US010733993B2

(12) United States Patent
Kudurshian et al.

(10) Patent No.: US 10,733,993 B2
(45) Date of Patent: Aug. 4, 2020

(54) INTELLIGENT DIGITAL ASSISTANT IN A MULTI-TASKING ENVIRONMENT

(71) Applicant: Apple Inc., Cupertino, CA (US)

(72) Inventors: Aram D. Kudurshian, San Francisco, CA (US); Bronwyn Jones, San Francisco, CA (US); Elizabeth Caroline Cranfill, San Francisco, CA (US); Harry J. Saddler, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/024,447

(22) Filed: Jun. 29, 2018

(65) Prior Publication Data

US 2018/0308485 A1 Oct. 25, 2018

Related U.S. Application Data

(63) Continuation of application No. 15/271,766, filed on Sep. 21, 2016, now Pat. No. 10,586,535.

(Continued)

(51) Int. Cl.

*G10L 15/22* (2006.01)
*G06F 16/683* (2019.01)

(Continued)

(52) U.S. Cl.

CPC .............. *G10L 15/22* (2013.01); *G06F 3/167* (2013.01); *G06F 16/685* (2019.01);

(Continued)

(58) Field of Classification Search

CPC ............... G10L 15/22; G10L 2015/221; G10L 2015/223; G10L 2015/225;

(Continued)

(56) References Cited

U.S. PATENT DOCUMENTS 1,559,320 A 10/1925 Hirsh
2,180,522 A 11/1939 Henne (Continued)

FOREIGN PATENT DOCUMENTS

CA 2694314 A1 8/2010
CA 2792412 A1 7/2011

(Continued)

OTHER PUBLICATIONS

Office Action received for Danish Patent Application No. PA201770032, dated Feb. 18, 2019, 2 pages.

(Continued)

*Primary Examiner* — Eric Yen
(74) *Attorney, Agent, or Firm* — Dentons US LLP

(57) ABSTRACT

Systems and processes for operating a digital assistant are provided. In one example, a method includes receiving a first speech input from a user. The method further includes identifying context information and determining a user intent based on the first speech input and the context information. The method further includes determining whether the user intent is to perform a task using a searching process or an object managing process. The searching process is configured to search data, and the object managing process is configured to manage objects. The method further includes, in accordance with a determination the user intent is to perform the task using the searching process, performing the task using the searching process; and in accordance with the determination that the user intent is to perform the task using the object managing process, performing the task using the object managing process.

44 Claims, 82 Drawing Sheets

Related U.S. Application Data

(60) Provisional application No. 62/348,728, filed on Jun. 10, 2016.

(51) Int. Cl.

| | |
|---|---|
| ***G06F 16/951*** | (2019.01) |
| ***G06F 3/16*** | (2006.01) |
| ***G06F 16/9032*** | (2019.01) |
| ***G10L 13/02*** | (2013.01) |
| ***G10L 15/18*** | (2013.01) |
| ***G10L 15/30*** | (2013.01) |

(52) U.S. Cl.
CPC ........ *G06F 16/9032* (2019.01); *G06F 16/951* (2019.01); *G10L 13/02* (2013.01); *G10L 15/1815* (2013.01); *G10L 15/30* (2013.01); *G10L 2015/223* (2013.01); *G10L 2015/228* (2013.01)

(58) Field of Classification Search
CPC ......... G10L 2015/226; G10L 2015/227; G10L 2015/228; G10L 15/26; G10L 15/265; G10L 15/28
See application file for complete search history.

(56) References Cited

U.S. PATENT DOCUMENTS

| | | | |
|---|---|---|---|
| 2,495,222 | A | 1/1950 | Bierig |
| 3,704,345 | A | 11/1972 | Coker et al. |
| 3,710,321 | A | 1/1973 | Rubenstein |
| 3,787,542 | A | 1/1974 | Gallagher et al. |
| 3,828,132 | A | 8/1974 | Flanagan et al. |
| 3,979,557 | A | 9/1976 | Schulman et al. |
| 4,013,085 | A | 3/1977 | Wright |
| 4,081,631 | A | 3/1978 | Feder |
| 4,090,216 | A | 5/1978 | Constable |
| 4,107,784 | A | 8/1978 | Van Bemmelen |
| 4,108,211 | A | 8/1978 | Tanaka |
| 4,159,536 | A | 6/1979 | Kehoe et al. |
| 4,181,821 | A | 1/1980 | Pirz et al. |
| 4,204,089 | A | 5/1980 | Key et al. |
| 4,241,286 | A | 12/1980 | Gordon |
| 4,253,477 | A | 3/1981 | Eichman |
| 4,278,838 | A | 7/1981 | Antonov |
| 4,282,405 | A | 8/1981 | Taguchi |
| 4,310,721 | A | 1/1982 | Manley et al. |
| 4,332,464 | A | 6/1982 | Bartulis et al. |
| 4,348,553 | A | 9/1982 | Baker et al. |
| 4,384,169 | A | 5/1983 | Mozer et al. |
| 4,386,345 | A | 5/1983 | Narveson et al. |
| 4,433,377 | A | 2/1984 | Eustis et al. |
| 4,451,849 | A | 5/1984 | Fuhrer |
| 4,485,439 | A | 11/1984 | Rothstein |
| 4,495,644 | A | 1/1985 | Parks et al. |
| 4,513,379 | A | 4/1985 | Wilson et al. |
| 4,513,435 | A | 4/1985 | Sakoe et al. |
| 4,555,775 | A | 11/1985 | Pike |
| 4,577,343 | A | 3/1986 | Oura |
| 4,586,158 | A | 4/1986 | Brandle |
| 4,587,670 | A | 5/1986 | Levinson et al. |
| 4,589,022 | A | 5/1986 | Prince et al. |
| 4,611,346 | A | 9/1986 | Bednar et al. |
| 4,615,081 | A | 10/1986 | Lindahl |
| 4,618,984 | A | 10/1986 | Das et al. |
| 4,642,790 | A | 2/1987 | Minshull et al. |
| 4,653,021 | A | 3/1987 | Takagi |
| 4,654,875 | A | 3/1987 | Srihari et al. |
| 4,655,233 | A | 4/1987 | Laughlin |
| 4,658,425 | A | 4/1987 | Julstrom |
| 4,670,848 | A | 6/1987 | Schramm |
| 4,677,570 | A | 6/1987 | Taki |
| 4,680,429 | A | 7/1987 | Murdock et al. |
| 4,680,805 | A | 7/1987 | Scott |
| 4,686,522 | A | 8/1987 | Hernandez et al. |
| 4,688,195 | A | 8/1987 | Thompson et al. |
| 4,692,941 | A | 9/1987 | Jacks et al. |
| 4,698,625 | A | 10/1987 | McCaskill et al. |
| 4,709,390 | A | 11/1987 | Atal et al. |
| 4,713,775 | A | 12/1987 | Scott et al. |
| 4,718,094 | A | 1/1988 | Bahl et al. |
| 4,724,542 | A | 2/1988 | Williford |
| 4,726,065 | A | 2/1988 | Froessl |
| 4,727,354 | A | 2/1988 | Lindsay |
| RE32,632 | E | 3/1988 | William |
| 4,736,296 | A | 4/1988 | Katayama et al. |
| 4,750,122 | A | 6/1988 | Kaji et al. |
| 4,754,489 | A | 6/1988 | Bokser |
| 4,755,811 | A | 7/1988 | Slavin et al. |
| 4,759,070 | A | 7/1988 | Voroba et al. |
| 4,776,016 | A | 10/1988 | Hansen |
| 4,783,804 | A | 11/1988 | Juang et al. |
| 4,783,807 | A | 11/1988 | Marley |
| 4,785,413 | A | 11/1988 | Atsumi |
| 4,790,028 | A | 12/1988 | Ramage |
| 4,797,930 | A | 1/1989 | Goudie |
| 4,802,223 | A | 1/1989 | Lin et al. |
| 4,803,729 | A | 2/1989 | Baker |
| 4,807,752 | A | 2/1989 | Chodorow |
| 4,811,243 | A | 3/1989 | Racine |
| 4,813,074 | A | 3/1989 | Marcus |
| 4,819,271 | A | 4/1989 | Bahl et al. |
| 4,827,518 | A | 5/1989 | Feustel et al. |
| 4,827,520 | A | 5/1989 | Zeinstra |
| 4,829,576 | A | 5/1989 | Porter |
| 4,829,583 | A | 5/1989 | Monroe et al. |
| 4,831,551 | A | 5/1989 | Schalk et al. |
| 4,833,712 | A | 5/1989 | Bahl et al. |
| 4,833,718 | A | 5/1989 | Sprague |
| 4,837,798 | A | 6/1989 | Cohen et al. |
| 4,837,831 | A | 6/1989 | Gillick et al. |
| 4,839,853 | A | 6/1989 | Deerwester et al. |
| 4,852,168 | A | 7/1989 | Sprague |
| 4,862,504 | A | 8/1989 | Nomura |
| 4,875,187 | A | 10/1989 | Smith |
| 4,878,230 | A | 10/1989 | Murakami et al. |
| 4,887,212 | A | 12/1989 | Zamora et al. |
| 4,896,359 | A | 1/1990 | Yamamoto et al. |
| 4,903,305 | A | 2/1990 | Gillick et al. |
| 4,905,163 | A | 2/1990 | Garber et al. |
| 4,908,867 | A | 3/1990 | Silverman |
| 4,914,586 | A | 4/1990 | Swinehart et al. |
| 4,914,590 | A | 4/1990 | Loatman et al. |
| 4,918,723 | A | 4/1990 | Iggulden et al. |
| 4,926,491 | A | 5/1990 | Maeda et al. |
| 4,928,307 | A | 5/1990 | Lynn |
| 4,931,783 | A | 6/1990 | Atkinson |
| 4,935,954 | A | 6/1990 | Thompson et al. |
| 4,939,639 | A | 7/1990 | Lee et al. |
| 4,941,488 | A | 7/1990 | Marxer et al. |
| 4,944,013 | A | 7/1990 | Gouvianakis et al. |
| 4,945,504 | A | 7/1990 | Nakama et al. |
| 4,953,106 | A | 8/1990 | Gansner et al. |
| 4,955,047 | A | 9/1990 | Morganstein et al. |
| 4,965,763 | A | 10/1990 | Zamora |
| 4,972,462 | A | 11/1990 | Shibata |
| 4,974,191 | A | 11/1990 | Amirghodsi et al. |
| 4,975,975 | A | 12/1990 | Filipski |
| 4,977,598 | A | 12/1990 | Doddington et al. |
| 4,980,916 | A | 12/1990 | Zinser |
| 4,985,924 | A | 1/1991 | Matsuura |
| 4,992,972 | A | 2/1991 | Brooks et al. |
| 4,994,966 | A | 2/1991 | Hutchins |
| 4,994,983 | A | 2/1991 | Landell et al. |
| 5,001,774 | A | 3/1991 | Lee |
| 5,003,577 | A | 3/1991 | Ertz et al. |
| 5,007,095 | A | 4/1991 | Nara et al. |
| 5,007,098 | A | 4/1991 | Kumagai |
| 5,010,574 | A | 4/1991 | Wang |
| 5,016,002 | A | 5/1991 | Levanto |
| 5,020,112 | A | 5/1991 | Chou |
| 5,021,971 | A | 6/1991 | Lindsay |
| 5,022,081 | A | 6/1991 | Hirose et al. |

(56) References Cited

U.S. PATENT DOCUMENTS

| | | | |
|---|---|---|---|
| 5,027,110 | A | 6/1991 | Chang et al. |
| 5,027,406 | A | 6/1991 | Roberts et al. |
| 5,027,408 | A | 6/1991 | Kroeker et al. |
| 5,029,211 | A | 7/1991 | Ozawa |
| 5,031,217 | A | 7/1991 | Nishimura |
| 5,032,989 | A | 7/1991 | Tornetta |
| 5,033,087 | A | 7/1991 | Bahl et al. |
| 5,040,218 | A | 8/1991 | Vitale et al. |
| 5,046,099 | A | 9/1991 | Nishimura |
| 5,047,614 | A | 9/1991 | Bianco |
| 5,047,617 | A | 9/1991 | Shepard et al. |
| 5,050,215 | A | 9/1991 | Nishimura |
| 5,053,758 | A | 10/1991 | Cornett et al. |
| 5,054,084 | A | 10/1991 | Tanaka et al. |
| 5,057,915 | A | 10/1991 | Von Kohorn |
| 5,062,143 | A | 10/1991 | Schmitt |
| 5,067,158 | A | 11/1991 | Arjmand |
| 5,067,503 | A | 11/1991 | Stile |
| 5,072,452 | A | 12/1991 | Brown et al. |
| 5,075,896 | A | 12/1991 | Wilcox et al. |
| 5,079,723 | A | 1/1992 | Herceg et al. |
| 5,083,119 | A | 1/1992 | Trevett et al. |
| 5,083,268 | A | 1/1992 | Hemphill et al. |
| 5,086,792 | A | 2/1992 | Chodorow |
| 5,090,012 | A | 2/1992 | Kajiyama et al. |
| 5,091,790 | A | 2/1992 | Silverberg |
| 5,091,945 | A | 2/1992 | Kleijn |
| 5,103,498 | A | 4/1992 | Lanier et al. |
| 5,109,509 | A | 4/1992 | Katayama et al. |
| 5,111,423 | A | 5/1992 | Kopec, Jr. et al. |
| 5,119,079 | A | 6/1992 | Hube et al. |
| 5,122,951 | A | 6/1992 | Kamiya |
| 5,123,103 | A | 6/1992 | Ohtaki et al. |
| 5,125,022 | A | 6/1992 | Hunt et al. |
| 5,125,030 | A | 6/1992 | Nomura et al. |
| 5,127,043 | A | 6/1992 | Hunt et al. |
| 5,127,053 | A | 6/1992 | Koch |
| 5,127,055 | A | 6/1992 | Larkey |
| 5,128,672 | A | 7/1992 | Kaehler |
| 5,133,011 | A | 7/1992 | McKiel, Jr. |
| 5,133,023 | A | 7/1992 | Bokser |
| 5,142,584 | A | 8/1992 | Ozawa |
| 5,144,875 | A | 9/1992 | Nakada |
| 5,148,541 | A | 9/1992 | Lee et al. |
| 5,153,913 | A | 10/1992 | Kandefer et al. |
| 5,157,610 | A | 10/1992 | Asano et al. |
| 5,157,779 | A | 10/1992 | Washburn et al. |
| 5,161,102 | A | 11/1992 | Griffin et al. |
| 5,163,809 | A | 11/1992 | Akgun et al. |
| 5,164,900 | A | 11/1992 | Bernath |
| 5,164,982 | A | 11/1992 | Davis |
| 5,165,007 | A | 11/1992 | Bahl et al. |
| 5,167,004 | A | 11/1992 | Netsch et al. |
| 5,175,536 | A | 12/1992 | Aschliman et al. |
| 5,175,803 | A | 12/1992 | Yeh |
| 5,175,814 | A | 12/1992 | Anick et al. |
| 5,179,627 | A | 1/1993 | Sweet et al. |
| 5,179,652 | A | 1/1993 | Rozmanith et al. |
| 5,194,950 | A | 3/1993 | Murakami et al. |
| 5,195,034 | A | 3/1993 | Garneau et al. |
| 5,195,167 | A | 3/1993 | Bahl et al. |
| 5,197,005 | A | 3/1993 | Shwartz et al. |
| 5,199,077 | A | 3/1993 | Wilcox et al. |
| 5,201,034 | A | 4/1993 | Matsuura et al. |
| 5,202,952 | A | 4/1993 | Gillick et al. |
| 5,208,862 | A | 5/1993 | Ozawa |
| 5,210,689 | A | 5/1993 | Baker et al. |
| 5,212,638 | A | 5/1993 | Bernath |
| 5,212,821 | A | 5/1993 | Gorin et al. |
| 5,216,747 | A | 6/1993 | Hardwick et al. |
| 5,218,700 | A | 6/1993 | Beechick |
| 5,220,629 | A | 6/1993 | Kosaka et al. |
| 5,220,639 | A | 6/1993 | Lee |
| 5,220,657 | A | 6/1993 | Bly et al. |
| 5,222,146 | A | 6/1993 | Bahl et al. |
| 5,230,036 | A | 7/1993 | Akamine et al. |
| 5,231,670 | A | 7/1993 | Goldhor et al. |
| 5,235,680 | A | 8/1993 | Bijnagte |
| 5,237,502 | A | 8/1993 | White et al. |
| 5,241,619 | A | 8/1993 | Schwartz et al. |
| 5,252,951 | A | 10/1993 | Tannenbaum et al. |
| 5,253,325 | A | 10/1993 | Clark |
| 5,255,386 | A | 10/1993 | Prager |
| 5,257,387 | A | 10/1993 | Richek et al. |
| 5,260,697 | A | 11/1993 | Barrett et al. |
| 5,266,931 | A | 11/1993 | Tanaka |
| 5,266,949 | A | 11/1993 | Rossi |
| 5,267,345 | A | 11/1993 | Brown et al. |
| 5,268,990 | A | 12/1993 | Cohen et al. |
| 5,274,771 | A | 12/1993 | Hamilton et al. |
| 5,274,818 | A | 12/1993 | Vasilevsky et al. |
| 5,276,616 | A | 1/1994 | Kuga et al. |
| 5,276,794 | A | 1/1994 | Lamb, Jr. |
| 5,278,980 | A | 1/1994 | Pedersen et al. |
| 5,282,265 | A | 1/1994 | Rohra Suda et al. |
| 5,283,818 | A | 2/1994 | Klausner et al. |
| 5,287,448 | A | 2/1994 | Nicol et al. |
| 5,289,562 | A | 2/1994 | Mizuta et al. |
| RE34,562 | E | 3/1994 | Murakami et al. |
| 5,291,286 | A | 3/1994 | Murakami et al. |
| 5,293,254 | A | 3/1994 | Eschbach |
| 5,293,448 | A | 3/1994 | Honda |
| 5,293,452 | A | 3/1994 | Picone et al. |
| 5,296,642 | A | 3/1994 | Konishi |
| 5,297,170 | A | 3/1994 | Eyuboglu et al. |
| 5,297,194 | A | 3/1994 | Hunt et al. |
| 5,299,125 | A | 3/1994 | Baker et al. |
| 5,299,284 | A | 3/1994 | Roy |
| 5,301,109 | A | 4/1994 | Landauer et al. |
| 5,303,406 | A | 4/1994 | Hansen et al. |
| 5,305,205 | A | 4/1994 | Weber et al. |
| 5,305,421 | A | 4/1994 | Li et al. |
| 5,305,768 | A | 4/1994 | Gross et al. |
| 5,309,359 | A | 5/1994 | Katz et al. |
| 5,315,689 | A | 5/1994 | Kanazawa et al. |
| 5,317,507 | A | 5/1994 | Gallant |
| 5,317,647 | A | 5/1994 | Pagallo |
| 5,325,297 | A | 6/1994 | Bird et al. |
| 5,325,298 | A | 6/1994 | Gallant |
| 5,325,462 | A | 6/1994 | Farrett |
| 5,326,270 | A | 7/1994 | Ostby et al. |
| 5,327,342 | A | 7/1994 | Roy |
| 5,327,498 | A | 7/1994 | Hamon |
| 5,329,608 | A | 7/1994 | Bocchieri et al. |
| 5,333,236 | A | 7/1994 | Bahl et al. |
| 5,333,266 | A | 7/1994 | Boaz et al. |
| 5,333,275 | A | 7/1994 | Wheatley et al. |
| 5,335,011 | A | 8/1994 | Addeo et al. |
| 5,335,276 | A | 8/1994 | Thompson et al. |
| 5,341,293 | A | 8/1994 | Vertelney et al. |
| 5,341,466 | A | 8/1994 | Perlin et al. |
| 5,345,536 | A | 9/1994 | Hoshimi et al. |
| 5,349,645 | A | 9/1994 | Zhao |
| 5,353,374 | A | 10/1994 | Wilson et al. |
| 5,353,376 | A | 10/1994 | Oh et al. |
| 5,353,377 | A | 10/1994 | Kuroda et al. |
| 5,353,408 | A | 10/1994 | Kato et al. |
| 5,353,432 | A | 10/1994 | Richek et al. |
| 5,357,431 | A | 10/1994 | Nakada et al. |
| 5,367,640 | A | 11/1994 | Hamilton et al. |
| 5,369,575 | A | 11/1994 | Lamberti et al. |
| 5,369,577 | A | 11/1994 | Kadashevich et al. |
| 5,371,853 | A | 12/1994 | Kao et al. |
| 5,371,901 | A | 12/1994 | Reed et al. |
| 5,373,566 | A | 12/1994 | Murdock |
| 5,377,103 | A | 12/1994 | Lamberti et al. |
| 5,377,301 | A | 12/1994 | Rosenberg et al. |
| 5,377,303 | A | 12/1994 | Firman |
| 5,384,671 | A | 1/1995 | Fisher |
| 5,384,892 | A | 1/1995 | Strong |
| 5,384,893 | A | 1/1995 | Hutchins |
| 5,386,494 | A | 1/1995 | White |
| 5,386,556 | A | 1/1995 | Hedin et al. |
| 5,390,236 | A | 2/1995 | Klausner et al. |

(56) References Cited

U.S. PATENT DOCUMENTS 5,390,279 A 2/1995 Strong
5,390,281 A 2/1995 Luciw et al.
5,392,419 A 2/1995 Walton
5,396,625 A 3/1995 Parkes
5,400,434 A 3/1995 Pearson
5,404,295 A 4/1995 Katz et al.
5,406,305 A 4/1995 Shimomura et al.
5,408,060 A 4/1995 Muurinen
5,412,756 A 5/1995 Bauman et al.
5,412,804 A 5/1995 Krishna
5,412,806 A 5/1995 Du et al.
5,418,951 A 5/1995 Damashek
5,422,656 A 6/1995 Allard et al.
5,424,947 A 6/1995 Nagao et al.
5,425,108 A 6/1995 Hwang et al.
5,428,731 A 6/1995 Powers
5,434,777 A 7/1995 Luciw
5,440,615 A 8/1995 Caccuro et al.
5,442,598 A 8/1995 Haikawa et al.
5,442,780 A 8/1995 Takanashi et al.
5,444,823 A 8/1995 Nguyen
5,449,368 A 9/1995 Kuzmak
5,450,523 A 9/1995 Zhao
5,455,888 A 10/1995 Iyengar et al.
5,457,768 A 10/1995 Tsuboi et al.
5,459,488 A 10/1995 Geiser
5,463,696 A 10/1995 Beernink et al.
5,463,725 A 10/1995 Henckel et al.
5,465,401 A 11/1995 Thompson
5,469,529 A 11/1995 Bimbot et al.
5,471,611 A 11/1995 McGregor
5,473,728 A 12/1995 Luginbuhl et al.
5,475,587 A 12/1995 Anick et al.
5,475,796 A 12/1995 Iwata
5,477,447 A 12/1995 Luciw et al.
5,477,448 A 12/1995 Golding et al.
5,477,451 A 12/1995 Brown et al.
5,479,488 A 12/1995 Lennig et al.
5,481,739 A 1/1996 Staats
5,483,261 A 1/1996 Yasutake
5,485,372 A 1/1996 Golding et al.
5,485,543 A 1/1996 Aso
5,488,204 A 1/1996 Mead et al.
5,488,727 A 1/1996 Agrawal et al.
5,490,234 A 2/1996 Narayan
5,491,758 A 2/1996 Bellegarda et al.
5,491,772 A 2/1996 Hardwick et al.
5,493,677 A 2/1996 Balogh et al.
5,495,604 A 2/1996 Harding et al.
5,497,319 A 3/1996 Chong et al.
5,500,903 A 3/1996 Gulli
5,500,905 A 3/1996 Martin et al.
5,500,937 A 3/1996 Thompson-Rohrlich
5,502,774 A 3/1996 Bellegarda et al.
5,502,790 A 3/1996 Yi
5,502,791 A 3/1996 Nishimura et al.
5,515,475 A 5/1996 Gupta et al.
5,521,816 A 5/1996 Roche et al.
5,524,140 A 6/1996 Klausner et al.
5,530,861 A 6/1996 Diamant et al.
5,533,182 A 7/1996 Bates et al.
5,535,121 A 7/1996 Roche et al.
5,536,902 A 7/1996 Serra et al.
5,537,317 A 7/1996 Schabes et al.
5,537,618 A 7/1996 Boulton et al.
5,537,647 A 7/1996 Hermansky et al.
5,543,588 A 8/1996 Bisset et al.
5,543,897 A 8/1996 Altrieth, III
5,544,264 A 8/1996 Bellegarda et al.
5,548,507 A 8/1996 Martino et al.
5,555,343 A 9/1996 Luther
5,555,344 A 9/1996 Zunkler
5,559,301 A 9/1996 Bryan, Jr. et al.
5,559,945 A 9/1996 Beaudet et al.
5,564,446 A 10/1996 Wiltshire
5,565,888 A 10/1996 Selker
5,568,536 A 10/1996 Tiller et al.
5,568,540 A 10/1996 Greco et al.
5,570,324 A 10/1996 Geil
5,572,576 A 11/1996 Klausner et al.
5,574,823 A 11/1996 Hassanein et al.
5,574,824 A 11/1996 Slyh et al.
5,577,135 A 11/1996 Grajski et al.
5,577,164 A 11/1996 Kaneko et al.
5,577,241 A 11/1996 Spencer
5,578,808 A 11/1996 Taylor
5,579,037 A 11/1996 Tahara et al.
5,579,436 A 11/1996 Chou et al.
5,581,484 A 12/1996 Prince
5,581,652 A 12/1996 Abe et al.
5,581,655 A 12/1996 Cohen et al.
5,583,993 A 12/1996 Foster et al.
5,584,024 A 12/1996 Shwartz
5,586,540 A 12/1996 Marzec et al.
5,594,641 A 1/1997 Kaplan et al.
5,596,260 A 1/1997 Moravec et al.
5,596,676 A 1/1997 Swaminathan et al.
5,596,994 A 1/1997 Bro
5,608,624 A 3/1997 Luciw
5,608,698 A 3/1997 Yamanoi et al.
5,608,841 A 3/1997 Tsuboka
5,610,812 A 3/1997 Schabes et al.
5,613,036 A 3/1997 Strong
5,613,122 A 3/1997 Burnard et al.
5,615,378 A 3/1997 Nishino et al.
5,615,384 A 3/1997 Allard et al.
5,616,876 A 4/1997 Cluts
5,617,386 A 4/1997 Choi
5,617,507 A 4/1997 Lee et al.
5,617,539 A 4/1997 Ludwig et al.
5,619,583 A 4/1997 Page et al.
5,619,694 A 4/1997 Shimazu
5,621,859 A 4/1997 Schwartz et al.
5,621,903 A 4/1997 Luciw et al.
5,627,939 A 5/1997 Huang et al.
5,634,084 A 5/1997 Malsheen et al.
5,636,325 A 6/1997 Farrett
5,638,425 A 6/1997 Meador, III et al.
5,638,489 A 6/1997 Tsuboka
5,638,523 A 6/1997 Mullet et al.
5,640,487 A 6/1997 Lau et al.
5,642,464 A 6/1997 Yue et al.
5,642,466 A 6/1997 Narayan
5,642,519 A 6/1997 Martin
5,644,656 A 7/1997 Akra et al.
5,644,727 A 7/1997 Atkins
5,644,735 A 7/1997 Luciw et al.
5,649,060 A 7/1997 Ellozy et al.
5,652,828 A 7/1997 Silverman
5,652,884 A 7/1997 Palevich
5,652,897 A 7/1997 Linebarger et al.
5,661,787 A 8/1997 Pocock
5,664,055 A 9/1997 Kroon
5,664,206 A 9/1997 Murow et al.
5,670,985 A 9/1997 Cappels, Sr. et al.
5,675,704 A 10/1997 Juang et al.
5,675,819 A 10/1997 Schuetze
5,678,039 A 10/1997 Hinks et al.
5,678,053 A 10/1997 Anderson
5,682,475 A 10/1997 Johnson et al.
5,682,539 A 10/1997 Conrad et al.
5,684,513 A 11/1997 Decker
5,687,077 A 11/1997 Gough, Jr.
5,689,287 A 11/1997 Mackinlay et al.
5,689,616 A 11/1997 Li
5,689,618 A 11/1997 Gasper et al.
5,692,205 A 11/1997 Berry et al.
5,696,962 A 12/1997 Kupiec
5,697,793 A 12/1997 Huffman et al.
5,699,082 A 12/1997 Marks et al.
5,701,400 A 12/1997 Amado
5,706,442 A 1/1998 Anderson et al.
5,708,659 A 1/1998 Rostoker et al.
5,708,822 A 1/1998 Wical

(56) References Cited

U.S. PATENT DOCUMENTS 5,710,886 A 1/1998 Christensen et al.
5,710,922 A 1/1998 Alley et al.
5,712,949 A 1/1998 Kato et al.
5,712,957 A 1/1998 Weibel et al.
5,715,468 A 2/1998 Budzinski
5,717,877 A 2/1998 Orton et al.
5,721,827 A 2/1998 Logan et al.
5,721,949 A 2/1998 Smith et al.
5,724,406 A 3/1998 Juster
5,724,985 A 3/1998 Snell et al.
5,726,672 A 3/1998 Hernandez et al.
5,727,950 A 3/1998 Cook et al.
5,729,694 A 3/1998 Holzrichter et al.
5,729,704 A 3/1998 Stone et al.
5,732,216 A 3/1998 Logan et al.
5,732,390 A 3/1998 Katayanagi et al.
5,732,395 A 3/1998 Silverman
5,734,750 A 3/1998 Arai et al.
5,734,791 A 3/1998 Acero et al.
5,736,974 A 4/1998 Selker
5,737,487 A 4/1998 Bellegarda et al.
5,737,609 A 4/1998 Reed et al.
5,737,734 A 4/1998 Schultz
5,739,451 A 4/1998 Winksy et al.
5,740,143 A 4/1998 Suetomi
5,742,705 A 4/1998 Parthasarathy
5,742,736 A 4/1998 Haddock
5,745,116 A 4/1998 Pisutha-Arnond
5,745,843 A 4/1998 Wetters et al.
5,745,873 A 4/1998 Braida et al.
5,748,512 A 5/1998 Vargas
5,748,974 A 5/1998 Johnson
5,749,071 A 5/1998 Silverman
5,749,081 A 5/1998 Whiteis
5,751,906 A 5/1998 Silverman
5,757,358 A 5/1998 Osga
5,757,979 A 5/1998 Hongo et al.
5,758,024 A 5/1998 Alleva
5,758,079 A 5/1998 Ludwig et al.
5,758,083 A 5/1998 Singh et al.
5,758,314 A 5/1998 McKenna
5,758,318 A 5/1998 Kojima et al.
5,759,101 A 6/1998 Von Kohorn
5,761,640 A 6/1998 Kalyanswamy et al.
5,761,687 A 6/1998 Hon et al.
5,764,852 A 6/1998 Williams
5,765,131 A 6/1998 Stentiford et al.
5,765,168 A 6/1998 Burrows
5,771,276 A 6/1998 Wolf
5,774,834 A 6/1998 Visser
5,774,855 A 6/1998 Foti et al.
5,774,859 A 6/1998 Houser et al.
5,777,614 A 7/1998 Ando et al.
5,778,405 A 7/1998 Ogawa
5,790,978 A 8/1998 Olive et al.
5,794,050 A 8/1998 Dahlgren et al.
5,794,182 A 8/1998 Manduchi et al.
5,794,207 A 8/1998 Walker et al.
5,794,237 A 8/1998 Gore, Jr.
5,797,008 A 8/1998 Burrows
5,799,268 A 8/1998 Boguraev
5,799,269 A 8/1998 Schabes et al.
5,799,276 A 8/1998 Komissarchik et al.
5,799,279 A 8/1998 Gould et al.
5,801,692 A 9/1998 Muzio et al.
5,802,466 A 9/1998 Gallant et al.
5,802,526 A 9/1998 Fawcett et al.
5,806,021 A 9/1998 Chen et al.
5,812,697 A 9/1998 Sakai et al.
5,812,698 A 9/1998 Platt et al.
5,815,142 A 9/1998 Allard et al.
5,815,225 A 9/1998 Nelson
5,818,142 A 10/1998 Edleblute et al.
5,818,451 A 10/1998 Bertram et al.
5,818,924 A 10/1998 King et al.
5,822,288 A 10/1998 Shinada
5,822,720 A 10/1998 Bookman et al.
5,822,730 A 10/1998 Roth et al.
5,822,743 A 10/1998 Gupta et al.
5,825,349 A 10/1998 Meier et al.
5,825,352 A 10/1998 Bisset et al.
5,825,881 A 10/1998 Colvin, Sr.
5,826,261 A 10/1998 Spencer
5,828,768 A 10/1998 Eatwell et al.
5,828,999 A 10/1998 Bellegarda et al.
5,832,433 A 11/1998 Yashchin et al.
5,832,435 A 11/1998 Silverman
5,833,134 A 11/1998 Ho et al.
5,835,077 A 11/1998 Dao et al.
5,835,079 A 11/1998 Shieh
5,835,721 A 11/1998 Donahue et al.
5,835,732 A 11/1998 Kikinis et al.
5,835,893 A 11/1998 Ushioda
5,839,106 A 11/1998 Bellegarda
5,841,902 A 11/1998 Tu
5,842,165 A 11/1998 Raman et al.
5,845,255 A 12/1998 Mayaud
5,848,410 A 12/1998 Walls et al.
5,850,480 A 12/1998 Scanlon
5,850,629 A 12/1998 Holm et al.
5,852,801 A 12/1998 Hon et al.
5,854,893 A 12/1998 Ludwig et al.
5,855,000 A 12/1998 Waibel et al.
5,857,184 A 1/1999 Lynch
5,859,636 A 1/1999 Pandit
5,860,063 A 1/1999 Gorin et al.
5,860,064 A 1/1999 Henton
5,860,075 A 1/1999 Hashizume et al.
5,862,223 A 1/1999 Walker et al.
5,862,233 A 1/1999 Poletti
5,864,806 A 1/1999 Mokbel et al.
5,864,815 A 1/1999 Rozak et al.
5,864,844 A 1/1999 James et al.
5,864,855 A 1/1999 Ruocco et al.
5,864,868 A 1/1999 Contois
5,867,799 A 2/1999 Lang et al.
5,870,710 A 2/1999 Ozawa et al.
5,873,056 A 2/1999 Liddy et al.
5,873,064 A 2/1999 De Armas et al.
5,875,427 A 2/1999 Yamazaki
5,875,429 A 2/1999 Douglas
5,875,437 A 2/1999 Atkins
5,876,396 A 3/1999 Lo et al.
5,877,751 A 3/1999 Kanemitsu et al.
5,877,757 A 3/1999 Baldwin et al.
5,878,393 A 3/1999 Hata et al.
5,878,394 A 3/1999 Muhling
5,878,396 A 3/1999 Henton
5,880,411 A 3/1999 Gillespie et al.
5,880,731 A 3/1999 Liles et al.
5,884,039 A 3/1999 Ludwig et al.
5,884,323 A 3/1999 Hawkins et al.
5,890,117 A 3/1999 Silverman
5,890,122 A 3/1999 Van et al.
5,891,180 A 4/1999 Greeninger et al.
5,893,126 A 4/1999 Drews et al.
5,893,132 A 4/1999 Huffman et al.
5,895,448 A 4/1999 Vysotsky et al.
5,895,464 A 4/1999 Bhandari et al.
5,895,466 A 4/1999 Goldberg et al.
5,896,321 A 4/1999 Miller et al.
5,896,500 A 4/1999 Ludwig et al.
5,899,972 A 5/1999 Miyazawa et al.
5,905,498 A 5/1999 Diament et al.
5,907,597 A 5/1999 Mark
5,909,666 A 6/1999 Gould et al.
5,912,951 A 6/1999 Checchio et al.
5,912,952 A 6/1999 Brendzel
5,913,185 A 6/1999 Martino et al.
5,913,193 A 6/1999 Huang et al.
5,915,001 A 6/1999 Uppaluru et al.
5,915,236 A 6/1999 Gould et al.
5,915,238 A 6/1999 Tjaden
5,915,249 A 6/1999 Spencer

(56) References Cited

U.S. PATENT DOCUMENTS

| | | | |
|---|---|---|---|
| 5,917,487 | A | 6/1999 | Ulrich |
| 5,918,303 | A | 6/1999 | Yamaura et al. |
| 5,920,327 | A | 7/1999 | Seidensticker, Jr. |
| 5,920,836 | A | 7/1999 | Gould et al. |
| 5,920,837 | A | 7/1999 | Gould et al. |
| 5,923,757 | A | 7/1999 | Hooker et al. |
| 5,924,068 | A | 7/1999 | Richard et al. |
| 5,926,769 | A | 7/1999 | Valimaa et al. |
| 5,926,789 | A | 7/1999 | Barbara et al. |
| 5,930,408 | A | 7/1999 | Seto |
| 5,930,751 | A | 7/1999 | Cohrs et al. |
| 5,930,754 | A | 7/1999 | Karaali et al. |
| 5,930,769 | A | 7/1999 | Rose |
| 5,930,783 | A | 7/1999 | Li et al. |
| 5,933,477 | A | 8/1999 | Wu |
| 5,933,806 | A | 8/1999 | Beyerlein et al. |
| 5,933,822 | A | 8/1999 | Braden-Harder et al. |
| 5,936,926 | A | 8/1999 | Yokouchi et al. |
| 5,937,163 | A | 8/1999 | Lee et al. |
| 5,940,811 | A | 8/1999 | Norris |
| 5,940,841 | A | 8/1999 | Schmuck et al. |
| 5,941,944 | A | 8/1999 | Messerly |
| 5,943,043 | A | 8/1999 | Furuhata et al. |
| 5,943,049 | A | 8/1999 | Matsubara et al. |
| 5,943,052 | A | 8/1999 | Allen et al. |
| 5,943,429 | A | 8/1999 | Haendel et al. |
| 5,943,443 | A | 8/1999 | Itonori et al. |
| 5,943,670 | A | 8/1999 | Prager |
| 5,946,647 | A | 8/1999 | Miller et al. |
| 5,946,648 | A | 8/1999 | Halstead et al. |
| 5,948,040 | A | 9/1999 | DeLorme et al. |
| 5,949,961 | A | 9/1999 | Sharman |
| 5,950,123 | A | 9/1999 | Schwelb et al. |
| 5,952,992 | A | 9/1999 | Helms |
| 5,953,541 | A | 9/1999 | King et al. |
| 5,956,021 | A | 9/1999 | Kubota et al. |
| 5,956,699 | A | 9/1999 | Wong et al. |
| 5,960,385 | A | 9/1999 | Skiena et al. |
| 5,960,394 | A | 9/1999 | Gould et al. |
| 5,960,422 | A | 9/1999 | Prasad |
| 5,963,208 | A | 10/1999 | Dolan et al. |
| 5,963,924 | A | 10/1999 | Williams et al. |
| 5,963,964 | A | 10/1999 | Nielsen |
| 5,966,126 | A | 10/1999 | Szabo |
| 5,970,446 | A | 10/1999 | Goldberg et al. |
| 5,970,474 | A | 10/1999 | LeRoy et al. |
| 5,973,612 | A | 10/1999 | Deo et al. |
| 5,973,676 | A | 10/1999 | Kawakura |
| 5,974,146 | A | 10/1999 | Randle et al. |
| 5,977,950 | A | 11/1999 | Rhyne |
| 5,982,352 | A | 11/1999 | Pryor |
| 5,982,370 | A | 11/1999 | Kamper |
| 5,982,891 | A | 11/1999 | Ginter et al. |
| 5,982,902 | A | 11/1999 | Terano |
| 5,983,179 | A | 11/1999 | Gould et al. |
| 5,983,184 | A | 11/1999 | Noguchi |
| 5,983,216 | A | 11/1999 | Kirsch et al. |
| 5,987,132 | A | 11/1999 | Rowney |
| 5,987,140 | A | 11/1999 | Rowney et al. |
| 5,987,401 | A | 11/1999 | Trudeau |
| 5,987,404 | A | 11/1999 | Della Pietra et al. |
| 5,987,440 | A | 11/1999 | O'Neil et al. |
| 5,990,887 | A | 11/1999 | Redpath et al. |
| 5,991,441 | A | 11/1999 | Jourjine |
| 5,995,460 | A | 11/1999 | Takagi et al. |
| 5,995,590 | A | 11/1999 | Brunet et al. |
| 5,995,918 | A | 11/1999 | Kendall et al. |
| 5,998,972 | A | 12/1999 | Gong |
| 5,999,169 | A | 12/1999 | Lee |
| 5,999,895 | A | 12/1999 | Forest |
| 5,999,908 | A | 12/1999 | Abelow |
| 5,999,927 | A | 12/1999 | Tukey et al. |
| 6,005,495 | A | 12/1999 | Connolly et al. |
| 6,006,274 | A | 12/1999 | Hawkins et al. |
| 6,009,237 | A | 12/1999 | Hirabayashi et al. |
| 6,011,585 | A | 1/2000 | Anderson |
| 6,014,428 | A | 1/2000 | Wolf |
| 6,016,471 | A | 1/2000 | Kuhn et al. |
| 6,017,219 | A | 1/2000 | Adams, Jr. et al. |
| 6,018,705 | A | 1/2000 | Gaudet |
| 6,018,711 | A | 1/2000 | French-St. George et al. |
| 6,020,881 | A | 2/2000 | Naughton et al. |
| 6,023,536 | A | 2/2000 | Visser |
| 6,023,676 | A | 2/2000 | Erell |
| 6,023,684 | A | 2/2000 | Pearson |
| 6,024,288 | A | 2/2000 | Gottlich et al. |
| 6,026,345 | A | 2/2000 | Shah et al. |
| 6,026,375 | A | 2/2000 | Hall et al. |
| 6,026,388 | A | 2/2000 | Liddy et al. |
| 6,026,393 | A | 2/2000 | Gupta et al. |
| 6,029,132 | A | 2/2000 | Kuhn et al. |
| 6,029,135 | A | 2/2000 | Krasle |
| 6,035,267 | A | 3/2000 | Watanabe et al. |
| 6,035,303 | A | 3/2000 | Baer et al. |
| 6,035,336 | A | 3/2000 | Lu et al. |
| 6,038,533 | A | 3/2000 | Buchsbaum et al. |
| 6,040,824 | A | 3/2000 | Maekawa et al. |
| 6,041,023 | A | 3/2000 | Lakhansingh |
| 6,047,255 | A | 4/2000 | Williamson |
| 6,047,300 | A | 4/2000 | Walfish et al. |
| 6,052,654 | A | 4/2000 | Gaudet et al. |
| 6,052,656 | A | 4/2000 | Suda et al. |
| 6,054,990 | A | 4/2000 | Tran |
| 6,055,514 | A | 4/2000 | Wren |
| 6,055,531 | A | 4/2000 | Bennett et al. |
| 6,061,646 | A | 5/2000 | Martino et al. |
| 6,064,767 | A | 5/2000 | Muir et al. |
| 6,064,951 | A | 5/2000 | Park et al. |
| 6,064,959 | A | 5/2000 | Young et al. |
| 6,064,960 | A | 5/2000 | Bellegarda et al. |
| 6,064,963 | A | 5/2000 | Gainsboro |
| 6,067,519 | A | 5/2000 | Lowry |
| 6,069,648 | A | 5/2000 | Suso et al. |
| 6,070,138 | A | 5/2000 | Iwata |
| 6,070,139 | A | 5/2000 | Miyazawa et al. |
| 6,070,140 | A | 5/2000 | Tran |
| 6,070,147 | A | 5/2000 | Harms et al. |
| 6,073,033 | A | 6/2000 | Campo |
| 6,073,036 | A | 6/2000 | Heikkinen et al. |
| 6,073,091 | A | 6/2000 | Kanevsky et al. |
| 6,073,097 | A | 6/2000 | Gould et al. |
| 6,076,051 | A | 6/2000 | Messerly et al. |
| 6,076,060 | A | 6/2000 | Lin et al. |
| 6,076,088 | A | 6/2000 | Paik et al. |
| 6,078,885 | A | 6/2000 | Beutnagel |
| 6,078,914 | A | 6/2000 | Redfern |
| 6,081,750 | A | 6/2000 | Hoffberg et al. |
| 6,081,774 | A | 6/2000 | de Hita et al. |
| 6,081,780 | A | 6/2000 | Lumelsky |
| 6,085,204 | A | 7/2000 | Chijiwa et al. |
| 6,088,671 | A | 7/2000 | Gould et al. |
| 6,088,731 | A | 7/2000 | Kiraly et al. |
| 6,092,036 | A | 7/2000 | Hamann et al. |
| 6,092,038 | A | 7/2000 | Kanevsky et al. |
| 6,092,043 | A | 7/2000 | Squires et al. |
| 6,094,649 | A | 7/2000 | Bowen et al. |
| 6,097,391 | A | 8/2000 | Wilcox |
| 6,101,468 | A | 8/2000 | Gould et al. |
| 6,101,470 | A | 8/2000 | Eide et al. |
| 6,105,865 | A | 8/2000 | Hardesty |
| 6,108,627 | A | 8/2000 | Sabourin |
| 6,108,640 | A | 8/2000 | Slotznick |
| 6,111,562 | A | 8/2000 | Downs et al. |
| 6,111,572 | A | 8/2000 | Blair et al. |
| 6,115,686 | A | 9/2000 | Chung et al. |
| 6,116,907 | A | 9/2000 | Baker et al. |
| 6,119,101 | A | 9/2000 | Peckover |
| 6,121,960 | A | 9/2000 | Carroll et al. |
| 6,122,340 | A | 9/2000 | Darley et al. |
| 6,122,614 | A | 9/2000 | Kahn et al. |
| 6,122,616 | A | 9/2000 | Henton |
| 6,122,647 | A | 9/2000 | Horowitz et al. |
| 6,125,284 | A | 9/2000 | Moore et al. |
| 6,125,346 | A | 9/2000 | Nishimura et al. |

(56) References Cited

U.S. PATENT DOCUMENTS 6,125,356 A 9/2000 Brockman et al.
6,129,582 A 10/2000 Wilhite et al.
6,138,098 A 10/2000 Shieber et al.
6,138,158 A 10/2000 Boyle et al.
6,141,642 A 10/2000 Oh
6,141,644 A 10/2000 Kuhn et al.
6,144,377 A 11/2000 Oppermann et al.
6,144,380 A 11/2000 Shwarts et al.
6,144,938 A 11/2000 Surace et al.
6,144,939 A 11/2000 Pearson et al.
6,151,401 A 11/2000 Annaratone
6,154,551 A 11/2000 Frenkel
6,154,720 A 11/2000 Onishi et al.
6,157,935 A 12/2000 Tran et al.
6,161,084 A 12/2000 Messerly et al.
6,161,087 A 12/2000 Wightman et al.
6,161,944 A 12/2000 Leman
6,163,769 A 12/2000 Acero et al.
6,163,809 A 12/2000 Buckley
6,167,369 A 12/2000 Schulze
6,169,538 B1 1/2001 Nowlan et al.
6,172,948 B1 1/2001 Keller et al.
6,173,194 B1 1/2001 Vanttila
6,173,251 B1 1/2001 Ito et al.
6,173,261 B1 1/2001 Arai et al.
6,173,263 B1 1/2001 Conkie
6,173,279 B1 1/2001 Levin et al.
6,177,905 B1 1/2001 Welch
6,177,931 B1 1/2001 Alexander et al.
6,179,432 B1 1/2001 Zhang et al.
6,182,028 B1 1/2001 Karaali et al.
6,182,099 B1 1/2001 Nakasato
6,185,533 B1 2/2001 Holm et al.
6,188,391 B1 2/2001 Seely et al.
6,188,967 B1 2/2001 Kurtzberg et al.
6,188,999 B1 2/2001 Moody
6,191,939 B1 2/2001 Burnett
6,192,253 B1 2/2001 Charlier et al.
6,192,340 B1 2/2001 Abecassis
6,195,641 B1 2/2001 Loring et al.
6,199,076 B1 3/2001 Logan et al.
6,205,456 B1 3/2001 Nakao
6,208,044 B1 3/2001 Viswanadham et al.
6,208,932 B1 3/2001 Ohmura et al.
6,208,956 B1 3/2001 Motoyama
6,208,964 B1 3/2001 Sabourin
6,208,967 B1 3/2001 Pauws et al.
6,208,971 B1 3/2001 Bellegarda et al.
6,212,564 B1 4/2001 Harter et al.
6,216,102 B1 4/2001 Martino et al.
6,216,131 B1 4/2001 Liu et al.
6,217,183 B1 4/2001 Shipman
6,222,347 B1 4/2001 Gong
6,226,403 B1 5/2001 Parthasarathy
6,226,533 B1 5/2001 Akahane
6,226,614 B1 5/2001 Mizuno et al.
6,226,655 B1 5/2001 Borman et al.
6,230,322 B1 5/2001 Saib et al.
6,232,539 B1 5/2001 Looney et al.
6,232,966 B1 5/2001 Kurlander
6,233,545 B1 5/2001 Datig
6,233,547 B1 5/2001 Denber et al.
6,233,559 B1 * 5/2001 Balakrishnan .......... G06F 9/451
704/275
6,233,578 B1 5/2001 Machihara et al.
6,237,025 B1 5/2001 Ludwig et al.
6,240,303 B1 5/2001 Katzur
6,243,681 B1 6/2001 Guji et al.
6,246,981 B1 6/2001 Papineni et al.
6,248,946 B1 6/2001 Dwek
6,249,606 B1 6/2001 Kiraly et al.
6,259,436 B1 7/2001 Moon et al.
6,259,826 B1 7/2001 Pollard et al.
6,260,011 B1 7/2001 Heckerman et al.
6,260,013 B1 7/2001 Sejnoha
6,260,016 B1 7/2001 Holm et al.
6,260,024 B1 7/2001 Shkedy
6,266,098 B1 7/2001 Cove et al.
6,266,637 B1 7/2001 Donovan et al.
6,268,859 B1 7/2001 Andresen et al.
6,269,712 B1 8/2001 Zentmyer
6,271,835 B1 8/2001 Hoeksma
6,272,456 B1 8/2001 De Campos
6,272,464 B1 8/2001 Kiraz et al.
6,275,795 B1 8/2001 Tzirkel-Hancock
6,275,824 B1 8/2001 O'Flaherty et al.
6,278,443 B1 8/2001 Amro et al.
6,278,970 B1 8/2001 Milner
6,282,507 B1 8/2001 Horiguchi et al.
6,282,511 B1 8/2001 Mayer
6,285,785 B1 9/2001 Bellegarda et al.
6,285,786 B1 9/2001 Seni et al.
6,289,085 B1 9/2001 Miyashita et al.
6,289,124 B1 9/2001 Okamoto
6,289,301 B1 9/2001 Higginbotham et al.
6,289,353 B1 9/2001 Hazlehurst et al.
6,292,772 B1 9/2001 Kantrowitz
6,292,778 B1 9/2001 Sukkar
6,295,390 B1 9/2001 Kobayashi et al.
6,295,541 B1 9/2001 Bodnar et al.
6,297,818 B1 10/2001 Ulrich et al.
6,298,314 B1 10/2001 Blackadar et al.
6,298,321 B1 10/2001 Karlov et al.
6,300,947 B1 10/2001 Kanevsky
6,304,844 B1 10/2001 Pan et al.
6,304,846 B1 10/2001 George et al.
6,307,548 B1 10/2001 Flinchem et al.
6,308,149 B1 10/2001 Gaussier et al.
6,310,610 B1 10/2001 Beaton et al.
6,311,152 B1 10/2001 Bai et al.
6,311,157 B1 10/2001 Strong
6,311,189 B1 10/2001 deVries et al.
6,317,237 B1 11/2001 Nakao et al.
6,317,594 B1 11/2001 Gossman et al.
6,317,707 B1 11/2001 Bangalore et al.
6,317,831 B1 11/2001 King
6,321,092 B1 11/2001 Fitch et al.
6,321,179 B1 11/2001 Glance et al.
6,323,846 B1 11/2001 Westerman et al.
6,324,499 B1 11/2001 Lewis et al.
6,324,502 B1 11/2001 Handel et al.
6,324,512 B1 11/2001 Junqua et al.
6,324,514 B2 11/2001 Matulich et al.
6,330,538 B1 12/2001 Breen
6,331,867 B1 12/2001 Eberhard et al.
6,332,175 B1 12/2001 Birrell et al.
6,334,103 B1 12/2001 Surace et al.
6,335,722 B1 1/2002 Tani et al.
6,336,365 B1 1/2002 Blackadar et al.
6,336,727 B1 1/2002 Kim
6,340,937 B1 1/2002 Stepita-Klauco
6,341,316 B1 1/2002 Kloba et al.
6,343,267 B1 1/2002 Kuhn et al.
6,345,240 B1 2/2002 Havens
6,345,250 B1 2/2002 Martin
6,351,522 B1 2/2002 Vitikainen
6,351,762 B1 2/2002 Ludwig et al.
6,353,442 B1 3/2002 Masui
6,353,794 B1 3/2002 Davis et al.
6,356,287 B1 3/2002 Ruberry et al.
6,356,854 B1 3/2002 Schubert et al.
6,356,864 B1 3/2002 Foltz et al.
6,356,905 B1 3/2002 Gershman et al.
6,357,147 B1 3/2002 Darley et al.
6,359,572 B1 3/2002 Vale
6,359,970 B1 3/2002 Burgess
6,360,227 B1 3/2002 Aggarwal et al.
6,360,237 B1 3/2002 Schulz et al.
6,363,348 B1 3/2002 Besling et al.
6,366,883 B1 4/2002 Campbell et al.
6,366,884 B1 4/2002 Bellegarda et al.
6,374,217 B1 4/2002 Bellegarda
6,374,226 B1 4/2002 Hunt et al.
6,377,530 B1 4/2002 Burrows

(56) References Cited

U.S. PATENT DOCUMENTS 6,377,925 B1 4/2002 Greene, Jr. et al.
6,377,928 B1 4/2002 Saxena et al.
6,381,593 B1 4/2002 Yano et al.
6,385,586 B1 5/2002 Dietz
6,385,662 B1 5/2002 Moon et al.
6,389,114 B1 5/2002 Dowens et al.
6,397,183 B1 5/2002 Baba et al.
6,397,186 B1 5/2002 Bush et al.
6,400,806 B1 6/2002 Uppaluru
6,400,996 B1 6/2002 Hoffberg et al.
6,401,065 B1 6/2002 Kanevsky et al.
6,401,085 B1 6/2002 Gershman et al.
6,405,169 B1 6/2002 Kondo et al.
6,405,238 B1 6/2002 Votipka
6,408,272 B1 6/2002 White et al.
6,411,924 B1 6/2002 De Hita et al.
6,411,932 B1 6/2002 Molnar et al.
6,415,250 B1 7/2002 Van Den Akker
6,417,873 B1 7/2002 Fletcher et al.
6,421,305 B1 7/2002 Gioscia et al.
6,421,672 B1 7/2002 McAllister et al.
6,421,707 B1 7/2002 Miller et al.
6,424,944 B1 7/2002 Hikawa
6,430,531 B1 8/2002 Polish
6,430,551 B1 8/2002 Thelen et al.
6,434,522 B1 8/2002 Tsuboka
6,434,524 B1 8/2002 Weber
6,434,529 B1 8/2002 Walker et al.
6,434,604 B1 8/2002 Harada et al.
6,437,818 B1 8/2002 Ludwig et al.
6,438,523 B1 8/2002 Oberteuffer et al.
6,442,518 B1 8/2002 Van Thong et al.
6,442,523 B1 8/2002 Siegel
6,446,076 B1 9/2002 Burkey et al.
6,448,485 B1 9/2002 Barile
6,448,986 B1 9/2002 Smith
6,449,620 B1 9/2002 Draper et al.
6,453,281 B1 9/2002 Walters et al.
6,453,292 B2 9/2002 Ramaswamy et al.
6,453,312 B1 9/2002 Goiffon et al.
6,453,315 B1 9/2002 Weissman et al.
6,456,616 B1 9/2002 Rantanen
6,456,972 B1 9/2002 Gladstein et al.
6,460,015 B1 10/2002 Hetherington et al.
6,460,029 B1 10/2002 Fries et al.
6,462,778 B1 10/2002 Abram et al.
6,463,128 B1 10/2002 Elwin
6,463,413 B1 10/2002 Applebaum et al.
6,466,654 B1 10/2002 Cooper et al.
6,467,924 B2 10/2002 Shipman
6,469,712 B1 10/2002 Hilpert, Jr. et al.
6,469,722 B1 10/2002 Kinoe et al.
6,469,732 B1 10/2002 Chang et al.
6,470,347 B1 10/2002 Gillam
6,473,630 B1 10/2002 Baranowski et al.
6,473,754 B1 10/2002 Matsubayashi et al.
6,477,488 B1 11/2002 Bellegarda
6,477,494 B2 11/2002 Hyde-Thomson et al.
6,487,533 B2 11/2002 Hyde-Thomson et al.
6,487,534 B1 11/2002 Thelen et al.
6,487,663 B1 11/2002 Jaisimha et al.
6,489,951 B1 12/2002 Wong et al.
6,490,547 B1 12/2002 Atkin et al.
6,490,560 B1 12/2002 Ramaswamy et al.
6,493,006 B1 12/2002 Gourdol et al.
6,493,428 B1 12/2002 Hillier
6,493,652 B1 12/2002 Ohlenbusch et al.
6,493,667 B1 12/2002 De Souza et al.
6,499,013 B1 12/2002 Weber
6,499,014 B1 12/2002 Chihara
6,499,016 B1 12/2002 Anderson et al.
6,501,937 B1 12/2002 Ho et al.
6,502,194 B1 12/2002 Berman et al.
6,505,158 B1 1/2003 Conkie
6,505,175 B1 1/2003 Silverman et al.
6,505,183 B1 1/2003 Loofbourrow et al.
6,507,829 B1 1/2003 Richards et al.
6,510,406 B1 1/2003 Marchisio
6,510,412 B1 1/2003 Sasai et al.
6,510,417 B1 1/2003 Woods et al.
6,513,006 B2 1/2003 Howard et al.
6,513,008 B2 1/2003 Pearson et al.
6,513,063 B1 1/2003 Julia et al.
6,519,565 B1 2/2003 Clements et al.
6,519,566 B1 2/2003 Boyer et al.
6,523,026 B1 2/2003 Gillis
6,523,061 B1 2/2003 Halverson et al.
6,523,172 B1 2/2003 Martinez-Guerra et al.
6,526,351 B2 2/2003 Whitham
6,526,382 B1 2/2003 Yuschik
6,526,395 B1 2/2003 Morris
6,529,592 B1 3/2003 Khan
6,529,608 B2 3/2003 Gersabeck et al.
6,532,444 B1 3/2003 Weber
6,532,446 B1 3/2003 King
6,535,610 B1 3/2003 Stewart
6,535,852 B2 3/2003 Eide
6,535,983 B1 3/2003 McCormack et al.
6,536,139 B2 3/2003 Darley et al.
6,538,665 B2 3/2003 Crow et al.
6,542,171 B1 4/2003 Satou et al.
6,542,584 B1 4/2003 Sherwood et al.
6,542,868 B1 4/2003 Badt et al.
6,546,262 B1 4/2003 Freadman
6,546,367 B2 4/2003 Otsuka
6,546,388 B1 4/2003 Edlund et al.
6,549,497 B2 4/2003 Miyamoto et al.
6,553,343 B1 4/2003 Kagoshima et al.
6,553,344 B2 4/2003 Bellegarda et al.
6,556,971 B1 4/2003 Rigsby et al.
6,556,983 B1 4/2003 Altschuler et al.
6,560,903 B1 5/2003 Darley
6,563,769 B1 5/2003 Van Der Meulen
6,564,186 B1 5/2003 Kiraly et al.
6,567,549 B1 5/2003 Marianetti et al.
6,570,557 B1 5/2003 Westerman et al.
6,570,596 B2 5/2003 Frederiksen
6,582,342 B2 6/2003 Kaufman
6,583,806 B2 6/2003 Ludwig et al.
6,584,464 B1 6/2003 Warthen
6,587,403 B1 7/2003 Keller et al.
6,587,404 B1 7/2003 Keller et al.
6,590,303 B1 7/2003 Austin et al.
6,591,379 B1 7/2003 LeVine et al.
6,594,673 B1 7/2003 Smith et al.
6,594,688 B2 7/2003 Ludwig et al.
6,597,345 B2 7/2003 Hirshberg
6,598,021 B1 7/2003 Shambaugh et al.
6,598,022 B2 7/2003 Yuschik
6,598,039 B1 7/2003 Livowsky
6,598,054 B2 7/2003 Schuetze et al.
6,601,026 B2 7/2003 Appelt et al.
6,601,234 B1 7/2003 Bowman-Amuah
6,603,837 B1 8/2003 Kesanupalli et al.
6,604,059 B2 8/2003 Strubbe et al.
6,606,101 B1 8/2003 Malamud et al.
6,606,388 B1 8/2003 Townsend et al.
6,606,632 B1 8/2003 Saulpaugh et al.
6,611,789 B1 8/2003 Darley
6,615,172 B1 9/2003 Bennett et al.
6,615,175 B1 9/2003 Gazdzinski
6,615,176 B2 9/2003 Lewis et al.
6,615,220 B1 9/2003 Austin et al.
6,621,768 B1 9/2003 Keller et al.
6,621,892 B1 9/2003 Banister et al.
6,622,121 B1 9/2003 Crepy et al.
6,622,136 B2 9/2003 Russell
6,623,529 B1 9/2003 Lakritz
6,625,583 B1 9/2003 Silverman et al.
6,628,808 B1 9/2003 Bach et al.
6,631,186 B1 10/2003 Adams et al.
6,631,346 B1 10/2003 Karaorman et al.
6,633,741 B1 10/2003 Pose et al.
6,633,846 B1 10/2003 Bennett et al.

(56) References Cited

U.S. PATENT DOCUMENTS 6,633,932 B1 10/2003 Bork et al.
6,642,940 B1 11/2003 Dakss et al.
6,643,401 B1 11/2003 Kashioka et al.
6,643,824 B1 11/2003 Bates et al.
6,647,260 B2 11/2003 Dusse et al.
6,650,735 B2 11/2003 Burton et al.
6,651,042 B1 11/2003 Field et al.
6,651,218 B1 11/2003 Adler et al.
6,654,740 B2 11/2003 Tokuda et al.
6,658,389 B1 12/2003 Alpdemir
6,658,408 B2 12/2003 Yano et al.
6,658,577 B2 12/2003 Huppi et al.
6,661,438 B1 12/2003 Shiraishi et al.
6,662,023 B1 12/2003 Helle
6,665,639 B2 12/2003 Mozer et al.
6,665,640 B1 12/2003 Bennett et al.
6,665,641 B1 12/2003 Coorman et al.
6,671,672 B1 12/2003 Heck
6,671,683 B2 12/2003 Kanno
6,671,856 B1 12/2003 Gillam
6,675,169 B1 1/2004 Bennett et al.
6,675,233 B1 1/2004 Du et al.
6,677,932 B1 1/2004 Westerman
6,680,675 B1 1/2004 Suzuki
6,684,187 B1 1/2004 Conkie
6,684,376 B1 1/2004 Kerzman et al.
6,690,387 B2 2/2004 Zimmerman et al.
6,690,800 B2 2/2004 Resnick
6,690,828 B2 2/2004 Meyers
6,691,064 B2 2/2004 Vroman
6,691,090 B1 2/2004 Laurila et al.
6,691,111 B2 2/2004 Lazaridis et al.
6,691,151 B1 2/2004 Cheyer et al.
6,694,295 B2 2/2004 Lindholm et al.
6,694,297 B2 2/2004 Sato
6,697,777 B1 * 2/2004 Ho .......................... G10L 15/26 704/235
6,697,780 B1 2/2004 Beutnagel et al.
6,697,824 B1 2/2004 Bowman-Amuah
6,701,294 B1 3/2004 Ball et al.
6,701,305 B1 3/2004 Holt et al.
6,701,318 B2 3/2004 Fox et al.
6,704,015 B1 3/2004 Bovarnick et al.
6,704,034 B1 3/2004 Rodriguez et al.
6,704,698 B1 3/2004 Paulsen, Jr. et al.
6,704,710 B2 3/2004 Strong
6,708,153 B2 3/2004 Britten et al.
6,711,585 B1 3/2004 Copperman et al.
6,714,221 B1 3/2004 Christie et al.
6,716,139 B1 4/2004 Hosseinzadeh-Dolkhani et al.
6,718,324 B2 4/2004 Edlund et al.
6,718,331 B2 4/2004 Davis et al.
6,720,980 B1 4/2004 Lui et al.
6,721,728 B2 4/2004 McGreevy
6,721,734 B1 4/2004 Subasic et al.
6,724,370 B2 4/2004 Dutta et al.
6,725,197 B1 4/2004 Wuppermann et al.
6,728,675 B1 4/2004 Maddalozzo, Jr. et al.
6,728,681 B2 4/2004 Whitham
6,728,729 B1 4/2004 Jawa et al.
6,731,312 B2 5/2004 Robbin
6,732,142 B1 5/2004 Bates et al.
6,735,562 B1 5/2004 Zhang et al.
6,735,632 B1 5/2004 Kiraly et al.
6,738,738 B2 5/2004 Henton
6,738,742 B2 5/2004 Badt et al.
6,741,264 B1 5/2004 Lesser
6,742,021 B1 5/2004 Halverson et al.
6,751,592 B1 6/2004 Shiga
6,751,595 B2 6/2004 Busayapongchai et al.
6,751,621 B1 6/2004 Calistri-Yeh et al.
6,754,504 B1 6/2004 Reed
6,757,362 B1 6/2004 Cooper et al.
6,757,365 B1 6/2004 Bogard
6,757,646 B2 6/2004 Marchisio
6,757,653 B2 6/2004 Buth et al.
6,757,718 B1 6/2004 Halverson et al.
6,760,412 B1 7/2004 Loucks
6,760,700 B2 7/2004 Lewis et al.
6,760,754 B1 7/2004 Isaacs et al.
6,762,741 B2 7/2004 Weindorf
6,762,777 B2 7/2004 Carroll
6,763,089 B2 7/2004 Feigenbaum
6,766,294 B2 7/2004 MacGinite et al.
6,766,295 B1 7/2004 Murveit et al.
6,766,320 B1 7/2004 Wang et al.
6,766,324 B2 7/2004 Carlson et al.
6,768,979 B1 7/2004 Menendez-Pidal et al.
6,771,982 B1 8/2004 Toupin
6,772,123 B2 8/2004 Cooklev et al.
6,772,195 B1 8/2004 Hatlelid et al.
6,772,394 B1 8/2004 Kamada
6,775,358 B1 8/2004 Breitenbach et al.
6,778,951 B1 8/2004 Contractor
6,778,952 B2 8/2004 Bellegarda
6,778,962 B1 8/2004 Kasai et al.
6,778,970 B2 8/2004 Au
6,778,979 B2 8/2004 Grefenstette et al.
6,782,510 B1 8/2004 Gross et al.
6,784,901 B1 8/2004 Harvey et al.
6,789,094 B2 9/2004 Rudoff et al.
6,789,231 B1 9/2004 Reynar et al.
6,790,704 B2 9/2004 Doyle et al.
6,792,082 B1 9/2004 Levine
6,792,083 B2 9/2004 Dams et al.
6,792,086 B1 9/2004 Saylor et al.
6,792,407 B2 9/2004 Kibre et al.
6,794,566 B2 9/2004 Pachet
6,795,059 B2 9/2004 Endo
6,799,226 B1 9/2004 Robbin et al.
6,801,604 B2 10/2004 Maes et al.
6,801,964 B1 10/2004 Mahdavi
6,803,905 B1 10/2004 Capps et al.
6,804,649 B2 10/2004 Miranda
6,804,677 B2 10/2004 Shadmon et al.
6,807,536 B2 10/2004 Achlioptas et al.
6,807,574 B1 10/2004 Partovi et al.
6,809,724 B1 10/2004 Shiraishi et al.
6,810,379 B1 10/2004 Vermeulen et al.
6,813,218 B1 11/2004 Antonelli et al.
6,813,491 B1 11/2004 McKinney
6,813,607 B1 11/2004 Faruquie et al.
6,816,578 B1 11/2004 Kredo et al.
6,820,055 B2 11/2004 Saindon et al.
6,829,018 B2 12/2004 Lin et al.
6,829,603 B1 12/2004 Chai et al.
6,832,194 B1 12/2004 Mozer et al.
6,832,381 B1 12/2004 Mathur et al.
6,836,651 B2 12/2004 Segal et al.
6,836,760 B1 12/2004 Bellegarda et al.
6,839,464 B2 1/2005 Hawkins et al.
6,839,669 B1 1/2005 Gould et al.
6,839,670 B1 1/2005 Stammler et al.
6,839,742 B1 1/2005 Dyer et al.
6,842,767 B1 1/2005 Partovi et al.
6,847,966 B1 1/2005 Sommer et al.
6,847,979 B2 1/2005 Allemang et al.
6,850,775 B1 2/2005 Berg
6,850,887 B2 2/2005 Epstein et al.
6,851,115 B1 2/2005 Cheyer et al.
6,856,259 B1 2/2005 Sharp
6,857,800 B2 2/2005 Zhang et al.
6,859,931 B1 2/2005 Cheyer et al.
6,862,568 B2 3/2005 Case
6,862,710 B1 3/2005 Marchisio
6,862,713 B1 3/2005 Kraft et al.
6,865,533 B2 3/2005 Addison et al.
6,868,045 B1 3/2005 Schroder
6,868,385 B1 3/2005 Gerson
6,870,529 B1 3/2005 Davis
6,871,346 B1 3/2005 Kumbalimutt et al.
6,873,953 B1 3/2005 Lennig
6,873,986 B2 3/2005 McConnell et al.
6,876,947 B1 4/2005 Darley et al.

(56) References Cited

U.S. PATENT DOCUMENTS 6,877,003 B2 4/2005 Ho et al.
6,879,957 B1 4/2005 Pechter et al.
6,882,335 B2 4/2005 Saarinen
6,882,337 B2 4/2005 Shetter
6,882,747 B2 4/2005 Thawonmas et al.
6,882,955 B1 4/2005 Ohlenbusch et al.
6,882,971 B2 4/2005 Craner
6,885,734 B1 4/2005 Eberle et al.
6,889,361 B1 5/2005 Bates et al.
6,895,084 B1 5/2005 Saylor et al.
6,895,257 B2 5/2005 Boman et al.
6,895,380 B2 5/2005 Sepe, Jr.
6,895,558 B1 5/2005 Loveland
6,898,550 B1 5/2005 Blackadar et al.
6,901,364 B2 5/2005 Nguyen et al.
6,901,399 B1 5/2005 Corston et al.
6,904,405 B2 6/2005 Suominen
6,907,112 B1 6/2005 Guedalia et al.
6,907,140 B2 6/2005 Matsugu et al.
6,910,004 B2 6/2005 Tarbouriech et al.
6,910,007 B2 6/2005 Stylianou et al.
6,910,012 B2 6/2005 Hartley et al.
6,910,186 B2 6/2005 Kim
6,911,971 B2 6/2005 Suzuki et al.
6,912,407 B1 6/2005 Clarke et al.
6,912,498 B2 6/2005 Stevens et al.
6,912,499 B1 6/2005 Sabourin et al.
6,915,138 B2 7/2005 Kraft
6,915,246 B2 7/2005 Gusler et al.
6,915,294 B1 7/2005 Singh et al.
6,917,373 B2 7/2005 Vong et al.
6,918,677 B2 7/2005 Shipman
6,924,828 B1 8/2005 Hirsch
6,925,438 B2 8/2005 Mohamed et al.
6,928,149 B1 8/2005 Panjwani et al.
6,928,614 B1 8/2005 Everhart
6,931,255 B2 8/2005 Mekuria
6,931,384 B1 8/2005 Horvitz et al.
6,932,708 B2 8/2005 Yamashita et al.
6,933,928 B1 8/2005 Lilienthal et al.
6,934,394 B1 8/2005 Anderson
6,934,684 B2 8/2005 Alpdemir et al.
6,934,756 B2 8/2005 Maes
6,934,812 B1 8/2005 Robbin et al.
6,937,975 B1 8/2005 Elworthy
6,937,986 B2 8/2005 Denenberg et al.
6,944,593 B2 9/2005 Kuzunuki et al.
6,944,846 B2 9/2005 Ryzhov
6,948,094 B2 9/2005 Schultz et al.
6,950,087 B2 9/2005 Knox et al.
6,950,502 B1 9/2005 Jenkins
6,952,799 B2 10/2005 Edwards et al.
6,954,755 B2 10/2005 Reisman
6,954,899 B1 10/2005 Anderson
6,956,845 B2 10/2005 Baker et al.
6,957,076 B2 10/2005 Hunzinger
6,957,183 B2 10/2005 Malayath et al.
6,960,734 B1 11/2005 Park
6,961,699 B1 11/2005 Kahn et al.
6,961,912 B2 11/2005 Aoki et al.
6,963,759 B1 11/2005 Gerson
6,963,841 B2 11/2005 Handal et al.
6,964,023 B2 11/2005 Maes et al.
6,965,376 B2 11/2005 Tani et al.
6,965,863 B1 11/2005 Zuberec et al.
6,968,311 B2 11/2005 Knockeart et al.
6,970,820 B2 11/2005 Junqua et al.
6,970,881 B1 11/2005 Mohan et al.
6,970,915 B1 11/2005 Partovi et al.
6,970,935 B1 11/2005 Maes
6,976,090 B2 12/2005 Ben-Shaul et al.
6,978,127 B1 12/2005 Bulthuis et al.
6,978,239 B2 12/2005 Chu et al.
6,980,949 B2 12/2005 Ford
6,980,953 B1 12/2005 Kanevsky et al.
6,980,955 B2 12/2005 Okutani et al.
6,983,251 B1 1/2006 Umemoto et al.
6,985,858 B2 1/2006 Frey et al.
6,985,865 B1 1/2006 Packingham et al.
6,985,958 B2 1/2006 Zwiegincew et al.
6,988,063 B2 1/2006 Tokuda et al.
6,988,071 B1 1/2006 Gazdzinski
6,990,450 B2 1/2006 Case et al.
6,996,520 B2 2/2006 Levin
6,996,531 B2 2/2006 Korall et al.
6,996,575 B2 2/2006 Cox et al.
6,999,066 B2 2/2006 Litwiller
6,999,914 B1 2/2006 Boerner et al.
6,999,925 B2 2/2006 Fischer et al.
6,999,927 B2 2/2006 Mozer et al.
7,000,189 B2 2/2006 Dutta et al.
7,002,556 B2 2/2006 Tsukada et al.
7,003,099 B1 2/2006 Zhang et al.
7,003,463 B1 2/2006 Maes et al.
7,003,522 B1 2/2006 Reynar et al.
7,006,969 B2 2/2006 Atal
7,006,973 B1 2/2006 Genly et al.
7,007,026 B2 2/2006 Wilkinson et al.
7,007,239 B1 2/2006 Hawkins et al.
7,010,581 B2 3/2006 Brown et al.
7,013,289 B2 3/2006 Horn et al.
7,013,308 B1 3/2006 Tunstall-Pedoe
7,013,429 B2 3/2006 Fujimoto et al.
7,015,894 B2 3/2006 Morohoshi
7,020,685 B1 3/2006 Chen et al.
7,024,363 B1 4/2006 Comerford et al.
7,024,364 B2 4/2006 Guerra et al.
7,024,366 B1 4/2006 Deyoe et al.
7,024,460 B2 4/2006 Koopmas et al.
7,027,568 B1 4/2006 Simpson et al.
7,027,974 B1 4/2006 Busch et al.
7,027,990 B2 4/2006 Sussman
7,028,252 B1 4/2006 Baru et al.
7,030,861 B1 4/2006 Westerman et al.
7,031,530 B2 4/2006 Driggs et al.
7,031,909 B2 4/2006 Mao et al.
7,035,794 B2 4/2006 Sirivara
7,035,801 B2 4/2006 Jimenez-Feltstrom
7,035,807 B1 4/2006 Brittain et al.
7,036,128 B1 4/2006 Julia et al.
7,036,681 B2 5/2006 Suda et al.
7,038,659 B2 5/2006 Rajkowski
7,039,588 B2 5/2006 Okutani et al.
7,043,420 B2 5/2006 Ratnaparkhi
7,043,422 B2 5/2006 Gao et al.
7,046,230 B2 5/2006 Zadesky et al.
7,046,850 B2 5/2006 Braspenning et al.
7,047,193 B1 5/2006 Bellegarda
7,050,550 B2 5/2006 Steinbiss et al.
7,050,976 B1 5/2006 Packingham
7,050,977 B1 5/2006 Bennett
7,051,096 B1 5/2006 Krawiec et al.
7,054,419 B2 5/2006 Culliss
7,054,888 B2 5/2006 LaChapelle et al.
7,057,607 B2 6/2006 Mayoraz et al.
7,058,569 B2 6/2006 Coorman et al.
7,058,888 B1 6/2006 Gjerstad et al.
7,058,889 B2 6/2006 Trovato et al.
7,062,223 B2 6/2006 Gerber et al.
7,062,225 B2 6/2006 White
7,062,428 B2 6/2006 Hogenhout et al.
7,062,438 B2 6/2006 Kobayashi et al.
7,065,185 B1 6/2006 Koch
7,065,485 B1 6/2006 Chong-White et al.
7,069,213 B2 6/2006 Thompson
7,069,220 B2 6/2006 Coffman et al.
7,069,560 B1 6/2006 Cheyer et al.
7,072,686 B1 7/2006 Schrager
7,072,941 B2 7/2006 Griffin et al.
7,076,527 B2 7/2006 Bellegarda et al.
7,079,713 B2 7/2006 Simmons
7,082,322 B2 7/2006 Harano
7,084,758 B1 8/2006 Cole
7,084,856 B2 8/2006 Huppi

(56) References Cited

U.S. PATENT DOCUMENTS

| | | | |
|---|---|---|---|
| 7,085,723 | B2 | 8/2006 | Ross et al. |
| 7,085,960 | B2 | 8/2006 | Bouat et al. |
| 7,088,345 | B2 | 8/2006 | Robinson et al. |
| 7,089,292 | B1 | 8/2006 | Roderick et al. |
| 7,092,370 | B2 | 8/2006 | Jiang et al. |
| 7,092,887 | B2 | 8/2006 | Mozer et al. |
| 7,092,928 | B1 | 8/2006 | Elad et al. |
| 7,092,950 | B2 | 8/2006 | Wong et al. |
| 7,093,693 | B1 | 8/2006 | Gazdzinski |
| 7,095,733 | B1 | 8/2006 | Yarlagadda et al. |
| 7,096,183 | B2 | 8/2006 | Junqua |
| 7,100,117 | B1 | 8/2006 | Chwa et al. |
| 7,103,548 | B2 | 9/2006 | Squibbs et al. |
| 7,107,204 | B1 | 9/2006 | Liu et al. |
| 7,111,248 | B2 | 9/2006 | Mulvey et al. |
| 7,111,774 | B2 | 9/2006 | Song |
| 7,113,803 | B2 | 9/2006 | Dehlin |
| 7,113,943 | B2 | 9/2006 | Bradford et al. |
| 7,115,035 | B2 | 10/2006 | Tanaka |
| 7,117,231 | B2 | 10/2006 | Fischer et al. |
| 7,120,865 | B1 | 10/2006 | Horvitz et al. |
| 7,123,696 | B2 | 10/2006 | Lowe |
| 7,124,081 | B1 | 10/2006 | Bellegarda |
| 7,124,082 | B2 | 10/2006 | Freedman |
| 7,124,164 | B1 | 10/2006 | Chemtob |
| 7,127,046 | B1 | 10/2006 | Smith et al. |
| 7,127,394 | B2 | 10/2006 | Strong et al. |
| 7,127,396 | B2 | 10/2006 | Chu et al. |
| 7,127,403 | B1 | 10/2006 | Saylor et al. |
| 7,129,932 | B1 | 10/2006 | Klarlund et al. |
| 7,133,900 | B1 | 11/2006 | Szeto |
| 7,136,710 | B1 | 11/2006 | Hoffberg et al. |
| 7,136,818 | B1 | 11/2006 | Cosatto et al. |
| 7,137,126 | B1 | 11/2006 | Coffman et al. |
| 7,139,697 | B2 | 11/2006 | Häkkinen et al. |
| 7,139,714 | B2 | 11/2006 | Bennett et al. |
| 7,139,722 | B2 | 11/2006 | Perrella et al. |
| 7,143,028 | B2 | 11/2006 | Hillis et al. |
| 7,143,038 | B2 | 11/2006 | Katae |
| 7,143,040 | B2 | 11/2006 | Durston et al. |
| 7,146,319 | B2 | 12/2006 | Hunt |
| 7,146,437 | B2 | 12/2006 | Robbin et al. |
| 7,149,319 | B2 | 12/2006 | Roeck |
| 7,149,695 | B1 | 12/2006 | Bellegarda |
| 7,149,964 | B1 | 12/2006 | Cottrille et al. |
| 7,152,070 | B1 | 12/2006 | Musick et al. |
| 7,152,093 | B2 | 12/2006 | Ludwig et al. |
| 7,154,526 | B2 | 12/2006 | Foote et al. |
| 7,155,668 | B2 | 12/2006 | Holland et al. |
| 7,158,647 | B2 | 1/2007 | Azima et al. |
| 7,159,174 | B2 | 1/2007 | Johnson et al. |
| 7,162,412 | B2 | 1/2007 | Yamada et al. |
| 7,162,482 | B1 | 1/2007 | Dunning |
| 7,165,073 | B2 | 1/2007 | Vandersluis |
| 7,166,791 | B2 | 1/2007 | Robbin et al. |
| 7,171,350 | B2 | 1/2007 | Lin et al. |
| 7,171,360 | B2 | 1/2007 | Huang et al. |
| 7,174,042 | B1 | 2/2007 | Simmons et al. |
| 7,174,295 | B1 | 2/2007 | Kivimaki |
| 7,174,297 | B2 | 2/2007 | Guerra et al. |
| 7,174,298 | B2 | 2/2007 | Sharma |
| 7,177,794 | B2 | 2/2007 | Mani et al. |
| 7,177,798 | B2 | 2/2007 | Hsu et al. |
| 7,177,817 | B1 | 2/2007 | Khosla et al. |
| 7,181,386 | B2 | 2/2007 | Mohri et al. |
| 7,181,388 | B2 | 2/2007 | Tian |
| 7,184,064 | B2 | 2/2007 | Zimmerman et al. |
| 7,185,276 | B2 | 2/2007 | Keswa |
| 7,188,085 | B2 | 3/2007 | Pelletier |
| 7,190,351 | B1 | 3/2007 | Goren |
| 7,190,794 | B2 | 3/2007 | Hinde |
| 7,191,118 | B2 | 3/2007 | Bellegarda |
| 7,191,131 | B1 | 3/2007 | Nagao |
| 7,193,615 | B2 | 3/2007 | Kim et al. |
| 7,194,186 | B1 | 3/2007 | Strub et al. |
| 7,194,413 | B2 | 3/2007 | Mahoney et al. |
| 7,194,471 | B1 | 3/2007 | Nagatsuka et al. |
| 7,194,611 | B2 | 3/2007 | Bear et al. |
| 7,194,699 | B2 | 3/2007 | Thomson et al. |
| 7,197,120 | B2 | 3/2007 | Luehrig et al. |
| 7,197,460 | B1 | 3/2007 | Gupta et al. |
| 7,200,550 | B2 | 4/2007 | Menezes et al. |
| 7,200,558 | B2 | 4/2007 | Kato et al. |
| 7,200,559 | B2 | 4/2007 | Wang |
| 7,203,297 | B2 | 4/2007 | Vitikainen et al. |
| 7,203,646 | B2 | 4/2007 | Bennett |
| 7,206,809 | B2 | 4/2007 | Ludwig et al. |
| 7,212,827 | B1 | 5/2007 | Veschi |
| 7,216,008 | B2 | 5/2007 | Sakata |
| 7,216,073 | B2 | 5/2007 | Lavi et al. |
| 7,216,080 | B2 | 5/2007 | Tsiao et al. |
| 7,218,920 | B2 | 5/2007 | Hyon |
| 7,218,943 | B2 | 5/2007 | Klassen et al. |
| 7,219,063 | B2 | 5/2007 | Schalk et al. |
| 7,219,123 | B1 | 5/2007 | Fiechter et al. |
| 7,225,125 | B2 | 5/2007 | Bennett et al. |
| 7,228,278 | B2 | 6/2007 | Nguyen et al. |
| 7,231,343 | B1 | 6/2007 | Treadgold et al. |
| 7,231,597 | B1 | 6/2007 | Braun et al. |
| 7,233,790 | B2 | 6/2007 | Kjellberg et al. |
| 7,233,904 | B2 | 6/2007 | Luisi |
| 7,234,026 | B2 | 6/2007 | Robbin et al. |
| 7,236,932 | B1 | 6/2007 | Grajski |
| 7,240,002 | B2 | 7/2007 | Minamino et al. |
| 7,243,130 | B2 | 7/2007 | Horvitz et al. |
| 7,243,305 | B2 | 7/2007 | Schabes et al. |
| 7,246,118 | B2 | 7/2007 | Chastain et al. |
| 7,246,151 | B2 | 7/2007 | Isaacs et al. |
| 7,248,900 | B2 | 7/2007 | Deeds et al. |
| 7,251,313 | B1 | 7/2007 | Miller et al. |
| 7,251,454 | B2 | 7/2007 | White |
| 7,254,773 | B2 | 8/2007 | Bates et al. |
| 7,257,537 | B2 | 8/2007 | Ross et al. |
| 7,259,752 | B1 | 8/2007 | Simmons |
| 7,260,529 | B1 | 8/2007 | Lengen |
| 7,260,567 | B2 | 8/2007 | Parikh et al. |
| 7,263,373 | B2 | 8/2007 | Mattisson |
| 7,266,189 | B1 | 9/2007 | Day |
| 7,266,495 | B1 | 9/2007 | Beaufays et al. |
| 7,266,496 | B2 | 9/2007 | Wang et al. |
| 7,266,499 | B2 | 9/2007 | Surace et al. |
| 7,269,544 | B2 | 9/2007 | Simske |
| 7,269,556 | B2 | 9/2007 | Kiss et al. |
| 7,272,224 | B1 | 9/2007 | Normile et al. |
| 7,275,063 | B2 | 9/2007 | Horn |
| 7,277,088 | B2 | 10/2007 | Robinson et al. |
| 7,277,854 | B2 | 10/2007 | Bennett et al. |
| 7,277,855 | B1 | 10/2007 | Acker et al. |
| 7,280,958 | B2 | 10/2007 | Pavlov et al. |
| 7,283,072 | B1 | 10/2007 | Plachta et al. |
| 7,289,102 | B2 | 10/2007 | Hinckley et al. |
| 7,290,039 | B1 | 10/2007 | Lisitsa et al. |
| 7,292,579 | B2 | 11/2007 | Morris |
| 7,292,979 | B2 | 11/2007 | Karas et al. |
| 7,292,980 | B1 | 11/2007 | August et al. |
| 7,296,019 | B1 | 11/2007 | Chandrasekar et al. |
| 7,296,230 | B2 | 11/2007 | Fukatsu et al. |
| 7,299,033 | B2 | 11/2007 | Kjellberg et al. |
| 7,302,392 | B1 | 11/2007 | Thenthiruperai et al. |
| 7,302,394 | B1 | 11/2007 | Baray et al. |
| 7,302,686 | B2 | 11/2007 | Togawa |
| 7,308,404 | B2 | 12/2007 | Venkataraman et al. |
| 7,308,408 | B1 | 12/2007 | Stifelman et al. |
| 7,310,329 | B2 | 12/2007 | Vieri et al. |
| 7,310,600 | B1 | 12/2007 | Garner et al. |
| 7,310,605 | B2 | 12/2007 | Janakiraman et al. |
| 7,313,523 | B1 | 12/2007 | Bellegarda et al. |
| 7,315,809 | B2 | 1/2008 | Xun |
| 7,315,818 | B2 | 1/2008 | Stevens et al. |
| 7,318,020 | B1 | 1/2008 | Kim |
| 7,319,957 | B2 | 1/2008 | Robinson et al. |
| 7,321,783 | B2 | 1/2008 | Kim |
| 7,322,023 | B2 | 1/2008 | Shulman et al. |
| 7,324,833 | B2 | 1/2008 | White et al. |

(56) References Cited

U.S. PATENT DOCUMENTS

| | | | |
|---|---|---|---|
| 7,324,947 | B2 | 1/2008 | Jordan et al. |
| 7,328,155 | B2 | 2/2008 | Endo et al. |
| 7,328,250 | B2 | 2/2008 | Wang et al. |
| 7,333,998 | B2 | 2/2008 | Heckerman et al. |
| 7,337,108 | B2 | 2/2008 | Florencio et al. |
| 7,345,670 | B2 | 3/2008 | Armstrong |
| 7,345,671 | B2 | 3/2008 | Robbin et al. |
| 7,349,953 | B2 | 3/2008 | Lisitsa et al. |
| 7,353,139 | B1 | 4/2008 | Burrell et al. |
| 7,356,748 | B2 | 4/2008 | Taleb |
| 7,359,493 | B1 | 4/2008 | Wang et al. |
| 7,359,671 | B2 | 4/2008 | Richenstein et al. |
| 7,359,851 | B2 | 4/2008 | Tong et al. |
| 7,360,158 | B1 | 4/2008 | Beeman |
| 7,362,738 | B2 | 4/2008 | Taube et al. |
| 7,363,227 | B2 | 4/2008 | Mapes-Riordan et al. |
| 7,363,586 | B1 | 4/2008 | Briggs et al. |
| 7,365,260 | B2 | 4/2008 | Kawashima |
| 7,366,461 | B1 | 4/2008 | Brown |
| 7,369,984 | B2 | 5/2008 | Fairweather |
| 7,369,993 | B1 | 5/2008 | Atal |
| 7,373,291 | B2 | 5/2008 | Garst |
| 7,373,612 | B2 | 5/2008 | Risch et al. |
| 7,376,556 | B2 | 5/2008 | Bennett |
| 7,376,632 | B1 | 5/2008 | Sadek et al. |
| 7,376,645 | B2 | 5/2008 | Bernard |
| 7,378,963 | B1 | 5/2008 | Begault et al. |
| 7,379,874 | B2 | 5/2008 | Schmid et al. |
| 7,380,203 | B2 | 5/2008 | Keely et al. |
| 7,383,170 | B2 | 6/2008 | Mills et al. |
| 7,386,110 | B2 | 6/2008 | Petrunka et al. |
| 7,386,438 | B1 | 6/2008 | Franz et al. |
| 7,386,449 | B2 | 6/2008 | Sun et al. |
| 7,386,799 | B1 | 6/2008 | Clanton et al. |
| 7,389,224 | B1 | 6/2008 | Elworthy |
| 7,389,225 | B1 | 6/2008 | Jensen et al. |
| 7,392,185 | B2 | 6/2008 | Bennett |
| 7,394,947 | B2 | 7/2008 | Li et al. |
| 7,398,209 | B2 | 7/2008 | Kennewick et al. |
| 7,401,300 | B2 | 7/2008 | Nurmi |
| 7,403,938 | B2 | 7/2008 | Harrison et al. |
| 7,403,941 | B2 | 7/2008 | Bedworth et al. |
| 7,404,143 | B2 | 7/2008 | Freelander et al. |
| 7,409,337 | B1 | 8/2008 | Potter et al. |
| 7,409,347 | B1 | 8/2008 | Bellegarda |
| 7,412,389 | B2 | 8/2008 | Yang |
| 7,412,470 | B2 | 8/2008 | Masuno et al. |
| 7,415,100 | B2 | 8/2008 | Cooper et al. |
| 7,415,469 | B2 | 8/2008 | Singh et al. |
| 7,418,382 | B1 | 8/2008 | Maes |
| 7,418,389 | B2 | 8/2008 | Chu et al. |
| 7,418,392 | B1 | 8/2008 | Mozer et al. |
| 7,426,467 | B2 | 9/2008 | Nashida et al. |
| 7,426,468 | B2 | 9/2008 | Coifman et al. |
| 7,427,024 | B1 | 9/2008 | Gazdzinski et al. |
| 7,428,541 | B2 | 9/2008 | Houle |
| 7,430,508 | B2 | 9/2008 | Williamson et al. |
| 7,433,869 | B2 | 10/2008 | Gollapudi |
| 7,433,921 | B2 | 10/2008 | Ludwig et al. |
| 7,436,947 | B2 | 10/2008 | Wadler et al. |
| 7,441,184 | B2 | 10/2008 | Frerebeau et al. |
| 7,443,316 | B2 | 10/2008 | Lim |
| 7,444,589 | B2 | 10/2008 | Zellner |
| 7,447,360 | B2 | 11/2008 | Li et al. |
| 7,447,624 | B2 | 11/2008 | Fuhrmann et al. |
| 7,447,635 | B1 | 11/2008 | Konopka et al. |
| 7,447,637 | B1 | 11/2008 | Grant et al. |
| 7,451,081 | B1 | 11/2008 | Gajic et al. |
| 7,454,351 | B2 | 11/2008 | Jeschke et al. |
| 7,460,652 | B2 | 12/2008 | Chang |
| 7,461,043 | B2 | 12/2008 | Hess |
| 7,467,087 | B1 | 12/2008 | Gillick et al. |
| 7,467,164 | B2 | 12/2008 | Marsh |
| 7,472,061 | B1 | 12/2008 | Alewine et al. |
| 7,472,065 | B2 | 12/2008 | Aaron et al. |
| 7,475,010 | B2 | 1/2009 | Chao |
| 7,475,015 | B2 | 1/2009 | Epstein et al. |
| 7,475,063 | B2 | 1/2009 | Datta et al. |
| 7,477,238 | B2 | 1/2009 | Fux et al. |
| 7,477,240 | B2 | 1/2009 | Yanagisawa |
| 7,478,037 | B2 | 1/2009 | Strong |
| 7,478,091 | B2 | 1/2009 | Mojsilovic et al. |
| 7,478,129 | B1 | 1/2009 | Chemtob |
| 7,479,948 | B2 | 1/2009 | Kim et al. |
| 7,479,949 | B2 | 1/2009 | Jobs et al. |
| 7,483,832 | B2 | 1/2009 | Tischer |
| 7,483,894 | B2 | 1/2009 | Cao |
| 7,487,089 | B2 | 2/2009 | Mozer |
| 7,487,093 | B2 | 2/2009 | Mutsuno et al. |
| 7,490,034 | B2 | 2/2009 | Finnigan et al. |
| 7,490,039 | B1 | 2/2009 | Shaffer et al. |
| 7,493,251 | B2 | 2/2009 | Gao et al. |
| 7,493,560 | B1 | 2/2009 | Kipnes et al. |
| 7,496,498 | B2 | 2/2009 | Chu et al. |
| 7,496,512 | B2 | 2/2009 | Zhao et al. |
| 7,499,923 | B2 | 3/2009 | Kawatani |
| 7,502,738 | B2 | 3/2009 | Kennewick et al. |
| 7,505,795 | B1 | 3/2009 | Lim et al. |
| 7,508,324 | B2 | 3/2009 | Suraqui |
| 7,508,373 | B2 | 3/2009 | Lin et al. |
| 7,516,123 | B2 | 4/2009 | Betz et al. |
| 7,519,327 | B2 | 4/2009 | White |
| 7,519,398 | B2 | 4/2009 | Hirose |
| 7,522,927 | B2 | 4/2009 | Fitch et al. |
| 7,523,036 | B2 | 4/2009 | Akabane et al. |
| 7,523,108 | B2 | 4/2009 | Cao |
| 7,526,466 | B2 | 4/2009 | Au |
| 7,526,738 | B2 | 4/2009 | Ording et al. |
| 7,528,713 | B2 | 5/2009 | Singh et al. |
| 7,529,671 | B2 | 5/2009 | Rockenbeck et al. |
| 7,529,676 | B2 | 5/2009 | Koyama |
| 7,535,997 | B1 | 5/2009 | McQuaide, Jr. et al. |
| 7,536,029 | B2 | 5/2009 | Choi et al. |
| 7,536,565 | B2 | 5/2009 | Girish et al. |
| 7,538,685 | B1 | 5/2009 | Cooper et al. |
| 7,539,619 | B1 | 5/2009 | Seligman et al. |
| 7,539,656 | B2 | 5/2009 | Fratkina et al. |
| 7,541,940 | B2 | 6/2009 | Upton |
| 7,542,967 | B2 | 6/2009 | Hurst-Hiller et al. |
| 7,542,971 | B2 | 6/2009 | Thione et al. |
| 7,543,232 | B2 | 6/2009 | Easton, Jr. et al. |
| 7,546,382 | B2 | 6/2009 | Healey et al. |
| 7,546,529 | B2 | 6/2009 | Reynar et al. |
| 7,548,895 | B2 | 6/2009 | Pulsipher |
| 7,552,045 | B2 | 6/2009 | Barliga et al. |
| 7,552,055 | B2 | 6/2009 | Lecoeuche |
| 7,555,431 | B2 | 6/2009 | Bennett |
| 7,555,496 | B1 | 6/2009 | Lantrip et al. |
| 7,558,381 | B1 | 7/2009 | Ali et al. |
| 7,558,730 | B2 | 7/2009 | Davis et al. |
| 7,559,026 | B2 | 7/2009 | Girish et al. |
| 7,561,069 | B2 | 7/2009 | Horstemeyer |
| 7,562,007 | B2 | 7/2009 | Hwang |
| 7,562,032 | B2 | 7/2009 | Abbosh et al. |
| 7,565,104 | B1 | 7/2009 | Brown et al. |
| 7,565,380 | B1 | 7/2009 | Venkatachary |
| 7,568,151 | B2 | 7/2009 | Bargeron et al. |
| 7,571,092 | B1 | 8/2009 | Nieh |
| 7,571,106 | B2 | 8/2009 | Cao et al. |
| 7,577,522 | B2 | 8/2009 | Rosenberg |
| 7,580,551 | B1 | 8/2009 | Srihari et al. |
| 7,580,576 | B2 | 8/2009 | Wang et al. |
| 7,580,839 | B2 | 8/2009 | Tamura et al. |
| 7,584,092 | B2 | 9/2009 | Brockett et al. |
| 7,584,093 | B2 | 9/2009 | Potter et al. |
| 7,584,278 | B2 | 9/2009 | Rajarajan et al. |
| 7,584,429 | B2 | 9/2009 | Fabritius |
| 7,593,868 | B2 | 9/2009 | Margiloff et al. |
| 7,596,269 | B2 | 9/2009 | King et al. |
| 7,596,499 | B2 | 9/2009 | Anguera et al. |
| 7,596,606 | B2 | 9/2009 | Codignotto |
| 7,596,765 | B2 | 9/2009 | Almas |
| 7,599,918 | B2 | 10/2009 | Shen et al. |
| 7,603,349 | B1 | 10/2009 | Kraft et al. |

(56) References Cited

U.S. PATENT DOCUMENTS 7,603,381 B2 10/2009 Burke et al.
7,606,444 B1 10/2009 Erol et al.
7,609,179 B2 10/2009 Diaz-Gutierrez et al.
7,610,258 B2 10/2009 Yuknewicz et al.
7,613,264 B2 11/2009 Wells et al.
7,614,008 B2 11/2009 Ording
7,617,094 B2 11/2009 Aoki et al.
7,620,407 B1 11/2009 Donald et al.
7,620,549 B2 11/2009 Di Cristo et al.
7,620,894 B1 11/2009 Kahn
7,623,119 B2 11/2009 Autio et al.
7,624,007 B2 11/2009 Bennett
7,627,481 B1 12/2009 Kuo et al.
7,630,900 B1 12/2009 Strom
7,630,901 B2 12/2009 Omi
7,633,076 B2 12/2009 Huppi et al.
7,634,409 B2 12/2009 Kennewick et al.
7,634,413 B1 12/2009 Kuo et al.
7,634,718 B2 12/2009 Nakajima
7,634,732 B1 12/2009 Blagsvedt et al.
7,636,657 B2 12/2009 Ju et al.
7,640,158 B2 12/2009 Detlef et al.
7,640,160 B2 12/2009 Di Cristo et al.
7,643,990 B1 1/2010 Bellegarda
7,647,225 B2 1/2010 Bennett et al.
7,649,454 B2 1/2010 Singh et al.
7,649,877 B2 1/2010 Vieri et al.
7,653,883 B2 1/2010 Hotelling et al.
7,656,393 B2 2/2010 King et al.
7,657,424 B2 2/2010 Bennett
7,657,828 B2 2/2010 Lucas et al.
7,657,844 B2 2/2010 Gibson et al.
7,657,849 B2 2/2010 Chaudhri et al.
7,660,715 B1 2/2010 Thambiratnam
7,663,607 B2 2/2010 Hotelling et al.
7,664,558 B2 2/2010 Lindahl et al.
7,664,638 B2 2/2010 Cooper et al.
7,668,710 B2 2/2010 Doyle
7,669,134 B1 2/2010 Christie et al.
7,672,841 B2 3/2010 Bennett
7,672,952 B2 3/2010 Isaacson et al.
7,673,238 B2 3/2010 Girish et al.
7,673,251 B1 3/2010 Wibisono
7,673,340 B1 3/2010 Cohen et al.
7,676,026 B1 3/2010 Baxter, Jr.
7,676,365 B2 3/2010 Hwang et al.
7,676,463 B2 3/2010 Thompson et al.
7,679,534 B2 3/2010 Kay et al.
7,680,649 B2 3/2010 Park
7,681,126 B2 3/2010 Roose
7,683,886 B2 3/2010 Willey
7,683,893 B2 3/2010 Kim
7,684,985 B2 3/2010 Dominach et al.
7,684,990 B2 3/2010 Caskey et al.
7,684,991 B2 3/2010 Stohr et al.
7,689,245 B2 3/2010 Cox et al.
7,689,408 B2 3/2010 Chen et al.
7,689,409 B2 3/2010 Heinecke
7,689,412 B2 3/2010 Wu et al.
7,689,421 B2 3/2010 Li et al.
7,693,715 B2 4/2010 Hwang et al.
7,693,717 B2 4/2010 Kahn et al.
7,693,719 B2 4/2010 Chu et al.
7,693,720 B2 4/2010 Kennewick et al.
7,698,131 B2 4/2010 Bennett
7,702,500 B2 4/2010 Blaedow
7,702,508 B2 4/2010 Bennett
7,703,091 B1 4/2010 Martin et al.
7,706,510 B2 4/2010 Ng
7,707,026 B2 4/2010 Liu
7,707,027 B2 4/2010 Balchandran et al.
7,707,032 B2 4/2010 Wang et al.
7,707,221 B1 4/2010 Dunning et al.
7,707,226 B1 4/2010 Tonse
7,707,267 B2 4/2010 Lisitsa et al.
7,710,262 B2 5/2010 Ruha
7,711,129 B2 5/2010 Lindahl et al.
7,711,550 B1 5/2010 Feinberg et al.
7,711,565 B1 5/2010 Gazdzinski
7,711,672 B2 5/2010 Au
7,712,053 B2 5/2010 Bradford et al.
7,716,056 B2 5/2010 Weng et al.
7,716,216 B1 5/2010 Harik et al.
7,720,674 B2 5/2010 Kaiser et al.
7,720,683 B1 5/2010 Vermeulen et al.
7,721,226 B2 5/2010 Barabe et al.
7,721,301 B2 5/2010 Wong et al.
7,724,242 B2 5/2010 Hillis et al.
7,724,696 B1 5/2010 Parekh
7,725,307 B2 5/2010 Bennett
7,725,318 B2 5/2010 Gavalda et al.
7,725,320 B2 5/2010 Bennett
7,725,321 B2 5/2010 Bennett
7,725,838 B2 5/2010 Williams
7,729,904 B2 6/2010 Bennett
7,729,916 B2 6/2010 Coffman et al.
7,734,461 B2 6/2010 Kwak et al.
7,735,012 B2 6/2010 Naik
7,739,588 B2 6/2010 Reynar et al.
7,742,953 B2 6/2010 King et al.
7,743,188 B2 6/2010 Haitani et al.
7,747,616 B2 6/2010 Yamada et al.
7,752,152 B2 7/2010 Paek et al.
7,756,708 B2 7/2010 Cohen et al.
7,756,868 B2 7/2010 Lee
7,756,871 B2 7/2010 Yacoub et al.
7,757,173 B2 7/2010 Beaman
7,757,182 B2 7/2010 Elliott et al.
7,761,296 B1 7/2010 Bakis et al.
7,763,842 B2 7/2010 Hsu et al.
7,774,202 B2 8/2010 Spengler et al.
7,774,204 B2 8/2010 Mozer et al.
7,774,388 B1 8/2010 Runchey
7,777,717 B2 8/2010 Fux et al.
7,778,432 B2 8/2010 Larsen
7,778,595 B2 8/2010 White et al.
7,778,632 B2 8/2010 Kurlander et al.
7,778,830 B2 8/2010 Davis et al.
7,779,353 B2 8/2010 Grigoriu et al.
7,779,356 B2 8/2010 Griesmer
7,779,357 B2 8/2010 Naik
7,783,283 B2 8/2010 Kuusinen et al.
7,783,486 B2 8/2010 Rosser et al.
7,788,590 B2 8/2010 Taboada et al.
7,788,663 B2 8/2010 Illowsky et al.
7,796,980 B1 9/2010 McKinney et al.
7,797,265 B2 9/2010 Brinker et al.
7,797,269 B2 9/2010 Rieman et al.
7,797,331 B2 9/2010 Theimer et al.
7,797,629 B2 9/2010 Fux et al.
7,801,721 B2 9/2010 Rosart et al.
7,801,728 B2 9/2010 Ben-David et al.
7,801,729 B2 9/2010 Mozer
7,805,299 B2 9/2010 Coifman
7,809,550 B1 10/2010 Barrows
7,809,565 B2 10/2010 Coifman
7,809,569 B2 10/2010 Attwater et al.
7,809,570 B2 10/2010 Kennewick et al.
7,809,610 B2 10/2010 Cao
7,809,744 B2 10/2010 Nevidomski et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,246 B1 11/2010 Smith et al.
7,831,423 B2 11/2010 Schubert
7,831,426 B2 11/2010 Bennett
7,831,432 B2 11/2010 Bodin et al.
7,835,504 B1 11/2010 Donald et al.

(56) References Cited

U.S. PATENT DOCUMENTS

| | | | |
|---|---|---|---|
| 7,836,437 | B2 | 11/2010 | Kacmarcik et al. |
| 7,840,348 | B2 | 11/2010 | Kim et al. |
| 7,840,400 | B2 | 11/2010 | Lavi et al. |
| 7,840,447 | B2 | 11/2010 | Kleinrock et al. |
| 7,840,581 | B2 | 11/2010 | Ross et al. |
| 7,840,912 | B2 | 11/2010 | Elias et al. |
| 7,844,394 | B2 | 11/2010 | Kim |
| 7,848,924 | B2 | 12/2010 | Nurminen et al. |
| 7,848,926 | B2 | 12/2010 | Goto et al. |
| 7,853,444 | B2 | 12/2010 | Wang et al. |
| 7,853,445 | B2 | 12/2010 | Bachenko et al. |
| 7,853,574 | B2 | 12/2010 | Kraenzel et al. |
| 7,853,577 | B2 | 12/2010 | Sundaresan et al. |
| 7,853,664 | B1 | 12/2010 | Wang et al. |
| 7,853,900 | B2 | 12/2010 | Nguyen et al. |
| 7,865,817 | B2 | 1/2011 | Ryan et al. |
| 7,869,998 | B1 | 1/2011 | Di Fabbrizio et al. |
| 7,869,999 | B2 | 1/2011 | Amato et al. |
| 7,870,118 | B2 | 1/2011 | Jiang et al. |
| 7,870,133 | B2 | 1/2011 | Krishnamoorthy et al. |
| 7,873,149 | B2 | 1/2011 | Schultz et al. |
| 7,873,519 | B2 | 1/2011 | Bennett |
| 7,873,654 | B2 | 1/2011 | Bernard |
| 7,877,705 | B2 | 1/2011 | Chambers et al. |
| 7,880,730 | B2 | 2/2011 | Robinson et al. |
| 7,881,283 | B2 | 2/2011 | Cormier et al. |
| 7,881,936 | B2 | 2/2011 | Longe et al. |
| 7,885,390 | B2 | 2/2011 | Chaudhuri et al. |
| 7,885,844 | B1 | 2/2011 | Cohen et al. |
| 7,886,233 | B2 | 2/2011 | Rainisto et al. |
| 7,889,101 | B2 | 2/2011 | Yokota |
| 7,889,184 | B2 | 2/2011 | Blumenberg et al. |
| 7,889,185 | B2 | 2/2011 | Blumenberg et al. |
| 7,890,330 | B2 | 2/2011 | Ozkaragoz et al. |
| 7,890,652 | B2 | 2/2011 | Bull et al. |
| 7,895,039 | B2 | 2/2011 | Braho et al. |
| 7,895,531 | B2 | 2/2011 | Radtke et al. |
| 7,899,666 | B2 | 3/2011 | Varone |
| 7,904,297 | B2 | 3/2011 | Mirkovic et al. |
| 7,908,287 | B1 | 3/2011 | Katragadda |
| 7,912,289 | B2 | 3/2011 | Kansal et al. |
| 7,912,699 | B1 | 3/2011 | Saraclar et al. |
| 7,912,702 | B2 | 3/2011 | Bennett |
| 7,912,720 | B1 | 3/2011 | Hakkani-Tur et al. |
| 7,912,828 | B2 | 3/2011 | Bonnet et al. |
| 7,913,185 | B1 | 3/2011 | Benson et al. |
| 7,916,979 | B2 | 3/2011 | Simmons |
| 7,917,367 | B2 | 3/2011 | Di Cristo et al. |
| 7,917,497 | B2 | 3/2011 | Harrison et al. |
| 7,920,678 | B2 | 4/2011 | Cooper et al. |
| 7,920,682 | B2 | 4/2011 | Byrne et al. |
| 7,920,857 | B2 | 4/2011 | Lau et al. |
| 7,925,525 | B2 | 4/2011 | Chin |
| 7,925,610 | B2 | 4/2011 | Elbaz et al. |
| 7,929,805 | B2 | 4/2011 | Wang et al. |
| 7,930,168 | B2 | 4/2011 | Weng et al. |
| 7,930,183 | B2 | 4/2011 | Odell et al. |
| 7,930,197 | B2 | 4/2011 | Ozzie et al. |
| 7,936,339 | B2 | 5/2011 | Marggraff et al. |
| 7,936,861 | B2 | 5/2011 | Martin et al. |
| 7,936,863 | B2 | 5/2011 | John et al. |
| 7,937,075 | B2 | 5/2011 | Zellner |
| 7,941,009 | B2 | 5/2011 | Li et al. |
| 7,945,294 | B2 | 5/2011 | Zhang et al. |
| 7,945,470 | B1 | 5/2011 | Cohen et al. |
| 7,949,529 | B2 | 5/2011 | Weider et al. |
| 7,949,534 | B2 | 5/2011 | Davis et al. |
| 7,949,752 | B2 | 5/2011 | Lange et al. |
| 7,953,679 | B2 | 5/2011 | Chidlovskii et al. |
| 7,957,975 | B2 | 6/2011 | Burns et al. |
| 7,958,136 | B1 | 6/2011 | Curtis et al. |
| 7,962,179 | B2 | 6/2011 | Huang |
| 7,974,835 | B2 | 7/2011 | Balchandran et al. |
| 7,974,844 | B2 | 7/2011 | Sumita |
| 7,974,972 | B2 | 7/2011 | Cao |
| 7,975,216 | B2 | 7/2011 | Woolf et al. |
| 7,983,478 | B2 | 7/2011 | Liu et al. |
| 7,983,915 | B2 | 7/2011 | Knight et al. |
| 7,983,917 | B2 | 7/2011 | Kennewick et al. |
| 7,983,919 | B2 | 7/2011 | Conkie |
| 7,983,997 | B2 | 7/2011 | Allen et al. |
| 7,984,062 | B2 | 7/2011 | Dunning et al. |
| 7,986,431 | B2 | 7/2011 | Emori et al. |
| 7,987,151 | B2 | 7/2011 | Schott et al. |
| 7,987,244 | B1 | 7/2011 | Lewis et al. |
| 7,991,614 | B2 | 8/2011 | Washio et al. |
| 7,992,085 | B2 | 8/2011 | Wang-Aryattanwanich et al. |
| 7,996,228 | B2 | 8/2011 | Miller et al. |
| 7,996,589 | B2 | 8/2011 | Schultz et al. |
| 7,996,769 | B2 | 8/2011 | Fux et al. |
| 7,996,792 | B2 | 8/2011 | Anzures et al. |
| 7,999,669 | B2 | 8/2011 | Singh et al. |
| 8,000,453 | B2 | 8/2011 | Cooper et al. |
| 8,005,664 | B2 | 8/2011 | Hanumanthappa |
| 8,005,679 | B2 | 8/2011 | Jordan et al. |
| 8,006,180 | B2 | 8/2011 | Tunning et al. |
| 8,014,308 | B2 | 9/2011 | Gates et al. |
| 8,015,006 | B2 | 9/2011 | Kennewick et al. |
| 8,015,011 | B2 | 9/2011 | Nagano et al. |
| 8,015,144 | B2 | 9/2011 | Zheng et al. |
| 8,018,431 | B1 | 9/2011 | Zehr et al. |
| 8,019,271 | B1 | 9/2011 | Izdepski |
| 8,019,604 | B2 | 9/2011 | Ma |
| 8,020,104 | B2 | 9/2011 | Robarts et al. |
| 8,024,195 | B2 | 9/2011 | Mozer et al. |
| 8,024,415 | B2 | 9/2011 | Horvitz et al. |
| 8,027,836 | B2 | 9/2011 | Baker et al. |
| 8,031,943 | B2 | 10/2011 | Chen et al. |
| 8,032,383 | B1 | 10/2011 | Bhardwaj et al. |
| 8,036,901 | B2 | 10/2011 | Mozer |
| 8,037,034 | B2 | 10/2011 | Plachta et al. |
| 8,041,557 | B2 | 10/2011 | Liu |
| 8,041,570 | B2 | 10/2011 | Mirkovic et al. |
| 8,041,611 | B2 | 10/2011 | Kleinrock et al. |
| 8,042,053 | B2 | 10/2011 | Darwish et al. |
| 8,046,363 | B2 | 10/2011 | Cha et al. |
| 8,046,374 | B1 | 10/2011 | Bromwich et al. |
| 8,050,500 | B1 | 11/2011 | Batty et al. |
| 8,054,180 | B1 | 11/2011 | Scofield et al. |
| 8,055,502 | B2 | 11/2011 | Clark et al. |
| 8,055,708 | B2 | 11/2011 | Chitsaz et al. |
| 8,056,070 | B2 | 11/2011 | Goller et al. |
| 8,060,824 | B2 | 11/2011 | Brownrigg, Jr. et al. |
| 8,064,753 | B2 | 11/2011 | Freeman |
| 8,065,143 | B2 | 11/2011 | Yanagihara |
| 8,065,155 | B1 | 11/2011 | Gazdzinski |
| 8,065,156 | B2 | 11/2011 | Gazdzinski |
| 8,068,604 | B2 | 11/2011 | Leeds et al. |
| 8,069,046 | B2 | 11/2011 | Kennewick et al. |
| 8,069,422 | B2 | 11/2011 | Sheshagiri et al. |
| 8,073,681 | B2 | 12/2011 | Baldwin et al. |
| 8,073,695 | B1 | 12/2011 | Hendricks et al. |
| 8,077,153 | B2 | 12/2011 | Benko et al. |
| 8,078,473 | B1 | 12/2011 | Gazdzinski |
| 8,082,153 | B2 | 12/2011 | Coffman et al. |
| 8,082,498 | B2 | 12/2011 | Salamon et al. |
| 8,090,571 | B2 | 1/2012 | Elshishiny et al. |
| 8,095,364 | B2 | 1/2012 | Longe et al. |
| 8,099,289 | B2 | 1/2012 | Mozer et al. |
| 8,099,395 | B2 | 1/2012 | Pabla et al. |
| 8,099,418 | B2 | 1/2012 | Inoue et al. |
| 8,103,510 | B2 | 1/2012 | Sato |
| 8,107,401 | B2 | 1/2012 | John et al. |
| 8,112,275 | B2 | 2/2012 | Kennewick et al. |
| 8,112,280 | B2 | 2/2012 | Lu |
| 8,117,037 | B2 | 2/2012 | Gazdzinski |
| 8,117,542 | B2 | 2/2012 | Radtke et al. |
| 8,121,413 | B2 | 2/2012 | Hwang et al. |
| 8,121,837 | B2 | 2/2012 | Agapi et al. |
| 8,122,094 | B1 | 2/2012 | Kotab |
| 8,122,353 | B2 | 2/2012 | Bouta |
| 8,130,929 | B2 | 3/2012 | Wilkes et al. |
| 8,131,557 | B2 | 3/2012 | Davis et al. |
| 8,135,115 | B1 | 3/2012 | Hogg, Jr. et al. |

(56) References Cited

U.S. PATENT DOCUMENTS 8,138,912 B2 3/2012 Singh et al.
8,140,335 B2 3/2012 Kennewick et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,175,872 B2 5/2012 Kristjansson et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,195,467 B2 6/2012 Mozer et al.
8,195,468 B2 6/2012 Kennewick et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,608 B2 7/2012 alSafadi et al.
8,224,649 B2 7/2012 Chaudhari et al.
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,247 B2 9/2012 Lazaridis et al.
8,260,617 B2 9/2012 Dhanakshirur et al.
8,270,933 B2 9/2012 Riemer et al.
8,271,287 B1 9/2012 Kermani
8,275,621 B2 9/2012 Alewine et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,326,627 B2 12/2012 Kennewick et al.
8,332,205 B2 12/2012 Krishnan et al.
8,332,218 B2 12/2012 Cross et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,401,163 B1 3/2013 Kirchhoff et al.
8,406,745 B1 3/2013 Upadhyay et al.
8,423,288 B2 4/2013 Stahl et al.
8,428,758 B2 4/2013 Naik et al.
8,433,778 B1 4/2013 Shreesha et al.
8,442,821 B1 5/2013 Vanhoucke
8,447,612 B2 5/2013 Gazdzinski
8,452,597 B2 5/2013 Bringert et al.
8,457,959 B2 6/2013 Kaiser
8,458,115 B2 6/2013 Cai et al.
8,458,278 B2 6/2013 Christie et al.
8,464,150 B2 6/2013 Davidson et al.
8,473,289 B2 6/2013 Jitkoff et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,750 B1 8/2013 Lei et al.
8,521,513 B2 8/2013 Millett et al.
8,521,531 B1 8/2013 Kim
8,527,276 B1 9/2013 Senior et al.
8,537,033 B2 9/2013 Gueziec
8,543,398 B1 9/2013 Strope et al.
8,560,229 B1 10/2013 Park et al.
8,571,851 B1 10/2013 Tickner et al.
8,583,416 B2 11/2013 Huang et al.
8,583,511 B2 11/2013 Hendrickson
8,589,869 B2 11/2013 Wolfram
8,589,911 B1 11/2013 Sharkey et al.
8,595,004 B2 11/2013 Koshinaka
8,595,642 B1 * 11/2013 Lagassey ................ G06F 3/048 715/781
8,600,743 B2 12/2013 Lindahl et al.
8,600,930 B2 12/2013 Sata et al.
8,606,568 B1 12/2013 Tickner et al.
8,620,659 B2 12/2013 Di Cristo et al.
8,620,662 B2 12/2013 Bellegarda
8,626,681 B1 1/2014 Jurca et al.
8,638,363 B2 1/2014 King et al.
8,639,516 B2 1/2014 Lindahl et al.
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.

(56) References Cited

U.S. PATENT DOCUMENTS 8,682,667 B2 3/2014 Haughay et al.
8,687,777 B1 4/2014 Lavian et al.
8,688,446 B2 4/2014 Yanagihara et al.
8,688,453 B1 4/2014 Joshi et al.
8,689,135 B2 * 4/2014 Portele .................... G06F 9/451 715/802
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,931 B2 7/2014 Fux et al.
8,781,456 B2 7/2014 Prociw
8,781,841 B1 7/2014 Wang
8,798,255 B2 8/2014 Lubowich et al.
8,798,995 B1 8/2014 Edara et al.
8,799,000 B2 8/2014 Guzzoni et al.
8,805,690 B1 8/2014 LeBeau et al.
8,812,302 B2 8/2014 Xiao et al.
8,838,457 B2 9/2014 Cerra et al.
8,855,915 B2 10/2014 Furuhata et al.
8,861,925 B1 10/2014 Ohme
8,862,252 B2 10/2014 Rottler et al.
8,868,409 B1 10/2014 Mengibar et al.
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,898,568 B2 11/2014 Bull et al.
8,903,716 B2 12/2014 Chen et al.
8,909,693 B2 12/2014 Frissora et al.
8,930,176 B2 1/2015 Li et al.
8,930,191 B2 1/2015 Gruber et al.
8,938,394 B1 1/2015 Faaborg et al.
8,938,688 B2 1/2015 Bradford et al.
8,942,986 B2 1/2015 Cheyer et al.
8,943,423 B2 1/2015 Merrill et al.
8,972,240 B2 3/2015 Brockett et al.
8,972,432 B2 3/2015 Shaw et al.
8,972,878 B2 3/2015 Mohler et al.
8,983,383 B1 3/2015 Haskin
8,989,713 B2 3/2015 Doulton
8,990,235 B2 3/2015 King et al.
8,994,660 B2 3/2015 Neels et al.
8,995,972 B1 * 3/2015 Cronin ................ G10L 15/1822 455/414.3
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,009,046 B1 4/2015 Stewart
9,020,804 B2 4/2015 Barbaiani et al.
9,026,425 B2 5/2015 Nikoulina et al.
9,031,834 B2 5/2015 Coorman et al.
9,037,967 B1 5/2015 Al-Jefri et al.
9,043,208 B2 5/2015 Koch et al.
9,049,255 B2 6/2015 MacFarlane et al.
9,049,295 B1 6/2015 Cooper et al.
9,053,706 B2 6/2015 Jitkoff et al.
9,058,811 B2 6/2015 Wang et al.
9,063,979 B2 6/2015 Chiu et al.
9,070,366 B1 6/2015 Mathias et al.
9,071,701 B2 6/2015 Donaldson et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,171,541 B2 10/2015 Kennewick et al.
9,171,546 B1 10/2015 Pike
9,190,062 B2 11/2015 Haughay
9,208,153 B1 12/2015 Zaveri et al.
9,218,809 B2 12/2015 Bellegarda
9,218,819 B1 12/2015 Stekkelpak et al.
9,223,537 B2 12/2015 Brown et al.
9,255,812 B2 2/2016 Maeoka et al.
9,258,604 B1 2/2016 Bilobrov et al.
9,262,612 B2 2/2016 Cheyer
9,286,910 B1 3/2016 Li et al.
9,292,487 B1 3/2016 Weber
9,292,489 B1 3/2016 Sak et al.
9,299,344 B2 3/2016 Braho et al.
9,300,718 B2 3/2016 Khanna
9,305,543 B2 4/2016 Fleizach et al.
9,305,548 B2 4/2016 Kennewick et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,330,659 B2 5/2016 Ju et al.
9,330,720 B2 5/2016 Lee
9,338,493 B2 5/2016 Van Os et al.
9,349,368 B1 5/2016 LeBeau et al.
9,361,084 B1 6/2016 Costa
9,367,541 B1 6/2016 Servan et al.
9,377,871 B2 6/2016 Waddell et al.
9,378,740 B1 6/2016 Rosen et al.
9,380,155 B1 6/2016 Reding et al.
9,390,726 B1 7/2016 Smus et al.
9,401,147 B2 7/2016 Jitkoff et al.
9,406,224 B1 8/2016 Sanders et al.
9,412,392 B2 8/2016 Lindahl
9,423,266 B2 8/2016 Clark et al.
9,436,918 B2 9/2016 Pantel et al.
9,437,186 B1 9/2016 Liu et al.
9,437,189 B2 9/2016 Epstein et al.
9,454,957 B1 9/2016 Mathias et al.
9,484,021 B1 11/2016 Mairesse et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,535,906 B2 1/2017 Lee et al.
9,536,527 B1 * 1/2017 Carlson .................. G10L 15/30
9,547,647 B2 1/2017 Badaskar
9,548,050 B2 1/2017 Gruber et al.
9,575,964 B2 2/2017 Yadgar et al.
9,578,173 B2 2/2017 Sanghavi et al.
9,607,612 B2 3/2017 Deleeuw
9,620,113 B2 4/2017 Kennewick et al.
9,620,126 B2 4/2017 Chiba
9,626,955 B2 4/2017 Fleizach et al.
9,633,004 B2 4/2017 Giuli et al.
9,633,660 B2 4/2017 Haughay
9,652,453 B2 5/2017 Mathur et al.
9,658,746 B2 5/2017 Cohn et al.
9,668,121 B2 5/2017 Naik et al.
9,672,725 B2 6/2017 Dotan-Cohen et al.
9,697,827 B1 7/2017 Lilly et al.
9,720,907 B2 8/2017 Bangalore et al.

(56) References Cited

U.S. PATENT DOCUMENTS 9,734,839 B1 8/2017 Adams
9,741,343 B1 8/2017 Miles et al.
9,786,271 B1 * 10/2017 Combs .................... G10L 15/07
2001/0005859 A1 6/2001 Okuyama et al.
2001/0020259 A1 9/2001 Sekiguchi et al.
2001/0027394 A1 10/2001 Theimer
2001/0027396 A1 10/2001 Sato
2001/0029455 A1 10/2001 Chin et al.
2001/0030660 A1 10/2001 Zainoulline
2001/0032080 A1 10/2001 Fukada
2001/0041021 A1 11/2001 Boyle et al.
2001/0042107 A1 11/2001 Palm
2001/0044724 A1 11/2001 Hon et al.
2001/0047264 A1 11/2001 Roundtree
2001/0055963 A1 12/2001 Cloutier
2001/0056342 A1 12/2001 Piehn et al.
2001/0056347 A1 12/2001 Chazan et al.
2002/0001395 A1 1/2002 Davis et al.
2002/0002039 A1 1/2002 Qureshey et al.
2002/0002413 A1 1/2002 Tokue
2002/0002461 A1 1/2002 Tetsumoto
2002/0002465 A1 1/2002 Maes
2002/0004703 A1 1/2002 Gaspard, II
2002/0010581 A1 1/2002 Euler et al.
2002/0010584 A1 1/2002 Schultz et al.
2002/0010589 A1 1/2002 Nashida et al.
2002/0010726 A1 1/2002 Rogson
2002/0010798 A1 1/2002 Ben-Shaul et al.
2002/0013707 A1 1/2002 Shaw et al.
2002/0013784 A1 1/2002 Swanson
2002/0013852 A1 1/2002 Janik
2002/0015024 A1 2/2002 Westerman et al.
2002/0015064 A1 2/2002 Robotham et al.
2002/0021278 A1 2/2002 Hinckley et al.
2002/0026315 A1 2/2002 Miranda
2002/0026456 A1 2/2002 Bradford
2002/0031254 A1 3/2002 Lantrip et al.
2002/0031262 A1 3/2002 Imagawa et al.
2002/0032048 A1 3/2002 Kitao et al.
2002/0032564 A1 3/2002 Ehsani et al.
2002/0032591 A1 3/2002 Mahaffy et al.
2002/0032751 A1 3/2002 Bharadwaj
2002/0035467 A1 3/2002 Morimoto et al.
2002/0035469 A1 3/2002 Holzapfel
2002/0035474 A1 3/2002 Alpdemir
2002/0040297 A1 4/2002 Tsiao et al.
2002/0040359 A1 4/2002 Green et al.
2002/0042707 A1 4/2002 Zhao et al.
2002/0045438 A1 4/2002 Tagawa et al.
2002/0045961 A1 4/2002 Gibbs et al.
2002/0046025 A1 4/2002 Hain
2002/0046315 A1 4/2002 Miller et al.
2002/0052730 A1 5/2002 Nakao
2002/0052740 A1 5/2002 Charlesworth et al.
2002/0052746 A1 5/2002 Handelman
2002/0052747 A1 5/2002 Sarukkai
2002/0052913 A1 5/2002 Yamada et al.
2002/0054094 A1 5/2002 Matsuda
2002/0055844 A1 5/2002 L'Esperance et al.
2002/0055934 A1 5/2002 Lipscomb et al.
2002/0057293 A1 5/2002 Liao
2002/0059066 A1 5/2002 O'hagan
2002/0059068 A1 5/2002 Rose et al.
2002/0065659 A1 5/2002 Isono et al.
2002/0065797 A1 5/2002 Meidan et al.
2002/0067308 A1 6/2002 Robertson
2002/0069063 A1 6/2002 Buchner et al.
2002/0069071 A1 6/2002 Knockeart et al.
2002/0069220 A1 6/2002 Tran
2002/0072816 A1 6/2002 Shdema et al.
2002/0072908 A1 6/2002 Case et al.
2002/0072914 A1 6/2002 Alshawi et al.
2002/0072915 A1 6/2002 Bower
2002/0073177 A1 6/2002 Clark et al.
2002/0077082 A1 6/2002 Cruickshank
2002/0077817 A1 6/2002 Atal
2002/0078041 A1 6/2002 Wu
2002/0080163 A1 6/2002 Morey
2002/0083068 A1 6/2002 Quass et al.
2002/0085037 A1 7/2002 Leavitt et al.
2002/0086680 A1 7/2002 Hunzinger
2002/0087306 A1 7/2002 Lee et al.
2002/0087508 A1 7/2002 Hull et al.
2002/0087974 A1 7/2002 Sprague et al.
2002/0091511 A1 7/2002 Hellwig et al.
2002/0091529 A1 7/2002 Whitham
2002/0095286 A1 7/2002 Ross et al.
2002/0095290 A1 7/2002 Kahn et al.
2002/0099547 A1 7/2002 Chu et al.
2002/0099552 A1 7/2002 Rubin et al.
2002/0101447 A1 8/2002 Carro
2002/0103641 A1 8/2002 Kuo et al.
2002/0103644 A1 8/2002 Brocious et al.
2002/0103646 A1 8/2002 Kochanski et al.
2002/0107684 A1 8/2002 Gao
2002/0109709 A1 8/2002 Sagar
2002/0110248 A1 8/2002 Kovales et al.
2002/0111198 A1 8/2002 Heie et al.
2002/0111810 A1 8/2002 Khan et al.
2002/0116082 A1 8/2002 Gudorf
2002/0116171 A1 8/2002 Russell
2002/0116185 A1 8/2002 Cooper et al.
2002/0116189 A1 8/2002 Yeh et al.
2002/0116420 A1 8/2002 Allam et al.
2002/0117384 A1 8/2002 Marchant
2002/0120697 A1 8/2002 Generous et al.
2002/0120925 A1 8/2002 Logan
2002/0122053 A1 9/2002 Dutta et al.
2002/0123891 A1 9/2002 Epstein et al.
2002/0123894 A1 9/2002 Woodward
2002/0126097 A1 9/2002 Savolainen
2002/0128821 A1 9/2002 Ehsani et al.
2002/0128827 A1 9/2002 Bu et al.
2002/0128840 A1 9/2002 Hinde et al.
2002/0129057 A1 9/2002 Spielberg
2002/0133347 A1 9/2002 Schoneburg et al.
2002/0133348 A1 9/2002 Pearson et al.
2002/0135565 A1 9/2002 Gordon et al.
2002/0135618 A1 9/2002 Maes et al.
2002/0137505 A1 9/2002 Eiche et al.
2002/0138254 A1 9/2002 Isaka et al.
2002/0138265 A1 9/2002 Stevens et al.
2002/0138270 A1 9/2002 Bellegarda et al.
2002/0138616 A1 9/2002 Basson et al.
2002/0140679 A1 10/2002 Wen
2002/0143533 A1 10/2002 Lucas et al.
2002/0143542 A1 10/2002 Eide
2002/0143551 A1 10/2002 Sharma et al.
2002/0143826 A1 10/2002 Day et al.
2002/0151297 A1 10/2002 Remboski et al.
2002/0152045 A1 10/2002 Dowling et al.
2002/0152255 A1 10/2002 Smith et al.
2002/0154160 A1 10/2002 Hosokawa
2002/0156771 A1 10/2002 Frieder et al.
2002/0161865 A1 10/2002 Nguyen
2002/0163544 A1 11/2002 Baker et al.
2002/0164000 A1 11/2002 Cohen et al.
2002/0165918 A1 11/2002 Bettis
2002/0166123 A1 11/2002 Schrader et al.
2002/0167534 A1 11/2002 Burke
2002/0169592 A1 11/2002 Aityan
2002/0169605 A1 11/2002 Damiba et al.
2002/0173273 A1 11/2002 Spurgat et al.
2002/0173889 A1 11/2002 Odinak et al.
2002/0173961 A1 11/2002 Guerra
2002/0173962 A1 11/2002 Tang et al.
2002/0173966 A1 11/2002 Henton
2002/0177993 A1 11/2002 Veditz et al.
2002/0184003 A1 12/2002 Hakkinen et al.
2002/0184015 A1 12/2002 Li et al.
2002/0184027 A1 12/2002 Britten et al.
2002/0184189 A1 12/2002 Hay et al.
2002/0189426 A1 12/2002 Hirade et al.
2002/0191029 A1 12/2002 Gillespie et al.

(56) References Cited

U.S. PATENT DOCUMENTS

2002/0193996 A1 12/2002 Squibbs et al.
2002/0196911 A1 12/2002 Gao et al.
2002/0198714 A1 12/2002 Zhou
2002/0198715 A1 12/2002 Belrose
2003/0001881 A1 1/2003 Mannheimer et al.
2003/0002632 A1 1/2003 Bhogal et al.
2003/0003609 A1 1/2003 Sauer et al.
2003/0003897 A1 1/2003 Seung-Taek
2003/0004968 A1 1/2003 Romer et al.
2003/0009459 A1 1/2003 Chastain et al.
2003/0013483 A1 1/2003 Ausems et al.
2003/0016770 A1 1/2003 Trans et al.
2003/0018475 A1 1/2003 Basu et al.
2003/0020760 A1 1/2003 Takatsu et al.
2003/0023420 A1 1/2003 Goodman et al.
2003/0023426 A1 1/2003 Pun et al.
2003/0025676 A1 2/2003 Cappendijk
2003/0026392 A1 2/2003 Brown et al.
2003/0026402 A1 2/2003 Clapper
2003/0028380 A1 2/2003 Freeland et al.
2003/0030645 A1 2/2003 Ribak et al.
2003/0033148 A1 2/2003 Silverman et al.
2003/0033152 A1 2/2003 Cameron
2003/0033153 A1 2/2003 Olson et al.
2003/0033214 A1 2/2003 Mikkelsen et al.
2003/0036909 A1 2/2003 Kato
2003/0037073 A1 2/2003 Tokuda et al.
2003/0037077 A1 2/2003 Brill et al.
2003/0037254 A1 2/2003 Fischer et al.
2003/0038786 A1 2/2003 Nguyen et al.
2003/0040908 A1 2/2003 Yang et al.
2003/0046075 A1 3/2003 Stone
2003/0046401 A1 3/2003 Abbott et al.
2003/0046434 A1 3/2003 Flanagin et al.
2003/0048881 A1 3/2003 Trajkovic et al.
2003/0050781 A1 3/2003 Tamura et al.
2003/0051136 A1 3/2003 Curtis et al.
2003/0055537 A1 3/2003 Odinak et al.
2003/0055623 A1 3/2003 Epstein et al.
2003/0061317 A1 3/2003 Brown et al.
2003/0061570 A1 3/2003 Hatori et al.
2003/0063073 A1 4/2003 Geaghan et al.
2003/0069893 A1 4/2003 Kanai et al.
2003/0074195 A1 4/2003 Bartosik et al.
2003/0074198 A1 4/2003 Sussman
2003/0074457 A1 4/2003 Kluth
2003/0076301 A1 4/2003 Tsuk et al.
2003/0078766 A1 4/2003 Appelt et al.
2003/0078779 A1 4/2003 Desai et al.
2003/0078780 A1 4/2003 Kochanski et al.
2003/0078969 A1 4/2003 Sprague et al.
2003/0079024 A1 4/2003 Hough et al.
2003/0079038 A1 4/2003 Robbin et al.
2003/0080991 A1 5/2003 Crow et al.
2003/0083113 A1 5/2003 Chua et al.
2003/0083878 A1 5/2003 Lee et al.
2003/0083884 A1 5/2003 Odinak et al.
2003/0084350 A1 5/2003 Eibach et al.
2003/0085870 A1 5/2003 Hinckley
2003/0086699 A1 5/2003 Benyamin et al.
2003/0088414 A1 5/2003 Huang et al.
2003/0088421 A1 5/2003 Maes et al.
2003/0090467 A1 5/2003 Hohl et al.
2003/0090474 A1 5/2003 Schaefer
2003/0095096 A1 5/2003 Robbin et al.
2003/0097210 A1 5/2003 Horst et al.
2003/0097379 A1 5/2003 Ireton
2003/0097407 A1 5/2003 Litwin et al.
2003/0097408 A1 5/2003 Kageyama et al.
2003/0098892 A1 5/2003 Hiipakka
2003/0099335 A1 5/2003 Tanaka et al.
2003/0101045 A1 5/2003 Moffatt et al.
2003/0101054 A1 5/2003 Davis et al.
2003/0115060 A1 6/2003 Junqua et al.
2003/0115064 A1 6/2003 Gusler et al.
2003/0115067 A1* 6/2003 Ibaraki .............. H04N 5/44513
704/275
2003/0115186 A1 6/2003 Wilkinson et al.
2003/0115552 A1 6/2003 Jahnke et al.
2003/0117365 A1 6/2003 Shteyn
2003/0120494 A1 6/2003 Jost et al.
2003/0122652 A1 7/2003 Himmelstein et al.
2003/0122787 A1 7/2003 Zimmerman et al.
2003/0125927 A1 7/2003 Seme
2003/0125955 A1 7/2003 Arnold et al.
2003/0126559 A1 7/2003 Fuhrmann
2003/0128819 A1 7/2003 Lee et al.
2003/0130847 A1 7/2003 Case et al.
2003/0131320 A1 7/2003 Kumhyr et al.
2003/0133694 A1 7/2003 Yeo
2003/0134678 A1 7/2003 Tanaka
2003/0135501 A1 7/2003 Frerebeau et al.
2003/0135740 A1 7/2003 Talmor et al.
2003/0140088 A1 7/2003 Robinson et al.
2003/0144846 A1 7/2003 Denenberg et al.
2003/0145285 A1 7/2003 Miyahira et al.
2003/0147512 A1 8/2003 Abburi
2003/0149557 A1 8/2003 Cox et al.
2003/0149567 A1 8/2003 Schmitz et al.
2003/0149978 A1 8/2003 Plotnick
2003/0152203 A1 8/2003 Berger et al.
2003/0152894 A1 8/2003 Townshend
2003/0154079 A1 8/2003 Ota et al.
2003/0154081 A1 8/2003 Chu et al.
2003/0157968 A1 8/2003 Boman et al.
2003/0158732 A1 8/2003 Pi et al.
2003/0158735 A1 8/2003 Yamada et al.
2003/0158737 A1 8/2003 Csicsatka
2003/0160702 A1 8/2003 Tanaka
2003/0160830 A1 8/2003 Degross
2003/0163316 A1 8/2003 Addison et al.
2003/0164848 A1 9/2003 Dutta et al.
2003/0167155 A1* 9/2003 Reghetti ................ G10L 15/26
703/1
2003/0167167 A1 9/2003 Gong
2003/0167318 A1 9/2003 Robbin et al.
2003/0167335 A1 9/2003 Alexander
2003/0171928 A1 9/2003 Falcon et al.
2003/0171936 A1 9/2003 Sall et al.
2003/0174830 A1 9/2003 Boyer et al.
2003/0177046 A1 9/2003 Socha-Leialoha et al.
2003/0179222 A1 9/2003 Noma et al.
2003/0182115 A1 9/2003 Malayath et al.
2003/0182131 A1 9/2003 Arnold et al.
2003/0187655 A1 10/2003 Dunsmuir
2003/0187659 A1 10/2003 Cho et al.
2003/0187775 A1 10/2003 Du et al.
2003/0187844 A1 10/2003 Li et al.
2003/0187925 A1 10/2003 Inala et al.
2003/0188005 A1 10/2003 Yoneda et al.
2003/0188192 A1 10/2003 Tang et al.
2003/0190074 A1 10/2003 Loudon et al.
2003/0191625 A1 10/2003 Gorin et al.
2003/0191645 A1 10/2003 Zhou
2003/0193481 A1 10/2003 Sokolsky
2003/0194080 A1 10/2003 Michaelis et al.
2003/0195741 A1 10/2003 Mani et al.
2003/0197736 A1 10/2003 Murphy
2003/0197744 A1 10/2003 Irvine
2003/0200085 A1 10/2003 Nguyen et al.
2003/0200452 A1 10/2003 Tagawa et al.
2003/0200858 A1 10/2003 Xie
2003/0202697 A1 10/2003 Simard et al.
2003/0204392 A1 10/2003 Finnigan et al.
2003/0204492 A1 10/2003 Wolf et al.
2003/0206199 A1 11/2003 Pusa et al.
2003/0208756 A1 11/2003 Macrae et al.
2003/0210266 A1 11/2003 Cragun et al.
2003/0212543 A1 11/2003 Epstein et al.
2003/0212961 A1 11/2003 Soin et al.
2003/0214519 A1 11/2003 Smith et al.
2003/0216919 A1 11/2003 Roushar
2003/0221198 A1 11/2003 Sloo et al.
2003/0224760 A1 12/2003 Day

(56) References Cited

U.S. PATENT DOCUMENTS

2003/0228863 A1 12/2003 Vander Veen et al.
2003/0228909 A1 12/2003 Tanaka et al.
2003/0229490 A1 12/2003 Etter
2003/0229616 A1 12/2003 Wong
2003/0233230 A1 12/2003 Ammicht et al.
2003/0233237 A1 12/2003 Garside et al.
2003/0233240 A1 12/2003 Kaatrasalo
2003/0234824 A1 12/2003 Litwiller
2003/0236663 A1 12/2003 Dimitrova et al.
2004/0001396 A1 1/2004 Keller et al.
2004/0006467 A1 1/2004 Anisimovich et al.
2004/0008277 A1 1/2004 Nagaishi et al.
2004/0010484 A1 1/2004 Foulger et al.
2004/0012556 A1 1/2004 Yong et al.
2004/0013252 A1 1/2004 Craner
2004/0015342 A1 1/2004 Garst et al.
2004/0021676 A1 2/2004 Chen et al.
2004/0022369 A1 2/2004 Vitikainen et al.
2004/0022373 A1 2/2004 Suder et al.
2004/0023643 A1 2/2004 Vander Veen et al.
2004/0030551 A1 2/2004 Marcu et al.
2004/0030554 A1 2/2004 Boxberger-Oberoi et al.
2004/0030556 A1 2/2004 Bennett
2004/0030559 A1 2/2004 Payne et al.
2004/0030996 A1 2/2004 Van Liempd et al.
2004/0036715 A1 2/2004 Warren
2004/0048627 A1 3/2004 Olvera-Hernandez
2004/0049388 A1 3/2004 Roth et al.
2004/0049391 A1 3/2004 Polanyi et al.
2004/0051729 A1 3/2004 Borden, IV
2004/0052338 A1 3/2004 Celi, Jr. et al.
2004/0054530 A1 3/2004 Davis et al.
2004/0054533 A1 3/2004 Bellegarda
2004/0054534 A1 3/2004 Junqua
2004/0054535 A1 3/2004 Mackie et al.
2004/0054541 A1 3/2004 Kryze et al.
2004/0054690 A1 3/2004 Hillerbrand et al.
2004/0055446 A1 3/2004 Robbin et al.
2004/0056899 A1 3/2004 Sinclair, II et al.
2004/0059577 A1 3/2004 Pickering
2004/0059790 A1 3/2004 Austin-Lane et al.
2004/0061717 A1 4/2004 Menon et al.
2004/0062367 A1 4/2004 Fellenstein et al.
2004/0064593 A1 4/2004 Sinclair et al.
2004/0069122 A1 4/2004 Wilson
2004/0070567 A1 4/2004 Longe et al.
2004/0070612 A1 4/2004 Sinclair et al.
2004/0073427 A1 4/2004 Moore
2004/0073428 A1 4/2004 Zlokarnik et al.
2004/0076086 A1 4/2004 Keller et al.
2004/0078382 A1 4/2004 Mercer et al.
2004/0085162 A1 5/2004 Agarwal et al.
2004/0085368 A1 5/2004 Johnson, Jr. et al.
2004/0086120 A1 5/2004 Akins, III et al.
2004/0093213 A1 5/2004 Conkie
2004/0093215 A1 5/2004 Gupta et al.
2004/0093328 A1 5/2004 Damle
2004/0094018 A1 5/2004 Ueshima et al.
2004/0096105 A1 5/2004 Holtsberg
2004/0098250 A1 5/2004 Kimchi et al.
2004/0100479 A1 5/2004 Nakano et al.
2004/0106432 A1 6/2004 Kanamori et al.
2004/0107169 A1 6/2004 Lowe
2004/0111266 A1 6/2004 Coorman et al.
2004/0111332 A1 6/2004 Baer et al.
2004/0114731 A1 6/2004 Gillett et al.
2004/0120476 A1 6/2004 Harrison et al.
2004/0122656 A1 6/2004 Abir
2004/0122664 A1 6/2004 Lorenzo et al.
2004/0122673 A1 6/2004 Park et al.
2004/0124583 A1 7/2004 Landis
2004/0125088 A1 7/2004 Zimmerman et al.
2004/0125922 A1 7/2004 Specht
2004/0127198 A1 7/2004 Roskind et al.
2004/0127241 A1 7/2004 Shostak
2004/0128137 A1 7/2004 Bush et al.
2004/0128614 A1 7/2004 Andrews et al.
2004/0133817 A1 7/2004 Choi
2004/0135701 A1 7/2004 Yasuda et al.
2004/0135774 A1 7/2004 La Monica
2004/0136510 A1 7/2004 Vander Veen
2004/0138869 A1 7/2004 Heinecke
2004/0145607 A1 7/2004 Alderson
2004/0153306 A1 8/2004 Tanner et al.
2004/0155869 A1 8/2004 Robinson et al.
2004/0160419 A1 8/2004 Padgitt
2004/0162741 A1 8/2004 Flaxer et al.
2004/0170379 A1 9/2004 Yao et al.
2004/0174399 A1 9/2004 Wu et al.
2004/0174434 A1 9/2004 Walker et al.
2004/0176958 A1 9/2004 Salmenkaita et al.
2004/0177319 A1 9/2004 Horn
2004/0178994 A1 9/2004 Kairls, Jr.
2004/0181392 A1 9/2004 Parikh et al.
2004/0183833 A1 9/2004 Chua
2004/0186713 A1 9/2004 Gomas et al.
2004/0186714 A1 9/2004 Baker
2004/0186777 A1 9/2004 Margiloff et al.
2004/0186857 A1 9/2004 Serlet et al.
2004/0193398 A1 9/2004 Chu et al.
2004/0193420 A1 9/2004 Kennewick et al.
2004/0193421 A1 9/2004 Blass
2004/0193426 A1 9/2004 Maddux et al.
2004/0196256 A1 10/2004 Wobbrock et al.
2004/0198436 A1 10/2004 Alden
2004/0199375 A1 10/2004 Ehsani et al.
2004/0199387 A1 10/2004 Wang et al.
2004/0199663 A1 10/2004 Horvitz et al.
2004/0203520 A1 10/2004 Schirtzinger et al.
2004/0205151 A1 10/2004 Sprigg et al.
2004/0205671 A1 10/2004 Sukehiro et al.
2004/0208302 A1 10/2004 Urban et al.
2004/0210442 A1 10/2004 Glynn et al.
2004/0210634 A1 10/2004 Ferrer et al.
2004/0213419 A1 10/2004 Varma et al.
2004/0215731 A1 10/2004 Tzann-en Szeto
2004/0216049 A1 10/2004 Lewis et al.
2004/0218451 A1 11/2004 Said et al.
2004/0220798 A1 11/2004 Chi et al.
2004/0220809 A1 11/2004 Wang et al.
2004/0221235 A1 11/2004 Marchisio et al.
2004/0223485 A1 11/2004 Arellano et al.
2004/0223599 A1 11/2004 Bear et al.
2004/0224638 A1 11/2004 Fadell et al.
2004/0225501 A1 11/2004 Cutaia et al.
2004/0225504 A1 11/2004 Junqua et al.
2004/0225650 A1 11/2004 Cooper et al.
2004/0225746 A1 11/2004 Niell et al.
2004/0230420 A1 11/2004 Kadambe et al.
2004/0230637 A1 11/2004 Lecoueche et al.
2004/0236778 A1 11/2004 Junqua et al.
2004/0242286 A1 12/2004 Benco et al.
2004/0243412 A1 12/2004 Gupta et al.
2004/0243419 A1 12/2004 Wang
2004/0249629 A1 12/2004 Webster
2004/0249637 A1 12/2004 Baker et al.
2004/0249667 A1 12/2004 Oon
2004/0252119 A1 12/2004 Hunleth et al.
2004/0252604 A1 12/2004 Johnson et al.
2004/0252966 A1 12/2004 Holloway et al.
2004/0254791 A1 12/2004 Coifman et al.
2004/0254792 A1 12/2004 Busayapongchai et al.
2004/0257432 A1 12/2004 Girish et al.
2004/0259536 A1 12/2004 Keskar et al.
2004/0260438 A1 12/2004 Chernetsky et al.
2004/0260547 A1 12/2004 Cohen et al.
2004/0260718 A1 12/2004 Fedorov et al.
2004/0261023 A1 12/2004 Bier
2004/0262051 A1 12/2004 Carro
2004/0263636 A1 12/2004 Cutler et al.
2004/0267825 A1 12/2004 Novak et al.
2004/0268253 A1 12/2004 Demello et al.
2004/0268262 A1 12/2004 Gupta et al.
2005/0002507 A1 1/2005 Timmins et al.

(56) References Cited

U.S. PATENT DOCUMENTS

2005/0010409 A1 1/2005 Hull et al.
2005/0012723 A1 1/2005 Pallakoff
2005/0015254 A1 1/2005 Beaman
2005/0015751 A1 1/2005 Grassens
2005/0015772 A1 1/2005 Saare et al.
2005/0021330 A1 1/2005 Mano et al.
2005/0022114 A1 1/2005 Shanahan et al.
2005/0024341 A1 2/2005 Gillespie et al.
2005/0024345 A1 2/2005 Eastty et al.
2005/0027385 A1 2/2005 Yueh
2005/0030175 A1 2/2005 Wolfe
2005/0031106 A1 2/2005 Henderson
2005/0033582 A1 2/2005 Gadd et al.
2005/0033771 A1 2/2005 Schmitter et al.
2005/0034164 A1 2/2005 Sano et al.
2005/0038657 A1 2/2005 Roth et al.
2005/0039141 A1 2/2005 Burke et al.
2005/0042591 A1 2/2005 Bloom et al.
2005/0043946 A1 2/2005 Ueyama et al.
2005/0043949 A1 2/2005 Roth et al.
2005/0044569 A1 2/2005 Marcus
2005/0045373 A1 3/2005 Born
2005/0049862 A1 3/2005 Choi et al.
2005/0049870 A1 3/2005 Zhang et al.
2005/0049880 A1 3/2005 Roth et al.
2005/0055212 A1 3/2005 Nagao
2005/0055403 A1 3/2005 Britten
2005/0058438 A1 3/2005 Hayashi
2005/0060155 A1 3/2005 Chu et al.
2005/0071165 A1 3/2005 Hofstader et al.
2005/0071332 A1 3/2005 Ortega et al.
2005/0071437 A1 3/2005 Bear et al.
2005/0074113 A1 4/2005 Mathew et al.
2005/0075881 A1 4/2005 Rigazio et al.
2005/0080613 A1 4/2005 Colledge et al.
2005/0080620 A1 4/2005 Rao et al.
2005/0080625 A1 4/2005 Bennett et al.
2005/0080632 A1 4/2005 Endo et al.
2005/0080780 A1 4/2005 Colledge et al.
2005/0086059 A1 4/2005 Bennett
2005/0086255 A1 4/2005 Schran et al.
2005/0086605 A1 4/2005 Ferrer et al.
2005/0091118 A1 4/2005 Fano
2005/0094475 A1 5/2005 Naoi
2005/0099398 A1 5/2005 Garside et al.
2005/0100214 A1 5/2005 Zhang et al.
2005/0102144 A1 5/2005 Rapoport
2005/0102614 A1 5/2005 Brockett et al.
2005/0102625 A1 5/2005 Lee et al.
2005/0105712 A1 5/2005 Williams et al.
2005/0108001 A1 5/2005 Aarskog
2005/0108017 A1 5/2005 Esser et al.
2005/0108074 A1 5/2005 Bloechl et al.
2005/0108338 A1 5/2005 Simske et al.
2005/0108344 A1 5/2005 Tafoya et al.
2005/0108642 A1 5/2005 Sinclair et al.
2005/0114124 A1 5/2005 Liu et al.
2005/0114140 A1 5/2005 Brackett et al.
2005/0114306 A1 5/2005 Shu et al.
2005/0114791 A1 5/2005 Bollenbacher et al.
2005/0119890 A1 6/2005 Hirose
2005/0119897 A1 6/2005 Bennett et al.
2005/0125216 A1 6/2005 Chitrapura et al.
2005/0125226 A1 6/2005 Magee
2005/0125235 A1 6/2005 Lazay et al.
2005/0131951 A1 6/2005 Zhang et al.
2005/0132301 A1 6/2005 Ikeda
2005/0136949 A1 6/2005 Barnes, Jr.
2005/0138305 A1 6/2005 Zellner
2005/0140504 A1 6/2005 Marshall et al.
2005/0143972 A1 6/2005 Gopalakrishnan et al.
2005/0144003 A1 6/2005 Iso-Sipila
2005/0144070 A1 6/2005 Cheshire
2005/0144568 A1 6/2005 Gruen et al.
2005/0148356 A1 7/2005 Ferguson et al.
2005/0149214 A1 7/2005 Yoo et al.
2005/0149330 A1 7/2005 Katae
2005/0149332 A1 7/2005 Kuzunuki et al.
2005/0149510 A1 7/2005 Shafrir
2005/0152558 A1 7/2005 Van Tassel
2005/0152602 A1 7/2005 Chen et al.
2005/0154578 A1 7/2005 Tong et al.
2005/0154591 A1 7/2005 Lecoeuche
2005/0159939 A1 7/2005 Mohler et al.
2005/0159957 A1 7/2005 Roth et al.
2005/0162395 A1 7/2005 Unruh
2005/0165015 A1 7/2005 Ncube et al.
2005/0165607 A1 7/2005 Di Fabbrizio et al.
2005/0166153 A1 7/2005 Eytchison et al.
2005/0177359 A1* 8/2005 Lu .................... H04N 5/44513 704/200
2005/0177445 A1 8/2005 Church
2005/0181770 A1 8/2005 Helferich
2005/0182616 A1 8/2005 Kotipalli
2005/0182627 A1 8/2005 Tanaka et al.
2005/0182628 A1 8/2005 Choi
2005/0182629 A1 8/2005 Coorman et al.
2005/0182630 A1 8/2005 Miro et al.
2005/0182765 A1 8/2005 Liddy
2005/0184958 A1 8/2005 Gnanamgari et al.
2005/0187770 A1 8/2005 Kompe et al.
2005/0187773 A1 8/2005 Filoche et al.
2005/0190970 A1 9/2005 Griffin
2005/0192801 A1 9/2005 Lewis et al.
2005/0192812 A1 9/2005 Buchholz et al.
2005/0195077 A1 9/2005 Mcculloch et al.
2005/0195429 A1 9/2005 Archbold
2005/0196733 A1 9/2005 Budra et al.
2005/0201572 A1 9/2005 Lindahl et al.
2005/0202854 A1 9/2005 Kortum et al.
2005/0203738 A1 9/2005 Hwang
2005/0203747 A1 9/2005 Lecoeuche
2005/0203991 A1 9/2005 Kawamura et al.
2005/0209848 A1 9/2005 Ishii
2005/0210394 A1 9/2005 Crandall et al.
2005/0216331 A1 9/2005 Ahrens et al.
2005/0222843 A1 10/2005 Kahn et al.
2005/0222973 A1 10/2005 Kaiser
2005/0228665 A1 10/2005 Kobayashi et al.
2005/0245243 A1 11/2005 Zuniga
2005/0246350 A1 11/2005 Canaran
2005/0246365 A1 11/2005 Lowles et al.
2005/0246686 A1 11/2005 Seshadri et al.
2005/0246726 A1 11/2005 Labrou et al.
2005/0251572 A1 11/2005 McMahan et al.
2005/0254481 A1 11/2005 Vishik et al.
2005/0261901 A1 11/2005 Davis et al.
2005/0262440 A1 11/2005 Stanciu et al.
2005/0267738 A1 12/2005 Wilkinson et al.
2005/0267757 A1 12/2005 Iso-Sipila et al.
2005/0268247 A1 12/2005 Baneth
2005/0271216 A1 12/2005 Lashkari
2005/0273332 A1 12/2005 Scott et al.
2005/0273337 A1 12/2005 Erell et al.
2005/0273626 A1 12/2005 Pearson et al.
2005/0278297 A1 12/2005 Nelson
2005/0278643 A1 12/2005 Ukai et al.
2005/0278647 A1 12/2005 Leavitt et al.
2005/0283363 A1 12/2005 Weng et al.
2005/0283364 A1 12/2005 Longe et al.
2005/0283726 A1 12/2005 Lunati
2005/0283729 A1 12/2005 Morris et al.
2005/0288934 A1 12/2005 Omi
2005/0288936 A1 12/2005 Busayapongchai et al.
2005/0289458 A1 12/2005 Kylmanen
2005/0289463 A1 12/2005 Wu et al.
2006/0001652 A1 1/2006 Chiu et al.
2006/0004570 A1 1/2006 Ju et al.
2006/0004640 A1 1/2006 Swierczek
2006/0004744 A1 1/2006 Nevidomski et al.
2006/0007174 A1 1/2006 Shen
2006/0009973 A1 1/2006 Nguyen et al.
2006/0013414 A1 1/2006 Shih
2006/0013446 A1 1/2006 Stephens

(56) References Cited

U.S. PATENT DOCUMENTS

2006/0015326 A1 1/2006 Mori et al.
2006/0015341 A1 1/2006 Baker
2006/0015484 A1 1/2006 Weng et al.
2006/0015819 A1 1/2006 Hawkins et al.
2006/0018446 A1 1/2006 Schmandt et al.
2006/0018492 A1 1/2006 Chiu et al.
2006/0020890 A1 1/2006 Kroll et al.
2006/0025999 A1 2/2006 Feng et al.
2006/0026233 A1 2/2006 Tenembaum et al.
2006/0026521 A1 2/2006 Hotelling et al.
2006/0026535 A1 2/2006 Hotelling et al.
2006/0026536 A1 2/2006 Hotelling et al.
2006/0033724 A1 2/2006 Chaudhri et al.
2006/0035632 A1 2/2006 Sorvari et al.
2006/0036946 A1 2/2006 Radtke et al.
2006/0041424 A1 2/2006 Todhunter et al.
2006/0041431 A1 2/2006 Maes
2006/0041590 A1 2/2006 King et al.
2006/0047632 A1 3/2006 Zhang
2006/0050865 A1 3/2006 Kortum et al.
2006/0052141 A1 3/2006 Suzuki
2006/0053007 A1 3/2006 Niemisto et al.
2006/0053365 A1 3/2006 Hollander et al.
2006/0053379 A1 3/2006 Henderson et al.
2006/0053387 A1 3/2006 Ording
2006/0058999 A1 3/2006 Barker et al.
2006/0059424 A1 3/2006 Petri et al.
2006/0059437 A1 3/2006 Conklin
2006/0060762 A1 3/2006 Chan et al.
2006/0061488 A1 3/2006 Dunton
2006/0064693 A1 3/2006 Messer et al.
2006/0067535 A1 3/2006 Culbert et al.
2006/0067536 A1 3/2006 Culbert et al.
2006/0069567 A1 3/2006 Tischer et al.
2006/0069664 A1 3/2006 Ling et al.
2006/0072248 A1 4/2006 Watanabe et al.
2006/0072716 A1 4/2006 Pham
2006/0074628 A1 4/2006 Elbaz et al.
2006/0074651 A1 4/2006 Arun et al.
2006/0074660 A1 4/2006 Waters et al.
2006/0074674 A1 4/2006 Zhang et al.
2006/0074750 A1 4/2006 Clark et al.
2006/0074898 A1 4/2006 Gavalda et al.
2006/0075429 A1 4/2006 Istvan et al.
2006/0077055 A1 4/2006 Basir
2006/0080098 A1 4/2006 Campbell
2006/0085187 A1 4/2006 Barquilla
2006/0085465 A1 4/2006 Nori et al.
2006/0085757 A1 4/2006 Andre et al.
2006/0093998 A1 5/2006 Vertegaal
2006/0095265 A1 5/2006 Chu et al.
2006/0095790 A1 5/2006 Nguyen et al.
2006/0095846 A1 5/2006 Nurmi
2006/0095848 A1 5/2006 Naik
2006/0097991 A1 5/2006 Hotelling et al.
2006/0100848 A1 5/2006 Cozzi et al.
2006/0100849 A1 5/2006 Chan
2006/0101354 A1 5/2006 Hashimoto et al.
2006/0103633 A1 5/2006 Gioeli
2006/0106592 A1 5/2006 Brockett et al.
2006/0106594 A1 5/2006 Brockett et al.
2006/0106595 A1 5/2006 Brockett et al.
2006/0111906 A1 5/2006 Cross et al.
2006/0111909 A1 5/2006 Maes et al.
2006/0116874 A1 6/2006 Samuelsson et al.
2006/0116877 A1 6/2006 Pickering et al.
2006/0117002 A1 6/2006 Swen
2006/0119582 A1 6/2006 Ng et al.
2006/0122834 A1 6/2006 Bennett
2006/0122836 A1 6/2006 Cross et al.
2006/0129379 A1 6/2006 Ramsey et al.
2006/0129929 A1 6/2006 Weber et al.
2006/0130006 A1 6/2006 Chitale
2006/0132812 A1 6/2006 Barnes et al.
2006/0135214 A1 6/2006 Zhang et al.
2006/0136213 A1 6/2006 Hirose et al.
2006/0136280 A1 6/2006 Cho et al.
2006/0136352 A1 6/2006 Brun et al.
2006/0141990 A1 6/2006 Zak et al.
2006/0142576 A1 6/2006 Meng et al.
2006/0142993 A1 6/2006 Menendez-Pidal et al.
2006/0143007 A1 6/2006 Koh et al.
2006/0143559 A1 6/2006 Spielberg et al.
2006/0143576 A1 6/2006 Gupta et al.
2006/0148520 A1 7/2006 Baker et al.
2006/0149557 A1 7/2006 Kaneko et al.
2006/0149558 A1 7/2006 Kahn et al.
2006/0150087 A1 7/2006 Cronenberger et al.
2006/0152496 A1 7/2006 Knaven
2006/0153040 A1 7/2006 Girish et al.
2006/0156252 A1 7/2006 Sheshagiri et al.
2006/0156307 A1 7/2006 Kunjithapatham et al.
2006/0161870 A1 7/2006 Hotelling et al.
2006/0161871 A1 7/2006 Hotelling et al.
2006/0161872 A1 7/2006 Rytivaara et al.
2006/0165105 A1 7/2006 Shenfield et al.
2006/0167676 A1 7/2006 Plumb
2006/0168150 A1 7/2006 Naik et al.
2006/0168507 A1 7/2006 Hansen
2006/0168539 A1 7/2006 Hawkins et al.
2006/0172720 A1 8/2006 Islam et al.
2006/0173683 A1 8/2006 Roth et al.
2006/0173684 A1 8/2006 Fischer et al.
2006/0174207 A1 8/2006 Deshpande
2006/0178868 A1 8/2006 Billerey-Mosier
2006/0181519 A1 8/2006 Vernier et al.
2006/0183466 A1 8/2006 Lee et al.
2006/0184886 A1 8/2006 Chung et al.
2006/0187073 A1 8/2006 Lin et al.
2006/0190269 A1 8/2006 Tessel et al.
2006/0190436 A1 8/2006 Richardson et al.
2006/0190577 A1 8/2006 Yamada
2006/0193518 A1 8/2006 Dong
2006/0194181 A1 8/2006 Rosenberg
2006/0195206 A1 8/2006 Moon et al.
2006/0195323 A1 8/2006 Monne et al.
2006/0197753 A1 9/2006 Hotelling
2006/0197755 A1 9/2006 Bawany
2006/0200253 A1 9/2006 Hoffberg et al.
2006/0200342 A1 9/2006 Corston-Oliver et al.
2006/0200347 A1 9/2006 Kim et al.
2006/0205432 A1 9/2006 Hawkins et al.
2006/0206313 A1 9/2006 Xu et al.
2006/0206454 A1 9/2006 Forstall et al.
2006/0206724 A1 9/2006 Schaufele et al.
2006/0212415 A1 9/2006 Backer et al.
2006/0217967 A1 9/2006 Goertzen et al.
2006/0218244 A1 9/2006 Rasmussen et al.
2006/0221738 A1 10/2006 Park et al.
2006/0221788 A1 10/2006 Lindahl et al.
2006/0224570 A1 10/2006 Quiroga et al.
2006/0229802 A1 10/2006 Vertelney et al.
2006/0229870 A1 10/2006 Kobal
2006/0229876 A1 10/2006 Aaron et al.
2006/0230350 A1 10/2006 Baluja
2006/0230410 A1 10/2006 Kurganov et al.
2006/0234680 A1 10/2006 Doulton
2006/0235550 A1 10/2006 Csicsatka et al.
2006/0235700 A1 10/2006 Wong et al.
2006/0235841 A1 10/2006 Betz et al.
2006/0236262 A1 10/2006 Bathiche et al.
2006/0239419 A1 10/2006 Joseph et al.
2006/0239471 A1 10/2006 Mao et al.
2006/0240866 A1 10/2006 Eilts et al.
2006/0241948 A1 10/2006 Abrash et al.
2006/0242190 A1 10/2006 Wnek
2006/0246955 A1 11/2006 Nirhamo et al.
2006/0247931 A1 11/2006 Caskey et al.
2006/0252457 A1 11/2006 Schrager
2006/0253210 A1 11/2006 Rosenberg
2006/0253787 A1 11/2006 Fogg
2006/0256934 A1 11/2006 Mazor
2006/0258376 A1 11/2006 Ewell et al.
2006/0262876 A1 11/2006 LaDue

(56) References Cited

U.S. PATENT DOCUMENTS

2006/0265208 A1 11/2006 Assadollahi
2006/0265503 A1 11/2006 Jones et al.
2006/0265648 A1 11/2006 Rainisto et al.
2006/0271627 A1 11/2006 Szczepanek
2006/0274051 A1 12/2006 Longe et al.
2006/0274905 A1 12/2006 Lindahl et al.
2006/0277031 A1 12/2006 Ramsey et al.
2006/0277058 A1 12/2006 J''maev et al.
2006/0282264 A1 12/2006 Denny et al.
2006/0282415 A1 12/2006 Shibata et al.
2006/0282455 A1 12/2006 Lee et al.
2006/0286527 A1 12/2006 Morel
2006/0287864 A1 12/2006 Pusa et al.
2006/0288024 A1 12/2006 Braica
2006/0291666 A1 12/2006 Ball et al.
2006/0293876 A1 12/2006 Kamatani et al.
2006/0293880 A1 12/2006 Elshishiny et al.
2006/0293886 A1 12/2006 Odell et al.
2006/0293889 A1 12/2006 Kiss et al.
2007/0003026 A1 1/2007 Hodge et al.
2007/0004451 A1 1/2007 C. Anderson
2007/0005849 A1 1/2007 Oliver
2007/0006098 A1 1/2007 Krumm et al.
2007/0011154 A1 1/2007 Musgrove et al.
2007/0014280 A1 1/2007 Cormier et al.
2007/0016563 A1 1/2007 Omoigui
2007/0016865 A1 1/2007 Johnson et al.
2007/0021956 A1 1/2007 Qu et al.
2007/0022380 A1 1/2007 Swartz et al.
2007/0025704 A1 2/2007 Tsukazaki et al.
2007/0026852 A1 2/2007 Logan et al.
2007/0027732 A1 2/2007 Hudgens
2007/0028009 A1 2/2007 Robbin et al.
2007/0030824 A1 2/2007 Ribaudo et al.
2007/0032247 A1 2/2007 Shaffer et al.
2007/0033003 A1 2/2007 Morris
2007/0033005 A1 2/2007 Cristo et al.
2007/0033026 A1 2/2007 Bartosik et al.
2007/0033054 A1 2/2007 Snitkovskiy et al.
2007/0036117 A1 2/2007 Taube et al.
2007/0036286 A1 2/2007 Champlin et al.
2007/0036294 A1 2/2007 Chaudhuri et al.
2007/0038436 A1 2/2007 Cristo et al.
2007/0038609 A1 2/2007 Wu
2007/0040813 A1 2/2007 Kushler et al.
2007/0041361 A1 2/2007 Iso-Sipila
2007/0042812 A1 2/2007 Basir et al.
2007/0043568 A1 2/2007 Dhanakshirur et al.
2007/0043687 A1 2/2007 Bodart et al.
2007/0043820 A1 2/2007 George et al.
2007/0044038 A1 2/2007 Horentrup et al.
2007/0046641 A1 3/2007 Lim
2007/0047719 A1 3/2007 Dhawan et al.
2007/0050184 A1 3/2007 Drucker et al.
2007/0050191 A1 3/2007 Weider et al.
2007/0050393 A1 3/2007 Vogel et al.
2007/0050712 A1 3/2007 Hull et al.
2007/0052586 A1 3/2007 Horstemeyer
2007/0055493 A1 3/2007 Lee
2007/0055508 A1 3/2007 Zhao et al.
2007/0055514 A1 3/2007 Beattie et al.
2007/0055525 A1 3/2007 Kennewick et al.
2007/0055529 A1 3/2007 Kanevsky et al.
2007/0058832 A1 3/2007 Hug et al.
2007/0060107 A1 3/2007 Day
2007/0060118 A1 3/2007 Guyette
2007/0061487 A1 3/2007 Moore et al.
2007/0061712 A1 3/2007 Bodin et al.
2007/0061754 A1 3/2007 Ardhanari et al.
2007/0067173 A1 3/2007 Bellegarda
2007/0067272 A1 3/2007 Flynt et al.
2007/0073540 A1 3/2007 Hirakawa et al.
2007/0073541 A1 3/2007 Tian
2007/0073745 A1 3/2007 Scott et al.
2007/0074131 A1 3/2007 Assadollahi et al.
2007/0075965 A1 4/2007 Huppi et al.
2007/0079027 A1 4/2007 Marriott et al.
2007/0080936 A1 4/2007 Tsuk et al.
2007/0083467 A1 4/2007 Lindahl et al.
2007/0083623 A1 4/2007 Nishimura et al.
2007/0088556 A1 4/2007 Andrew
2007/0089132 A1 4/2007 Qureshey et al.
2007/0089135 A1 4/2007 Qureshey et al.
2007/0093277 A1 4/2007 Cavacuiti et al.
2007/0094026 A1 4/2007 Ativanichayaphong et al.
2007/0098195 A1 5/2007 Holmes
2007/0100206 A1 5/2007 Lin et al.
2007/0100602 A1 5/2007 Kim
2007/0100619 A1 5/2007 Purho et al.
2007/0100624 A1 5/2007 Weng et al.
2007/0100635 A1 5/2007 Mahajan et al.
2007/0100709 A1 5/2007 Lee et al.
2007/0100790 A1 5/2007 Cheyer et al.
2007/0100814 A1 5/2007 Lee et al.
2007/0100883 A1 5/2007 Rose et al.
2007/0106491 A1 5/2007 Carter et al.
2007/0106497 A1 5/2007 Ramsey et al.
2007/0106512 A1 5/2007 Acero et al.
2007/0106513 A1 5/2007 Boillot et al.
2007/0106657 A1 5/2007 Brzeski et al.
2007/0106674 A1 5/2007 Agrawal et al.
2007/0106685 A1 5/2007 Houh et al.
2007/0112562 A1 5/2007 Vainio et al.
2007/0116195 A1 5/2007 Thompson et al.
2007/0118351 A1 5/2007 Sumita
2007/0118377 A1 5/2007 Badino et al.
2007/0118378 A1 5/2007 Skuratovsky
2007/0121846 A1 5/2007 Altberg et al.
2007/0124131 A1 5/2007 Chino et al.
2007/0124132 A1 5/2007 Takeuchi et al.
2007/0124149 A1 5/2007 Shen et al.
2007/0124291 A1 5/2007 Hassan et al.
2007/0124676 A1 5/2007 Amundsen et al.
2007/0127888 A1 6/2007 Hayashi et al.
2007/0128777 A1 6/2007 Yin et al.
2007/0129059 A1 6/2007 Nadarajah et al.
2007/0130014 A1 6/2007 Altberg et al.
2007/0130128 A1 6/2007 Garg et al.
2007/0132738 A1 6/2007 Lowles et al.
2007/0133771 A1 6/2007 Stifelman et al.
2007/0135187 A1 6/2007 Kreiner et al.
2007/0135949 A1 6/2007 Snover et al.
2007/0136064 A1 6/2007 Carroll
2007/0136778 A1 6/2007 Birger et al.
2007/0143163 A1 6/2007 Weiss et al.
2007/0149252 A1 6/2007 Jobs et al.
2007/0150289 A1* 6/2007 Sakuramoto ............ G10L 15/22
704/275
2007/0150403 A1 6/2007 Mock et al.
2007/0150444 A1 6/2007 Chesnais et al.
2007/0150842 A1 6/2007 Chaudhri et al.
2007/0152978 A1 7/2007 Kocienda et al.
2007/0152980 A1 7/2007 Kocienda et al.
2007/0155346 A1 7/2007 Mijatovic et al.
2007/0156410 A1 7/2007 Stohr et al.
2007/0156627 A1 7/2007 D'Alicandro
2007/0157089 A1 7/2007 Van Os et al.
2007/0157268 A1 7/2007 Girish et al.
2007/0162274 A1 7/2007 Ruiz et al.
2007/0162296 A1 7/2007 Altberg et al.
2007/0162414 A1 7/2007 Horowitz et al.
2007/0165003 A1 7/2007 Fux et al.
2007/0167136 A1 7/2007 Groth
2007/0168922 A1 7/2007 Kaiser et al.
2007/0173233 A1 7/2007 Vander Veen et al.
2007/0173267 A1 7/2007 Klassen et al.
2007/0174057 A1 7/2007 Genly
2007/0174188 A1 7/2007 Fish
2007/0174350 A1 7/2007 Pell et al.
2007/0174396 A1 7/2007 Kumar et al.
2007/0179776 A1 8/2007 Segond et al.
2007/0179778 A1 8/2007 Gong et al.
2007/0180383 A1 8/2007 Naik
2007/0182595 A1 8/2007 Ghasabian

(56) References Cited

U.S. PATENT DOCUMENTS

2007/0185551 A1 8/2007 Meadows et al.
2007/0185754 A1 8/2007 Schmidt
2007/0185831 A1 8/2007 Churcher
2007/0185917 A1 8/2007 Prahlad et al.
2007/0188901 A1 8/2007 Heckerman et al.
2007/0192026 A1 8/2007 Lee et al.
2007/0192027 A1 8/2007 Lee et al.
2007/0192105 A1 8/2007 Neeracher et al.
2007/0192179 A1 8/2007 Van et al.
2007/0192293 A1 8/2007 Swen
2007/0192403 A1 8/2007 Heine et al.
2007/0192744 A1 8/2007 Reponen
2007/0198267 A1 8/2007 Jones et al.
2007/0198269 A1 8/2007 Braho et al.
2007/0198273 A1 8/2007 Hennecke
2007/0198566 A1 8/2007 Sustik
2007/0203955 A1 8/2007 Pomerantz
2007/0207785 A1 9/2007 Chatterjee et al.
2007/0208555 A1 9/2007 Blass et al.
2007/0208569 A1 9/2007 Subramanian et al.
2007/0208579 A1 9/2007 Peterson
2007/0208726 A1 9/2007 Krishnaprasad et al.
2007/0211071 A1 9/2007 Slotznick et al.
2007/0213099 A1 9/2007 Bast
2007/0213857 A1 9/2007 Bodin et al.
2007/0213984 A1 9/2007 Ativanichayaphong et al.
2007/0217693 A1 9/2007 Kretzschmar, Jr.
2007/0219645 A1 9/2007 Thomas et al.
2007/0219777 A1 9/2007 Chu et al.
2007/0219801 A1 9/2007 Sundaram et al.
2007/0219803 A1 9/2007 Chiu et al.
2007/0219983 A1 9/2007 Fish
2007/0225980 A1 9/2007 Sumita
2007/0225984 A1 9/2007 Milstein et al.
2007/0226652 A1 9/2007 Kikuchi et al.
2007/0229323 A1 10/2007 Plachta et al.
2007/0230729 A1 10/2007 Naylor et al.
2007/0233484 A1 10/2007 Coelho et al.
2007/0233487 A1 10/2007 Cohen et al.
2007/0233490 A1 10/2007 Yao
2007/0233497 A1 10/2007 Paek et al.
2007/0233692 A1 10/2007 Lisa et al.
2007/0233725 A1 10/2007 Michmerhuizen et al.
2007/0238488 A1 10/2007 Scott
2007/0238489 A1 10/2007 Scott
2007/0238520 A1 10/2007 Kacmarcik
2007/0239429 A1 10/2007 Johnson et al.
2007/0239453 A1 10/2007 Peek et al.
2007/0240043 A1 10/2007 Fux et al.
2007/0240044 A1 10/2007 Fux et al.
2007/0240045 A1 10/2007 Fux et al.
2007/0241885 A1 10/2007 Clipsham et al.
2007/0244702 A1 10/2007 Kahn et al.
2007/0244976 A1 10/2007 Carroll et al.
2007/0247441 A1 10/2007 Kim et al.
2007/0255435 A1 11/2007 Cohen et al.
2007/0255979 A1 11/2007 Deily et al.
2007/0257890 A1 11/2007 Hotelling et al.
2007/0258642 A1 11/2007 Thota
2007/0260460 A1 11/2007 Hyatt
2007/0260595 A1 11/2007 Beatty et al.
2007/0260822 A1 11/2007 Adams
2007/0261080 A1 11/2007 Saetti
2007/0265831 A1 11/2007 Dinur et al.
2007/0265850 A1 11/2007 Kennewick et al.
2007/0271104 A1 11/2007 McKay
2007/0271510 A1 11/2007 Grigoriu et al.
2007/0274468 A1 11/2007 Cai
2007/0276651 A1 11/2007 Bliss et al.
2007/0276714 A1 11/2007 Beringer
2007/0276810 A1 11/2007 Rosen
2007/0277088 A1 11/2007 Bodin et al.
2007/0282595 A1 12/2007 Tunning et al.
2007/0285958 A1 12/2007 Platchta et al.
2007/0286363 A1 12/2007 Burg et al.
2007/0286399 A1 12/2007 Ramamoorthy et al.
2007/0288238 A1 12/2007 Hetherington et al.
2007/0288241 A1 12/2007 Cross et al.
2007/0288449 A1 12/2007 Datta et al.
2007/0291108 A1 12/2007 Huber et al.
2007/0294077 A1 12/2007 Narayanan et al.
2007/0294083 A1 12/2007 Bellegarda et al.
2007/0294199 A1 12/2007 Nelken et al.
2007/0294263 A1 12/2007 Punj et al.
2007/0299664 A1 12/2007 Peters et al.
2007/0299831 A1 12/2007 Williams et al.
2007/0300140 A1 12/2007 Makela et al.
2008/0001785 A1 1/2008 Elizarov et al.
2008/0010050 A1 1/2008 Fux et al.
2008/0010355 A1 1/2008 Vieri et al.
2008/0010605 A1 1/2008 Frank et al.
2008/0012950 A1 1/2008 Lee et al.
2008/0013751 A1 1/2008 Hiselius
2008/0015863 A1 1/2008 Agapi et al.
2008/0015864 A1 1/2008 Ross et al.
2008/0016575 A1 1/2008 Vincent et al.
2008/0021708 A1 1/2008 Bennett et al.
2008/0021886 A1 1/2008 Wang-Aryattanwanich et al.
2008/0022208 A1 1/2008 Morse
2008/0027711 A1 1/2008 Rajendran et al.
2008/0027726 A1 1/2008 Hansen et al.
2008/0031475 A1 2/2008 Goldstein
2008/0033719 A1 2/2008 Hall et al.
2008/0033723 A1 2/2008 Jang et al.
2008/0034032 A1 2/2008 Healey et al.
2008/0034044 A1 2/2008 Bhakta et al.
2008/0036743 A1 2/2008 Westerman et al.
2008/0040339 A1 2/2008 Zhou et al.
2008/0042970 A1 2/2008 Liang et al.
2008/0043936 A1 2/2008 Liebermann
2008/0043943 A1 2/2008 Sipher et al.
2008/0046239 A1 2/2008 Boo
2008/0046250 A1 2/2008 Agapi et al.
2008/0046422 A1 2/2008 Lee et al.
2008/0046820 A1 2/2008 Lee et al.
2008/0046948 A1 2/2008 Verosub
2008/0048908 A1 2/2008 Sato
2008/0050027 A1 2/2008 Bashyam et al.
2008/0052063 A1 2/2008 Bennett et al.
2008/0052073 A1 2/2008 Goto et al.
2008/0052077 A1 2/2008 Bennett et al.
2008/0052080 A1 2/2008 Narayanan et al.
2008/0052262 A1 2/2008 Kosinov et al.
2008/0055194 A1 3/2008 Baudino et al.
2008/0056459 A1 3/2008 Vallier et al.
2008/0056579 A1 3/2008 Guha
2008/0057922 A1 3/2008 Kokes et al.
2008/0059190 A1 3/2008 Chu et al.
2008/0059200 A1 3/2008 Puli
2008/0059876 A1 3/2008 Hantler et al.
2008/0062141 A1 3/2008 Chaudhri
2008/0065382 A1 3/2008 Gerl et al.
2008/0065387 A1 3/2008 Cross et al.
2008/0071529 A1 3/2008 Silverman et al.
2008/0071544 A1 3/2008 Beaufays et al.
2008/0071742 A1 3/2008 Yang et al.
2008/0072143 A1 3/2008 Assadollahi
2008/0075296 A1 3/2008 Lindahl et al.
2008/0076972 A1 3/2008 Dorogusker et al.
2008/0077310 A1 3/2008 Murlidar et al.
2008/0077384 A1 3/2008 Agapi et al.
2008/0077386 A1 3/2008 Gao et al.
2008/0077391 A1 3/2008 Chino et al.
2008/0077393 A1 3/2008 Gao et al.
2008/0077406 A1 3/2008 Ganong, III
2008/0077859 A1 3/2008 Schabes et al.
2008/0079566 A1 4/2008 Singh et al.
2008/0080411 A1 4/2008 Cole
2008/0082332 A1 4/2008 Mallett et al.
2008/0082338 A1 4/2008 O''Neil et al.
2008/0082390 A1 4/2008 Hawkins et al.
2008/0082576 A1 4/2008 Bodin et al.
2008/0082651 A1 4/2008 Singh et al.
2008/0084974 A1 4/2008 Dhanakshirur

(56) References Cited

U.S. PATENT DOCUMENTS

2008/0085689 A1 4/2008 Zellner
2008/0091406 A1 4/2008 Baldwin et al.
2008/0091426 A1 4/2008 Rempel et al.
2008/0091428 A1 4/2008 Bellegarda
2008/0091443 A1 4/2008 Strope et al.
2008/0096531 A1 4/2008 Mcquaide et al.
2008/0096533 A1 4/2008 Manfredi et al.
2008/0096726 A1 4/2008 Riley et al.
2008/0097937 A1 4/2008 Hadjarian
2008/0098302 A1 4/2008 Roose
2008/0098480 A1 4/2008 Henry et al.
2008/0100579 A1 5/2008 Robinson et al.
2008/0101584 A1 5/2008 Gray et al.
2008/0103774 A1 5/2008 White
2008/0109222 A1 5/2008 Liu
2008/0109402 A1 5/2008 Wang et al.
2008/0114480 A1 5/2008 Harb
2008/0114598 A1 5/2008 Prieto et al.
2008/0114604 A1 5/2008 Wei et al.
2008/0114841 A1 5/2008 Lambert
2008/0115084 A1 5/2008 Scott et al.
2008/0118143 A1 5/2008 Gordon et al.
2008/0119953 A1 5/2008 Reed
2008/0120102 A1 5/2008 Rao
2008/0120112 A1 5/2008 Jordan et al.
2008/0120196 A1 5/2008 Reed et al.
2008/0120311 A1 5/2008 Reed
2008/0120312 A1 5/2008 Reed
2008/0120330 A1 5/2008 Reed
2008/0120342 A1 5/2008 Reed et al.
2008/0122796 A1 5/2008 Jobs et al.
2008/0124695 A1 5/2008 Myers et al.
2008/0126075 A1 5/2008 Thorn et al.
2008/0126077 A1 5/2008 Thorn
2008/0126091 A1 5/2008 Clark et al.
2008/0126093 A1 5/2008 Sivadas
2008/0126100 A1 5/2008 Grost et al.
2008/0126491 A1 5/2008 Portele et al.
2008/0129520 A1 6/2008 Lee
2008/0130867 A1 6/2008 Bowen
2008/0131006 A1 6/2008 Oliver
2008/0132221 A1 6/2008 Willey et al.
2008/0132295 A1 6/2008 Horowitz
2008/0133215 A1 6/2008 Sarukkai
2008/0133228 A1 6/2008 Rao
2008/0133230 A1 6/2008 Herforth et al.
2008/0133241 A1 6/2008 Baker et al.
2008/0133245 A1 6/2008 Proulx et al.
2008/0133479 A1 6/2008 Zelevinsky et al.
2008/0133956 A1 6/2008 Fadell
2008/0140413 A1 6/2008 Millman et al.
2008/0140415 A1 6/2008 Shostak
2008/0140416 A1 6/2008 Shostak
2008/0140652 A1 6/2008 Millman et al.
2008/0140657 A1 6/2008 Azvine et al.
2008/0140702 A1 6/2008 Reed et al.
2008/0141125 A1 6/2008 Ghassabian et al.
2008/0141180 A1 6/2008 Reed et al.
2008/0141182 A1 6/2008 Barsness et al.
2008/0146245 A1 6/2008 Appaji
2008/0146290 A1 6/2008 Sreeram et al.
2008/0147408 A1 6/2008 Da Palma et al.
2008/0147411 A1 6/2008 Dames et al.
2008/0147874 A1 6/2008 Yoneda et al.
2008/0150900 A1 6/2008 Han
2008/0154577 A1 6/2008 Kim et al.
2008/0154599 A1 6/2008 Muschett et al.
2008/0154600 A1 6/2008 Tian et al.
2008/0154603 A1 6/2008 Oddo
2008/0154612 A1 6/2008 Evermann et al.
2008/0154828 A1 6/2008 Antebi et al.
2008/0157867 A1 7/2008 Krah
2008/0161113 A1 7/2008 Hansen et al.
2008/0162120 A1 7/2008 Mactavish et al.
2008/0162137 A1 7/2008 Saitoh et al.
2008/0162471 A1 7/2008 Bernard
2008/0163119 A1 7/2008 Kim et al.
2008/0163131 A1 7/2008 Hirai et al.
2008/0165144 A1 7/2008 Forstall et al.
2008/0165980 A1 7/2008 Pavlovic et al.
2008/0165994 A1 7/2008 Caren et al.
2008/0167013 A1 7/2008 Novick et al.
2008/0167858 A1 7/2008 Christie et al.
2008/0167876 A1 7/2008 Bakis et al.
2008/0168052 A1 7/2008 Ott et al.
2008/0168144 A1 7/2008 Lee
2008/0168366 A1 7/2008 Kocienda et al.
2008/0172698 A1 7/2008 Berger et al.
2008/0183473 A1 7/2008 Nagano et al.
2008/0186960 A1 8/2008 Kocheisen et al.
2008/0189099 A1 8/2008 Friedman et al.
2008/0189106 A1 8/2008 Low et al.
2008/0189110 A1 8/2008 Freeman et al.
2008/0189114 A1 8/2008 Fail et al.
2008/0189360 A1 8/2008 Kiley et al.
2008/0189606 A1 8/2008 Rybak
2008/0195312 A1 8/2008 Aaron et al.
2008/0195388 A1 8/2008 Bower et al.
2008/0195391 A1 8/2008 Marple et al.
2008/0195601 A1 8/2008 Ntoulas et al.
2008/0195630 A1 8/2008 Exartier et al.
2008/0195940 A1 8/2008 Gail et al.
2008/0200142 A1 8/2008 Abdel-Kader et al.
2008/0201000 A1 8/2008 Heikkila et al.
2008/0201306 A1 8/2008 Cooper et al.
2008/0201375 A1 8/2008 Khedouri et al.
2008/0201434 A1 8/2008 Holmes et al.
2008/0204379 A1 8/2008 Perez-Noguera
2008/0207176 A1 8/2008 Brackbill et al.
2008/0208585 A1 8/2008 Ativanichayaphong et al.
2008/0208587 A1 8/2008 Ben-David et al.
2008/0208864 A1 8/2008 Cucerzan et al.
2008/0212796 A1 9/2008 Denda
2008/0219641 A1 9/2008 Sandrew et al.
2008/0221866 A1 9/2008 Katragadda et al.
2008/0221879 A1 9/2008 Cerra et al.
2008/0221880 A1 9/2008 Cerra et al.
2008/0221887 A1 9/2008 Rose et al.
2008/0221889 A1 9/2008 Cerra et al.
2008/0221903 A1 9/2008 Kanevsky et al.
2008/0222118 A1 9/2008 Scian et al.
2008/0226130 A1 9/2008 Kansal et al.
2008/0228463 A1 9/2008 Mori et al.
2008/0228485 A1 9/2008 Owen
2008/0228490 A1 9/2008 Fischer et al.
2008/0228495 A1 9/2008 Cross et al.
2008/0228496 A1 9/2008 Yu et al.
2008/0228928 A1 9/2008 Donelli et al.
2008/0229185 A1 9/2008 Lynch
2008/0229218 A1 9/2008 Maeng
2008/0235017 A1 9/2008 Satomura et al.
2008/0235023 A1 9/2008 Kennewick et al.
2008/0235024 A1 9/2008 Goldberg et al.
2008/0235027 A1 9/2008 Cross
2008/0240569 A1 10/2008 Tonouchi
2008/0242280 A1 10/2008 Shapiro et al.
2008/0242322 A1 10/2008 Scott et al.
2008/0242363 A1 10/2008 Onda et al.
2008/0243501 A1 10/2008 Hafsteinsson et al.
2008/0243834 A1 10/2008 Rieman et al.
2008/0244390 A1 10/2008 Fux et al.
2008/0244446 A1 10/2008 Lefevre et al.
2008/0247519 A1 10/2008 Abella et al.
2008/0247529 A1 10/2008 Barton et al.
2008/0248797 A1 10/2008 Freeman et al.
2008/0249770 A1 10/2008 Kim et al.
2008/0249778 A1 10/2008 Barton et al.
2008/0253577 A1 10/2008 Eppolito
2008/0254419 A1 10/2008 Cohen
2008/0254425 A1 10/2008 Cohen et al.
2008/0255837 A1 10/2008 Kahn et al.
2008/0255842 A1 10/2008 Simhi et al.
2008/0255845 A1 10/2008 Bennett
2008/0255852 A1 10/2008 Hu

(56) References Cited

U.S. PATENT DOCUMENTS

| | | | |
|---|---|---|---|
| 2008/0256613 | A1 | 10/2008 | Grover |
| 2008/0259022 | A1 | 10/2008 | Mansfield et al. |
| 2008/0261572 | A1 | 10/2008 | Tsui et al. |
| 2008/0262828 | A1 | 10/2008 | Och et al. |
| 2008/0262838 | A1 | 10/2008 | Nurminen et al. |
| 2008/0262846 | A1 | 10/2008 | Burns et al. |
| 2008/0263139 | A1 | 10/2008 | Martin |
| 2008/0267416 | A1 | 10/2008 | Goldstein et al. |
| 2008/0270118 | A1 | 10/2008 | Kuo et al. |
| 2008/0270138 | A1 | 10/2008 | Knight et al. |
| 2008/0270139 | A1 | 10/2008 | Shi et al. |
| 2008/0270140 | A1 | 10/2008 | Hertz et al. |
| 2008/0270151 | A1 | 10/2008 | Mahoney et al. |
| 2008/0270344 | A1 | 10/2008 | Yurick et al. |
| 2008/0273672 | A1 | 11/2008 | Didcock et al. |
| 2008/0277473 | A1 | 11/2008 | Kotlarsky et al. |
| 2008/0281510 | A1 | 11/2008 | Shahine |
| 2008/0281582 | A1 | 11/2008 | Hsu et al. |
| 2008/0288259 | A1 | 11/2008 | Chambers et al. |
| 2008/0288460 | A1 | 11/2008 | Poniatowski et al. |
| 2008/0292112 | A1 | 11/2008 | Valenzuela et al. |
| 2008/0294418 | A1 | 11/2008 | Cleary et al. |
| 2008/0294517 | A1 | 11/2008 | Hill |
| 2008/0294651 | A1 | 11/2008 | Masuyama et al. |
| 2008/0294981 | A1 | 11/2008 | Balzano et al. |
| 2008/0298563 | A1 | 12/2008 | Rondeau et al. |
| 2008/0298766 | A1 | 12/2008 | Wen et al. |
| 2008/0299523 | A1 | 12/2008 | Chai et al. |
| 2008/0300857 | A1 | 12/2008 | Barbaiani et al. |
| 2008/0300871 | A1 | 12/2008 | Gilbert |
| 2008/0300877 | A1 | 12/2008 | Gilbert et al. |
| 2008/0300878 | A1 | 12/2008 | Bennett |
| 2008/0301567 | A1 | 12/2008 | Martin et al. |
| 2008/0303645 | A1 | 12/2008 | Seymour et al. |
| 2008/0306727 | A1 | 12/2008 | Thurmair et al. |
| 2008/0312909 | A1 | 12/2008 | Hermansen et al. |
| 2008/0312928 | A1 | 12/2008 | Goebel et al. |
| 2008/0313335 | A1 | 12/2008 | Jung et al. |
| 2008/0316183 | A1 | 12/2008 | Westerman et al. |
| 2008/0319735 | A1 | 12/2008 | Kambhatla et al. |
| 2008/0319738 | A1 | 12/2008 | Liu et al. |
| 2008/0319753 | A1 | 12/2008 | Hancock |
| 2008/0319763 | A1 | 12/2008 | Di Fabbrizio et al. |
| 2008/0319783 | A1 | 12/2008 | Yao et al. |
| 2009/0003115 | A1 | 1/2009 | Lindahl et al. |
| 2009/0005012 | A1 | 1/2009 | Van Heugten |
| 2009/0005891 | A1 | 1/2009 | Batson et al. |
| 2009/0006096 | A1 | 1/2009 | Li et al. |
| 2009/0006097 | A1 | 1/2009 | Etezadi et al. |
| 2009/0006099 | A1 | 1/2009 | Sharpe et al. |
| 2009/0006100 | A1 | 1/2009 | Badger et al. |
| 2009/0006343 | A1 | 1/2009 | Platt et al. |
| 2009/0006345 | A1 | 1/2009 | Platt et al. |
| 2009/0006488 | A1 | 1/2009 | Lindahl et al. |
| 2009/0006671 | A1 | 1/2009 | Batson et al. |
| 2009/0007001 | A1 | 1/2009 | Morin et al. |
| 2009/0011709 | A1 | 1/2009 | Akasaka et al. |
| 2009/0012748 | A1 | 1/2009 | Beish et al. |
| 2009/0012775 | A1 | 1/2009 | El Hady et al. |
| 2009/0018828 | A1 | 1/2009 | Nakadai et al. |
| 2009/0018829 | A1 | 1/2009 | Kuperstein |
| 2009/0018834 | A1 | 1/2009 | Cooper et al. |
| 2009/0018835 | A1 | 1/2009 | Cooper et al. |
| 2009/0018839 | A1 | 1/2009 | Cooper et al. |
| 2009/0018840 | A1 | 1/2009 | Lutz et al. |
| 2009/0022329 | A1 | 1/2009 | Mahowald |
| 2009/0024595 | A1 | 1/2009 | Chen |
| 2009/0028435 | A1 | 1/2009 | Wu et al. |
| 2009/0030800 | A1 | 1/2009 | Grois |
| 2009/0030978 | A1 | 1/2009 | Johnson et al. |
| 2009/0043580 | A1 | 2/2009 | Mozer et al. |
| 2009/0043583 | A1 | 2/2009 | Agapi et al. |
| 2009/0043763 | A1 | 2/2009 | Peng |
| 2009/0044094 | A1 | 2/2009 | Rapp et al. |
| 2009/0048821 | A1 | 2/2009 | Yam et al. |
| 2009/0048841 | A1 | 2/2009 | Pollet et al. |
| 2009/0048845 | A1 | 2/2009 | Burckart et al. |
| 2009/0049067 | A1 | 2/2009 | Murray |
| 2009/0054046 | A1* | 2/2009 | Whittington ...... H04M 3/42178 455/418 |
| 2009/0055168 | A1 | 2/2009 | Wu et al. |
| 2009/0055175 | A1 | 2/2009 | Terrell et al. |
| 2009/0055179 | A1 | 2/2009 | Cho et al. |
| 2009/0055186 | A1 | 2/2009 | Lance et al. |
| 2009/0055380 | A1 | 2/2009 | Peng et al. |
| 2009/0055381 | A1 | 2/2009 | Wu et al. |
| 2009/0055648 | A1 | 2/2009 | Kim et al. |
| 2009/0058823 | A1 | 3/2009 | Kocienda |
| 2009/0058860 | A1 | 3/2009 | Fong et al. |
| 2009/0060351 | A1 | 3/2009 | Li et al. |
| 2009/0060472 | A1 | 3/2009 | Bull et al. |
| 2009/0063974 | A1 | 3/2009 | Bull et al. |
| 2009/0064031 | A1 | 3/2009 | Bull et al. |
| 2009/0070097 | A1 | 3/2009 | Wu et al. |
| 2009/0070102 | A1 | 3/2009 | Maegawa |
| 2009/0070109 | A1 | 3/2009 | Didcock et al. |
| 2009/0070114 | A1 | 3/2009 | Staszak |
| 2009/0074214 | A1 | 3/2009 | Bradford et al. |
| 2009/0076792 | A1 | 3/2009 | Lawson-Tancred |
| 2009/0076796 | A1 | 3/2009 | Daraselia |
| 2009/0076798 | A1 | 3/2009 | Oh et al. |
| 2009/0076819 | A1 | 3/2009 | Wouters et al. |
| 2009/0076821 | A1 | 3/2009 | Brenner et al. |
| 2009/0076825 | A1 | 3/2009 | Bradford et al. |
| 2009/0077165 | A1 | 3/2009 | Rhodes et al. |
| 2009/0077464 | A1 | 3/2009 | Goldsmith et al. |
| 2009/0079622 | A1 | 3/2009 | Seshadri et al. |
| 2009/0083034 | A1 | 3/2009 | Hernandez et al. |
| 2009/0083035 | A1 | 3/2009 | Huang et al. |
| 2009/0083036 | A1 | 3/2009 | Zhao et al. |
| 2009/0083037 | A1 | 3/2009 | Gleason et al. |
| 2009/0083047 | A1 | 3/2009 | Lindahl et al. |
| 2009/0089058 | A1 | 4/2009 | Bellegarda |
| 2009/0091537 | A1 | 4/2009 | Huang et al. |
| 2009/0092239 | A1 | 4/2009 | Macwan et al. |
| 2009/0092260 | A1 | 4/2009 | Powers |
| 2009/0092261 | A1 | 4/2009 | Bard |
| 2009/0092262 | A1 | 4/2009 | Costa et al. |
| 2009/0094029 | A1 | 4/2009 | Koch et al. |
| 2009/0094033 | A1 | 4/2009 | Mozer et al. |
| 2009/0097634 | A1 | 4/2009 | Nambiar et al. |
| 2009/0097637 | A1 | 4/2009 | Boscher et al. |
| 2009/0098903 | A1 | 4/2009 | Donaldson et al. |
| 2009/0100049 | A1 | 4/2009 | Cao |
| 2009/0100454 | A1 | 4/2009 | Weber |
| 2009/0104898 | A1 | 4/2009 | Harris |
| 2009/0106026 | A1 | 4/2009 | Ferrieux |
| 2009/0106376 | A1 | 4/2009 | Tom et al. |
| 2009/0106397 | A1 | 4/2009 | O'Keefe |
| 2009/0112572 | A1 | 4/2009 | Thorn |
| 2009/0112576 | A1 | 4/2009 | Jackson et al. |
| 2009/0112592 | A1 | 4/2009 | Candelore et al. |
| 2009/0112677 | A1 | 4/2009 | Rhett |
| 2009/0112892 | A1 | 4/2009 | Cardie et al. |
| 2009/0119587 | A1 | 5/2009 | Allen et al. |
| 2009/0123021 | A1 | 5/2009 | Jung et al. |
| 2009/0123071 | A1 | 5/2009 | Iwasaki |
| 2009/0125477 | A1 | 5/2009 | Lu et al. |
| 2009/0125602 | A1 | 5/2009 | Bhatia et al. |
| 2009/0125947 | A1 | 5/2009 | Ibaraki |
| 2009/0128505 | A1 | 5/2009 | Partridge et al. |
| 2009/0132253 | A1 | 5/2009 | Bellegarda |
| 2009/0132255 | A1 | 5/2009 | Lu |
| 2009/0137286 | A1 | 5/2009 | Luke et al. |
| 2009/0138263 | A1 | 5/2009 | Shozakai et al. |
| 2009/0138430 | A1 | 5/2009 | Nambiar et al. |
| 2009/0138736 | A1 | 5/2009 | Chin |
| 2009/0138828 | A1 | 5/2009 | Schultz et al. |
| 2009/0144036 | A1 | 6/2009 | Jorgensen et al. |
| 2009/0144049 | A1 | 6/2009 | Haddad et al. |
| 2009/0144428 | A1 | 6/2009 | Bowater et al. |
| 2009/0144609 | A1 | 6/2009 | Liang et al. |
| 2009/0146848 | A1 | 6/2009 | Ghassabian |
| 2009/0150147 | A1 | 6/2009 | Jacoby et al. |

(56) References Cited

U.S. PATENT DOCUMENTS

2009/0150156 A1 6/2009 Kennewick et al.
2009/0152349 A1 6/2009 Bonev et al.
2009/0153288 A1 6/2009 Hope et al.
2009/0154669 A1 6/2009 Wood et al.
2009/0157382 A1 6/2009 Bar
2009/0157384 A1 6/2009 Toutanova et al.
2009/0157401 A1 6/2009 Bennett
2009/0158200 A1 6/2009 Palahnuk et al.
2009/0158323 A1 6/2009 Bober et al.
2009/0158423 A1 6/2009 Orlassino et al.
2009/0160803 A1 6/2009 Hashimoto
2009/0163243 A1 6/2009 Barbera
2009/0164301 A1 6/2009 O'Sullivan et al.
2009/0164441 A1 6/2009 Cheyer
2009/0164655 A1 6/2009 Pettersson et al.
2009/0164937 A1 6/2009 Alviar et al.
2009/0167508 A1 7/2009 Fadell et al.
2009/0167509 A1 7/2009 Fadell et al.
2009/0171578 A1 7/2009 Kim et al.
2009/0171662 A1 7/2009 Huang et al.
2009/0171664 A1 7/2009 Kennewick et al.
2009/0172108 A1 7/2009 Singh
2009/0172542 A1 7/2009 Girish et al.
2009/0174667 A1 7/2009 Kocienda et al.
2009/0174677 A1 7/2009 Gehani et al.
2009/0177300 A1 7/2009 Lee
2009/0177461 A1 7/2009 Ehsani et al.
2009/0177966 A1 7/2009 Chaudhri
2009/0182445 A1 7/2009 Girish et al.
2009/0182549 A1 7/2009 Anisimovich et al.
2009/0182702 A1 7/2009 Miller
2009/0183070 A1 7/2009 Robbins
2009/0187402 A1 7/2009 Scholl
2009/0187577 A1 7/2009 Reznik et al.
2009/0187950 A1 7/2009 Nicas et al.
2009/0190774 A1 7/2009 Wang et al.
2009/0191895 A1 7/2009 Singh et al.
2009/0192782 A1 7/2009 Drewes
2009/0192787 A1 7/2009 Roon
2009/0192798 A1 7/2009 Basson et al.
2009/0198497 A1 8/2009 Kwon
2009/0204402 A1 8/2009 Marhawa et al.
2009/0204409 A1 8/2009 Mozer et al.
2009/0204478 A1 8/2009 Kaib et al.
2009/0204596 A1 8/2009 Brun et al.
2009/0204601 A1 8/2009 Grasset
2009/0204620 A1 8/2009 Thione et al.
2009/0210230 A1 8/2009 Schwarz et al.
2009/0210232 A1 8/2009 Sanchez et al.
2009/0213134 A1 8/2009 Stephanick et al.
2009/0215466 A1 8/2009 Ahl et al.
2009/0215503 A1 8/2009 Zhang et al.
2009/0216396 A1 8/2009 Yamagata
2009/0216528 A1 8/2009 Gemello et al.
2009/0216540 A1 8/2009 Tessel et al.
2009/0216704 A1 8/2009 Zheng et al.
2009/0219166 A1 9/2009 MacFarlane et al.
2009/0221274 A1 9/2009 Venkatakrishnan et al.
2009/0222257 A1 9/2009 Sumita et al.
2009/0222270 A2 9/2009 Likens et al.
2009/0222488 A1 9/2009 Boerries et al.
2009/0225041 A1* 9/2009 Kida .................... G06F 3/0237 345/173
2009/0228126 A1 9/2009 Spielberg et al.
2009/0228273 A1 9/2009 Wang et al.
2009/0228277 A1 9/2009 Bonforte et al.
2009/0228281 A1 9/2009 Singleton et al.
2009/0228439 A1 9/2009 Manolescu et al.
2009/0228792 A1 9/2009 Van Os et al.
2009/0228842 A1 9/2009 Westerman et al.
2009/0233264 A1 9/2009 Rogers et al.
2009/0234638 A1 9/2009 Ranjan et al.
2009/0234651 A1 9/2009 Basir et al.
2009/0234655 A1 9/2009 Kwon
2009/0235280 A1 9/2009 Tannier et al.
2009/0239202 A1 9/2009 Stone
2009/0239552 A1 9/2009 Churchill et al.
2009/0240485 A1 9/2009 Dalal et al.
2009/0241054 A1 9/2009 Hendricks
2009/0241760 A1 10/2009 Georges
2009/0247237 A1 10/2009 Mittleman et al.
2009/0248182 A1 10/2009 Logan et al.
2009/0248395 A1 10/2009 Alewine et al.
2009/0248402 A1 10/2009 Ito et al.
2009/0248420 A1 10/2009 Basir et al.
2009/0248422 A1 10/2009 Li et al.
2009/0248456 A1 10/2009 Fahmy et al.
2009/0249198 A1 10/2009 Davis et al.
2009/0249247 A1 10/2009 Tseng et al.
2009/0252350 A1 10/2009 Seguin
2009/0253457 A1 10/2009 Seguin
2009/0253463 A1 10/2009 Shin et al.
2009/0254339 A1 10/2009 Seguin
2009/0254345 A1 10/2009 Fleizach et al.
2009/0254819 A1 10/2009 Song et al.
2009/0254823 A1 10/2009 Barrett
2009/0259475 A1 10/2009 Yamagami et al.
2009/0259969 A1 10/2009 Pallakoff
2009/0265171 A1 10/2009 Davis
2009/0265368 A1 10/2009 Crider et al.
2009/0271109 A1 10/2009 Lee et al.
2009/0271175 A1 10/2009 Bodin et al.
2009/0271176 A1 10/2009 Bodin et al.
2009/0271178 A1 10/2009 Bodin et al.
2009/0271188 A1 10/2009 Agapi et al.
2009/0271189 A1 10/2009 Agapi et al.
2009/0274315 A1 11/2009 Carnes et al.
2009/0278804 A1 11/2009 Rubanovich et al.
2009/0281789 A1 11/2009 Waibel et al.
2009/0284482 A1 11/2009 Chin
2009/0286514 A1 11/2009 Lichorowic et al.
2009/0287583 A1 11/2009 Holmes
2009/0290718 A1 11/2009 Kahn et al.
2009/0292987 A1 11/2009 Sorenson
2009/0296552 A1 12/2009 Hicks et al.
2009/0298474 A1 12/2009 George
2009/0298529 A1 12/2009 Mahajan
2009/0299745 A1 12/2009 Kennewick et al.
2009/0299849 A1 12/2009 Cao et al.
2009/0300391 A1 12/2009 Jessup et al.
2009/0300488 A1 12/2009 Salamon et al.
2009/0304198 A1 12/2009 Herre et al.
2009/0305203 A1 12/2009 Okumura et al.
2009/0306967 A1 12/2009 Nicolov et al.
2009/0306969 A1 12/2009 Goud et al.
2009/0306979 A1 12/2009 Jaiswal et al.
2009/0306980 A1 12/2009 Shin
2009/0306981 A1 12/2009 Cromack et al.
2009/0306985 A1 12/2009 Roberts et al.
2009/0306988 A1 12/2009 Chen et al.
2009/0306989 A1* 12/2009 Kaji ........................ G10L 15/22 704/270
2009/0307162 A1 12/2009 Bui et al.
2009/0307201 A1 12/2009 Dunning et al.
2009/0307584 A1 12/2009 Davidson et al.
2009/0307594 A1 12/2009 Kosonen et al.
2009/0309352 A1 12/2009 Walker et al.
2009/0313014 A1 12/2009 Shin et al.
2009/0313020 A1 12/2009 Koivunen
2009/0313023 A1 12/2009 Jones
2009/0313026 A1 12/2009 Coffman et al.
2009/0313544 A1 12/2009 Wood et al.
2009/0313564 A1 12/2009 Rottler et al.
2009/0316943 A1 12/2009 Frigola Munoz et al.
2009/0318119 A1 12/2009 Basir et al.
2009/0318198 A1 12/2009 Carroll
2009/0319257 A1 12/2009 Blume et al.
2009/0319266 A1 12/2009 Brown et al.
2009/0319342 A1 12/2009 Shilman et al.
2009/0320126 A1* 12/2009 Harada .................. G06F 21/36 726/18
2009/0326923 A1 12/2009 Yan et al.
2009/0326936 A1 12/2009 Nagashima
2009/0326938 A1 12/2009 Marila et al.

(56) References Cited

U.S. PATENT DOCUMENTS

| | | | |
|---|---|---|---|
| 2009/0326949 A1 | 12/2009 | Douthitt et al. | |
| 2009/0327977 A1 | 12/2009 | Bachfischer et al. | |
| 2010/0004918 A1 | 1/2010 | Lee et al. | |
| 2010/0004930 A1 | 1/2010 | Strope et al. | |
| 2010/0004931 A1 | 1/2010 | Ma et al. | |
| 2010/0005081 A1 | 1/2010 | Bennett | |
| 2010/0010803 A1 | 1/2010 | Ishikawa et al. | |
| 2010/0010814 A1 | 1/2010 | Patel | |
| 2010/0013760 A1 | 1/2010 | Hirai et al. | |
| 2010/0013796 A1 | 1/2010 | Abileah et al. | |
| 2010/0017212 A1 | 1/2010 | Attwater et al. | |
| 2010/0017382 A1 | 1/2010 | Katragadda et al. | |
| 2010/0019834 A1 | 1/2010 | Zerbe et al. | |
| 2010/0023318 A1 | 1/2010 | Lemoine | |
| 2010/0023320 A1 | 1/2010 | Di Cristo et al. | |
| 2010/0023331 A1 | 1/2010 | Duta et al. | |
| 2010/0026526 A1 | 2/2010 | Yokota | |
| 2010/0030549 A1 | 2/2010 | Lee et al. | |
| 2010/0030928 A1 | 2/2010 | Conroy et al. | |
| 2010/0031143 A1 | 2/2010 | Rao et al. | |
| 2010/0031150 A1* | 2/2010 | Andrew | G06F 3/167 715/728 |
| 2010/0036653 A1 | 2/2010 | Kim et al. | |
| 2010/0036655 A1 | 2/2010 | Cecil et al. | |
| 2010/0036660 A1 | 2/2010 | Bennett | |
| 2010/0036928 A1 | 2/2010 | Granito et al. | |
| 2010/0037183 A1 | 2/2010 | Miyashita et al. | |
| 2010/0042400 A1 | 2/2010 | Block et al. | |
| 2010/0042576 A1 | 2/2010 | Roettger et al. | |
| 2010/0046842 A1 | 2/2010 | Conwell et al. | |
| 2010/0049498 A1 | 2/2010 | Cao et al. | |
| 2010/0049514 A1 | 2/2010 | Kennewick et al. | |
| 2010/0050064 A1 | 2/2010 | Liu et al. | |
| 2010/0054512 A1 | 3/2010 | Solum | |
| 2010/0057435 A1 | 3/2010 | Kent et al. | |
| 2010/0057443 A1 | 3/2010 | Di Cristo et al. | |
| 2010/0057457 A1 | 3/2010 | Ogata et al. | |
| 2010/0057461 A1 | 3/2010 | Neubacher et al. | |
| 2010/0057643 A1 | 3/2010 | Yang | |
| 2010/0058200 A1 | 3/2010 | Jablokov et al. | |
| 2010/0060646 A1 | 3/2010 | Unsal et al. | |
| 2010/0063804 A1 | 3/2010 | Sato et al. | |
| 2010/0063825 A1 | 3/2010 | Williams et al. | |
| 2010/0063961 A1 | 3/2010 | Guiheneuf et al. | |
| 2010/0064113 A1 | 3/2010 | Lindahl et al. | |
| 2010/0064218 A1 | 3/2010 | Bull et al. | |
| 2010/0064226 A1 | 3/2010 | Stefaniak et al. | |
| 2010/0066546 A1 | 3/2010 | Aaron | |
| 2010/0066684 A1 | 3/2010 | Shahraray et al. | |
| 2010/0067723 A1 | 3/2010 | Bergmann et al. | |
| 2010/0067867 A1 | 3/2010 | Lin et al. | |
| 2010/0070281 A1 | 3/2010 | Conkie et al. | |
| 2010/0070521 A1 | 3/2010 | Clinchant et al. | |
| 2010/0070899 A1 | 3/2010 | Hunt et al. | |
| 2010/0071003 A1 | 3/2010 | Bychkov et al. | |
| 2010/0076760 A1 | 3/2010 | Kraenzel et al. | |
| 2010/0076993 A1 | 3/2010 | Klawitter et al. | |
| 2010/0077350 A1 | 3/2010 | Lim et al. | |
| 2010/0079501 A1 | 4/2010 | Ikeda et al. | |
| 2010/0080398 A1 | 4/2010 | Waldmann | |
| 2010/0080470 A1 | 4/2010 | Deluca et al. | |
| 2010/0081456 A1 | 4/2010 | Singh et al. | |
| 2010/0081487 A1 | 4/2010 | Chen et al. | |
| 2010/0082286 A1 | 4/2010 | Leung | |
| 2010/0082327 A1 | 4/2010 | Rogers et al. | |
| 2010/0082328 A1 | 4/2010 | Rogers et al. | |
| 2010/0082329 A1 | 4/2010 | Silverman et al. | |
| 2010/0082333 A1 | 4/2010 | Al-Shammari | |
| 2010/0082346 A1 | 4/2010 | Rogers et al. | |
| 2010/0082347 A1 | 4/2010 | Rogers et al. | |
| 2010/0082348 A1 | 4/2010 | Silverman et al. | |
| 2010/0082349 A1 | 4/2010 | Bellegarda et al. | |
| 2010/0082567 A1 | 4/2010 | Rosenblatt et al. | |
| 2010/0082970 A1 | 4/2010 | Lindahl et al. | |
| 2010/0086152 A1 | 4/2010 | Rank et al. | |
| 2010/0086153 A1 | 4/2010 | Hagen et al. | |
| 2010/0086156 A1 | 4/2010 | Rank et al. | |
| 2010/0088020 A1 | 4/2010 | Sano et al. | |
| 2010/0088093 A1 | 4/2010 | Lee et al. | |
| 2010/0088100 A1 | 4/2010 | Lindahl | |
| 2010/0094632 A1 | 4/2010 | Davis et al. | |
| 2010/0098231 A1 | 4/2010 | Wohlert et al. | |
| 2010/0100212 A1 | 4/2010 | Lindahl et al. | |
| 2010/0100384 A1 | 4/2010 | Ju et al. | |
| 2010/0100385 A1 | 4/2010 | Davis et al. | |
| 2010/0100816 A1 | 4/2010 | Mccloskey et al. | |
| 2010/0103776 A1 | 4/2010 | Chan | |
| 2010/0106486 A1 | 4/2010 | Hua et al. | |
| 2010/0106498 A1 | 4/2010 | Morrison et al. | |
| 2010/0106500 A1 | 4/2010 | McKee et al. | |
| 2010/0106503 A1 | 4/2010 | Farrell et al. | |
| 2010/0114856 A1 | 5/2010 | Kuboyama | |
| 2010/0114887 A1 | 5/2010 | Conway et al. | |
| 2010/0121637 A1 | 5/2010 | Roy et al. | |
| 2010/0125456 A1 | 5/2010 | Weng et al. | |
| 2010/0125458 A1 | 5/2010 | Franco et al. | |
| 2010/0125460 A1 | 5/2010 | Mellott et al. | |
| 2010/0125811 A1 | 5/2010 | Moore et al. | |
| 2010/0131269 A1 | 5/2010 | Park et al. | |
| 2010/0131273 A1 | 5/2010 | Aley-Raz et al. | |
| 2010/0131498 A1 | 5/2010 | Linthicum et al. | |
| 2010/0131899 A1 | 5/2010 | Hubert | |
| 2010/0138215 A1 | 6/2010 | Williams | |
| 2010/0138224 A1 | 6/2010 | Bedingfield, Sr. | |
| 2010/0138416 A1 | 6/2010 | Bellotti | |
| 2010/0138680 A1 | 6/2010 | Brisebois et al. | |
| 2010/0138759 A1 | 6/2010 | Roy | |
| 2010/0138798 A1 | 6/2010 | Wilson et al. | |
| 2010/0142740 A1 | 6/2010 | Roerup | |
| 2010/0145694 A1 | 6/2010 | Ju et al. | |
| 2010/0145700 A1 | 6/2010 | Kennewick et al. | |
| 2010/0145707 A1 | 6/2010 | Ljolje et al. | |
| 2010/0146442 A1 | 6/2010 | Nagasaka et al. | |
| 2010/0150321 A1 | 6/2010 | Harris et al. | |
| 2010/0153114 A1 | 6/2010 | Shih et al. | |
| 2010/0153115 A1 | 6/2010 | Klee et al. | |
| 2010/0153448 A1 | 6/2010 | Harpur et al. | |
| 2010/0161311 A1 | 6/2010 | Massuh | |
| 2010/0161313 A1 | 6/2010 | Karttunen | |
| 2010/0161337 A1 | 6/2010 | Pulz et al. | |
| 2010/0161554 A1 | 6/2010 | Datuashvili et al. | |
| 2010/0164897 A1 | 7/2010 | Morin et al. | |
| 2010/0169075 A1 | 7/2010 | Raffa et al. | |
| 2010/0169093 A1 | 7/2010 | Washio | |
| 2010/0169097 A1 | 7/2010 | Nachman et al. | |
| 2010/0169098 A1 | 7/2010 | Patch | |
| 2010/0171713 A1 | 7/2010 | Kwok et al. | |
| 2010/0174544 A1 | 7/2010 | Heifets | |
| 2010/0175066 A1 | 7/2010 | Paik | |
| 2010/0179932 A1 | 7/2010 | Yoon et al. | |
| 2010/0179991 A1 | 7/2010 | Lorch et al. | |
| 2010/0180218 A1 | 7/2010 | Boston et al. | |
| 2010/0185448 A1 | 7/2010 | Meisel | |
| 2010/0185949 A1 | 7/2010 | Jaeger | |
| 2010/0191520 A1 | 7/2010 | Gruhn et al. | |
| 2010/0197359 A1 | 8/2010 | Harris | |
| 2010/0199180 A1 | 8/2010 | Brichter et al. | |
| 2010/0199215 A1 | 8/2010 | Seymour et al. | |
| 2010/0204986 A1 | 8/2010 | Kennewick et al. | |
| 2010/0211199 A1 | 8/2010 | Naik et al. | |
| 2010/0211379 A1 | 8/2010 | Gorman et al. | |
| 2010/0211644 A1 | 8/2010 | Lavoie et al. | |
| 2010/0216509 A1 | 8/2010 | Riemer et al. | |
| 2010/0217604 A1 | 8/2010 | Baldwin et al. | |
| 2010/0222033 A1 | 9/2010 | Scott et al. | |
| 2010/0222098 A1 | 9/2010 | Garg | |
| 2010/0223055 A1 | 9/2010 | Mclean | |
| 2010/0223056 A1 | 9/2010 | Kadirkamanathan et al. | |
| 2010/0223131 A1 | 9/2010 | Scott et al. | |
| 2010/0225599 A1 | 9/2010 | Danielsson et al. | |
| 2010/0225809 A1 | 9/2010 | Connors et al. | |
| 2010/0227642 A1 | 9/2010 | Kim et al. | |
| 2010/0228540 A1 | 9/2010 | Bennett | |
| 2010/0228549 A1 | 9/2010 | Herman et al. | |

(56) References Cited

U.S. PATENT DOCUMENTS

2010/0228691 A1 9/2010 Yang et al.
2010/0229082 A1 9/2010 Karmarkar et al.
2010/0229100 A1 9/2010 Miller et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235732 A1 9/2010 Bergman
2010/0235770 A1 9/2010 Ording et al.
2010/0235780 A1 9/2010 Westerman et al.
2010/0241418 A1 9/2010 Maeda et al.
2010/0250542 A1 9/2010 Fujimaki
2010/0250599 A1 9/2010 Schmidt et al.
2010/0255858 A1 10/2010 Juhasz
2010/0257160 A1 10/2010 Cao
2010/0257478 A1 10/2010 Longe et al.
2010/0262599 A1 10/2010 Nitz
2010/0268537 A1 10/2010 Al-Telmissani
2010/0268539 A1 10/2010 Xu et al.
2010/0269040 A1 10/2010 Lee
2010/0274753 A1 10/2010 Liberty et al.
2010/0277579 A1 11/2010 Cho et al.
2010/0278320 A1 11/2010 Arsenault et al.
2010/0278453 A1 11/2010 King
2010/0280983 A1 11/2010 Cho et al.
2010/0281034 A1 11/2010 Petrou et al.
2010/0286984 A1 11/2010 Wandinger et al.
2010/0286985 A1 11/2010 Kennewick et al.
2010/0287514 A1 11/2010 Cragun et al.
2010/0290632 A1 11/2010 Lin
2010/0293460 A1 11/2010 Budelli
2010/0295645 A1 11/2010 Falldin et al.
2010/0299133 A1 11/2010 Kopparapu et al.
2010/0299138 A1 11/2010 Kim
2010/0299142 A1 11/2010 Freeman et al.
2010/0302056 A1 12/2010 Dutton et al.
2010/0304342 A1 12/2010 Zilber
2010/0304705 A1 12/2010 Hursey et al.
2010/0305807 A1 12/2010 Basir et al.
2010/0305947 A1 12/2010 Schwarz et al.
2010/0312547 A1 12/2010 Van Os et al.
2010/0312566 A1 12/2010 Odinak et al.
2010/0318366 A1 12/2010 Sullivan et al.
2010/0318576 A1 12/2010 Kim
2010/0322438 A1 12/2010 Siotis
2010/0324709 A1 12/2010 Starmen
2010/0324895 A1 12/2010 Kurzweil et al.
2010/0324896 A1 12/2010 Attwater et al.
2010/0324905 A1 12/2010 Kurzweil et al.
2010/0325131 A1 12/2010 Dumais et al.
2010/0325158 A1 12/2010 Oral et al.
2010/0325573 A1 12/2010 Estrada et al.
2010/0325588 A1 12/2010 Reddy et al.
2010/0330908 A1 12/2010 Maddern et al.
2010/0332220 A1 12/2010 Hursey et al.
2010/0332224 A1 12/2010 Mäkelä et al.
2010/0332235 A1 12/2010 David
2010/0332236 A1 12/2010 Tan
2010/0332280 A1 12/2010 Bradley et al.
2010/0332348 A1 12/2010 Cao
2010/0332428 A1 12/2010 Mchenry et al.
2010/0332976 A1 12/2010 Fux et al.
2010/0333030 A1 12/2010 Johns
2010/0333163 A1 12/2010 Daly
2011/0002487 A1 1/2011 Panther et al.
2011/0004475 A1 1/2011 Bellegarda
2011/0009107 A1 1/2011 Guba et al.
2011/0010178 A1 1/2011 Lee et al.
2011/0010644 A1 1/2011 Merrill et al.
2011/0015928 A1 1/2011 Odell et al.
2011/0016150 A1 1/2011 Engstrom et al.
2011/0018695 A1 1/2011 Bells et al.
2011/0021211 A1 1/2011 Ohki
2011/0021213 A1 1/2011 Carr
2011/0022292 A1 1/2011 Shen et al.
2011/0022388 A1 1/2011 Wu et al.
2011/0022393 A1 1/2011 Waller et al.
2011/0022394 A1 1/2011 Wide et al.
2011/0022472 A1 1/2011 Zon et al.
2011/0022952 A1 1/2011 Wu et al.
2011/0029616 A1 2/2011 Wang et al.
2011/0030067 A1 2/2011 Wilson
2011/0033064 A1 2/2011 Johnson et al.
2011/0034183 A1 2/2011 Haag et al.
2011/0035144 A1 2/2011 Okamoto et al.
2011/0035434 A1 2/2011 Lockwood
2011/0038489 A1 2/2011 Visser et al.
2011/0040707 A1 2/2011 Theisen et al.
2011/0045841 A1 2/2011 Kuhlke et al.
2011/0047072 A1 2/2011 Ciurea
2011/0047149 A1 2/2011 Vaananen
2011/0047161 A1 2/2011 Myaeng et al.
2011/0047266 A1 2/2011 Yu et al.
2011/0047605 A1 2/2011 Sontag et al.
2011/0050591 A1 3/2011 Kim et al.
2011/0050592 A1 3/2011 Kim et al.
2011/0054647 A1 3/2011 Chipchase
2011/0054894 A1 3/2011 Phillips et al.
2011/0054901 A1 3/2011 Qin et al.
2011/0055256 A1 3/2011 Phillips et al.
2011/0060584 A1 3/2011 Ferrucci et al.
2011/0060587 A1 3/2011 Phillips et al.
2011/0060589 A1 3/2011 Weinberg et al.
2011/0060807 A1 3/2011 Martin et al.
2011/0064387 A1 3/2011 Mendeloff et al.
2011/0065456 A1 3/2011 Brennan et al.
2011/0066366 A1 3/2011 Ellanti et al.
2011/0066468 A1 3/2011 Huang et al.
2011/0066634 A1 3/2011 Phillips et al.
2011/0072492 A1 3/2011 Mohler et al.
2011/0075818 A1* 3/2011 Vance .................... G10L 15/07
379/88.01
2011/0076994 A1 3/2011 Kim et al.
2011/0077943 A1 3/2011 Miki et al.
2011/0080260 A1 4/2011 Wang et al.
2011/0081889 A1 4/2011 Gao et al.
2011/0082688 A1 4/2011 Kim et al.
2011/0083079 A1 4/2011 Farrell et al.
2011/0087491 A1 4/2011 Wittenstein et al.
2011/0087685 A1 4/2011 Lin et al.
2011/0090078 A1 4/2011 Kim et al.
2011/0092187 A1 4/2011 Miller
2011/0093261 A1 4/2011 Angott
2011/0093265 A1 4/2011 Stent et al.
2011/0093271 A1 4/2011 Bernard et al.
2011/0099000 A1 4/2011 Rai et al.
2011/0103682 A1 5/2011 Chidlovskii et al.
2011/0105097 A1 5/2011 Tadayon et al.
2011/0106736 A1 5/2011 Aharonson et al.
2011/0106892 A1 5/2011 Nelson et al.
2011/0110502 A1 5/2011 Daye et al.
2011/0111724 A1 5/2011 Baptiste
2011/0112827 A1 5/2011 Kennewick et al.
2011/0112837 A1 5/2011 Kurki-Suonio et al.
2011/0112838 A1 5/2011 Adibi
2011/0112921 A1 5/2011 Kennewick et al.
2011/0116610 A1 5/2011 Shaw et al.
2011/0119049 A1 5/2011 Ylonen
2011/0119051 A1 5/2011 Li et al.
2011/0119623 A1 5/2011 Kim
2011/0119715 A1 5/2011 Chang et al.
2011/0123004 A1 5/2011 Chang et al.
2011/0125498 A1 5/2011 Pickering et al.
2011/0125540 A1 5/2011 Jang et al.
2011/0125701 A1 5/2011 Nair et al.
2011/0130958 A1 6/2011 Stahl et al.
2011/0131036 A1 6/2011 DiCristo et al.
2011/0131038 A1 6/2011 Oyaizu et al.
2011/0131045 A1 6/2011 Cristo et al.
2011/0137636 A1 6/2011 Srihari et al.
2011/0141141 A1 6/2011 Kankainen
2011/0143726 A1 6/2011 de Silva
2011/0143811 A1 6/2011 Rodriguez
2011/0144857 A1 6/2011 Wingrove et al.

(56) References Cited

U.S. PATENT DOCUMENTS

| | | | |
|---|---|---|---|
| 2011/0144901 A1 | 6/2011 | Wang | |
| 2011/0144973 A1 | 6/2011 | Bocchieri et al. | |
| 2011/0144999 A1 | 6/2011 | Jang et al. | |
| 2011/0145718 A1 | 6/2011 | Ketola et al. | |
| 2011/0151830 A1 | 6/2011 | Blanda et al. | |
| 2011/0153209 A1 | 6/2011 | Geelen | |
| 2011/0153322 A1 | 6/2011 | Kwak et al. | |
| 2011/0153324 A1 | 6/2011 | Ballinger et al. | |
| 2011/0153329 A1 | 6/2011 | Moorer | |
| 2011/0153330 A1 | 6/2011 | Yazdani et al. | |
| 2011/0153373 A1 | 6/2011 | Dantzig et al. | |
| 2011/0154193 A1 | 6/2011 | Creutz et al. | |
| 2011/0157029 A1 | 6/2011 | Tseng | |
| 2011/0161072 A1 | 6/2011 | Terao et al. | |
| 2011/0161076 A1 | 6/2011 | Davis et al. | |
| 2011/0161079 A1 | 6/2011 | Gruhn et al. | |
| 2011/0161309 A1 | 6/2011 | Lung et al. | |
| 2011/0161852 A1 | 6/2011 | Vainio et al. | |
| 2011/0166851 A1 | 7/2011 | LeBeau et al. | |
| 2011/0167350 A1 | 7/2011 | Hoellwarth | |
| 2011/0175810 A1 | 7/2011 | Markovic et al. | |
| 2011/0179002 A1 | 7/2011 | Dumitru et al. | |
| 2011/0179372 A1 | 7/2011 | Moore et al. | |
| 2011/0183650 A1 | 7/2011 | Mckee et al. | |
| 2011/0184721 A1 | 7/2011 | Subramanian et al. | |
| 2011/0184730 A1 | 7/2011 | LeBeau et al. | |
| 2011/0184736 A1 | 7/2011 | Slotznick | |
| 2011/0184737 A1 | 7/2011 | Nakano et al. | |
| 2011/0184768 A1 | 7/2011 | Norton et al. | |
| 2011/0185288 A1 | 7/2011 | Gupta et al. | |
| 2011/0191108 A1 | 8/2011 | Friedlander | |
| 2011/0191271 A1 | 8/2011 | Baker et al. | |
| 2011/0191344 A1 | 8/2011 | Jin et al. | |
| 2011/0195758 A1 | 8/2011 | Damale et al. | |
| 2011/0196670 A1 | 8/2011 | Dang et al. | |
| 2011/0197128 A1 | 8/2011 | Assadollahi et al. | |
| 2011/0199312 A1 | 8/2011 | Okuta | |
| 2011/0201385 A1 | 8/2011 | Higginbotham et al. | |
| 2011/0201387 A1 | 8/2011 | Paek et al. | |
| 2011/0202526 A1 | 8/2011 | Lee et al. | |
| 2011/0205149 A1 | 8/2011 | Tom et al. | |
| 2011/0208511 A1 | 8/2011 | Sikstrom et al. | |
| 2011/0208524 A1 | 8/2011 | Haughay | |
| 2011/0209088 A1 | 8/2011 | Hinckley et al. | |
| 2011/0212717 A1 | 9/2011 | Rhoads et al. | |
| 2011/0216093 A1 | 9/2011 | Griffin | |
| 2011/0218806 A1 | 9/2011 | Alewine et al. | |
| 2011/0218855 A1 | 9/2011 | Cao et al. | |
| 2011/0219018 A1 | 9/2011 | Bailey et al. | |
| 2011/0223893 A1 | 9/2011 | Lau et al. | |
| 2011/0224972 A1 | 9/2011 | Millett et al. | |
| 2011/0228913 A1 | 9/2011 | Cochinwala et al. | |
| 2011/0231182 A1 | 9/2011 | Weider et al. | |
| 2011/0231184 A1 | 9/2011 | Kerr | |
| 2011/0231188 A1 | 9/2011 | Kennewick et al. | |
| 2011/0231432 A1 | 9/2011 | Sata et al. | |
| 2011/0231474 A1 | 9/2011 | Locker et al. | |
| 2011/0238191 A1 | 9/2011 | Kristjansson et al. | |
| 2011/0238407 A1 | 9/2011 | Kent | |
| 2011/0238408 A1 | 9/2011 | Larcheveque et al. | |
| 2011/0238676 A1 | 9/2011 | Liu et al. | |
| 2011/0239111 A1 | 9/2011 | Grover | |
| 2011/0242007 A1 | 10/2011 | Gray et al. | |
| 2011/0244888 A1 | 10/2011 | Ohki | |
| 2011/0246471 A1 | 10/2011 | Rakib et al. | |
| 2011/0249144 A1 | 10/2011 | Chang | |
| 2011/0250570 A1 | 10/2011 | Mack et al. | |
| 2011/0257966 A1 | 10/2011 | Rychlik | |
| 2011/0258188 A1 | 10/2011 | Abdalmageed et al. | |
| 2011/0260829 A1 | 10/2011 | Lee | |
| 2011/0260861 A1 | 10/2011 | Singh et al. | |
| 2011/0264643 A1 | 10/2011 | Cao | |
| 2011/0264999 A1 | 10/2011 | Bells et al. | |
| 2011/0274303 A1 | 11/2011 | Filson et al. | |
| 2011/0276595 A1 | 11/2011 | Kirkland et al. | |
| 2011/0276598 A1 | 11/2011 | Kozempel | |
| 2011/0276944 A1 | 11/2011 | Bergman et al. | |
| 2011/0279368 A1 | 11/2011 | Klein et al. | |
| 2011/0282663 A1 | 11/2011 | Talwar et al. | |
| 2011/0282888 A1 | 11/2011 | Koperski et al. | |
| 2011/0282906 A1 | 11/2011 | Wong | |
| 2011/0283189 A1 | 11/2011 | McCarty | |
| 2011/0288852 A1 | 11/2011 | Dymetman et al. | |
| 2011/0288855 A1 | 11/2011 | Roy | |
| 2011/0288861 A1 | 11/2011 | Kurzweil et al. | |
| 2011/0288863 A1 | 11/2011 | Rasmussen | |
| 2011/0288866 A1 | 11/2011 | Rasmussen | |
| 2011/0298585 A1 | 12/2011 | Barry | |
| 2011/0301943 A1 | 12/2011 | Patch | |
| 2011/0302162 A1 | 12/2011 | Xiao et al. | |
| 2011/0306426 A1 | 12/2011 | Novak et al. | |
| 2011/0307241 A1 | 12/2011 | Waibel et al. | |
| 2011/0307491 A1 | 12/2011 | Fisk et al. | |
| 2011/0307810 A1 | 12/2011 | Hilerio et al. | |
| 2011/0313775 A1 | 12/2011 | Laligand et al. | |
| 2011/0314003 A1 | 12/2011 | Ju et al. | |
| 2011/0314032 A1 | 12/2011 | Bennett et al. | |
| 2011/0314404 A1 | 12/2011 | Kotler et al. | |
| 2011/0320187 A1 | 12/2011 | Motik et al. | |
| 2012/0002820 A1 | 1/2012 | Leichter | |
| 2012/0005602 A1 | 1/2012 | Anttila et al. | |
| 2012/0008754 A1 | 1/2012 | Mukherjee et al. | |
| 2012/0010886 A1 | 1/2012 | Razavilar | |
| 2012/0011138 A1 | 1/2012 | Dunning et al. | |
| 2012/0013609 A1 | 1/2012 | Reponen et al. | |
| 2012/0015629 A1 | 1/2012 | Olsen et al. | |
| 2012/0016658 A1 | 1/2012 | Wu et al. | |
| 2012/0016678 A1 | 1/2012 | Gruber et al. | |
| 2012/0019400 A1 | 1/2012 | Patel et al. | |
| 2012/0020490 A1 | 1/2012 | Leichter | |
| 2012/0022787 A1 | 1/2012 | LeBeau et al. | |
| 2012/0022857 A1 | 1/2012 | Baldwin et al. | |
| 2012/0022860 A1 | 1/2012 | Lloyd et al. | |
| 2012/0022868 A1 | 1/2012 | LeBeau et al. | |
| 2012/0022869 A1 | 1/2012 | Lloyd et al. | |
| 2012/0022870 A1 | 1/2012 | Kristjansson et al. | |
| 2012/0022872 A1 | 1/2012 | Gruber et al. | |
| 2012/0022874 A1 | 1/2012 | Lloyd et al. | |
| 2012/0022876 A1 | 1/2012 | LeBeau et al. | |
| 2012/0022967 A1 | 1/2012 | Bachman et al. | |
| 2012/0023088 A1 | 1/2012 | Cheng et al. | |
| 2012/0023095 A1 | 1/2012 | Wadycki et al. | |
| 2012/0023462 A1 | 1/2012 | Rosing et al. | |
| 2012/0029661 A1 | 2/2012 | Jones et al. | |
| 2012/0029910 A1 | 2/2012 | Medlock et al. | |
| 2012/0034904 A1 | 2/2012 | LeBeau et al. | |
| 2012/0035907 A1 | 2/2012 | Lebeau et al. | |
| 2012/0035908 A1 | 2/2012 | Lebeau et al. | |
| 2012/0035924 A1 | 2/2012 | Jitkoff et al. | |
| 2012/0035925 A1 | 2/2012 | Friend et al. | |
| 2012/0035926 A1 | 2/2012 | Ambler | |
| 2012/0035931 A1 | 2/2012 | LeBeau et al. | |
| 2012/0035932 A1 | 2/2012 | Jitkoff et al. | |
| 2012/0035935 A1 | 2/2012 | Park et al. | |
| 2012/0036556 A1 | 2/2012 | LeBeau et al. | |
| 2012/0039539 A1 | 2/2012 | Boiman et al. | |
| 2012/0041752 A1 | 2/2012 | Wang et al. | |
| 2012/0041759 A1* | 2/2012 | Barker | H04H 60/05 704/201 |
| 2012/0042014 A1 | 2/2012 | Desai et al. | |
| 2012/0042343 A1 | 2/2012 | Laligand et al. | |
| 2012/0053815 A1 | 3/2012 | Montanari et al. | |
| 2012/0053829 A1 | 3/2012 | Agarwal et al. | |
| 2012/0053945 A1 | 3/2012 | Gupta et al. | |
| 2012/0056815 A1 | 3/2012 | Mehra | |
| 2012/0059655 A1 | 3/2012 | Cartales | |
| 2012/0059813 A1 | 3/2012 | Sejnoha et al. | |
| 2012/0062473 A1 | 3/2012 | Xiao et al. | |
| 2012/0066212 A1 | 3/2012 | Jennings | |
| 2012/0066581 A1 | 3/2012 | Spalink | |
| 2012/0075054 A1 | 3/2012 | Ge et al. | |
| 2012/0077479 A1 | 3/2012 | Sabotta et al. | |
| 2012/0078611 A1 | 3/2012 | Soltani et al. | |
| 2012/0078624 A1 | 3/2012 | Yook et al. | |

(56) References Cited

U.S. PATENT DOCUMENTS

2012/0078627 A1 3/2012 Wagner
2012/0078635 A1 3/2012 Rothkopf et al.
2012/0078747 A1 3/2012 Chakrabarti et al.
2012/0082317 A1 4/2012 Pance et al.
2012/0083286 A1 4/2012 Kim et al.
2012/0084086 A1 4/2012 Gilbert et al.
2012/0084089 A1* 4/2012 Lloyd .................... G10L 15/20 704/500
2012/0084634 A1 4/2012 Wong et al.
2012/0088219 A1 4/2012 Briscoe et al.
2012/0089331 A1 4/2012 Schmidt et al.
2012/0101823 A1 4/2012 Weng et al.
2012/0108166 A1 5/2012 Hymel
2012/0108221 A1 5/2012 Thomas et al.
2012/0116770 A1 5/2012 Chen et al.
2012/0117499 A1 5/2012 Mori et al.
2012/0124126 A1 5/2012 Alcazar et al.
2012/0128322 A1 5/2012 Shaffer et al.
2012/0130709 A1 5/2012 Bocchieri et al.
2012/0136572 A1 5/2012 Norton
2012/0136855 A1 5/2012 Ni et al.
2012/0136985 A1 5/2012 Popescu et al.
2012/0137367 A1 5/2012 Dupont et al.
2012/0149342 A1 6/2012 Cohen et al.
2012/0149394 A1 6/2012 Singh et al.
2012/0150544 A1 6/2012 McLoughlin et al.
2012/0150580 A1 6/2012 Norton
2012/0158293 A1 6/2012 Burnham
2012/0158399 A1 6/2012 Tremblay et al.
2012/0158422 A1 6/2012 Burnham et al.
2012/0159380 A1 6/2012 Kocienda et al.
2012/0163710 A1 6/2012 Skaff et al.
2012/0166196 A1 6/2012 Ju et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0179457 A1 7/2012 Newman et al.
2012/0179467 A1 7/2012 Williams
2012/0185237 A1 7/2012 Gajic et al.
2012/0185480 A1 7/2012 Ni et al.
2012/0185781 A1 7/2012 Guzman et al.
2012/0191461 A1 7/2012 Lin et al.
2012/0192096 A1 7/2012 Bowman et al.
2012/0197743 A1 8/2012 Grigg et al.
2012/0197995 A1 8/2012 Caruso
2012/0197998 A1 8/2012 Kessel et al.
2012/0201362 A1 8/2012 Crossan et al.
2012/0209853 A1 8/2012 Desai et al.
2012/0209874 A1 8/2012 Wong et al.
2012/0210266 A1 8/2012 Jiang et al.
2012/0214141 A1 8/2012 Raya et al.
2012/0214517 A1 8/2012 Singh et al.
2012/0215762 A1 8/2012 Hall et al.
2012/0221339 A1 8/2012 Wang et al.
2012/0221552 A1 8/2012 Reponen et al.
2012/0223889 A1 9/2012 Medlock et al.
2012/0223936 A1 9/2012 Aughey et al.
2012/0232885 A1 9/2012 Barbosa et al.
2012/0232886 A1 9/2012 Capuozzo et al.
2012/0232906 A1 9/2012 Lindahl et al.
2012/0239661 A1 9/2012 Giblin
2012/0239761 A1 9/2012 Linner et al.
2012/0242482 A1 9/2012 Elumalai et al.
2012/0245719 A1 9/2012 Story, Jr. et al.
2012/0245939 A1 9/2012 Braho et al.
2012/0245941 A1 9/2012 Cheyer
2012/0245944 A1 9/2012 Gruber et al.
2012/0246064 A1 9/2012 Balkow
2012/0250858 A1 10/2012 Iqbal et al.
2012/0252367 A1 10/2012 Gaglio et al.
2012/0252540 A1 10/2012 Kirigaya
2012/0253785 A1 10/2012 Hamid et al.
2012/0254143 A1 10/2012 Varma et al.
2012/0254152 A1 10/2012 Park et al.
2012/0254290 A1 10/2012 Naaman
2012/0259615 A1 10/2012 Morin et al.
2012/0265528 A1 10/2012 Gruber et al.
2012/0265535 A1 10/2012 Bryant-Rich et al.
2012/0265806 A1 10/2012 Blanchflower et al.
2012/0271625 A1 10/2012 Bernard
2012/0271634 A1 10/2012 Lenke
2012/0271635 A1 10/2012 Ljolje
2012/0271640 A1 10/2012 Basir
2012/0271676 A1 10/2012 Aravamudan et al.
2012/0275377 A1 11/2012 Lehane et al.
2012/0284015 A1 11/2012 Drewes
2012/0284027 A1 11/2012 Mallett et al.
2012/0290291 A1 11/2012 Shelley et al.
2012/0290300 A1 11/2012 Lee et al.
2012/0295708 A1 11/2012 Hernandez-Abrego et al.
2012/0296649 A1 11/2012 Bansal et al.
2012/0296654 A1 11/2012 Hendrickson et al.
2012/0296891 A1 11/2012 Rangan
2012/0297348 A1 11/2012 Santoro
2012/0303369 A1 11/2012 Brush et al.
2012/0303371 A1 11/2012 Labsky et al.
2012/0304124 A1 11/2012 Chen et al.
2012/0309363 A1 12/2012 Gruber et al.
2012/0310642 A1 12/2012 Cao et al.
2012/0310649 A1 12/2012 Cannistraro et al.
2012/0310652 A1 12/2012 O'Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316862 A1 12/2012 Sultan et al.
2012/0316875 A1 12/2012 Nyquist et al.
2012/0316878 A1 12/2012 Singleton et al.
2012/0317194 A1 12/2012 Tian
2012/0317498 A1 12/2012 Logan et al.
2012/0321112 A1 12/2012 Schubert et al.
2012/0324391 A1 12/2012 Tocci et al.
2012/0327009 A1 12/2012 Fleizach
2012/0329529 A1 12/2012 van der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007648 A1 1/2013 Gamon et al.
2013/0010575 A1 1/2013 He et al.
2013/0013313 A1 1/2013 Shechtman et al.
2013/0013319 A1 1/2013 Grant et al.
2013/0018659 A1 1/2013 Chi
2013/0024576 A1 1/2013 Dishneau et al.
2013/0027875 A1 1/2013 Zhu et al.
2013/0030787 A1 1/2013 Cancedda et al.
2013/0030789 A1 1/2013 Dalce
2013/0030804 A1 1/2013 Zavaliagko et al.
2013/0030815 A1 1/2013 Madhvanath et al.
2013/0030955 A1 1/2013 David
2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.
2013/0041968 A1 2/2013 Cohen et al.
2013/0046544 A1 2/2013 Kay et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054675 A1 2/2013 Jenkins et al.

(56) References Cited

U.S. PATENT DOCUMENTS

2013/0054706 A1 2/2013 Graham et al.
2013/0055099 A1 2/2013 Yao et al.
2013/0055147 A1 2/2013 Vasudev et al.
2013/0063611 A1 3/2013 Papakipos et al.
2013/0066832 A1 3/2013 Sheehan et al.
2013/0067307 A1 3/2013 Tian et al.
2013/0073286 A1 3/2013 Bastea-Forte et al.
2013/0073346 A1 3/2013 Chun et al.
2013/0080152 A1 3/2013 Brun et al.
2013/0080162 A1 3/2013 Chang et al.
2013/0080167 A1 3/2013 Mozer
2013/0080177 A1 3/2013 Chen
2013/0080251 A1 3/2013 Dempski
2013/0082967 A1 4/2013 Hillis et al.
2013/0085755 A1 4/2013 Bringert et al.
2013/0085761 A1 4/2013 Bringert et al.
2013/0090921 A1 4/2013 Liu et al.
2013/0091090 A1 4/2013 Spivack et al.
2013/0095805 A1 4/2013 Lebeau et al.
2013/0096909 A1 4/2013 Brun et al.
2013/0096917 A1 4/2013 Edgar et al.
2013/0097566 A1 4/2013 Berglund
2013/0097682 A1 4/2013 Zeljkovic et al.
2013/0100268 A1 4/2013 Mihailidis et al.
2013/0103391 A1 4/2013 Millmore et al.
2013/0103405 A1 4/2013 Namba et al.
2013/0106742 A1 5/2013 Lee et al.
2013/0110505 A1 5/2013 Gruber et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124189 A1 5/2013 Baldwin et al.
2013/0132084 A1 5/2013 Stonehocker et al.
2013/0132089 A1 5/2013 Fanty et al.
2013/0132871 A1 5/2013 Zeng et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore et al.
2013/0151339 A1 6/2013 Kim et al.
2013/0152092 A1 6/2013 Yadgar et al.
2013/0154811 A1 6/2013 Ferren et al.
2013/0157629 A1 6/2013 Lee et al.
2013/0158977 A1 6/2013 Senior
2013/0165232 A1 6/2013 Nelson et al.
2013/0166303 A1 6/2013 Chang et al.
2013/0166442 A1 6/2013 Nakajima et al.
2013/0170738 A1 7/2013 Capuozzo et al.
2013/0172022 A1 7/2013 Seymour et al.
2013/0176244 A1 7/2013 Yamamoto et al.
2013/0176592 A1 7/2013 Sasaki
2013/0179168 A1* 7/2013 Bae ........................ G10L 21/00
704/248
2013/0179440 A1 7/2013 Gordon
2013/0183944 A1 7/2013 Mozer et al.
2013/0185059 A1 7/2013 Riccardi et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0191117 A1 7/2013 Atti et al.
2013/0197911 A1 8/2013 Wei et al.
2013/0204813 A1 8/2013 Master et al.
2013/0204897 A1 8/2013 McDougall
2013/0207898 A1 8/2013 Sullivan et al.
2013/0218553 A1 8/2013 Fujii et al.
2013/0218560 A1 8/2013 Hsiao et al.
2013/0222249 A1 8/2013 Pasquero et al.
2013/0225128 A1 8/2013 Gomar
2013/0231917 A1 9/2013 Naik
2013/0234947 A1 9/2013 Kristensson et al.
2013/0235987 A1 9/2013 Arroniz-Escobar et al.
2013/0238647 A1 9/2013 Thompson
2013/0244615 A1 9/2013 Miller et al.
2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0275117 A1 10/2013 Winer
2013/0275138 A1 10/2013 Gruber et al.
2013/0275164 A1 10/2013 Gruber et al.
2013/0275199 A1 10/2013 Proctor, Jr. et al.
2013/0275625 A1 10/2013 Taivalsaari et al.
2013/0275875 A1 10/2013 Gruber et al.
2013/0275899 A1 10/2013 Schubert et al.
2013/0283168 A1 10/2013 Brown et al.
2013/0289991 A1 10/2013 Eshwar et al.
2013/0289993 A1 10/2013 Rao et al.
2013/0289994 A1 10/2013 Newman et al.
2013/0291015 A1 10/2013 Pan
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0303106 A1 11/2013 Martin
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311997 A1 11/2013 Gruber et al.
2013/0316746 A1 11/2013 Miller et al.
2013/0322634 A1 12/2013 Bennett et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325481 A1 12/2013 Van Os et al.
2013/0325484 A1 12/2013 Chakladar et al.
2013/0325967 A1 12/2013 Parks et al.
2013/0325979 A1 12/2013 Mansfield et al.
2013/0329023 A1 12/2013 Suplee, III et al.
2013/0331127 A1 12/2013 Sabatelli et al.
2013/0332159 A1 12/2013 Federighi et al.
2013/0332162 A1 12/2013 Keen
2013/0332164 A1 12/2013 Nalk
2013/0332168 A1 12/2013 Kim et al.
2013/0332400 A1 12/2013 González
2013/0339256 A1 12/2013 Shroff
2013/0346068 A1 12/2013 Solem et al.
2013/0346347 A1 12/2013 Patterson et al.
2014/0006012 A1 1/2014 Zhou et al.
2014/0006025 A1 1/2014 Krishnan et al.
2014/0006027 A1 1/2014 Kim et al.
2014/0006030 A1 1/2014 Fleizach et al.
2014/0006153 A1 1/2014 Thangam et al.
2014/0012580 A1 1/2014 Ganong et al.
2014/0012586 A1 1/2014 Rubin et al.
2014/0019116 A1 1/2014 Lundberg et al.
2014/0019133 A1 1/2014 Bao et al.
2014/0028735 A1 1/2014 Williams et al.
2014/0032453 A1 1/2014 Eustice et al.
2014/0033071 A1 1/2014 Gruber et al.
2014/0035823 A1 2/2014 Khoe et al.
2014/0039894 A1 2/2014 Shostak
2014/0040274 A1 2/2014 Aravamudan et al.
2014/0040748 A1 2/2014 Lemay et al.
2014/0040801 A1 2/2014 Patel et al.
2014/0040918 A1 2/2014 Li et al.
2014/0046934 A1 2/2014 Zhou et al.
2014/0047001 A1 2/2014 Phillips et al.
2014/0052680 A1 2/2014 Nitz et al.

(56) References Cited

U.S. PATENT DOCUMENTS

2014/0052791 A1 2/2014 Chakra et al.
2014/0053082 A1 2/2014 Park et al.
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0068751 A1 3/2014 Last et al.
2014/0074466 A1 3/2014 Sharifi et al.
2014/0074470 A1 3/2014 Jansche et al.
2014/0074472 A1 3/2014 Lin et al.
2014/0074815 A1 3/2014 Plimton
2014/0078065 A1 3/2014 Akkok et al.
2014/0080428 A1 3/2014 Rhoads et al.
2014/0081619 A1 3/2014 Solntseva et al.
2014/0081633 A1 3/2014 Badaskar et al.
2014/0082501 A1 3/2014 Bae et al.
2014/0086458 A1 3/2014 Rogers et al.
2014/0087711 A1 3/2014 Geyer et al.
2014/0088961 A1 3/2014 Woodward et al.
2014/0095171 A1 4/2014 Lynch et al.
2014/0095172 A1 4/2014 Cabaco et al.
2014/0095173 A1 4/2014 Lynch et al.
2014/0096209 A1 4/2014 Saraf et al.
2014/0098247 A1 4/2014 Rao et al.
2014/0108017 A1 4/2014 Mason et al.
2014/0114554 A1 4/2014 Lagassey
2014/0118155 A1 5/2014 Bowers et al.
2014/0122059 A1 5/2014 Patel et al.
2014/0122086 A1 5/2014 Kapur et al.
2014/0122136 A1 5/2014 Jayanthi
2014/0122153 A1 5/2014 Truitt
2014/0134983 A1 5/2014 Jung et al.
2014/0135036 A1 5/2014 Bonanni et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0142923 A1 5/2014 Jones et al.
2014/0142935 A1 5/2014 Lindahl et al.
2014/0143550 A1 5/2014 Ganong, III et al.
2014/0143721 A1 5/2014 Suzuki et al.
2014/0146200 A1 5/2014 Scott et al.
2014/0152577 A1 6/2014 Yuen et al.
2014/0155031 A1 6/2014 Lee et al.
2014/0157422 A1 6/2014 Livshits et al.
2014/0163951 A1 6/2014 Nikoulina et al.
2014/0163953 A1 6/2014 Parikh
2014/0163954 A1 6/2014 Joshi et al.
2014/0163981 A1 6/2014 Cook et al.
2014/0164476 A1 6/2014 Thomson
2014/0164508 A1 6/2014 Lynch et al.
2014/0164532 A1 6/2014 Lynch et al.
2014/0164533 A1 6/2014 Lynch et al.
2014/0169795 A1 6/2014 Clough
2014/0173460 A1 6/2014 Kim
2014/0180499 A1 6/2014 Cooper et al.
2014/0180689 A1 6/2014 Kim et al.
2014/0180697 A1 6/2014 Torok et al.
2014/0181865 A1 6/2014 Koganei
2014/0188477 A1 7/2014 Zhang
2014/0195230 A1 7/2014 Han et al.
2014/0195233 A1 7/2014 Bapat
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0203939 A1 7/2014 Harrington et al.
2014/0207439 A1 7/2014 Venkatapathy et al.
2014/0207446 A1 7/2014 Klein et al.
2014/0207468 A1 7/2014 Bartnik
2014/0207582 A1 7/2014 Flinn et al.
2014/0214429 A1 7/2014 Pantel
2014/0214537 A1 7/2014 Yoo et al.
2014/0218372 A1 8/2014 Missig et al.
2014/0222436 A1* 8/2014 Binder .................. G10L 15/265
704/275
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0230055 A1 8/2014 Boehl
2014/0232656 A1 8/2014 Pasquero et al.
2014/0236595 A1 8/2014 Gray
2014/0236986 A1 8/2014 Guzman
2014/0237042 A1 8/2014 Ahmed et al.
2014/0244248 A1 8/2014 Arisoy et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244268 A1 8/2014 Abdelsamie et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249817 A1 9/2014 Hart et al.
2014/0249821 A1 9/2014 Kennewick et al.
2014/0250046 A1 9/2014 Winn et al.
2014/0257815 A1 9/2014 Zhao et al.
2014/0258857 A1 9/2014 Dykstra-Erickson et al.
2014/0267022 A1 9/2014 Kim
2014/0267599 A1 9/2014 Drouin et al.
2014/0272821 A1 9/2014 Pitschel et al.
2014/0274203 A1 9/2014 Ganong et al.
2014/0274211 A1 9/2014 Sejnoha et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278429 A1 9/2014 Ganong, III
2014/0278435 A1 9/2014 Ganong et al.
2014/0278443 A1 9/2014 Gunn et al.
2014/0278513 A1 9/2014 Prakash et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0281983 A1 9/2014 Xian et al.
2014/0282003 A1 9/2014 Gruber et al.
2014/0282007 A1 9/2014 Fleizach
2014/0282045 A1 9/2014 Ayanam et al.
2014/0282201 A1 9/2014 Pasquero et al.
2014/0282586 A1 9/2014 Shear et al.
2014/0282743 A1 9/2014 Howard et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0304605 A1 10/2014 Ohmura et al.
2014/0310001 A1 10/2014 Kalns et al.
2014/0310002 A1 10/2014 Nitz et al.
2014/0316585 A1 10/2014 Boesveld et al.
2014/0317030 A1 10/2014 Shen et al.
2014/0317502 A1 10/2014 Brown et al.
2014/0324884 A1 10/2014 Lindahl et al.
2014/0337037 A1 11/2014 Chi
2014/0337048 A1 11/2014 Brown et al.
2014/0337266 A1 11/2014 Wolverton et al.
2014/0337371 A1 11/2014 Li
2014/0337438 A1 11/2014 Govande et al.
2014/0337751 A1 11/2014 Lim et al.
2014/0337814 A1 11/2014 Kalns et al.
2014/0342762 A1 11/2014 Hajdu et al.
2014/0343946 A1* 11/2014 Torok ..................... G10L 15/30
704/270.1

(56) References Cited

U.S. PATENT DOCUMENTS

2014/0344627 A1 11/2014 Schaub et al.
2014/0344687 A1 11/2014 Durham et al.
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.
2014/0358523 A1 12/2014 Sheth et al.
2014/0365209 A1 12/2014 Evermann
2014/0365214 A1 12/2014 Bayley
2014/0365216 A1 12/2014 Gruber et al.
2014/0365226 A1 12/2014 Sinha
2014/0365227 A1 12/2014 Cash et al.
2014/0365407 A1 12/2014 Brown et al.
2014/0365880 A1 12/2014 Bellegarda
2014/0365885 A1 12/2014 Carson et al.
2014/0365895 A1 12/2014 Paulson et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372931 A1 12/2014 Zhai et al.
2014/0379334 A1 12/2014 Fry
2015/0003797 A1 1/2015 Schmidt
2015/0006148 A1 1/2015 Goldszmit et al.
2015/0006157 A1 1/2015 Andrade Silva et al.
2015/0006178 A1 1/2015 Peng et al.
2015/0006199 A1 1/2015 Snider et al.
2015/0012271 A1 1/2015 Peng et al.
2015/0019219 A1 1/2015 Tzirkel-hancock et al.
2015/0019221 A1 1/2015 Lee et al.
2015/0019974 A1 1/2015 Doi et al.
2015/0031416 A1 1/2015 Wells et al.
2015/0033219 A1 1/2015 Breiner et al.
2015/0039292 A1 2/2015 Suleman et al.
2015/0039299 A1 2/2015 Weinstein et al.
2015/0039305 A1 2/2015 Huang
2015/0040012 A1 2/2015 Faaborg et al.
2015/0045003 A1 2/2015 Vora et al.
2015/0045068 A1 2/2015 Soffer et al.
2015/0046537 A1 2/2015 Rakib
2015/0050633 A1 2/2015 Christmas et al.
2015/0058013 A1 2/2015 Pakhomov et al.
2015/0058018 A1 2/2015 Georges et al.
2015/0058785 A1 2/2015 Ookawara
2015/0065200 A1 3/2015 Namgung et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0067485 A1 3/2015 Kim et al.
2015/0067822 A1 3/2015 Randall
2015/0073788 A1 3/2015 Allauzen et al.
2015/0073804 A1 3/2015 Senior et al.
2015/0074524 A1 3/2015 Nicholson et al.
2015/0082229 A1 3/2015 Ouyang et al.
2015/0088511 A1 3/2015 Bharadwaj et al.
2015/0088514 A1 3/2015 Typrin
2015/0088522 A1 3/2015 Hendrickson et al.
2015/0088523 A1 3/2015 Schuster
2015/0095031 A1 4/2015 Conkie et al.
2015/0095278 A1 4/2015 Flinn et al.
2015/0100316 A1 4/2015 Williams et al.
2015/0100537 A1 4/2015 Grieves et al.
2015/0100983 A1 4/2015 Pan
2015/0106093 A1 4/2015 Weeks et al.
2015/0113407 A1 4/2015 Hoffert et al.
2015/0120723 A1 4/2015 Deshmukh et al.
2015/0121216 A1 4/2015 Brown et al.
2015/0127350 A1 5/2015 Agiomyrgiannakis
2015/0133109 A1 5/2015 Freeman et al.
2015/0134334 A1 5/2015 Sachidanandam et al.
2015/0135085 A1 5/2015 Shoham et al.
2015/0135123 A1 5/2015 Carr et al.
2015/0142420 A1 5/2015 Sarikaya et al.
2015/0142438 A1 5/2015 Dai et al.
2015/0142447 A1 5/2015 Kennewick et al.
2015/0142851 A1 5/2015 Gupta et al.
2015/0148013 A1 5/2015 Baldwin et al.
2015/0149177 A1 5/2015 Kalns et al.
2015/0149182 A1 5/2015 Kalns et al.
2015/0149354 A1 5/2015 Mccoy
2015/0149469 A1 5/2015 Xu et al.
2015/0154185 A1 6/2015 Waibel
2015/0161370 A1 6/2015 North et al.
2015/0161989 A1 6/2015 Hsu et al.
2015/0162001 A1 6/2015 Kar et al.
2015/0163558 A1 6/2015 Wheatley
2015/0169336 A1 6/2015 Harper et al.
2015/0170664 A1 6/2015 Doherty et al.
2015/0172463 A1 6/2015 Quast et al.
2015/0178388 A1 6/2015 Winnemoeller et al.
2015/0179176 A1 6/2015 Ryu et al.
2015/0185964 A1 7/2015 Stout
2015/0186012 A1 7/2015 Coleman et al.
2015/0186110 A1 7/2015 Kannan
2015/0186155 A1 7/2015 Brown et al.
2015/0186156 A1 7/2015 Brown et al.
2015/0186351 A1 7/2015 Hicks et al.
2015/0186538 A1* 7/2015 Yan .................... G06F 3/04842 707/722
2015/0187355 A1 7/2015 Parkinson et al.
2015/0187369 A1 7/2015 Dadu et al.
2015/0189362 A1 7/2015 Lee et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0195379 A1 7/2015 Zhang et al.
2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0201064 A1 7/2015 Bells et al.
2015/0205568 A1* 7/2015 Matsuoka ................ G06F 3/16 704/246
2015/0205858 A1 7/2015 Xie et al.
2015/0208226 A1 7/2015 Kuusilinna et al.
2015/0212791 A1 7/2015 Kumar et al.
2015/0213796 A1 7/2015 Waltermann et al.
2015/0220507 A1 8/2015 Mohajer et al.
2015/0221304 A1 8/2015 Stewart
2015/0221307 A1 8/2015 Shah et al.
2015/0227633 A1 8/2015 Shapira
2015/0228281 A1 8/2015 Raniere
2015/0234636 A1 8/2015 Barnes, Jr.
2015/0234800 A1 8/2015 Patrick et al.
2015/0242091 A1 8/2015 Lu et al.
2015/0243278 A1 8/2015 Kibre et al.
2015/0243283 A1 8/2015 Halash et al.
2015/0245154 A1 8/2015 Dadu et al.
2015/0248651 A1 9/2015 Akutagawa et al.
2015/0248886 A1 9/2015 Sarikaya et al.
2015/0254057 A1* 9/2015 Klein ..................... G06F 3/167 704/275
2015/0254058 A1 9/2015 Klein et al.
2015/0254333 A1 9/2015 Fife et al.
2015/0255071 A1 9/2015 Chiba
2015/0256873 A1 9/2015 Klein et al.
2015/0261496 A1 9/2015 Faaborg et al.
2015/0269139 A1 9/2015 McAteer et al.
2015/0269943 A1* 9/2015 VanBlon ................ G06F 3/013 704/275
2015/0277574 A1 10/2015 Jain et al.
2015/0278370 A1 10/2015 Lusch et al.
2015/0278737 A1* 10/2015 Chen Huebscher ........................ G06Q 10/06314 705/7.18
2015/0279358 A1 10/2015 Kingsbury et al.
2015/0279360 A1 10/2015 Mengibar et al.
2015/0281380 A1 10/2015 Wang et al.
2015/0286627 A1 10/2015 Chang et al.
2015/0287401 A1 10/2015 Lee et al.

(56) References Cited

U.S. PATENT DOCUMENTS

2015/0287409 A1 10/2015 Jang
2015/0288629 A1 10/2015 Choi et al.
2015/0294086 A1 10/2015 Kare et al.
2015/0294516 A1 10/2015 Chiang
2015/0295915 A1 10/2015 Xiu
2015/0302855 A1 10/2015 Kim et al.
2015/0302856 A1 10/2015 Kim et al.
2015/0302857 A1 10/2015 Yamada
2015/0309997 A1 10/2015 Lee et al.
2015/0310858 A1 10/2015 Li et al.
2015/0310862 A1 10/2015 Dauphin et al.
2015/0310879 A1 10/2015 Buchanan et al.
2015/0312182 A1 10/2015 Langholz
2015/0317069 A1 11/2015 Clements et al.
2015/0317310 A1 11/2015 Eiche et al.
2015/0324041 A1 11/2015 Varley et al.
2015/0324334 A1 11/2015 Lee et al.
2015/0331664 A1 11/2015 Osawa et al.
2015/0331711 A1 11/2015 Huang et al.
2015/0332667 A1 11/2015 Mason
2015/0339049 A1 11/2015 Kasemset et al.
2015/0339391 A1 11/2015 Kang et al.
2015/0340040 A1 11/2015 Mun et al.
2015/0340042 A1 11/2015 Sejnoha et al.
2015/0341717 A1 11/2015 Song et al.
2015/0347086 A1 12/2015 Liedholm et al.
2015/0347381 A1 12/2015 Bellegarda
2015/0347382 A1 12/2015 Dolfing et al.
2015/0347385 A1 12/2015 Flor et al.
2015/0347393 A1 12/2015 Futrell et al.
2015/0347733 A1 12/2015 Tsou et al.
2015/0347985 A1 12/2015 Gross et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0350031 A1 12/2015 Burks et al.
2015/0352999 A1 12/2015 Bando et al.
2015/0355879 A1 12/2015 Beckhardt et al.
2015/0370531 A1 12/2015 Faaborg
2015/0370780 A1 12/2015 Wang et al.
2015/0371639 A1 12/2015 Foerster et al.
2015/0371665 A1 12/2015 Naik et al.
2015/0373183 A1 12/2015 Woolsey et al.
2015/0382047 A1 12/2015 Van Os et al.
2015/0382079 A1 12/2015 Lister et al.
2016/0004690 A1 1/2016 Bangalore et al.
2016/0014476 A1 1/2016 Caliendo, Jr. et al.
2016/0019886 A1 1/2016 Hong
2016/0026258 A1 1/2016 Ou et al.
2016/0027431 A1 1/2016 Kurzweil et al.
2016/0028666 A1 1/2016 Li
2016/0029316 A1 1/2016 Mohan et al.
2016/0034811 A1 2/2016 Paulik et al.
2016/0042735 A1 2/2016 Vibbert et al.
2016/0042748 A1 2/2016 Jain et al.
2016/0048666 A1 2/2016 Dey et al.
2016/0055422 A1 2/2016 Li
2016/0062605 A1 3/2016 Agarwal et al.
2016/0063998 A1 3/2016 Krishnamoorthy et al.
2016/0070581 A1 3/2016 Soon-Shiong
2016/0071516 A1 3/2016 Lee et al.
2016/0071521 A1 3/2016 Haughay
2016/0077794 A1 3/2016 Kim et al.
2016/0078860 A1 3/2016 Paulik et al.
2016/0080165 A1 3/2016 Ehsani et al.
2016/0086116 A1 3/2016 Rao et al.
2016/0091967 A1 3/2016 Prokofieva et al.
2016/0092447 A1 3/2016 Venkataraman et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094979 A1 3/2016 Naik et al.
2016/0117386 A1 4/2016 Ajmera et al.
2016/0119338 A1 4/2016 Cheyer
2016/0125048 A1 5/2016 Hamada
2016/0125071 A1 5/2016 Gabbai
2016/0132484 A1 5/2016 Nauze et al.
2016/0139662 A1 5/2016 Dabhade
2016/0147725 A1 5/2016 Patten et al.
2016/0148610 A1 5/2016 Kennewick, Jr. et al.
2016/0155442 A1 6/2016 Kannan et al.
2016/0155443 A1 6/2016 Mooney et al.
2016/0162456 A1 6/2016 Munro et al.
2016/0163312 A1 6/2016 Naik et al.
2016/0170966 A1 6/2016 Kolo
2016/0173578 A1 6/2016 Sharma et al.
2016/0173960 A1 6/2016 Snibbe et al.
2016/0179462 A1 6/2016 Bjorkengren
2016/0180844 A1 6/2016 Vanblon et al.
2016/0182410 A1 6/2016 Janakiraman et al.
2016/0188181 A1 6/2016 Smith
2016/0188738 A1 6/2016 Gruber et al.
2016/0189717 A1 6/2016 Kannan et al.
2016/0210981 A1 7/2016 Lee
2016/0212488 A1 7/2016 Os et al.
2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0240187 A1 8/2016 Fleizach et al.
2016/0247061 A1 8/2016 Trask et al.
2016/0253312 A1 9/2016 Rhodes
2016/0259656 A1 9/2016 Sumner et al.
2016/0260431 A1 9/2016 Newendorp et al.
2016/0260433 A1 9/2016 Sumner et al.
2016/0260436 A1 9/2016 Lemay et al.
2016/0266871 A1 9/2016 Schmid et al.
2016/0267904 A1 9/2016 Biadsy et al.
2016/0275941 A1 9/2016 Bellegarda et al.
2016/0275947 A1 9/2016 Li et al.
2016/0282956 A1 9/2016 Ouyang et al.
2016/0284199 A1 9/2016 Dotan-Cohen et al.
2016/0286045 A1 9/2016 Shaltiel et al.
2016/0299685 A1 10/2016 Zhai et al.
2016/0299882 A1 10/2016 Hegerty et al.
2016/0299883 A1 10/2016 Zhu et al.
2016/0307566 A1 10/2016 Bellegarda
2016/0314788 A1 10/2016 Jitkoff et al.
2016/0314792 A1 10/2016 Alvarez et al.
2016/0321261 A1 11/2016 Spasojevic et al.
2016/0322045 A1 11/2016 Hatfeild et al.
2016/0322050 A1 11/2016 Wang et al.
2016/0328893 A1 11/2016 Cordova et al.
2016/0336007 A1 11/2016 Hanazawa
2016/0336010 A1 11/2016 Lindahl
2016/0337299 A1 11/2016 Lane et al.
2016/0337301 A1 11/2016 Rollins et al.
2016/0342685 A1 11/2016 Basu et al.
2016/0351190 A1 12/2016 Binder et al.
2016/0357304 A1 12/2016 Hatori et al.
2016/0357728 A1 12/2016 Bellegarda et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358619 A1 12/2016 Ramprashad et al.
2016/0359771 A1 12/2016 Sridhar
2016/0360039 A1 12/2016 Sanghavi et al.
2016/0364378 A1 12/2016 Futrell et al.
2016/0371250 A1 12/2016 Rhodes
2016/0378747 A1 12/2016 Orr et al.
2016/0379641 A1 12/2016 Liu et al.
2017/0004824 A1 1/2017 Yoo et al.
2017/0019987 A1 1/2017 Dragone et al.
2017/0031576 A1 2/2017 Saoji et al.
2017/0032787 A1* 2/2017 Dayal .................. A61H 3/061
2017/0040002 A1 2/2017 Basson et al.
2017/0055895 A1 3/2017 Des Jardins et al.
2017/0060853 A1 3/2017 Lee et al.
2017/0068423 A1 3/2017 Napolitano et al.
2017/0068513 A1 3/2017 Stasior et al.

(56) References Cited

U.S. PATENT DOCUMENTS

| | | | |
|---|---|---|---|
| 2017/0068670 A1 | 3/2017 | Orr et al. | |
| 2017/0083179 A1 | 3/2017 | Gruber et al. | |
| 2017/0091168 A1 | 3/2017 | Bellegarda et al. | |
| 2017/0092270 A1 | 3/2017 | Newendorp et al. | |
| 2017/0092278 A1 | 3/2017 | Evermann et al. | |
| 2017/0105190 A1 | 4/2017 | Logan et al. | |
| 2017/0116989 A1 | 4/2017 | Yadgar et al. | |
| 2017/0127124 A9 | 5/2017 | Wilson et al. | |
| 2017/0132199 A1 | 5/2017 | Vescovi et al. | |
| 2017/0140644 A1 | 5/2017 | Hwang et al. | |
| 2017/0161018 A1 | 6/2017 | Lemay et al. | |
| 2017/0169819 A1 | 6/2017 | Mese et al. | |
| 2017/0178619 A1 | 6/2017 | Naik et al. | |
| 2017/0178626 A1 | 6/2017 | Gruber et al. | |
| 2017/0180499 A1 | 6/2017 | Gelfenbeyn et al. | |
| 2017/0186429 A1 | 6/2017 | Giuli et al. | |
| 2017/0193083 A1 | 7/2017 | Bhatt et al. | |
| 2017/0199874 A1 | 7/2017 | Patel et al. | |
| 2017/0227935 A1 | 8/2017 | Su et al. | |
| 2017/0230709 A1 | 8/2017 | Van Os et al. | |
| 2017/0242653 A1 | 8/2017 | Lang et al. | |
| 2017/0243468 A1 | 8/2017 | Dotan-Cohen et al. | |
| 2017/0256256 A1 | 9/2017 | Wang et al. | |
| 2017/0263248 A1 | 9/2017 | Gruber et al. | |
| 2017/0285915 A1 | 10/2017 | Napolitano et al. | |
| 2017/0316775 A1 | 11/2017 | Le et al. | |
| 2017/0316782 A1 | 11/2017 | Haughay et al. | |
| 2017/0323637 A1 | 11/2017 | Naik | |
| 2017/0345411 A1 | 11/2017 | Raitio et al. | |
| 2017/0352346 A1 | 12/2017 | Paulik et al. | |
| 2017/0352350 A1 | 12/2017 | Booker et al. | |
| 2017/0357478 A1 | 12/2017 | Piersol et al. | |
| 2017/0357632 A1 | 12/2017 | Pagallo et al. | |
| 2017/0357633 A1 | 12/2017 | Wang et al. | |
| 2017/0357637 A1 | 12/2017 | Nell et al. | |
| 2017/0357640 A1 | 12/2017 | Bellegarda et al. | |
| 2017/0357716 A1 | 12/2017 | Bellegarda et al. | |
| 2017/0358300 A1 | 12/2017 | Laurens et al. | |
| 2017/0358301 A1 | 12/2017 | Raitio et al. | |
| 2017/0358304 A1 | 12/2017 | Castillo et al. | |
| 2017/0358305 A1 | 12/2017 | Kudurshian et al. | |
| 2018/0007538 A1 | 1/2018 | Naik et al. | |
| 2018/0012596 A1 | 1/2018 | Piernot et al. | |
| 2018/0033431 A1 | 2/2018 | Newendorp et al. | |
| 2018/0090143 A1 | 3/2018 | Saddler et al. | |
| 2018/0108346 A1 | 4/2018 | Paulik et al. | |
| 2018/0191670 A1* | 7/2018 | Suyama | H04L 61/256 |
| 2019/0259386 A1 | 8/2019 | Kudurshian et al. | |

FOREIGN PATENT DOCUMENTS

| | | | |
|---|---|---|---|
| CA | 2666438 | C | 6/2013 |
| CH | 681573 | A5 | 4/1993 |
| CN | 1263385 | A | 8/2000 |
| CN | 1274440 | A | 11/2000 |
| CN | 1369858 | A | 9/2002 |
| CN | 1378156 | A | 11/2002 |
| CN | 1383109 | A | 12/2002 |
| CN | 1407795 | A | 4/2003 |
| CN | 1125436 | C | 10/2003 |
| CN | 1471098 | A | 1/2004 |
| CN | 1494695 | A | 5/2004 |
| CN | 1535519 | A | 10/2004 |
| CN | 1640191 | A | 7/2005 |
| CN | 1673939 | A | 9/2005 |
| CN | 1864204 | A | 11/2006 |
| CN | 1898721 | A | 1/2007 |
| CN | 2865153 | Y | 1/2007 |
| CN | 1959628 | A | 5/2007 |
| CN | 1975715 | A | 6/2007 |
| CN | 1995917 | A | 7/2007 |
| CN | 101008942 | A | 8/2007 |
| CN | 101162153 | A | 4/2008 |
| CN | 101174366 | A | 5/2008 |
| CN | 101179754 | A | 5/2008 |
| CN | 101183525 | A | 5/2008 |
| CN | 101188644 | A | 5/2008 |
| CN | 101228503 | A | 7/2008 |
| CN | 101233741 | A | 7/2008 |
| CN | 101246020 | A | 8/2008 |
| CN | 101271689 | A | 9/2008 |
| CN | 101277501 | A | 10/2008 |
| CN | 101281745 | A | 10/2008 |
| CN | 101292282 | A | 10/2008 |
| CN | 101297541 | A | 10/2008 |
| CN | 101325756 | A | 12/2008 |
| CN | 101416471 | A | 4/2009 |
| CN | 101427244 | A | 5/2009 |
| CN | 101448340 | A | 6/2009 |
| CN | 101453498 | A | 6/2009 |
| CN | 101499156 | A | 8/2009 |
| CN | 101500041 | A | 8/2009 |
| CN | 101535983 | A | 9/2009 |
| CN | 101547396 | A | 9/2009 |
| CN | 101557432 | A | 10/2009 |
| CN | 101604521 | A | 12/2009 |
| CN | 101632316 | A | 1/2010 |
| CN | 101636736 | A | 1/2010 |
| CN | 101673544 | A | 3/2010 |
| CN | 101751387 | A | 6/2010 |
| CN | 101847405 | A | 9/2010 |
| CN | 101894547 | A | 11/2010 |
| CN | 101939740 | A | 1/2011 |
| CN | 101951553 | A | 1/2011 |
| CN | 102137193 | A | 7/2011 |
| CN | 102160043 | A | 8/2011 |
| CN | 102246136 | A | 11/2011 |
| CN | 202035047 | U | 11/2011 |
| CN | 102282609 | A | 12/2011 |
| CN | 202092650 | U | 12/2011 |
| CN | 102368256 | A | 3/2012 |
| CN | 102498457 | A | 6/2012 |
| CN | 102629246 | A | 8/2012 |
| CN | 102682771 | A | 9/2012 |
| CN | 102685295 | A | 9/2012 |
| CN | 102693725 | A | 9/2012 |
| CN | 102792320 | A | 11/2012 |
| CN | 102870065 | A | 1/2013 |
| CN | 102917004 | A | 2/2013 |
| CN | 103035240 | A | 4/2013 |
| CN | 103038728 | A | 4/2013 |
| CN | 104281259 | A | 1/2015 |
| CN | 104284257 | A | 1/2015 |
| CN | 104423625 | A | 3/2015 |
| CN | 104516522 | A | 4/2015 |
| DE | 3837590 | A1 | 5/1990 |
| DE | 4126902 | A1 | 2/1992 |
| DE | 4334773 | A1 | 4/1994 |
| DE | 4445023 | A1 | 6/1996 |
| DE | 102004029203 | A1 | 12/2005 |
| DE | 19841541 | B4 | 12/2007 |
| DE | 102008024258 | A1 | 11/2009 |
| EP | 30390 | A1 | 6/1981 |
| EP | 57514 | A1 | 8/1982 |
| EP | 59880 | A2 | 9/1982 |
| EP | 138061 | A1 | 4/1985 |
| EP | 140777 | A1 | 5/1985 |
| EP | 218859 | A2 | 4/1987 |
| EP | 262938 | A1 | 4/1988 |
| EP | 138061 | B1 | 6/1988 |
| EP | 283995 | A2 | 9/1988 |
| EP | 293259 | A2 | 11/1988 |
| EP | 299572 | A2 | 1/1989 |
| EP | 313975 | A2 | 5/1989 |
| EP | 314908 | A2 | 5/1989 |
| EP | 327408 | A2 | 8/1989 |
| EP | 389271 | A2 | 9/1990 |
| EP | 411675 | A2 | 2/1991 |
| EP | 441089 | A2 | 8/1991 |
| EP | 464712 | A2 | 1/1992 |
| EP | 476972 | A2 | 3/1992 |
| EP | 534410 | A2 | 3/1993 |
| EP | 558312 | A1 | 9/1993 |
| EP | 559349 | A1 | 9/1993 |

(56) References Cited

FOREIGN PATENT DOCUMENTS

| | | | |
|---|---|---|---|
| EP | 570660 | A1 | 11/1993 |
| EP | 575146 | A2 | 12/1993 |
| EP | 578604 | A1 | 1/1994 |
| EP | 586996 | A2 | 3/1994 |
| EP | 609030 | A1 | 8/1994 |
| EP | 651543 | A2 | 5/1995 |
| EP | 679005 | A1 | 10/1995 |
| EP | 795811 | A1 | 9/1997 |
| EP | 476972 | B1 | 5/1998 |
| EP | 845894 | A2 | 6/1998 |
| EP | 852052 | A1 | 7/1998 |
| EP | 863453 | A1 | 9/1998 |
| EP | 863469 | A2 | 9/1998 |
| EP | 867860 | A2 | 9/1998 |
| EP | 869697 | A2 | 10/1998 |
| EP | 559349 | B1 | 1/1999 |
| EP | 889626 | A1 | 1/1999 |
| EP | 917077 | A2 | 5/1999 |
| EP | 691023 | B1 | 9/1999 |
| EP | 946032 | A2 | 9/1999 |
| EP | 981236 | A1 | 2/2000 |
| EP | 982732 | A1 | 3/2000 |
| EP | 984430 | A2 | 3/2000 |
| EP | 1001588 | A2 | 5/2000 |
| EP | 1014277 | A1 | 6/2000 |
| EP | 1028425 | A2 | 8/2000 |
| EP | 1028426 | A2 | 8/2000 |
| EP | 1047251 | A2 | 10/2000 |
| EP | 1052566 | A1 | 11/2000 |
| EP | 1076302 | A1 | 2/2001 |
| EP | 1091615 | A1 | 4/2001 |
| EP | 1094406 | A2 | 4/2001 |
| EP | 1107229 | A2 | 6/2001 |
| EP | 1229496 | A2 | 8/2002 |
| EP | 1233600 | A2 | 8/2002 |
| EP | 1245023 | A1 | 10/2002 |
| EP | 1246075 | A2 | 10/2002 |
| EP | 1280326 | A1 | 1/2003 |
| EP | 1291848 | A2 | 3/2003 |
| EP | 1311102 | A1 | 5/2003 |
| EP | 1315084 | A1 | 5/2003 |
| EP | 1315086 | A1 | 5/2003 |
| EP | 1347361 | A1 | 9/2003 |
| EP | 1368961 | A2 | 12/2003 |
| EP | 1379061 | A2 | 1/2004 |
| EP | 1432219 | A1 | 6/2004 |
| EP | 1435620 | A1 | 7/2004 |
| EP | 1480421 | A1 | 11/2004 |
| EP | 1517228 | A2 | 3/2005 |
| EP | 1536612 | A1 | 6/2005 |
| EP | 1566948 | A1 | 8/2005 |
| EP | 1650938 | A1 | 4/2006 |
| EP | 1675025 | A2 | 6/2006 |
| EP | 1693829 | A1 | 8/2006 |
| EP | 1699042 | A1 | 9/2006 |
| EP | 1739546 | A2 | 1/2007 |
| EP | 1181802 | B1 | 2/2007 |
| EP | 1818786 | A1 | 8/2007 |
| EP | 1892700 | A1 | 2/2008 |
| EP | 1912205 | A2 | 4/2008 |
| EP | 1939860 | A1 | 7/2008 |
| EP | 1944997 | A2 | 7/2008 |
| EP | 651543 | B1 | 9/2008 |
| EP | 1909263 | B1 | 1/2009 |
| EP | 1335620 | B1 | 3/2009 |
| EP | 2069895 | A1 | 6/2009 |
| EP | 2094032 | A1 | 8/2009 |
| EP | 2096840 | A1 | 9/2009 |
| EP | 2107553 | A1 | 10/2009 |
| EP | 2109295 | A1 | 10/2009 |
| EP | 1720375 | B1 | 7/2010 |
| EP | 2205010 | A1 | 7/2010 |
| EP | 2309491 | A1 | 4/2011 |
| EP | 2329348 | | 6/2011 |
| EP | 2400373 | A1 | 12/2011 |

| | | | |
|---|---|---|---|
| EP | 2431842 | A2 | 3/2012 |
| EP | 2551784 | A1 | 1/2013 |
| EP | 2555536 | A1 | 2/2013 |
| EP | 2575128 | A2 | 4/2013 |
| EP | 2733598 | A2 | 5/2014 |
| EP | 2801890 | A1 | 11/2014 |
| EP | 2801972 | A1 | 11/2014 |
| EP | 2824564 | A1 | 1/2015 |
| EP | 2930715 | A1 | 10/2015 |
| EP | 2938022 | A1 | 10/2015 |
| EP | 2940556 | A1 | 11/2015 |
| FR | 2911201 | A1 | 7/2008 |
| GB | 2293667 | A | 4/1996 |
| GB | 2310559 | A | 8/1997 |
| GB | 2323694 | A | 9/1998 |
| GB | 2342802 | A | 4/2000 |
| GB | 2343285 | A | 5/2000 |
| GB | 2346500 | A | 8/2000 |
| GB | 2352377 | A | 1/2001 |
| GB | 2384399 | A | 7/2003 |
| GB | 2402855 | A | 12/2004 |
| GB | 2445436 | A | 7/2008 |
| GB | 2445667 | A | 7/2008 |
| IT | FI20010199 | A1 | 4/2003 |
| JP | 55-80084 | A | 6/1980 |
| JP | 57-41731 | A | 3/1982 |
| JP | 59-57336 | A | 4/1984 |
| JP | 62-153326 | A | 7/1987 |
| JP | 1-500631 | A | 3/1989 |
| JP | 1-254742 | A | 10/1989 |
| JP | 2-86397 | A | 3/1990 |
| JP | 2-153415 | A | 6/1990 |
| JP | 3-113578 | A | 5/1991 |
| JP | 4-236624 | A | 8/1992 |
| JP | 5-79951 | A | 3/1993 |
| JP | 5-165459 | A | 7/1993 |
| JP | 5-293126 | A | 11/1993 |
| JP | 6-19965 | A | 1/1994 |
| JP | 6-69954 | A | 3/1994 |
| JP | 6-274586 | A | 9/1994 |
| JP | 6-332617 | A | 12/1994 |
| JP | 7-199379 | A | 8/1995 |
| JP | 7-219961 | A | 8/1995 |
| JP | 7-320051 | A | 12/1995 |
| JP | 7-320079 | A | 12/1995 |
| JP | 8-63330 | A | 3/1996 |
| JP | 8-185265 | A | 7/1996 |
| JP | 8-223281 | A | 8/1996 |
| JP | 8-227341 | A | 9/1996 |
| JP | 9-18585 | A | 1/1997 |
| JP | 9-27000 | A | 1/1997 |
| JP | 9-55792 | A | 2/1997 |
| JP | 9-259063 | A | 10/1997 |
| JP | 9-265457 | A | 10/1997 |
| JP | 10-31497 | A | 2/1998 |
| JP | 10-78952 | A | 3/1998 |
| JP | 10-105324 | A | 4/1998 |
| JP | 10-274997 | A | 10/1998 |
| JP | 10-320169 | A | 12/1998 |
| JP | 11-06743 | A | 1/1999 |
| JP | 11-45241 | A | 2/1999 |
| JP | 11-136278 | A | 5/1999 |
| JP | 11-231886 | A | 8/1999 |
| JP | 11-265400 | A | 9/1999 |
| JP | 2000-32140 | A | 1/2000 |
| JP | 2000-90119 | A | 3/2000 |
| JP | 2000-99225 | A | 4/2000 |
| JP | 2000-134407 | A | 5/2000 |
| JP | 2000-163031 | A | 6/2000 |
| JP | 2000-207167 | A | 7/2000 |
| JP | 2000-216910 | A | 8/2000 |
| JP | 2000-224663 | A | 8/2000 |
| JP | 2000-272349 | A | 10/2000 |
| JP | 2000-331004 | A | 11/2000 |
| JP | 2000-339137 | A | 12/2000 |
| JP | 2000-352988 | A | 12/2000 |
| JP | 2000-352989 | A | 12/2000 |
| JP | 2001-13978 | A | 1/2001 |
| JP | 2001-14319 | A | 1/2001 |

(56) References Cited

FOREIGN PATENT DOCUMENTS

| | | | |
|---|---|---|---|
| JP | 2001-22498 | A | 1/2001 |
| JP | 2001-34289 | A | 2/2001 |
| JP | 2001-34290 | A | 2/2001 |
| JP | 2001-56233 | A | 2/2001 |
| JP | 2001-109493 | A | 4/2001 |
| JP | 2001-125896 | A | 5/2001 |
| JP | 2001-148899 | A | 5/2001 |
| JP | 2001-273283 | A | 10/2001 |
| JP | 2001-282813 | A | 10/2001 |
| JP | 2001-296880 | A | 10/2001 |
| JP | 2002-14954 | A | 1/2002 |
| JP | 2002-24212 | A | 1/2002 |
| JP | 2002-30676 | A | 1/2002 |
| JP | 2002-41276 | A | 2/2002 |
| JP | 2002-41624 | A | 2/2002 |
| JP | 2002-82748 | A | 3/2002 |
| JP | 2002-82893 | A | 3/2002 |
| JP | 2002-132804 | A | 5/2002 |
| JP | 2002-169588 | A | 6/2002 |
| JP | 2002-230021 | A | 8/2002 |
| JP | 2002-524806 | A | 8/2002 |
| JP | 2002-281562 | A | 9/2002 |
| JP | 2002-342033 | A | 11/2002 |
| JP | 2002-342212 | A | 11/2002 |
| JP | 2002-344880 | A | 11/2002 |
| JP | 2002-542501 | A | 12/2002 |
| JP | 2003-15682 | A | 1/2003 |
| JP | 2003-44091 | A | 2/2003 |
| JP | 2003-84877 | A | 3/2003 |
| JP | 2003-517158 | A | 5/2003 |
| JP | 2003-233568 | A | 8/2003 |
| JP | 2003-244317 | A | 8/2003 |
| JP | 2003-527656 | A | 9/2003 |
| JP | 2003-288356 | A | 10/2003 |
| JP | 2003-533909 | A | 11/2003 |
| JP | 2004-48804 | A | 2/2004 |
| JP | 2004-54080 | A | 2/2004 |
| JP | 2004-505322 | A | 2/2004 |
| JP | 2004-505525 | A | 2/2004 |
| JP | 2004-86356 | A | 3/2004 |
| JP | 2004-94936 | A | 3/2004 |
| JP | 2004-117905 | A | 4/2004 |
| JP | 2004-152063 | A | 5/2004 |
| JP | 2004-523004 | A | 7/2004 |
| JP | 2004-295837 | A | 10/2004 |
| JP | 2004-534268 | A | 11/2004 |
| JP | 2004-347786 | A | 12/2004 |
| JP | 2005-55782 | A | 3/2005 |
| JP | 2005-63257 | A | 3/2005 |
| JP | 2005-70645 | A | 3/2005 |
| JP | 2005-80094 | A | 3/2005 |
| JP | 2005-86624 | A | 3/2005 |
| JP | 2005-506602 | A | 3/2005 |
| JP | 2005-92441 | A | 4/2005 |
| JP | 2005-149481 | A | 6/2005 |
| JP | 2005-181386 | A | 7/2005 |
| JP | 2005-189454 | A | 7/2005 |
| JP | 2005-221678 | A | 8/2005 |
| JP | 2005-283843 | A | 10/2005 |
| JP | 2005-311864 | A | 11/2005 |
| JP | 2005-332212 | A | 12/2005 |
| JP | 2006-4274 | A | 1/2006 |
| JP | 2006-23860 | A | 1/2006 |
| JP | 2006-30447 | A | 2/2006 |
| JP | 2006-31092 | A | 2/2006 |
| JP | 2006-59094 | A | 3/2006 |
| JP | 2006-80617 | A | 3/2006 |
| JP | 2006-107438 | A | 4/2006 |
| JP | 2006-146008 | A | 6/2006 |
| JP | 2006-146182 | A | 6/2006 |
| JP | 2006-155368 | A | 6/2006 |
| JP | 2006-189394 | A | 7/2006 |
| JP | 2006-195637 | A | 7/2006 |
| JP | 2006-201870 | A | 8/2006 |
| JP | 2006-208696 | A | 8/2006 |
| JP | 2006-244296 | A | 9/2006 |
| JP | 2006-267328 | A1 | 10/2006 |
| JP | 2006-302091 | A | 11/2006 |
| JP | 2006-526185 | A | 11/2006 |
| JP | 2007-4633 | A | 1/2007 |
| JP | 2007-17990 | A | 1/2007 |
| JP | 2007-500903 | A | 1/2007 |
| JP | 2007-53796 | A | 3/2007 |
| JP | 2007-79690 | A | 3/2007 |
| JP | 2007-171534 | A | 7/2007 |
| JP | 2007-193794 | A | 8/2007 |
| JP | 2007-206317 | A | 8/2007 |
| JP | 2007-264471 | A | 10/2007 |
| JP | 2007-264792 | A | 10/2007 |
| JP | 2007-264892 | A | 10/2007 |
| JP | 2007-299352 | A | 11/2007 |
| JP | 2007-325089 | A | 12/2007 |
| JP | 2008-009120 | A | 1/2008 |
| JP | 2008-21002 | A | 1/2008 |
| JP | 2008-26381 | A | 2/2008 |
| JP | 2008-39928 | A | 2/2008 |
| JP | 2008-58813 | A | 3/2008 |
| JP | 2008-064687 | A | 3/2008 |
| JP | 2008-90545 | A | 4/2008 |
| JP | 2008-97003 | A | 4/2008 |
| JP | 2008-134949 | A | 6/2008 |
| JP | 2008-158510 | A | 7/2008 |
| JP | 2008-526101 | A | 7/2008 |
| JP | 2008-185693 | A | 8/2008 |
| JP | 2008-198022 | A | 8/2008 |
| JP | 2008-217468 | A | 9/2008 |
| JP | 2008-228129 | A | 9/2008 |
| JP | 2008-233678 | A | 10/2008 |
| JP | 2008-236448 | A | 10/2008 |
| JP | 2008-252161 | A | 10/2008 |
| JP | 2008-268684 | A | 11/2008 |
| JP | 2008-269480 | A | 11/2008 |
| JP | 2008-271481 | A | 11/2008 |
| JP | 2008-275731 | A | 11/2008 |
| JP | 2008-299221 | A | 12/2008 |
| JP | 2009-2850 | A | 1/2009 |
| JP | 2009-503623 | A | 1/2009 |
| JP | 2009-36999 | A | 2/2009 |
| JP | 2009-505142 | A | 2/2009 |
| JP | 2009-47920 | A | 3/2009 |
| JP | 2009-069062 | A | 4/2009 |
| JP | 2009-98490 | A | 5/2009 |
| JP | 2009-110300 | A | 5/2009 |
| JP | 2009-134409 | A | 6/2009 |
| JP | 2009-140444 | A | 6/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-223840 | A | 10/2009 |
| JP | 2009-294913 | A | 12/2009 |
| JP | 2009-294946 | A | 12/2009 |
| JP | 2010-66519 | A | 3/2010 |
| JP | 2010-78979 | A | 4/2010 |
| JP | 2010-108378 | A | 5/2010 |
| JP | 2010-518475 | A | 5/2010 |
| JP | 2010-518526 | A | 5/2010 |
| JP | 2010-157207 | A | 7/2010 |
| JP | 2010-224236 | A | 10/2010 |
| JP | 4563106 | B2 | 10/2010 |
| JP | 2010-535377 | A | 11/2010 |
| JP | 2010-287063 | A | 12/2010 |
| JP | 2011-33874 | A | 2/2011 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2011-238022 | A | 11/2011 |
| JP | 2011-250027 | A | 12/2011 |
| JP | 2012-014394 | A | 1/2012 |
| JP | 2012-508530 | A | 4/2012 |
| JP | 2012-089020 | A | 5/2012 |

(56) References Cited

FOREIGN PATENT DOCUMENTS

| | | | |
|---|---|---|---|
| JP | 2012-116442 | A | 6/2012 |
| JP | 2012-147063 | A | 8/2012 |
| JP | 2012-518847 | A | 8/2012 |
| JP | 2013-37688 | A | 2/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-080476 | A | 5/2013 |
| JP | 2013-517566 | A | 5/2013 |
| JP | 2013-134430 | A | 7/2013 |
| JP | 2013-527947 | A | 7/2013 |
| JP | 2013-528012 | A | 7/2013 |
| JP | 2013-156349 | A | 8/2013 |
| JP | 2013-200423 | A | 10/2013 |
| JP | 2013-205999 | A | 10/2013 |
| JP | 2013-238936 | A | 11/2013 |
| JP | 2014-10688 | A | 1/2014 |
| JP | 2014-026629 | A | 2/2014 |
| JP | 2014-60600 | A | 4/2014 |
| JP | 2014-72586 | A | 4/2014 |
| JP | 2014-077969 | A | 5/2014 |
| JP | 2014-124332 | A | 7/2014 |
| JP | 2014-140121 | A | 7/2014 |
| JP | 2014-145842 | A | 8/2014 |
| JP | 2014-150323 | A | 8/2014 |
| JP | 2014-219614 | A | 11/2014 |
| JP | 2014-222514 | A | 11/2014 |
| JP | 2015-18365 | A | 1/2015 |
| JP | 2015-501022 | A | 1/2015 |
| JP | 2015-41845 | A | 3/2015 |
| JP | 2015-94848 | A | 5/2015 |
| JP | 2015-519675 | A | 7/2015 |
| JP | 2015-528140 | A | 9/2015 |
| JP | 2015-528918 | A | 10/2015 |
| JP | 2016-119615 | A | 6/2016 |
| KR | 10-1999-0073234 | A | 10/1999 |
| KR | 2001-0093654 | A | 10/2001 |
| KR | 10-2001-0102132 | A | 11/2001 |
| KR | 2002-0013984 | A | 2/2002 |
| KR | 2002-0057262 | A | 7/2002 |
| KR | 2002-0064149 | A | 8/2002 |
| KR | 2002-0069952 | A | 9/2002 |
| KR | 2003-0016993 | A | 3/2003 |
| KR | 10-2004-0014835 | A | 2/2004 |
| KR | 10-2004-0044632 | A | 5/2004 |
| KR | 10-2005-0083561 | A | 8/2005 |
| KR | 10-2005-0090568 | A | 9/2005 |
| KR | 10-2006-0011603 | A | 2/2006 |
| KR | 10-2006-0012730 | A | 2/2006 |
| KR | 10-2006-0055313 | A | 5/2006 |
| KR | 10-2006-0073574 | A | 6/2006 |
| KR | 10-2006-0091469 | A | 8/2006 |
| KR | 10-2007-0024262 | A | 3/2007 |
| KR | 10-2007-0071675 | A | 7/2007 |
| KR | 10-2007-0094767 | A | 9/2007 |
| KR | 10-0757496 | B1 | 9/2007 |
| KR | 10-2007-0100837 | A | 10/2007 |
| KR | 10-0776800 | B1 | 11/2007 |
| KR | 10-0801227 | B1 | 2/2008 |
| KR | 10-0810500 | B1 | 3/2008 |
| KR | 10-2008-0033070 | A | 4/2008 |
| KR | 10-0819928 | B1 | 4/2008 |
| KR | 10-2008-0049647 | A | 6/2008 |
| KR | 10-2008-0059332 | A | 6/2008 |
| KR | 10-2008-0109322 | A | 12/2008 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2009-0129192 | A | 12/2009 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-1178310 | B1 | 8/2012 |
| KR | 10-2012-0120316 | A | 11/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0147557 | A | 12/2014 |
| KR | 10-2015-0043512 | A | 4/2015 |
| KR | 10-2015-0095624 | A | 8/2015 |
| KR | 10-2016-0004351 | A | 1/2016 |
| KR | 10-2016-0010523 | A | 1/2016 |
| KR | 10-2016-0040279 | A | 4/2016 |
| NL | 1014847 | C | 10/2001 |
| RU | 2273106 | C2 | 3/2006 |
| RU | 2349970 | C2 | 3/2009 |
| RU | 2353068 | C2 | 4/2009 |
| RU | 2364917 | C2 | 8/2009 |
| TW | 468323 | B | 12/2001 |
| TW | 200601264 | A | 1/2006 |
| TW | 200638337 | A | 11/2006 |
| TW | 200643744 | A | 12/2006 |
| TW | 200801988 | A | 1/2008 |
| TW | I301373 | B | 9/2008 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 2011-42823 | A1 | 12/2011 |
| TW | 201227715 | A1 | 7/2012 |
| TW | 201245989 | A1 | 11/2012 |
| TW | 201312548 | A1 | 3/2013 |
| WO | 1993/020640 | A1 | 10/1993 |
| WO | 1994/016434 | A1 | 7/1994 |
| WO | 1994/029788 | A1 | 12/1994 |
| WO | 1995/002221 | A1 | 1/1995 |
| WO | 1995/016950 | A1 | 6/1995 |
| WO | 1995/017746 | A1 | 6/1995 |
| WO | 1997/010586 | A1 | 3/1997 |
| WO | 1997/026612 | A1 | 7/1997 |
| WO | 1997/029614 | A1 | 8/1997 |
| WO | 1997/038488 | A1 | 10/1997 |
| WO | 1997/049044 | A1 | 12/1997 |
| WO | 1998/009270 | A1 | 3/1998 |
| WO | 1998/033111 | A1 | 7/1998 |
| WO | 1998/041956 | A1 | 9/1998 |
| WO | 1999/001834 | A1 | 1/1999 |
| WO | 1999/008238 | A1 | 2/1999 |
| WO | 1999/016181 | A1 | 4/1999 |
| WO | 1999/056227 | A1 | 11/1999 |
| WO | 2000/014727 | A1 | 3/2000 |
| WO | 2000/014728 | A1 | 3/2000 |
| WO | 2000/019697 | A1 | 4/2000 |
| WO | 2000/022820 | A1 | 4/2000 |
| WO | 2000/029964 | A1 | 5/2000 |
| WO | 2000/030070 | A2 | 5/2000 |
| WO | 2000/038041 | A1 | 6/2000 |
| WO | 2000/044173 | A1 | 7/2000 |
| WO | 2000/060435 | A2 | 10/2000 |
| WO | 2000/060435 | A3 | 10/2000 |

(56) References Cited

FOREIGN PATENT DOCUMENTS

| | | | |
|---|---|---|---|
| WO | 2000/063766 | A1 | 10/2000 |
| WO | 2000/068936 | A1 | 11/2000 |
| WO | 2001/006489 | A1 | 1/2001 |
| WO | 2001/030046 | A2 | 4/2001 |
| WO | 2001/030047 | A2 | 4/2001 |
| WO | 2001/033569 | A1 | 5/2001 |
| WO | 2001/035391 | A1 | 5/2001 |
| WO | 2001/044912 | A2 | 6/2001 |
| WO | 2001/046946 | A1 | 6/2001 |
| WO | 2001/065413 | A1 | 9/2001 |
| WO | 2001/067753 | A1 | 9/2001 |
| WO | 2001/071480 | A2 | 9/2001 |
| WO | 2002/010900 | A2 | 2/2002 |
| WO | 2002/025610 | A1 | 3/2002 |
| WO | 2002/031814 | A1 | 4/2002 |
| WO | 2002/037469 | A2 | 5/2002 |
| WO | 2002/049253 | A2 | 6/2002 |
| WO | 2002/071259 | A1 | 9/2002 |
| WO | 2002/073603 | A1 | 9/2002 |
| WO | 2003/003152 | A2 | 1/2003 |
| WO | 2003/003765 | A1 | 1/2003 |
| WO | 2003/023786 | A2 | 3/2003 |
| WO | 2003/036457 | A2 | 5/2003 |
| WO | 2003/041364 | A2 | 5/2003 |
| WO | 2003/049494 | A1 | 6/2003 |
| WO | 2003/056789 | A1 | 7/2003 |
| WO | 2003/067202 | A2 | 8/2003 |
| WO | 2003/084196 | A1 | 10/2003 |
| WO | 2003/094489 | A1 | 11/2003 |
| WO | 2003/105125 | A1 | 12/2003 |
| WO | 2003/107179 | A1 | 12/2003 |
| WO | 2004/008801 | A1 | 1/2004 |
| WO | 2004/025938 | A1 | 3/2004 |
| WO | 2004/047415 | A1 | 6/2004 |
| WO | 2004/055637 | A2 | 7/2004 |
| WO | 2004/057486 | A1 | 7/2004 |
| WO | 2004/061850 | A1 | 7/2004 |
| WO | 2004/084413 | A2 | 9/2004 |
| WO | 2005/003920 | A2 | 1/2005 |
| WO | 2005/008505 | A1 | 1/2005 |
| WO | 2005/008899 | A1 | 1/2005 |
| WO | 2005/010725 | A2 | 2/2005 |
| WO | 2005/027472 | A2 | 3/2005 |
| WO | 2005/027485 | A1 | 3/2005 |
| WO | 2005/031737 | A1 | 4/2005 |
| WO | 2005/034082 | A1 | 4/2005 |
| WO | 2005/034085 | A1 | 4/2005 |
| WO | 2005/041455 | A1 | 5/2005 |
| WO | 2005/059895 | A1 | 6/2005 |
| WO | 2005/064592 | A1 | 7/2005 |
| WO | 2005/069171 | A1 | 7/2005 |
| WO | 2005/101176 | A2 | 10/2005 |
| WO | 2006/020305 | A2 | 2/2006 |
| WO | 2006/037545 | A2 | 4/2006 |
| WO | 2006/054724 | A1 | 5/2006 |
| WO | 2006/056822 | A1 | 6/2006 |
| WO | 2006/078246 | A1 | 7/2006 |
| WO | 2006/084144 | A2 | 8/2006 |
| WO | 2006/101649 | A2 | 9/2006 |
| WO | 2006/129967 | A1 | 12/2006 |
| WO | 2006/133571 | A1 | 12/2006 |
| WO | 2007/002753 | A2 | 1/2007 |
| WO | 2007/036762 | A1 | 4/2007 |
| WO | 2007/080559 | A2 | 7/2007 |
| WO | 2007/083894 | A1 | 7/2007 |
| WO | 2008/030970 | A2 | 3/2008 |
| WO | 2008/071231 | A1 | 6/2008 |
| WO | 2008/085742 | A2 | 7/2008 |
| WO | 2008/098900 | A2 | 8/2008 |
| WO | 2008/109835 | A2 | 8/2008 |
| WO | 2008/120036 | A1 | 10/2008 |
| WO | 2008/130095 | A1 | 10/2008 |
| WO | 2008/140236 | A1 | 11/2008 |
| WO | 2008/142472 | A1 | 11/2008 |
| WO | 2008/153639 | A1 | 12/2008 |
| WO | 2009/009240 | A2 | 1/2009 |
| WO | 2009/016631 | A2 | 2/2009 |
| WO | 2009/017280 | A1 | 2/2009 |
| WO | 2009/075912 | A1 | 6/2009 |
| WO | 2009/104126 | A1 | 8/2009 |
| WO | 2009/156438 | A1 | 12/2009 |
| WO | 2009/156978 | A1 | 12/2009 |
| WO | 2010/054373 | A2 | 5/2010 |
| WO | 2010/075623 | A1 | 7/2010 |
| WO | 2010/100937 | A1 | 9/2010 |
| WO | 2010/141802 | A1 | 12/2010 |
| WO | 2011/057346 | A1 | 5/2011 |
| WO | 2011/060106 | A1 | 5/2011 |
| WO | 2011/088053 | A2 | 7/2011 |
| WO | 2011/093025 | A1 | 8/2011 |
| WO | 2011/116309 | A1 | 9/2011 |
| WO | 2011/133543 | A1 | 10/2011 |
| WO | 2011/150730 | A1 | 12/2011 |
| WO | 2011/163350 | A1 | 12/2011 |
| WO | 2011/088053 | A3 | 1/2012 |
| WO | 2012/019637 | A1 | 2/2012 |
| WO | 2012/129231 | A1 | 9/2012 |
| WO | 2012/135157 | A2 | 10/2012 |
| WO | 2012/154317 | A1 | 11/2012 |
| WO | 2012/155079 | A2 | 11/2012 |
| WO | 2012/167168 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/163113 | A1 | 10/2013 |
| WO | 2013/169842 | A2 | 11/2013 |
| WO | 2013/173504 | A1 | 11/2013 |
| WO | 2013/173511 | A2 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/022148 | A1 | 2/2014 |
| WO | 2014/028797 | A1 | 2/2014 |
| WO | 2014/031505 | A1 | 2/2014 |
| WO | 2014/066352 | A1 | 5/2014 |
| WO | 2014/078965 | A1 | 5/2014 |
| WO | 2014/093339 | A1 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144579 | A1 | 9/2014 |
| WO | 2014/159581 | A1 | 10/2014 |
| WO | 2014/197336 | A1 | 12/2014 |
| WO | 2014/200728 | A1 | 12/2014 |
| WO | 2014/204659 | A2 | 12/2014 |
| WO | 2015/018440 | A1 | 2/2015 |
| WO | 2015/030796 | A1 | 3/2015 |
| WO | 2015/041892 | A1 | 3/2015 |
| WO | 2015/084659 | A1 | 6/2015 |
| WO | 2015/094169 | A1 | 6/2015 |
| WO | 2015/094369 | A1 | 6/2015 |
| WO | 2015/099939 | A1 | 7/2015 |
| WO | 2015/116151 | A1 | 8/2015 |
| WO | 2015/151133 | A1 | 10/2015 |
| WO | 2015/157013 | A1 | 10/2015 |
| WO | 2015/183401 | A1 | 12/2015 |
| WO | 2015/200207 | A1 | 12/2015 |
| WO | 2016/028946 | A1 | 2/2016 |
| WO | 2016/033257 | A1 | 3/2016 |
| WO | 2016/057268 | A1 | 4/2016 |
| WO | 2016/075081 | A1 | 5/2016 |
| WO | 2016/144982 | A1 | 9/2016 |
| WO | 2016/209444 | A1 | 12/2016 |

(56) References Cited

FOREIGN PATENT DOCUMENTS

WO 2017/044629 A1 3/2017
WO 2017/053311 A1 3/2017

OTHER PUBLICATIONS

2004 Chrysler Pacifica: U-Connect Hands-Free Communication System, The Best and Brightest of 2004, Brief Article, Automotive Industries, Sep. 2003, 1 page.
2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.
Abcom Pty. Ltd. "12.1" 925 Candela Mobile PC, LCDHardware.com, available at <http://www.lcdhardware.com/panel/12_1_panel/default.asp.>, retrieved on Dec. 19, 2002, 2 pages.
ABF Software, "Lens—Magnifying Glass 1.5", available at <http://download.com/3000-2437-10262078.html?tag=1st-0-1>, retrieved on Feb. 11, 2004, 1 page.
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.
Acero et al., "Environmental Robustness in Automatic Speech Recognition", International Conference on Acoustics, Speech and Signal Processing (ICASSP'90), Apr. 1990, 4 pages.
Acero et al., "Robust Speech Recognition by Normalization of the Acoustic Space", International Conference on Acoustics, Speech and Signal Processing, 1991, 4 pages.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
adobe.com, "Reading PDF Documents with Adobe Reader 6.0—A Guide for People with Disabilities", Available online at "https://www.adobe.com/enterprise/accessibility/pdfs/acro6_cg_ue.pdf", Jan. 2004, 76 pages.
Agnas et al., "Spoken Language Translator: First-Year Report", SICS (ISSN 0283-3638), SRI and Telia Research AB, Jan. 1994, 161 pages.
Ahlberg et al., "The Alphaslider: A Compact and Rapid Selector", CHI '94 Proceedings of the SIGCHI Conference on Human Factors in Computing Systems, Apr. 1994, pp. 365-371.
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.
Ahmed et al., "Intelligent Natural Language Query Processor", TENCON '89, Fourth IEEE Region 10 International Conference, Nov. 22-24, 1989, pp. 47-49.
Ahuja et al., "A Comparison of Application Sharing Mechanisms in Real-Time Desktop Conferencing Systems", AT&T Bell Laboratories, 1990, pp. 238-248.
Aikawa et al., "Generation for Multilingual MT", available at <http://mtarchive.info/MTS-2001-Aikawa.pdf>, retrieved on Sep. 18, 2001, 6 pages.
Aikawa et al., "Speech Recognition Using Time-Warping Neural Networks", Proceedings of the 1991, IEEE Workshop on Neural Networks for Signal Processing, 1991, 10 pages.
Aikawa, K. "Time-Warping Neural Network for Phoneme Recognition", IEEE International Joint Conference on Neural Networks, vol. 3, Nov. 18-21, 1991, pp. 2122-2127.
Alfred App, "Alfred", available at <http://www.alfredapp.com/>, retrieved on Feb. 8, 2012, 5 pages.
All Music Website, available at <http://www.allmusic.com/>, retrieved on Mar. 19, 2007, 2 pages.
Allen et al., "Automated Natural Spoken Dialog", Computer, vol. 35, No. 4, Apr. 2002, pp. 51-56.
Allen, J., "Natural Language Understanding", 2nd Edition, The Benjamin/Cummings Publishing Company, Inc., 1995, 671 pages.
Alleva et al., "Applying SPHINX-II to DARPA Wall Street Journal CSR Task", Proceedings of Speech and Natural Language Workshop, Feb. 1992, pp. 393-398.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems,Tokyo, Sep. 1988, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Amano et al., "A User-friendly Multimedia Book Authoring System", The Institute of Electronics, Information and Communication Engineers Technical Report, vol. 103, No. 416, Nov. 2003, pp. 33-40.
Amano, Junko, "A User-Friendly Authoring System for Digital Talking Books", IEICE Technical Report, The Institute of Electronics, Information and Communication Engineers, vol. 103 No. 418, Nov. 6, 2003, pp. 33-40.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Amrel Corporation, "Rocky Matrix BackLit Keyboard", available at <http://www.amrel.com/asi_matrixkeyboard.html>, retrieved on Dec. 19, 2002, 1 page.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Anhui USTC IFL Ytek Co. Ltd., "Flytek Research Center Information Datasheet", available at <http://www.iflttek.com/english/Research.htm>, retrieved on Oct. 15, 2004, 3 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
API.AI, "Android App Review—Speaktoit Assistant", Available at <https://www.youtube.com/watch?v=myE498nyfGw>, Mar. 30, 2011, 3 pages.
Appelt et al., "Fastus: A Finite-State Processor for Information Extraction from Real-world Text", Proceedings of IJCAI, 1993, 8 pages.

(56) References Cited

OTHER PUBLICATIONS

Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Apple Computer, "Guide Maker Users Guide", Apple Computer, Inc., Apr. 27, 1994, 8 pages.
Apple Computer, "Introduction to Apple Guide", Apple Computer, Inc., Apr. 28, 1994, 20 pages.
Apple Computer, "Knowledge Navigator", published by Apple Computer no later than 2008, as depicted in Exemplary Screenshots from video entitled 'Knowledge Navigator', 2008, 7 pages.
Apple Computer, Inc., "Apple—iPod—Technical Specifications, iPod 20GB and 60GB Mac + PC", available at <http://www.apple.com/ipod/color/specs.html>, 2005, 3 pages.
Apple Computer, Inc., "Apple Announces iTunes 2", Press Release, Oct. 23, 2001, 2 pages.
Apple Computer, Inc., "Apple Introduces iTunes—World's Best and Easiest to Use Jukebox Software", Macworld Expo, Jan. 9, 2001, 2 pages.
Apple Computer, Inc., "Apple's iPod Available in Stores Tomorrow", Press Release, Nov. 9, 2001, 1 page.
Apple Computer, Inc., "Inside Macintosh", vol. VI, 1985.
Apple Computer, Inc. "iTunes 2, Playlist Related Help Screens", iTunes v2.0, 2000-2001, 8 pages.
Apple Computer, Inc. "iTunes 2: Specification Sheet", 2001, 2 pages.
Apple Computer, Inc. "iTunes, Playlist Related Help Screens", iTunes v1.0, 2000-2001, 8 pages.
Apple Computer, Inc. "QuickTime Movie Playback Programming Guide", Aug. 11, 2005, pp. 1-58.
Apple Computer, Inc. "QuickTime Overview", Aug. 11, 2005, pp. 1-34.
Apple Computer, Inc. "Welcome to Tiger", available at <http://www.maths.dundee.ac.uk/software/Welcome_to_Mac_OS_X_v10.4_Tiger.pdf>, 2005, pp. 1-32.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Apple, "VoiceOver", available at <http://www.apple.com/accessibility/voiceover/>, 2014, 3 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
AppleEvent Manager, which is described in the publication Inside Macintosh vol. VI, available from Addison-Wesley Publishing Company, 1985.
Arango et al., "Touring Machine: A Software Platform for Distributed Multimedia Applications", 1992 IFIP International Conference on Upper Layer Protocols, Architectures, and Applications, May 1992, pp. 1-11.
Archbold et al., "A Team User's Guide", SRI International, Dec. 21, 1981, 70 pages.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech and Signal Processing (ICASSP'83), Apr. 1983, 4 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Recognition of a Continuously Read Natural Corpus", IEEE International Conference on Acoustics, Speech, and Signal Processing, vol. 3, Apr. 1978, pp. 422-424.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Bajarin, Tim, "With Low End Launched, Apple Turns to Portable Future", PC Week, vol. 7, Oct. 1990, p. 153(1).
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Barrett et al., "How to Personalize the Web", 1997 in proceddings of the ACM SIGCHI Conference on Human Factors in Computer Systems, Mar. 22-27, 1997, pp. 75-82.
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Beck et al., "Integrating Natural Language, Query Processing, and Semantic Data Models", COMCON Spring '90. IEEE Computer Society International Conference, 1990, Feb. 26-Mar. 2, 1990, pp. 538-543.
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.

(56) References Cited

OTHER PUBLICATIONS

Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jerome R. "Latent Semantic Mapping", IEEE Signal Processing Magazine, vol. 22, No. 5, Sep. 2005, pp. 70-80.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input—A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", Proceedings of the First International Conference on Human Language Technology Research, Paper, 2001, 5 pages.
Benel et al., "Optimal Size and Spacing of Touchscreen Input Areas", Human-Computer Interaction-INTERACT, 1987, pp. 581-585.
Bergmann et al., "An adaptable man-machine interface using connected-word recognition", 2nd European Conference on Speech Communication and Technology (Eurospeech 91), vol. 2, XP002176387, Sep. 24-26, 1991, pp. 467-470.
Beringer et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Symantec", New version of MORE.TM, Apr. 10, 1990, 1 page.
Berry et al., "Task Management under Change and Uncertainty Constraint Solving Experience with the CALO Project", Proceedings of CP'05 Workshop on Constraint Solving under Change, 2005, 5 pages.
Bertulucci, Jeff, "Google Adds Voice Search to Chrome Browser", PC World, Jun. 14, 2011, 5 pages.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Betts et al., "Goals and Objectives for User Interface Software", Computer Graphics, vol. 21, No. 2, Apr. 1987, pp. 73-78.
Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.
Bier et al., "Toolglass and Magic Lenses: The See-Through Interface", Computer Graphics (SIGGRAPH '93 Proceedings), vol. 27, 1993, pp. 73-80.
Birrell, Andrew, "Personal Jukebox (PJB)", available at <http://birrell.org/andrew/talks/pjb-overview.ppt>, Oct. 13, 2000, 6 pages.
Black et al., "Automatically Clustering Similar Units for Unit Selection in Speech Synthesis", Proceedings of Eurospeech, vol. 2, 1997, 4 pages.
Black et al., "Multilingual Text-to-Speech Synthesis", Acoustics, Speech and Signal Processing (ICASSP'04), Proceedings of the IEEE International Conference, vol. 3, May 17-21, 2004, pp. 761-764.
Blair et al., "An Evaluation of Retrieval Effectiveness for a Full-Text Document-Retrieval System", Communications of the ACM, vol. 28, No. 3, Mar. 1985, 11 pages.
Bleher et al., "A Graphic Interactive Application Monitor", IBM Systems Journal, vol. 19, No. 3, Sep. 1980, pp. 382-402.
BluePhoneElite: About, available at <http://www.reelintelligence.com/BluePhoneElite>, retrieved on Sep. 25, 2006, 2 pages.
BluePhoneElite: Features, available at <http://www.reelintelligence.com/BluePhoneElite/features.shtml,>, retrieved on Sep. 25, 2006, 2 pages.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Bobrow et al., "Knowledge Representation for Syntactic/Semantic Processing", From: AAA-80 Proceedings, Copyright 1980, AAAI, 1980, 8 pages.
Bocchieri et al., "Use of Geographical Meta-Data in ASR Language and Acoustic Models", IEEE International Conference on Acoustics Speech and Signal Processing, 2010, pp. 5118-5121.
Bociurkiw, Michael, "Product Guide: Vanessa Matz", available at <http://www.forbes.com/asap/2000/1127/vmartz_print.html>, retrieved on Jan. 23, 2003, 2 pages.
Borden IV, G.R., "An Aural User Interface for Ubiquitous Computing", Proceedings of the 6th International Symposium on Wearable Computers, IEEE, 2002, 2 pages.
Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.
Bouchou et al., "Using Transducers in Natural Language Database Query", Proceedings of 4th International Conference on Applications of Natural Language to Information Systems, Austria, Jun. 1999, 17 pages.
Boy, Guy A., "Intelligent Assistant Systems", Harcourt Brace Jovanovicy, 1991, 1 page.

(56) References Cited

OTHER PUBLICATIONS

Boyer et al., "A Fast String Searching Algorithm", Communications of the ACM, vol. 20, 1977, pp. 762-772.
Brain, Marshall, "How MP3 Files Work", available at <http://www.howstuffworks.com>, retrieved on Mar. 19, 2007, 4 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Brown et al., "Browing Graphs Using a Fisheye View", Apple Inc., Video Clip, Systems Research Center, CHI '92 Continued Proceedings on a CD, 1992.
Brown et al., "Browsing Graphs Using a Fisheye View", CHI '93 Proceedings of the INTERACT '93 and CHI '93 Conference on Human Factors in Computing Systems, 1993, p. 516.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burger, D., "Improved Access to Computers for the Visually Handicapped: New Prospects and Principles", IEEE Transactions on Rehabilitation Engineering, vol. 2, No. 3, Sep. 1994, pp. 111-118.
Burke et al., "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Bussey, et al., "Service Architecture, Prototype Description and Network Implications of a Personalized Information Grazing Service", INFOCOM'90, Ninth Annual Joint Conference of the IEEE Computer and Communication Societies, Available at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "EVI Arrives in Town to go Toe-to-Toe with Sin", TechCrunch, Jan. 23, 2012, 2 pages.
Butler, Travis, "Archos Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.
Buzo et al., "Speech Coding Based Upon Vector Quantization", IEEE Transactions on Acoustics, Speech and Signal Processing, vol. Assp-28, No. 5, Oct. 1980, 13 pages.
Call Centre, "Word Prediction", The CALL Centre & Scottish Executive Education Dept., 1999, pp. 63-73.
Caminero-Gil et al., "Data-Driven Discourse Modeling for Semantic Interpretation", Proceedings of the IEEE International Conference on Acoustics, Speech and Signal Processing, May 1996, 6 pages.
Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.
Cao et al., "Adapting Ranking SVM to Document Retrieval", SIGIR '06, Seattle, WA, Aug. 6-11, 2006, 8 pages.
Car Working Group, "Hands-Free Profile 1.5 HFP1.5_SPEC", Bluetooth Doc, available at <www.bluetooth.org>, Nov. 25, 2005, 93 pages.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Carter et al., "The Speech-Language Interface in the Spoken Language Translator", SRI International, Nov. 23, 1994, 9 pages.
Carter, D., "Lexical Acquisition in the Core Language Engine", Proceedings of the Fourth Conference of the European Chapter of the Association for Computational Linguistics, 1989, 8 pages.
Casner et al., "N-Way Conferencing with Packet Video", The Third International Workshop on Packet Video, Mar. 22-23, 1990, pp. 1-6.
Castleos, "Whole House Voice Control Demonstration", available online at : https://www.youtube.com/watch?v=9SRCoxrZ_W4, Jun. 2, 2012, 26 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Chamberlain, Kim, "Quick Start Guide Natural Reader", available online at <http://atrc.colostate.edu/files/guickstarts/Natural_Reader_Quick_Start_Guide.>, Apr. 2008, 5 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chang et al., "Discriminative Training of Dynamic Programming based Speech Recognizers", IEEE Transactions on Speech and Audio Processing, vol. 1, No. 2, Apr. 1993, pp. 135-143.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Chen et al., "An Improved Method for Image Retrieval Using Speech Annotation", The 9th International Conference on Multi-Media Modeling, Jan. 2003, pp. 1-17.
Chen, Yi, "Multimedia Siri Finds and Plays Whatever You Ask For", PSFK Report, Feb. 9, 2012, 9 pages.
Cheyer et al., "Demonstration Video of Multimodal Maps Using an Agent Architecture", published by SRI International no later than 1996, as depicted in Exemplary Screenshots from video entitled 'Demonstration Video of Multimodal Maps Using an Agent Architecture, 1996, 6 pages.
Cheyer et al., "Demonstration Video of Multimodal Maps Using an Open-Agent Architecture", published by SRI International no later than 1996, as depicted in Exemplary Screenshots from video entitled 'Demonstration Video of Multimodal Maps Using an Open-Agent Architecture, 6 pages.
Cheyer et al., "Multimodal Maps: An Agent-Based Approach", International Conference on Co-operative Multimodal Communication, 1995, 15 pages.

(56) References Cited

OTHER PUBLICATIONS

Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Chomsky et al., "The Sound Pattern of English", New York, Harper and Row, 1968, 242 pages.
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.
Church, Kenneth W., "Phonological Parsing in Speech Recognition", Kluwer Academic Publishers, 1987.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.
Codd, E. F., "Databases: Improving Usability and Responsiveness—How About Recently", Copyright 1978, Academic Press, Inc., 1978, 28 pages.
Cohen et al., "An Open Agent Architecture", available at <http://citeseerx.ist.psu.edu/viewdoc/summary?doi=1 0.1.1.30.480>, 1994, 8 pages.
Cohen et al., "Voice User Interface Design,", Excerpts from Chapter 1 and Chapter 10, 2004, 36 pages.
Coleman, David W., "Meridian Mail Voice Mail System Integrates Voice Processing and Personal Computing", Speech Technology, vol. 4, No. 2, Mar./Apr. 1988, pp. 84-87.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 Pages.
Coles et al., "The Application of Theorem Proving to Information Retrieval", SRI International, Jan. 1971, 21 pages.
Colt, Sam, "Here's One Way Apple's Smartwatch Could Be Better Than Anything Else", Business Insider, Aug. 21, 2014, pp. 1-4.
Combined Search Report and Examination Report under Sections 17 and 18(3) received for GB Patent Application No. 1009318.5, dated Oct. 8, 2010, 5 pages.
Combined Search Report and Examination Report under Sections 17 and 18(3) received for GB Patent Application No. 1217449.6, dated Jan. 17, 2013, 6 pages.
Compaq Inspiration Technology, "Personal Jukebox (PJB)—Systems Research Center and PAAD", Oct. 13, 2000, 25 pages.
Compaq, "Personal Jukebox", available at <http://research.compaq.com/SRC/pjb/>, 2001, 3 pages.
Conkie et al., "Preselection of Candidate Units in a Unit Selection-Based Text-to-Speech Synthesis System", ISCA, 2000, 4 pages.
Conklin, Jeff, "Hypertext: An Introduction and Survey", Computer Magazine, Sep. 1987, 25 pages.
Conklin, Jeffrey, "A Survey of Hypertext", MCC Software Technology Program, Dec. 1987, 40 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corporate Ladder, BLOC Publishing Corporation, 1991, 1 page.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Cox et al., "Speech and Language Processing for Next-Millennium Communications Services", Proceedings of the IEEE, vol. 88, No. 8, Aug. 2000, 24 pages.
Craig et al., "Deacon: Direct English Access and Control", AFIPS Conference Proceedings, vol. 19, San Francisco, Nov. 1966, 18 pages.
Creative Technology Ltd., "Creative Nomad® II: Getting Started—User Guide (On Line Version)", available at <http://ec1.images-amazon.com/media/i3d/01/A/man-migrate/MANUAL000026434.pdf>, Apr. 2000, 46 pages.
Creative Technology Ltd., "Creative Nomad®: Digital Audio Player: User Guide (On-Line Version)", available at <http://ec1.images-amazon.com/media/i3d/01/A/man-migrate/MANUAL000010757.pdf>, Jun. 1999, 40 pages.
Creative Technology Ltd., "Nomad Jukebox", User Guide, Version 1.0, Aug. 2000, 52 pages.
Creative, "Creative Nomad MuVo TX", available at <http://web.archive.org/web/20041024175952/www.creative.com/products/pfriendly.asp?product=9672>, retrieved on Jun. 6, 2006, 1 page.
Creative, "Creative Nomad MuVo", available at <http://web.archive.org/web/20041024075901/www.creative.com/products/product.asp?category=213&subcategory=216&product=4983>, retrieved on Jun. 7, 2006, 1 page.
Creative, "Digital MP3 Player", available at <http://web.archive.org/web/20041024074823/www.creative.com/products/product.asp?category=213&subcategory=216&product=4983, 2004, 1 page.
Croft et al., "Task Support in an Office System", Proceedings of the Second ACM—SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cucerzan et al., "Bootstrapping a Multilingual Part-of-Speech Tagger in One Person-Day", In Proceedings of the 6th Conference on Natural Language Learning, vol. 20, 2002, pp. 1-7.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
Cutkosky et al., "PACT: An Experiment in Integrating Concurrent Engineering Systems", Journal & Magazines, Computer, vol. 26, No. 1, Jan. 1993, 14 pages.
Dar et al., "DTL's DataSpot: Database Exploration Using Plain Language", Proceedings of the 24th VLDB Conference, New York, 1998, 5 pages.
Database WPI Section Ch, Week 8733, Derwent Publications Ltd., London, GB; Class A17, AN 87-230826 & JP, A, 62 153 326 (Sanwa Kako KK (Sans) Sanwa Kako Co), Jul. 8, 1987, 6 pages.
Database WPI Section Ch, Week 8947, Derwent Publications Ltd., London, GB; Class A17, AN 89-343299 & JP, A, 1 254 742 (Sekisui Plastics KK), Oct. 11, 1989, 7 pages.
Davis et al., "A Personal Handheld Multi-Modal Shopping Assistant", International Conference on Networking and Services, IEEE, 2006, 9 pages.
Davis et al., "Stone Soup Translation", Department of Linguistics, Ohio State University, 2001, 11 pages.

(56) References Cited

OTHER PUBLICATIONS

De Herrera, Chris, "Microsoft ActiveSync 3.1", Version 1.02, available at <http://www.cewindows.net/wce/activesync3.1.htm>, Oct. 13, 2000, 8 pages.

Decker et al., "Designing Behaviors for Information Agents", The Robotics Institute, Carnegie-Mellon University, Paper, Jul. 1996, 15 pages.

Decker et al., "Matchmaking and Brokering", The Robotics Institute, Carnegie-Mellon University, Paper, May 1996, 19 pages.

Deerwester et al., "Indexing by Latent Semantic Analysis", Journal of the American Society for Information Science, vol. 41, No. 6, Sep. 1990, 19 pages.

Degani et al., "'Soft' Controls for Hard Displays: Still a Challenge", Proceedings of the 36th Annual Meeting of the Human Factors Society, 1992, pp. 52-56.

Del Strother, Jonathan, "Coverflow", available at <http://www.steelskies.com/coverflow>, retrieved on Jun. 15, 2006, 14 pages.

Deller, Jr. et al., "Discrete—Time Processing of Speech Signals", Prentice Hall, ISBN: 0-02-328301-7, 1987, 14 pages.

Diagrammaker, Action Software, 1989.

Diagram-Master, Ashton-Tate, 1989.

Diamond Multimedia Systems, Inc., "Rio PMP300: User's Guide", available at <http://ec1.images-amazon.com/media/i3d/01/A/man-migrate/MANUAL000022854.pdf>, 1998, 28 pages.

Dickinson et al., "Palmtips: Tiny Containers for All Your Data", PC Magazine, vol. 9, Mar. 1990, p. 218(3).

Digital Audio in the New Era, Electronic Design and Application, No. 6, Jun. 30, 2003, 3 pages.

Digital Equipment Corporation, "Open VMS Software Overview", Software Manual, Dec. 1995, 159 pages.

Digital Equipment Corporation, "OpenVMS RTL DECtalk (DTK$) Manual", May 1993, 56 pages.

Dittenbach et al., "A Natural Language Query Interface for Tourism Information", In: Information and Communication Technologies in Tourism 2003, XP055114393, Feb. 14, 2003, pp. 152-162.

Dobrisek et al., "Evolution of the Information-Retrieval System for Blind and Visually-Impaired People", International Journal of Speech Technology, vol. 6, 2003, pp. 301-309.

Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.

Donahue et al., "Whiteboards: A Graphical Database Tool", ACM Transactions on Office Information Systems, vol. 4, No. 1, Jan. 1986, pp. 24-41.

Donovan, R. E., "A New Distance Measure for Costing Spectral Discontinuities in Concatenative Speech Synthesisers", available at <http://citeseerx.ist.osu.edu/viewdoc/summarv?doi=1 0.1.1.21.6398>, 2001, 4 pages.

Dourish et al., "Portholes: Supporting Awareness in a Distributed Work Group", CHI 1992;, May 1992, pp. 541-547.

Dowding et al., "Gemini: A Natural Language System for Spoken-Language Understanding", Proceedings of the Thirty-First Annual Meeting of the Association for Computational Linguistics, 1993, 8 pages.

Dowding et al., "Interleaving Syntax and Semantics in an Efficient Bottom-Up Parser", Proceedings of the 32nd Annual Meeting of the Association for Computational Linguistics, 1994, 7 pages.

Dragon Naturally Speaking Version 11 Users Guide, Nuance Communications, Inc., Copyright @2002-2010, 132 pages.

Dual Rate Speech Coder for Multimedia Communications Transmitting at 5.3 and 6.3 kbit/s, International Telecommunication Union Recommendation G.723, 7 pages.

Dusan et al., "Multimodal Interaction on PDA's Integrating Speech and Pen Inputs", Eurospeech Geneva, 2003, 4 pages.

dyslexic.com, "AlphaSmart 3000 with CoWriter SmartApplet: Don Johnston Special Needs", available at <http://www.dyslexic.com/procuts.php?catid-2&pid=465&PHPSESSID=2511b800000f7da>, retrieved on Dec. 6, 2005, 13 pages.

Eagle et al., "Social Serendipity: Proximity Sensing and Cueing", MIT Media Laboratory Technical Note 580, May 2004, 18 pages.

Edwards, John R., "Q&A: Integrated Software with Macros and an Intelligent Assistant", Byte Magazine, vol. 11, No. 1, Jan. 1986, pp. 120-122.

Egido, Carmen, "Video Conferencing as a Technology to Support Group Work: A Review of its Failures", Bell Communications Research, 1988, pp. 13-24.

Elio et al., "On Abstract Task Models and Conversation Policies", Proc. Workshop on Specifying and Implementing Conversation Policies, Autonomous Agents'99 Conference, 1999, pp. 1-10.

Elliot, Chip, "High-Quality Multimedia Conferencing Through a Long-Haul Packet Network", BBN Systems and Technologies, 1993, pp. 91-98.

Elliott et al., "Annotation Suggestion and Search for Personal Multimedia Objects on the Web", CIVR, Jul. 7-9, 2008, pp. 75-84.

Elofson et al., "Delegation Technologies: Environmental Scanning with Intelligent Agents", Jour. of Management Info. Systems, Summer 1991, vol. 8, No. 1, 1991, pp. 37-62.

Eluminx, "Illuminated Keyboard", available at <http://www.elumix.com/>, retrieved on Dec. 19, 2002, 1 page.

Engst, Adam C., "SoundJam Keeps on Jammin'", available at <http://db.tidbits.com/getbits.acgi?tbart=05988>, Jun. 19, 2000, 3 pages.

Epstein et al., "Natural Language Access to a Melanoma Data Base", SRI International, Sep. 1978, 7 pages.

Ericsson et al., "Software Illustrating a Unified Approach to Multimodality and Multilinguality in the In-Home Domain", Talk and Look: Tools for Ambient Linguistic Knowledge, Dec. 2006, 127 pages.

Ericsson Inc., "Cellular Phone with Integrated MP3 Player", Research Disclosure Journal No. 41815, Feb. 1999, 2 pages.

Erol et al., "Multimedia Clip Generation From Documents for Browsing on Mobile Devices", IEEE Transactions on Multimedia, vol. 10, No. 5, Aug. 2008, 13 pages.

Eslambolchilar et al., "Making Sense of Fisheye Views", Second Dynamics and Interaction Workshop at University of Glasgow, Aug. 2005, 6 pages.

Eslambolchilar et al., "Multimodal Feedback for Tilt Controlled Speed Dependent Automatic Zooming", UIST'04, Oct. 24-27, 2004, 2 pages.

European Search Report received for European Patent Application No. 01201774.5, dated Sep. 14, 2001, 3 pages.

European Search Report received for European Patent Application No. 99107544.1, dated Jul. 8, 1999, 4 pages.

European Search Report received for European Patent Application No. 99107545.8, dated Jul. 1, 1999, 3 pages.

Evermann et al., "Posterior Probability Decoding, Confidence Estimation and System Combination", Proceedings Speech Transcription Workshop, 2000, 4 pages.

Evi, "Meet Evi: The One Mobile Application that Provides Solutions for your Everyday Problems", Feb. 2012, 3 pages.

Exhibit 1, "Natural Language Interface Using Constrained Intermediate Dictionary of Results", List of Publications Manually Reviewed for the Search of U.S. Pat. No. 7,177,798, Mar. 22, 2013, 1 page.

Extended European Search Report (includes European Search Report and European Search Opinion) received for European Patent Application No. 06256215.2, dated Feb. 20, 2007, 6 pages.

Extended European Search Report (includes European Search Report and European Search Opinion) received for European Patent Application No. 12186113.2, dated Apr. 28, 2014, 14 pages.

Extended European Search Report (includes Partial European Search Report and European Search Opinion) received for European Patent Application No. 13169672.6, dated Aug. 14, 2013, 11 pages.

Extended European Search Report (includes Partial European Search Report and European Search Opinion) received for European Patent Application No. 15169349.6, dated Jul. 28, 2015, 8 pages.

Extended European Search Report (includes Partial European Search Report and European Search Opinion) received for European Patent Application No. 15196748.6, dated Apr. 4, 2016, 6 pages.

Extended European Search Report (includes Partial European Search Report and European Search Opinion) received for European Patent Application No. 16150079.8, dated Feb. 18, 2016, 7 pages.

(56) References Cited

OTHER PUBLICATIONS

Extended European Search Report (includes Supplementary European Search Report and Search Opinion) received for European Patent Application No. 07863218.9, dated Dec. 9, 2010, 7 pages.
Extended European Search Report (includes Supplementary European Search Report and Search Opinion) received for European Patent Application No. 12727027.0, dated Sep. 26, 2014, 7 pages.
Extended European Search Report (inclusive of the Partial European Search Report and European Search Opinion) received for European Patent Application No. 12729332.2, dated Oct. 31, 2014, 6 pages.
Extended European Search Report and Search Opinion received for European Patent Application No. 12185276.8, dated Dec. 18, 2012, 4 pages.
Extended European Search Report received for European Patent Application No. 11159884.3, dated May 20, 2011, 8 pages.
Extended European Search Report received for European Patent Application No. 12186663.6, dated Jul. 16, 2013, 6 pages.
Extended European Search Report received for European Patent Application No. 13726938.7, dated Dec. 14, 2015, 8 pages.
Extended European Search Report received for European Patent Application No. 13770552.1, dated Jan. 7, 2016, 5 pages.
Extended European Search Report received for European Patent Application No. 14737370.8, dated May 19, 2016, 12 pages.
Fanty et al., "A Comparison of DFT, PLP and Cochleagram for Alphabet Recognition", IEEE, Nov. 1991, pp. 326-329.
Feigenbaum et al., "Computer-Assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-Based Knowledge Representation and its Natural Deduction System", SRI International, Jul. 1977, 43 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Fiscus, J. G., "A Post-Processing System to Yield Reduced Word Error Rates: Recognizer Output Voting Error Reduction (ROVER)", IEEE Proceedings, Automatic Speech Recognition and Understanding, Dec. 14-17, 1997, pp. 347-354.
Fisher et al., "Virtual Environment Display System", Interactive 3D Graphics, Oct. 23- 24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Frisse, M. E., "Searching for Information in a Hypertext Medical Handbook", Communications of the ACM, vol. 31, No. 7, Jul. 1988, 8 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991, pp. 1-9.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gautier et al., "Generating Explanations of Device Behavior Using Compositional Modeling and Causal Ordering", CiteSeerx, 1993, pp. 89-97.
Gaver et al., "One Is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Gervasio et al., "Active Preference Learning for Personalized Calendar Scheduling Assistance", CiteSeerx, Proceedings of IUI'05, Jan. 2005, pp. 90-97.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Glinert-Stevens, Susan, "Microsoft Publisher: Desktop Wizardry", PC Sources, vol. 3, No. 2, Feb. 1992, 1 page.
Glossary of Adaptive Technologies: Word Prediction, available at <http://www.utoronto.ca/atrc/reference/techwordpred.html>, retrieved on Dec. 6, 2005, 5 pages.
Gmail, "About Group Chat", available at <http://mail.google.com/support/bin/answer.py?answer=81090>, Nov. 26, 2007, 2 pages.
Goddeau et al., "A Form-Based Dialogue Manager for Spoken Language Applications", Available online at <http://phasedance.com/pdf!icslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Goldberg, Cheryl, "IBM Drawing Assistant: Graphics for the EGA", PC Magazine, vol. 4, No. 26, Dec. 24, 1985, 1 page.
Gong et al., "Guidelines for Handheld Mobile Device Interface Design", Proceedings of DSI 2004 Annual Meeting, 2004, pp. 3751-3756.
Gonnet et al., "Handbook of Algorithms and Data Structures: in Pascal and C. (2nd ed.)", Addison-Wesley Longman Publishing Co., 1991, 17 pages.
Good et al., "Building a User-Derived Interface", Communications of the ACM; (Oct. 1984) vol. 27, No. 10, Oct. 1984, pp. 1032-1043.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Greenberg, Saul, "A Fisheye Text Editor for Relaxed-WYSIWIS Groupware", CHI '96 Companion, Vancouver, Canada, Apr. 13-18, 1996, 2 pages.

(56) References Cited

OTHER PUBLICATIONS

Gregg et al., "DSS Access on the WWW: An Intelligent Agent Prototype", Proceedings of the Americas Conference on Information Systems, Association for Information Systems, 1998, 3 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at Sri", SRI International, Nov. 1981, 21 pages.
Grosz et al., "Team: An Experiment in the Design of Transportable Natural-Language Interfaces", Artificial Intelligence, vol. 32, 1987, 71 pages.
Grosz, B., "Team: A Transportable Natural-Language Interface System", Proceedings of the First Conference on Applied Natural Language Processing, 1983, 7 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "A Translation Approach to Portable Ontology Specifications", Knowledge Acquisition, vol. 5, No. 2, Jun. 1993, pp. 199-220.
Gruber, Thomas R., "Automated Knowledge Acquisition for Strategic Knowledge", Machine Learning, vol. 4, 1989, pp. 293-336.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Thomas R., "Toward Principles for the Design of Ontologies used for Knowledge Sharing", International Journal of Human-Computer Studies, vol. 43, 1993, pp. 907-928.
Gruber, Thomas R., et al., U.S. Appl. No. 61/186,414, filed Jun. 12, 2009 titled "System and Method for Semantic Auto-Completion" 13 pages (Copy Not Attached).
Gruber, Thomas R., et al., U.S. Appl. No. 61/493,201, filed Jun. 3, 2011 titled "Generating and Processing Data Items That Represent Tasks to Perform", 68 pages (Copy Not Attached).
Gruber, Thomas R., et al., U.S. Appl. No. 61/657,744, filed Jun. 9, 2012 titled "Automatically Adapting User Interfaces for Hands-Free Interaction", 40 pages.
Gruber, Thomas R., et al., U.S. Appl. No. 07/976,970, filed Nov. 16, 1992 titled "Status Bar for Application Windows", (Copy Not Attached).
Gruber, Tom, "(Avoiding) the Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It Is What It Does: The Pragmatics of Ontology for Knowledge Sharing", Proceedings of the International CIDOC CRM Symposium, Available online at<http://tomgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant-Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semantic Web Conference, Nov. 2006, 38 pages.
Gruhn et al., "A Research Perspective on Computer-Assisted Office Work", IBM Systems Journal, vol. 18, No. 3, 1979, pp. 432-456.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guida et al., "NLI: A Robust Interface for Natural Language Person-Machine Communication", International Journal of Man-Machine Studies, vol. 17, 1982, 17 pages.
Guim, Mark, "How to Set a Person-Based Reminder with Cortana", available at <http://www.wpcentral.com/how-to-person-based-reminder-cortana>, Apr. 26, 2014, 15 pages.
Gurevych et al., "Semantic Coherence Scoring Using an Ontology", North American Chapter of the Association for Computational Linguistics Archive, Proceedings of the 2003 Conference of the North American Chapter of the Association for Computational Linguistics on Human Language Technology, May 27, 2003, 8 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni et al., "Many Robots Make Short Work", AAAI Robot Contest, SRI International, 1996, 9 pages.

(56) References Cited

OTHER PUBLICATIONS

Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A Unified Platform for Building Intelligent Assistant Applications", Oct. 25, 2007, 262 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Haga et al., "A Usability Survey of a Contents-Based Video Retrieval System by Combining Digital Video and an Electronic Bulletin Board", The Internet and Higher Education, vol. 8, No. 3, 2005, pp. 251-262.
Hain et al., "The Papageno TTS System", Siemens AG, Corporate Technology, Munich, Germany TC-STAR Workshop, 2006, 6 pages.
Haitsma et al., "A Highly Robust Audio Fingerprinting System", In Proceedings of the International Symposium on Music Information Retrieval (ISMIR), 2002, 9 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hartson et al., "Advances in Human-Computer Interaction", Chapters 1, 5, and 6, vol. 3, 1992, 121 pages.
Hashimoto, Yoshiyuki , "Simple Guide for iPhone Siri, Which Can Be Operated with Your Voice", Shuwa System Co., Ltd., vol. 1, Jul. 5, 2012, pp. 8, 130, 131.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Headset Button Controller v7.3 APK Full APP Download for Android, Blackberry, iPhone, 2014, 11 pages.
Hear voice from Google translate, Available on URL:https://www.youtube.com/watch?v=18AvMhFgD28, Jan. 28, 2011, 1 page.
Heger et al., "KNOWBOT: An Adaptive Data Base Interface", Nuclear Science and Engineering, V. 107, No. 2, Feb. 1991, pp. 142-157.
Helm et al., "Building Visual Language Parsers", Proceedings of CHI'91, Proceedings of the SIGCHI Conference on Human Factors in Computing Systems, 1991, 8 pages.
Hendrickson, Bruce, "Latent Semantic Analysis and Fiedler Retrieval", Linear Algebra and its Applications, vol. 421, 2007, pp. 345-355.
Hendrix et al., "Developing a Natural Language Interface to Complex Data", ACM Transactions on Database Systems, vol. 3, No. 2, Jun. 1978, pp. 105-147.
Hendrix et al., "The Intelligent Assistant: Technical Considerations Involved in Designing Q&A's Natural-Language Interface", Byte Magazine, Issue 14, Dec. 1987, 1 page.
Hendrix et al., "Transportable Natural-Language Interfaces to Databases", SRI International, Technical Note 228, Apr. 30, 1981, 18 pages.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 220-223.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, "Speech System and Research", 1955, pp. 129-135, 152-153.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Horvitz et al., "Handsfree Decision Support: Toward a Non-invasive Human-Computer Interface", Proceedings of the Symposium on Computer Applications in Medical Care, IEEE Computer Society Press, 1995, p. 955.

(56) References Cited

OTHER PUBLICATIONS

Horvitz et al., "In Pursuit of Effective Handsfree Decision Support: Coupling Bayesian Inference, Speech Understanding, and User Models", 1995, 8 pages.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "A Novel Approach to Robust Speech Endpoint Detection in Car Environments", Acoustics, Speech, and Signal Processing 2000, ICASSP '00, Proceeding S. 2000 IEEE International Conference on Jun. 5-9, 2000, vol. 3, Jun. 5, 2000, pp. 1751-1754.
Huang et al., "Real-Time Software-Based Video Coder for Multimedia Communication Systems", Department of Computer Science and Information Engineering, 1993, 10 pages.
Huang et al., "The SPHINX-II Speech Recognition System: An Overview", Computer, Speech and Language, vol. 7, No. 2, 1993, 14 pages.
Hukin, R. W., "Testing an Auditory Model by Resynthesis", European Conference on Speech Communication and Technology, Sep. 26-29, 1989, pp. 243-246.
Hunt, "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
iAP Sports Lingo 0×09 Protocol V1.00, May 1, 2006, 17 pages.
IBM Corporation, "Simon Says Here's How", Users Manual, 1994, 3 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
IBM, "Why Buy: ThinkPad", available at <http://www.pc.ibm.com/us/thinkpad/easeofuse.html>, retrieved on Dec. 19, 2002, 2 pages.
ICHAT AV, "Video Conferencing for the Rest of Us", Apple—Mac Os X—iChat AV, available at <http://www.apple.com/macosx/features/ichat/>, retrieved on Apr. 13, 2006, 3 pages.
id3.org, "id3v2.4.0—Frames", available at <http://id3.org/id3v2.4.0-frames?action=print>, retrieved on Jan. 22, 2015, 41 pages.
IEEE 1394 (Redirected from Firewire, Wikipedia, The Free Encyclopedia, available at <http://www.wikipedia.org/wiki/Firewire>, retrieved on Jun. 8, 2003, 2 pages.
Interactive Voice, available at <http://www.helloivee.com/company/>, retrieved on Feb. 10, 2014, 2 pages.
International Preliminary Report on Patentability received for PCT Patent Application No. PCT/GB2009/051684, dated Jun. 23, 2011, 10 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Preliminary Report on Patentability received for PCT Patent Application No. PCT/US1994/011011, dated Feb. 28, 1996, 4 pages.
International Preliminary Report on Patentability received for PCT Patent Application No. PCT/US1995/008369, dated Oct. 9, 1996, 4 pages.
International Preliminary Report on Patentability received for PCT Patent Application No. PCT/US2004/002873, dated Feb. 1, 2006, 5 pages.
International Preliminary report on Patentability received for PCT Patent Application No. PCT/US2004/016519, dated Jan. 23, 2006, 12 pages.
International Preliminary Report on Patentability received for PCT Patent Application No. PCT/US2005/030234, dated Mar. 20, 2007, 9 pages.
International Preliminary Report on Patentability received for PCT Patent Application No. PCT/US2008/000042, dated Jul. 7, 2009, 6 pages.
International Preliminary Report on Patentability received for PCT Patent Application No. PCT/US2008/000043, dated Jul. 7, 2009, 8 pages.
International Preliminary Report on Patentability received for PCT Patent Application No. PCT/US2008/000047, dated Jul. 7, 2009, 8 pages.
International Preliminary Report on Patentability received for PCT Patent Application No. PCT/US2009/051954, dated Mar. 24, 2011, 8 pages.
International Preliminary Report on Patentability received for PCT Patent Application No. PCT/US2009/055577, completed on Aug. 6, 2010, 12 pages.
International Preliminary Report on Patentability received for PCT Patent Application No. PCT/US2010/037378, dated Dec. 6, 2011, 9 pages.
International Preliminary Report on Patentability received for PCT Patent Application No. PCT/US2011/020350, dated Jul. 17, 2012, 12 pages.
International Preliminary Report on Patentability received for PCT Patent Application No. PCT/US2011/020825, dated Jan. 13, 2012, 17 pages.
International Preliminary Report on Patentability received for PCT Patent Application No. PCT/US2011/020861, dated Aug. 2, 2012, 11 pages.
International Preliminary Report on Patentability received for PCT Patent Application No. PCT/US2011/037014, dated Dec. 13, 2012, 10 pages.
International Preliminary Report on Patentability received for PCT Patent Application No. PCT/US2012/029810, dated Oct. 3, 2013, 9 pages.
International Preliminary Report on Patentability received for PCT Patent Application No. PCT/US2012/034028, dated Oct. 31, 2013, 7 pages.
International Preliminary Report on Patentability received for PCT Patent Application No. PCT/US2012/040571, dated Dec. 19, 2013, 10 pages.
International Preliminary Report on Patentability received for PCT Patent Application No. PCT/US2012/040801, dated Dec. 19, 2013, 16 pages.
International Preliminary Report on Patentability received for PCT Patent Application No. PCT/US2012/040931, dated Dec. 18, 2014, 9 pages.
International Preliminary Report on Patentability received for PCT Patent Application No. PCT/US2012/043098, dated Jan. 9, 2014, 8 pages.
International Preliminary Report on Patentability received for PCT Patent Application No. PCT/US2012/043100, dated Jan. 9, 2014, 7 pages.
International Preliminary Report on Patentability received for PCT Patent Application No. PCT/US2012/056382, dated Apr. 10, 2014, 9 pages.
International Preliminary Report on Patentability received for PCT Patent Application No. PCT/US2013/028412, dated Sep. 12, 2014, 12 pages.
International Preliminary Report on Patentability received for PCT Patent Application No. PCT/US2013/028920, dated Sep. 18, 2014, 11 pages.
International Preliminary Report on Patentability received for PCT Patent Application No. PCT/US2013/029156, dated Sep. 9, 2014, 7 pages.
International Preliminary Report on Patentability received for PCT Patent Application No. PCT/US2013/041225, dated Nov. 27, 2014, 9 pages.
International Preliminary Report on Patentability received for PCT Patent Application No. PCT/US2013/041233, dated Nov. 18, 2014, 8 pages.

(56) References Cited

OTHER PUBLICATIONS

International Preliminary Report on Patentability received for PCT Patent Application No. PCT/US2013/044574, dated Dec. 9, 2014, 8 pages.
International Preliminary Report on Patentability received for PCT Patent Application No. PCT/US2013/044834, dated Dec. 9, 2014, 9 pages.
International Preliminary Report on Patentability received for PCT Patent Application No. PCT/US2013/047659, dated Dec. 31, 2014, 15 pages.
International Preliminary Report on Patentability received for PCT Patent Application No. PCT/US2013/047668, dated Jan. 8, 2015, 13 pages.
International Preliminary Report on Patentability received for PCT Patent Application No. PCT/US2013/052558, dated Feb. 12, 2015, 12 pages.
International Preliminary Report on Patentability received for PCT Patent Application No. PCT/US2013/058916, dated Mar. 19, 2015, 8 pages.
International Preliminary Report on Patentability received for PCT Patent Application No. PCT/US2013/060121, dated Apr. 2, 2015, 6 pages.
International Preliminary Report on Patentability received for PCT Patent Application No. PCT/US2014/015418, dated Aug. 20, 2015, 12 pages.
International Preliminary Report on Patentability received for PCT Patent Application No. PCT/US2014/016988, dated Sep. 3, 2015, 8 pages.
International Preliminary Report on Patentability received for PCT Patent Application No. PCT/US2014/023822, dated Sep. 24, 2015, 12 pages.
International Preliminary Report on Patentability received for PCT Patent Application No. PCT/US2014/023826, dated Sep. 24, 2015, 9 pages.
International Preliminary Report on Patentability received for PCT Patent Application No. PCT/US2014/026871, dated Sep. 24, 2015, 7 pages.
International Preliminary Report on Patentability received for PCT Patent Application No. PCT/US2014/026873, dated Sep. 24, 2015, 9 pages.
International Preliminary Report on Patentability received for PCT Patent Application No. PCT/US2014/028785, dated Sep. 24, 2015, 15 pages.
International Preliminary Report on Patentability received for PCT Patent Application No. PCT/US2014/028950, dated Sep. 24, 2015, 8 pages.
International Preliminary Report on Patentability received for PCT Patent Application No. PCT/US2014/029050, dated Sep. 24, 2015, 7 pages.
International Preliminary Report on Patentability received for PCT Patent Application No. PCT/US2014/029562, dated Sep. 24, 2015, 16 pages.
International Preliminary Report on Patentability received for PCT Patent Application No. PCT/US2014/040393, dated Dec. 8, 2015, 15 pages.
International Preliminary Report on Patentability received for PCT Patent Application No. PCT/US2014/040394, dated Dec. 23, 2015, 7 pages.
International Preliminary Report on Patentability received for PCT Patent Application No. PCT/US2014/040397, dated Dec. 17, 2015, 8 pages.
International Preliminary Report on Patentability received for PCT Patent Application No. PCT/US2014/040401, dated Dec. 8, 2015, 6 pages.
International Preliminary Report on Patentability received for PCT Patent Application No. PCT/US2014/040403 dated Dec. 23, 2015, 7 pages.
International Preliminary Report on Patentability received for PCT Patent Application No. PCT/US2014/040961, dated Dec. 17, 2015, 20 pages.
International Preliminary Report on Patentability received for PCT Patent Application No. PCT/US2014/041159, dated Dec. 17, 2015, 8 pages.
International Preliminary Report on Patentability received for PCT Patent Application No. PCT/US2014/041173, dated Dec. 17, 2015, 9 pages.
International Preliminary Report on Patentability received for PCT Patent Application No. PCT/US2014/049568, dated Feb. 18, 2016, 10 pages.
International Search Report & Written Opinion received for PCT Patent Application No. PCT/US2016/021410, dated Jul. 26, 2016, 19 pages.
International Search Report and Written Opinion received for PCT Patent Application No. PCT/US1994/011011, dated Feb. 8, 1995, 3 pages (International Search Report only).
International Search Report and Written Opinion received for PCT Patent Application No. PCT/US2004/002873, dated Oct. 13, 2005, 7 pages.
International Search Report and Written Opinion received for PCT Patent Application No. PCT/US2004/016519, dated Nov. 3, 2005, 6 pages.
International Search Report and Written Opinion received for PCT Patent Application No. PCT/US2005/030234, dated Mar. 17, 2006, 11 pages.
International Search Report and Written Opinion received for PCT Patent Application No. PCT/US2005/038819, dated Apr. 5, 2006, 12 pages.
International Search Report and Written Opinion received for PCT Patent Application No. PCT/US2006/048669, dated Jul. 2, 2007, 12 pages.
International Search Report and Written Opinion received for PCT Patent Application No. PCT/US2006/048670, dated May 21, 2007, 11 pages.
International Search Report and Written Opinion received for PCT Patent Application No. PCT/US2006/048753, dated Jun. 19, 2007, 15 pages.
International Search Report and Written Opinion received for PCT Patent Application No. PCT/US2007/026243, dated Mar. 31, 2008, 10 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2008/000032, dated Jun. 12, 2008, 7 pages.
International Search Report and Written Opinion received for PCT Patent Application No. PCT/US2008/000042, dated May 21, 2008, 7 pages.
International Search Report and Written Opinion received for PCT Patent Application No. PCT/US2008/000043, dated Oct. 10, 2008, 12 pages.
International Search Report and Written Opinion received for PCT Patent Application No. PCT/US2008/000045, dated Jun. 12, 2008, 7 pages.
International Search Report and Written Opinion received for PCT Patent Application No. PCT/US2008/000047, dated Sep. 11, 2008, 12 pages.
International Search Report and Written Opinion received for PCT Patent Application No. PCT/US2008/000059, dated Sep. 19, 2008, 18 pages.
International Search Report and Written Opinion received for PCT Patent Application No. PCT/US2008/000061, dated Jul. 1, 2008, 13 pages.
International Search Report and Written Opinion received for PCT Patent Application No. PCT/US2009/051954, dated Oct. 30, 2009, 10 pages.
International Search Report and Written Opinion received for PCT Patent Application No. PCT/US2009/055577, dated Jan. 26, 2010, 9 pages.

(56) References Cited

OTHER PUBLICATIONS

International Search Report and Written Opinion received for PCT Patent Application No. PCT/US2010/037378, dated Aug. 25, 2010, 14 pages.
International Search Report and Written Opinion received for PCT Patent Application No. PCT/US2011/020350, dated Jun. 30, 2011, 17 pages.
International Search Report and Written Opinion received for PCT Patent Application No. PCT/US2011/020825, dated Mar. 18, 2011, 9 pages.
International Search Report and Written Opinion received for PCT Patent Application No. PCT/US2011/020861, dated Nov. 29, 2011, 12 pages.
International Search Report and Written Opinion received for PCT Patent Application No. PCT/US2012/029810, dated Aug. 17, 2012, 11 pages.
International Search Report and Written Opinion received for PCT Patent Application No. PCT/US2012/034028, dated Jun. 11, 2012, 9 pages.
International Search Report and Written Opinion received for PCT Patent Application No. PCT/US2012/040571, dated Nov. 16, 2012, 14 pages.
International Search Report and Written Opinion received for PCT Patent Application No. PCT/US2012/040801, dated Oct. 22, 2012, 20 pages.
International Search Report and Written Opinion received for PCT Patent Application No. PCT/US2012/040931, dated Feb. 1, 2013, 4 pages (International Search Report only).
International Search Report and Written Opinion received for PCT Patent Application No. PCT/US2012/043098, dated Nov. 14, 2012, 9 pages.
International Search Report and Written Opinion received for PCT Patent Application No. PCT/US2012/043100, dated Nov. 15, 2012, 8 pages.
International Search Report and Written Opinion received for PCT Patent Application No. PCT/US2012/056382, dated Dec. 20, 2012, 11 pages.
International Search Report and Written Opinion received for PCT Patent Application No. PCT/US2013/028412, dated Sep. 26, 2013, 17 pages.
International Search Report and Written Opinion received for PCT Patent Application No. PCT/US2013/028920, dated Jun. 27, 2013, 14 pages.
International Search Report and Written Opinion received for PCT Patent Application No. PCT/US2013/029156, dated Jul. 15, 2013, 9 pages.
International Search Report and Written Opinion received for PCT Patent Application No. PCT/US2013/040971, dated Nov. 12, 2013, 11 pages.
International Search Report and Written Opinion received for PCT Patent Application No. PCT/US2013/041225, dated Aug. 23, 2013, 3 pages (International Search Report only).
International Search Report and Written Opinion received for PCT Patent Application No. PCT/US2013/044574, dated Sep. 27, 2013, 12 pages.
International Search Report and Written Opinion received for PCT Patent Application No. PCT/US2013/044834, dated Dec. 20, 2013, 13 pages.
International Search Report and Written Opinion received for PCT Patent Application No. PCT/US2013/047659, dated Jul. 7, 2014, 25 pages.
International Search Report and Written Opinion received for PCT Patent Application No. PCT/US2013/047668, dated Feb. 13, 2014, 17 pages.
International Search Report and Written Opinion received for PCT Patent Application No. PCT/US2013/052558, dated Jan. 30, 2014, 15 pages.
International Search Report and Written Opinion received for PCT Patent Application No. PCT/US2013/058916, dated Sep. 8, 2014, 10 pages.
International Search Report and Written Opinion received for PCT Patent Application No. PCT/US2013/060121, dated Dec. 6, 2013, 8 pages.
International Search Report and Written Opinion received for PCT Patent Application No. PCT/US2014/015418, dated Aug. 26, 2014, 17 pages.
International Search Report and Written Opinion received for PCT Patent Application No. PCT/US2014/016988, dated Apr. 29, 2014, 10 pages.
International Search Report and Written Opinion received for PCT Patent Application No. PCT/US2014/023822, dated Sep. 25, 2014, 14 pages.
International Search Report and Written Opinion received for PCT Patent Application No. PCT/US2014/023826, dated Oct. 9, 2014, 13 pages.
International Search Report and Written Opinion received for PCT Patent Application No. PCT/US2014/026871, dated Jul. 23, 2014, 9 pages.
International Search Report and Written Opinion received for PCT Patent Application No. PCT/US2014/026873, dated Jan. 5, 2015, 11 pages.
International Search Report and Written Opinion received for PCT Patent Application No. PCT/US2014/028785, dated Oct. 17, 2014, 23 pages.
International Search Report and Written Opinion received for PCT Patent Application No. PCT/US2014/028950, dated Nov. 25, 2014, 10 pages.
International Search Report and Written Opinion received for PCT Patent Application No. PCT/US2014/029050, dated Jul. 31, 2014, 9 pages.
International Search Report and Written Opinion received for PCT Patent Application No. PCT/US2014/029562, dated Sep. 18, 2014, 21 pages.
International Search Report and Written Opinion received for PCT Patent Application No. PCT/US2014/040393, dated Dec. 8, 2014, 23 pages.
International Search Report and Written Opinion received for PCT Patent Application No. PCT/US2014/040394, dated Aug. 8, 2014, 11 pages.
International Search Report and Written Opinion received for PCT Patent Application No. PCT/US2014/040397, dated Aug. 27, 2014, 12 pages.
International Search Report and Written Opinion received for PCT Patent Application No. PCT/US2014/040401, dated Sep. 4, 2014, 10 pages.
International Search Report and Written Opinion received for PCT Patent Application No. PCT/US2014/040403, dated Sep. 23, 2014, 9 pages.
International Search Report and Written Opinion received for PCT Patent Application No. PCT/US2014/040961, dated Mar. 10, 2015, 5 pages.
International Search Report and Written Opinion received for PCT Patent Application No. PCT/US2014/041159, dated Sep. 26, 2014, 10 pages.
International Search Report and Written Opinion received for PCT Patent Application No. PCT/US2014/041173, dated Sep. 10, 2014, 11 pages.
International Search Report and Written Opinion received for PCT Patent Application No. PCT/US2014/049568, dated Nov. 14, 2014, 12 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019320, dated Jul. 2, 2015, 14 pages.

(56) References Cited

OTHER PUBLICATIONS

International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/023089, dated Aug. 20, 2015, 16 pages.
International Search Report and Written Opinion received for PCT Patent Application No. PCT/US2015/023097, dated Jul. 7, 2015, 15 pages.
International Search Report and Written Opinion received for PCT Patent Application No. PCT/US2015/023593, dated Aug. 14, 2015, 16 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/029554, dated Jul. 16, 2015, 11 pages.
International Search Report and Written Opinion received for PCT Patent Application No. PCT/US2015/032470, dated Oct. 1, 2015, 13 pages.
International Search Report and Written Opinion received for PCT Patent Application No. PCT/US2015/032724, dated Jul. 27, 2015, 11 pages.
International Search Report and Written Opinion received for PCT Patent Application No. PCT/US2015/033051, dated Aug. 5, 2015, 14 pages.
International Search Report and Written Opinion received for PCT Patent Application No. PCT/US2015/047062, dated Jan. 13, 2016, 25 pages.
International Search Report and Written Opinion received for PCT Patent Application No. PCT/US2015/047064, dated Nov. 13, 2015, 13 pages.
International Search Report and Written Opinion received for PCT Patent Application No. PCT/US2015/047281, dated Dec. 17, 2015, 19 pages.
International Search Report and Written Opinion received for PCT Patent Application No. PCT/US2015/047553, dated Jan. 5, 2016, 10 pages.
International Search Report and Written opinion received for PCT Patent Application No. PCT/US2015/047583, dated Feb. 3, 2016, 11 pages.
International Search Report and Written Opinion received for PCT Patent Application No. PCT/US2015/047584, dated Nov. 9, 2015, 10 pages.
International Search Report and Written Opinion received for PCT Patent Application No. PCT/US2015/053365, dated Mar. 10, 2016, 20 pages.
International Search Report and Written Opinion received for PCT Patent Application No. PCT/US2015/053366, dated Apr. 26, 2016, 16 pages.
International Search Report and Written Opinion received for PCT Patent Application No. PCT/US2016/021103, dated Jun. 8, 2016, 15 pages.
International Search Report and Written Opinion received for PCT Patent Application No. PCT/US2016/021104, dated Jun. 8, 2016, 15 pages.
International Search Report and Written opinion received for PCT Patent Application No. PCT/US2016/021409, dated May 26, 2016, 22 pages.
International Search report and Written Opinion received for PCT Patent Application No. PCT/US2016/024666, dated Jun. 10, 2016, 13 pages.
International Search Report and Written Opinion received for PCT Patent Application No. PCT/US2016/025404, dated Jun. 24, 2016, 21 pages.
International Search Report and Written Opinion received for PCT Patent Application No. PCT/US2016/025407, dated Jun. 23, 2016, 18 pages.
International Search Report and Written Opinion received for PCT Patent Application No. PCT/US2016/025408, dated Aug. 11, 2016, 19 pages.
International Search Report and Written Opinion received for PCT Patent Application No. PCT/US2016/031059, dated Aug. 8, 2016, 11 pages.
International Search Report and Written Opinion received for PCT Patent Application No. PCT/US2016/031549, dated Aug. 5, 2016, 35 pages.
International Search Report and Written Opinion received for PCT Patent Application No. PCT/US2016/031550, dated Aug. 4, 2016, 13 pages.
International Search Report and Written Opinion received for PCT Patent Application No. PCT/US2016/035105, dated Aug. 29, 2016, 25 pages.
International Search Report and Written Opinion received for PCT Patent Application No. PCT/US2016/035107, dated Aug. 31, 2016, 26 pages.
International Search Report and Written Opinion received for PCT Patent Application No. PCT/US2016/035112, dated Aug. 22, 2016, 21 pages.
International Search Report and Written Opinion received for PCT Patent Application No. PCT/US2016/059953, dated Mar. 10, 2017, 13 pages.
International Search Report received for PCT Patent Application No. PCT/GB2009/051684, dated Mar. 12, 2010, 4 pages.
International Search Report received for PCT Patent Application No. PCT/US1993/012666, dated Nov. 9, 1994, 8 pages.
International Search Report received for PCT Patent Application No. PCT/US1994/000687, dated Jun. 3, 1994, 1 page.
International Search Report received for PCT Patent Application No. PCT/US1994/00077, dated May 25, 1994, 2 pages.
International Search Report received for PCT Patent Application No. PCT/US1995/008369, dated Nov. 8, 1995, 6 pages.
International Search Report received for PCT Patent Application No. PCT/US1995/013076, dated Feb. 2, 1996, 1 page.
International Search Report received for PCT Patent Application No. PCT/US1996/01002, dated Oct. 30, 1996, 4 pages.
International Search Report received for PCT Patent Application No. PCT/US2002/024669, dated Nov. 5, 2002, 3 pages.
International Search Report received for PCT Patent Application No. PCT/US2002/024670, dated Sep. 26, 2002, 3 pages.
International Search Report received for PCT Patent Application No. PCT/US2002/033330, dated Feb. 4, 2003, 6 pages.
International Search Report received for PCT Patent Application No. PCT/US2005/046797, dated Nov. 24, 2006, 6 pages.
International Search Report received for PCT Patent Application No. PCT/US2011/037014, dated Oct. 4, 2011, 6 pages.
International Search Report received for PCT Patent Application No. PCT/US2013/041233, dated Nov. 22, 2013, 3 pages.
Intraspect Software, "The Intraspect Knowledge Management Solution: Technical Overview", available at <http://tomgruber.org/writing/intraspect-whitepaper-1998.pdf>, 1998, 18 pages.
Invitation to Pay Additional Fee Received for PCT Patent Application No. PCT/US2016/059953, dated Dec. 29, 2016, 2pages.
Invitation to Pay Additional Fees and Partial International Search Report received for PCT Patent Application No. PCT/US2004/016519, dated Aug. 4, 2005, 6 pages.
Invitation to Pay Additional Fees and Partial International Search Report received for PCT Patent Application No. PCT/US2005/046797, dated Jul. 3, 2006, 6 pages.
Invitation to Pay Additional Fees and Partial International Search Report received for PCT Patent Application No. PCT/US2006/048738, dated Jul. 10, 2007, 4 pages.
Invitation to Pay Additional Fees and Partial International Search Report received for PCT Patent Application No. PCT/US2011/020350, dated Apr. 14, 2011, 5 pages.
Invitation to Pay Additional Fees and Partial International Search Report received for PCT Patent Application No. PCT/US2015/023089, dated Jun. 17, 2015, 7 pages.

(56) References Cited

OTHER PUBLICATIONS

Invitation to Pay Additional Fees received for PCT Application No. PCT/US2016/021410, dated Apr. 28, 2016, 2 pages.
Invitation to Pay Additional Fees received for PCT Patent Application No. PCT/US2008/000043, dated Jun. 27, 2008, 4 pages.
Invitation to Pay Additional Fees received for PCT Patent Application No. PCT/US2008/000047, dated Jul. 4, 2008, 4 pages.
Invitation to Pay Additional Fees received for PCT Patent Application No. PCT/US2011/037014, dated Aug. 2, 2011, 6 pages.
Invitation to Pay Additional Fees received for PCT Patent Application No. PCT/US2012/040801, dated Aug. 8, 2012, 2 pages.
Invitation to Pay Additional Fees received for PCT Patent Application No. PCT/US2013/047659, dated Feb. 27, 2014, 7 pages.
Invitation to Pay Additional Fees received for PCT Patent Application No. PCT/US2013/052558, dated Nov. 7, 2013, 6 pages.
Invitation to pay additional fees received for PCT Patent Application No. PCT/US2014/029562, dated Jul. 4, 2014, 7 pages.
Invitation to Pay Additional Fees received for PCT Patent Application No. PCT/US2014/040393, dated Sep. 17, 2014, 7 pages.
Invitation to Pay Additional Fees received for PCT Patent Application No. PCT/US2014/040961, dated Jan. 14, 2015, 3 pages.
Invitation to Pay Additional Fees received for PCT Patent Application No. PCT/US2015/047281, dated Oct. 8, 2015, 6 pages.
Invitation to Pay Additional Fees received for PCT Patent Application No. PCT/US2015/053366, dated Feb. 19, 2016, 8 pages.
Invitation to Pay Additional Fees received for PCT Patent Application No. PCT/US2016/025408, dated May 13, 2016, 2 pages.
Invitation to Pay Additional Fees received for PCT Patent Application No. PCT/US2014/028785, dated Jul. 4, 2014, 7 pages.
Invitation to pay additional fees received for the PCT Patent Application No. PCT/US2014/015418, dated May 26, 2014, 5 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
iPhone Hacks, "Native iPhone MMS Application Released", available at <http://www.iphonehacks.com/2007/12/iphone-mms-app.html>, retrieved on Dec. 25, 2007, 5 pages.
iPhonechat, "iChat for iPhone in JavaScript", available at <http://www.publictivity.com/iPhoneChat/>, retrieved on Dec. 25, 2007, 2 pages.
Iso-Sipila et al., "Multi-Lingual Speaker-Independent Voice User Interface for Mobile Devices", ICASSP 2006 Proceedings, IEEE International Conference on Acoustics, Speech and Signal Processing May 14, 2006, pp. 1-1081.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
Jabra Corporation, "FreeSpeak: BT200 User Manual", 2002, 42 pages.
Jabra, "Bluetooth Headset: User Manual", 2005, 17 pages.
Jabra, "Bluetooth Introduction", 2004, 15 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jawaid et al., "Machine Translation with Significant Word Reordering and Rich Target-Side Morphology", WDS'11 Proceedings of Contributed Papers, Part I, 2011, pp. 161-166.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice May 1980, pp. 381-397.
Jelinek, F., "Self-Organized Language Modeling for Speech Recognition", Readings in Speech Recognition, Edited by Alex Weibel and Kai-Fu Lee, Morgan Kaufmann Publishers, Inc., ISBN: 1-55860-124-4, 1990, 63 pages.
Jennings et al., "A Personal News Service Based on a User Model Neural Network", IEICE Transactions on Information and Systems, vol. E75-D, No. 2, Mar. 1992, 12 pages.
Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.
Jiang et al., "A Syllable-based Name Transliteration System", Proc. of the 2009 Named Entities Workshop, Aug. 7, 2009, pp. 96-99.
Johnson, Jeff A., "A Comparison of User Interfaces for Panning on a Touch-Controlled Display", CHI '95 Proceedings, 1995, 8 pages.
Johnson, Julia Ann., "A Data Management Strategy for Transportable Natural Language Interfaces", Doctoral Thesis Submitted to the Department of Computer Science, University of British Columbia, Canada, Jun. 1989, 285 pages.
Jones, J., "Speech Recognition for Cyclone", Apple Computer, Inc., E.R.S. Revision 2.9, Sep. 10, 1992, 93 pages.
Jouvet et al., "Evaluating Grapheme-to-phoneme Converters in Automatic Speech Recognition Context", IEEE,, 2012,, pp. 4821-4824.
Julia et al., "http://www.speech.sri.com/demos/atis.html", Proceedings of AAAI, Spring Symposium, 1997, 5 pages.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kaeppner et al., "Architecture of HeiPhone: A Testbed for Audio/Video Teleconferencing", IBM European Networking Center, 1993, 51 pages.
Kahn et al., "CoABS Grid Scalability Experiments", Autonomous Agents and Multi-Agent Systems, vol. 7, 2003, pp. 171-178.
Kamba et al., "Using Small Screen Space More Efficiently", CHI '96 Proceedings of the SIGCHI Conference on Human Factors in Computing Systems, Apr. 13-18, 1996, pp. 383-390.
Kamel et al., "A Graph Based Knowledge Retrieval System", IEEE International Conference on Systems, Man and Cybernetics, 1990, pp. 269-275.
Kanda et al., "Robust Domain Selection Using Dialogue History in Multi-domain Spoken Dialogue Systems", Journal of Information Processing Society, vol. 48, No. 5, May 15, 2007, pp. 1980-1989. (English Abstract Submitted).
Kanda et al., "Spoken Language Understanding Using Dialogue Context in Database Search Task", Journal of Information Processing Society of Japan, vol. 47, No. 6, Jun. 15, 2006, pp. 1802-1811. (English Abstract Submitted).
Kane et al., "Slide Rule: Making Mobile Touch Screens Accessible to Blind People Using Multi-Touch Interaction Techniques", ASSETS, Oct. 13-15, 2008, pp. 73-80.
Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.
Karp, P. D., "A Generic Knowledge-Base Access Protocol", Available online at <http://lecture.cs.buu.ac.th/-f50353/Document/gfp.pdf>, May 12, 1994, 66 pages.
Katz et al., "Exploiting Lexical Regularities in Designing Natural Language Systems", Proceedings of the 12th International Conference on Computational Linguistics, 1988, pp. 1-22.
Katz et al., "REXTOR: A System for Generating Relations from Natural Language", Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.

(56) References Cited

OTHER PUBLICATIONS

Katz, Boris, "Annotating the World Wide Web Using Natural Language", Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.
Kazemzadeh et al., "Acoustic Correlates of User Response to Error in Human-Computer Dialogues", Automatic Speech Recognition and Understanding, 2003, pp. 215-220.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P. J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Kikui, Gen-Itiro, "Identifying the Coding System and Language of On-Line Documents on the Internet", International Conference on Computational, Aug. 1996, pp. 652-657.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET '93, 1993, pp. 1-12.
Kitano, H., "PhiDM-Dialog, An Experimental Speech-to-Speech Dialog Translation System", Computer, vol. 24, No. 6, Jun. 1991, 13 pages.
Kitaoka et al., "Detection and Recognition of Correction Utterances on Misrecognition of Spoken Dialog System", Systems and Computers in Japan, vol. 36, No. 11 Oct. 2005, pp. 24-33.
Kjelldahl et al., "Multimedia—Principles, Systems, and Applications", Proceedings of the 1991 Eurographics Workshop on Multimedia Systems, Applications, and Interaction, Apr. 1991, 14 pages.
Klabbers et al., "Reducing Audible Spectral Discontinuities", IEEE Transactions on Speech and Audio Processing, vol. 9, No. 1, Jan. 2001, 13 pages.
Klatt et al., "Linguistic Uses of Segmental Duration in English: Acoustic and Perpetual Evidence", Journal of the Acoustical Society of America, vol. 59, No. 5, May 1976, 16 pages.
Kline et al., "Improving Gui Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Knownav, "Knowledge Navigator", YouTube Video available at <http://www.youtube.com/watch?v=QRH8eimU_20>, Apr. 29, 2008, 1 page.
Kohler, Joachim, "Multilingual Phone Models for Vocabulary-Independent Speech Recognition Tasks", Speech Communication, vol. 35, No. 1-2, Aug. 2001, pp. 21-30.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kroon et al., "Pitch Predictors with High Temporal Resolution", IEEE, vol. 2, 1990, pp. 661-664.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb. 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.
Ladefoged, Peter, "A Course in Phonetics", New York, Harcourt, Brace, Jovanovich, Second Edition, 1982.
Laface et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Laird et al., "SOAR: An Architecture for General Intelligence", Artificial Intelligence, vol. 33, 1987, pp. 1-64.
Lamel et al., "Generation and synthesis of Broadcast Messages", Proceedings of ESCA-NATO Workshop: Applications of Speech Technology, Sep. 1, 1993, 4 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Langley et al., "A Design for the ICARUS Architechture", SIGART Bulletin, vol. 2, No. 4, 1991, pp. 104-109.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Larks, "Intelligent Software Agents", available at <http://www.cs.cmu.edu/~softagents/larks.html> retrieved on Mar. 15, 2013, 2 pages.
Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and

(56) References Cited

OTHER PUBLICATIONS

IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.
Lee et al., "Golden Mandarin (II)—An Intelligent Mandarin Dictation Machine for Chinese Character Input with Adaptation/ Learning Functions", International Symposium on Speech, Image Processing and Neural Networks, Hong Kong, Apr. 1994, 5 pages.
Lee et al., "On URL Normalization", Proceedings of the International Conference on Computational Science and its Applications, ICCSA 2005, pp. 1076-1085.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.
Lee, Kai-Fu, "Automatic Speech Recognition", 1989, 14 pages (Table of Contents).
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent User Interfaces, Jan. 2005, pp. 231-238.
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Leveseque et al., "A Fundamental Tradeoff in Knowledge Representation and Reasoning", Readings in Knowledge Representation, 1985, 30 pages.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Cameron, "Task Ave for iPhone Review", Mac Life, Available at <http://www.maclife.com/article/reviews/task_ave_iphone_review>, Mar. 3, 2011, 5 pages.
Lewis, Peter, "Two New Ways to Buy Your Bits", CNN Money, available at <http://money.cnn.com/2003/12/30/commentary/ontechnology/download/>,, Dec. 31, 2003, 4 pages.
Li et al., "A Phonotactic Language model for Spoken Language Identification", Proceedings of the 43rd Annual Meeting of the ACL, Jun. 25, 2005, pp. 515-522.
Lieberman et al., "Out of Context: Computer Systems that Adapt to, and Learn from, Context", IBM Systems Journal, vol. 39, No. 3 & 4, 2000, pp. 617-632.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.
Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.
Logan et al., "Mel Frequency Cepstral Co-efficients for Music Modeling", International Symposium on Music Information Retrieval, 2000, 2 pages.
Lowerre, B. T., "The-Harpy Speech Recognition System", Doctoral Dissertation, Department of Computer Science, Carnegie Mellon University, Apr. 1976, 20 pages.
Lyon, R., "A Computational Model of Binaural Localization and Separation", Proceedings of IEEE International Conference on Acoustics, Speech and Signal Processing, Apr. 1983, pp. 1148-1151.
Lyons et al., "Augmenting Conversations Using Dual-Purpose Speech", Proceedings of the 17th Annual ACM Symposium on User interface Software and Technology, 2004, 10 pages.
Lyons, Richard F., "CCD Correlators for Auditory Models", Proceedings of the Twenty-Fifth Asilomar Conference on Signals, Systems and Computers, Nov. 4-6, 1991, pp. 785-789.
Macchi, Marian, "Issues in Text-to-Speech Synthesis" Proceedings of IEEE International Joint Symposia on Intelligence and Systems, May 21, 1998, pp. 318-325.
Mackenzie et al., "Alphanumeric Entry on Pen-Based Computers", International Journal of Human-Computer Studies, vol. 41, 1994, pp. 775-792.
Mackinlay et al., "The Perspective Wall: Detail and Context Smoothly Integrated", ACM, 1991, pp. 173-179.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
Mactech, "KeyStrokes 3.5 for Mac OS X Boosts Word Prediction", available at <http://www.mactech.com/news/?p=1007129>, retrieved on Jan. 7, 2008, 3 pages.
Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.
Mahedero et al., "Natural Language Processing of Lyrics", In Proceedings of the 13th Annual ACM International Conference on Multimedia, ACM, Nov. 6-11, 2005, 4 pages.
Mangu et al., "Finding Consensus in Speech Recognition: Word Error Minimization and Other Applications of Confusion Networks", Computer Speech and Language, vol. 14, No. 4, 2000, pp. 291-294.
Manning etal, "Foundations of Statistical Natural Language Processing", The MIT Press, Cambridge Massachusetts, 1999, pp. 10-11.
Marcus et al., "Building a Large Annotated Corpus of English: The Penn Treebank", Computational Linguistics, vol. 19, No. 2, 1993, pp. 313-330.
Markel et al., "Linear Prediction of Speech", Springer-Verlag, Berlin, Heidelberg, New York, 1976, 12 pages.
Markel et al., "Linear Production of Speech", Reviews, 1976, pp. xii, 288.
Martin et al., "Building and Using Practical Agent Applications", SRI International, PAAM Tutorial, 1998, 78 pages.

(56) References Cited

OTHER PUBLICATIONS

Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the Second International Conference on the Practical Application of Intelligent Agents and Multi-Agent Technology, Apr. 1997, pp. 1-20.
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf>>, retrieved from internet on Jan.-Mar. 1999.
Martin et al., "Transportability and Generality in a Natural-Language Interface System", Proceedings of the Eighth International Joint Conference on Artificial Intelligence, Technical Note 293, Aug. 1983, 21 pages.
Martins et al., "Extracting and Exploring the Geo-Temporal Semantics of Textual Resources", Semantic Computing, IEEE International Conference, 2008, pp. 1-9.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Matiasek et al., "Tamic-P: A System for NL Access to Social Insurance Database", 4th International Conference on Applications of Natural Language to Information Systems, Jun. 1999, 7 pages.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, pp. 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
McGuire et al., "SHADE: Technology for Knowledge-Based Collaborative Engineering", Journal of Concurrent Engineering Applications and Research (CERA), 1993, 18 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mellinger, David K., "Feature-Map Methods for Extracting Sound Frequency Modulation", IEEE Computer Society Press, 1991, pp. 795-799.
Meng et al., "Generating Phonetic Cognates to Handle Named Entities in English-Chinese Cross-Language Spoken Document Retrieval", Automatic Speech Recognition and Understanding, Dec. 2001, pp. 311-314.
Meng et al., "Wheels: A Conversational System in the Automobile Classified Domain", Proceedings of Fourth International Conference on Spoken Language, ICSLP 96, vol. 1, Oct. 1996, 4 pages.
Menico, Costas, "Faster String Searches", Dr. Dobb's Journal, vol. 14, No. 7, Jul. 1989, pp. 74-77.
Menta, Richard, "1200 Song MP3 Portable is a Milestone Player", available at <http://www.mp3newswire.net/stories/personaljuke.html>, Jan. 11, 2000, 4 pages.
Merlin et al., "Non Directly Acoustic Process for Costless Speaker Recognition and Indexation", International Workshop on Intelligent Communication Technologies and Applications, Jan. 1, 1999, 5 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Miastkowski, Stan, "paperWorks Makes Paper Intelligent", Byte Magazine, Jun. 1992.
Michos et al., "Towards an Adaptive Natural Language Interface to Command Languages", Natural Language Engineering, vol. 2, No. 3, 1996, pp. 191-209.
Microsoft Corporation, "Microsoft MS-DOS Operating System User's Guide", Microsoft Corporation, 1982, pp. 4-1 to 4-16, 5-1 to 5-19.
Microsoft Corporation, Microsoft Office Word 2003 (SP2), Microsoft Corporation, SP3 as of 2005, pp. MSWord 2003 Figures 1-5, 1983-2003.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pp. MSWord Figures 1-5, 1999.
Microsoft, "Turn on and Use Magnifier", available at <http://www.microsoft.com/windowsxp/using/accessibility/magnifierturnon.mspx>, retrieved on Jun. 6, 2009.
Microsoft/Ford, "Basic Sync Commands", www.SyncMyRide.com, Sep. 14, 2007, 1 page.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Miniman, Jared, "Applian Software's Replay Radio and Player v1.02", pocketnow.com —Review, available at <http://www.pocketnow.com/reviews/replay/replay.htm>, Jul. 31, 2001, 16 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Moberg et al., "Cross-Lingual Phoneme Mapping for Multilingual Synthesis Systems", Proceedings of the 8th International Conference on Spoken Language Processing, Jeju Island, Korea, Interspeech 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Mobile Tech News, "T9 Text Input Software Updated", available at <http://www.mobiletechnews.com/info/2004/11/23/122155.html>, Nov. 23, 2004, 4 pages.
Modi et al., "CMRadar: A Personal Assistant Agent for Calendar Management", AAAI, Intelligent Systems Demonstrations, 2004, pp. 1020-1021.
Mok et al., "Media Searching on Mobile Devices", IEEE EIT 2007 Proceedings, 2007, pp. 126-129.

(56) References Cited

OTHER PUBLICATIONS

Moore et al., "Combining Linguistic and Statistical Knowledge Sources in Natural-Language Processing for ATIS", SRI International, Artificial Intelligence Center, 1995, 4 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IU197), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3,, Mar. 1986, pp. 184-201.
Morton, Philip, "Checking If an Element Is Hidden", StackOverflow, Available at <http://stackoverflow.com/questions/178325/checking-if-an-element-is-hidden>, Oct. 7, 2008, 12 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Muller et al., "CSCW'92 Demonstrations", 1992, pp. 11-14.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Musicmatch, "Musicmatch and Xing Technology Introduce Musicmatch Jukebox", Press Releases, available at <http://www.musicmatch.com/info/company/press/releases/?year= 1998&release=2>, May 18, 1998, 2 pages.
Muthusamy et al., "Speaker-Independent Vowel Recognition: Spectograms versus Cochleagrams", IEEE, Apr. 1990, pp. 533-536.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
N200 Hands-Free Bluetooth Car Kit, available at <www.wirelessground.com>, retrieved on Mar. 19, 2007, 3 pages.
Nadoli et al., "Intelligent Agents in the Simulation of Manufacturing Systems", Proceedings of the SCS Multiconference on AI and Simulation, 1989, 1 page.
Nakagawa et al., "Speaker Recognition by Combining MFCC and Phase Information", IEEE International Conference on Acoustics, Speech and Signal Processing (ICASSP), Mar. 2010, 4 pages.
Nakagawa et al., "Unknown Word Guessing and Part-of-Speech Tagging Using Support Vector Machines", Proceedings of the 6th NLPRS, 2001, pp. 325-331.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 70 pages.
NCIP Staff, "Magnification Technology", available at <http://www2.edc.org/ncip/library/vi/magnifi.htm>, 1994, 6 pages.
NCIP, "NCIP Library: Word Prediction Collection", available at <http://www2.edc.org/ncip/library/wp/toc.htm>, 1998, 4 pages.
Ncip, "What is Word Prediction?", available at <http://www2.edc.org/NCIP/library/wp/what_is.htm>, 1998, 2 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Neches et al., "Enabling Technology for Knowledge Sharing", Fall, 1991, pp. 37-56.
Newton, Harry, "Newton's Telecom Dictionary", Mar. 1998, pp. 62, 155, 610-611, 771.
Ng, Simon, "Google's Task List Now Comes to Iphone", SimonBlog, Available at <http://www.simonblog.com/2009/02/04/googles-task-list-now-comes-to-iphone/>, Feb. 4, 2009, 33 pages.
Nguyen et al., "Generic Manager for Spoken Dialogue Systems", In DiaBruck: 7th Workshop on the Semantics and Pragmatics of Dialogue, Proceedings, 2003, 2 pages.
Niesler et al., "A Variable-Length Category-Based N-Gram Language Model", IEEE International Conference on Acoustics, Speech and Signal Processing (ICASSP'96), vol. 1, May 1996, 6 pages.
Nilsson, B. A., "Microsoft Publisher is an Honorable Start for DTP Beginners", Computer Shopper, Feb. 1, 1992, 2 pages.
Noik, Emanuel G., "Layout-Independent Fisheye Views of Nested Graphs", IEEE Proceedings of Symposium on Visual Languages, 1993, 6 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 Pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
O'Connor, Rory J., "Apple Banking on Newton's Brain", San Jose Mercury News, Apr. 22, 1991.
Odubiyi et al., "SAIRE—A Scalable Agent-Based Information Retrieval Engine", Proceedings of the First International Conference on Autonomous Agents, 1997, 12 pages.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.

(56) References Cited

OTHER PUBLICATIONS

Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
Osxdaily, "Get a List of Sin Commands Directly from Siri", Available at <http://osxdaily.com/2013/02/05/list-siri-commands/>, Feb. 5, 2013, 15 pages.
Owei et al., "Natural Language Query Filtration in the Conceptual Query Language", IEEE, 1997, pp. 539-549.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide: Your Palm® Treo.TM. 755p Smartphone", 2005-2007, 304 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.
Parks et al., "Classification of Whale and Ice Sounds with a cochlear Model", IEEE, Mar. 1992.
Parson, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.
Patent Abstracts of Japan, vol. 014, No. 273 (E-0940) Jun. 13, 1990 (Jun. 13, 1990)—& JP 02 086057 A (Japan Storage Battery Co Ltd), Mar. 27, 1990 (Mar. 27, 1990), 3 pages.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patterson et al., "Rendezvous: An Architecture for Synchronous Multi-User Applications", CSCW '90 Proceedings, 1990, pp. 317-328.
Pearl, Amy, "System Support for Integrated Desktop Video Conferencing", Sunmicrosystems Laboratories, Dec. 1992, pp. 1-15.
Penn et al., "Ale for Speech: A Translation Prototype", Bell Laboratories, 1999, 4 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
PhatNoise, Voice Index on Tap, Kenwood Music Keg, available at <http://www.phatnoise.com/kenwood/kenwoodssamail.html>, retrieved on Jul. 13, 2006, 1 page.
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.
Phoenix Solutions, Inc., "Declaration of Christopher Schmandt Regarding the MIT Galaxy System", West Interactive Corp., A Delaware Corporation, Document 40, Jul. 2, 2010, 162 pages.
Pickering, J. A., "Touch-Sensitive Screens: The Technologies and Their Application", International Journal of Man-Machine Studies, vol. 25, No. 3, Sep. 1986, pp. 249-269.
Picone, J., "Continuous Speech Recognition using Hidden Markov Models", IEEE ASSP Magazine, vol. 7, No. 3, Jul. 1990, 16 pages.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Pollock, Stephen, "A Rule-Based Message Filtering System", Published in: Journal, ACM Transactions on Information Systems (TOIS), vol. 6, Issue 3, Jul. 1988, pp. 232-254.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Powell, Josh, "Now You See Me . . . Show/Hide Performance", available at http://www.learningjguery.com/2010/05/now-you-see-me-showhide-performance, May 4, 2010, 3 pages.
Public Safety Technologies, "Tracer 2000 Computer", available at <http://www.pst911.com/tracer.html>, retrieved on Dec. 19, 2002, 3 pages.
Pulman et al., "Clare: A Combined Language and Reasoning Engine", Proceedings of JFIT Conference, available at <http://www.cam.sri.com/tr/crc042/paper.ps.Z>, 1993, 8 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Quick Search Algorithm, Communications of the ACM, 33(8), 1990, pp. 132-142.
Rabiner et al., "Digital Processing of Speech Signals", Prentice Hall, 1978, pp. 274-277.
Rabiner et al., "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K.,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.

(56) References Cited

OTHER PUBLICATIONS

Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner et al., "Adapting the Core Language Engine to French and Spanish", Cornell University Library, available at <http:I/arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.
Rayner, M., "Abductive Equivalential Translation and its Application to Natural Language Database Interfacing", Dissertation Paper, SRI International, Sep. 1993, 162 pages.
Rayner, Manny, "Linguistic Domain Theories: Natural-Language Database Interfacing from First Principles", SRI International, Cambridge, 1993, 11 pages.
Reddi, "The Parser".
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Remde et al., "SuperBook: An Automatic Tool for Information Exploration-Hypertext?", In Proceedings of Hypertext, 87 Papers, Nov. 1987, 14 pages.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction Interact, 1997, pp. 85-92.
Reynolds, C. F., "On-Line Reviews: a New Application of the HICOM Conferencing System", IEEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Ricker, Thomas, "Apple Patents Audio User Interface", Engadget, available at <http://www.engadget.com/2006/05/04/apple-patents-audio-user-interface/>, May 4, 2006, 6 pages.
Riecken, R D., "Adaptive Direct Manipulation", IEEE Xplore, 1991, pp. 1115-1120.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.
Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rioport, "Rio 500: Getting Started Guide", available at <http://ec1.images-amazon.com/media/i3d/01/A/man-migrate/MANUAL000023453.pdf>, 1999, 2 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech and Signal Processing (ICASSP'79), Apr. 1979, 5 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Roddy et al., "Communication and Collaboration in a Landscape of B2B eMarketplaces", VerticalNet Solutions, White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rose et al., "Inside Macintosh", vols. I, II, and III, Addison-Wesley Publishing Company, Inc., Jul. 1988, 1284 pages.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosenfeld, R., "A Maximum Entropy Approach to Adaptive Statistical Language Modelling", Computer Speech and Language, vol. 10, No. 3, Jul. 1996, 25 pages.
Rosner et al., "In Touch: A Graphical User Interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roszkiewicz, A., "Extending your Apple", Back Talk-Lip Service, A+ Magazine, The Independent Guide for Apple Computing, vol. 2, No. 2, Feb. 1984, 5 pages.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al., "High Quality Time-Scale Modification for Speech", Proceedings of the 1985 IEEE Conference on Acoustics, Speech and Signal Processing, 1985, pp. 493-496.
Rubine, Dean Harris, "Combining Gestures and Direct Manipulation", CHI '92, May 3-7, 1992, pp. 659-660.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Ruch et al., "Using Lexical Disambiguation and Named-Entity Recognition to Improve Spelling Correction in the Electronic Patient Record", Artificial Intelligence in Medicine, Sep. 2003, pp. 169-184.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approach", Prentice Hall, Inc., 1995, 121 pages.
Russo et al., "Urgency is a Non-Monotonic Function of Pulse Rate", Journal of the Acoustical Society of America, vol. 122, No. 5, 2007, 6 pages.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.
Sacerdoti et al., "A Ladder User's Guide (Revised)", SRI International Artificial Intelligence Center, Mar. 1980, 39 pages.

(56) References Cited

OTHER PUBLICATIONS

Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
Sankar, Ananth, "Bayesian Model Combination (BAYCOM) for Improved Recognition", IEEE International Conference on Acoustics, Speech, and Signal Processing (ICASSP), Mar. 18-23, 2005, pp. 845-848.
San-Segundo et al., "Confidence Measures for Dialogue Management in the CU Communicator System", Proceedings of Acoustics, Speech and Signal Processing (ICASSP'00), Jun. 2000, 4 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Santen, Van P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Graphical Fisheye Views of Graphs", Systems Research Center, Digital Equipment Corporation,, Mar. 17, 1992, 31 pages.
Sarkar et al., "Graphical Fisheye Views", Communications of the ACM, vol. 37, No. 12, Dec. 1994, pp. 73-83.
Sarkar et al., "Stretching the Rubber Sheet: A Metaphor for Viewing Large Layouts on Small Screens", UIST'93, ACM, Nov. 3-5, 1993, pp. 81-91.
Sarvas et al., "Metadata Creation System for Mobile Images", Conference Proceedings, The Second International Conference on Mobile Systems, Applications and Services, Jun. 6, 2004, pp. 36-48.
Sastry, Ravindra W., "A Need for Speed: A New Speedometer for Runners", submitted to the Department of Electrical Engineering and Computer Science at the Massachusetts Institute of Technology, 1999, pp. 1-42.
Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schafer et al., "Digital Representations of Speech Signals", Proceedings of the IEEE, vol. 63, No. 4, Apr. 1975, pp. 662-677.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Augmenting a Window System with Speech Input", IEEE Computer Society, Computer, vol. 23, No. 8, Aug. 1990, 8 pages.
Schmandt et al., "Phone Slave: A Graphical Telecommunications Interface", Proceedings of the SID, vol. 26, No. 1, 1985, pp. 79-82.
Schmandt et al., "Phone Slave: A Graphical Telecommunications Interface", Society for Information Display, International Symposium Digest of Technical Papers, Jun. 1984, 4 pages.
Schmid, H., "Part-of-speech tagging with neural networks", COLING '94 Proceedings of the 15th conference on Computational linguistics—vol. 1, 1994, pp. 172-176.
Schnelle, Dirk, "Context Aware Voice User Interfaces for Workflow Support", Dissertation paper, Aug. 27, 2007, 254 pages.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Schooler et al., "A Packet-switched Multimedia Conferencing System", by Eve Schooler, et al; ACM SIGOIS Bulletin, vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schooler, Eve, "A Distributed Architecture for Multimedia Conference Control", ISI Research Report, Nov. 1991, pp. 1-18.
Schultz, Tanja, "Speaker Characteristics", In: Speaker Classification I, retrieved from <http://ccc.inaoep.mx/~villasen/bib/Speaker%20Characteristics.pdf>, 2007, pp. 47-74.
Schütze, H., "Dimensions of Meaning", Proceedings of Supercomputing'92 Conference, Nov. 1992, 10 pages.
Schütze, H., "Distributional part-of-speech tagging", EACL '95 Proceedings of the seventh conference on European chapter of the Association for Computational Linguistics, 1995, pp. 141-148.
Schütze, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient and Exact Procedure for Finding the N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.

(56) References Cited

OTHER PUBLICATIONS

Sears et al., "Investigating Touchscreen Typing: The Effect of Keyboard Size on Typing Speed", Behavior & Information Technology, vol. 12, No. 1, 1993, pp. 17-22.
Sears et al., "Touchscreen Keyboards", Apple Inc., Video Clip, Human-Computer Interaction Laboratory, on a CD, Apr. 1991.
Seide et al., "Improving Speech Understanding by Incorporating Database Constraints and Dialogue History", Proceedings of Fourth International Conference on Philadelphia 1996, pp. 1017-1020.
Sen et al., "Indian Accent Text-to-Speech System for Web Browsing", Sadhana, vol. 27, No. 1, Feb. 2002, pp. 113-126.
Seneff et al., "A New Restaurant Guide Conversational System: Issues in Rapid Prototyping for Specialized Domains", Proceedings of Fourth International Conference on Spoken Language, vol. 2, 1996, 4 pages.
Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.
Sharoff et al., "Register-Domain Separation as a Methodology for Development of Natural Language Interfaces to Databases", Proceedings of Human-Computer Interaction (Interact'99), 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "Capit: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.
Shklar et al., "InfoHarness: Use of Automatically Generated Metadata for Search and Retrieval of Heterogeneous Information", Proceedings of CAiSE'95, Finland, 1995, 14 pages.
Shneiderman, Ben, "Designing the User Interface: Strategies for Effective Human-Computer Interaction", Second Edition, 1992, 599 pages.
Shneiderman, Ben, "Designing the User Interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, (Table of Contents, Title Page, Ch. 4, Ch. 6 and List of References), 133 pages (various sections).
Shneiderman, Ben, "The Eyes Have It: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Mar. 1991, pp. 93-94.
Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.
Sigurdsson et al., "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simkovitz, Daniel, "LP-DOS Magnifies the PC Screen", IEEE, 1992, pp. 203-204.
Simonite, Tom, "One Easy Way to Make Sin Smarter", Technology Review, Oct. 18, 2011, 2 pages.
Singh et al., "Automatic Generation of Phone Sets and Lexical Transcriptions", Acoustics, Speech and Signal Processing (ICASSP'00), 2000, 1 page.
Singh, N., "Unifying Heterogeneous Information Models", Communications of the ACM, 1998, 13 pages.
Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.
Slaney et al., "On the Importance of Time—A Temporal Representation of Sound", Visual Representation of Speech Signals, 1993, pp. 95-116.
Smeaton, Alan F., "Natural Language Processing and Information Retrieval", Information Processing and Management, vol. 26, No. 1, 1990, pp. 19-20.
Smith et al., "Guidelines for Designing User Interface Software", User Lab, Inc., Aug. 1986, pp. 1-384.
Smith et al., "Relating Distortion to Performance in Distortion Oriented Displays", Proceedings of Sixth Australian Conference on Computer-Human Interaction, Nov. 1996, pp. 6-11.
Sony Ericsson Corporate, "Sony Ericsson to introduce Auto pairing.TM. to Improve Bluetooth.TM. Connectivity Between Headsets and Phones", Press Release, available at <http://www.sonyericsson.com/spg.jsp?cc=global&lc=en&ver=4001&template=pc3_1_ 1&z . . . >, Sep. 28, 2005, 2 pages.
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.
Speaker Recognition, Wikipedia, The Free Enclyclopedia, Nov. 2, 2010, 4 pages.
Spiller, Karen, "Low-Decibel Earbuds Keep Noise at a Reasonable Level", available at <http://www.nashuatelegraph.com/apps/pbcs.dll/article?Date=20060813&Cate . . . >, Aug. 13, 2006, 3 pages.
SRI International, "The Open Agent Architecture TM 1.0 Distribution", Open Agent Architecture (OAA), 1999, 2 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Srihari, R. K.., "Use of Multimedia Input in Automated Image Annotation and Content-based Retrieval", Proceedings of Spie, International Society for Optical Engineering, vol. 2420, Feb. 9, 1995., pp. 249-260.
Srinivas et al., "Monet: A Multi-Media System for Conferencing and Application Sharing in Distributed Systems", CERC Technical Report Series Research Note, Feb. 1992.
Starr et al., "Knowledge-Intensive Query Processing", Proceedings of the 5th KRDB Workshop, Seattle, May 31, 1998, 6 pages.
Stealth Computer Corporation, "Peripherals for Industrial Keyboards & Pointing Devices", available at <http://www.stealthcomputer.com/peripherals_oem.htm>, retrieved on Dec. 19, 2002, 6 pages.
Steinberg, Gene, "Sonicblue Rio Car (10 GB, Reviewed: 6 GB)", available at <http://electronics.cnet.com/electronics/0-6342420-1304-4098389.htrnl>, Dec. 12, 2000, 2 pages.
Stent et al., "Geo-Centric Language Models for Local Business Voice Search", AT&T Labs—Research, 2009, pp. 389-396.
Stent et al., "The CommandTalk Spoken Dialogue System", SRI International, 1999, pp. 183-190.

(56) References Cited

OTHER PUBLICATIONS

Stern et al., "Multiple Approaches to Robust Speech Recognition", Proceedings of Speech and Natural Language Workshop, 1992, 6 pages.
Stickel, Mark E., "A Nonclausal Connection-Graph Resolution Theorem-Proving Program", Proceedings of AAAI'82, 1982, 5 pages.
Stifelman, L., "Not Just Another Voice Mail System", Proceedings of 1991 Conference, American Voice, Atlanta GA, Sep. 24-26, 1991, pp. 21-26.
Stone et al., "The Movable Filter as a User Interface Tool", CHI '94 Human Factors in Computing Systems, 1994, pp. 306-312.
Strom et al., "Intelligent Barge-In in Conversational Systems", MIT laboratory for Computer Science, 2000, 4 pages.
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Su et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, Oct. 1998, pp. 705, 707-710.
Sugumaran, V., "A Distributed Intelligent Agent-Based Spatial Decision Support System", Proceedings of the Americas Conference on Information systems (AMCIS), Dec. 31, 1998, 4 pages.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
Sundaram et al., "Latent Perceptual Mapping with Data-Driven Variable-Length Acoustic Units for Template-Based Speech Recognition", ICASSP 2012, Mar. 2012, pp. 4125-4128.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
T3 Magazine, "Creative MuVo Tx 256MB", available at <http://www.t3.co.uk/reviews/entertainment/mp3_player/creative_muvo_tx_256mb>, Aug. 17, 2004, 1 page.
Taos, "Taos, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Taylor et al., "Speech Synthesis by Phonological Structure Matching", International Speech Communication Association, vol. 2, Section 3, 1999, 4 pages.
Tello, Ernest R., "Natural-Language Systems", Mastering AI Tools and Techniques, Howard W. Sams & Company, 1988, pp. 25-64.
Tenenbaum et al., "Data Structure Using Pascal", Prentice-Hall, Inc., 1981, 34 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
TG3 Electronics, Inc., "BL82 Series Backlit Keyboards", available at <http://www.tg3electronics.com/products/backlit/backlit.htm>, retrieved on Dec. 19, 2002, 2 pages.
The HP 150, "Hardware: Compact, Powerful, and Innovative", vol. 8, No. 10, Oct. 1983, pp. 36-50.
Tidwell, Jenifer, "Animated Transition", Designing Interfaces, Patterns for effective Interaction Design, Nov. 2005, First Edition, 4 pages.
Timothy et al., "Speech-Based Annotation and Retrieval of Digital Photographs", Interspeech. 8th Annual Conference of the International Speech Communication Association, Aug. 27, 2007, pp. 2165-2168.
Tofel, Kevin C., "SpeakTolt: A Personal Assistant for Older iPhones, iPads", Apple News, Tips and Reviews, Feb. 9, 2012, 7 pages.
Tombros et al., "Users' Perception of Relevance of Spoken Documents", Journal of the American Society for Information Science, New York, Aug. 2000, pp. 929-939.
Top 10 Best Practices for Voice User Interface Design available at <http://www.developer.com/voice/article.php/1567051/Top-10-Best-Practices-for-Voice-UserInterface-Design.htm>, Nov. 1, 2002, 4 pages.
Touch, Joseph, "Zoned Analog Personal Teleconferencing", USC / Information Sciences Institute, 1993, pp. 1-19.
Toutanova et al., "Feature-Rich Part-of-Speech Tagging with a Cyclic Dependency Network", Computer Science Dept., Stanford University, Stanford CA 94305-9040, 2003, 8 pages.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp. 1-6.
Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.
Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Turletti, Thierry, "The INRIA Videoconferencing System (IVS)", Oct. 1994, pp. 1-7.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1994, 9 pages.
Uslan et al., "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al., "A Review of Two Screen Magnification Programs for Windows 95: Magnum 95 and LP-Windows", Journal of Visual Impairment & Blindness, Sep.-Oct. 1997, pp. 9-13.
Van Santen, J. P.H., "Contextual Effects on Vowel Duration", Journal Speech Communication, vol. 11, No. 6, Dec. 1992, pp. 513-546.
Veiga, Alex, "AT&T Wireless Launching Music Service", available at <http://bizyahoo.com/ap/041005/at_t_mobile_music_5.html?printer=1>, Oct. 5, 2004, 2 pages.
Vepa et al., "New Objective Distance Measures for Spectral Discontinuities in Concatenative Speech Synthesis", Proceedings of the IEEE 2002 Workshop on Speech Synthesis, 2002, 4 pages.
Verschelde, Jan, "MATLAB Lecture 8. Special Matrices in MATLAB", UIC, Dept. of Math, Stat. & CS, MCS 320, Introduction to Symbolic Computation, 2007, 4 pages.

(56) References Cited

OTHER PUBLICATIONS

Viegas et al., "Chat Circles", SIGCHI Conference on Human Factors in Computing Systems, May 15-20, 1999, pp. 9-16.
Viiki et al., "Speaker- and Language-Independent Speech Recognition in Mobile Communication Systems", IEEE, vol. 1, 2001, pp. 5-8.
Vingron, Martin, "Near-Optimal Sequence Alignment", Current Opinion in Structural Biology, vol. 6, No. 3, 1996, pp. 346-352.
Vlingo Incar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
Vogel et al., "Shift: A Technique for Operating Pen-Based Interfaces Using Touch", CHI '07 Proceedings, Mobile Interaction Techniques I, Apr. 28-May 3, 2007, pp. 657-666.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJgpWgQS98w>, Jul. 27, 2009, 1 page.
W3C Working Draft, "Speech Synthesis Markup Language Specification for the Speech Interface Framework", available at <http://www.w3org./TR/speech-synthesis>, retrieved on Dec. 14, 2000, 42 pages.
Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Wahlster et al., "Smartkom: Multimodal Communication with a Life-Like Character", Eurospeech-Scandinavia, 7th European Conference on Speech Communication and Technology, 2001, 5 pages.
Waibel, Alex, "Interactive Translation of Conversational Speech", Computer, vol. 29, No. 7, Jul. 1996, pp. 41-48.
Waldinger et al., "Deductive Question Answering from Multiple Resources", New Directions in Question Answering, Published by AAAI, Menlo Park, 2003, 22 pages.
Walker et al., "Natural Language Access to Medical Text", SRI International, Artificial Intelligence Center, Mar. 1981, 23 pages.
Walker et al., "The LOCUS Distributed Operating System 1", University of California Los Angeles, 1983, pp. 49-70.
Waltz, D., "An English Language Question Answering System for a Large Relational Database", ACM, vol. 21, No. 7, 1978, 14 pages.
Wang et al., "An Industrial-Strength Audio Search Algorithm", In Proceedings of the International Conference on Music Information Retrieval (ISMIR), 2003, 7 pages.
Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.
Wang et al., "Tone Recognition of Continuous Mandarin Speech Based on Hidden Markov Model", International Journal of Pattern Recognition and Artificial Intelligence, vol. 8, 1994, pp. 233-245.
Ward et al., "A Class Based Language Model for Speech Recognition", IEEE, 1996, 3 pages.
Ward et al., "Recent Improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90, 1990, pp. 127-129.
Ware et al., "The DragMag Image Magnifier Prototype I", Apple Inc., Video Clip, Marlon, on a CD, Applicant is not Certain about the Date for the Video Clip., 1995.
Warren et al., "An Efficient Easily Adaptable System for Interpreting Natural Language Queries", American Journal of Computational Linguistics, vol. 8, No. 3-4, 1982, 11 pages.
Watabe et al., "Distributed Multiparty Desktop Conferencing System: Mermaid", CSCW 90 Proceedings, Oct. 1990, pp. 27-38.
Weizenbaum, J., "Eliza—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Westerman, Wayne, "Hand Tracking, Finger Identification and Chordic Manipulation on a Multi-Touch Surface", Doctoral Dissertation, 1999, 363 Pages.
What is Fuzzy Logic?, available at <http://www.cs.cmu.edu>, retrieved on Apr. 15, 1993, 5 pages.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Windows XP: A Big Surprise!—Experiencing Amazement from Windows XP, New Computer, No. 2, Feb. 28, 2002, 8 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wolff, M., "Post Structuralism and the ARTFUL Database: Some Theoretical Considerations", Information Technology and Libraries, vol. 13, No. 1, Mar. 1994, 10 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Worldwide Character Encoding, Version 2.0, vols. 1,2 by Unicode, Inc., 12 pages.
Written Opinion received for PCT Patent Application No. PCT/US2005/046797, dated Nov. 24, 2006, 9 pages.
Wu et al., "Automatic Generation of Synthesis Units and Prosodic Information for Chinese Concatenative Synthesis", Speech Communication, vol. 35, No. 3-4, Oct. 2001, pp. 219-237.
Wu et al., "KDA: A Knowledge-Based Database Assistant", Proceeding of the Fifth International Conference on Engineering (IEEE Cat.No. 89CH2695-5), 1989, 8 pages.
Wu, M., "Digital Speech Processing and Coding", Multimedia Signal Processing, Lecture-2 Course Presentation, University of Maryland, College Park, 2003, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.

(56) References Cited

OTHER PUBLICATIONS

Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yarowsky, David, "Homograph Disambiguation in Text-to-Speech Synthesis", Chapter 12, Progress in Speech Synthesis, 1997, pp. 157-172.
Yiourgalis et al., "Text-to-Speech system for Greek", ICASSP 91, vol. 1, May 14-17, 1991, pp. 525-528.
Yoon et al., "Letter-to-Sound Rules for Korean", Department of Linguistics, The Ohio State University, 2002, 4 pages.
Young et al, "The HTK Book", Version 3.4, Dec. 2006, 368 pages.
Youtube, "New bar search for Facebook", available at "https://www.youtube.com/watch?v=vwgN1WbvCas", 2 pages.
Yunker, John, "Beyond Borders: Web Globalization Strategies", New Riders, Aug. 22, 2002, 11 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zeng et al., "Cooperative Intelligent Software Agents", The Robotics Institute, Carnegie-Mellon University, Mar. 1995, 13 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhao et al., "Intelligent Agents for Flexible Workflow Systems", Proceedings of the Americas Conference on Information Systems (AMCIS), Oct. 1998, 4 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhong et al., "JustSpeak: Enabling Universal Voice Control on Android", W4A'14, Proceedings of the 11th Web for All Conference, No. 36, Apr. 7-9, 2014, 8 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
Zovato et al., "Towards Emotional Speech Synthesis: A Rule based Approach", Proceedings of 5th ISCA Speech Synthesis Workshop—Pittsburgh, 2004, pp. 219-220.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al., "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
Zue, Victor, "Conversational Interfaces: Advances and Challenges", Spoken Language System Group, Sep. 1997, 10 pages.
Office Action received for Danish Patent Application No. PA201770035, dated Jan. 8, 2019, 4 pages.
Office Action received for Korean Patent Application No. 10-2018-7023111, dated Jan. 2, 2019, 11 pages.
"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.
"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.
"Ask Alexa—Things That Are Smart Wiki", Available online at <URL:http://thingsthataresmart.wiki/index.php?title=Ask_Alexa&oldid=4283>,[retrieved from internet on Aug. 2, 2017], Jun. 8, 2016, pp. 1-31.
"DIRECTV™ Voice", Now Part of the DIRECTTV Mobile App for Phones, Sep. 18, 2013, 5 pages.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Anania, Peter, "Amazon Echo with Home Automation (Smartthings)", Available online at https://www.youtube.com/watch?v=LMW6aXmsWNE, Dec. 20, 2015, 1 page.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (See Communication under 37 CFR § 1.98(a) (3)).
Cambria et al., "Jumping NLP Curves: A Review of Natural Language Processing Research", IEEE Computational Intelligence Magazine, 2014, vol. 9, May 2014, pp. 48-57.
Deedeevuu, "Amazon Echo Alarm Feature", Available online at https://www.youtube.com/watch?v=fdjU8eRLk7c, Feb. 16, 2015, 1 page.
Filipowicz, Luke, "How to use the Quick Type Keyboard in iOS 8", available online at <https://www.imore.com/comment/568232>, Oct. 11, 2014, pp. 1-17.
Finkel et al., "Joint Parsing and Named Entity Recognition", Human Language Technologies: The 2009 Annual Conference of the North American Chapter of the ACL, Jun. 2009, pp. 326-334.
Gomez et al., "Mouth Gesture and Voice Command Based Robot Command Interface", IEEE International Conference on Robotics and Automation, May 12-17, 2009, pp. 333-338.
Jonsson et al, "Proximity-based Reminders Using Bluetooth", 2014 IEEE International Conference on Pervasive Computing and Communications Demonstrations, 2014, pp. 151-153.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Mhatre et al., "Donna Interactive Chat-bot acting as a Personal Assistant", International Journal of Computer Applications (0975-8887), vol. 140, No. 10, Apr. 2016, 6 pages.
Morrison, Jonathan, "iPhone 5 Siri Demo", Online Available at <https://www.youtube.com/watch?v=_wHWwG5IhWc>, Sep. 21, 2012, 3 pages.
Nakazawa et al., "Detection and Labeling of Significant Scenes from TV program based on Twitter Analysis", Proceedings of the 3rd Forum on Data Engineering and Information Management (DEIM 2011 proceedings), IEICE Data Engineering Technical Group. Available online at: http://db-event.jpn.org/deim2011/proceedings/pdf/f5-6.pdf, Feb. 28, 2011, 10 pages (See Communication under 37 CFR § 1.98(a) (3)).
Nozawa, Naoki et al., "iPhone 4S Perfect Manual", vol. 1, First Edition, Nov. 11, 2011, 5 pages.
Patra et al., "A Kernel-Based Approach for Biomedical Named Entity Recognition", Scientific World Journal, vol. 2013, 2013, pp. 1-7.
Routines, "SmartThings Support", Available online at <https://web.archive.org/web/20151207165701/https://support.smartthings.com/hc/en-us/articles/205380034-Routines>, 2015, 2 pages.

(56) References Cited

OTHER PUBLICATIONS

Selfrifge et al., "Interact: Tightly-coupling Multimodal Dialog with an Interactive Virtual Assistant", International Conference on Multimodal Interaction, ACM, Nov. 9, 2015, pp. 381-382.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Vodafone Deutschland, "Samsung Galaxy S3 Tastatur Spracheingabe", Available online at—"https://www.youtube.com/watch?v=6kOd6Gr8uFE", Aug. 22, 2012, 1 page.
X.AI, "How it Works", May 2016, 6 pages.
Yan et al., "A Scalable Approach to Using DNN-Derived Features in GMM-HMM Based Acoustic Modeling for LVCSR", InInterspeech, 2013, pp. 104-108.
Young et al., "The Hidden Information State model: A practical framework for POMDP-based spoken dialogue management", Computer Speech & Language, vol. 24, Issue 2, 2010, pp. 150-174.
Zangerle et al., "Recommending #—Tag in Twitter", Proceedings of the Workshop on Semantic Adaptive Socail Web, 2011, pp. 1-12.
Karn, Ujjwal, "An Intuitive Explanation of Convolutional Neural Networks", The Data Science Blog, Aug. 11, 2016, 23 pages.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Intention to Grant received for Danish Patent Application No. PA201770036, dated May 1, 2018, 2 pages.
Office Action received for Danish Patent Application No. PA201770032, dated Apr. 16, 2018, 5 pages.
Office Action received for Danish Patent Application No. PA201770032, dated Apr. 18, 2017, 10 pages.
Office Action received for Danish Patent Application No. PA201770032, dated Oct. 19, 2017, 2 pages.
Office Action received for Danish Patent Application No. PA201770035, dated Mar. 20, 2018, 5 pages.
Office Action received for Danish Patent Application No. PA201770035, dated Mar. 23, 2017, 6 pages.
Office Action received for Danish Patent Application No. PA201770035, dated Oct. 17, 2017, 4 pages.
Office Action received for Danish Patent Application No. PA201770036, dated Feb. 21, 2018, 3 pages.
Office Action received for Danish Patent Application No. PA201770036, dated Jun. 20, 2017, 10 pages.
Decision to Grant received for Danish Patent Application No. PA201770036, dated Oct. 8, 2018, 2 pages.
Non-Final Office Action received for U.S. Appl. No. 15/271,766, dated Oct. 1, 2018, 16 pages.
Notice of Acceptance received for Australian Patent application No. 2016409890, dated Jul. 6, 2018, 3 pages.
International Preliminary Report on Patentability received for PCT Patent Application No. PCT/US2016/059953, dated Dec. 20, 2018, 9 pages.
Office Action received for Japanese Patent Application No. 2018-535277, dated Nov. 19, 2018, 10 pages (5 pages of English Translation and 5 pages of Official Copy).
Final Office Action Received for U.S. Appl. No. 15/271,766, dated Mar. 11, 2019, 17 pages.
Extended European Search Report received for European Patent Application No. 19150734.2, dated Apr. 26, 2019, 8 pages.
Office Action received for Japanese Patent Application No. 2018-535277, dated Mar. 12, 2019, 7 pages (3 pages of English Translation and 4 pages of Official Copy).
Decision to Grant received for Danish Patent Application No. PA201770032, dated May 22, 2019, 2 pages.
Notice of Acceptance received for Australian Patent Application No. 2018241102, dated May 22, 2019, 3 pages.
Intention to Grant received for Danish Patent Application No. PA201770035, dated Apr. 26, 2019, 2 pages.
Intention to Grant received for Danish Patent Application No. PA201770032, dated Mar. 18, 2019, 2 pages.
Corrected Notice of Allowance for U.S. Appl. No. 15/271,766, dated Sep. 30, 2019, 2 pages.
Office Action received for Japanese Patent Application No. 2019-121991, dated Aug. 30, 2019, 4 pages (2 pages of English translation and 2 pages of Official copy).
Office Action received for Australian Patent Application No. 2019213416, dated Aug. 14, 2019, 4 pages.
Extended European Search Report received for European Patent Application No. 19157463.1, dated Jun. 6, 2019, 8 pages.
Extended European Search Report received for European Patent Application No. 16904830.3, dated Jun. 24, 2019, 8 pages.
Notice of Allowance received for U.S. Appl. No. 15/271,766, dated Jul. 31, 2019, 19 pages.
Decision to Grant received for Danish Patent Application No. PA201770035, dated Jun. 21, 2019, 2 Pages.
Office Action received for Korean Patent Application No. 10-2018-7023111, dated Sep. 25, 2019, 6 pages (3 pages of English Translation and 3 pages of Official Copy).
Office Action received for Korean Patent Application No. 10-2019-7004448, dated Sep. 19, 2019, 12 pages (6 pages of English Translation and 6 pages of Official Copy).
Notice of Allowance received for Japanese Patent Application No. 2019-121991, dated Dec. 13, 2019, 4 pages (1 page of English Translation and 3 pages of Official Copy).
Office Action received for Korean Patent Application No. 10-2018-7023111, dated Dec. 12, 2019, 6 pages (3 pages of English Translation and 3 pages of Official Copy).
Notice of Acceptance received for Australian Patent Application No. 2019213416, dated Nov. 7, 2019, 3 pages.
Applicant-Initiated Interview Summary received for U.S. Appl. No. 16/402,922, dated Jan. 17, 2020, 3 pages.
Corrected Notice of Allowance received for U.S. Appl. No. 15/271,766, dated Dec. 4, 2019, 2 pages.
Corrected Notice of Allowance received for U.S. Appl. No. 15/271,766, dated Jan. 28, 2020, 2 pages.
Corrected Notice of Allowance received for U.S. Appl. No. 15/271,766, dated Oct. 15, 2019, 2 pages.
Final Office Action received for U.S. Appl. No. 16/402,922, dated Jan. 31, 2020, 22 pages.
Non-Final Office Action received for U.S. Appl. No. 16/402,922, dated Oct. 18, 2019, 20 pages.
Office Action received for European Patent Application No. 16904830.3, dated Feb. 28, 2020, 7 pages.
Office Action received for European Patent Application No. 19150734.2, dated Feb. 21, 2020, 7 pages.
Office Action received for European Patent Application No. 19157463.1, dated Mar. 2, 2020, 7 pages.

* cited by examiner

INTELLIGENT DIGITAL ASSISTANT IN A MULTI-TASKING ENVIRONMENT

CROSS-REFERENCE TO RELATED APPLICATIONS

This is a continuation application of U.S. patent application Ser. No. 15/271,766, entitled "INTELLIGENT DIGITAL ASSISTANT IN A MULTI-TASKING ENVIRONMENT," filed on Sep. 21, 2016, which claims priority to U.S. Provisional Patent Application Ser. No. 62/348,728, entitled "INTELLIGENT DIGITAL ASSISTANT IN A MULTI-TASKING ENVIRONMENT," filed on Jun. 10, 2016. The content of both applications is hereby incorporated by reference in its entirety for all purposes.

FIELD

The present disclosure relates generally to a digital assistant and, more specifically, to a digital assistant that interacts with a user to perform a task in a multi-tasking environment.

BACKGROUND

Digital assistants are increasing popular. In a desktop or tablet environment, a user frequently multi-tasks including searching files or information, managing files or folders, playing movies or songs, editing documents, adjusting system configurations, sending emails, etc. It is often cumbersome and inconvenient for the user to manually perform multiple tasks in parallel and to frequently switch between tasks. It is thus desirable for a digital assistant to have the ability to assist the user to perform some of the tasks in a multi-tasking environment based on a user's voice input.

BRIEF SUMMARY

Some existing techniques for assisting the user to perform a task in a multi-tasking environment may include, for example, dictation. Typically, a user may be required to manually perform many other tasks in a multi-tasking environment. As an example, a user may have been working on a presentation yesterday on his or her desktop computer and may wish to continue to work on the presentation. The user is typically required to manually locate the presentation on his or her desktop computer, open the presentation, and continue the editing of the presentation.

As another example, a user may have been booking a flight on his or her smartphone when the user is away from his desktop computer. The user may wish to continue booking the flight when the desktop computer is available. In existing technologies, the user needs to launch a web browser and start over on the flight booking process at the user's desktop computer. In other words, the prior flight booking progress that the user made at the smartphone may not be continued at the user's desktop computer.

As another example, a user may be editing a document on his or her desktop computer and wish to change a system configuration such as changing the brightness level of the screen, turning on Bluetooth connections, or the like. In existing technologies, the user may need to stop editing the document, find and launch the brightness configuration application, and manually change the settings. In a multi-tasking environment, some existing technologies are incapable of performing tasks as described in the above examples based on a user's speech input. Providing a voice-enabled digital assistant in a multi-tasking environment is thus desired and advantageous.

Systems and processes for operating a digital assistant are provided in accordance with one or more examples, a method includes, at a user device with one or more processors and memory, receiving a first speech input from a user. The method further includes identifying context information associated with the user device and determining a user intent based on the first speech input and the context information. The method further includes determining whether the user intent is to perform a task using a searching process or an object managing process. The searching process is configured to search data stored internally or externally to the user device, and the object managing process is configured to manage objects associated with the user device. The method further includes, in accordance with a determination that the user intent is to perform the task using the searching process, performing the task using the searching process. The method further includes, in accordance with the determination that the user intent is to perform the task using the object managing process, performing the task using the object managing process.

In accordance with one or more examples, a method includes, at a user device with one or more processors and memory, receiving a speech input from a user to perform a task. The method further includes identifying context information associated with the user device and determining a user intent based on the speech input and context information associated with the user device. The method further includes, in accordance with user intent, determining whether the task is to be performed at the user device or at a first electronic device communicatively connected to the user device. The method further includes, in accordance with a determination that the task is to be performed at the user device and content for performing the task is located remotely, receiving the content for performing the task. The method further includes, in accordance with a determination that the task is to be performed at the first electronic device and the content for performing the task is located remotely to the first electronic device, providing the content for performing the task to the first electronic device.

In accordance with one or more examples, a method includes, at a user device with one or more processors and memory, receiving a speech input from a user to manage one or more system configurations of the user device. The user device is configured to concurrently provide a plurality of user interfaces. The method further includes identifying context information associated with the user device and determining a user intent based on the speech input and context information. The method further includes determining whether the user intent indicates an informational request or a request for performing a task. The method further includes, in accordance with a determination that the user intent indicates an informational request, providing a spoken response to the informational request. The method further includes, in accordance with a determination that the user intent indicates a request for performing a task, instantiating a process associated with the user device to perform the task.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE DRAWINGS

For a better understanding of the various described embodiments, reference should be made to the Detailed. Description below, in conjunction with the following drawings in which like reference numerals refer to corresponding parts throughout the figures.

DETAILED DESCRIPTION

Figure 1:
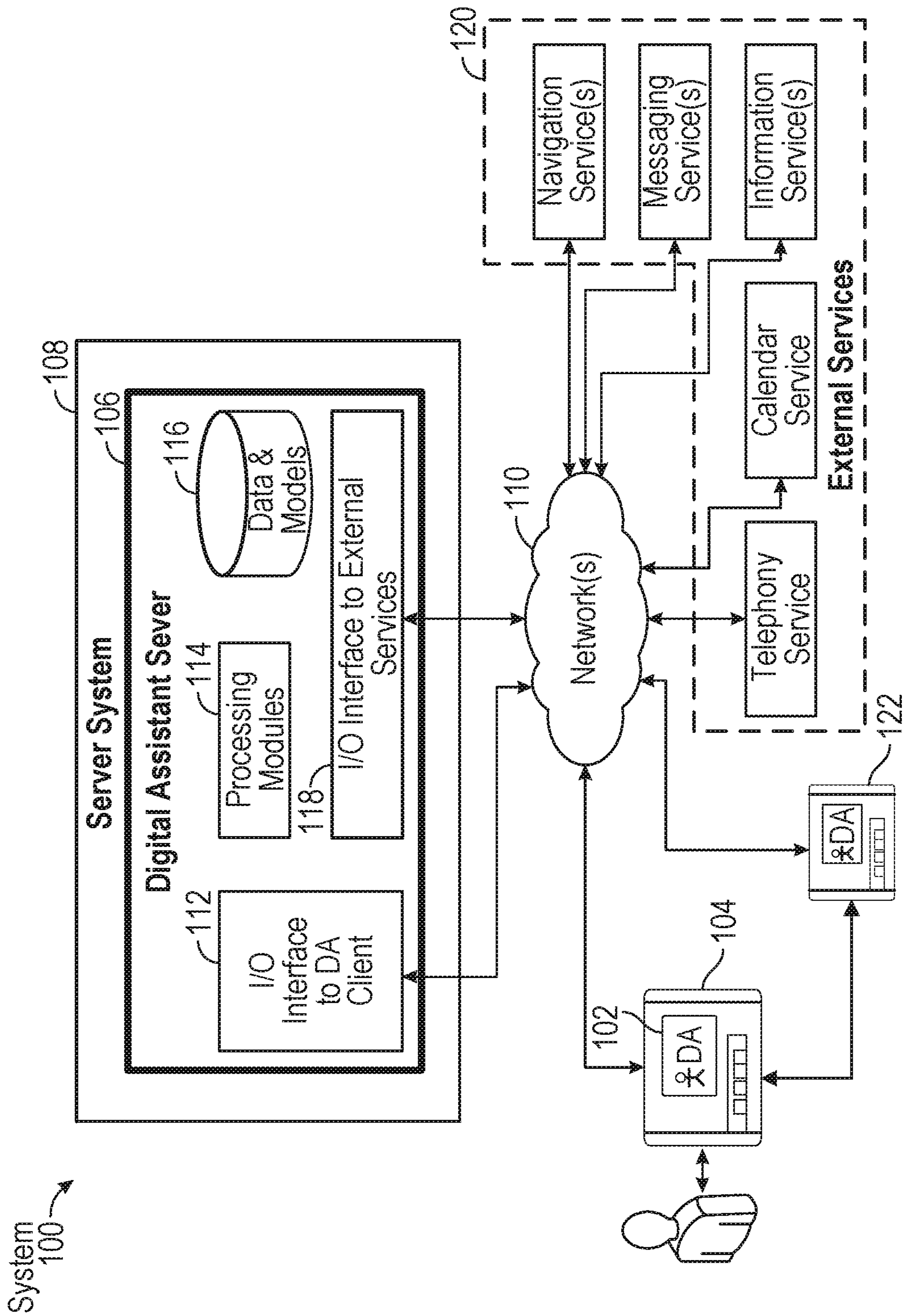
FIG. 1 is a block diagram illustrating a system and environment for implementing a digital assistant according to various examples.

In the following description of the disclosure and embodiments, reference is made to the accompanying drawings, in which it is shown by way of illustration, of specific embodiments that can be practiced. It is to be understood that other embodiments and examples can be practiced and changes can be made without departing from the scope of the disclosure.

Techniques for providing a digital assistant in a multitasking environment are desirable. As described herein, techniques for providing a digital assistant in a multi-tasking environment are desired for various purposes such as reducing the cumbersomeness of searching objects or information, enabling efficient object management, maintaining continuity between tasks performed at the user device and at another electronic device, and reducing the user's manual effort in adjusting system configurations. Such techniques are advantageous by allowing the user to operate a digital assistant to perform various tasks using speech inputs in a multi-tasking environment. Further, such techniques alleviate the cumbersomeness or inconvenience associated with performing various tasks in a multi-tasking environment. Furthermore, by allowing the user to perform tasks using speech, they are able to keep both hands on the keyboard or mouse while performing tasking that would require a context switch—effectively, allowing the digital assistant to perform tasks as if a "third-hand" of the user. As will be appreciated, by allowing the user to perform tasks using speech it allows the user to more efficiently complete tasks that may require multiple interactions with multiple applications. For example, searching for images and sending them to an individual in an email may require opening a search interface, entering search terms, selecting one or more results, opening am email for composition, copying or moving the resulting files to the open email, addressing the email and sending it. Such a task can be completed more efficiently by voice with a command such as "find pictures from X date and send them to my wife". Similar requests for moving files, searching for information on the internet, composing messages can all be made more efficient using voice, while simultaneously allowing the user to perform other tasks using their hands.

Although the following description uses terms "first," "second," etc. to describe various elements, these elements should not be limited by the terms. These terms are only used to distinguish one element from another. For example, a first storage could be termed a second storage, and, similarly, a second storage could be termed a first storage, without departing from the scope of the various described examples. The first storage and the second storage can both be storages and, in some cases, can be separate and different storages.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to inter user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B). A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can operate in a multi-tasking environment. A multi-tasking environment allows a user to operate device 104 to perform multiple tasks in parallel. For example, a multi-tasking environment may be a desktop or laptop environment, in which device 104 may perform one task in response to the user input received from a physical user-interface device and, in parallel, perform another task in response to the user's voice input. In some examples, user device 104 cart include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BILE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to IDA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
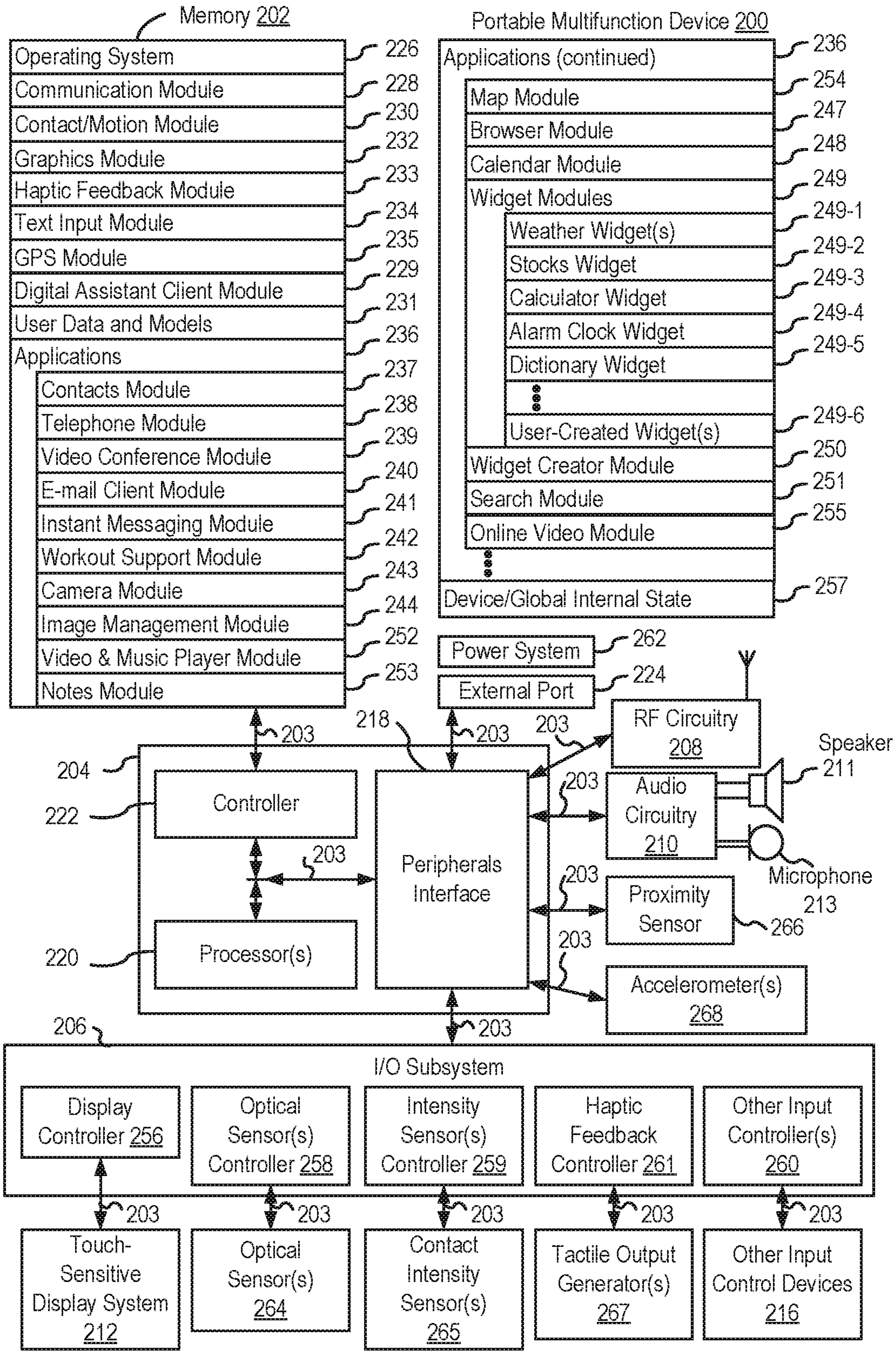
FIG. 2A is a block diagram illustrating a portable multifunction device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system," Device 200 includes memory 202. (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of process 1200, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of process 1200, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user interface objects.

Touch screen 212 has a touch-sensitive surface, sensor, or set of sensors that accept input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light-emitting polymer display) technology, or LED (light-emitting diode) technology, although other display technologies may be used in other embodiments. Touch screen 212 and display controller 256 may detect contact and any movement or breaking thereof using any of a plurality of touch-sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313; "Multipoint Touch Surface Controller," filed. May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources battery or alternating current (AC)), a recharging system, a power failure detection circuit, a power converter or inverter, a power status indicator (e.g., a light-emitting diode) and any other components associated with the generation, management, and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device, so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
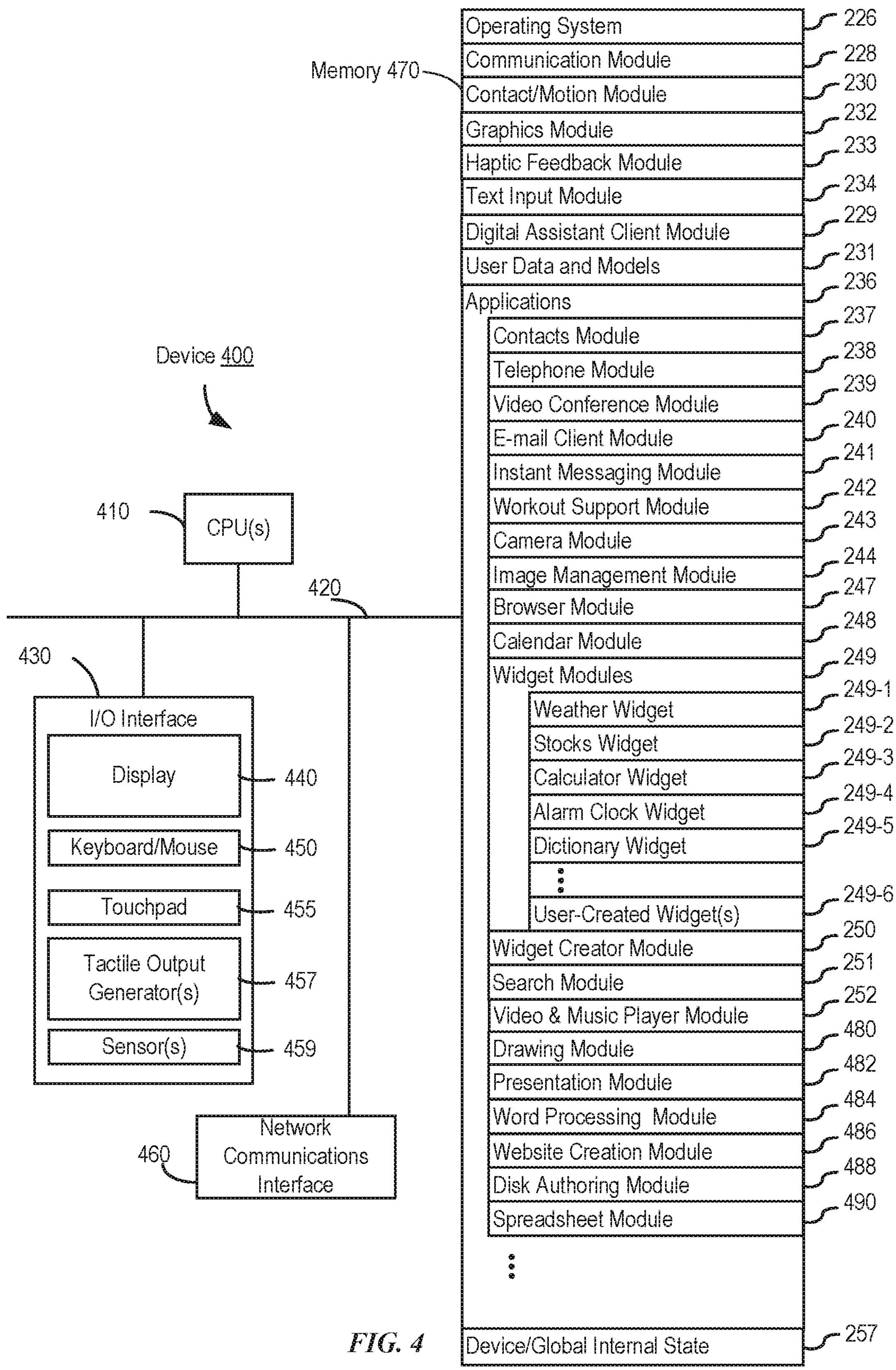
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views, or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:

- Contacts module 237 (sometimes called an address book or contact list);
- Telephone module 238;
- Video conference module 239;
- Email client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), email address(es), physical addresses) or other information with a name; associating an image with a name; categorizing and sorting names; providing telephone numbers or email addresses to initiate and/or facilitate communications by telephone 238, video conference module 239, email 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, email client module 240 includes executable instructions to create, send, receive, and manage email in response to user instructions. In conjunction with image management module 244, email client module 240 makes it very easy to create and send emails with still or video images taken with camera module 243.

In conjunction with RF circuitry 208, touch screen 212, display controller 256, contact/motion module 230, graphics module 232, and text input module 234, instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, email client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, email client module 240, and browser module 247, online video module 255 includes instructions that allow the user to access, browse, receive (e.g., by streaming and/or download), play back (e.g., on the touch screen or on an external, connected display via external port 224), send an email with a link to a particular online video, and otherwise manage online videos in one or more file formats, such as H.264. In some embodiments, instant messaging module 241, rather than email client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad, By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
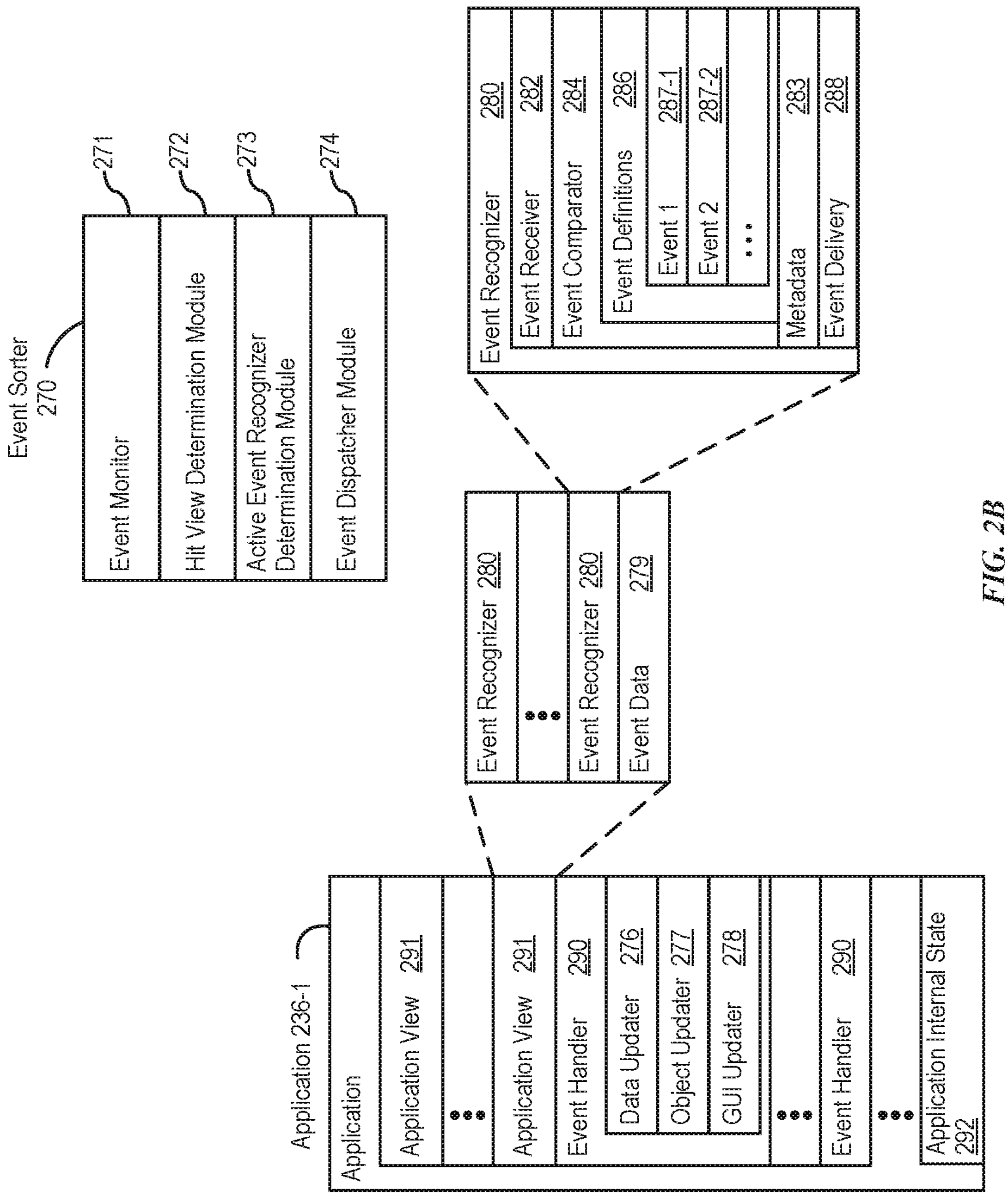
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283 and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
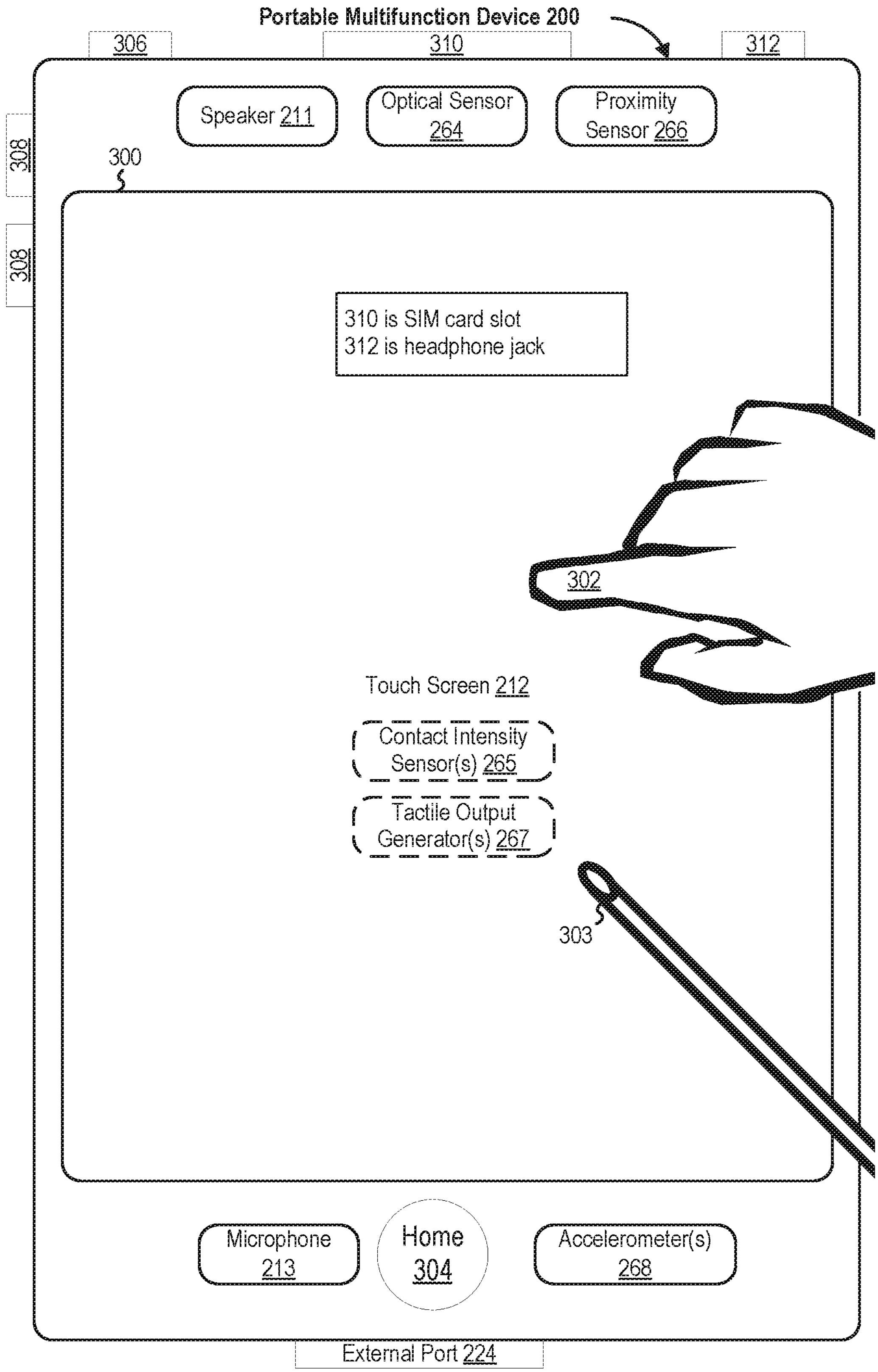
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward, and/or downward), and/or a rolling of a finger (from right to left, left to right, upward, and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
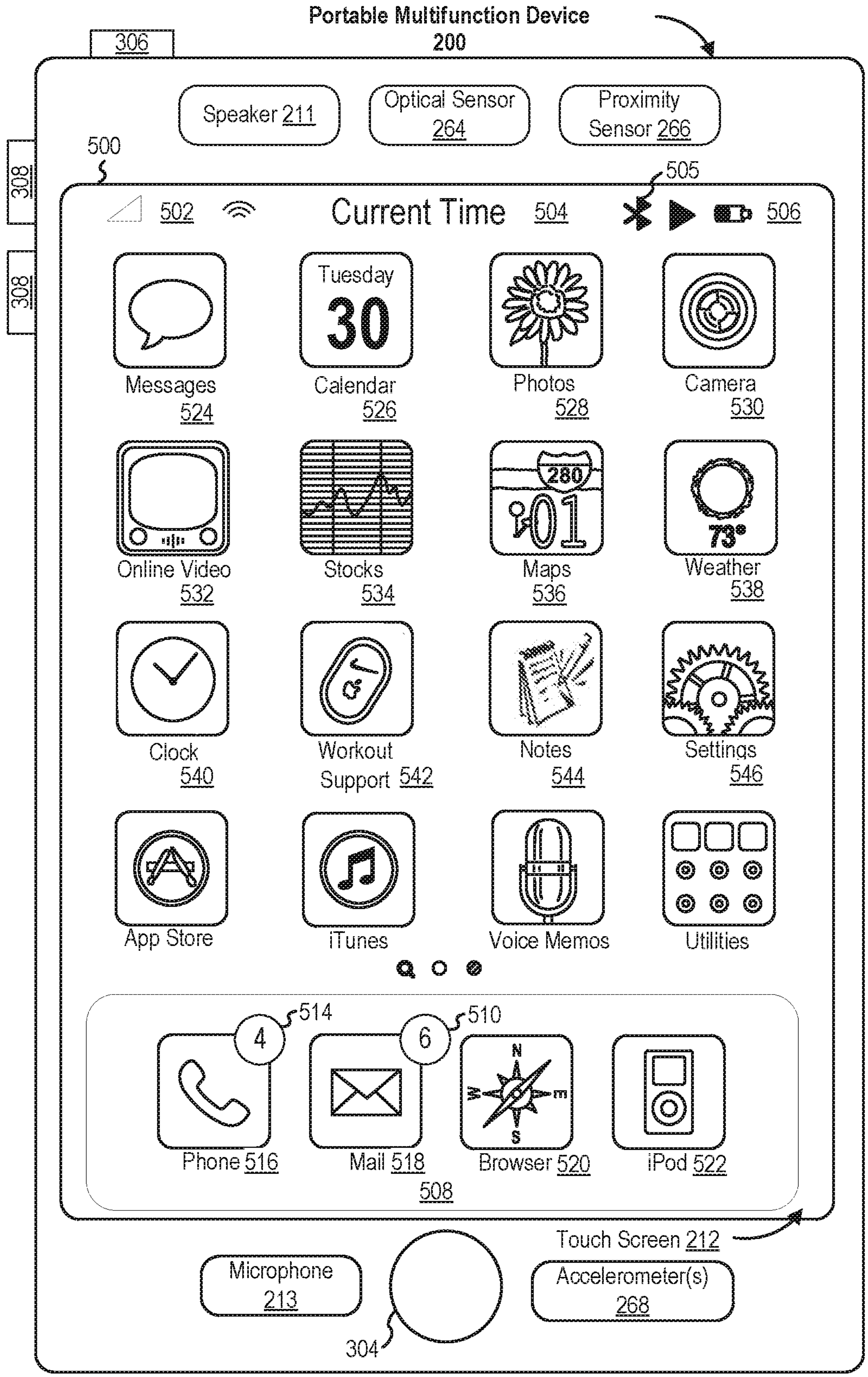
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

- Icon 516 for telephone module 238, labeled "Phone," which optionally includes an indicator 514 of the number of missed calls or voicemail messages;
- a Icon 518 for email client module 240, labeled "Mail," which optionally includes an indicator 510 of the number of unread emails;
- Icon 520 for browser module 247, labeled "Browser," and
- Icon 522 for video and music player module 252, also referred to as iPod (trademark of Apple Inc.) module 252, labeled "iPod;" and Icons for other applications, such as:

- Icon 524 for IM module 241, labeled "Messages;"
- Icon 526 for calendar module 248, labeled "Calendar;"
- Icon 528 for image management module 244, labeled "Photos,"
- Icon 530 for camera module 243, labeled "Camera;"
- Icon 532 for online video module 255, labeled "Online Video,"
- Icon 534 for stocks widget 249-2, labeled "Stocks,"
- Icon 536 for map module 254, labeled "Maps;"
- Icon 538 for weather widget 249-1, labeled "Weather;"
- Icon 540 for alarm clock widget 249-4, labeled "Clock;"
- Icon 542 for workout support module 242, labeled "Workout Support,"
- Icon 544 for notes module 253, labeled "Notes," and
- Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
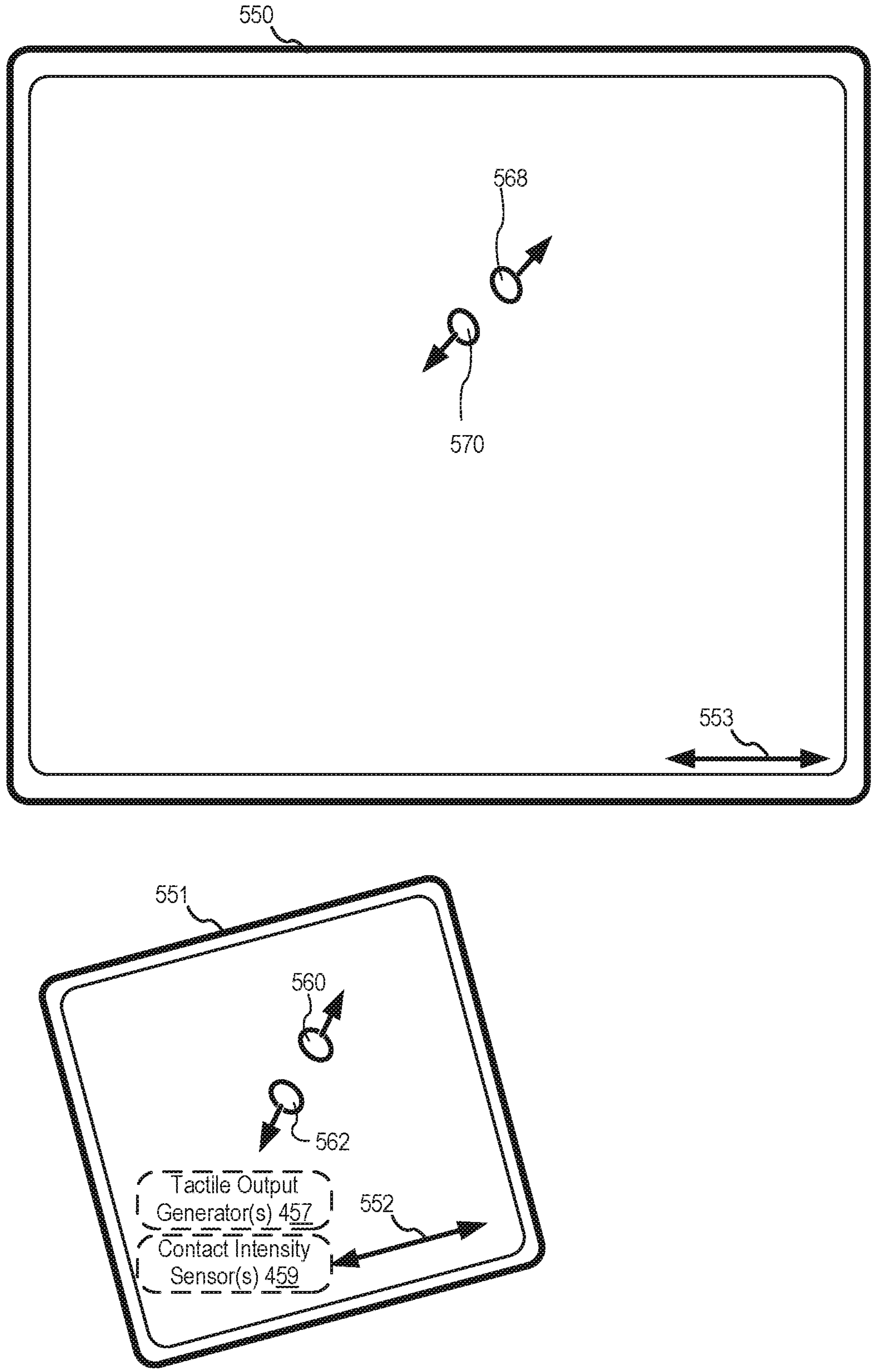
FIG. 5B illustrates an exemplary user interface for a multifunction device with a touch-sensitive surface that is separate from the display according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, and/or finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
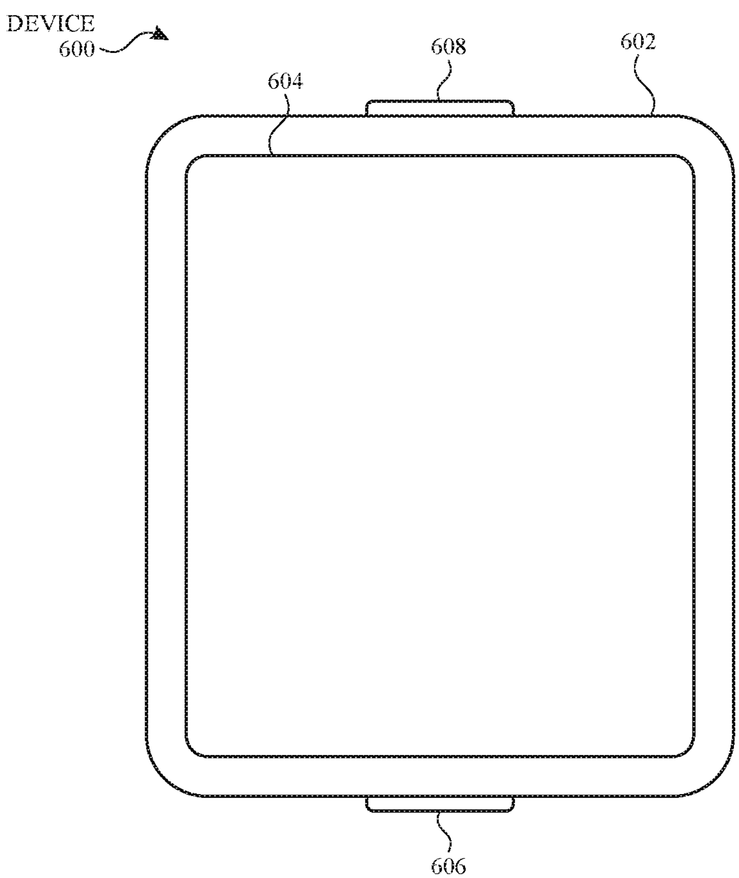
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
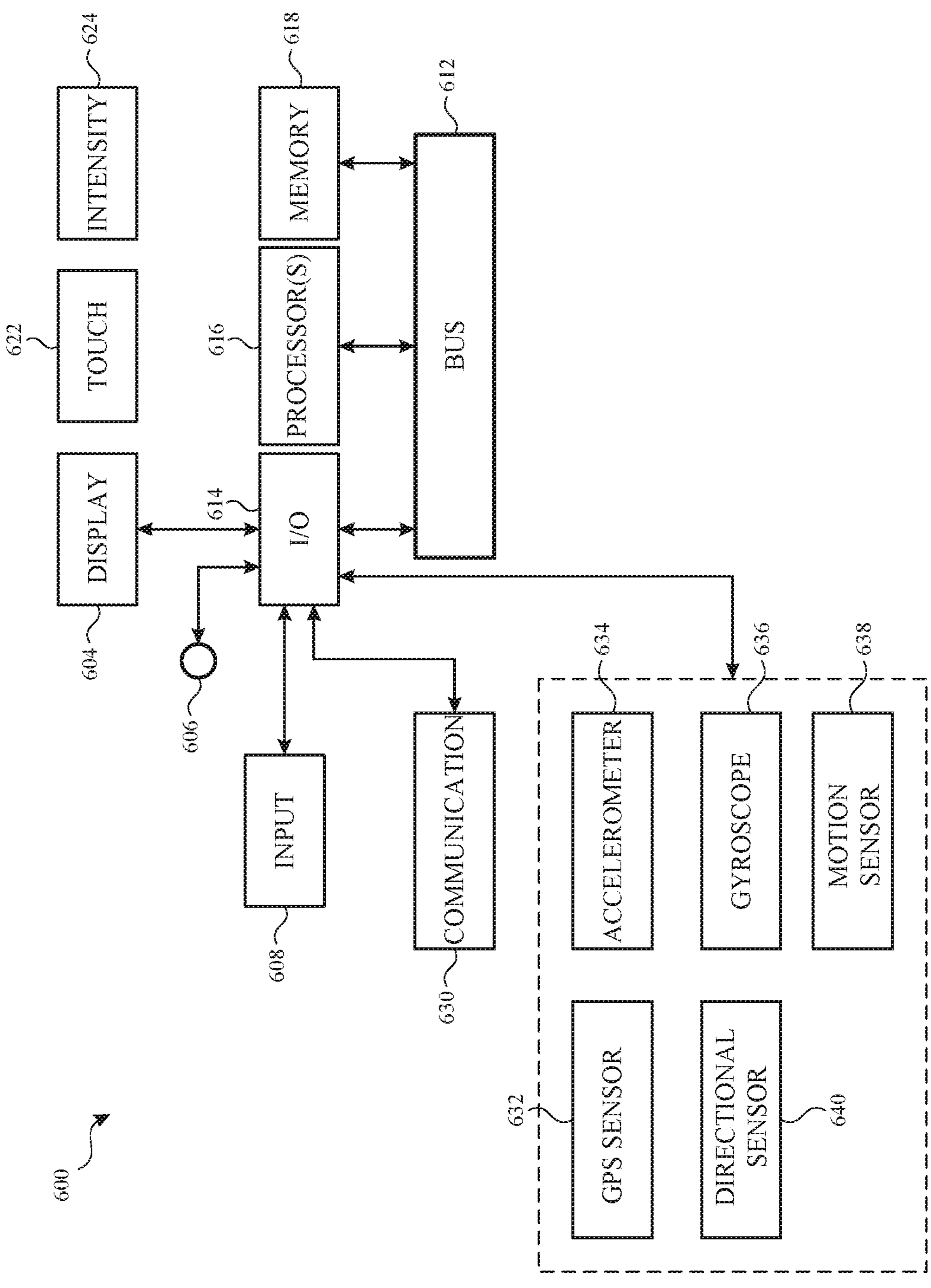
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can be a non-transitory computer-readable storage medium, for storing computer-executable instructions, which, when executed by one or more computer processors 616, for example, can cause the computer processors to perform the techniques described below, including process 1200 (FIG. 12A-D). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., link) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs, sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
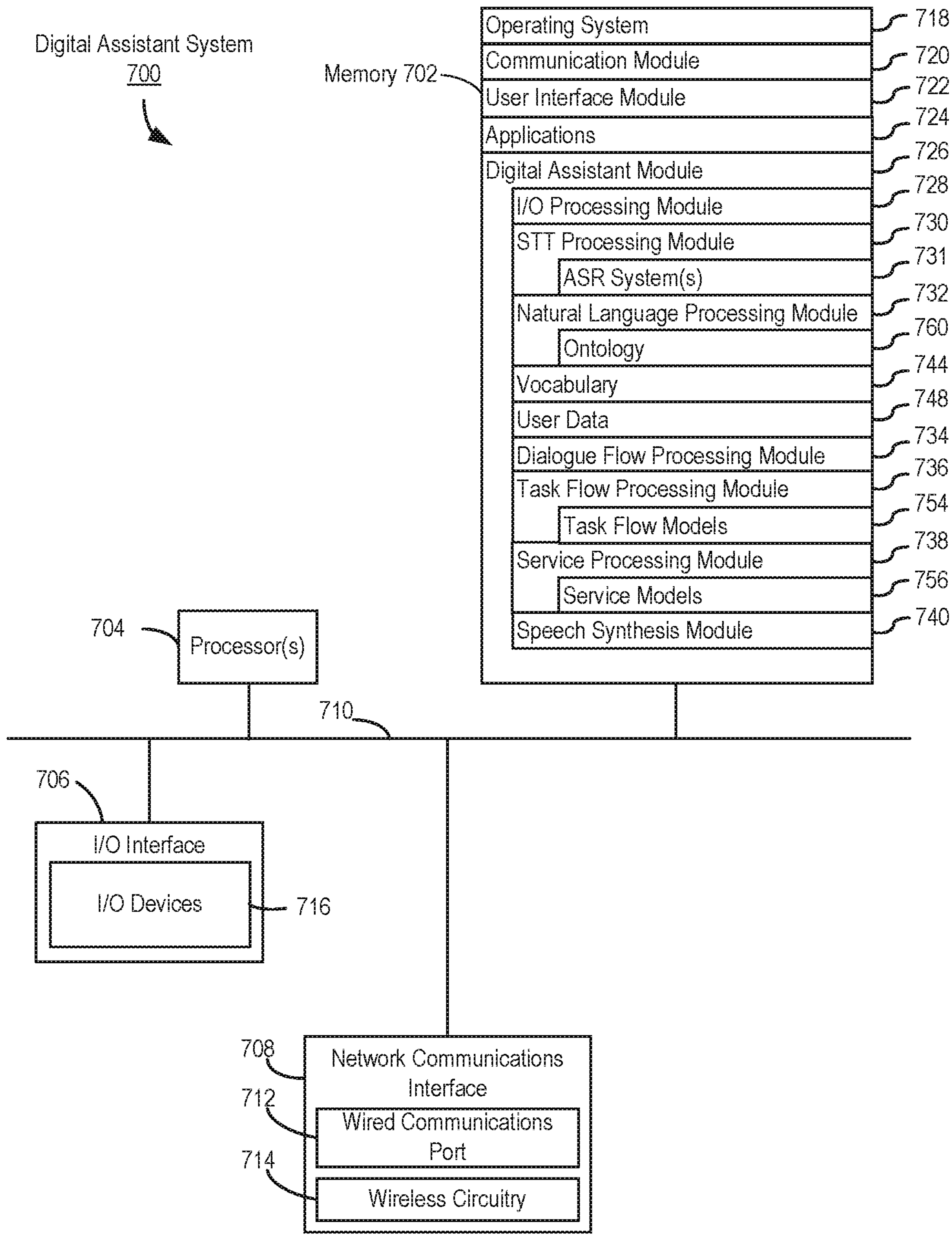
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and process them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) 712 can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing process 1200, described below. One or more processors 704 can execute these programs, modules, and instructions, and read/write from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIGS. 2A, 4, 6A-B, respectively. Communications module 720 can also include various components for handling data received by wireless circuitry 714 and/or wired communications port 712.

User interface module 722 can receive commands and/or inputs from a user via. I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems 731.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
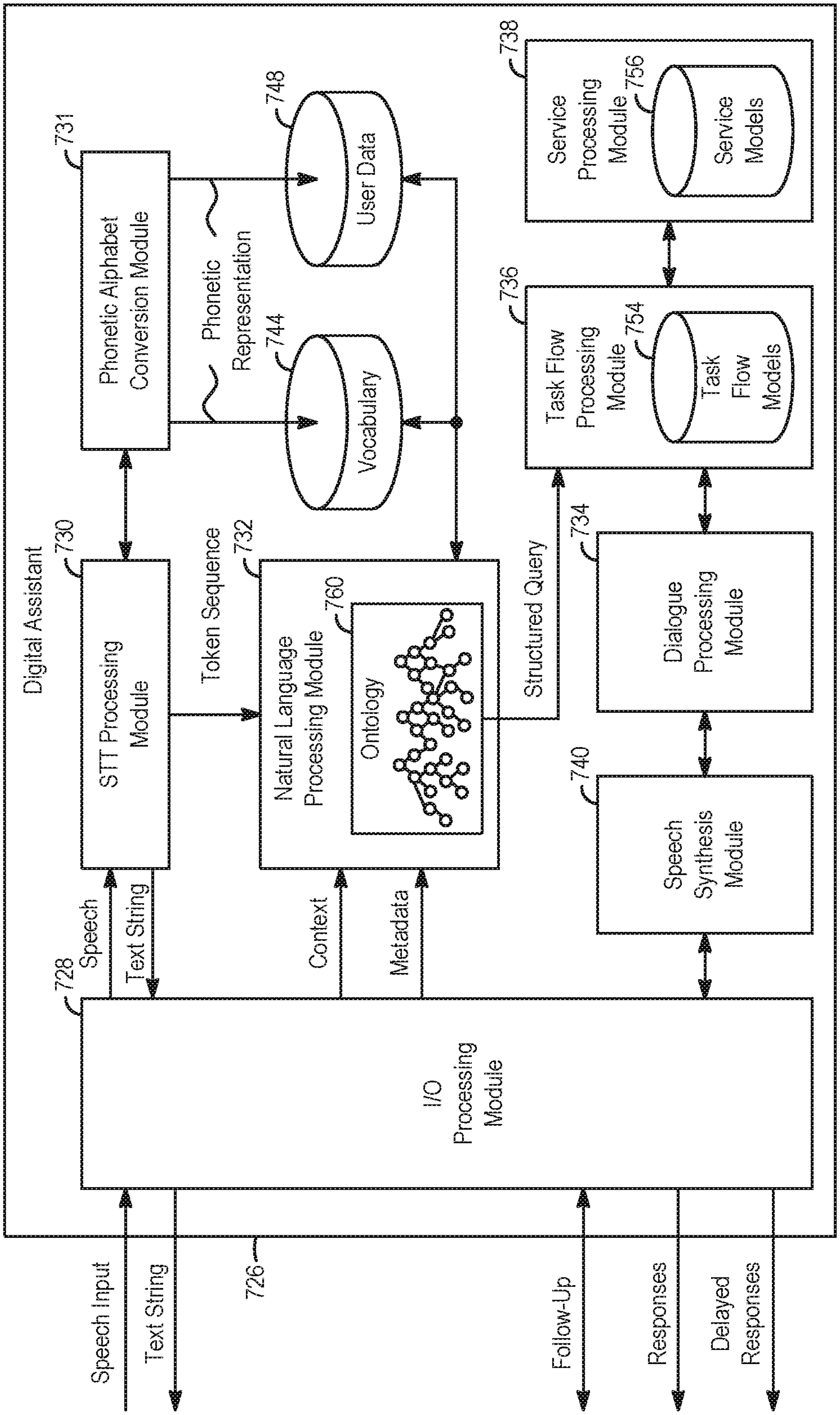
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or a speech recognizer) for speech-to-text conversions.

SIT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meɪroʊ/ and /tə'mɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪroʊ/ can be ranked higher than /tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪroʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /tə'meɪroʊ/ corresponding to a portion of the speech input, it can then determine, based on vocabulary index 744, that this sequence corresponds to the word "tomato."

In some examples, SIT processing module 730 can use approximate matching techniques to determine words in a voice input. Thus, for example, the SIT processing module 730 can determine that the sequence of phonemes /tə'mɑtoʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by SIT processing module 730 and attempt to associate the token sequence with one or more "actionable intents" recognized by the digital assistant. An "actionable intent" can represent a task that can be performed by the digital assistant and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754 or, in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STF processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
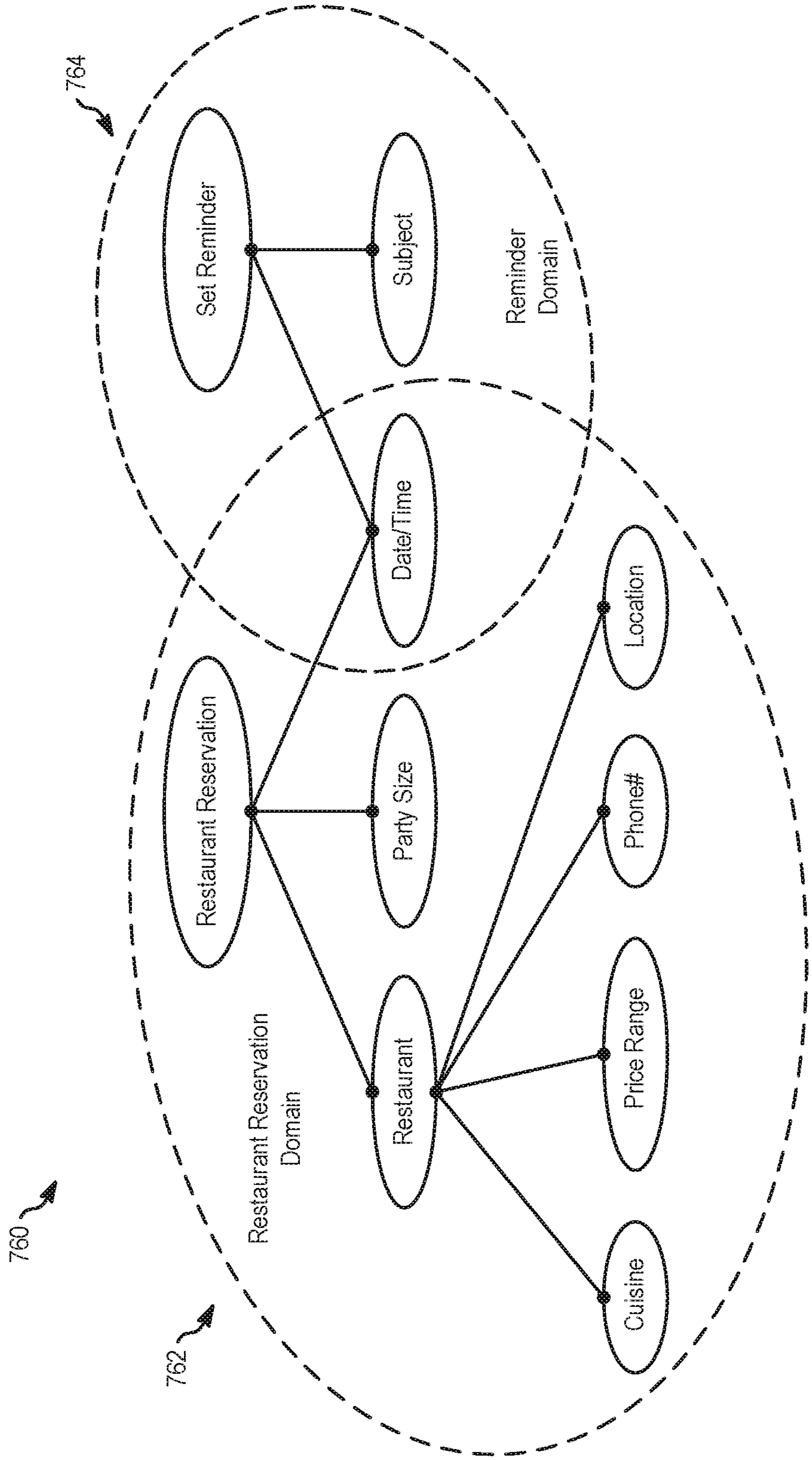
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e. another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location," Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task," and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7," In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time "7 pm"}. However, in this example, the user's speech input contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous speech inputs. When such interactions are necessary, task flow processing module 736 can invoke dialogue flow processing module 734 to engage in a dialogue with the user. In some examples, dialogue flow processing module 734 can determine how (and/or when) to ask the user for the additional information and receive and processes the user responses. The questions can be provided to and answers can be received from the users through I/O processing module 728. In some examples, dialogue flow processing module 734 can present dialogue output to the user via audio and/or visual output, and receive input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®; (2) entering the date, time, and party size information in a form on the website; (3) submitting the form; and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Functions of a Digital Assistant—Intelligent Search and Object Management FIGS. 8A-8F, 9A-9H, 10A-10B, 11A-11D, 12A-12D, and 13A-13C illustrate functionalities of performing a task using a search process or an object managing process by a digital assistant. In some examples, the digital assistant system (e.g., digital assistant system 700) is implemented by a user device according to various examples. In some examples, the user device, a server (e.g., server 108), or a combination thereof, may implement a digital assistant system (e.g., digital assistant system 700). The user device can be implemented using, for example, device 104, 200, or 400. In some examples, the user device is a laptop computer, a desktop computer, or a tablet computer. The user device can operate in a multi-tasking environment, such as a desktop environment.

With references to FIGS. 8A-8F, 9A-9H, 10A-10B, 11A-11D, 12A-12D, and 13A-13C, in some examples, a user device provides various user interfaces (e.g., user interfaces 810, 910, 1010, 1110, 1210, and 1310). The user device displays the various user interfaces on a display (e.g., touch-sensitive display system 212, display 440) associated with the user device. The various user interfaces provide one or more affordances representing different processes (e.g., affordances 820, 920, 1020, 1120, 1220, and 1320 representing searching processes; and affordances 830, 930, 1030, 1130, 1230, and 1330 representing object managing processes). The one or more processes can be instantiated directly or indirectly by the user. For example, a user instantiates the one or more processes by selecting the affordances using an input device such as a keyboard, a mouse, a joystick, a finger, or the like. A user can also instantiate the one or more processes using a speech input, as described in more detail below. Instantiating a process includes invoking the process if the process is not already executing. If at least one instance of the process is executing, instantiating a process includes executing an existing instance of the process or generating a new instance of the process. For example, instantiating an object managing process includes invoking the object managing process, using an existing object managing process, or generate a new instance of the object managing process.

As shown in FIGS. 8A-8F, 9A-9H, 10A-10B, 11A-11D, 12A-12D, and 13A-13C, the user device displays, on a user interface (e.g., user interface 810, 910, 1010, 1110, 1210, and 1310) an affordance (e.g., affordance 840; 940, 1040, 1140, 1240, and 1340) to instantiate a digital assistant service. The affordance can be, for example, a microphone icon representing the digital assistant. The affordance can be displayed at any location on the user interfaces. For example, the affordance can be displayed on the dock (e.g., dock 808, 908, 1008, 1108, 1208, and 1308) at the bottom of the user interfaces, on the menu bar (e.g. menu bar 806, 906, 1006, 1106, 1206, and 1306) at the top of the user interfaces, in a notification center at the right side of the user interfaces, or the like. The affordance can also be displayed dynamically on the user interface. For example, the user device displays the affordance near an application user interface (e.g., an application window) such that the digital assistant service can be conveniently instantiated.

In some examples, the digital assistant is instantiated in response to receiving a pre-determined phrase. For example, the digital assistant is invoked in response to receiving a phrase such as "Hey, Assistant," "Wake up, Assistant," "Listen up, Assistant," "OK, Assistant," or the like. In some examples, the digital assistant is instantiated in response to receiving a selection of the affordance. For example, a user selects affordance 840, 940, 1040, 1140, 1240, and/or 1340 using an input device such as a mouse, a stylus, a finger, or the like. Providing a digital assistant on a user device consumes computing resources (e.g., power, network bandwidth, memory, and processor cycles). In some examples, the digital assistant is suspended or shut down until a user invokes it. In some examples, the digital assistant is active for various periods of time. For example, the digital assistant can be active and monitoring the user's speech input during the time that various user interfaces are displayed, that the user device is turned on, that the user device is hibernating or sleeping, that the user is logged off, or a combination thereof.

With reference to FIGS. 8A-8F, 9A-9H, 10A-10B, 11A-11D, 12A-12D, and 13A-13C, a digital assistant receives one or more speech inputs, such as speech inputs 852, 854, 855, 856, 952, 954, 1052, 1054, 1152, 1252, or 1352, from a user. The user provides various speech inputs for the purpose of, for example, performing a task using a searching process or an object managing process. In some examples, the digital assistant receives speech inputs directly from the user at the user device or indirectly through another electronic device that is communicatively connected to the user device. The digital assistant receives speech inputs directly from the user via, for example, a microphone (e.g., microphone 213) of the user device. The user device includes a device that is configured to operate in a multi-tasking environment, such as a laptop computer, a desktop computer, a tablet, a server, or the like. The digital assistant can also receive speech inputs indirectly through one or more electronic devices such as a headset, a smartphone, a tablet, or the like. For instance, the user may speak to a headset (not shown). The headset receives the speech input from the user and transmits the speech input or a representation of it to the digital assistant of the user device via, for example, a Bluetooth connection between the headset and the user device.

With reference to FIGS. 8A-8F, 9A-9H, 10A-10B, 11A-11D, 12A-12D, and 13A-13C, in some embodiments, the digital assistant (e.g., represented by affordance 840, 940, 1040, 1140, 1240, and 1340) identifies context information associated with the user device. The context information includes, for example, user-specific data, metadata associated with one or more objects, sensor data, and user device configuration data. An object can be a target or a component of a process (e.g., an object managing process) associated with performing a task or a graphical element currently displayed on screen, and the object or graphical element may have or may not currently have focus (e.g., be currently selected). For example, an object can include a file (e.g., a photo, a document), a folder, a communication (e.g., an email, a message, a notification, or a voicemail), a contact, a calendar, an application, an online resource, or the like. In some examples, the user-specific data includes log information, user preferences, the history of user's interaction with the user device, or the like. Log information indicates recent objects (e.g., a presentation file) used in a process. In some examples, metadata associated with one or more objects includes the title of the object, the time information of the object, the author of the object, the summary of the object, or the like. In some examples, the sensor data includes various data collected by a sensor associated with the user device. For example, the sensor data includes location data indicating the physical location of the user device. In some examples, the user device configuration data includes the current device configurations. For example, the device configurations indicate that the user device is communicatively connected to one or more electronic devices such as a smartphone, a tablet, or the like. As described in more detail below, the user device can perform one or more processes using the context information.

With reference to FIGS. 8A-8F, 9A-9H, 10A-10B, 11A-11D, 12A-12D, and 13A-13C, in response to receiving a speech input, the digital assistant determines a user intent based on the speech input. As described above, in some examples, the digital assistant processes a speech input via an I/O processing module (e.g., I/O processing module 728 as shown in FIG. 7B), an SIT processing module (e.g., SIT processing module 730 as shown in FIG. 7B), and a natural language processing module (e.g., natural language processing module 732 as shown in FIG. 7B). The I/O processing module forwards the speech input to an SIT processing module (or a speech recognizer) for speech-to-text conversions. The speech-to-text conversion generates text based on the speech input. As described above, the STT processing module generates a sequence of words or tokens ("token sequence") and provides the token sequence to the natural language processing module. The natural language processing module performs natural language processing of the text and determines the user intent based on a result of the natural language processing. For example, the natural language processing module may attempt to associate the token sequence with one or more actionable intents recognized by the digital assistant. As described, once the natural language processing module identifies an actionable intent based on the user input, it generates a structured query to represent the identified actionable intent. The structured query includes one or more parameters associated with the actionable intent. The one or more parameters are used to facilitate the performance of a task based on the actionable intent.

In some embodiments, the digital assistant further determines whether the user intent is to perform a task using a searching process or an object managing process. The searching process is configured to search data stored internally or externally to the user device. The object managing process is configured to manage objects associated with the user device. Various examples of determination of the user intent are provided below in more detail with respect to FIGS. 8A-8F, 9A-9H, 10A-10B, 11A-11D, 12A-12D, and 13A-13C.

Figure 8A:
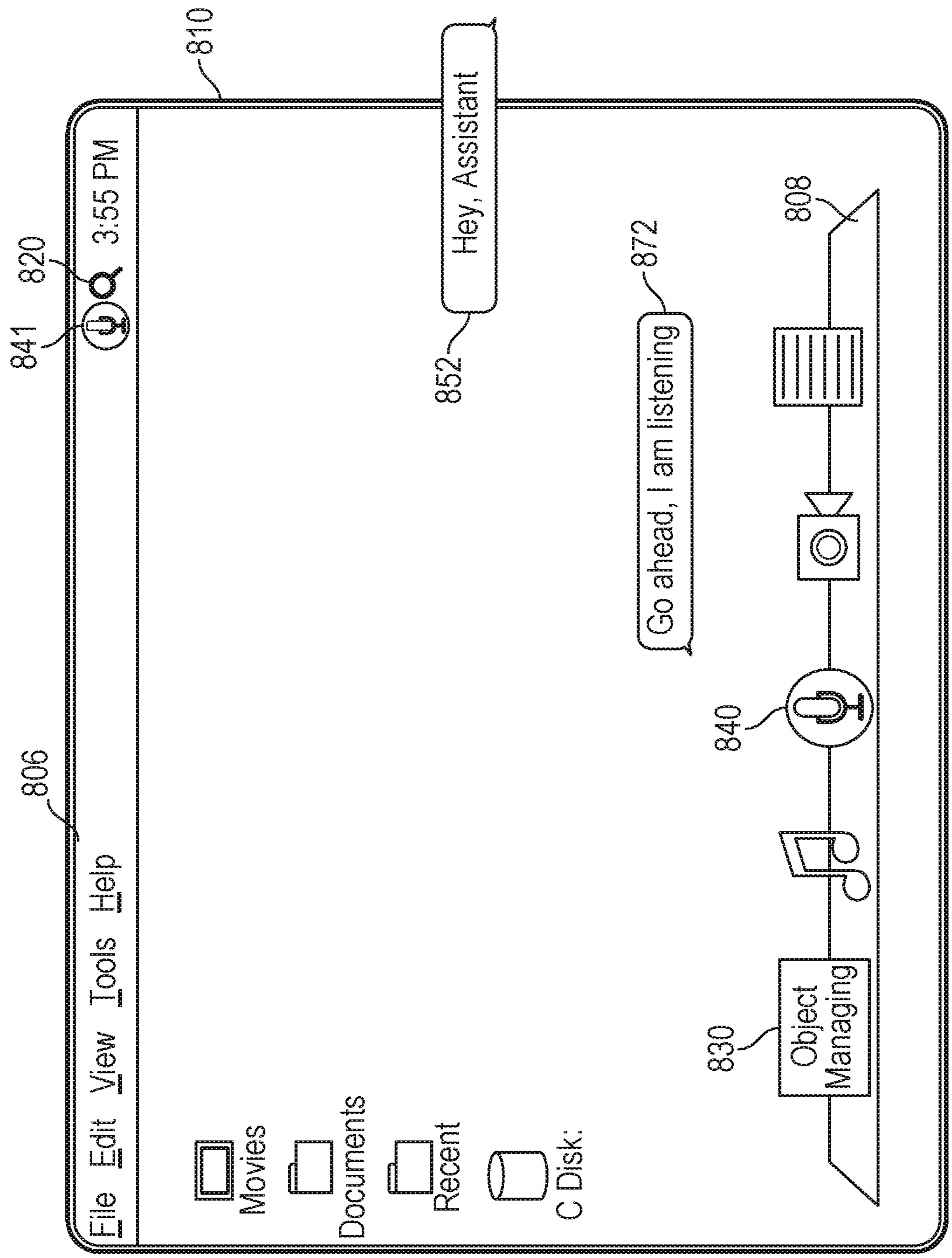
FIGS. 8A-8F illustrate functionalities of performing a task using a search process or an object managing process by a digital assistant according to various examples.

With reference to FIG. 8A, in some examples, a user device receives a speech input 852 from a user to instantiate the digital assistant. Speech input 852 includes, for example, "Hey, Assistant." in response to the speech input, the user device instantiates the digital assistant represented by affordance 840 or 841 such that the digital assistant is actively monitoring subsequent speech inputs. In some examples, the digital assistant provides a spoken output 872 indicating that it is instantiated. For example, spoken output 872 includes "Go ahead, I am listening." In some examples, the user device receives a selection of affordance 840 or affordance 841 from the user to instantiate the digital assistant. The selection of affordance is performed by using an input device such as a mouse, a stylus, a finger, or the like.

Figure 8B:
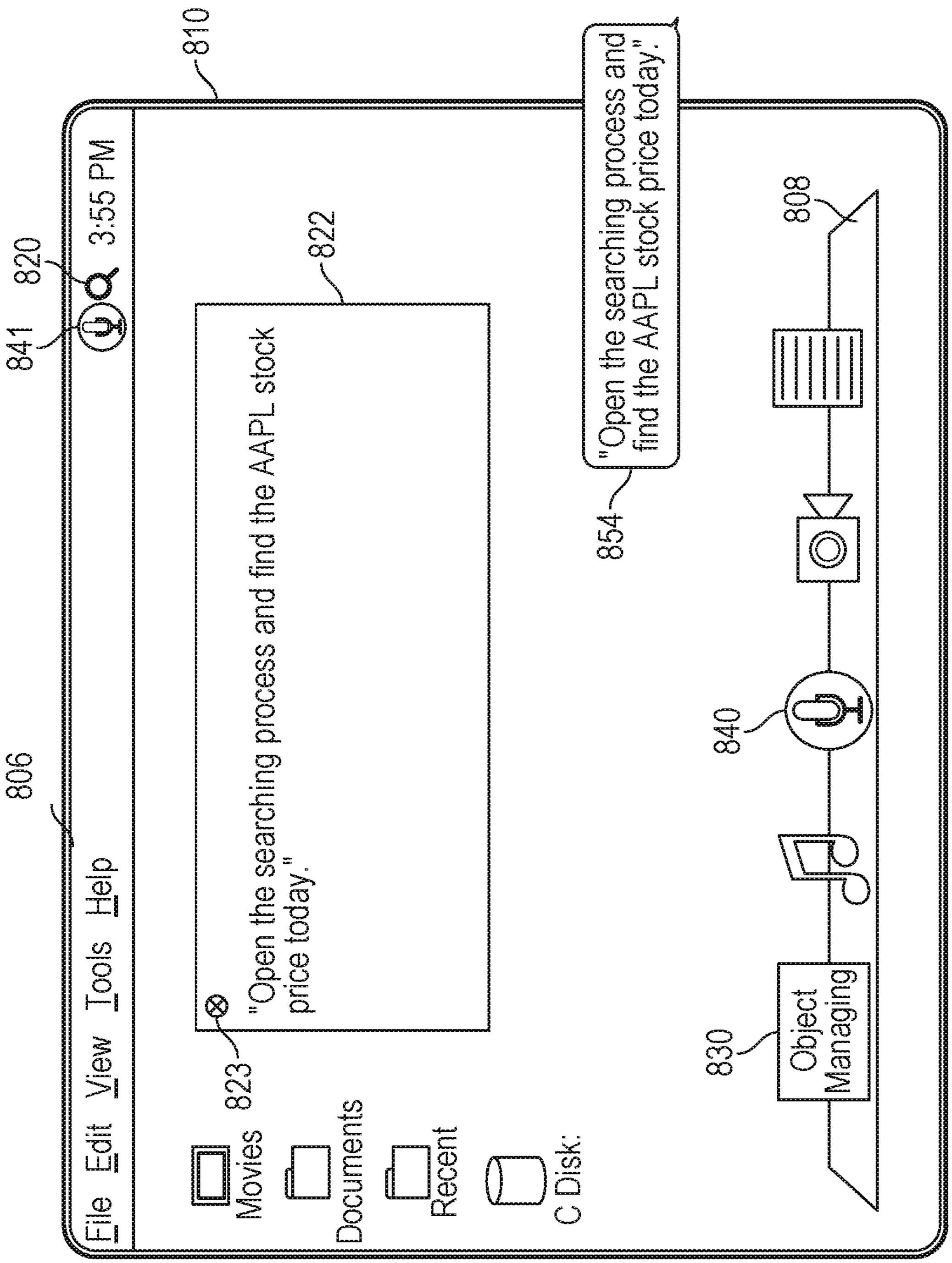

With reference to FIG. 8B, in some examples, the digital assistant receives a speech input 854. Speech input 854 includes, for example, "Open the searching process and find the AAPL stock price today," or simply "show me the AAPL stock price today." Based on speech input 854, the digital assistant determines the user intent. For example, to determine the user intent, the digital assistant determines that the actionable intent is obtaining online information and that one or more parameters associated with this actionable intent include "AAPL stock price," and "today."

As described, in some examples, the digital assistant further determines whether the user intent is to perform a task using a searching process or an object managing process. In some embodiments, to make the determination, the digital assistant determines whether the speech input includes one or more keywords representing the searching process or the object managing process. For example, the digital assistant determines that speech input 854 includes keywords or a phrase such as "open the searching process," indicating the user intent is to use the searching process to perform the task. As a result, the digital assistant determines that the user intent is to perform a task using the searching process.

As shown in FIG. 8B, in accordance with a determination the user intent is to perform the task using the searching process, the digital assistant performs the task using the searching process. As described, the natural language processing module of the digital assistant generates a structured query based on the user intent and passes the generated structured query to a task flow processing module (e.g., task flow processing module 736). The task flow processing module receives the structured query from the natural language processing module, completes the structured query, if necessary, and performs the actions required to "complete" the user's ultimate request. Performing the task using the searching process includes, for example, searching at least one object. In some embodiments, at least one object includes a folder, a file (e.g., a photo, an audio, a video), a communication (e.g., an email, a message, a notification, a voicemail), a contact, a calendar, an application (e.g., Keynote, Number, iTunes, Safari), an online informational source (e.g., Google, Yahoo, Bloomberg), or a combination thereof. In some examples, searching an object is based on metadata associated with the object. For example, the searching of a file or folder can use metadata such as a tag, a date, a time, an author, a title, a type of the file, a size, a page count, and/or a file location associated with the folder or file. In some examples, the file or folder is stored internally or externally to the user device. For example, the file or folder can be stored on the hard disk of the user device or stored on a cloud server. In some examples, searching a communication is based on metadata associated with the communication. For example, the searching of an email uses metadata such as the sender of the email, the receiver of the email, the sent/receive dates of the email, or the like.

As illustrated in FIG. 8B, in accordance with the determination that the user intent is to obtain the AAPL stock price using the searching process, the digital assistant performs the searching. For example, the digital assistant instantiates a searching process, represented by affordance 820, and causes the searching process to search today's AAPL stock price. In some examples, the digital assistant further causes the searching process to display a user interface 822 (e.g., a snippet or a window) providing text corresponding to speech input 854 (e.g., "Open the searching process and find the AAPL stock price today").

Figure 8C:
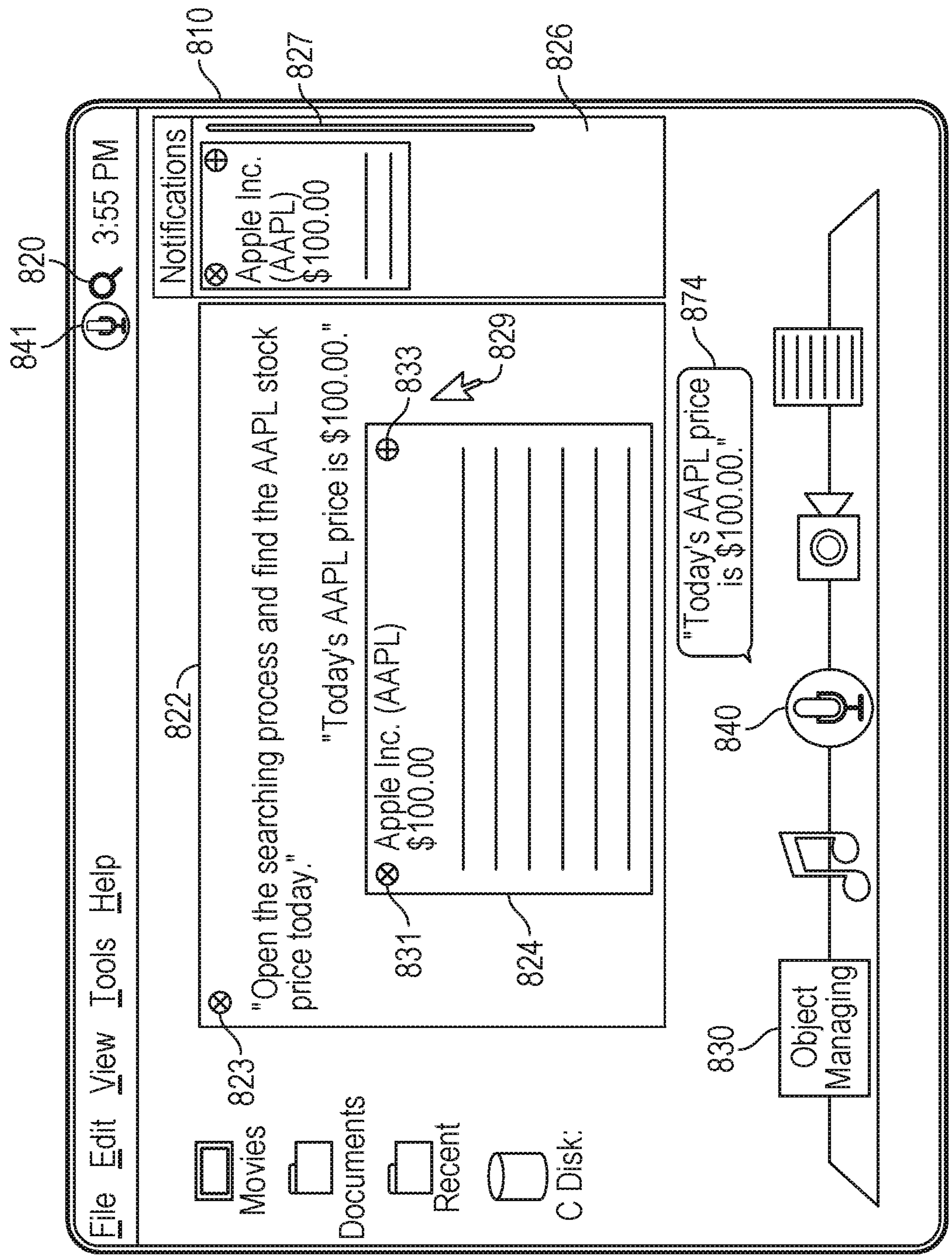

With reference to FIG. 8C, in some embodiments, the digital assistant provides a response based on a result of performing the task using the searching process. As illustrated in FIG. 8C, as a result of searching the AAPL stock price, the digital assistant displays a user interface 824 (e.g., a snippet or a window) providing the result of performing the task using the searching process. In some embodiments, user interface 824 is located within user interface 822 as a separate user interface. In some embodiments, user interfaces 824 and 822 are integrated together as a single user interface. On user interface 824, the search result of the stock price of AAPL is displayed. In some embodiments, user interface 824 further provides affordances 831 and 833. Affordance 831 enables closing of user interface 824. For example, if the digital assistant receives a user's selection of affordance 831, user interface 824 disappears or closes from the display of the user device. Affordance 833 enables moving or sharing of the search result displayed on user interface 824. For example, if the digital assistant receives the user's selection of affordance 833, it instantiates a process (e.g., the object managing process) to move or share user interface 824 (or the search result thereof) with a notification application. As shown in FIG. 8C, the digital assistant displays a user interface 826 that is associated with the notification application to provide the search result of AAPL stock price. In some embodiments, user interface 826 displays an affordance 827. Affordance 827 enables scrolling within user interface 826 such that the user can view the entire content (e.g., multiple notifications) within user interface 826 and/or indicates that relative position of the document with respect to its entire length and/or width. In some embodiments, user interface 826 displays results and/or dialog history (e.g., search results obtained from a current and/or past searching process) stored by the digital assistant. Further, in some examples, results of the performance the task are dynamically updated over time. For example, the AAPL stock price can be dynamically updated over time and displayed on user interface 826.

In some embodiments, the digital assistant also provides a spoken output corresponding to the search result. For example, the digital assistant (e.g., represented by affordance 840) provides a spoken output 874 including "Today's AAPL price is $100.00." In some examples, user interface 822 includes text corresponding to spoken output 874.

Figure 8D:
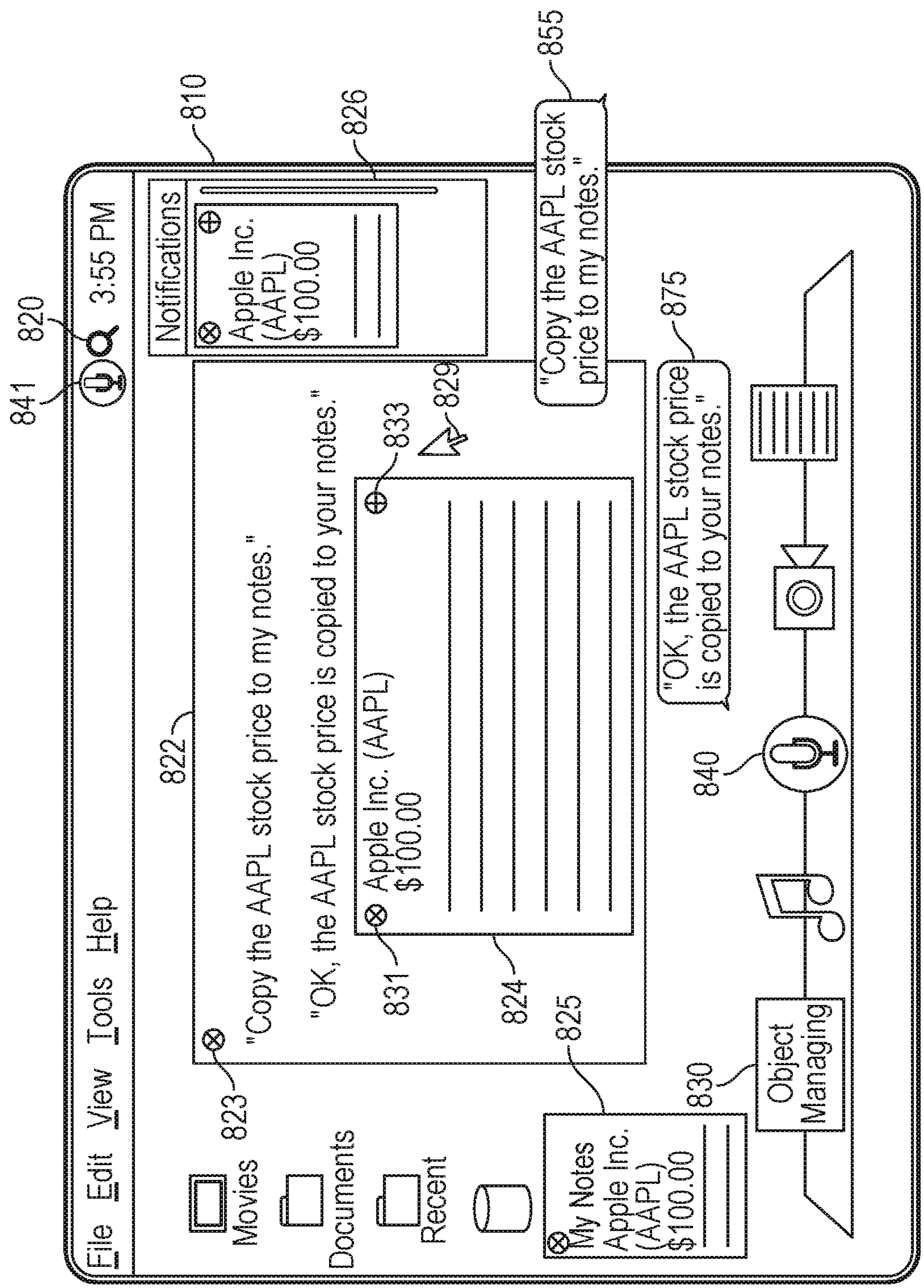

With reference to FIG. 8D, in some examples, the digital assistant instantiates a process (e.g., the object managing process) to move or share the search result displayed on user interface 824 in response to a subsequent speech input. For example, the digital assistant receives a speech input 855 such as "Copy the AAPL stock price to my notes." In response, the digital assistant instantiates a process to move or copy the search result (e.g., the AAPL stock price) to the user's note. As shown in FIG. 8D, in some examples, the digital assistant further displays a user interface 825 providing the copied or moved search result in user's note. In some examples, the digital assistant further provides a spoken output 875 such as "OK, the AAPL stock price is copied to your notes." In some examples, user interface 822 includes text corresponding to spoken output 875.

Figure 8E:
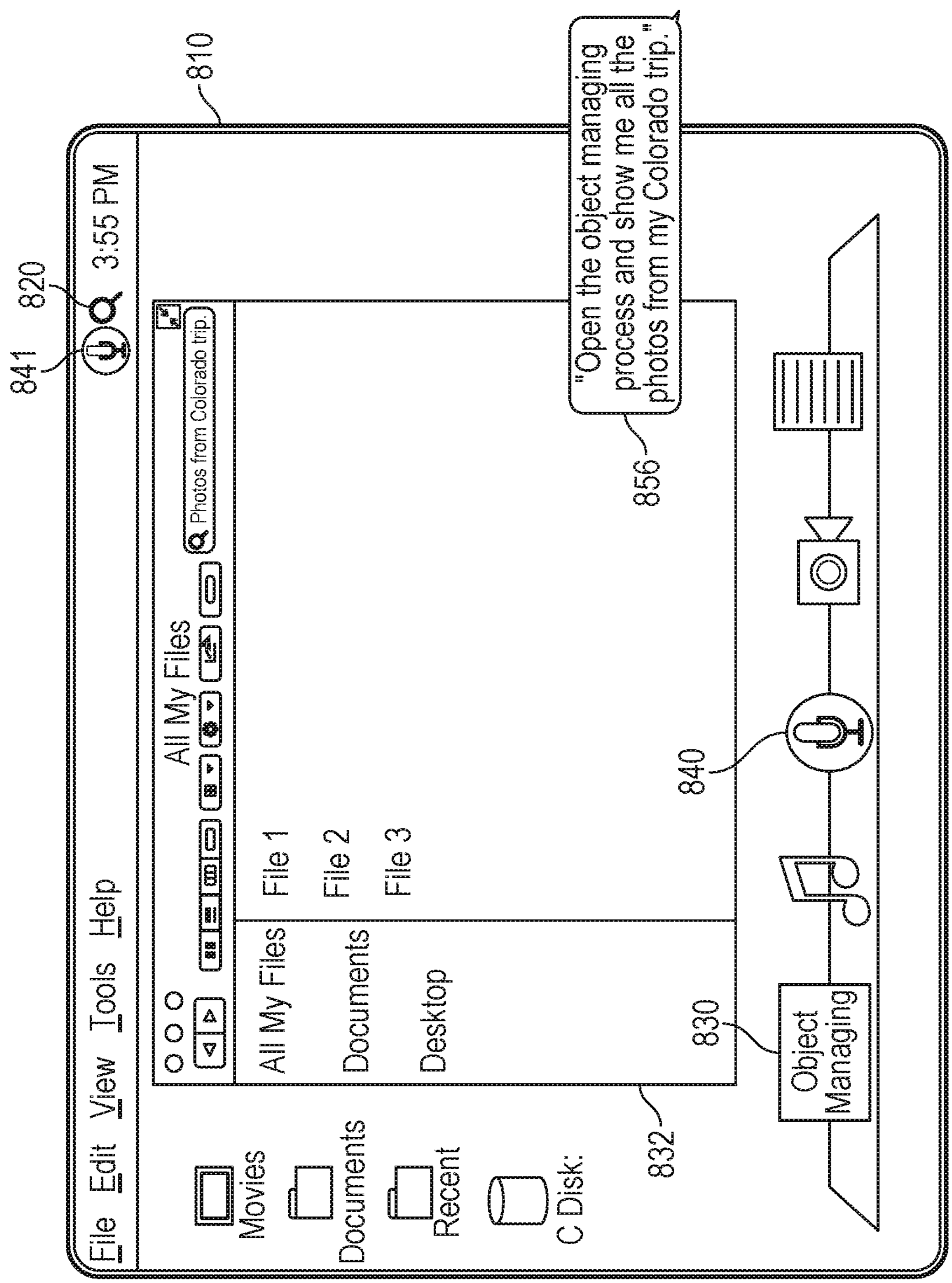

With reference to FIG. 8E, in some examples, the digital assistant determines that the user intent is to perform a task using the object managing process and performs the task using an object managing process. For example, the digital assistant receives a speech input 856 such as "Open the object managing process and show me all the photos from my Colorado trip," or simply "Show me all the photos from my Colorado trip." Based on speech input 856 and context information, the digital assistant determines the user intent. For example, the digital assistant determines that the actionable intent is to display photos and determines one or more parameters such as "all," and "Colorado trip." The digital assistant further determines which photos correspond to the user's Colorado trip using context information. As described, context information includes user-specific data, metadata of one or more objects, sensor data, and/or device configuration data. As an example, metadata associated with one or more files (e.g., file 1, file 2, and file 3 displayed in user interface 832) indicates that the file names includes the word "Colorado" or a city name of Colorado (e.g., "Denver"). The metadata may also indicate that a folder name includes the word "Colorado" or a city name of Colorado (e.g., "Denver"). As another example, sensor data (e.g., GPS data) indicates that the user was travelling within Colorado during a certain period of time. As a result, any photos the user took during that particular period of time are photos taken during the user's Colorado trip. As well, photos themselves may include geotagged metadata that associates the photo with the location at which it was taken. Based on the context information, the digital assistant determines that the user intent is to, for example, display photos stored in a folder having a folder name "Colorado trip," or display photos taken during the period of time that the user was travelling within Colorado.

As described, in some examples, the digital assistant determines whether the user intent is to perform a task using a searching process or an object managing process. To make such determination, the digital assistant determines whether the speech input includes one or more keywords representing the searching process or the object managing process. For example, the digital assistant determines that speech input 856 includes keywords or a phrase such as "open the object managing process," indicating that the user intent is to use the object managing process to perform the task.

In accordance with a determination the user intent is to perform the task using the object managing process, the digital assistant performs the task using the object managing process. For example, the digital assistant searches at least one object using the object managing process. In some examples, at least one object includes at least one of a folder or a file. A file can include at least one of a photo, an audio (e.g., a song), or a video (e.g., a movie). In some examples, searching a file or a folder is based on metadata associated with the folder or file. For example, the searching of a file or folder uses metadata such as a tag, a date, a time, an author, a title, a type of the file, a size, a page count, and/or a file location associated with the folder or file. In some examples, the file or folder can be stored internally or externally to the user device. For example, the file or folder can be stored on the hard disk of the user device or stored on a cloud server.

As illustrated in FIG. 8E, in accordance with the determination that the user intent is, for example, to display photos stored in a folder having a folder name "Colorado trip," or display photos taken during the period of time that the user was travelling within Colorado, the digital assistant performs the task using the object managing process. For example, the digital assistant instantiates an object managing process represented by affordance 830 and causes the object managing process to search for photos from the user's Colorado trip. In some examples, the digital assistant also causes the object managing process to display a snippet or a window (not shown) providing text of the user's speech input 856.

Figure 8F:
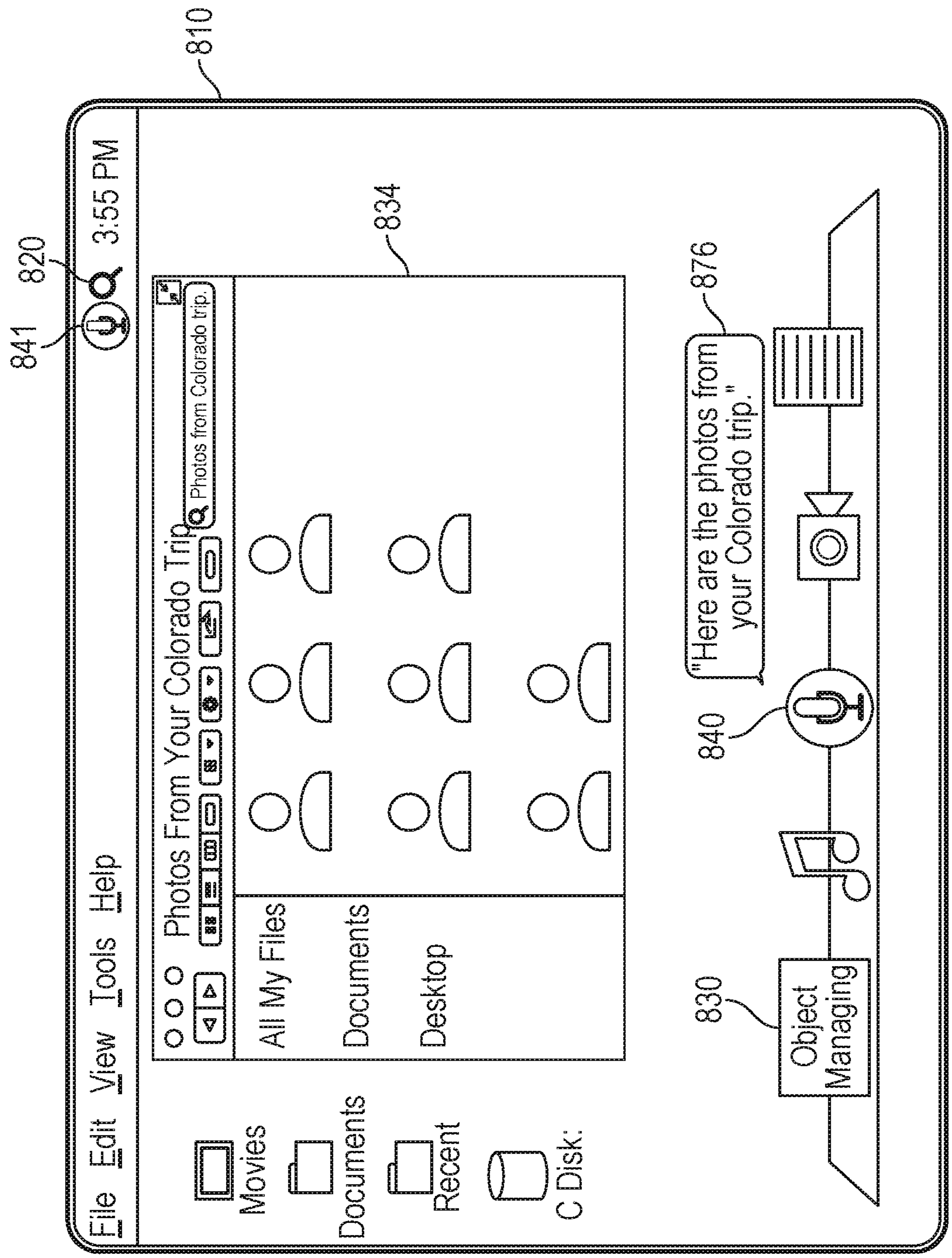

With reference to FIG. 8F, in some embodiments, the digital assistant further provides a response based on a result of performing the task using the object managing process. As illustrated in FIG. 8F, as a result of searching the photos of the user's Colorado trip, the digital assistant displays a user interface 834 (e.g., a snippet or a window) providing the result of performing the task using the object managing process. For example, on user interface 834, a preview of the photos is displayed. In some examples, the digital assistant instantiates a process (e.g., the object managing process) to perform additional tasks on the photos, such as inserting the photos to a document or attaching the photos to email. As described in more detail below, the digital assistant can instantiate a process to perform the additional tasks in response to a user's additional speech input. As well, the digital assistant can perform multiple tasks in response to a single speech input, such as "send the photos from my Colorado trip to my Mom by email." The digital assistant can also instantiate a process to perform such additional tasks in response to the user's input using an input device (e.g., a mouse input to select of one or more affordances or perform a drag-and-drop operation). In some embodiments, the digital assistant further provides a spoken output corresponding to the result. For example, the digital assistant provides a spoken output 876 including "Here are the photos from your Colorado trip."

Figure 9A:
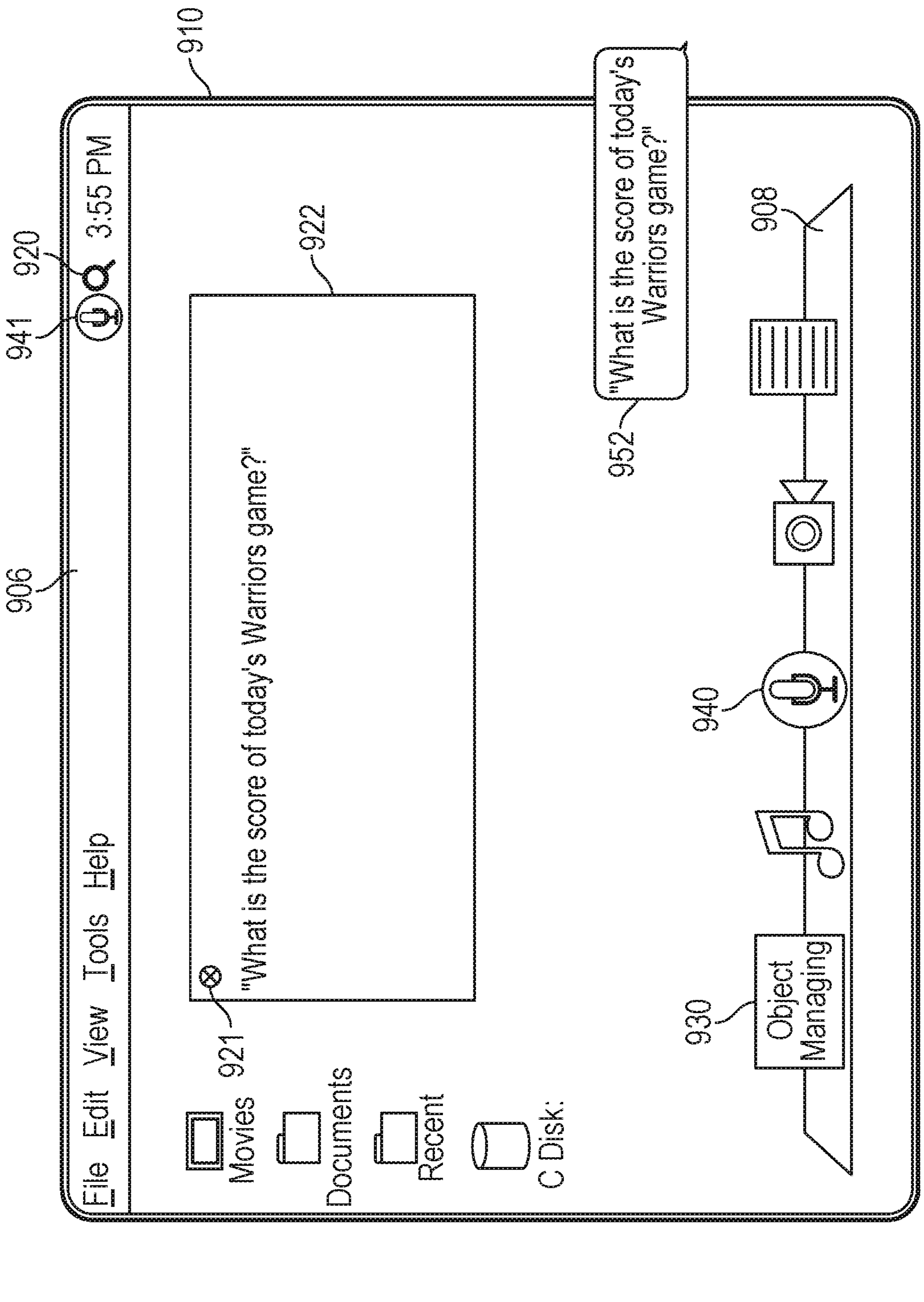
FIGS. 9A-9H illustrate functionalities of performing a task using a search process by a digital assistant according to various examples.

With reference to FIG. 9A, in some examples, user's speech input may not include one or more keywords indicating whether the user intent is to use the searching process or the object managing process. For example, the user provides a speech input 952 such as "What is the score of today's Warriors game?" Speech input 952 does not include keywords indicating "the searching process" or the "object managing process." As a result, the keywords may not be available for the digital assistant to determine whether the user intent is to perform the task using the searching process or the object managing process.

In some embodiments, to determine whether the user intent is to perform the task using the searching process or the object managing process, the digital assistant determines whether the task is associated with searching based on the speech input. In some examples, a task that is associated with searching can be performed by either the searching process or the object managing process. For example, both the searching process and the object managing process can search a folder and a file. In some examples, the searching process can further search a variety of objects including online information sources (e.g., websites), communications (e.g., emails), contacts, calendars, or the like. In some examples, the object managing process may not be configured to search certain objects such as online information sources.

In accordance with a determination that the task is associated with searching, the digital assistant further determines whether performing the task requires the searching process. As described, if a task is associated with searching, either the searching process or the object managing process can be used to perform the task. However, the object managing process may not be configured to search certain objects. As a result, to determine whether the user intent is to use the searching process or the object managing process, the digital assistant further determines whether the task requires the searching process. For example, as illustrated in FIG. 9A, based on speech input 952, the digital assistant determines that the user intent is, for example, to obtain the score of today's Warriors game. According to the user intent, the digital assistant further determines that performing the task requires searching online information sources and therefore is associated with searching. The digital assistant further determines whether performing the task requires the searching process. As described, in some examples, the searching process is configured to search online information sources such as websites, while the object managing process may not be configured to search such online information sources. As a result, the digital assistant determines that searching online information sources (e.g., searching Warriors' website to obtain the score) requires the searching process.

Figure 9B:
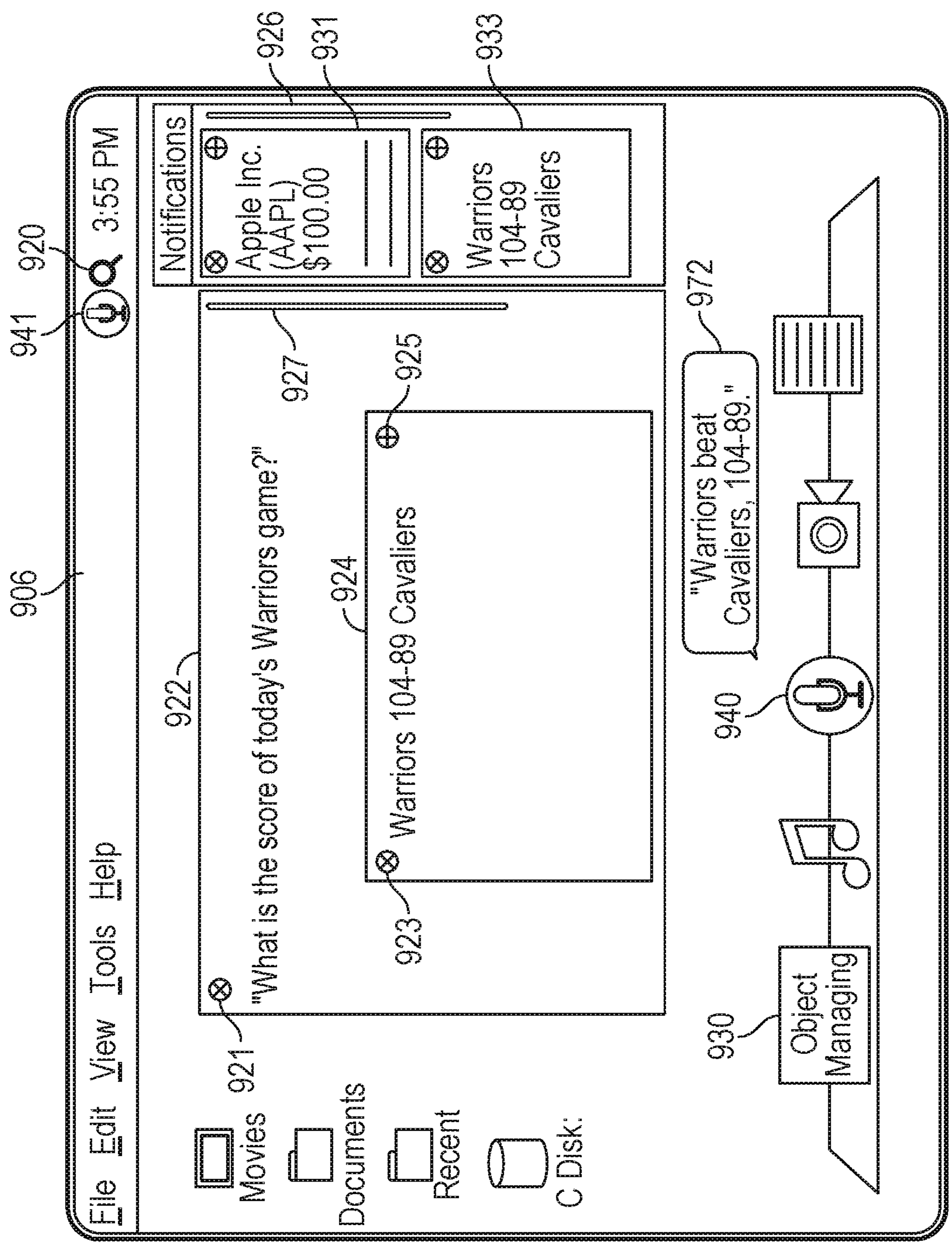

With reference to FIG. 9B, in some embodiments, in accordance with a determination that performing the task requires the searching process, the digital assistant performs the task using the searching process. For example, in accordance with the determination that searching the score of today's Warriors game requires the searching process, the digital assistant instantiates a searching process represented by affordance 920, and causes the searching process to search score of today's Warriors game. In some examples, the digital assistant further causes the searching process to display a user interface 922 (e.g., a snippet or a window) providing text of user speech input 952 (e.g., "What is the score of today's Warriors game?"). User interface 922 includes one or more affordances 921 and 927. Similar to described above, affordance 921 (e.g., a close button) enables closing of user interface 922 and affordance 927 (e.g., a scrolling bar) enables scrolling within user interface 922 such that the user can view the entire content within user interface 922.

With reference to FIG. 9B, in some examples, based on the search results, the digital assistant further provides one or more responses. As illustrated in FIG. 9B, as a result of searching the score of today's Warriors game, the digital assistant displays a user interface 924 (e.g., a snippet or a window) providing the result of performing the task using the searching process. In some embodiments, user interface 924 is located within user interface 922 as a separate user interface. In some embodiments, user interfaces 924 and 922 are integrated together as a single user interface. In some examples, the digital assistant displays the user interface 924 providing the current search results (e.g., the Warriors game score) together with another user interface (e.g., user interface 824 shown on FIG. 8C) providing prior search results (e.g., the AAPL stock price). In some embodiments, the digital assistant only displays user interface 924 providing the current search results and does not display another user interface providing prior search results. As illustrated in FIG. 9B, the digital assistant only displays user interface 924 to provide the current search results (e.g., the Warriors game score). In some examples, affordance 927 (e.g., a scrolling bar) enables scrolling within user interface 922 such that the user can view the prior search results. Further, in some examples, prior search results dynamically update or refresh, e.g., such that stock prices, sports score, weather forecast, etc., update over time.

As illustrated in FIG. 9B, on user interface 924, the search result of the score of today's Warriors game is displayed (e.g., Warriors 104-89 Cavaliers). In some embodiments, user interface 924 further provides affordances 923 and 925. Affordance 923 enables closing of user interface 924. For example, if the digital assistant receives a user's selection of affordance 923, user interface 924 disappears or closes from the display of the user device. Affordance 925 enables moving or sharing of the search result displayed on user interface 924. For example, if the digital assistant receives the user's selection of affordance 925, it moves or shares user interface 924 (or the search result thereof) with a notification application. As shown in FIG. 9B, the digital assistant displays user interface 926 that is associated with the notification application to provide the search result of Warriors game score. As described, results of the performance the task are dynamically updated over time. For example, the Warriors game score can be dynamically updated over time while the game is ongoing and displayed on user interface 924 (e.g., the snippet or window) and/or on user interface 926 (e.g., the notification application user interface). In some embodiments, the digital assistant further provides a spoken output corresponding to the search result. For example, the digital assistant represented by affordance 940 or 941 provides a spoken output 972 such as "Warriors beats Cavaliers, 104-89." In some examples, user interface 922 (e.g., a snippet or a window) provides text corresponding to spoken output 972.

Figure 9C:
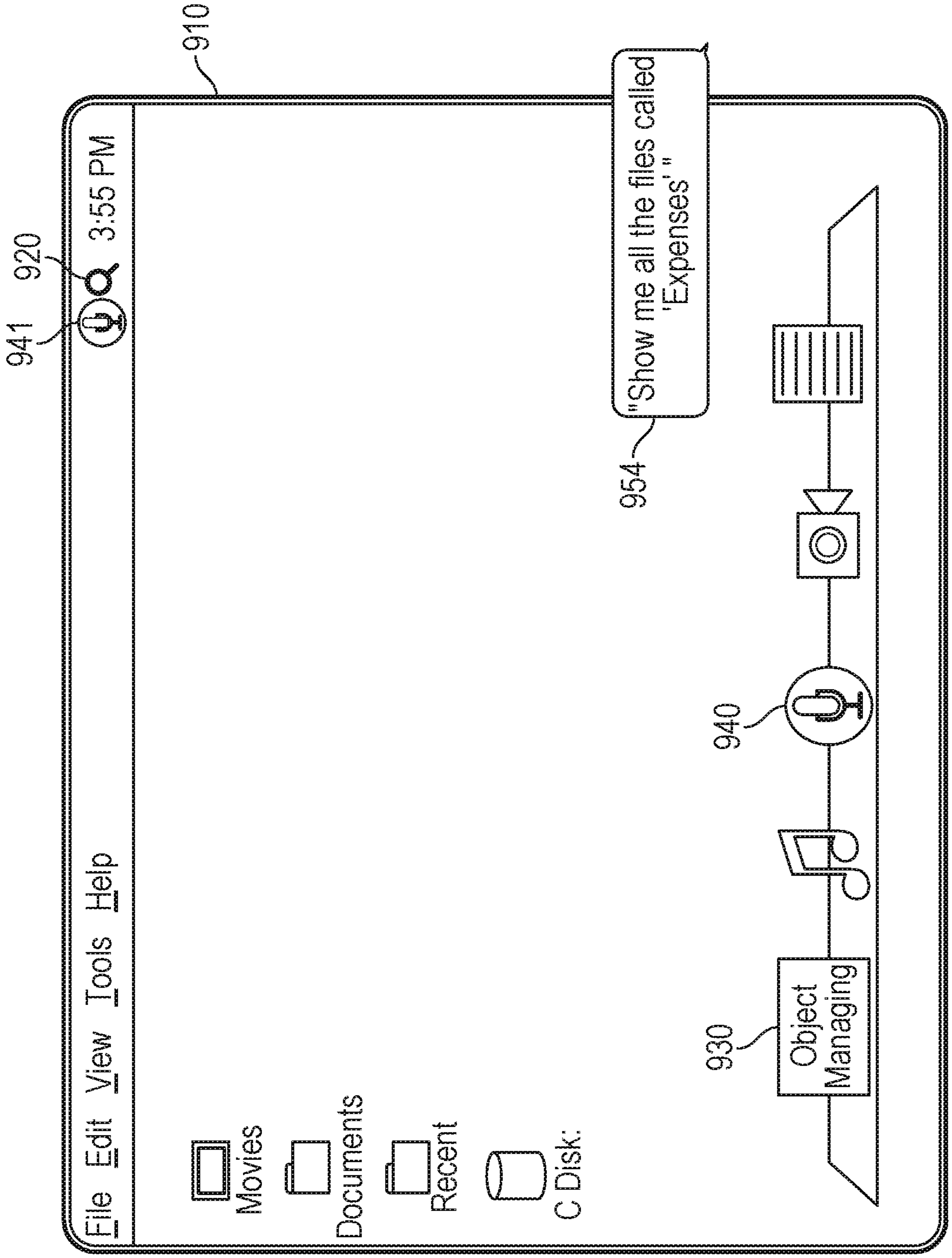

As described above, in some embodiments, the digital assistant determines whether the task is associated with searching, and in accordance with such a determination, the digital assistant determines whether performing the task requires the searching process. With reference to FIG. 9C, in some embodiments, the digital assistant determines that performing the task does not require the searching process. For example, as illustrated in FIG. 9C, the digital assistant receives a speech input 954 such as "Show me all the files called Expenses." Based on speech input 954 and context information, the digital assistant determines that user intent is to display all the files having the word "Expenses" (or a portion, a variation, a paraphrase thereof) contained in their file names, the metadata, the content of the files, or the like. According to the user intent, the digital assistant determines that the task to be performed includes searching all the files associated with the word "Expenses." As a result, the digital assistant determines that performing the task is associated with searching. As described above, in some examples, the searching process and the object managing process can both perform searching of files. As a result, the digital assistant determines that performing the task of searching all the files associated with the word "Expenses" does not require the searching process.

Figure 9D:
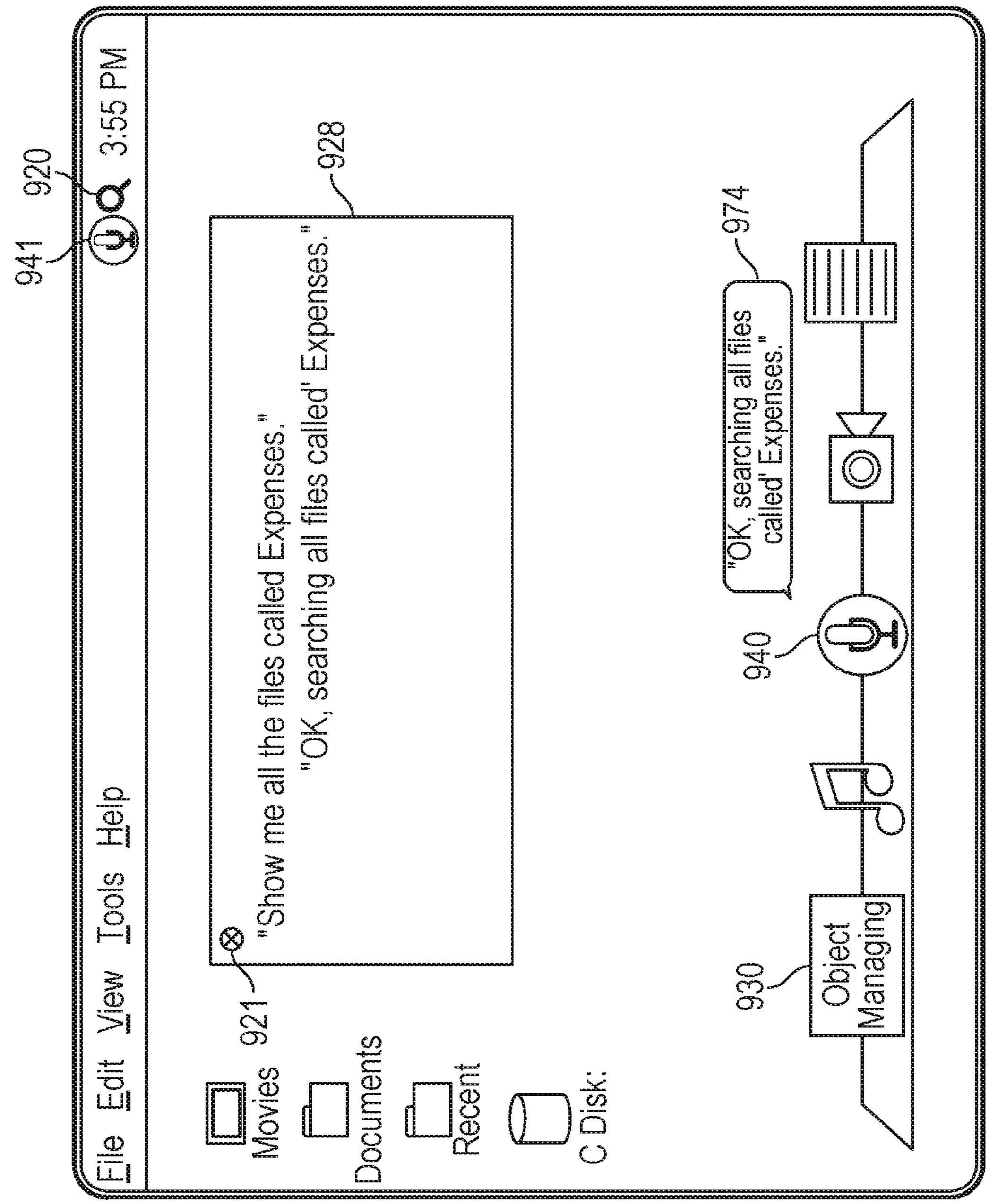

With reference to FIG. 9D, in some examples, in accordance with a determination that performing the task does not require the searching process, the digital assistant determines, based on a pre-determined configuration, whether the task is to be performed using the searching process or the object managing process. For example, if both the searching process and the object managing process can perform the task, a pre-determined configuration may indicate that the task is to be performed using the searching process. The pre-determined configuration can be generated and updated using context information such as user preferences or user-specific data. For example, the digital assistant determines that historically, for a particular user, the searching process was selected more frequently than the object managing process for file searching. As a result, the digital assistant generates or updates the pre-determined configuration to indicate that the searching process is the default process for searching files. In some examples, the digital assistant generates or updates the pre-determined configuration to indicate that the object managing process is the default process.

As illustrated in FIG. 9D, based on a pre-determined configuration, the digital assistant determines that the task of searching all the files associated with the word "Expense" is to be performed using the searching process. As a result, the digital assistant performs the searching of all the files associated with the word "Expenses" using the searching process. For example, the digital assistant instantiates a searching process represented by affordance 920 displayed on user interface 910, and causes the searching process to search all files associated with the word "Expenses," In some examples, the digital assistant further provides a spoken output 974, informing the user that the task is being performed. Spoken output 974 includes, for example, "OK, searching all files called 'Expenses'." In some examples, the digital assistant further causes the searching process to display a user interface 928 (e.g., a snippet or a window) providing text corresponding to speech input 954 and spoken output 974.

Figure 9E:
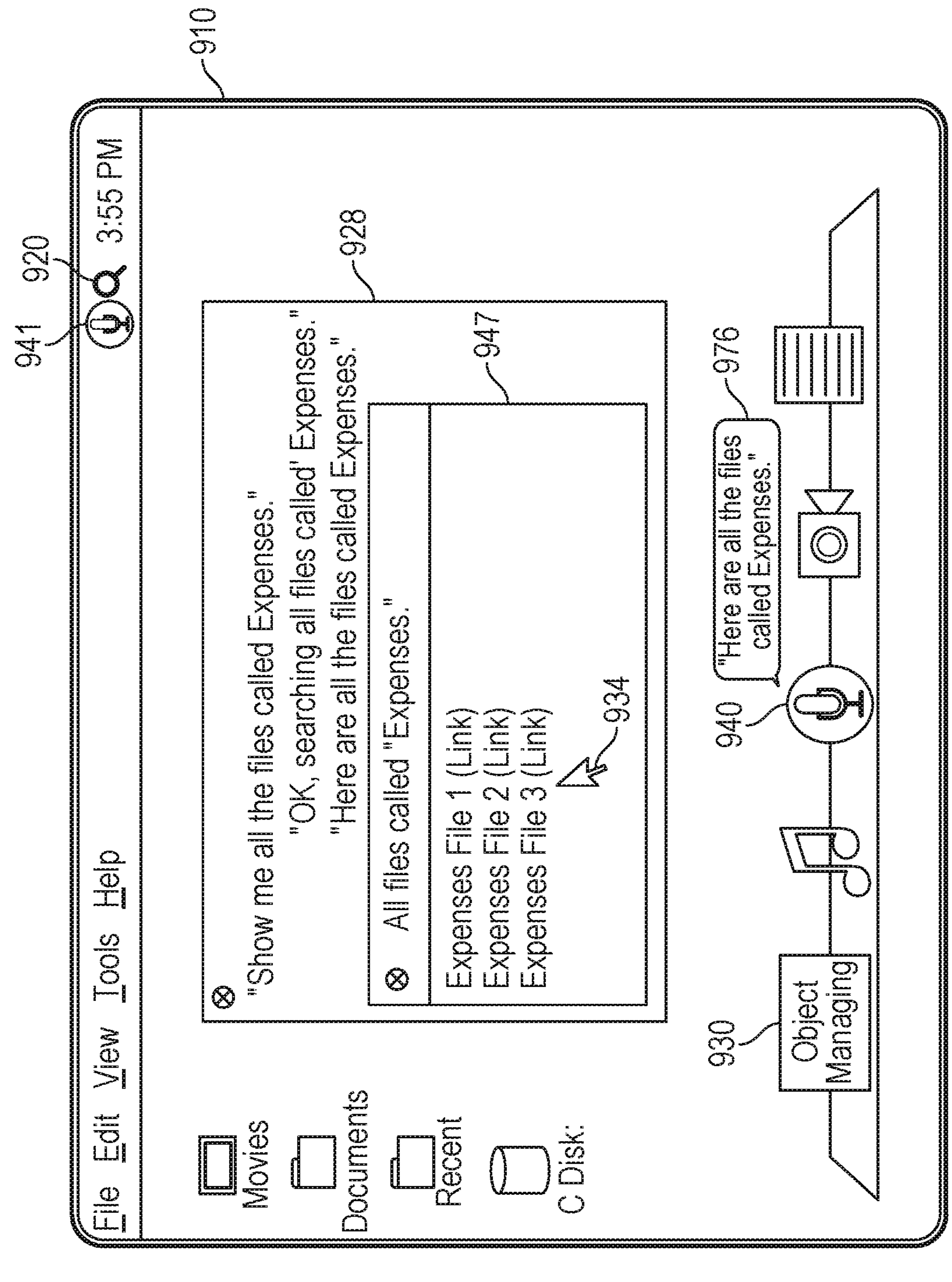

With reference to FIG. 9E, in some embodiments, the digital assistant further provides one or more responses based on a result of performing the task using the searching process. As illustrated in FIG. 9E, as a result of searching all files associated with the word "Expenses," the digital assistant displays a user interface 947 (e.g., a snippet or a window) providing the search results. In some embodiments, user interface 947 is located within user interface 928 as a separate user interface. In some embodiments, user interfaces 947 and 928 are integrated together as a single user interface. On user interface 947, a list of files that are associated with the word "Expenses" are displayed. In some embodiments, the digital assistant further provides a spoken output corresponding to the search result. For example, the digital assistant represented by affordance 940 or 941 provides a spoken output 976 such as "Here are all the files called Expenses." In some examples, the digital assistant further provides, on user interface 928, text corresponding to spoken output 976.

In some embodiments, the digital assistant provides one or more links associated with the result of performing the task using the searching process. A link enables instantiating a process (e.g., opening a file, invoking an object managing process) using the search result. As illustrated in FIG. 9E, on user interface 947, the list of files (e.g., Expenses File 1, Expenses File 2, Expenses File 3) represented by their file names can be associated with links. As an example, a link is displayed on the side of each file name. As another example, the file names is displayed in a particular color (e.g., blue) indicating that the file names are associated with links. In some examples, the file names associated with links are displayed in the same color as other items displayed on user interface 947.

Figure 9F:
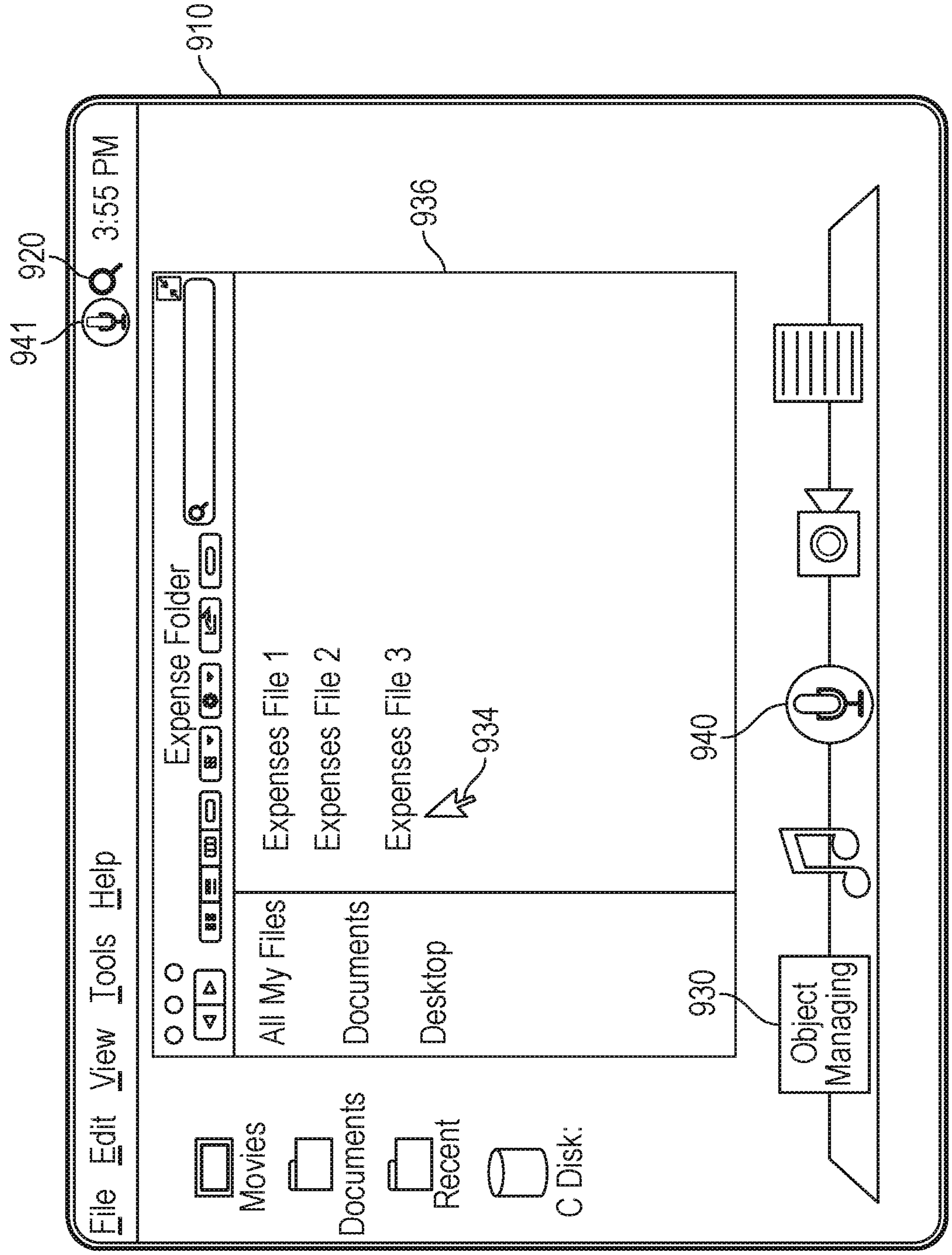

As described, a link enables instantiating a process using the search result. Instantiating a process includes invoking the process if the process is not already running. If at least one instance of the process is running, instantiating a process includes executing an existing instance of the process or generating a new instance of the process. For example, instantiating an object managing process includes invoking the object managing process, using an existing object managing process, or generating a new instance of the object managing process. As illustrated in FIGS. 9E and 9F, a link displayed on user interface 947 enables managing an object (e.g., a file) associated with the link. For example, user interface 947 receives a user selection of a link (e.g., a selection by a cursor 934) associated with a file (e.g., "Expenses file 3"). In response, the digital assistant instantiates an object managing process represented by affordance 930 to enable managing of the file. As shown in FIG. 9F, the digital assistant displays a user interface 936 (e.g., a snippet or a window) providing the folder containing the file associated with the link (e.g., "Expenses file 3"). Using user interface 936, the digital assistant instantiates the object managing process to perform one or more additional tasks (e.g., copying, editing, viewing, moving, compressing, or the like) with respect to the files.

With reference back to FIG. 9E, in some examples, a link displayed on user interface 947 enables direct viewing and/or editing of the object. For example, the digital assistant, via user interface 947, receives a selection of a link (e.g., a selection by a cursor 934) associated with a file (e.g., "Expenses file 3"). In response, the digital assistant instantiates a process (e.g., a document viewing/editing process) to view and/or edit the file. In some examples, the digital assistant instantiates the process to view and/or edit the file without instantiating an object managing process. For example, the digital assistant directly instantiates a Number process or an Excel process to view and/or edit of the Expense file 3.

Figure 9G:
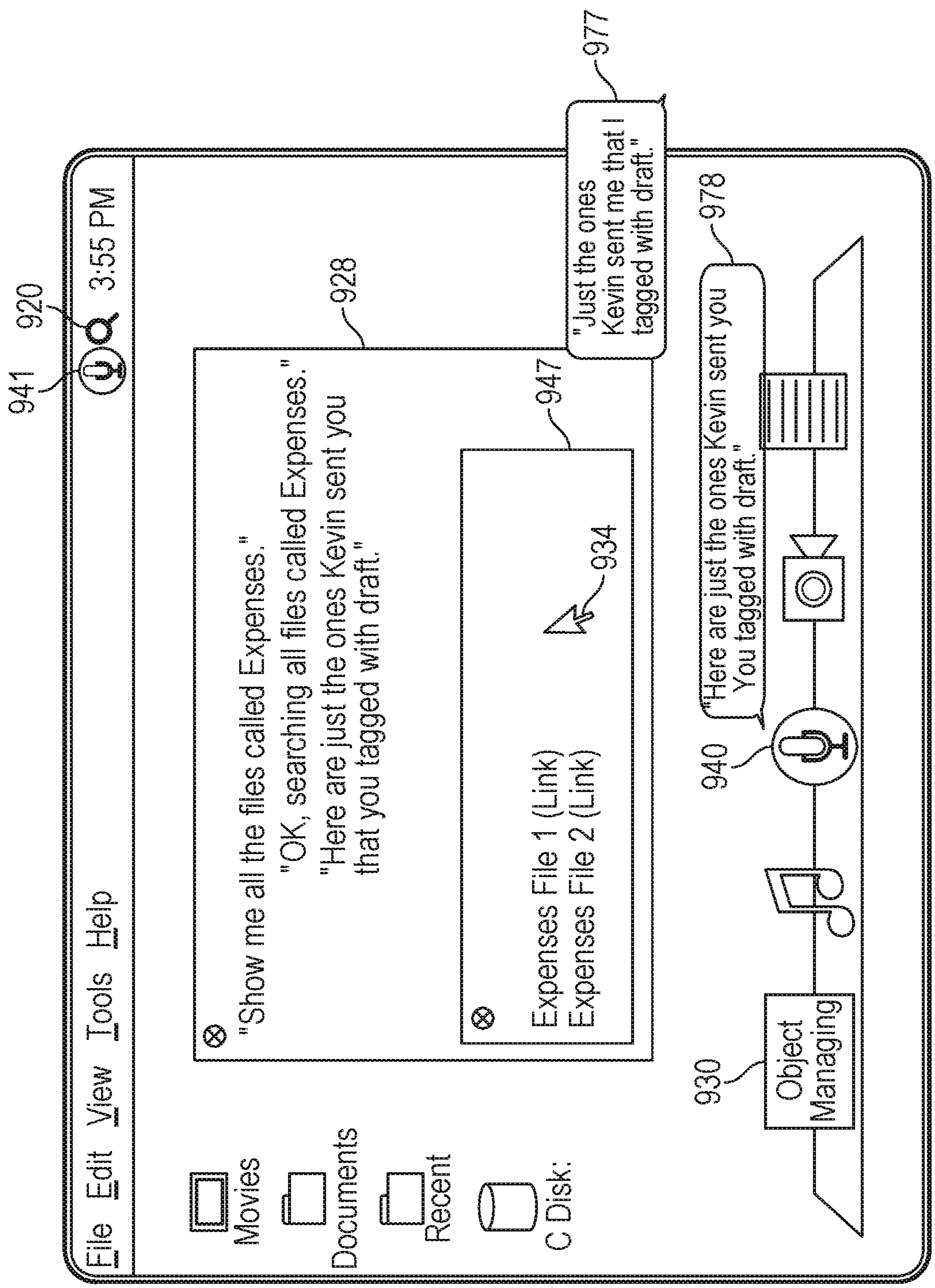

With reference to FIGS. 9E and 9G, in some examples, the digital assistant instantiates a process (e.g., the searching process) to refine the search results. As illustrated in FIGS. 9E and 9G, the user may desire to refine the search result displayed on user interface 947. For example, the user may desire to select one or more files from the search results. In some examples, the digital assistant receives, from the user, a speech input 977 such as "Just the ones Kevin sent me that I tagged with draft." Based on speech input 977 and context information, the digital assistant determines that the user intent is to display only the Expenses files that were sent from Kevin and that are associated with draft tags. Based on the user intent, the digital assistant instantiates a process (e.g., the searching process) to refine the search results. For example, as shown in FIG. 9G, based on the search result, the digital assistant determines that Expenses File 1 and Expense file 2 were sent from Kevin to the user and were tagged. As a result, the digital assistant continues to display these two files on user interface 947 and remove the Expense file 3 from user interface 947. In some examples, the digital assistant provides a spoken output 978 such as "Here are just the ones Kevin sent you that you tagged with draft." The digital assistant may further provide text corresponding to spoken output 978 on user interface 928.

Figure 9H:
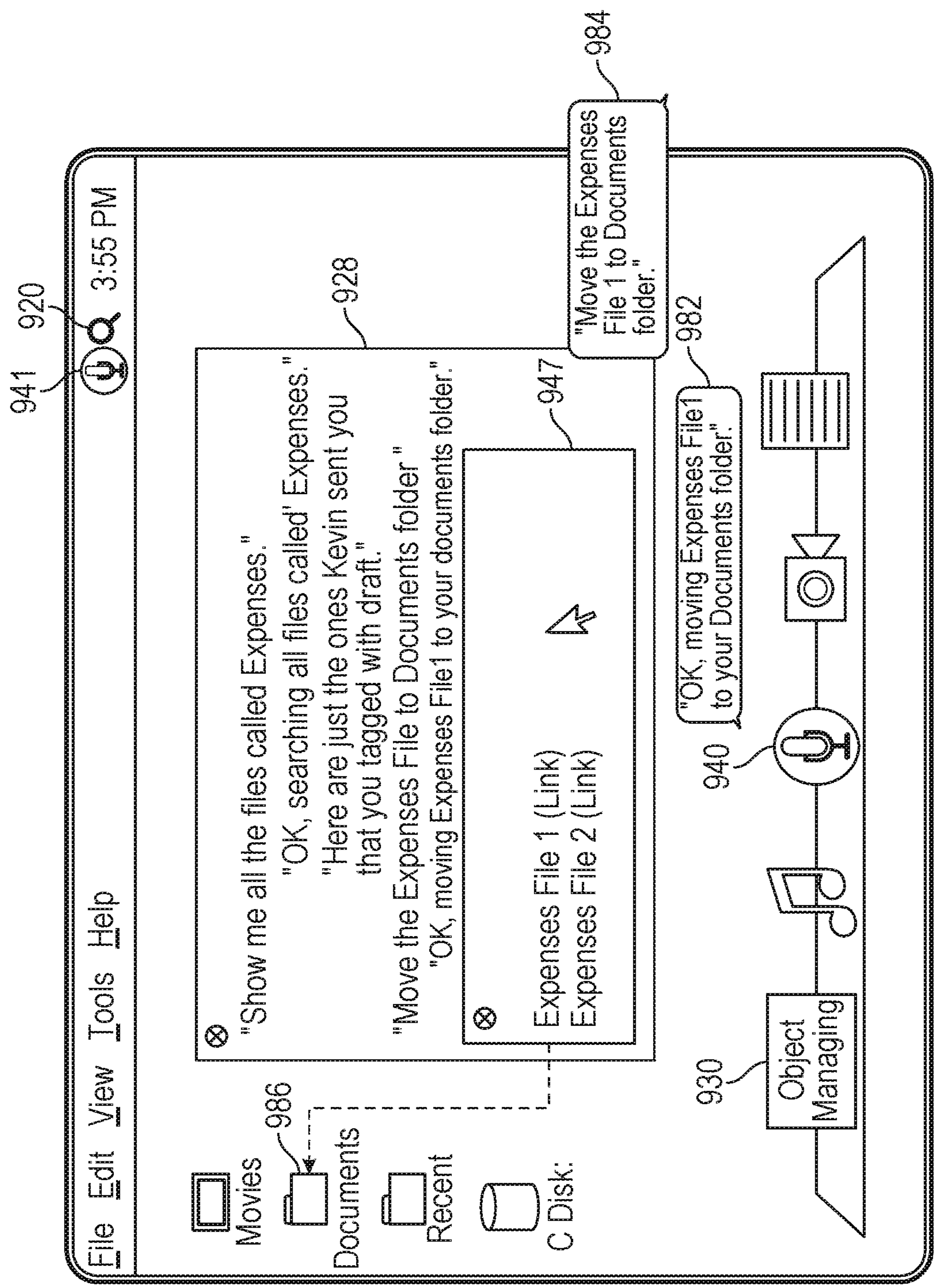

With reference to FIG. 9H, in some examples, the digital assistant instantiates a process an object managing process) to perform an object managing task (e.g., coping, moving, sharing, etc.). For example, as shown in FIG. 9H, the digital assistant receives, from the user, a speech input 984 such as "Move the Expenses file 1 to Documents folder." Based on speech input 984 and context information, the digital assistant determines that the user intent is to copy or move Expense file 1 from its current folder to Document folder. In accordance with the user intent, the digital assistant instantiates a process (e.g., the object managing process) to copy or move Expense file 1 from its current folder to Document folder. In some examples, the digital assistant provides a spoken output 982 such as "Ok, moving Expenses File 1 to your Documents folder." In some examples, the digital assistant furthers provide text corresponding to spoken output 982 on user interface 928.

Figure 10A:
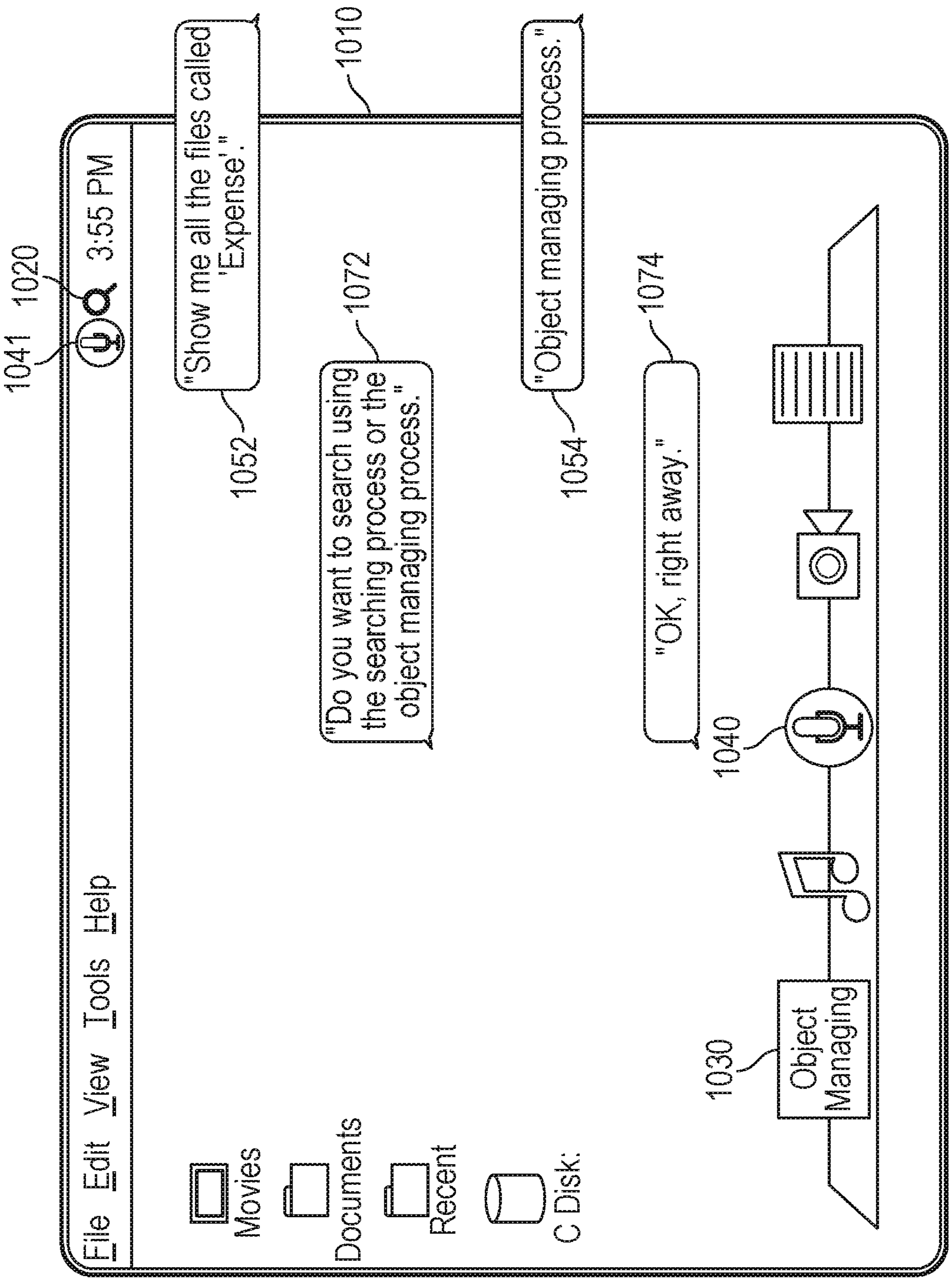
FIGS. 10A-10B illustrate functionalities of performing a task using an object managing process by a digital assistant according to various examples.
Figure 10B:
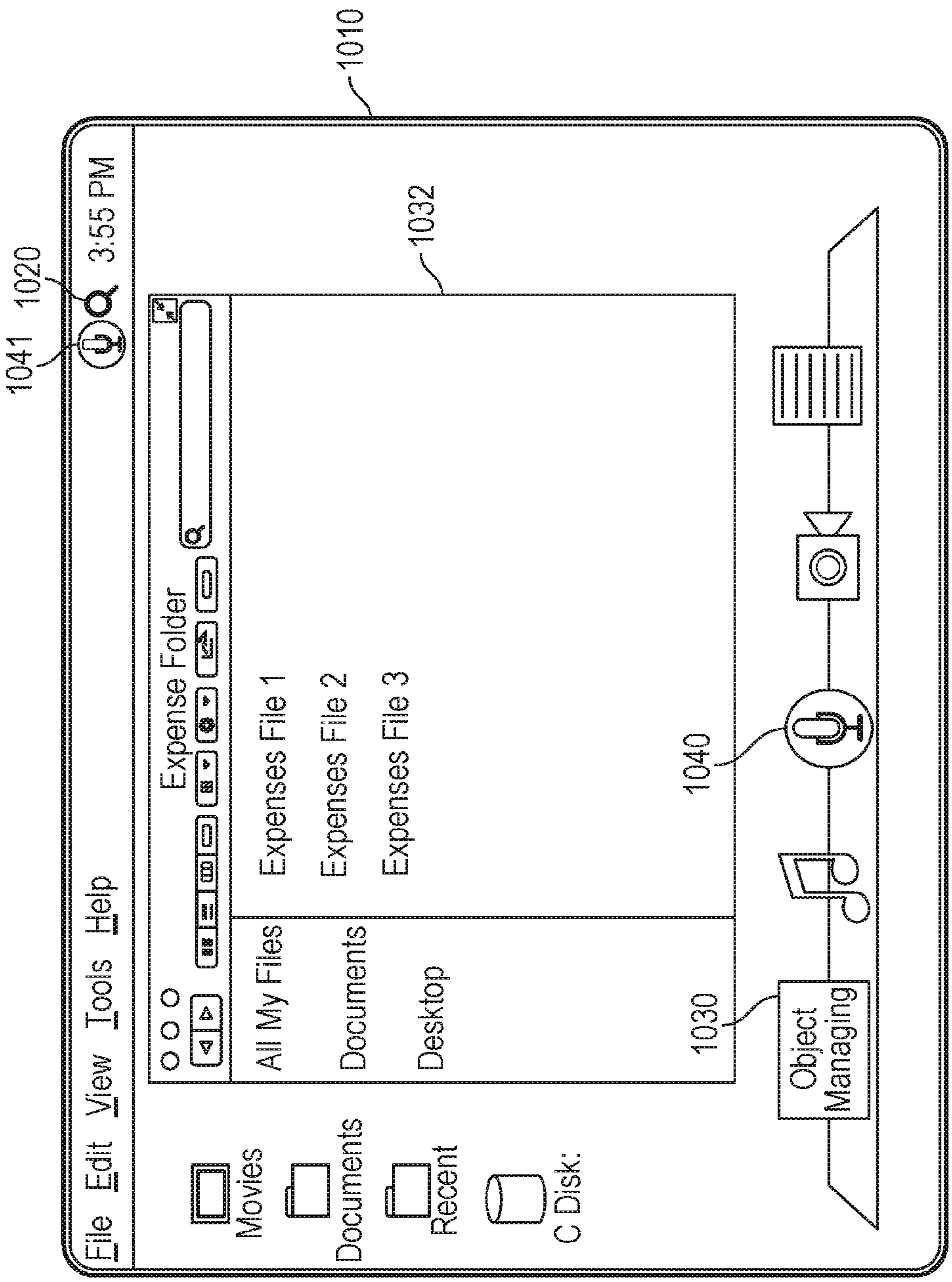

As described, in some examples, a user's speech input may not include keywords indicating whether the user intent is to perform the task using the search process or the object managing process. With reference to FIGS. 10A-10B, in some embodiments, the digital assistant determines that performing the task does not require the searching process. In accordance with the determination, the digital assistant provides a spoken output requesting the user to select the searching process or the object managing process. For example, as shown in FIG. 10A, the digital assistant receives, from the user, a speech input 1052 such as "Show me all the files called 'Expenses.'" Based on speech input 1052 and context information, the digital assistant determines that the user intent is to display all the files associated with the word "Expense." In accordance with the user intent, the digital assistant further determines that the task can be performed by either the searching process or the object managing process, and therefore does not require the search process. In some examples, the digital assistant provides a spoken output 1072 such as "Do you want to search using the searching process or the object managing process?" In some examples, the digital assistant receives, from the user, a speech input 1054 such as "Object managing process." Speech input 1054 thus indicates that the user intent is to perform the task using the object managing process. According to the selection, for example, the digital assistant instantiates an object managing process represented by affordance 1030 to search all the files associated with the word "Expenses." As shown in FIG. 10B, similar to those described above, as a result of the searching, the digital assistant displays a user interface 1032 (e.g., a snippet or a window) providing a folder containing the files associated with the word "Expenses". Similar to those described above, using user interface 1032, the digital assistant instantiates the object managing process to perform additional one or more tasks (e.g., copying, editing, viewing, moving, compressing, or the like) with respect to the files.

Figure 11A:
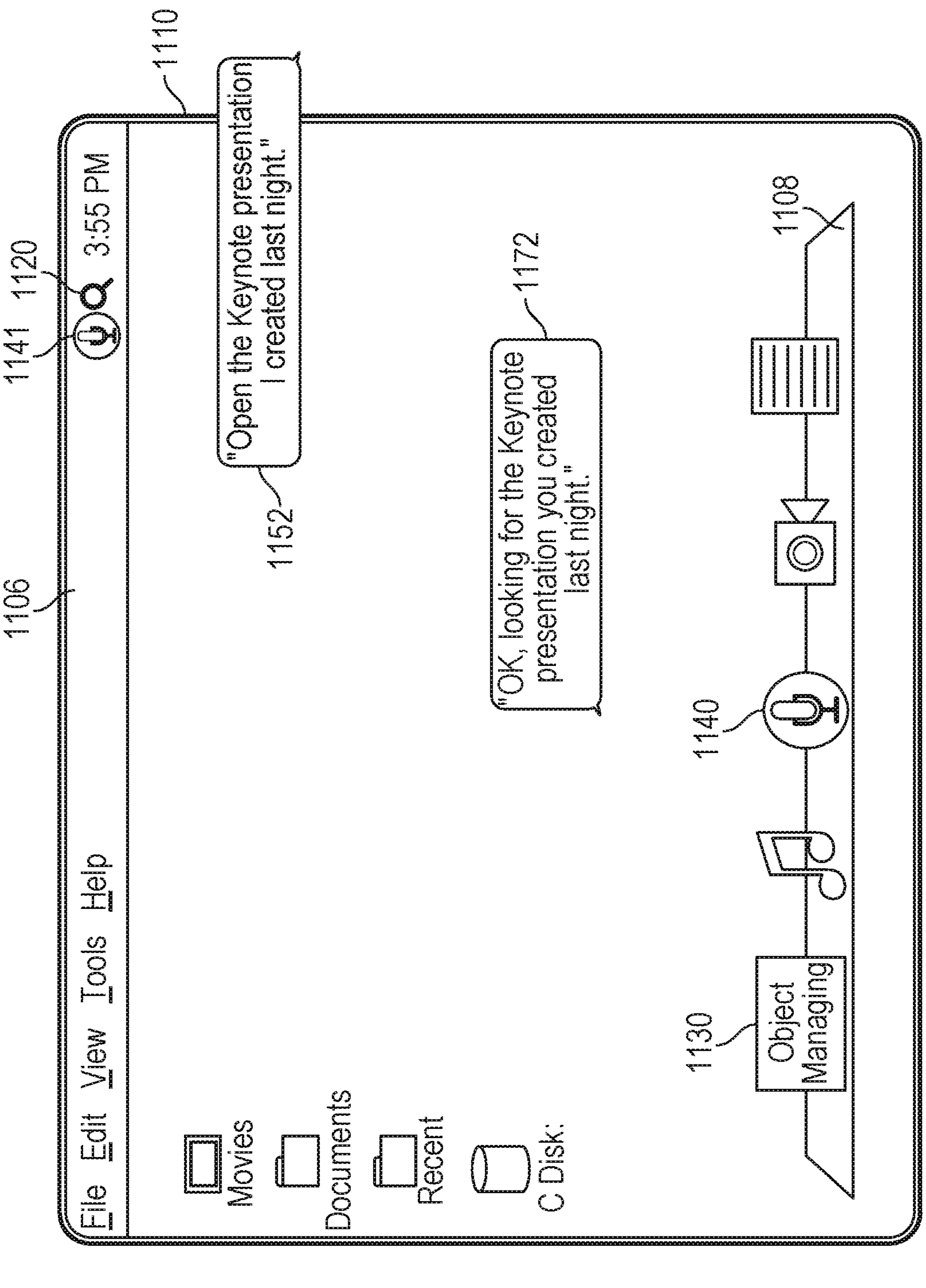
FIGS. 11A-11D illustrate functionalities of performing a task using a search process by a digital assistant according to various examples.
Figure 11B:
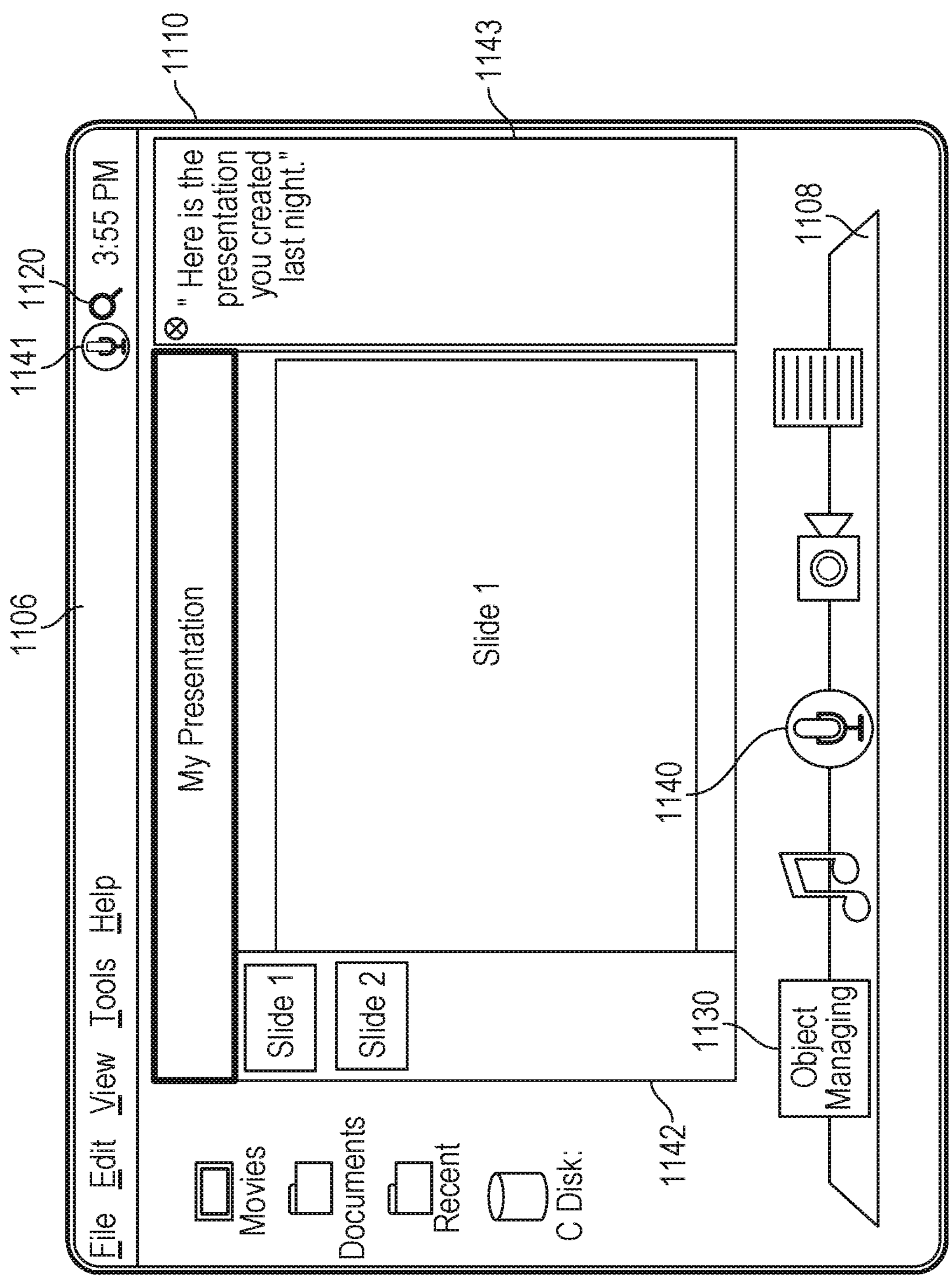

With reference to FIGS. 11A and 11B, in some embodiments, the digital assistant identifies context information and determines the user intent based on the context information and the user's speech input. As illustrated in FIG. 11A, the digital assistant represented by affordance 1140 or 1141 receives a speech input 1152 such as "Open the Keynote presentation I created last night." In response to receiving speech input 1152, the digital assistant identifies context information such as the history of the user's interaction with the user device, the metadata associated with files that the user recently worked on, or the like. For example, the digital assistant identifies the metadata such as the date, the time, and the type of files the user worked on yesterday from 6 p.m.-2 a.m. Based on the identified context information and speech input 1152, the digital assistant determines that the user intent includes searching a Keynote presentation file associated with metadata indicating that the file was edited approximately 6 p.m.-12 a.m yesterday; and instantiating a process (e.g., a Keynote process) to open the presentation file.

In some examples, the context information includes application names or identifications (IDs). For example, a user's speech input provides "Open the Keynote presentation," "find my Pages document," or "find my HotNewApp documents." The context information includes the application names (e.g., Keynote, Pages, HotNewApp) or application IDs. In some examples, the context information is dynamically updated or synchronized. For example, the context information is updated in real time after the user installs a new application named HotNewApp. In some examples, the digital assistant identifies the dynamically updated context information and determines the user intent. For example, the digital assistant identifies the application names Keynote, Pages, HotNewApp or their IDs and determines the user intent according to the application names/IDs and speech inputs.

In accordance with the user intent, the digital assistant further determines whether the user intent is to perform the task using the searching process or the object managing process. As described, the digital assistant makes such determination based on one or more keywords included in the speech input, based on whether the task requires the searching process, based on a pre-determined configuration, and/or based on the user's selection. As illustrated in FIG. 11A, speech input 1152 does not include keywords that indicate whether the user intent is to use the searching process or the object managing process. As a result, the digital assistant determines, for example, based on a pre-determined configuration that the user intent is to use the object managing process. In accordance with the determination, the digital assistant instantiate an object managing process to search a Keynote presentation file associated with metadata that indicates the file was edited approximately 6 p.m.-12 a.m yesterday. In some embodiments, the digital assistant further provides a spoken output 1172 such as "OK, looking for the Keynote presentation you created last night."

In some embodiments, context information is used in performing the task. For example, application names and/or IDs can be used to form a query for searching the application and/or objects (e.g., files) associated with the application names/IDs. In some examples, a server (e.g., server 108) forms a query using the application names (e.g., Keynote, Pages, HotNewApp) and/or IDs and sends the query to the digital assistant of a user device. Based on the query, the digital assistant instantiates a searching process or an object managing process to search one or more applications and/or objects. In some examples, the digital assistant only searches the objects (e.g., files) that correspond to the application name/ID. For example, if a query includes an application name "Pages," the digital assistant only searches Pages files and does not search other files (e.g., Word files) that can be opened by a Pages application. In some examples, the digital assistant searches all objects that is associated with the application name/ID in the query.

Figure 11C:
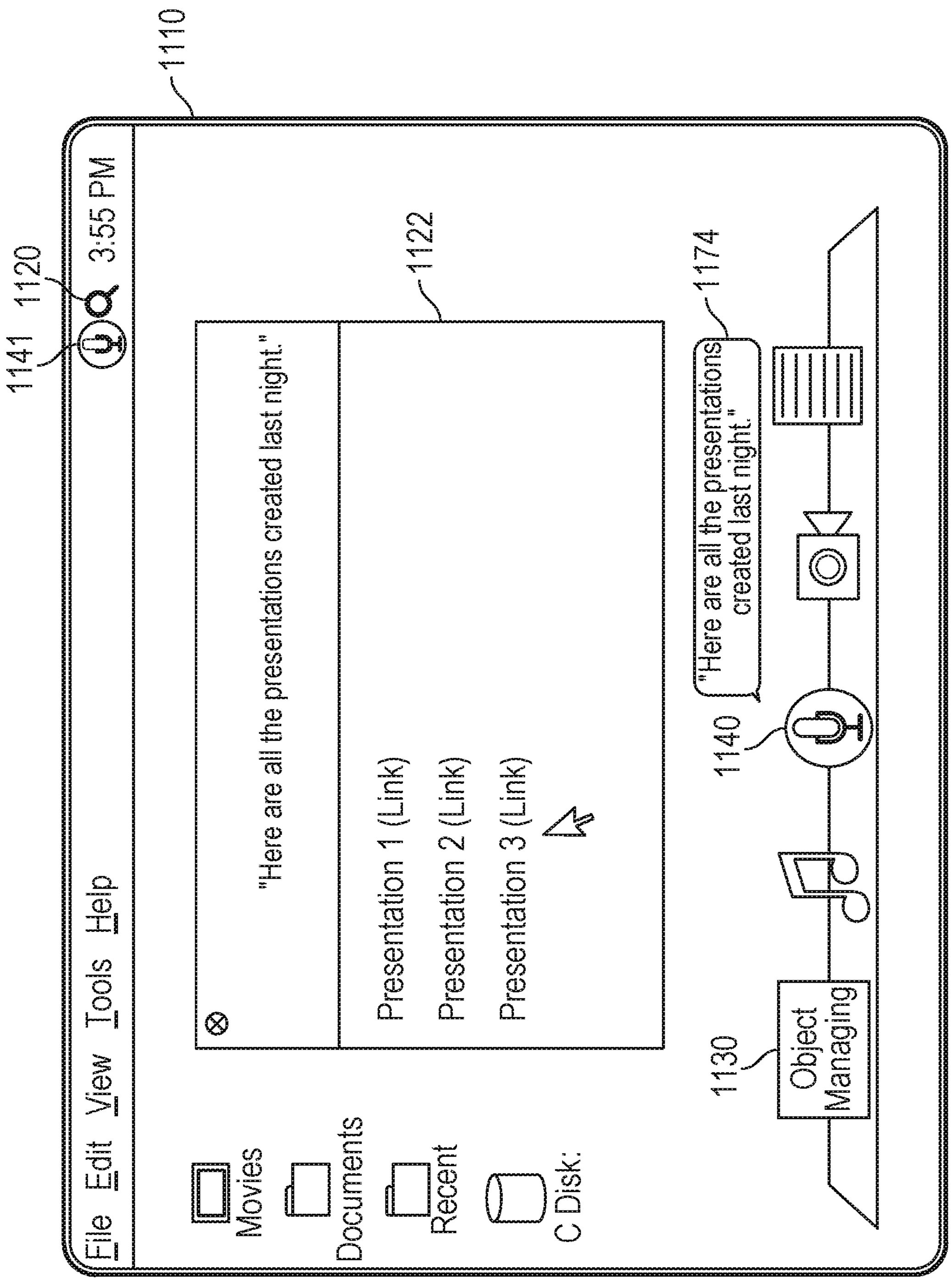

With references to FIGS. 11B and 11C, in some embodiments, the digital assistant provides one or more responses in accordance with a confidence level associated with the results of performing the task. Inaccuracies may exist or arise during the determination of the user intent, the determination of whether the user intent is to perform the task using the searching process or the object managing process, and/or the performance of the task. In some examples, the digital assistant determines a confidence level representing the accuracy of determining the user intent based on the speech input and context information, the accuracy of determining whether the user intent is to perform the task using the searching process or the object managing process, the accuracy of performing the task using the searching process or the object managing process, or a combination thereof.

Continuing the above example illustrated in FIG. 11A, based on speech input 1152 such as "Open the Keynote presentation I created last night," the digital assistant instantiates an object managing process to perform a search of a Keynote presentation file associated with metadata that indicates the file was edited approximately 6 p.m.-12 a.m yesterday. The search result may include a single file that fully matches the search criteria. That is, the single file is a presentation file that was edited approximately 6 p.m.-12 a.m yesterday. Accordingly, the digital assistant determines that the accuracy of the search is high and thus determines that the confidence level is high. As another example, the search result may include a plurality of files that partially match the search criteria. For instance, no file is a presentation file that was edited approximately 6 p.m.-12 a.m yesterday, or multiple files are presentation files that were edited approximately 6 p.m.-12 a.m yesterday. Accordingly, the digital assistant determines that the accuracy of the search is medium or low and thus determines that the confidence level is medium or low.

As illustrated in FIGS. 11B and 11C, the digital assistant provides a response in accordance with the determination of the confidence level. In some examples, the digital assistant determines whether the confidence level is greater than or equal to a threshold confidence level. In accordance with a determination that the confidence level is greater than or equal to the threshold confidence level, the digital assistant provides a first response. In accordance with a determination that the confidence level is less than a threshold confidence level, the digital assistant provides a second response. In some examples, the second response is different from the first response. As shown in FIG. 11B, if the digital assistant determines that the confidence level is greater than or equal to a threshold confidence level, the digital assistant instantiates a process (e.g., a Keynote process represented by user interface 1142) to enable the viewing and editing of the file. In some examples, the digital assistant provides a spoken output such as "Here is the presentation you created last night," and displays the text of the spoken output in a user interface 1143. As shown in FIG. 11C, if the digital assistant determines that the confidence level is less than a threshold confidence level, the digital assistant displays a user interface 1122 (e.g., a snippet or a window) providing a list of candidate files. Each of the candidate files may partially satisfy the search criteria. In some embodiments, the confidence level can be pre-determined and/or dynamically updated based on user preferences, historical accuracy rates, or the like. In some examples, the digital assistant further provides a spoken output 1174 such as "Here are all the presentations created last night," and displays the text corresponding to spoken output 1174 on user interface 1122.

Figure 11D:
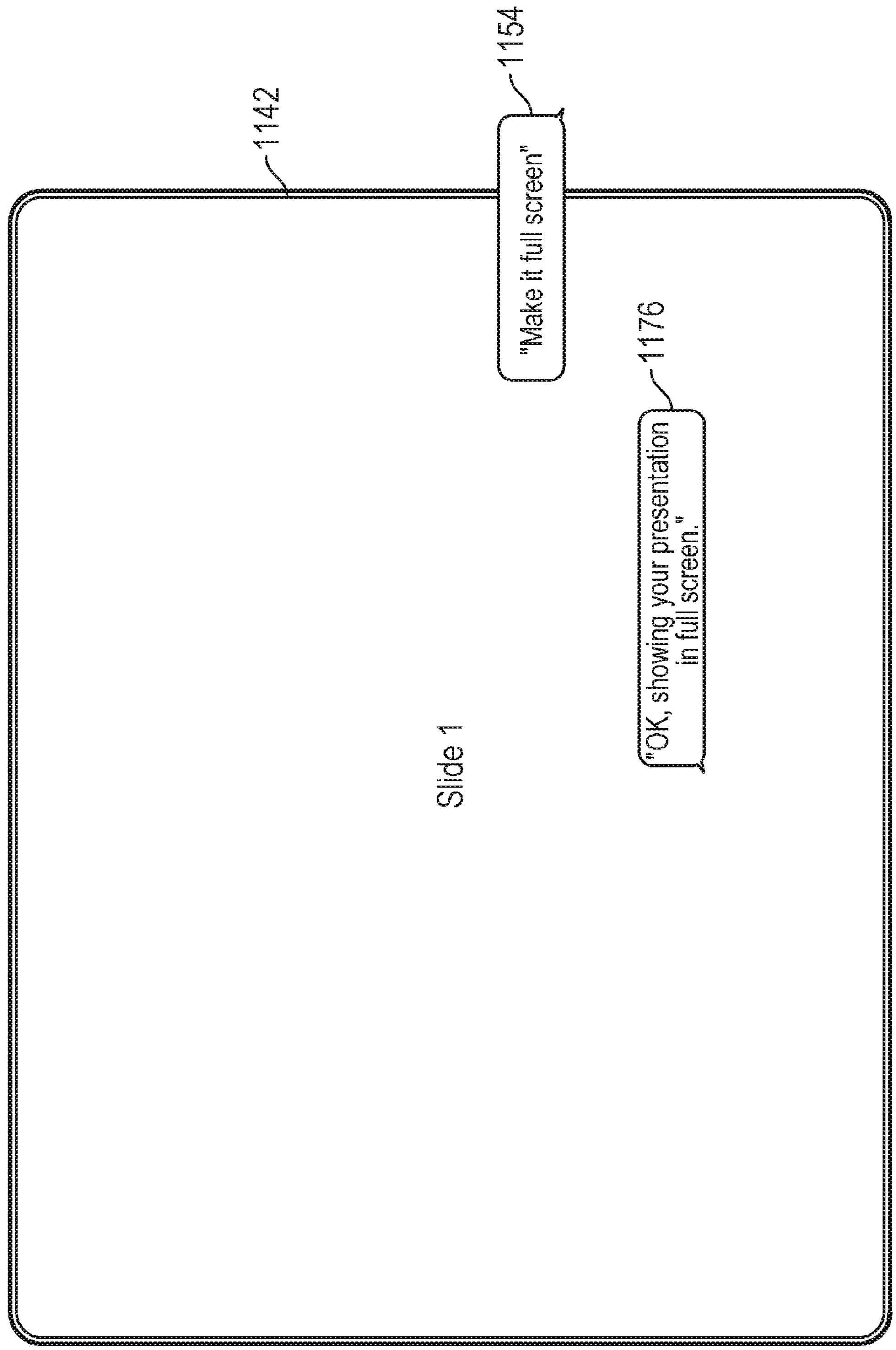

With reference to FIG. 11D, in some embodiments, the digital assistant instantiates a process (e.g., the Keynote presentation process) to perform additional tasks. Continuing with the above example, as shown in FIGS. 11B and 11D, the user may desire to display the presentation file in a full screen mode. The digital assistant receives, from the user, a speech input 1154 such as "Make it full screen." Based on speech input 1154 and context information, the digital assistant determines that the user intent is to display the presentation file in a full screen mode. In accordance with the user intent, the digital assistant causes the Keynote presentation process to display the slides in a full-screen mode. In some examples, the digital assistant provides a spoken output 1176 such as "OK, showing your presentation in full screen."

Figure 12A:
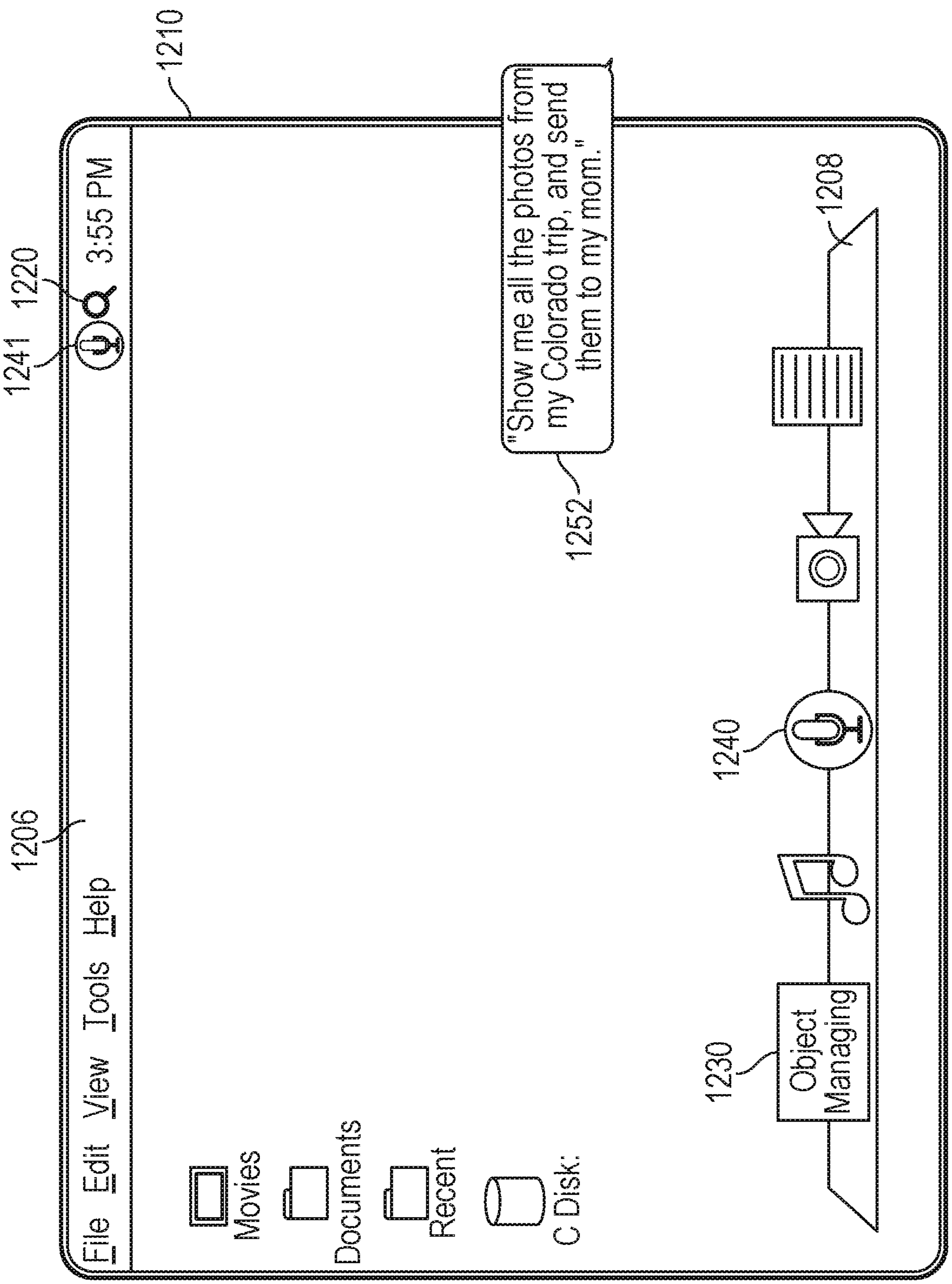
FIGS. 12A-12D illustrate functionalities of performing a task using a search process or an object managing process by a digital assistant according to various examples.
Figure 12B:
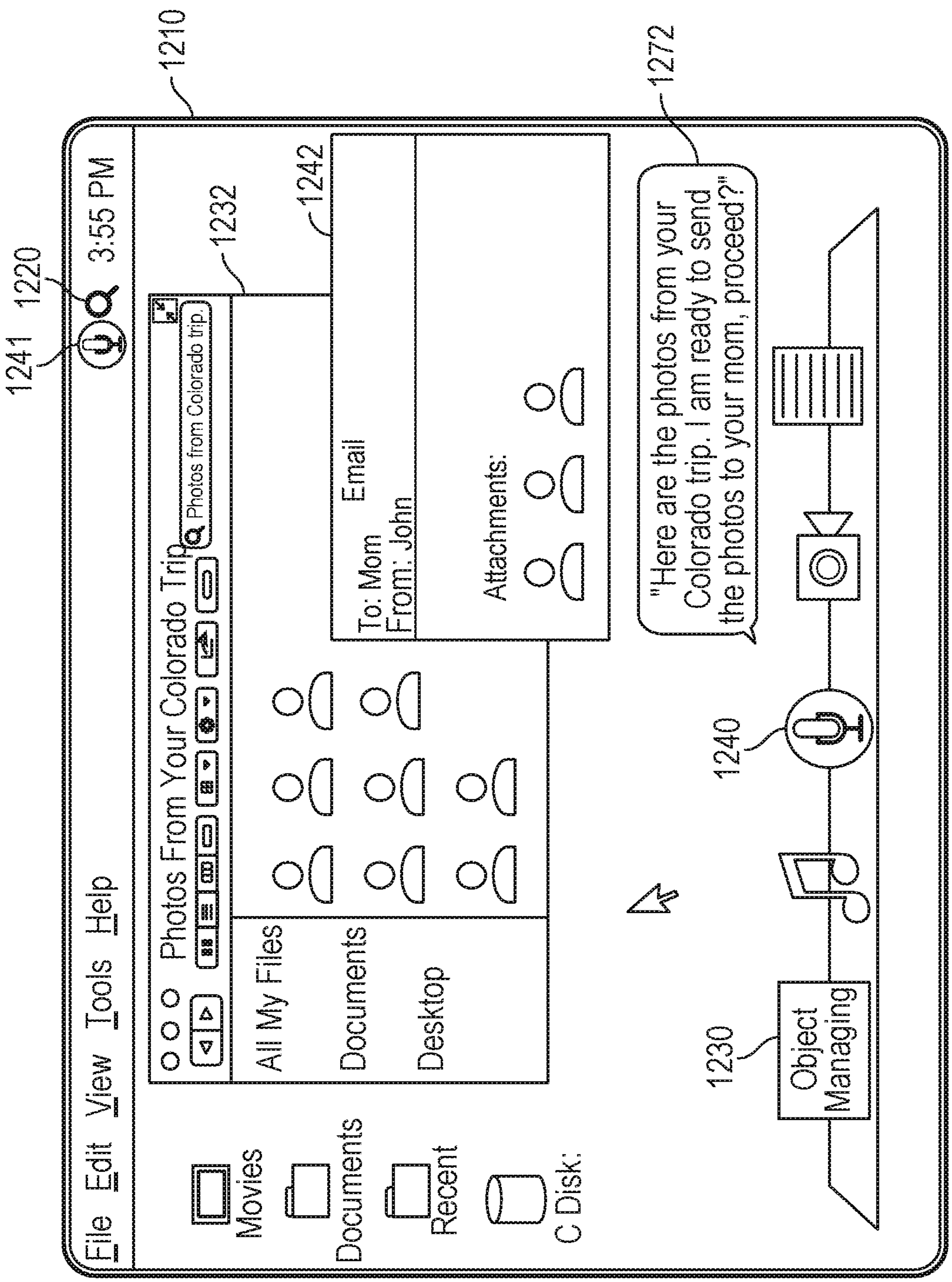
Figure 12C:
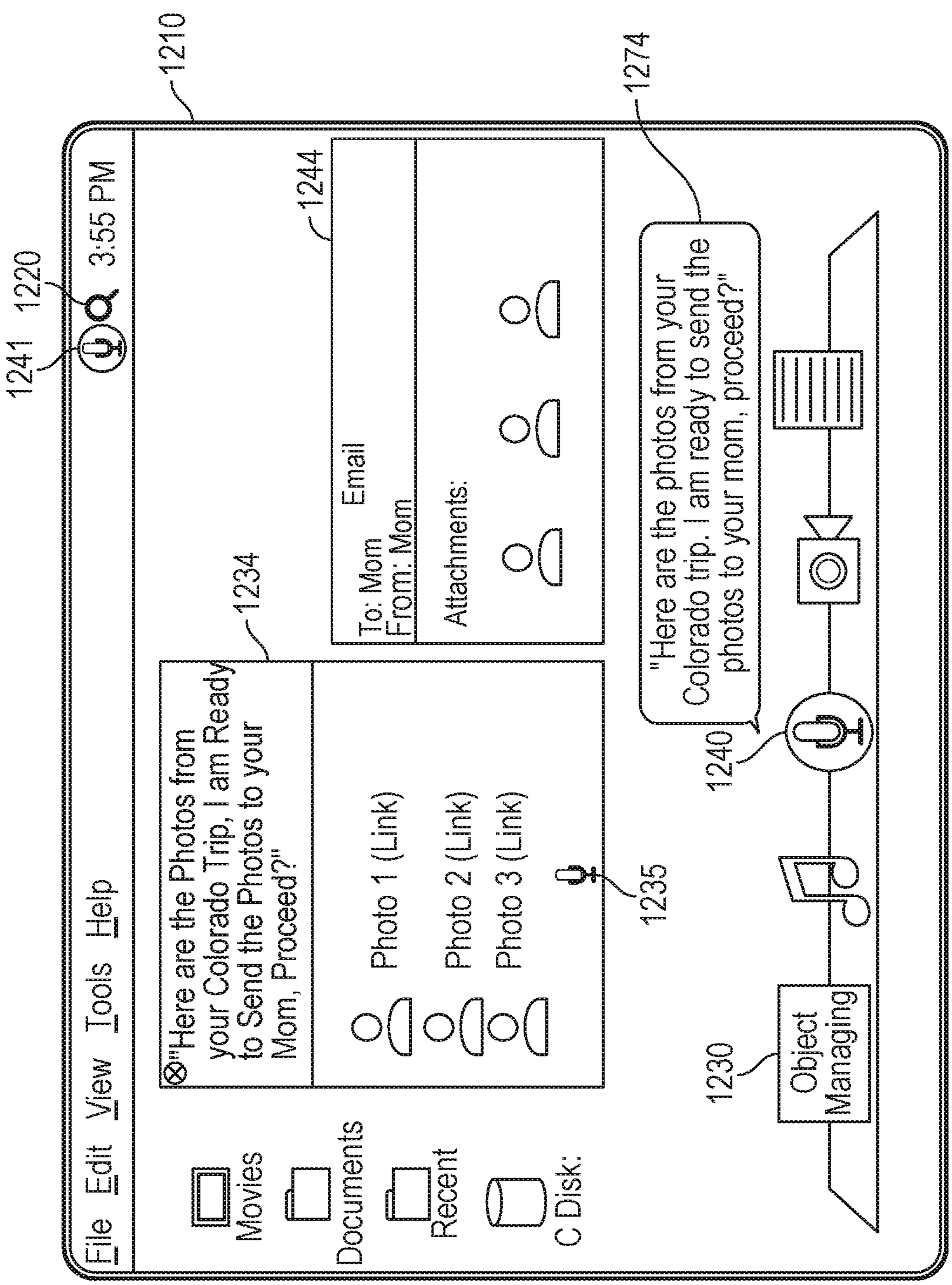

With reference to FIGS. 12A-12C, in some embodiments, the digital assistant determines, based on a single speech input or an utterance, that the user intent is to perform a plurality of tasks. In accordance with the user intent, the digital assistant further instantiates one or more processes to perform the plurality of tasks. For example, as shown in FIG. 12A, the digital assistant represented by accordance 1240 or 1241 receives a single speech input 1252 such as "Show me all the photos from my Colorado trip, and send them to my mom." Based on speech input 1252 and context information, the digital assistant determines that the user intent is to perform a first task and a second task. Similar to those described above, the first task is to display photos stored in a folder having a folder name "Colorado trip," or display photos taken during the period of time that the user is travelling within Colorado. With respect to the second task, the context information may indicate that a particular email address stored in the user's contacts is tagged as the user's mom. Accordingly, the second task is to send an email containing the photos associated with the Colorado trip to the particular email address.

In some examples, the digital assistant determines, with respect to each task, whether the user intent is to perform the task using the searching process or the object managing process. As an example, the digital assistant determines that the first task is associated with searching and the user intent is to perform the first task using the object managing process. As illustrated in FIG. 12B, in accordance with a determination the user intent is to perform the first task using the object managing process, the digital assistant instantiates the object managing process to search photos associated with the user's Colorado trip. In some examples, the digital assistant displays a user interface 1232 (e.g., a snippet or a window) providing a folder including the search result (e.g., photos 1, 2, and 3). As another example, the digital assistant determines that the first task is associated with searching and the user intent is to perform the first task using the searching process. As illustrated in FIG. 12C, in accordance with a determination the user intent is to perform the first task using the searching process, the digital assistant instantiates the searching process to search photos associated with the user's Colorado trip. In some examples, the digital assistant displays a user interface 1234 (e.g., a snippet or a window) providing photos and/or links associated with the search result (e.g., photos 1, 2, and 3).

As another example, the digital assistant determines that the second task (e.g., sending an email containing the photos associated with the Colorado trip to the particular email address) is not associated with searching or associated with managing an object. In accordance with the determination, the digital assistant determines whether the task can be performed using a process that is available to the user device. For example, the digital assistant determines that the second task can be performed using an email process at the user device. In accordance with the determination, the digital assistant instantiates the process to perform the second task. As illustrated in FIGS. 12B and 12C, the digital assistant instantiates the email process and displays user interfaces 1242 and 1244 associated with the email process. The email process attaches the photos associated with the user's Colorado trip to email messages. As shown in FIGS. 12B and 12C, in some embodiments, the digital assistant further provides spoken outputs 1272 and 1274 such as "Here are the photos from your Colorado trip. I am ready to send the photos to your mom, proceed?" In some examples, the digital assistant displays text corresponding to spoken output 1274 on user interface 1244. In response to spoken outputs 1272 and 1274, the user provides a speech input such as "OK." Upon receiving the speech input from the user, the digital assistant causes the email process to send out the email messages.

Techniques for performing a plurality of tasks based on multiple commands contained within a single speech input or an utterance may be found, for example, in related applications: U.S. patent application Ser. No. 14/724,623, titled "MULTI-COMMAND SINGLE UTTERANCE INPUT METHOD," filed May 28, 2015, which claims the benefit of priority of U.S. Provisional Patent Application No. 62/005,556, entitled "MULTI-COMMAND SINGLE UTTERANCE INPUT METHOD," filed on May 30, 2014; and U.S. Provisional Patent Application No. 62/129,851, entitled "MULTI-COMMAND SINGLE UTTERANCE INPUT METHOD," filed on Mar. 8, 2015. Each of these applications is hereby incorporated by reference in their entirety.

Figure 12D:
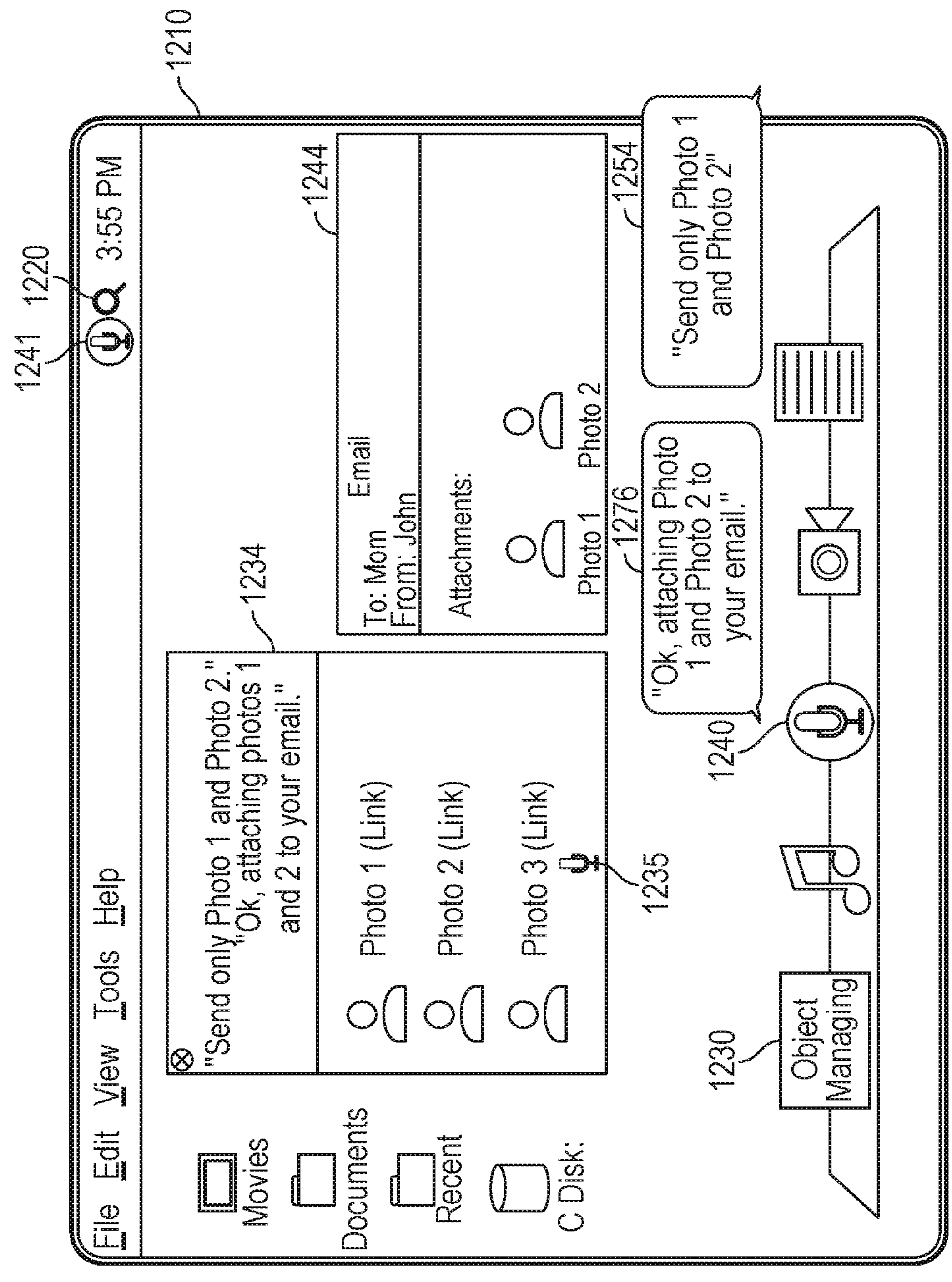

As illustrated in FIGS. 12C and 12D, in some examples, the digital assistant causes a process to perform additional tasks based on the user's additional speech inputs. For example, in view of the search result displayed in user interface 1234, the user may desire to send some, but not all, of the photos. The user provides a speech input 1254 such as "Send only Photo 1 and Photo 2." In some examples, the digital assistant receives speech input 1254 after the user selects affordance 1235 (e.g., a microphone icon displayed on user interface 1234). The digital assistant determines, based on speech input 1254 and context information, that the user intent is to send an email attaching only Photo 1 and Photo 2. In accordance with the user intent, the digital assistant causes the email process to remove Photo 3 from the email message. In some examples, the digital assistant provides a spoken output 1276, such as "OK, attaching Photo 1 and Photo 2 to your email," and displays the text corresponding to spoken output 1276 on user interface 1234.

Figure 13A:
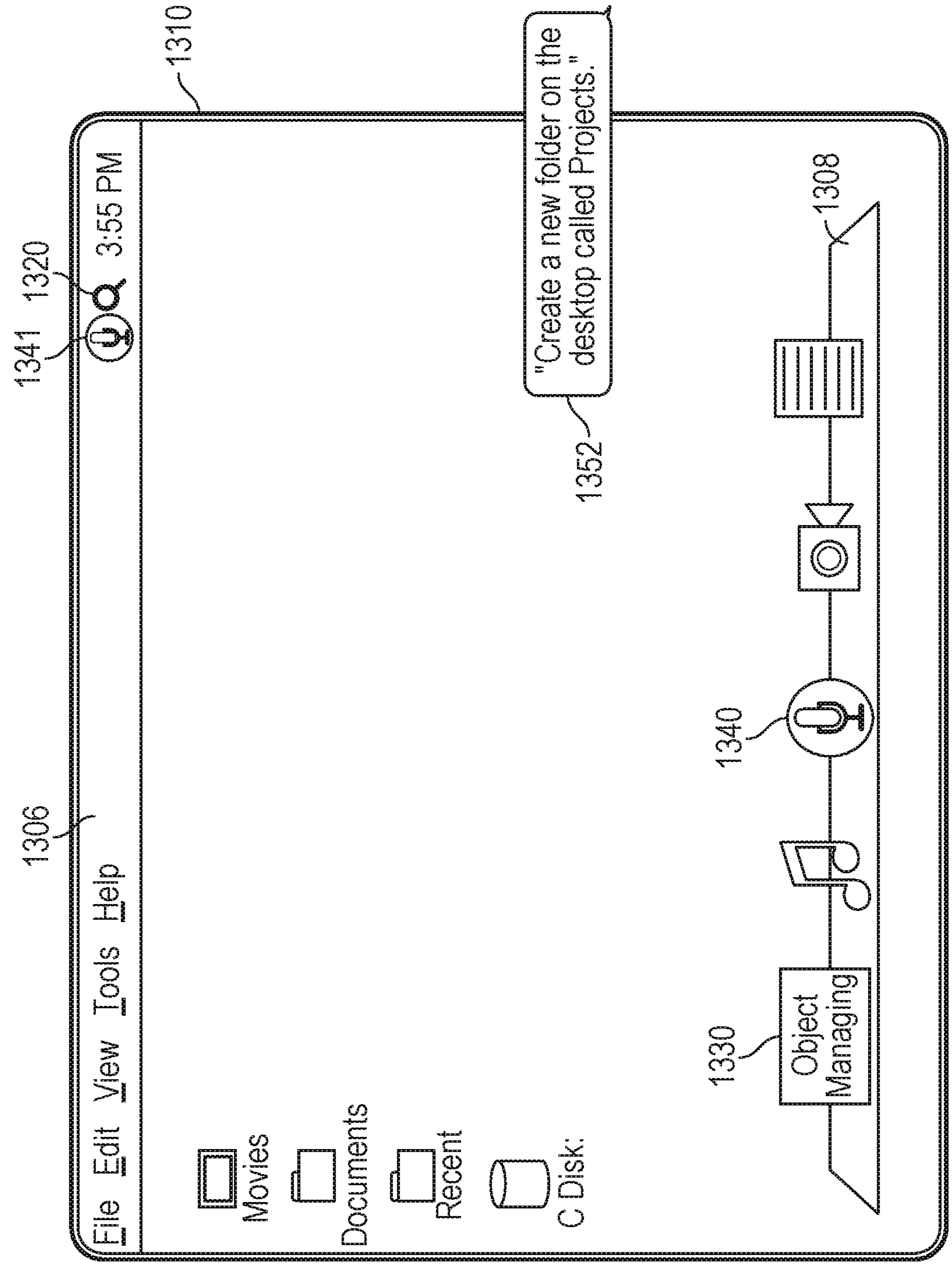
FIGS. 13A-13C illustrate functionalities of performing a task using an object managing process by a digital assistant according to various examples.

With reference to FIG. 13A, in some embodiments, in accordance with a determination that the task is not associated with searching, the digital assistant determines whether the task is associated with managing at least one object. As illustrated in FIG. 13A, for example, the digital assistant receives a speech input 1352 such as "Create a new folder on the desktop called Projects." Based on speech input 1352 and context information, the digital assistant determines that the user intent is to generate a new folder at the desktop with a folder name "Projects." The digital assistant further determines that the user intent is not associated with searching, and instead is associated with managing an object (e.g., a folder). Accordingly, the digital assistant determines that the user intent is to perform a task using the object managing process.

In some examples, in accordance with the determination that the user intent is to perform the task using the object managing process, the digital assistant performs the task using the object managing process. Performing the task using the object managing process can include, for example, creating at least one object (e.g., creating a folder or a file), storing at least one object (e.g., storing a folder, a file, or a communication), and compressing at least one object (e.g., compressing folders and files). Performing the task using the object managing process can further include, for example, copying or moving at least one object from a first physical or virtual storage to a second physical or virtual storage. For instance, the digital assistant instantiates an object managing process to cut and paste a file from the user device to a flash drive or a cloud drive.

Performing the task using the object managing process can further include, for example, deleting at least one object stored in a physical or virtual storage (e.g., deleting a folder or a file) and/or recovering at least one object stored at a physical or virtual storage (e.g., recovering a deleted folder or a deleted file). Performing the task using the object managing process can further include, for example, marking at least one object. In some examples, marking of an object can be visible or invisible. For example, the digital assistant can cause the object managing process to generate a "like" sign for a social media post, to tag an email, to mark a file, or the like. The marking may be visible by displaying, for example, a flag, a sign, or the like. The marking may also be performed with respect to the metadata of the object such that a storage (e.g., a memory) content of the metadata is varied. The metadata may or may not be visible.

Performing the task using the object managing process can further include, for example, backing up at least one object according to a predetermined time period for backing up or upon the user's request. For example, the digital assistant can cause the object managing process to instantiate a backup program (e.g., time machine program) to backup folders and files. The backup can be performed automatically according to a pre-determined schedule (e.g., once a day, a week, a month, or the like) or according to a user request.

Performing the task using the object managing process can further include, for example, sharing at least one object among one or more electronic devices communicatively connected to the user device. For example, the digital assistant can cause the object managing process to share a photo stored on the user device with another electronic device (e.g., the user's smartphone or tablet).

Figure 13B:
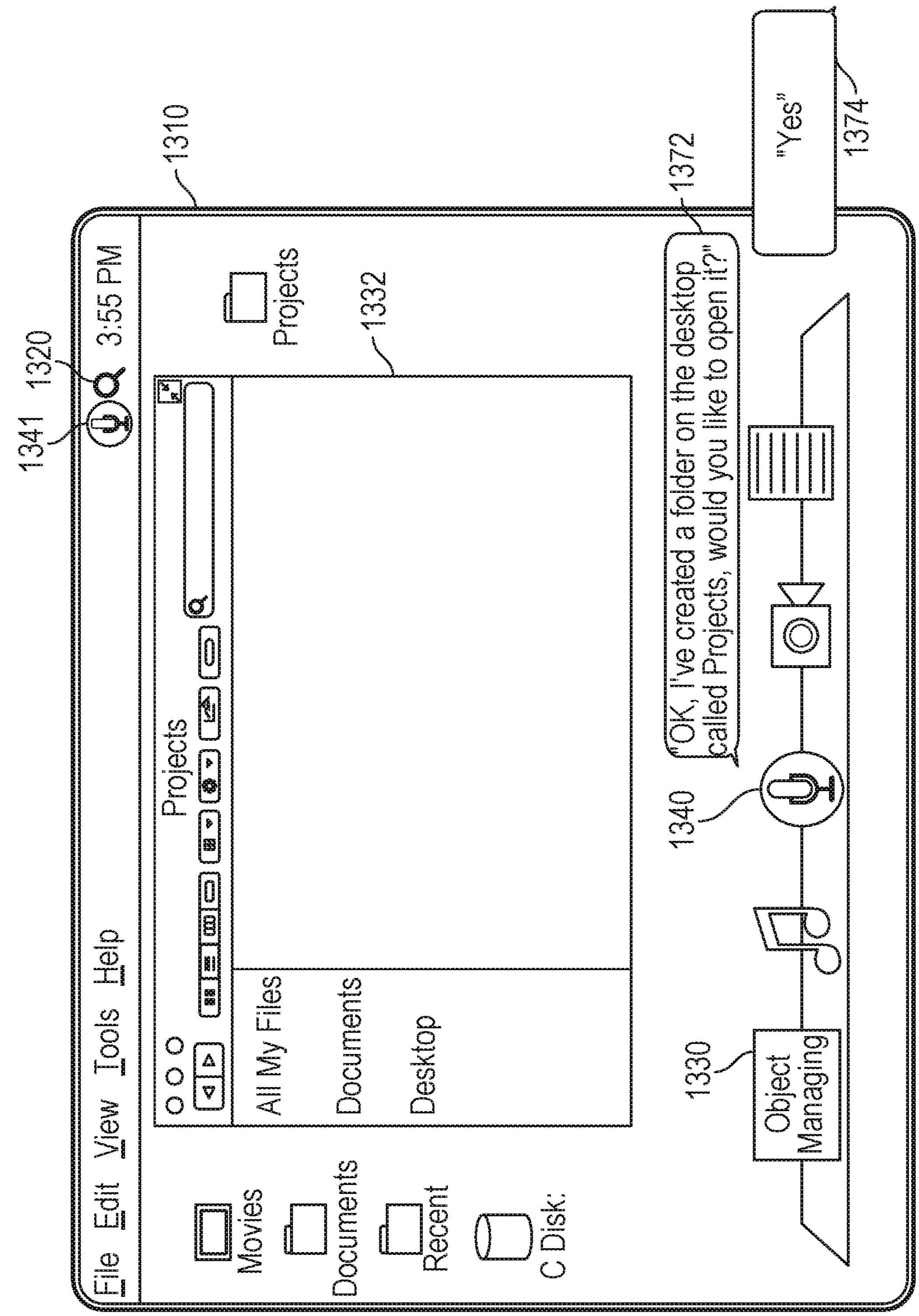

As illustrated in FIG. 13B, in accordance with the determination that the user intent is to perform the task using the object managing process, the digital assistant performs the task using the object managing process. For example, the digital assistant instantiates an object managing process to generate a folder named "Projects" on the desktop of user interface 1310. In some examples, the digital assistant can cause the object managing process to further open the folder either automatically or in response to an additional user input. For example, the digital assistant provides a spoken output 1372 such as "OK, I've created a folder on the desktop called Projects, would you like to open it?" The user provides a speech input 1374 such as "Yes." In response to the user's speech input 1374, the digital assistant causes the object managing process to open the Projects folder and display a user interface 1332 corresponding to the Projects folder.

Figure 13C:
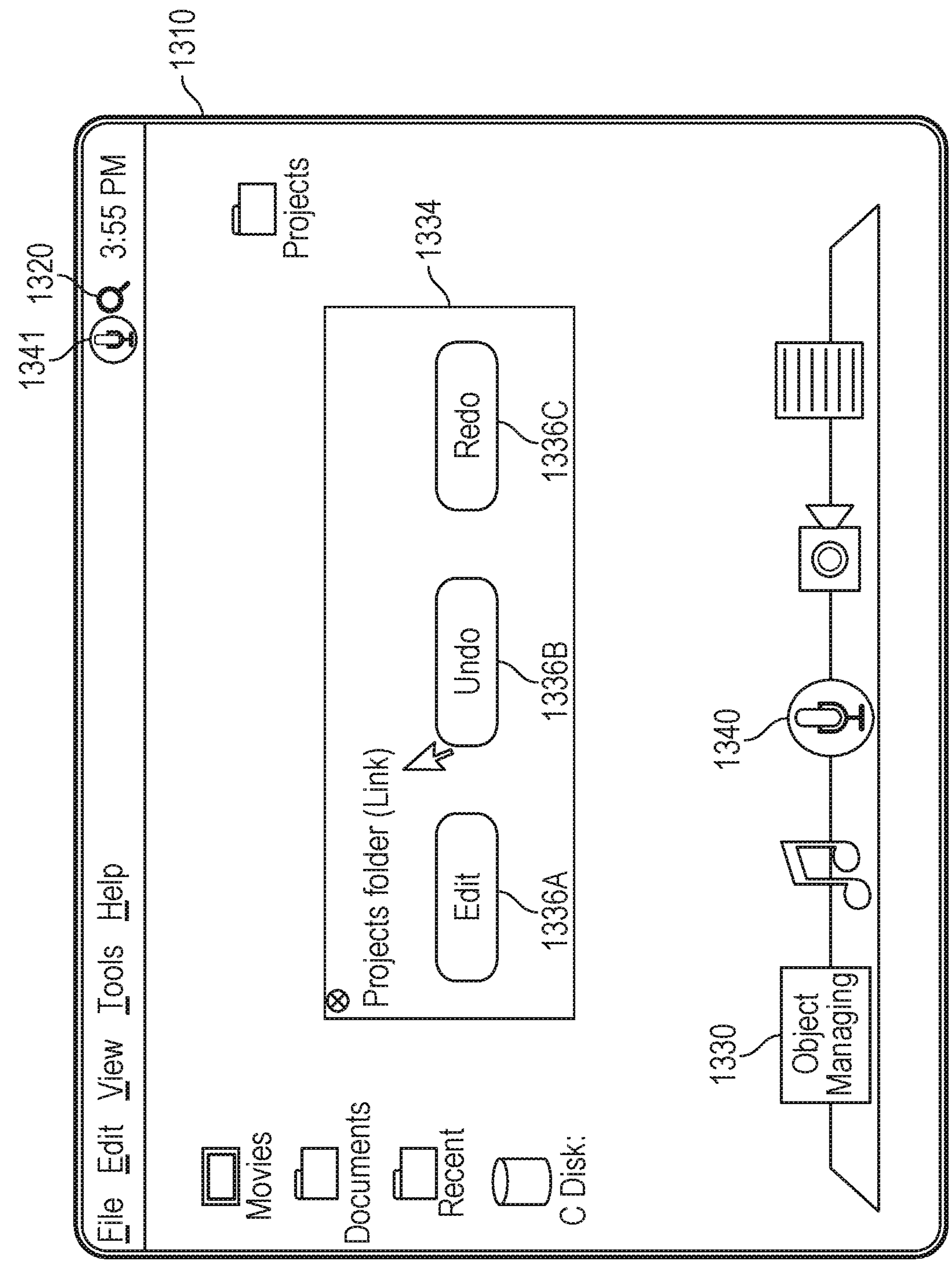

With reference to FIG. 13C, in some embodiments, the digital assistant provides one or more affordances that enable the user to manipulate the result of performing the task using the searching process or the object managing process. The one or more affordances include, for example, an edit button, a cancel button, a redo button, an undo button, or the like. For example, as shown in FIG. 13C, after generating the folder named "Projects" on the desktop, the digital assistant provides a user interface 1334, which displays an edit button 1336A, an undo button 1336B, and a redo button 1336C. In some examples, the edit button 1336A enables the user to edit one or more aspects of the object (e.g., edit the name of the Projects folder); the undo button 1336B enables the user to reverse the last task performed by the object managing process (e.g., delete the Projects folder); and the redo button 1336C enables the user to repeat the last task performed by the object managing process (e.g., creating another folder using the object managing process). It is appreciated that the digital assistant can provide any desired affordances to enable the user to perform any manipulation of the result of performing a task using the searching process or the object managing process.

As described, the digital assistant can determine whether the user intent is to perform a task using a searching process or an object managing process. In some examples, the digital assistant determines that the user intent is not associated with the searching process or the object managing process. For example, the user provides a speech input such as "start dictation." The digital assistant determines that the task of dictation is not associated with searching. In some examples, in accordance with a determination that the task is not associated with searching, the digital assistant further determines whether the task is associated with managing at least one object. For example, the digital assistant determines that the task of dictation is also not associated with managing an object, such as copying, moving, or deleting a file, a folder, or an email. In some examples, in accordance with a determination that the task is not associated with managing an object, the digital assistant determines whether the task can be performed using a process available to the user device. For example, the digital assistant determines that the task of dictation can be performed using a dictation process that is available to the user device. In some examples, the digital assistant initiates a dialog with the user with respect to performing the task using a process available to the user device. For example, the digital assistant provides a spoken output such as "OK, starting dictation." or "Would you like to dictate in this presentation you are working now?" After providing the spoken output, the digital assistant receives a response from the user, for example, confirming that the user intent is to dictate in the presentation the user is currently working on.

5. Exemplary Functions of a Digital Assistant—Continuity

FIGS. 14A-14D, 15A-15D, 16A-16C, and 17A-17E illustrate functionalities of performing a task at a user device or a first electronic device using remotely located content by a digital assistant. In some examples, the digital assistant system (e.g., digital assistant system 700) is implemented by a user device (e.g., devices 1400, 1500, 1600, and 1700) according to various examples. In some examples, the user device, a server (e.g., server 108), or a combination thereof, may implement a digital assistant system (e.g., digital assistant system 700). The user device can be implemented using, for example, device 104, 200, or 400. In some examples, the user device can be a laptop computer, a desktop computer, or a tablet computer. The user device operates in a multitasking environment, such as a desktop environment.

With references to FIGS. 14A-14D, 15A-15D, 16A-16C, and 17A-17E, in some examples, a user device (e.g., devices 1400, 1500, 1600, and 1700) provides various user interfaces (e.g., user interfaces 1410, 1510, 1610, and 1710). Similar to those described above, the user device displays the various user interfaces on a display, and the various user interfaces enable the user to instantiate one or more processes (e.g., a movie process, a photo process, a web-browsing process.

As shown in FIGS. 14A-14D, 15A-15D, 16A-16C, and 17A-17E, similar to those described above, the user device (e.g., devices 1400, 1500, 1600, and 1700) displays, on a user interface (e.g., user interfaces 1410, 1510, 1610, and 1710) an affordance (e.g., affordance 1440, 1540, 1640, and 1740) to instantiate a digital assistant service. Similar to those described above, in some examples, the digital assistant is instantiated in response to receiving a pre-determined phrase. In some examples, the digital assistant is instantiated in response to receiving a selection of the affordance.

With reference to FIGS. 14A-14D, 15A-15D, 16A-16C, and 17A-17E, in some embodiments, a digital assistant receives one or more speech inputs, such as speech inputs 1452, 1454, 1456, 1458, 1552, 1554, 1556, 1652, 1654, 1656, 1752, and 1756 from a user. The user may provide various speech inputs for the purpose of, for example, performing a task at the user device (e.g., devices 1400, 1500, 1600, and 1700) or at a first electronic device (e.g., electronic devices 1420, 1520, 1530, 1522, 1532, 1620, 1622, 1630, 1720, and 1730) using remotely located content. Similar to those described above, in some examples, the digital assistant can receive speech inputs directly from the user at the user device or indirectly through another electronic device that is communicatively connected to the user device.

With reference to FIGS. 14A-14D, 15A-15D, 16A-16C, and 17A-17E, in some embodiments, the digital assistant identifies context information associated with the user device. The context information includes, for example, user-specific data, sensor data, and user device configuration data. In some examples, the user-specific data includes log information indicating user preferences, the history of user's interaction with the user device (e.g., devices 1400, 1500, 1600, and 1700), and/or electronic devices communicative connected to the user device, or the like. For example, user-specific data indicates that the user recently took a self-portrait photo using an electronic device 1420 (e.g., a smartphone), that the user recently accessed a podcast, webcast, movie, song, audio book, or the like. In some examples, the sensor data includes various data collected by a sensor associated with the user device or other electronic devices. For example, the sensor data includes GPS location data indicating the physical location of the user device or electronic devices communicatively connected to the user device at any time point or during any time period. For example, the sensor data indicates that a photo stored in electronic device 1420 was taken at Hawaii. In some examples, the user device configuration data includes the current or historical device configurations. For example, the user device configuration data indicates that the user device is currently communicatively connected to some electronic devices but disconnected from other electronic devices. The electronic devices includes, for example, a smartphone, a set-top box, a tablet, or the like. As described in more detail below, the context information can be used in determining a user intent and/or in performing one or more tasks.

With reference to FIGS. 14A-14D, 15A-15D, 16A-16C, and 17A-17E, similar to those described above, in response to receiving a speech input, the digital assistant determines a user intent based on the speech input. The digital assistant determines the user intent based on a result of natural language processing. For example, the digital assistant identifies an actionable intent based on the user input, and generates a structured query to represent the identified actionable intent. The structured query includes one or more parameters associated with the actionable intent. The one or more parameters can be used to facilitate the performance of a task based on the actionable intent. For example, based on a speech input such as "show the selfie I just took," the digital assistant determines that the actionable intent is to display a photo, and the parameters include a self-portrait that the user recently took during the past few days. In some embodiments, the digital assistant further determines the user intent based on the speech input and context information. For example, the context information indicates that the user device is communicatively connected to the user's phone using a Bluetooth connection and indicates that a self-portrait photo was added to the user's phone two days ago. As a result, the digital assistant determines that the user intent is to display a photo that is a self-portrait that was added to the user's phone two days ago. Determining the user intent based on speech input and context information is described in more detail below in various examples.

In some embodiments, in accordance with user intent, the digital assistant further determines whether the task is to be performed at the user device or at a first electronic device communicatively connected to the user device. Various examples of the determination are provided below in more detail with respect to FIGS. 14A-14D, 15A-15D, 16A-16C, and 17A-17E.

Figure 14A:
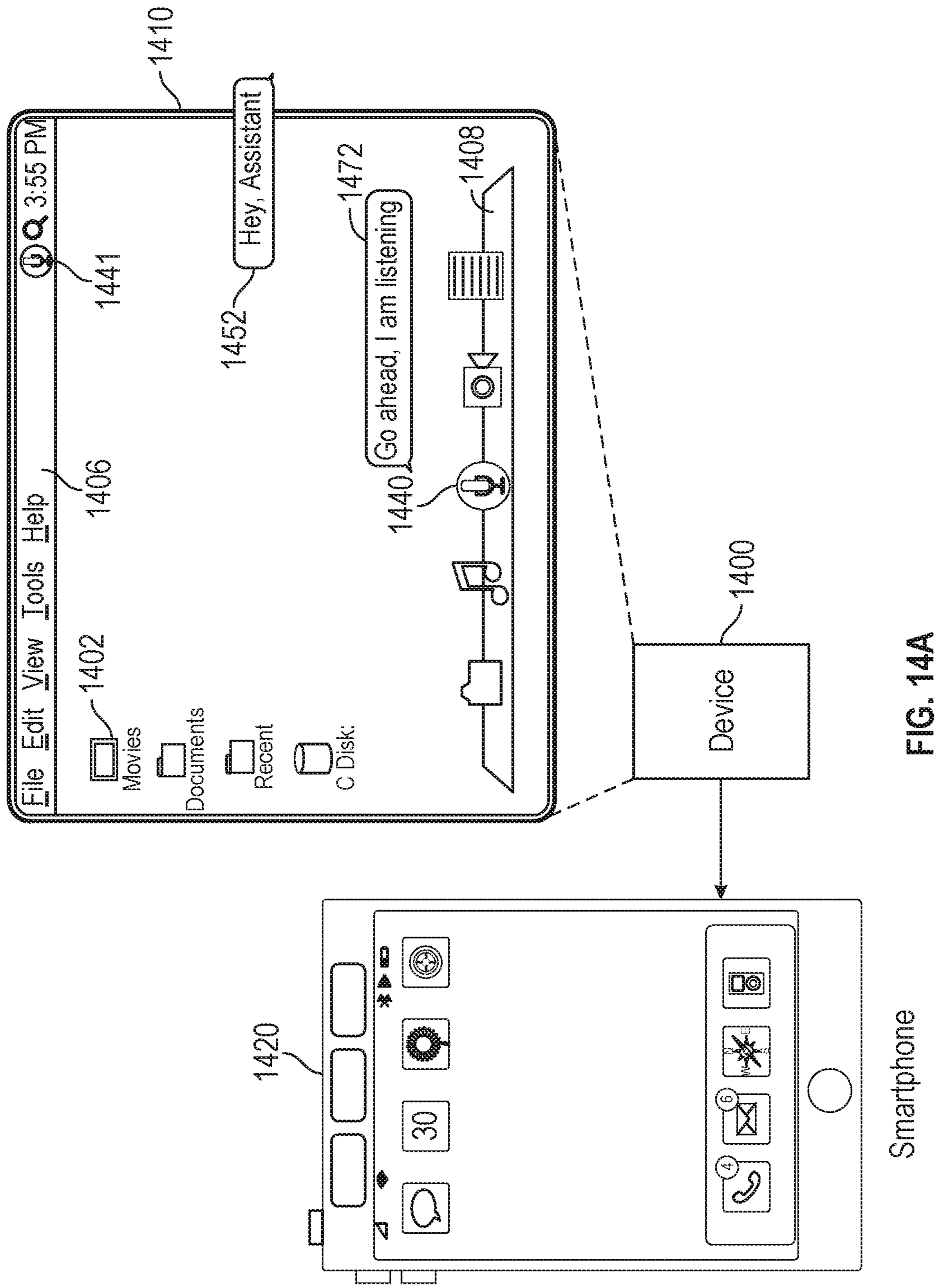
FIGS. 14A-14D illustrate functionalities of performing a task at a user device using remotely located content by a digital assistant according to various examples.

With reference to FIG. 14A, in some examples, user device 1400 receives a speech input 1452 from a user to invoke the digital assistant. As shown in FIG. 14A, in some examples, the digital assistant is represented by affordances 1440 or 1441 displayed on user interface 1410. Speech input 1452 includes, for example, "Hey, Assistant." in response to speech input 1452, user device 1400 invokes the digital assistant such that the digital assistant actively monitors subsequent speech inputs. In some examples, the digital assistant provides a spoken output 1472 indicating that it is invoked. For example, spoken output 1472 includes "Go ahead, I am listening." As shown in FIG. 14A, in some examples, user device 1400 is communicatively connected to one or more electronic devices such as electronic device 1420. Electronic device 1420 can communicate with user device 1400 using wired or wireless networks. For example, electronic device 1420 communicates with user device 1400 using Bluetooth connections such that voice and data (e.g., audio and video files) can be exchanged between the two devices.

Figure 14B:
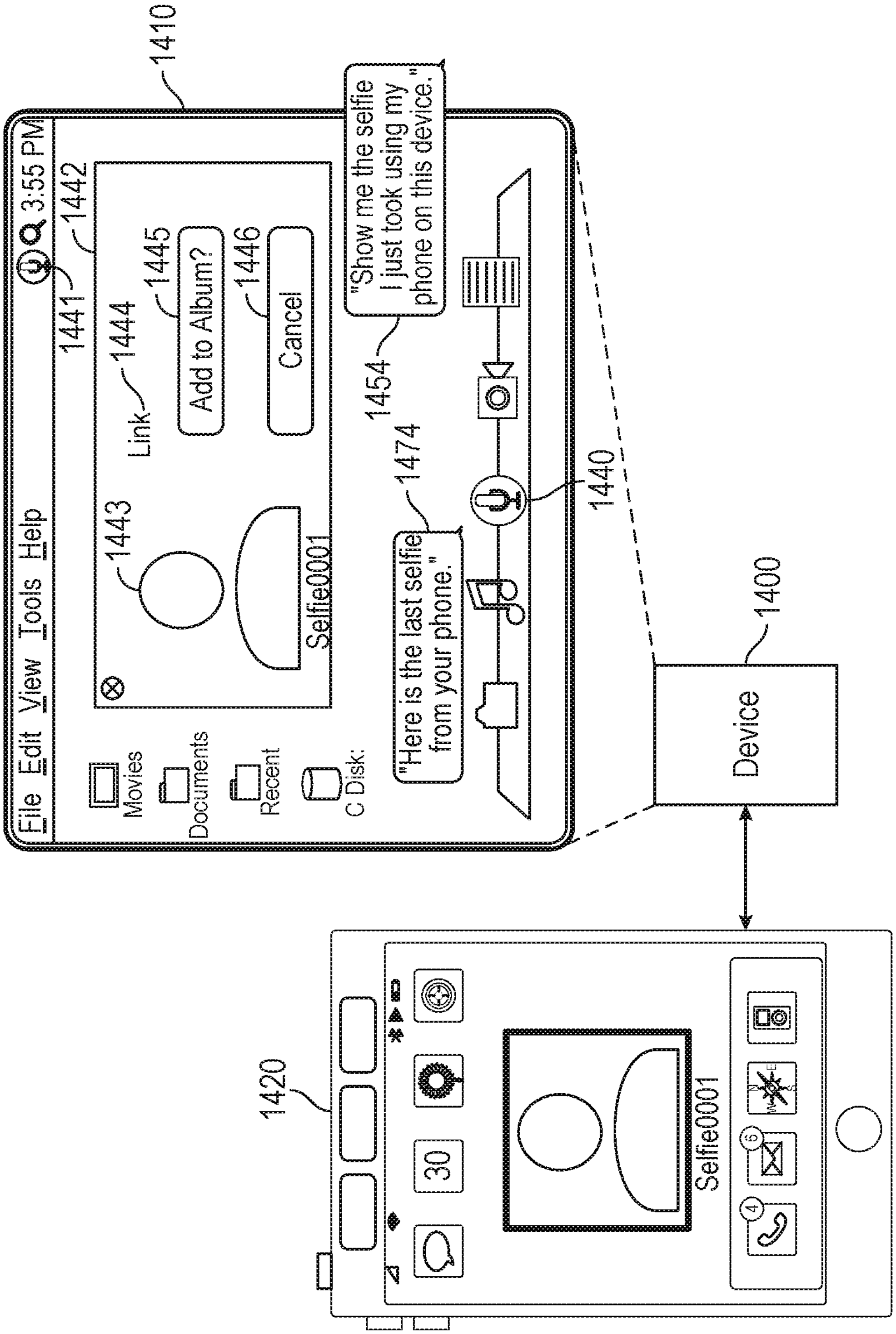

With reference to FIG. 14B, in some examples, the digital assistant receives a speech input 1454 such as "Show me the selfie I just took using my phone on this device." Based on speech input 1454 and/or context information, the digital assistant determines the user intent. For example, as shown in FIG. 14B, context information indicates that the user device 1400 is communicatively connected to electronic device 1420 using wired or wireless networks (e.g., a. Bluetooth connection, a Wi-Fi connection, or the like). Context information also indicates that the user recently took a self-portrait, which is stored in electronic device 1420 with a name "selfie0001." As a result, the digital assistant determines that the user intent is to display the photo named selfie0001 stored in electronic device 1420. Alternatively, the photo may have been tagged with photo recognition software as containing the user's face and be identified accordingly.

As described, in accordance with the user intent, the digital assistant further determines whether the task is to be performed at the user device or at a first electronic device communicatively connected to the user device. In some embodiments, determining whether the task is to be performed at the user device or at the first electronic device is based on one or more keywords included in the speech input. For example, the digital assistant determines that speech input 1454 includes keywords or a phrase such as "on this device," indicating the task is to be performed on user device 1400. As a result, the digital assistant determines that displaying the photo named selfie0001 stored in electronic device 1420 is to be performed at user device 1400. User device 1400 and electronic device 1420 are different devices. For example, user device 1400 can be a laptop computer, and electronic device 1420 can be a phone.

In some embodiments, the digital assistant further determines whether the content associated with the performance of the task is located remotely. Content is located remotely if at or near the time the digital assistant determines which device is to perform the task, at least a portion of the content for performing the task is not stored in the device that is determined to perform the task. For example, as shown in FIG. 14B, at or near the time the digital assistant of user device 1400 determines that the user intent is to display the photo named selfie0001 at user device 1400, the photo named selfie0001 is not stored at user device 1400 and instead is stored at electronic device 1420 (e.g., a smartphone). Accordingly, the digital assistant determines that the photo is located remotely to user device 1400.

As illustrated in FIG. 14B, in some embodiments, in accordance with a determination that the task is to be performed at the user device and content for performing the task is located remotely, the digital assistant of the user device receives the content for performing the task. In some examples, the digital assistant of the user device 1400 receives at least a portion of the content stored in the electronic device 1420. For example, to display the photo named selfie0001, the digital assistant of user device 1400 sends a request to electronic device 1420 to obtain the photo named selfie0001. Electronic device 1420 receives the request and, in response, transmits the photo named selfie0001 to user device 1400. The digital assistant of user device 1400 then receives the photo named selfie0001.

As illustrated in FIG. 14B, in some embodiments, after receiving the remotely located content, the digital assistant provides a response at the user device. In some examples, providing a response includes performing the task using the received content. For example, the digital assistant of user device 1400 displays a user interface 1442 (e.g., a snippet or a window) providing a view 1443 of the photo named selfie0001. View 1443 can be a preview (e.g., a thumbnail), an icon, or a full view of the photo named selfie0001.

In some examples, providing a response includes providing a link that is associated with the task to be performed at the user device. A link enables instantiating of a process. As described, instantiating a process includes invoking the process if the process is not already running. If at least one instance of the process is running, instantiating a process includes executing an existing instance of the process or generating a new instance of the process. As shown in FIG. 14B, user interface 1442 may provide a link 1444 associated with view 1443 of the photo named selfie0001. Link 1444 enables, for example, instantiating a photo process to view a full representation of the photo or edit the photo. As an example, link 1444 is displayed on the side of view 1443. As another example, view 1443 can itself include or incorporate link 1444 such that a selection of view 1443 instantiates a photo process.

In some embodiments, providing a response includes providing one or more affordances that enable the user to further manipulate the results of the performance of the task. As shown in FIG. 14B, in some examples, the digital assistant provides affordances 1445 and 1446 on user interface 1442 (e.g., a snippet or a window). Affordance 1445 can include a button for adding a photo to an album, and affordance 1446 can include a button for canceling view 1443 of the photo. The user may select one or both of affordances 1445 and 1446. In response to the selection of affordance 1445, for example, a photo process adds the photo associated with view 1443 to an album. In response to the selection of affordance 1446, for example, a photo process removes view 1443 from user interface 1442.

In some embodiments, providing a response includes providing a spoken output according to the task to be performed at the user device. As illustrated in FIG. 14B, the digital assistant represented by affordances 1440 or 1441 provides a spoken output 1474 such as "Here is the last selfie from your phone."

Figure 14C:
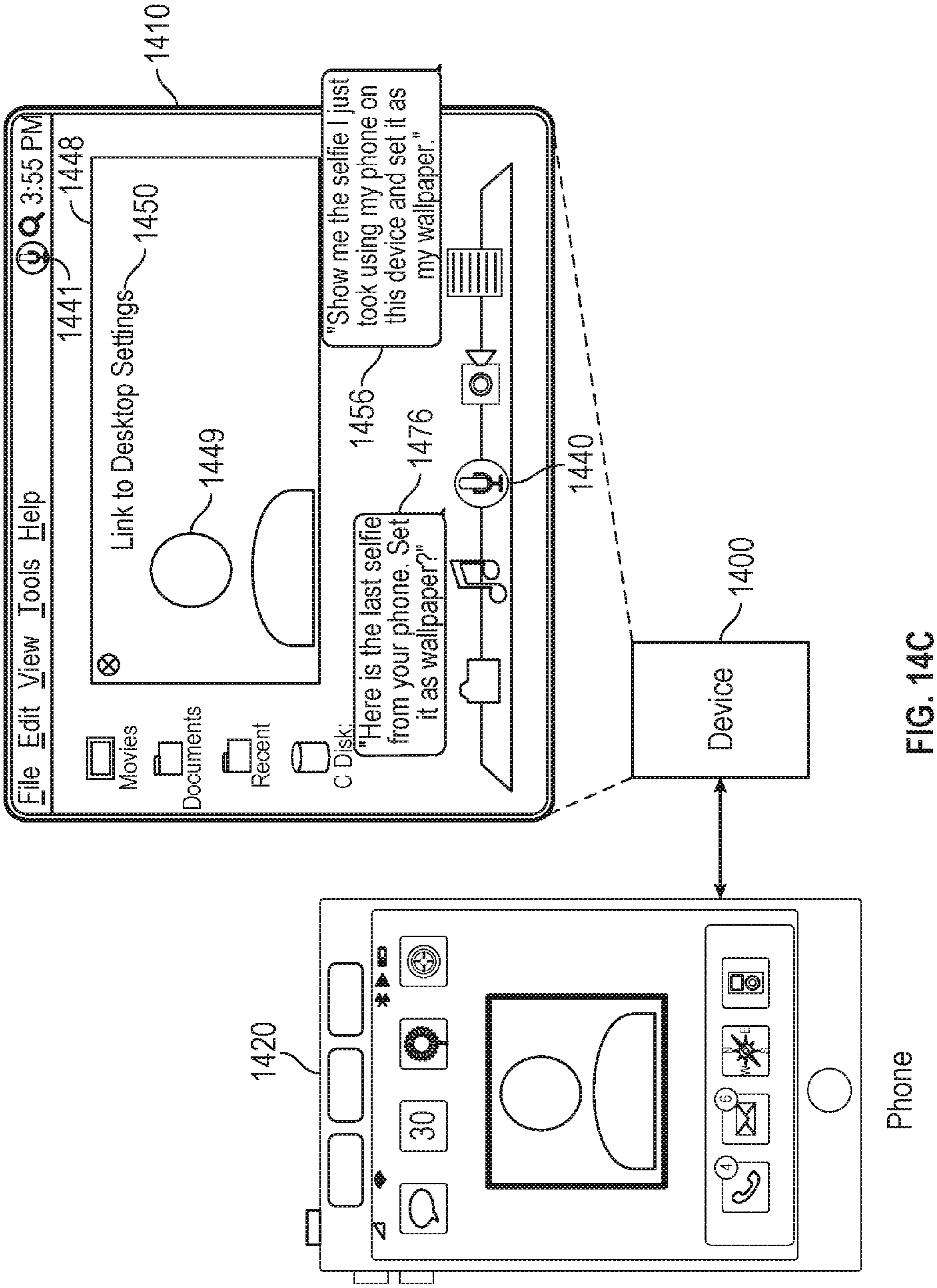

With reference to FIG. 14C, in some examples, based on a single speech input/utterance and context information, the digital assistant determines that the user intent is to perform a plurality of tasks. As shown in FIG. 14C, the digital assistant receives a speech input 1456 such as "Show me the selfie I just took using my phone on this device and set it as my wallpaper." Based on speech input 1456 and context information, the digital assistant determines that the user intent is to perform a first task of displaying the photo named selfie0001 stored at electronic device 1420 and performs a second task of setting the photo named selfie0001 as the wallpaper. Thus, based on a single speech input 1456, the digital assistant determines that the user intent is to perform multiple tasks.

In some embodiments, the digital assistant determines whether the plurality of tasks is to be performed at the user device or at an electronic device communicatively connected to the user device. For example, using the keywords "this device" included in speech input 1456, the digital assistant determines that the plurality of tasks is to be performed at user device 1400. Similar to those described above, the digital assistant further determines whether the content for performing at least one task is located remotely. For example, the digital assistant determines that the content for performing at least the first task (e.g., displaying the photo named selfie0001) is located remotely. In some embodiments, in accordance with a determination that the plurality of tasks is to be performed at the user device and content for performing at least one task is located remotely, the digital assistant requests the content from another electronic device (e.g., electronic device 1420), receives the content for performing the tasks, and provides a response at the user device.

In some embodiments, providing a response includes performing the plurality of tasks. For example, as illustrated in FIG. 14C, providing a response includes performing the first task of displaying a view 1449 of the photo named selfie0001, and performing the second task of setting the photo named selfie0001 as the wallpaper. In some examples, the digital assistant automatically configures the wallpaper to be the photo named selfi0001 using a desktop settings configuration process. In some examples, the digital assistant provides a link to desktop settings 1450, enabling the user to manually configure the wallpaper using the photo named selfie0001. For example, the user may select the link to desktop settings 1450 by using an input device such as a mouse, a stylus, or a finger. Upon receiving the selection of the link to desktop setting 1450, the digital assistant initiates the desktop setting configuration process that enables the user to select the photo named selfie0001 and set it as the wallpaper of user device 1400.

As illustrated in FIG. 14C, in some examples, the digital assistant initiates a dialog with the user and facilitates the configuration of the wallpaper in response to receiving a speech input from the user. For example, the digital assistant provides a spoken output 1476 such as "Here is the last selfie from your phone. Set is as wallpaper?" The user provides a speech input such as "OK." Upon receiving the speech input, the digital assistant instantiates the desktop settings configuration process to configure the wallpaper as the photo named selfie0001.

Figure 14D:
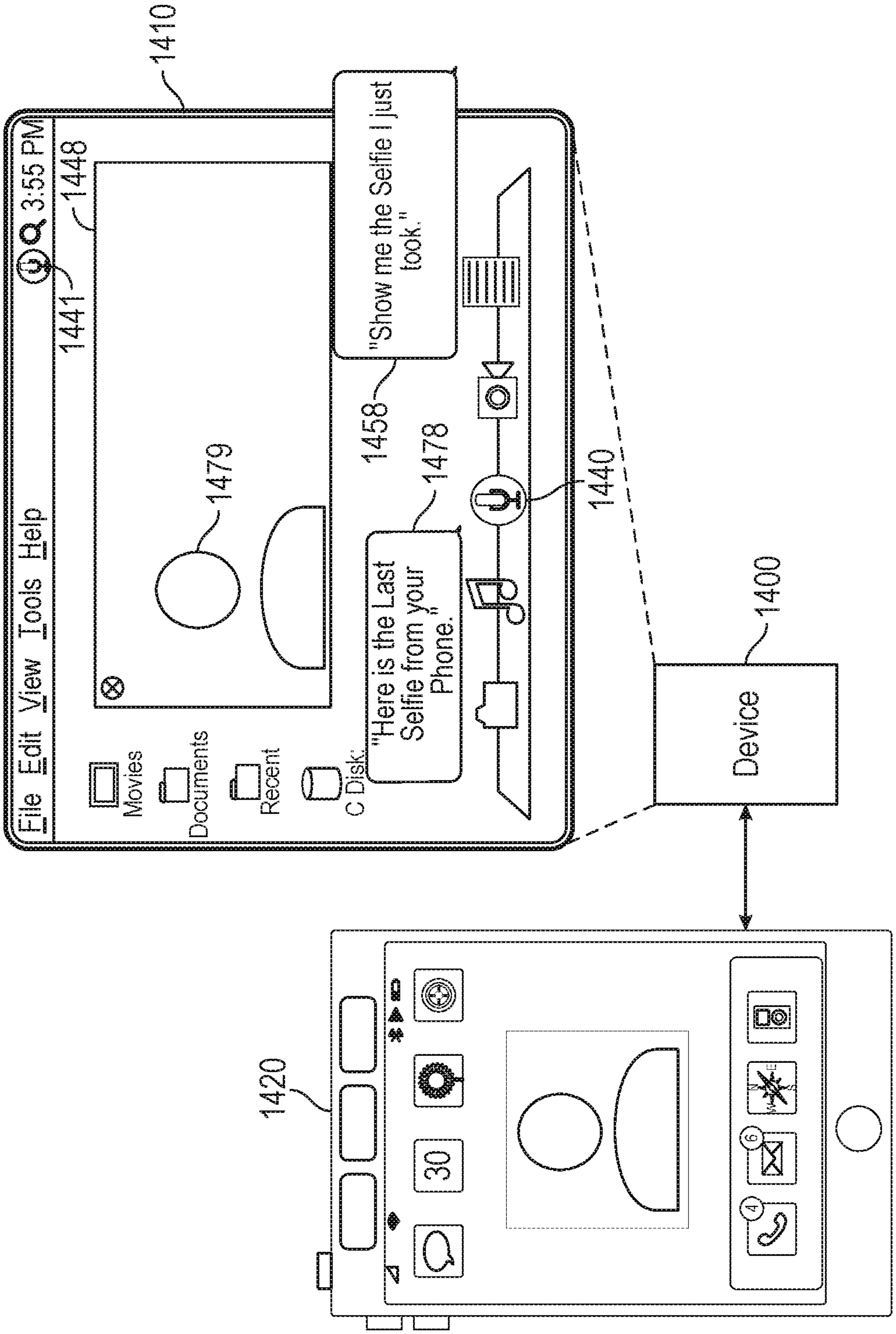

As described, in some examples, the digital assistant determines the user intent based on the speech input and context information. With reference to FIG. 14D, in some examples, the speech input may not include information sufficient to determine the user intent. For example, the speech input may not indicate the location of the content for performing the task. As shown in FIG. 14D, the digital assistant receives a speech input 1458 such as "Show me the selfie I just took." Speech input 1458 does not include one or more keywords indicating which photo is to be displayed or the location of the selfie to be displayed. As a result, the user intent may not be determined based solely on speech input 1458. In some examples, the digital assistant determines the user intent based on speech input 1458 and context information. For example, based on context information, the digital assistant determines that user device 1400 is communicatively connected to electronic device 1420. In some examples, the digital assistant instantiates a searching process to search for photos that the user recently took at user device 1400 and electronic device 1420. Based on the search result, the digital assistant determines that a photo named selfie0001 is stored in electronic device 1420. Accordingly, the digital assistant determines that the user intent is to display the photo named selfie0001 located at electronic device 1420. In some examples, if the user intent cannot be determined based on the speech input and context information, the digital assistant initiates a dialog with the user to further clarify or disambiguate the user intent.

As illustrated in FIG. 141), in some examples, the speech input may not include one or more keywords indicating whether a task is to be performed at the user device or at an electronic device communicatively connected to the user device. For example, speech input 1458 does not indicate whether the task of displaying the selfie is to be performed at user device 1400 or at electronic device 1420. In some examples, the digital assistant determines whether a task is to be performed at the user device or at an electronic device based on context information. As an example, the context information indicates that the digital assistant receives speech input 1458 at user device 1400, not at electronic device 1420. As a result, the digital assistant determines that the task of displaying the selfie is to be performed at user device 1400. As another example, context information indicates that a photo is to be displayed on electronic device 1420 according to user preferences. As a result, the digital assistant determines that the task of displaying the selfie is to be performed at electronic device 1420. It is appreciated that the digital assistant can determine whether a task is to be performed at the user device or at an electronic device based on any context information.

Figure 15A:
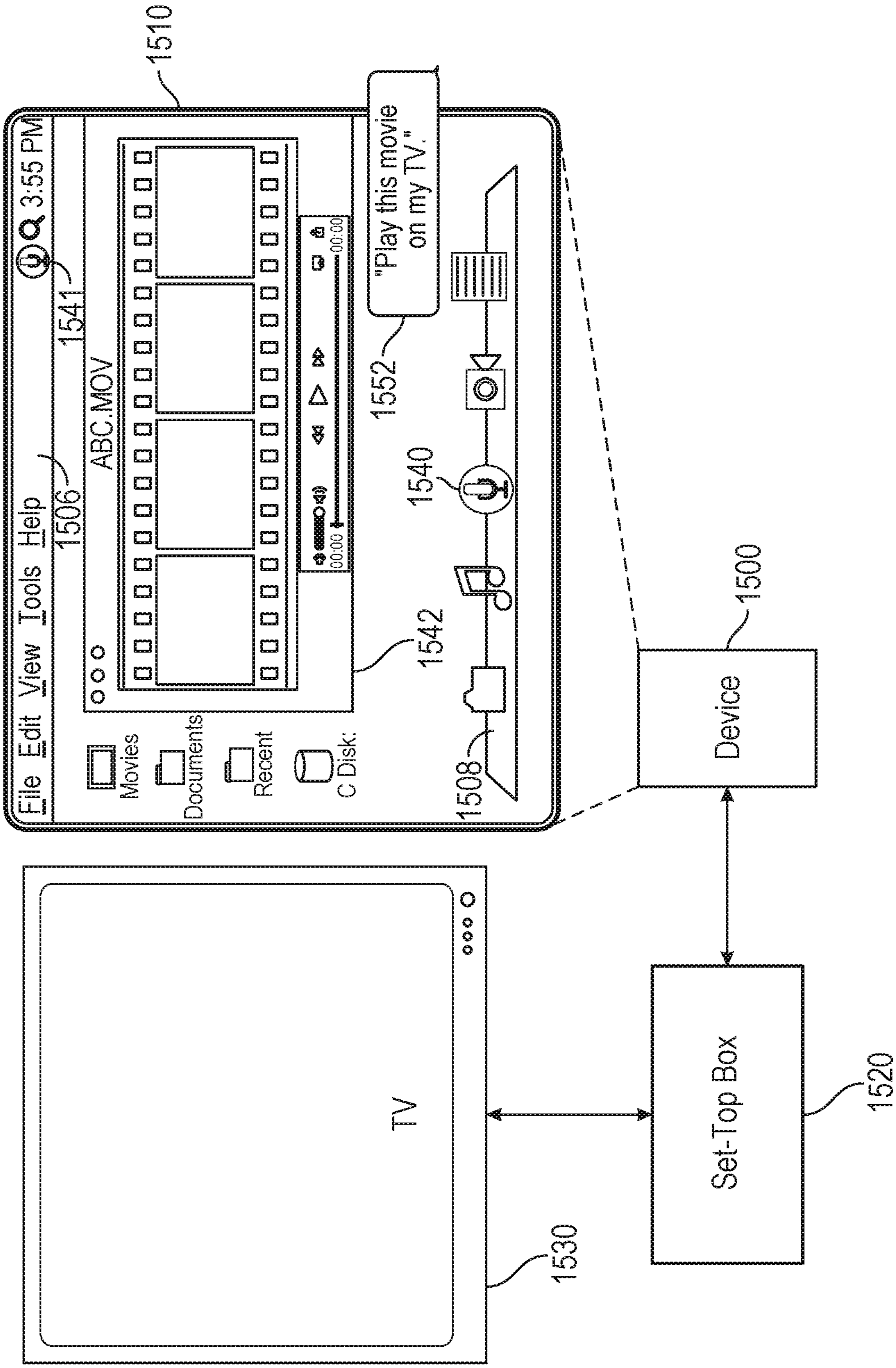
FIGS. 15A-15D illustrate functionalities of performing a task at a first electronic device using remotely located content by a digital assistant according to various examples.

With reference to FIG. 15A, in some embodiments, a digital assistant determines that the task is to be performed at an electronic device (e.g., electronic device 1520 and/or 1530) communicatively connected to the user device (e.g., user device 1500) and determine that the content is located remotely to the electronic device. As shown in FIG. 15A, in some examples, the digital assistant receives a speech input 1552 such as "Play this movie on my TV." As described, the digital assistant can determine the user intent based on speech input 1552 and context information. For example, context information indicates that user interface 1542 is displaying a movie named ABC.mov. As a result, the digital assistant determines that the user intent is to play the movie named ABC.mov.

In accordance with the user intent, the digital assistant furthers determine whether the task is to be performed at the user device or at a first electronic device communicatively connected to the user device. In some embodiments, determining whether the task is to be performed at the user device or at the first electronic device is based on one or more keywords included in the speech input. For example, speech input 1552 includes the words or phrase "on my TV." In some examples, context information indicates that user device 1500 is connected to a set-top box 1520 and/or a TV 1530 using, for example, a wired connection, a Bluetooth connection, or a Wi-Fi connection. As a result, the digital assistant determines that the task of playing the movie named ABC.mov is to be performed on set-top box 1520 and/or TV 1530.

In some embodiments, the digital assistant further determines whether the content associated with the performance of the task is located remotely. As described, content is located remotely if at or near the time the digital assistant determines which device is to perform the task, at least a portion of the content for performing the task is not stored in the device that is determined to perform the task. For example, as shown in FIG. 15A, at or near the time the digital assistant of user device 1500 determines that movie ABC.mov is to be played at set-top box 1520 and/or TV 1530, at least a portion of the movie ABC.mov is stored at user device 1500 (e.g., a laptop computer) and/or a server (not shown) and is not stored at set-top box 1520 and/or TV 1530. Accordingly, the digital assistant determines that the movie ABC.mov is located remotely to set-top box 1520 and/or TV 1530.

Figure 15B:
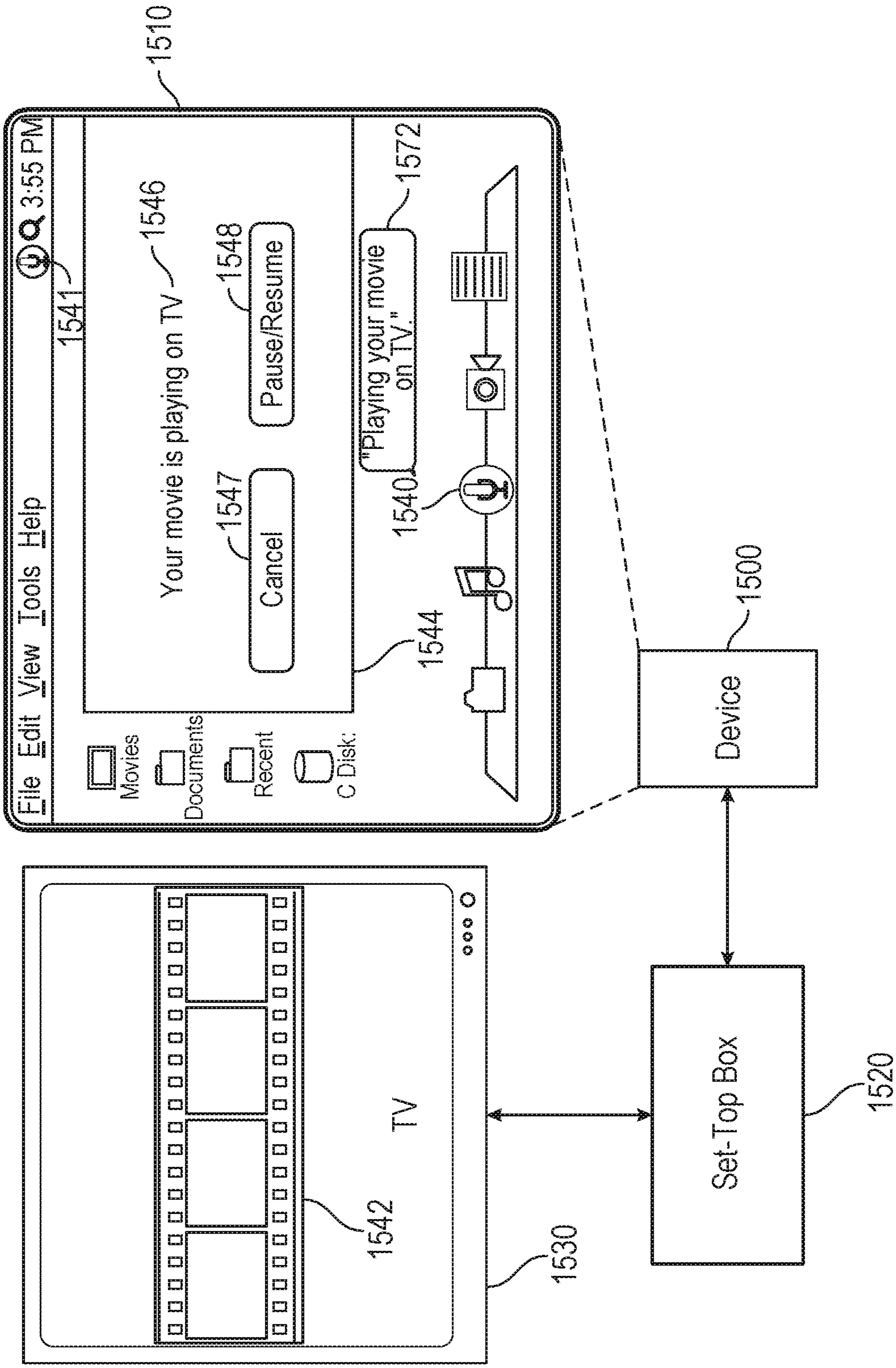

With reference to FIG. 15B, in accordance with a determination that the task is to be performed at the first electronic device (e.g., set-top box 1520 and/or TV 1530) and the content for performing the task is located remotely to the first electronic device, the digital assistant of the user device provides the content to the first electronic device to perform the task. For example, to play the movie ABC.mov on set-top box 1520 and/or TV 1530, the digital assistant of user device 1500 transmits at least a portion of the movie ABC.mov to set-top box 1520 and/or TV 1530.

In some examples, instead of providing the content from the user device, the digital assistant of the user device causes at least a portion of the content to be provided from another electronic device (e.g., a server) to the first electronic device to perform the task. For example, the movie ABC.mov is stored in a server (not shown) and not at user device 1500. As a result, the digital assistant of user device 1500 causes at least a portion of the movie named ABC.mov to be transmitted from the server to set-top box 1520 and/or TV 1530. In some examples, the content for performing the task is provided to set-top box 1520, which then transmits the content to TV 1530. In some examples, the content for performing the task is provided to TV 1530 directly.

As illustrated in FIG. 15B, in some examples, after the content is provided to the first electronic device (e.g., set-top box 1520 and/or TV 1530), the digital assistant of user device 1500 provides a response at user device 1500. In some examples, providing the response includes causing the task to be performed at set-top box 1520 and/or TV 1530 using the content. For example, the digital assistant of user device 1500 sends a request to set-top box 1520 and/or TV 1530 to initiate a multimedia process to play the movie ABC.mov. In response to the request, set-top box 1520 and/or TV 1530 initiates the multimedia process to play the movie ABC.mov.

In some examples, the task to be performed at the first electronic device (e.g., set-top box 1520 and/or TV 1530) is a continuation of a task performed remotely to the first electronic device. For example, as illustrated in FIGS. 15A and 15B, the digital assistant of user device 1500 has caused a multimedia process of user device 1500 to play a portion of the movie ABC.mov at user device 1500. In accordance with the determination that the user intent is to play the movie ABC.mov at the first electronic device (e.g., set-top box 1520 and/or TV 1530), the digital assistant of user device 1500 causes the first electronic device to continue playing the rest of the movie ABC.mov rather than start playing from the beginning. As a result, the digital assistant of user device 1500 enables the user to continuously watch the movie.

As illustrated in FIG. 15B, in some embodiments, providing a response includes providing one or more affordances that enable the user to further manipulate the results of the performance of the task. As shown in FIG. 15B, in some examples, the digital assistant provides affordances 1547 and 1548 on a user interface 1544 (e.g., a snippet or a window). Affordance 1547 can be a button for cancelling the playing of movie ABC.mov on the first electronic device (e.g., set-top box 1520 and/or TV 1530). Affordance 1548 can be a button to pause or resume the playing of movie ABC.mov that is playing on the first electronic device. The user may select affordance 1547 or 1548 using an input device such as a mouse, a stylus, or a finger. Upon receiving a selection of affordance 1547, for example, the digital assistant causes the playing of movie ABC.mov on the first electronic device to stop. In some examples, after the playing on the first electronic device stops, the digital assistant also causes the playing of movie ABC.mov on user device 1500 to resume. Upon receiving a selection of affordance 1548, for example, the digital assistant causes the playing of movie ABC.mov on the first electronic device to pause or resume.

In some embodiments, providing a response includes providing a spoken output according to the task to be performed at the first electronic device. As illustrated in FIG. 15B, the digital assistant represented by affordance 1540 or 1541 provides a spoken output 1572 such as "Playing your movie on TV."

Figure 15C:
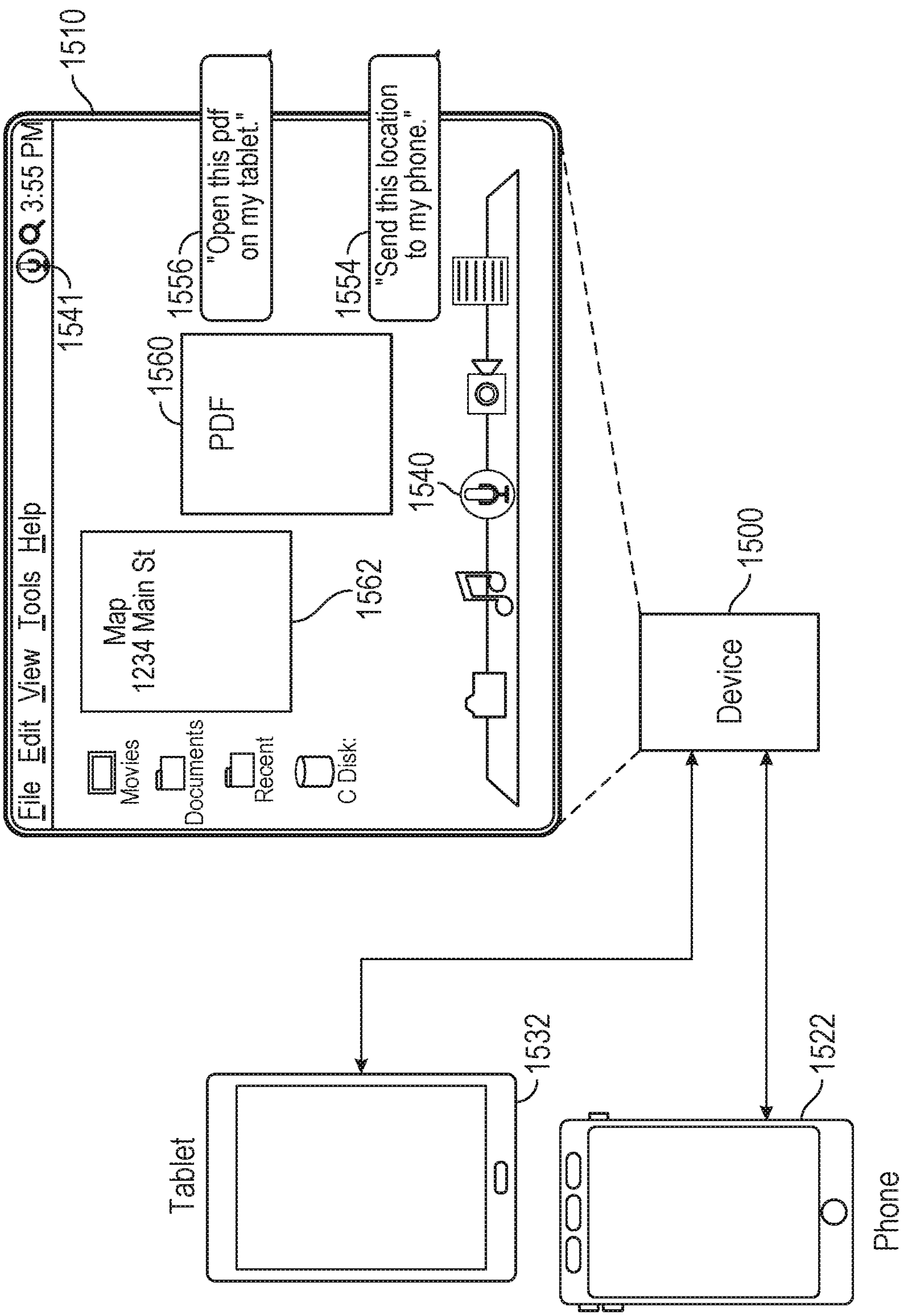

As described, in accordance with a determination that the task is to be performed at a first electronic device and the content for performing the task is located remotely to the first electronic device, the digital assistant provides the content for performing the task to the first electronic device. With reference to FIG. 15C, the content for performing the task can include, for example, a document (e.g., document 1560) or location information. For instance, the digital assistant of user device 1500 receives a speech input 1556 such as "Open this pdf on my tablet." The digital assistant determines that the user intent is to perform a task of displaying document 1560 and determines that the task is to be performed at a tablet 1532 that is communicatively connected to user device 1500. As a result, the digital assistant provides document 1560 to tablet 1532 to be displayed. As another example, the digital assistant of user device 1500 receives a speech input 1554 such as "Send this location to my phone." The digital assistant determines that the user intent is to perform a task of navigation using the location information and determines that the task is to be performed at phone 1522 (e.g., a smartphone) that is communicatively connected to user device 1500. As a result, the digital assistant provides location information (e.g., 1234 Main St.) to phone 1522 to perform the task of navigation.

Figure 15D:
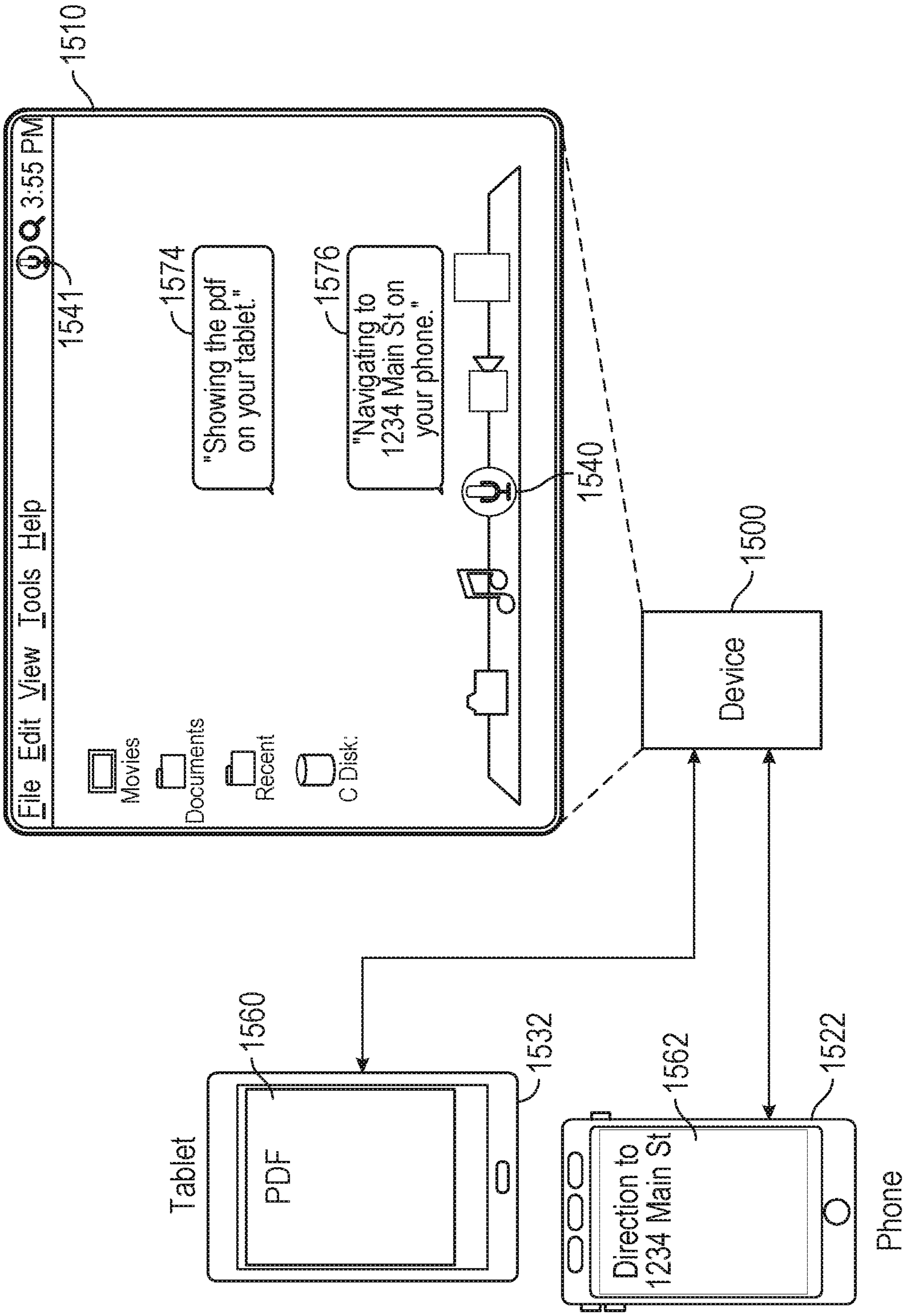

As described, in some examples, after providing the content for performing the task to the first electronic device, the digital assistant provides a response at the user device. In some embodiments, providing the response includes causing the task to be performed at the first electronic device. For example, as shown in FIG. 15D, the digital assistant of user device 1500 transmits a request to phone 1522 to perform the task of navigating to the location 1234 Main St. The digital assistant of user device 1500 further transmits a request to tablet 1532 to perform the task of displaying document 1560. In some examples, providing the response at the user device includes providing a spoken output according to the task to be performed at the first electronic device. As illustrated in FIG. 15D, the digital assistant provides a spoken output 1574 such as "Showing the pdf on your tablet" and a spoken output 1576 such as "navigating to 1234 Main St on your phone."

Figure 16A:
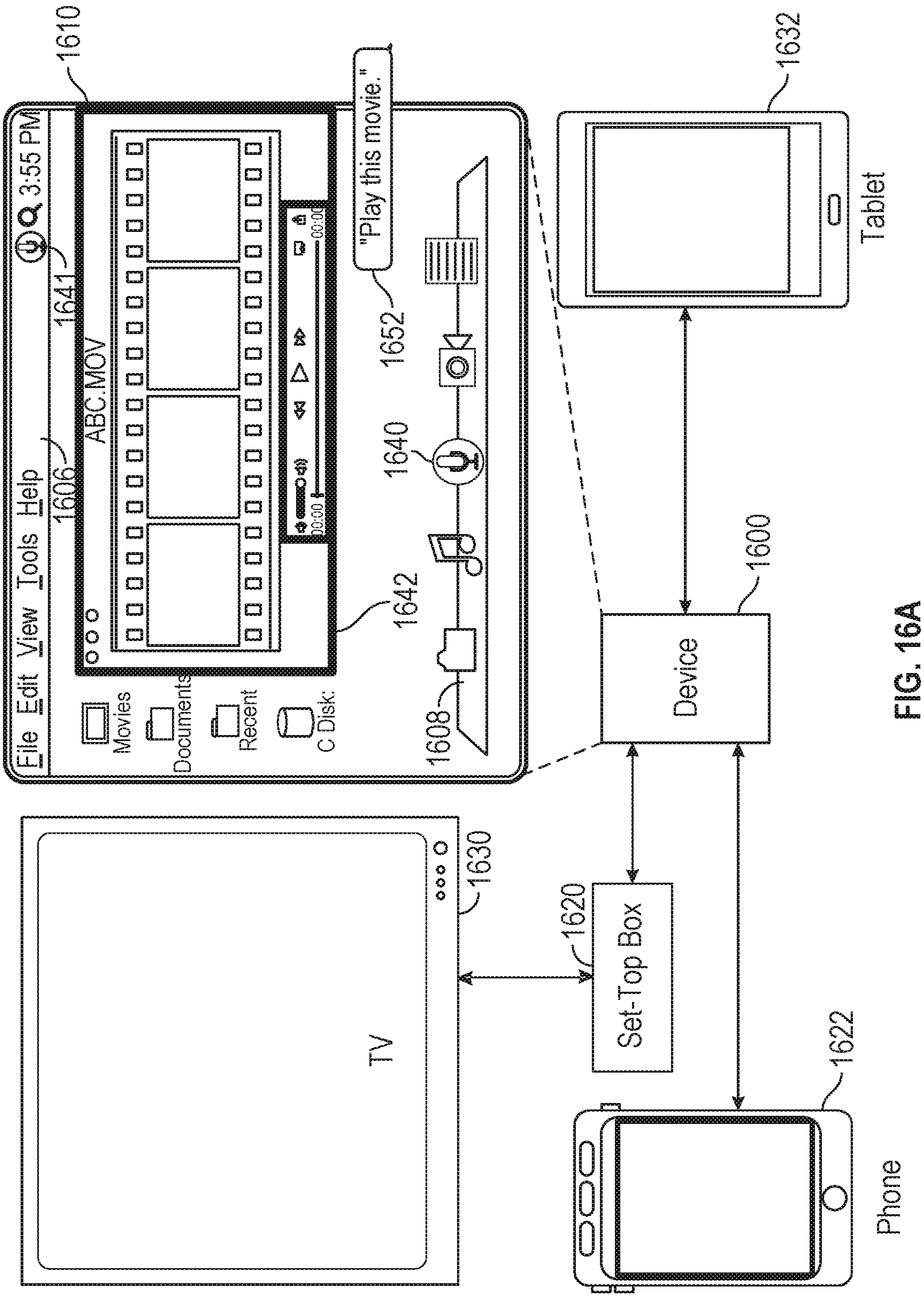
FIGS. 16A-16C illustrate functionalities of performing a task at a first electronic device using remotely located content by a digital assistant according to various examples.

As described, in some examples, the speech input may not include one or more keywords indicating whether a task is to be performed at the user device or at a first electronic device communicatively connected to the user device. With reference to FIG. 16A, for example, the digital assistant receives a speech input 1652 such as "Play this movie." Speech input 1652 does not indicate whether the task of playing the movie is to be performed at user device 1600 or at a first electronic device (e.g., set-top box 1620 and/or TV 1630, phone 1622, or tablet 1632).

In some embodiments, to determine whether the task is to be performed at the user device or at a first electronic device, the digital assistant of the user device determines whether performing the task at the user device satisfies performance criteria. Performance criteria facilitate evaluating the performance of the task. For example, as illustrated in FIG. 16A, the digital assistant determines that the user intent is to perform the tasking of playing the movie ABC.mov. Performance criteria for playing a movie include, for example, the quality criteria of playing a movie (e.g., 480p, 720p, 1080p), the smoothness criteria of playing the movie (e.g., no delay or waiting), the screen size criteria (e.g., a minimum screen size of 48 inches), the sound effect criteria (e.g., stereo sounds, number of speakers), or the like. The performance criteria can be pre-configured and/or dynamically updated. In some examples, the performance criteria are determined based on context information such as user-specific data (e.g., user preferences), device configuration data (e.g., screen resolution and size of the electronic devices), or the like.

In some examples, the digital assistant of user device 1600 determines that performing the task at the user device satisfies the performance criteria. For example, as illustrated in FIG. 16A, user device 1600 may have a screen resolution, a screen size, and sound effect that satisfy the performance criteria of playing the movie ABC.mov, which may be a low-resolution online video. In accordance with a determination that performing the task at user device 1600 satisfies the performance criteria, the digital assistant determines that the task is to be performed at user device 1600.

Figure 16B:
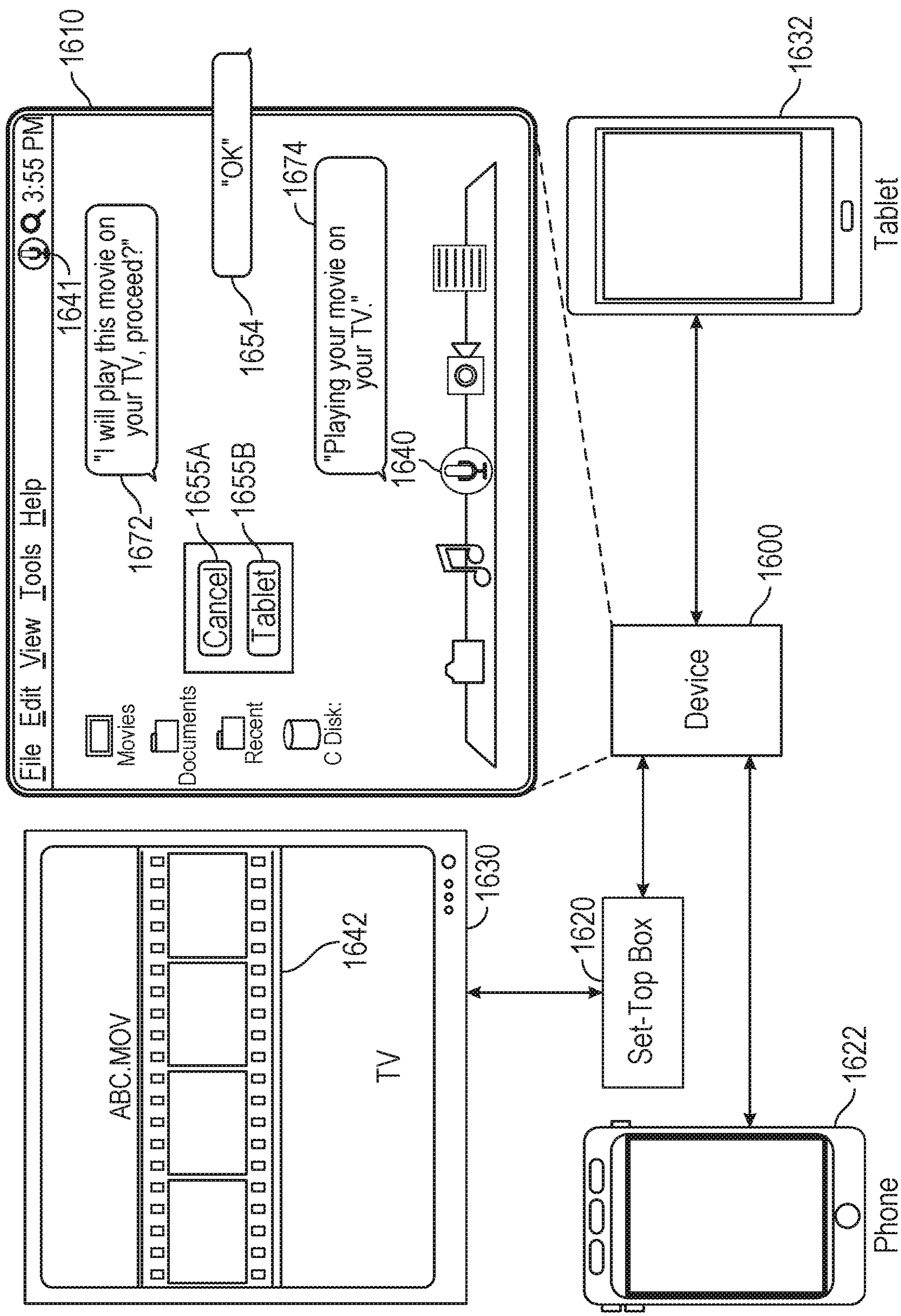

In some examples, the digital assistant of user device 1600 determines that performing the task at the user device does not satisfy the performance criteria. For example, user device 1600 may not have the screen size, the resolution, and/or the sound effect to satisfy the performance criteria of playing the movie ABC.mov, which may be a high-resolution Blu-ray video. In some examples, in accordance with a determination that performing the task at the user device does not satisfy the performance criteria, the digital assistant of user device 1600 determines whether performing the task at the first electronic device satisfies the performance criteria. As illustrated in FIG. 16B, the digital assistant of user device 1600 determines that performing the task of playing the movie ABC.mov at set-top box 1620 and/or TV 1630 satisfies the performance criteria. For example, set-top box 1620 and/or TV 1630 may have a screen size of 52 inches, may have a 1080p resolution, and may have eight speakers connected. As a result, the digital assistant determines that the task is to be performed at set-top box 1620 and/or TV 1630.

In some examples, the digital assistant of user device 1600 determines that performing the task at the first electronic device does not satisfy the performance criteria. In accordance with the determination, the digital assistant determines whether performing the task at the second electronic device satisfies the performance criteria. For example, as illustrated in FIG. 16B, TV 1630 may have a screen resolution (e.g., 720p) that does not satisfy the performance criteria (e.g., 1080p). As a result, the digital assistant determines whether any one of phone 1622 (e.g., a smartphone) or tablet 1632 satisfies the performance criteria.

In some examples, the digital assistant determines which device provides the optimum performance of the task. For example, as illustrated in FIG. 16B, the digital assistant evaluates or estimates the performance of the task of playing movie ABC.mov on each of user device 1600, set-top box 1620 and TV 1630, phone 1622, and tablet 1632. Based on the evaluation or estimation, the digital assistant determines whether performing the task at one device (e.g., user device 1600) is better than at another device (e.g., phone 1622) and determines a device for optimum performance.

As described, in some examples, in accordance with the determination of a device for performing the task, the digital assistant provides a response at user device 1600. In some embodiments, providing a response includes providing a spoken output according to the task to be performed at the device. As illustrated in FIG. 16B, the digital assistant represented by affordances 1640 or 1641 provides a spoken output 1672 such as "I will play this movie on your TV, proceed?" In some examples, the digital assistant receives a speech input 1654 such as "OK" from the user. In response, the digital assistant causes the movie ABC.mov to be played at, for example, set-top box 1620 and TV 1630 and provides a spoken output 1674 such as "Playing your movie on your TV."

In some examples, providing a response includes providing one or more affordances that enable the user to select another electronic device for performance of the task. As illustrated in FIG. 16B, for example, the digital assistant provides affordances 1655A-B (e.g., a cancel button and a tablet button). Affordance 1655A enables the user to cancel playing the movie ABC.mov at set-top box 1620 and TV 1630. Affordance 1655B enables the user to select tablet 1632 to continue playing the movie ABC.mov.

Figure 16C:
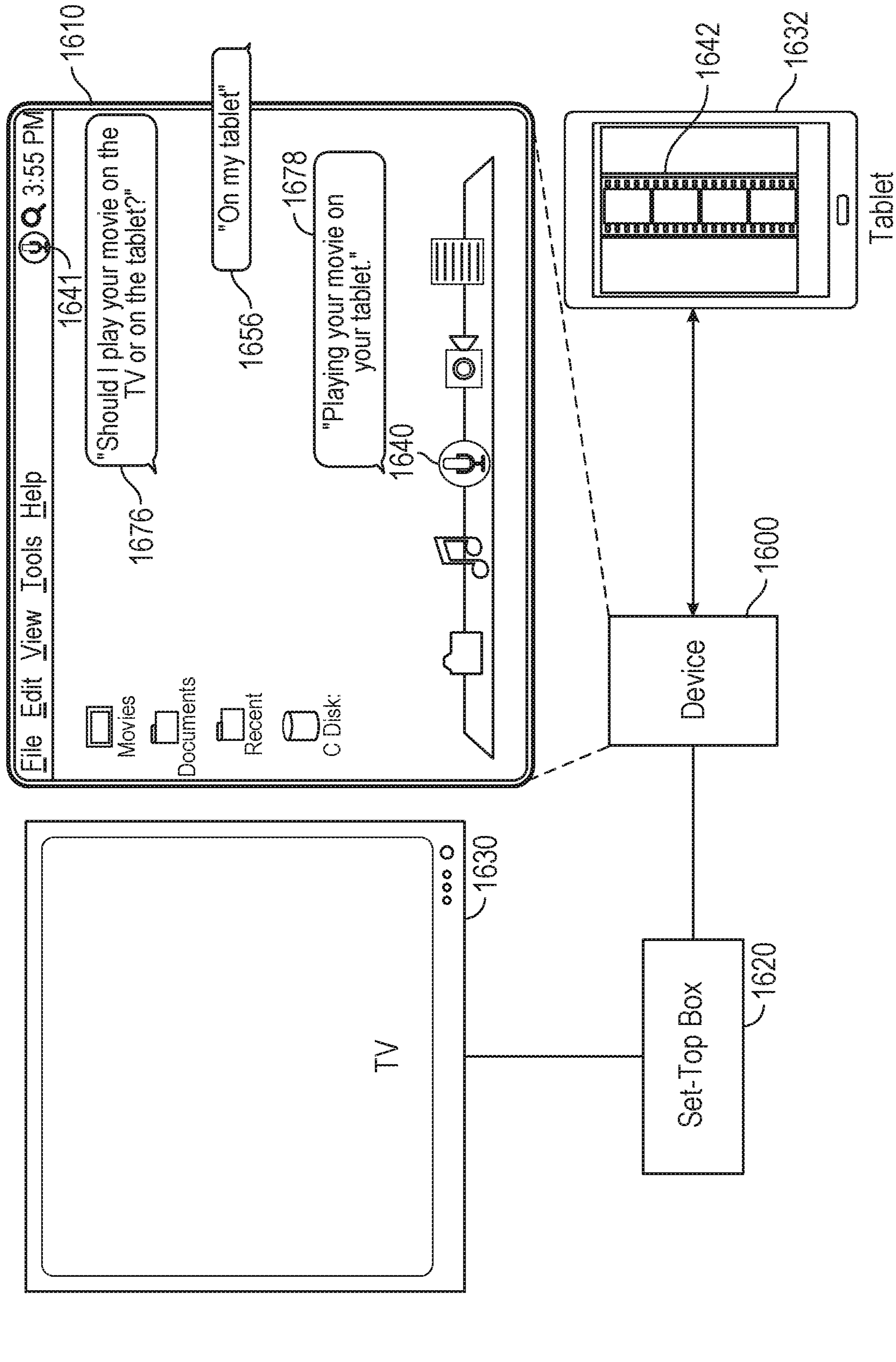

With reference to FIG. 16C, in some embodiments, to determine a device for performing a task, the digital assistant of user device 1600 initiates a dialog with the user. For example, the digital assistant provides a spoken output 1676 such as "Should I play your movie on the TV or on the tablet?" The user provides a speech input 1656 such as "On my tablet," Upon receiving speech input 1656, the digital assistant determines that the task of playing the movie is to be performed at tablet 1632, which is communicatively connected to user device 1600. In some examples, the digital assistant further provides a spoken output 1678 such as "Playing your movie on your tablet."

Figure 17A:
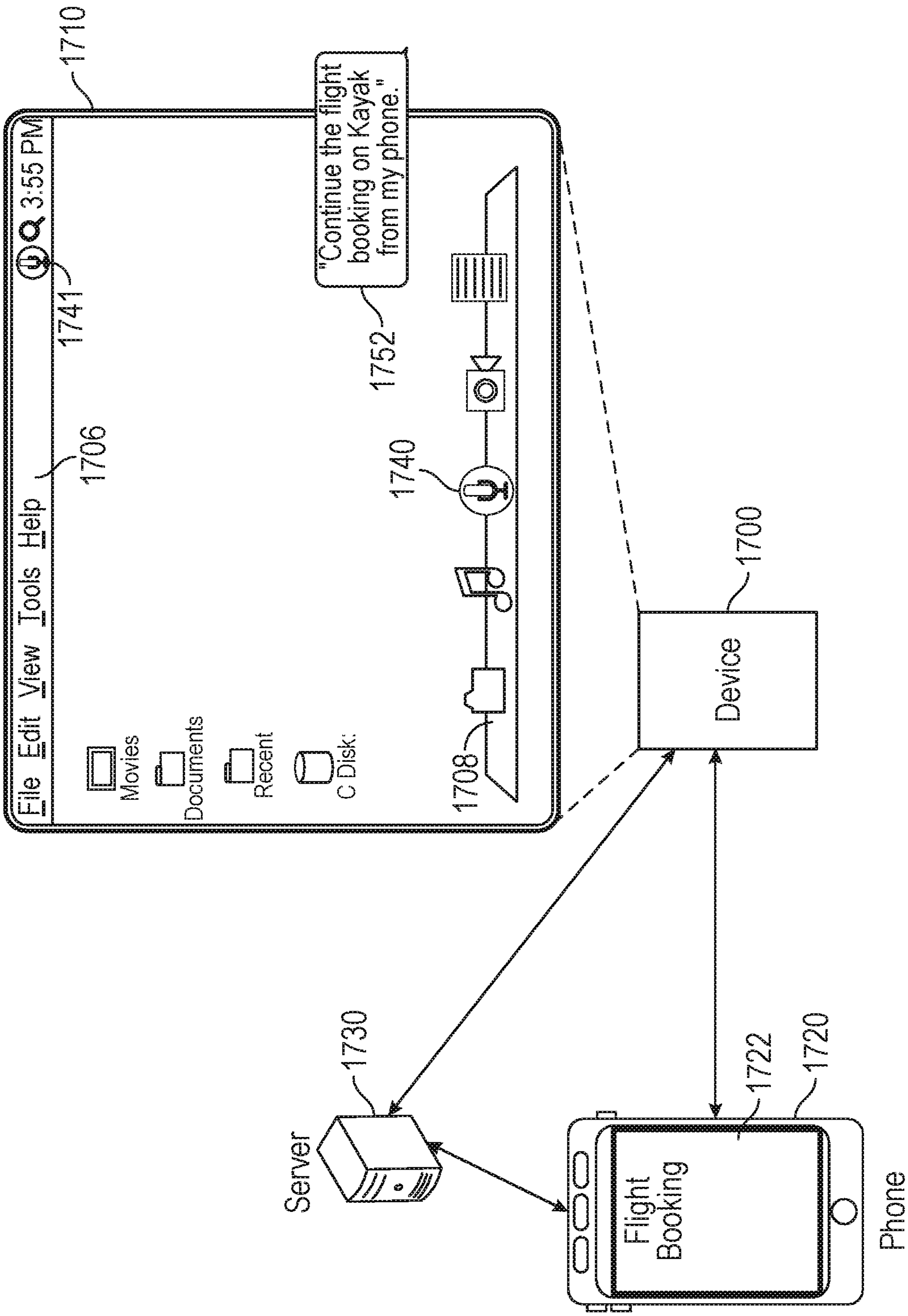
FIGS. 17A-17E illustrate functionalities of performing a task at a user device using remotely located content by a digital assistant according to various examples.

With reference to FIG. 17A, in some embodiments, a digital assistant of a user device 1700 continues to perform a task that was partially performed remotely at a first electronic device. In some embodiments, the digital assistant of a user device continues to perform the task using content received from a third electronic device. As illustrated in FIG. 17A, in some examples, phone 1720 may have been performing a task of flight booking using content from a third electronic device such as a server 1730. For example, the user may have been using phone 1720 to book flights from Kayak.com. As a result, phone 1720 receives content transmitted from server 1730 that is associated with Kayak.com. In some examples, the user may be interrupted while booking his or her flight on phone 1720 and may desire to continue the flight booking using user device 1700. In some examples, the user may desire to continue the flight booking simply because using user device 1700 is more convenient. Accordingly, the user may provide a speech input 1752 such as "Continue the flight booking on Kayak from my phone."

Figure 17B:
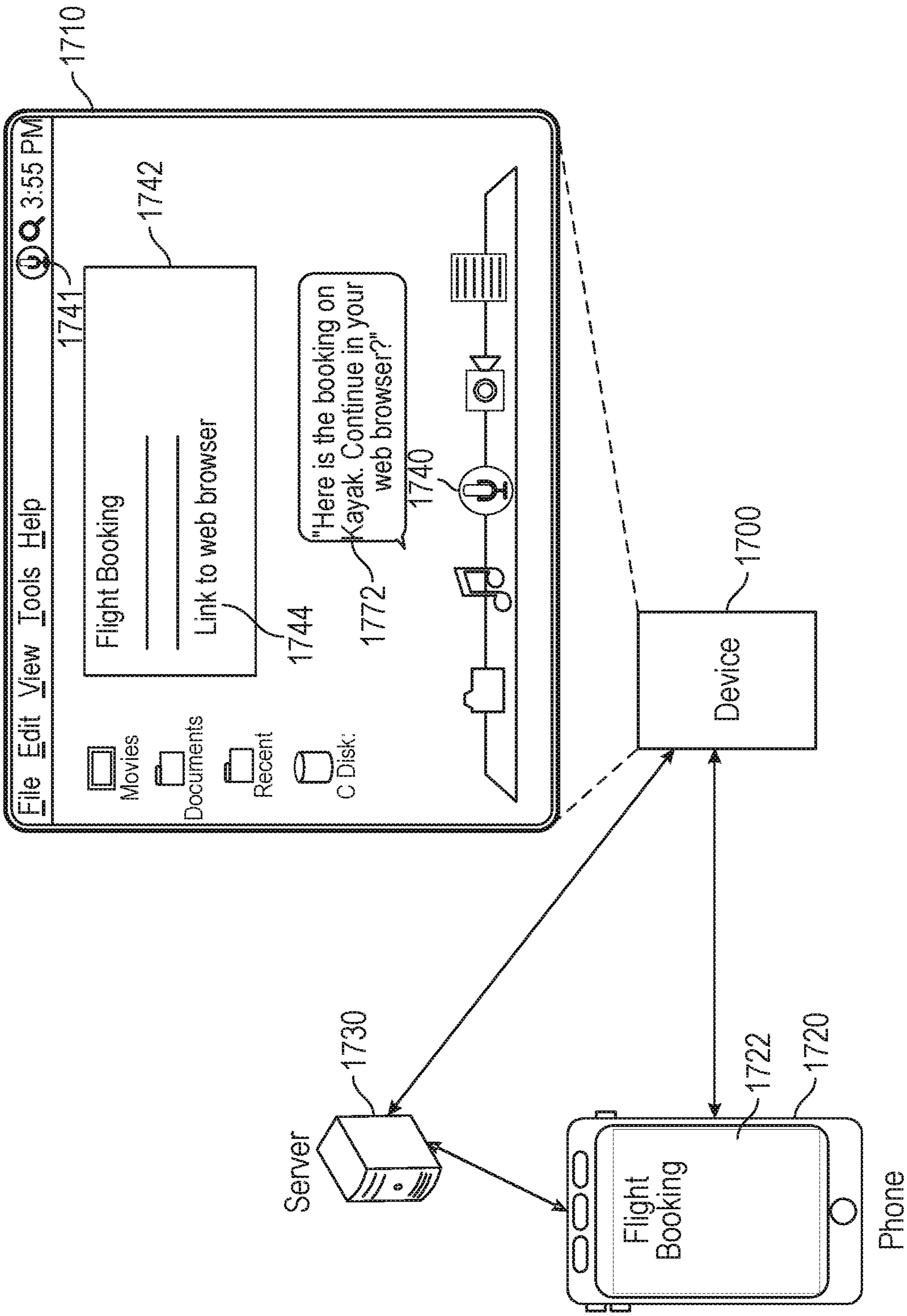

With reference to FIG. 17B, upon receiving speech input 1752, the digital assistant determines the user intent is to perform a task of flight booking. In some examples, the digital assistant further determines that the task is to be performed at user device 1700 based on context information. For example, the digital assistant determines that speech input 1752 is received at user device 1700 and therefore determines that the task is to be performed at user device 1700. In some examples, the digital assistant further uses context information such as user preferences (e.g., user device 1700 is used frequently in the past for flight booking) to determine that the task is to be performed at user device 1700.

As shown in FIG. 17B, in accordance with the determination that the task is to be performed at the user device 1700, and the content for performing the task is located remotely, the digital assistant receives the content for performing the task. In some examples, the digital assistant receives the at least a portion of the content from phone 1720 (e.g., a smartphone) and/or at least a portion of the content from server 1730. For example, the digital assistant receives data representing the status of flight booking from phone 1720 such that user device 1700 can continue the flight booking. In some examples, the data representing the status of flight booking is stored at server 1730, such as a server associated with Kayak.com. The digital assistant thus receives data from server 1730 for continuing the flight booking.

As illustrated in FIG. 17B, after receiving the content from phone 1720 and/or server 1730, the digital assistant provides a response at user device 1700. In some examples, providing the response includes continuing to perform the task of flight booking that was partially performed remotely at phone 1720. For example, the digital assistant displays a user interface 1742 enabling the user to continue booking the flight on Kayak.com. In some examples, providing the response includes providing a link associated with the task to be performed at user device 1700. For example, the digital assistant displays a user interface 1742 (e.g., a snippet or a window) providing the current status of flight booking (e.g., showing available flights). User interface 1742 also provides a link 1744 (e.g., a link to a web browser) for continuing performing the task of flight booking. In some embodiments, the digital assistant also provides a spoken output 1772 such as "Here is the booking on Kayak. Continue in your web browser?"

Figure 17C:
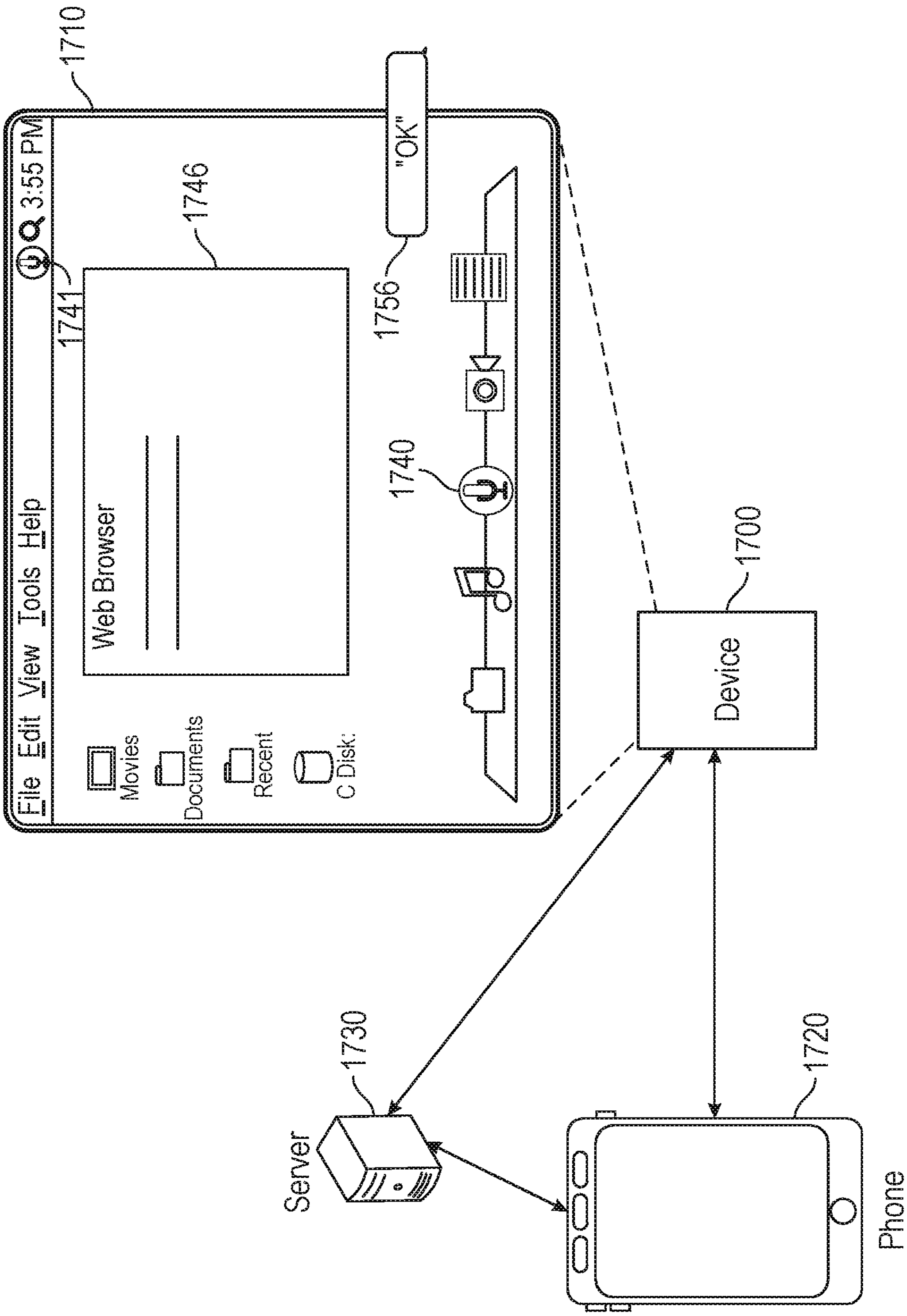

As shown in FIGS. 17B and 17C, for example, if the user selects link 1744, the digital assistant instantiates a web browsing process and displays a user interface 1746 (e.g., a snippet or a window) for continuing the flight booking task. In some examples, in response to spoken output 1772, the user provides a speech input 1756 such as "OK" confirming that the user desires to continue flight book using a web browser of user device 1700. Upon receiving speech input 1756, the digital assistant instantiates a web browsing process and displays user interface 1746 (e.g., a snippet or a window) for continuing the flight booking task.

Figure 17D:
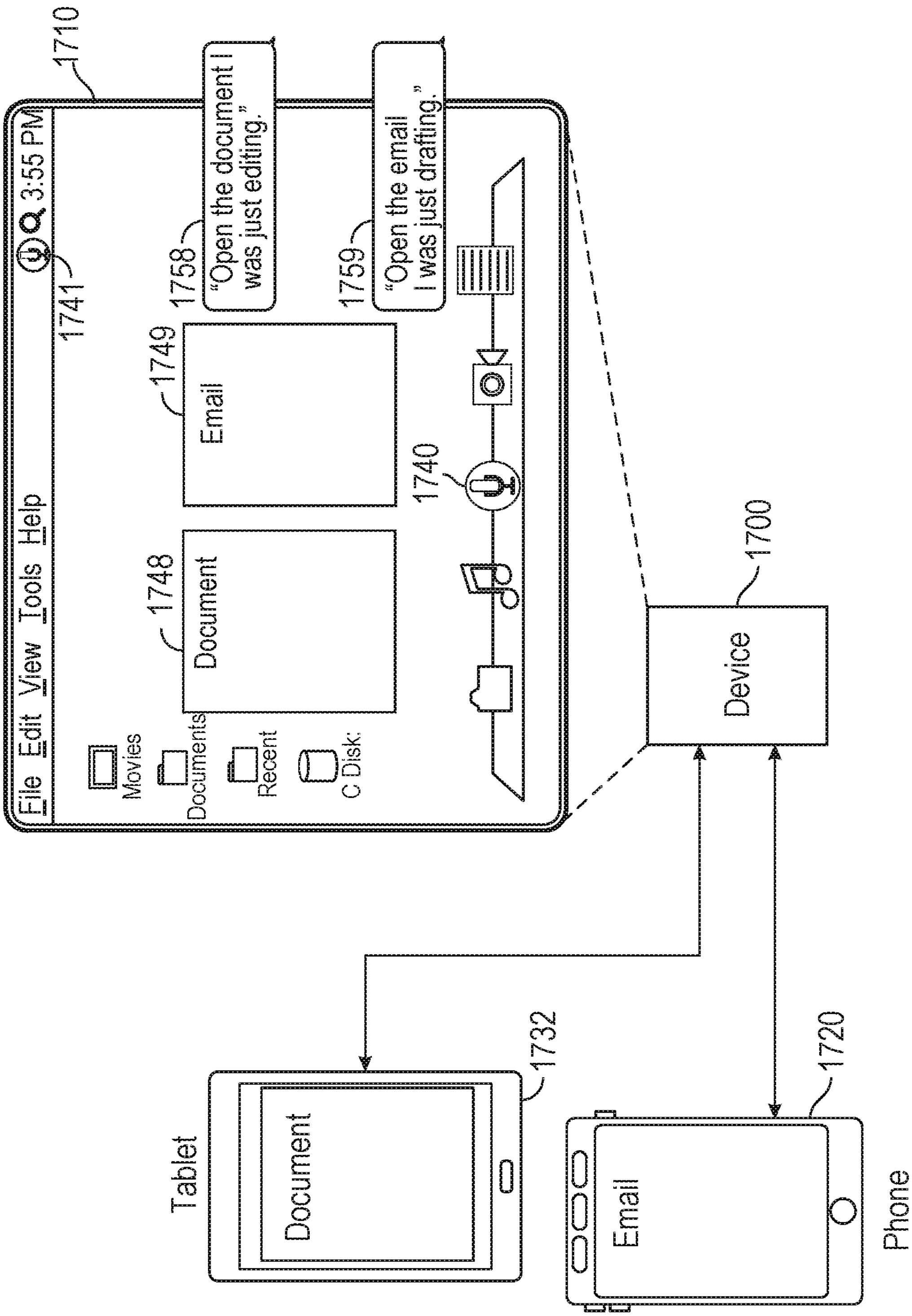

With reference to FIG. 17D, in some embodiments, a digital assistant of a user device 1700 continues to perform a task that was partially performed remotely at a first electronic device. In some embodiments, the digital assistant of the user device continues to perform the task using content received from the first electronic device, rather than a third electronic device such as a server. As illustrated in FIG. 17D, in some examples, the first electronic device (e.g., phone 1720 or tablet 1732) may have been performing a task. For example, the user may have been using phone 1720 to compose an email or using tablet 1732 to edit a document such as a photo. In some examples, the user is interrupted while using phone 1720 or tablet 1732, and/or desires to continue the performance of the task using user device 1700. In some examples, the user may desire to continue the performance of the task simply because using user device 1700 is more convenient (e.g., a larger screen). Accordingly, the user may provide a speech input 1758 such as "Open the document I was just editing" or speech input 1759 such as "Open the email I was just drafting."

With reference to FIG. 17D, upon receiving speech input 1758 or 1759, the digital assistant determines the user intent is to perform a task of editing a document or composing an email. Similar to those described above, in some examples, the digital assistant further determines that the task is to be performed at user device 1700 based on context information, and determines that the content for performing the task is located remotely. Similar to described above, in some examples, the digital assistant determines, based on context information (e.g., user-specific data), that the content is located remotely at the first electronic device (e.g., at phone 1720 or tablet 1732), rather than at a server. As shown in FIG. 17D, in accordance with the determination that the task is to be performed at the user device 1700 and the content for performing the task is located remotely, the digital assistant receives the content for performing the task. In some examples, the digital assistant receives the at least a portion of the content from phone 1720 (e.g., a smartphone) and/or at least a portion of the content from tablet 1730. After receiving the content from phone 1720 and/or tablet 1732, the digital assistant provides a response at user device 1700, such as displaying a user interface 1748 for the user to continue editing the document and/or displaying a user interface 1749 for the user to continue composing the email. It is appreciated that the digital assistant of user device 1700 can also cause a first electronic device to continue performing a task that was partially performed remotely at the user device 1700. For example, the user may be composing an email on user device 1700 and may need to leave. The user provides a speech input such as "Open the email I was drafting on my phone." Based on the speech input, the digital assistant determines the user intent is to continue performing the task on phone 1720 and the content is located remotely at the user device 1700. In some examples, the digital assistant provides the content for performing the task to the first electronic device and causes the first electronic device to continue performing the task, similar to those described above.

Figure 17E:
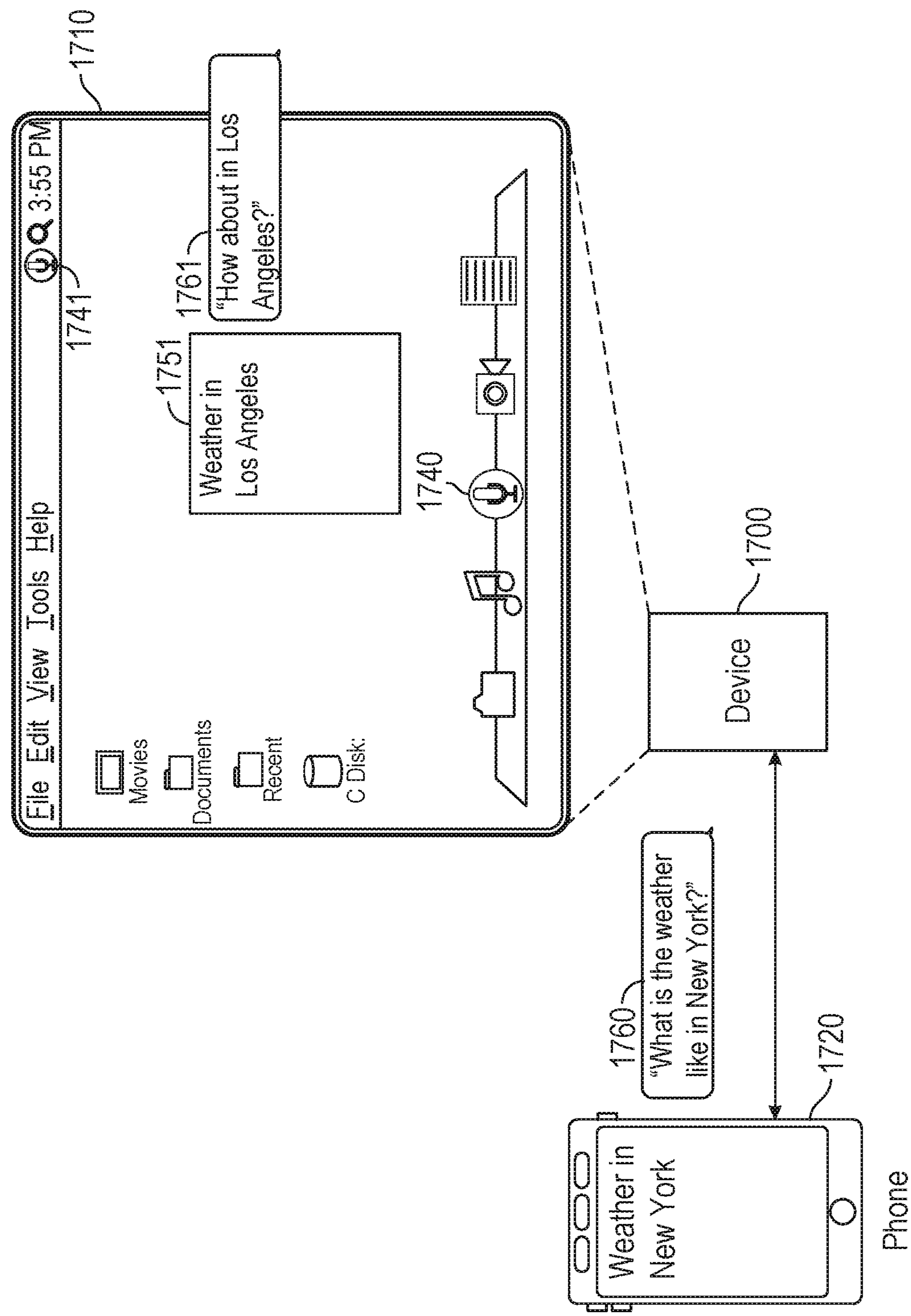

With reference to FIG. 17E, in some embodiments, continuing to performing a task is based on context information that is shared or synchronized among a plurality of devices including, for example, user device 1700 and first electronic device (e.g., phone 1720). As described, in some examples, the digital assistant determines a user intent based on the speech input and context information. The context information can be stored locally or remotely. For example, as shown in FIG. 17E, the user provides a speech input 1760 such as "What is the weather like in New York?" to phone 1720. A digital assistant of phone 1720 determines the user intent, performs the task to obtain the weather information in New York, and displays the weather information of New York on a user interface of phone 1720. The user subsequently provides a speech input 1761 such as "How about in Los Angeles?" to user device 1700. In some examples, the digital assistant of user device 1700 determines the user intent using context information stored at and/or shared by phone 1720, either directly or through a server. The context information includes, for example, historical user data associated with phone 1720, conversational state, system state, etc. Both the historical user data and conversational state indicate that user was inquiring about weather information. Accordingly, the digital assistant of user device 1700 determines that the user intent is to obtain the weather information in Los Angeles. Based on the user intent, the digital assistant of user device 1700 receives the weather information from, for example, a server, and provides a user interface 1751 displaying the weather information on user device 1710.

6. Exemplary Functions of a Digital Assistant—Voice-Enabled System Configuration Management FIGS. 18A-18F and 19A-19D illustrate functionalities of providing system configuration information or performing a task in response to a user request by a digital assistant. In some examples, the digital assistant system (e.g., digital assistant system 700) can be implemented by a user device according to various examples. In some examples, the user device, a server (e.g., server 108), or a combination thereof, may implement a digital assistant system (e.g., digital assistant system 700). The user device is implemented using, for example, device 104, 200, or 400. In some examples, the user device is a laptop computer, a desktop computer, or a tablet computer. The user device operates in a multi-tasking environment, such as a desktop environment.

With references to FIGS. 18A-18F and 19A-19D, in some examples, a user device provides various user interfaces (e.g., user interfaces 1810 and 1910). Similar to those described above, the user device displays the various user interfaces on a display and the various user interfaces enable the user to instantiate one or more processes (e.g., system configuration processes).

As shown in FIGS. 18A-18F and 19A-19D, similar to those described above, the user device displays, on a user interface (e.g., user interfaces 1810 and 1910), an affordance (e.g., affordance 1840 and 1940) to facilitate the instantiation of a digital assistant service.

Similar to those described above, in some examples, the digital assistant is instantiated in response to receiving a pre-determined phrase. In some examples, the digital assistant is instantiated in response to receiving a selection of the affordance.

With reference to FIGS. 18A-18F and 19A-19D, in some embodiments, a digital assistant receives one or more speech inputs, such as speech inputs 1852, 1854, 1856, 1858, 1860, 1862, 1952, 1954, 1956, and 1958 from a user. The user provides various speech inputs for the purpose of managing one or more system configurations of the user device. The system configurations can include audio configurations, date and time configurations, dictation configuration, display configurations, input device configurations, notification configurations, printing configurations, security configurations, backup configurations, application configurations, user interface configurations, or the like. To manage audio configurations, a speech input may include "Mute my microphone," "Turn the volume all the up," "Turn the volume up 10%," or the like. To manage date and time configurations, a speech input may include "What is my time zone?", "Change my time zone to Cupertino Time," "Add a clock for London time zone," or the like. To manage dictation configurations, a speech input may include "Turn on dictation," "Turn off dictation," "Dictation in Chinese," "Enable advanced commands," or the like. To manage display configurations, a speech input may include "Make my screen brighter," "Increase the contrast my 20%," "Extend my screen to a second monitor," "Mirror my display," or the like. To manage input device configurations, a speech input may include "Connect my Bluetooth keyboard," "Make my mouse pointer bigger," or the like. To manage network configurations, a speech input may include "Turn Wi-Fi on," "Turn Wi-Fi off," "Which Wi-Fi network am I connected to?", "Am I connected to my phone?", or the like. To manage notification configuration, a speech input may include "Turn on Do not Disturb," "Stop showing me these notifications," "Show only new emails," "No alert for text message," or the like. To manage printing configurations, a speech input may include "Does my printer have enough ink?", "Is my printer connected?", or the like. To manage security configurations, a speech input may include "Change password for John's account," "Turn on firewall," "Disable cookie," or the like. To manage backup configurations, a speech input may include "Run backup now," "Set backup interval to once a month," "Recover the July 4 backup of last year," or the like. To manage application configurations, a speech input may include "Change my default web browser to Safari," "Automatically log in to Messages application each time I sign in," or the like. To manage user interface configurations, a speech input may include "Change my desktop wallpapers," "Hide the dock," "Add Evernote to the Dock," or the like. Various examples of using speech inputs to manage system configurations are described below in more details.

Similar to those described above, in some examples, the digital assistant receives speech inputs directly from the user at the user device or indirectly through another electronic device that is communicatively connected to the user device.

With reference to FIGS. 18A-18F and 19A-19D, in some embodiments, the digital assistant identifies context information associated with the user device. The context information includes, for example, user-specific data, sensor data, and user device configuration data. In some examples, the user-specific data includes log information indicating user preferences, the history of user's interaction with the user device, or the like. For example, user-specific data indicates the last time the user's system was backed up; and that the user's preferences of a particular Wi-Fi network when several networks are available or the like. In some examples, the sensor data includes various data collected by a sensor. For example, the sensor data indicates a printer ink level collected by a printer ink level sensor. In some examples, the user device configuration data includes the current and historical device configurations. For example, the user device configuration data indicates that the user device is currently, communicatively connected to one or more electronic devices using Bluetooth connections. The electronic devices may include, for example, a smartphone, a set-top box, a tablet, or the like. As described in more detail below, the user device can determine user intent and/or perform one or more processes using the context information.

With reference to FIGS. 18A-18F and 19A-19D, similar to those described above, in response to receiving a speech input, the digital assistant determines a user intent based on the speech input. The digital assistant determines the user intent based on a result of natural language processing. For example, the digital assistant identifies an actionable intent based on the user input, and generates a structured query to represent the identified actionable intent. The structured query includes one or more parameters associated with the actionable intent. The one or more parameters can be used to facilitate the performance of a task based on the actionable intent. For example, based on a speech input such as "Turn the volume up by 10%," the digital assistant determines that the actionable intent is to adjust the system volume, and the parameters include setting the volume to be 10% higher than the current volume level. In some embodiments, the digital assistant also determines the user intent based on the speech input and context information. For example, the context information may indicate that the current volume of the user device is at 50%, As a result, upon receiving the speech input such as "Turn the volume up by 10%," the digital assistant determines that the user intent is to increase the volume level to 60%. Determining the user intent based on speech input and context information is described in more detail below in various examples.

In some embodiments, the digital assistant further determines whether the user intent indicates an informational request or a request for performing a task. Various examples of the determination are provided below in more detail with respect to FIGS. 18A-18F and 19A-19D.

Figure 18A:
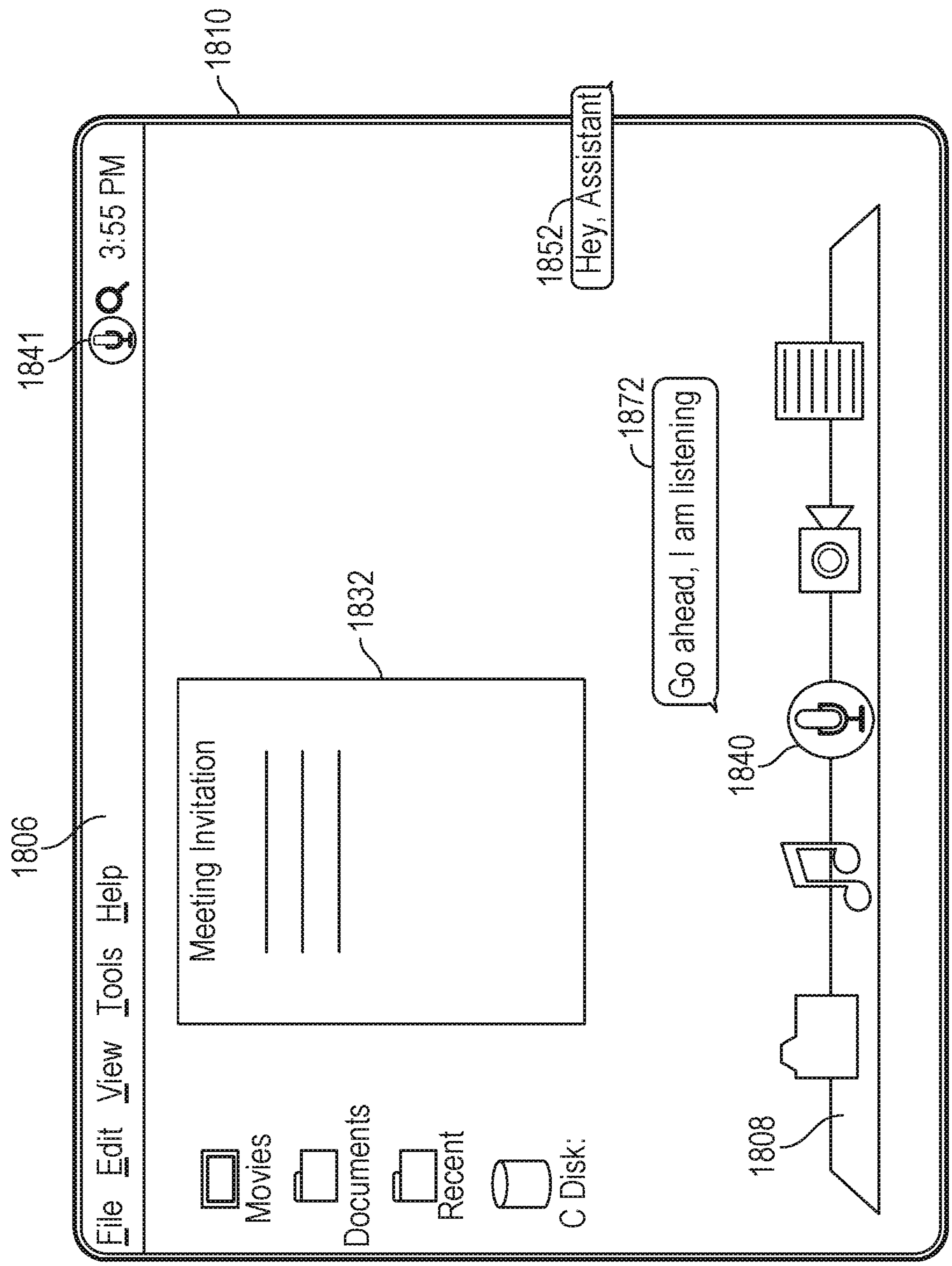
FIGS. 18A-18F illustrate functionalities of providing system configuration information in response to an informational request of the user by a digital assistant according to various examples.

With reference to FIG. 18A, in some examples, the user device displays a user interface 1832 associated with performing a task. For example, the task includes composing a meeting invitation. In composing the meeting invitation, the user may desire to know the time zone of the user device so that the meeting invitation can be properly composed. In some examples, the user provides a speech input 1852 to invoke the digital assistant represented by affordance 1840 or 1841. Speech input 1852 includes, for example, "Hey, Assistant." The user device receives the speech input 1852 and, in response, invokes the digital assistant such that the digital assistant actively monitors subsequent speech inputs. In some examples, the digital assistant provides a spoken output 1872 indicating that it is invoked. For example, spoken output 1872 includes "Go ahead, I am listening."

Figure 18B:
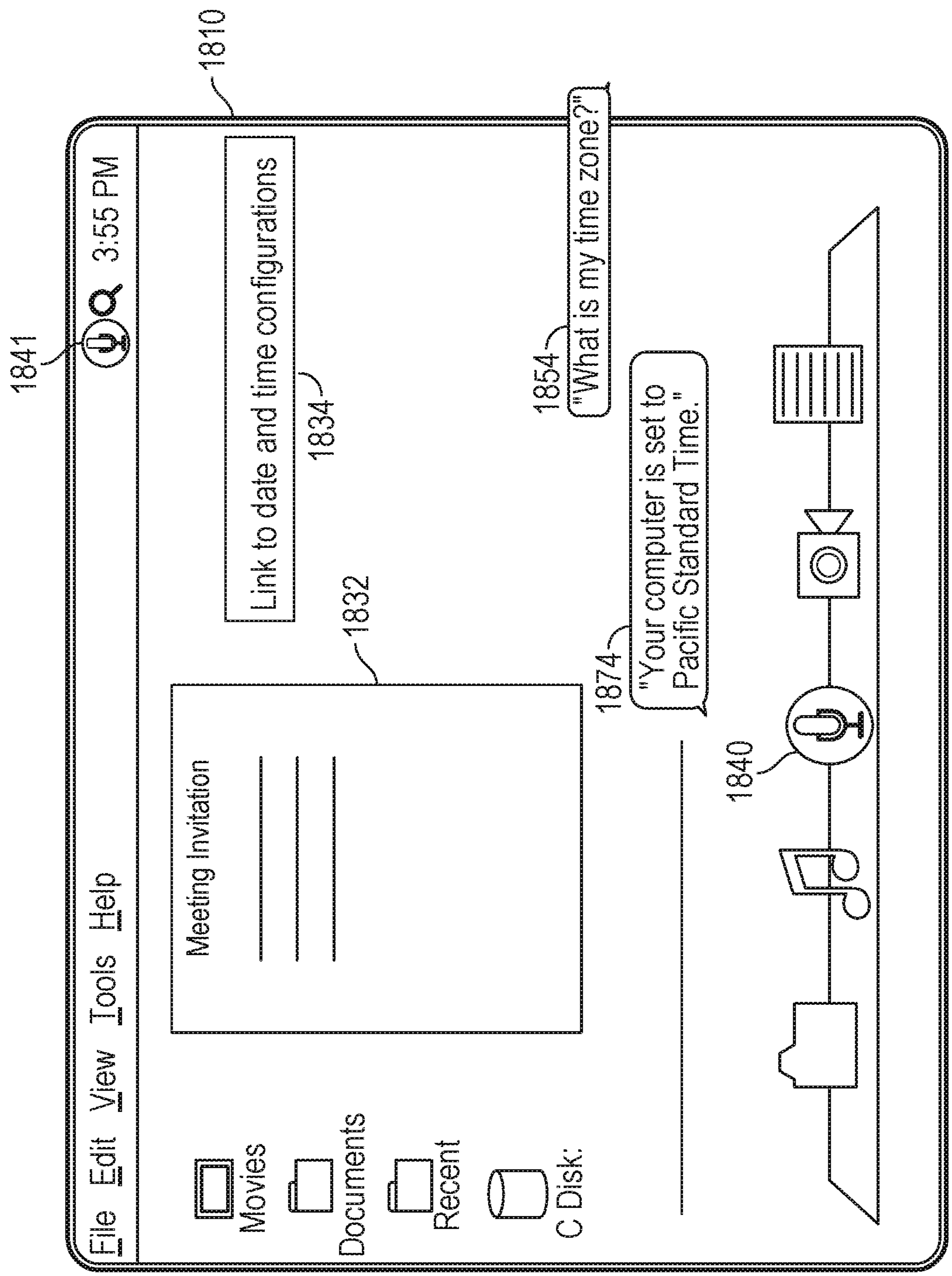

With reference to FIG. 18B, in some examples, the user provides a speech input 1854 such as "What is my time zone?" The digital assistant determines that the user intent is to obtain the time zone of the user device. The digital assistant further determines whether the user intent indicates an informational request or a request for performing a task. In some examples, determining whether the user intent indicates an informational request or a request for performing a task includes determining whether the user intent is to vary a system configuration For example, based on the determination that the user intent is to obtain the time zone of the user device, the digital assistant determines that no system configuration is to be varied. As a result, the digital assistant determines that the user intent indicates an informational request.

In some embodiments, in accordance with a determination that the user intent indicates an informational request, the digital assistant provides a spoken response to the informational request. In some examples, the digital assistant obtains status of one or more system configurations according to the informational request, and provides the spoken response according to the status of one or more system configurations. As shown in FIG. 18B, the digital assistant determines that the user intent is to obtain the time zone of the user device, and this user intent indicates an informational request. Accordingly, the digital assistant obtains the time zone status from the time and date configuration of the user device. The time zone status indicates, for example, the user device is set to the Pacific time zone. Based on the time zone status, the digital assistant provides a spoken output 1874 such as "Your computer is set to Pacific Standard Time." In some examples, the digital assistant further provides a link associated with the informational request. As illustrated in FIG. 18B, the digital assistant provides a link 1834, enabling the user to further manage the data and time configurations. In some examples, the user uses an input device (e.g., a mouse) to select link 1834. Upon receiving the user's selection of link 1834, the digital assistant instantiates a date and time configuration process and displays an associated date and time configuration user interface. The user can thus use the date and time configuration user interface to further manage the date and time configurations.

Figure 18C:
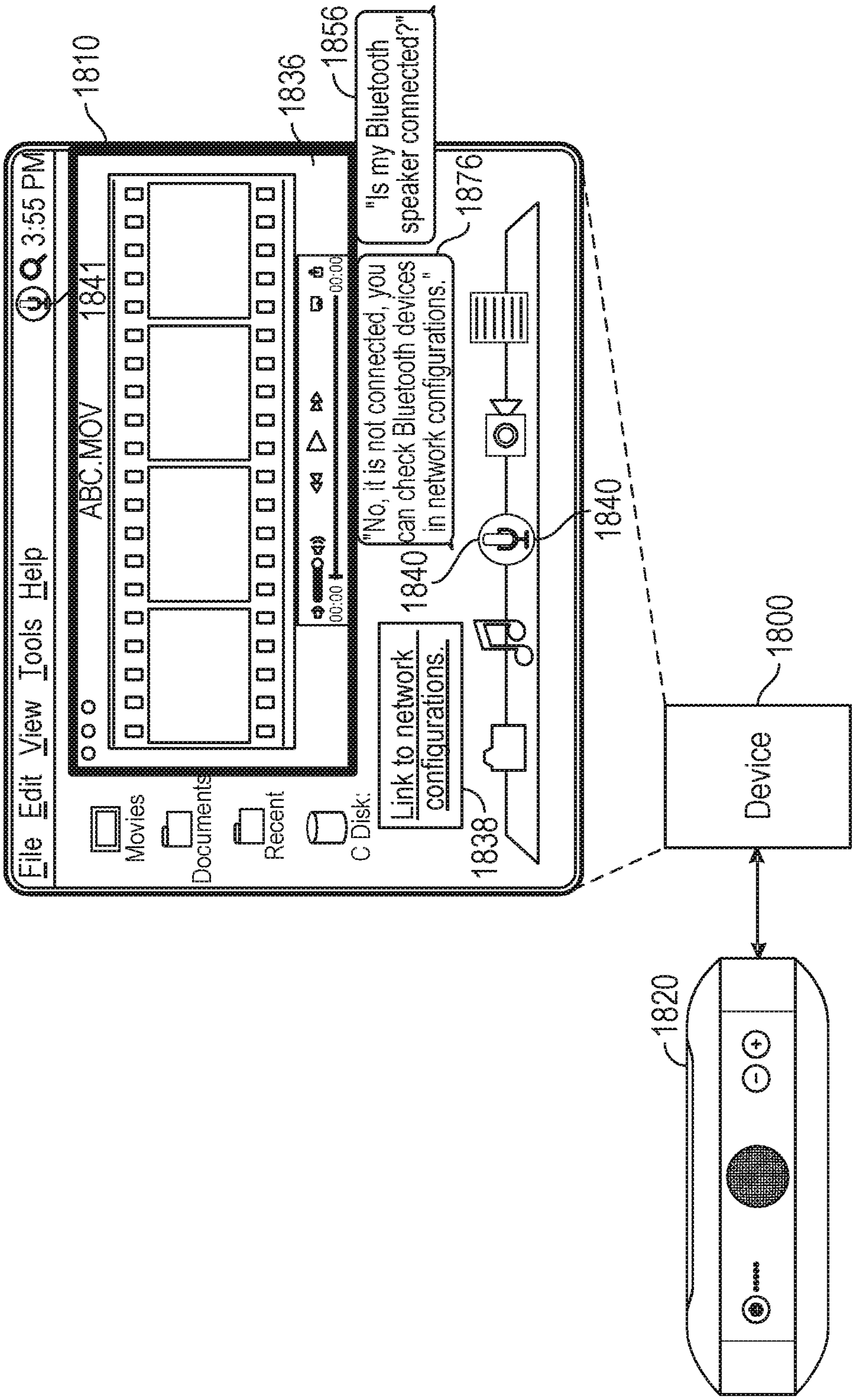

With reference to FIG. 18C, in some examples, the user device displays a user interface 1836 associated with performing a task. For example, the task includes playing a video (e.g., ABC.mov). To enhance the experience of watching the video, the user may desire to use a speaker and may want to know whether a Bluetooth speaker is connected. In some examples, the user provides a speech input 1856 such as "Is my Bluetooth speaker connected?" The digital assistant determines that the user intent is to obtain the connection status of the Bluetooth speaker 1820. The digital assistant further determines that obtaining the connection status of the Bluetooth speaker 1820 does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18C, the digital assistant obtains the connection status from the network configuration of the user device. The connection status indicates, for example, user device 1800 is not connected to a Bluetooth speaker 1820. Based on the connection status, the digital assistant provides a spoken output 1876 such as "No, it is not connected, you can check Bluetooth devices in the network configurations," In some examples, the digital assistant further provides a link associated with the informational request. As illustrated in FIG. 18C, the digital assistant provides a link 1838, enabling the user to further manage the network configurations. In some examples, the user uses an input device (e.g., a mouse) to select link 1838. Upon receiving the user's selection of link 1838, the digital assistant instantiates a network configuration process and displays an associated network configuration user interface. The user can thus use the network configuration user interface to further manage the network configurations.

Figure 18D:
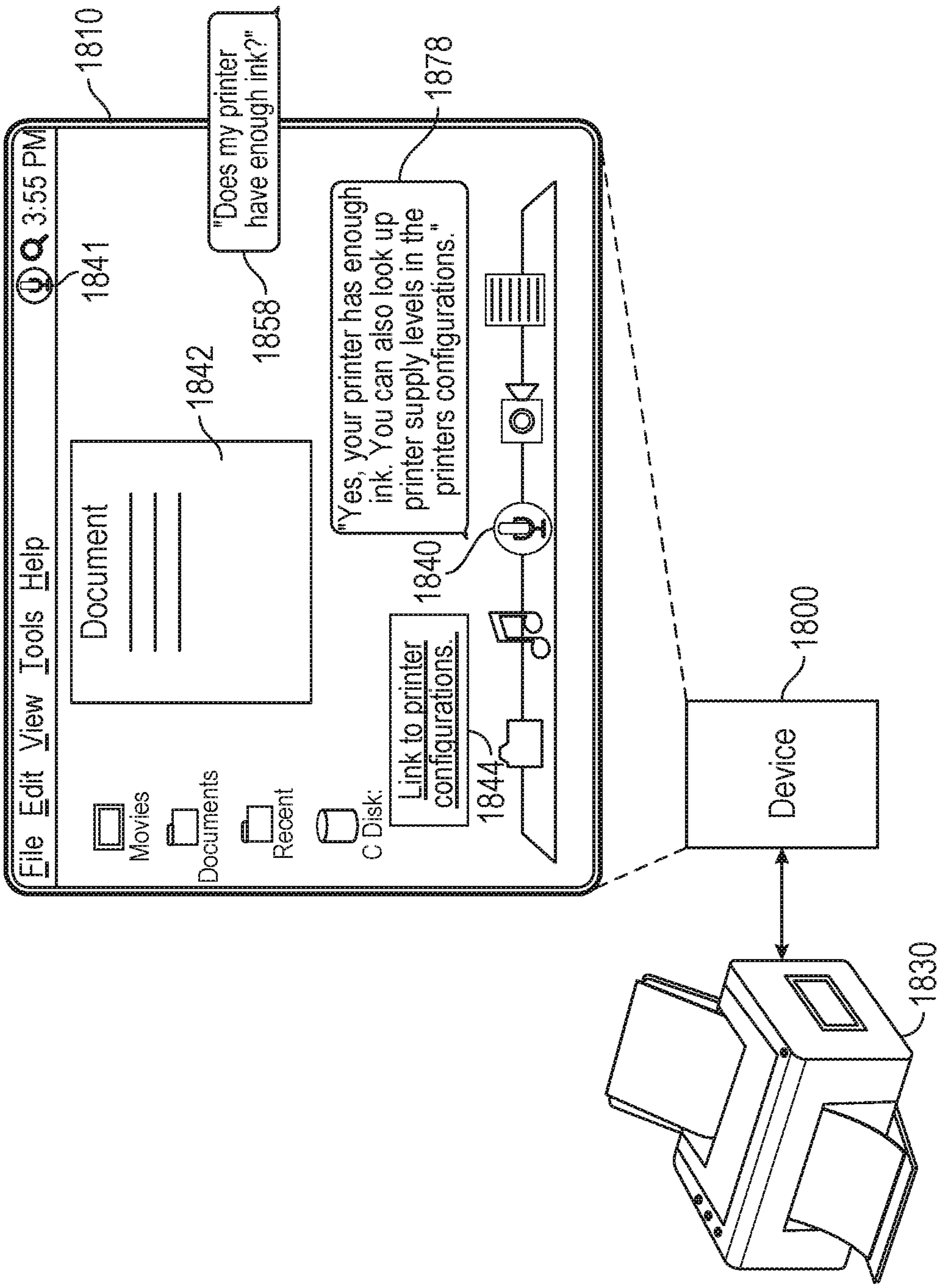

With reference to FIG. 18D, in some examples, the user device displays a user interface 1842 associated with performing a task. For example, the task includes viewing and/or editing a document. The user may desire to print out the document and may want to know whether a printer 1830 has enough ink for the printing job. In some examples, the user provides a speech input 1858 such as "Does my printer have enough ink?" The digital assistant determines that the user intent is to obtain printer ink level status of the printer. The digital assistant further determines that the obtaining the printer level status does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18D, the digital assistant obtains the printer ink level status from the printing configuration of the user device. The printer ink level status indicates, for example, the printer ink level of printer 1830 is at 50%. Based on the connection status, the digital assistant provides a spoken output 1878 such as "Yes, your printer has enough ink. You can also look up printer supply levels in the printer configurations." In some examples, the digital assistant further provides a link associated with the informational request. As illustrated in FIG. 18D, the digital assistant provides a link 1844, enabling the user to further manage the printer configurations. In some examples, the user uses an input device (e.g., a mouse) to select link 1844. Upon receiving the user's selection of the link, the digital assistant instantiates a printer configuration process and displays an associated printer configuration user interface. The user can thus use the printer configuration user interface to further manage the printer configurations.

Figure 18E:
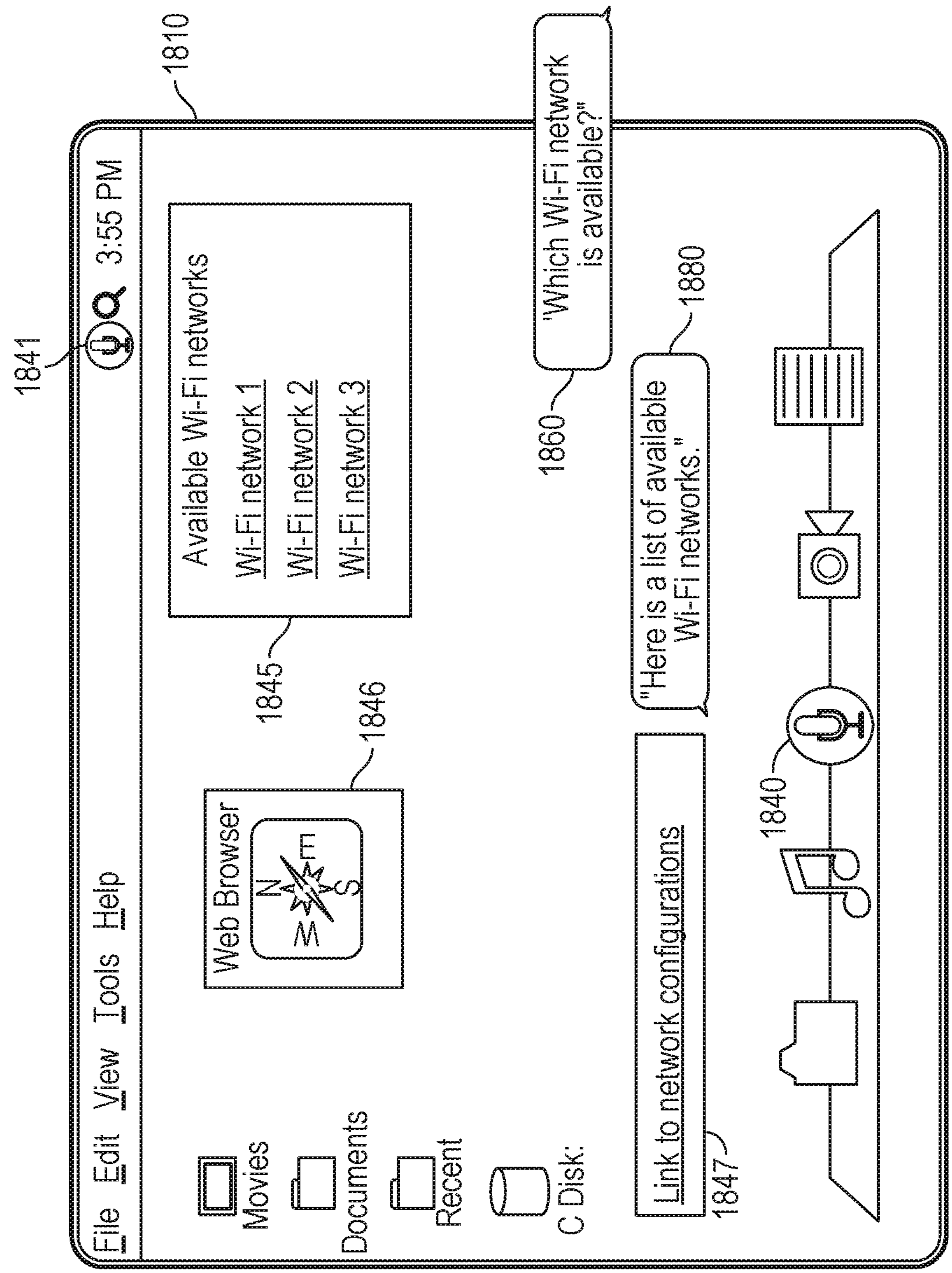

With reference to FIG. 18E, in some examples, the user device displays a user interface 1846 associated with performing a task. For example, the task includes browsing Internet using a web browser (e.g., Safari). To browse the Internet, the user may desire to know available Wi-Fi networks and select one Wi-Fi network to connect. In some examples, the user provides a speech input 1860 such as "Which Wi-Fi networks are available?" The digital assistant determines that the user intent is to obtain a list of available Wi-Fi networks. The digital assistant further determines that obtaining the list of available Wi-Fi networks does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18E, the digital assistant obtains status of currently available Wi-Fi networks from the network configuration of the user device. The status of currently available Wi-Fi networks indicates, for example, Wi-Fi network 1, Wi-Fi network 2, and Wi-Fi network 3 are available. In some examples, the status further indicates the signal strength of each of the Wi-Fi networks. The digital assistant displays a user interface 1845 providing information according to the status. For example, user interface 1845 provides the list of available Wi-Fi networks. The digital assistant also provides a spoken output 1880 such as "Here is a list of available Wi-Fi networks." In some examples, the digital assistant further provides a link associated with the informational request. As illustrated in FIG. 18E, the digital assistant provides a link 1847, enabling the user to further manage the network configurations. In some examples, the user uses an input device (e.g., a mouse) to select link 1847. Upon receiving the user's selection of the link 1847, the digital assistant instantiates a network configuration process and displays an associated network configuration user interface. The user can thus use the network configuration user interface to further manage the configurations.

Figure 18F:
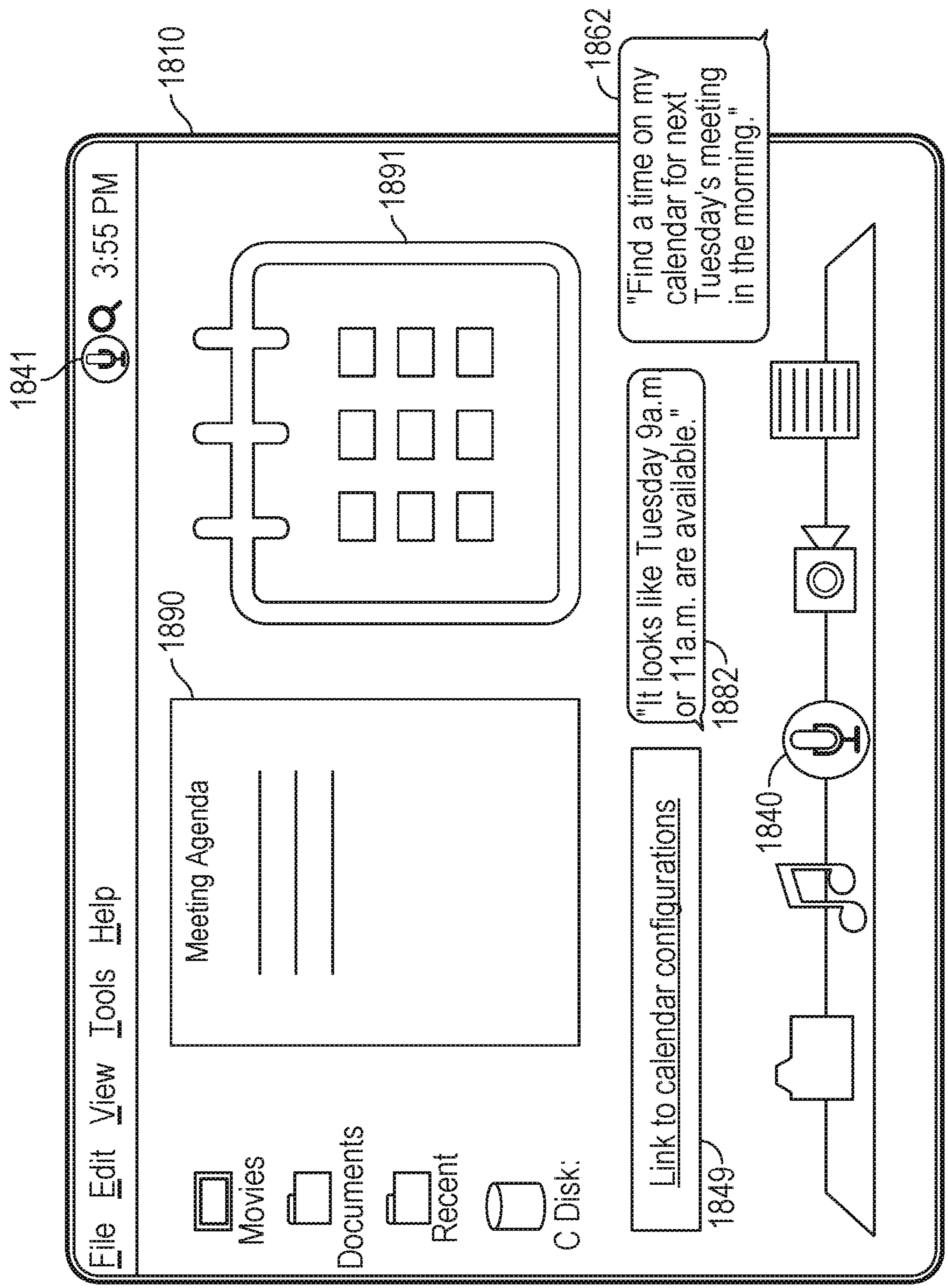

With reference to FIG. 18F, in some examples, the user device displays a user interface 1890 associated with performing a task. For example, the task includes preparing a meeting agenda. In preparing a meeting agenda, the user may desire to find a date and time for the meeting. In some examples, the user provides a speech input 1862 such as "Find a time on my calendar for next Tuesday's meeting in the morning." The digital assistant determines that the user intent is to find an available time slot on the user's calendar on Tuesday morning. The digital assistant further determines that finding a time slot does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18F, the digital assistant obtains status of user's calendar from calendar configurations. The status of user's calendar indicates, for example, 9 a.m. or 11 a.m. on Tuesday is still available. The digital assistant displays a user interface 1891 providing information according to the status. For example, user interface 1891 provides the user's calendar in the proximity of the date and time the user requested. In some examples, the digital assistant also provides a spoken output 1882 such as "It looks like Tuesday 9 a.m. or 11 a.m. is available." In some examples, the digital assistant further provides a link associated with the informational request. As illustrated in FIG. 18F, the digital assistant provides a link 1849, enabling the user to further manage the calendar configurations. In some examples, the user uses an input device (e.g., a mouse) to select link 1849. Upon receiving the user's selection of link 1849, the digital assistant instantiates a calendar configuration process and displays an associated calendar configuration user interface. The user can thus use the calendar configuration user interface to further manage the configurations.

Figure 19A:
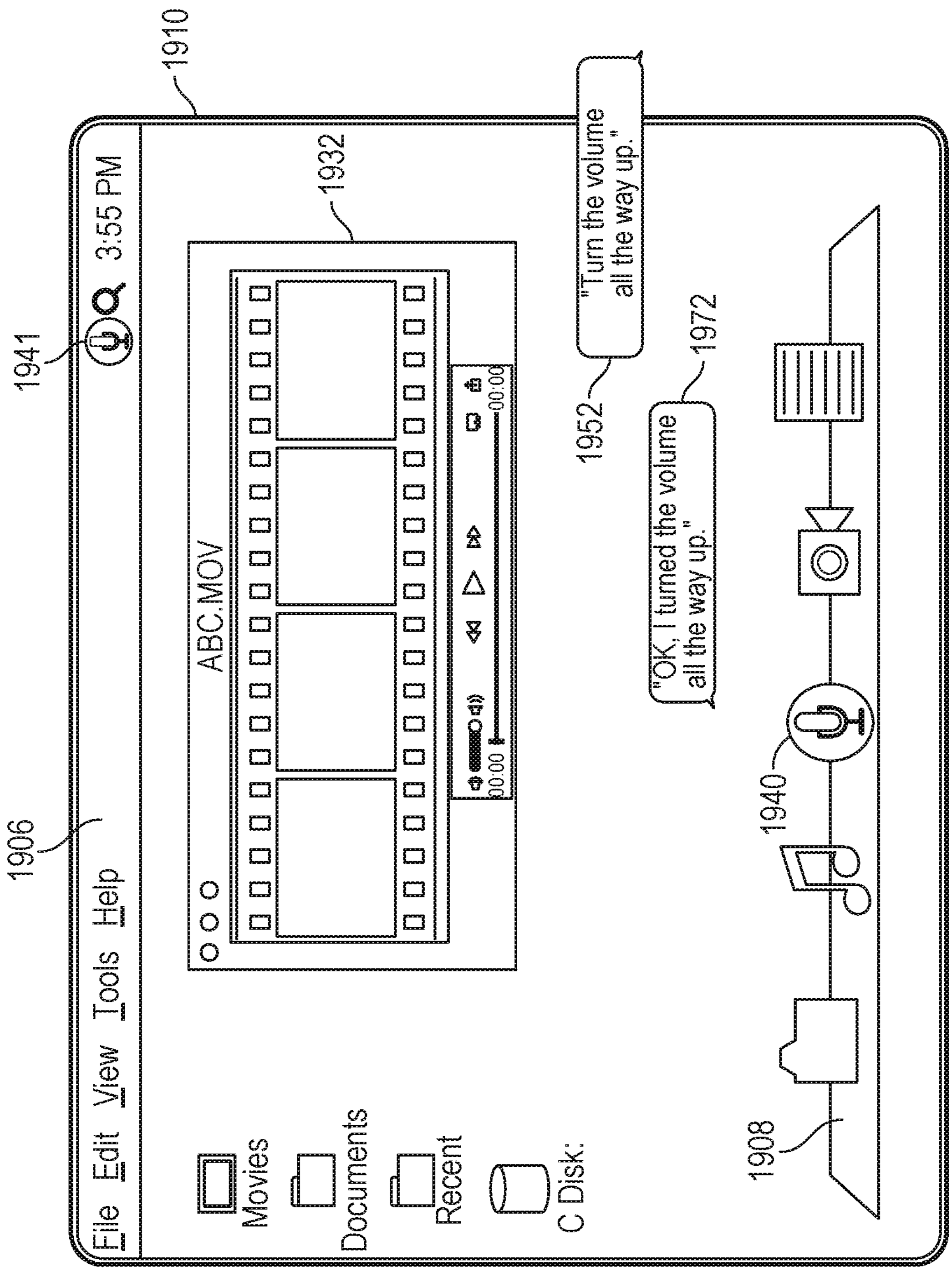
FIGS. 19A-19D illustrate functionalities of performing a task in response to a user request by a digital assistant according to various examples.

With reference to FIG. 19A, the user device displays a user interface 1932 associated with performing a task. For example, the task includes playing a video (e.g., ABC.mov). While the video is playing, the user may desire to turn up the volume. In some examples, the user provides a speech input 1952 such as "Turn the volume all the way up." The digital assistant determines that the user intent is to increase the volume to its maximum level. The digital assistant further determines whether the user intent indicates an informational request or a request for performing a task. For example, based on the determination that the user intent is to increase the volume of the user device, the digital assistant determines that an audio configuration is to be varied, and therefore the user intent indicates a request for performing a task.

In some embodiments, in accordance with a determination that the user intent indicates a request for performing a task, the digital assistant instantiates a process associated with the user device to perform the task. Instantiating a process includes invoking the process if the process is not already running. If at least one instance of the process is running, instantiating a process includes executing an existing instance of the process or generating a new instance of the process. For example, instantiating an audio configuration process includes invoking the audio configuration process, using an existing audio configuration process, or generating a new instance of the audio configuration process. In some examples, instantiating a process includes performing the task using the process. For example, as illustrated in FIG. 19A, in accordance with the user intent to increase the volume to its maximum level, the digital assistant instantiates an audio configuration process to set the volume to its maximum level. In some examples, the digital assistant further provides a spoken output 1972 such as "OK, I turned the volume all the way up."

Figure 19B:
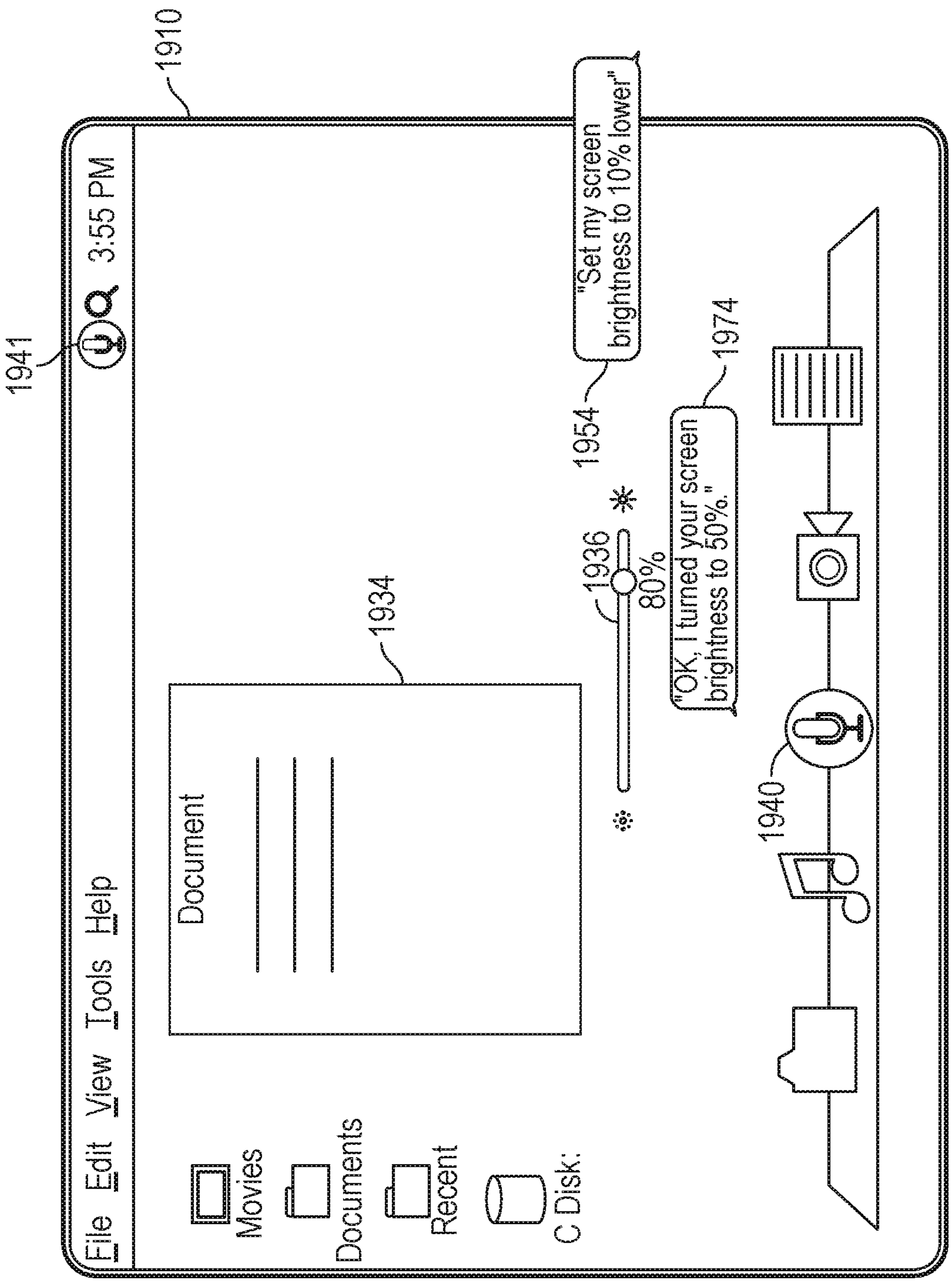

With reference to FIG. 19B, the user device displays a user interface 1934 associated with performing a task. For example, the task includes viewing or editing a document. The user may desire to lower the screen brightness for eye protection. In some examples, the user provides a speech input 1954 such as "Set my screen brightness to 10% lower." The digital assistant determines the user intent based on speech input 1954 and context information. For example, context information indicates that the current brightness configuration is at 90%. As a result, the digital assistant determines that the user intent is to reduce the brightness level from 90% to 80%. The digital assistant further determines whether the user intent indicates an informational request or a request for performing a task. For example, based on the determination that the user intent is to change the screen brightness to 80%, the digital assistant determines that a display configuration is to be varied, and therefore the user intent indicates a request for performing a task.

In some embodiments, in accordance with a determination that the user intent indicates a request for performing a task, the digital assistant instantiates a process to perform the task. For example, as illustrated in FIG. 19B, in accordance with the user intent to change the brightness level, the digital assistant instantiates a display configuration process to reduce the brightness level to 80%. In some examples, the digital assistant further provides a spoken output 1974 such as "OK, I turned your screen brightness to 80%." In some examples, as illustrated in FIG. 19B, the digital assistant provides an affordance 1936 enabling the user to manipulate a result of performing the task. For example, affordance 1936 can be a sliding bar allowing the user to further change the brightness level.

Figure 19C:
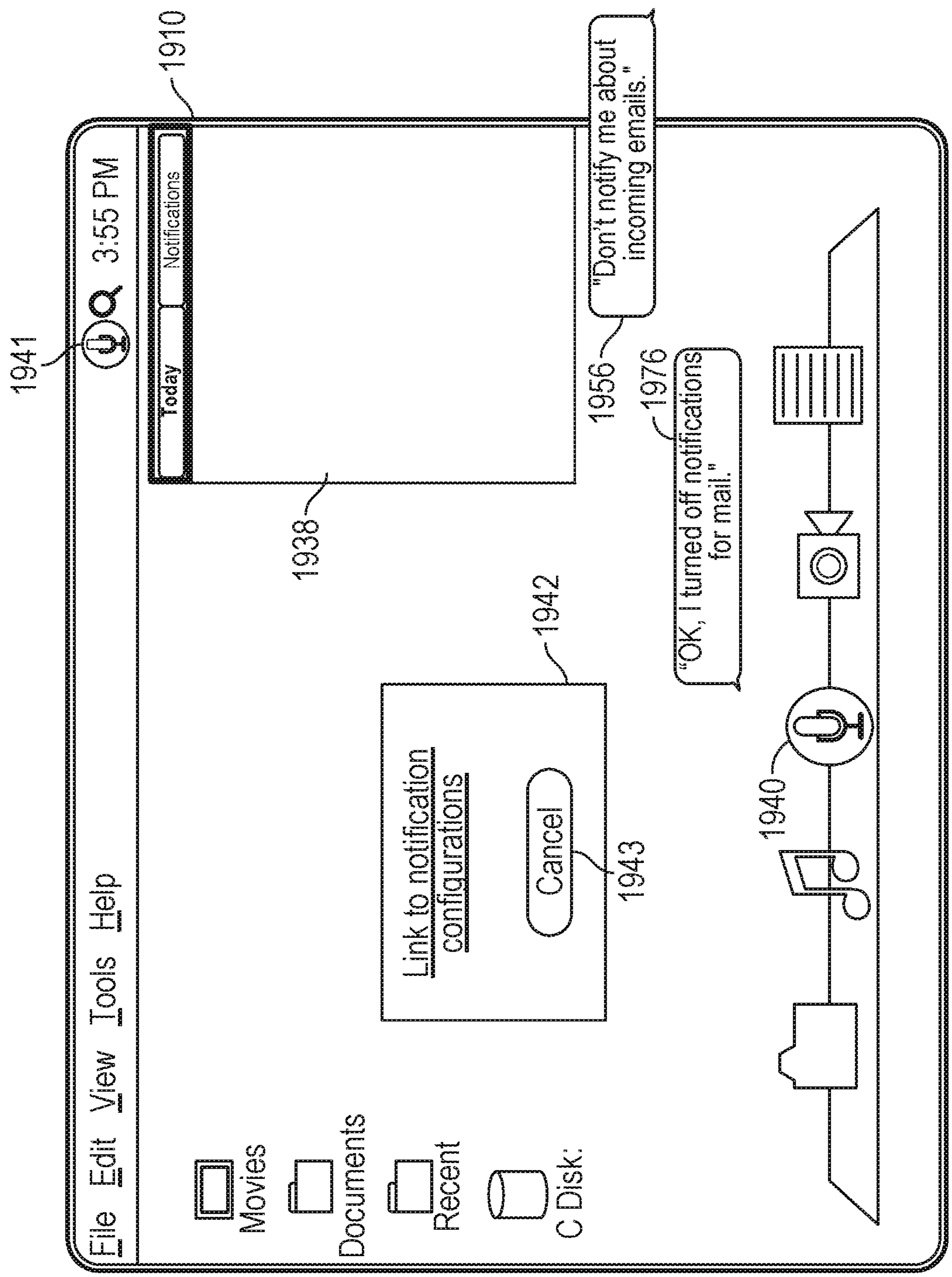

With reference to FIG. 19C, the user device displays a user interface 1938 associated with performing a task. For example, the task includes providing one or more notifications. A notification can include an alert of an email, a message, a reminder, or the like. In some examples, notifications are provided in user interface 1938. A notification can be displayed or provided to the user in real time or shortly after it is available at the user device. For example, a notification appears on user interface 1938 and/or user interface 1910 shorted after the user device receives it. Sometimes, the user may be performing an important task (e.g., editing a document) and may not want to be disturbed by the notifications. In some examples, the user provides a speech input 1956 such as "Don't notify me about incoming emails." The digital assistant determines that the user intent is to turn off the alert of mails. Based on the determination that the user intent is to turn off the alert of incoming emails, the digital assistant determines that a notification configuration is to be varied, and therefore the user intent indicates a request for performing a task.

In some embodiments, in accordance with a determination that the user intent indicates a request for performing a task, the digital assistant instantiates a process to perform the task. For example, as illustrated in FIG. 19C, in accordance with the user intent, the digital assistant instantiates a notification configuration process to turn off the alert of entails. In some examples, the digital assistant further provides a spoken output 1976 such as "OK, I turned off notifications for mail." In some examples, as illustrated in FIG. 19C, the digital assistant provides a user interface 1942 (e.g., a snippet or a window) enabling the user to manipulate a result of performing the task. For example, user interface 1942 provides an affordance 1943 (e.g., a cancel button). If the user desires to continue receiving notification of entails, for example, the user can select affordance 1943 to turn the notifications of emails back on. In some examples, the user can also provide another speech input, such as "Notify me of incoming emails" to turn on the notification of emails.

Figure 19D:
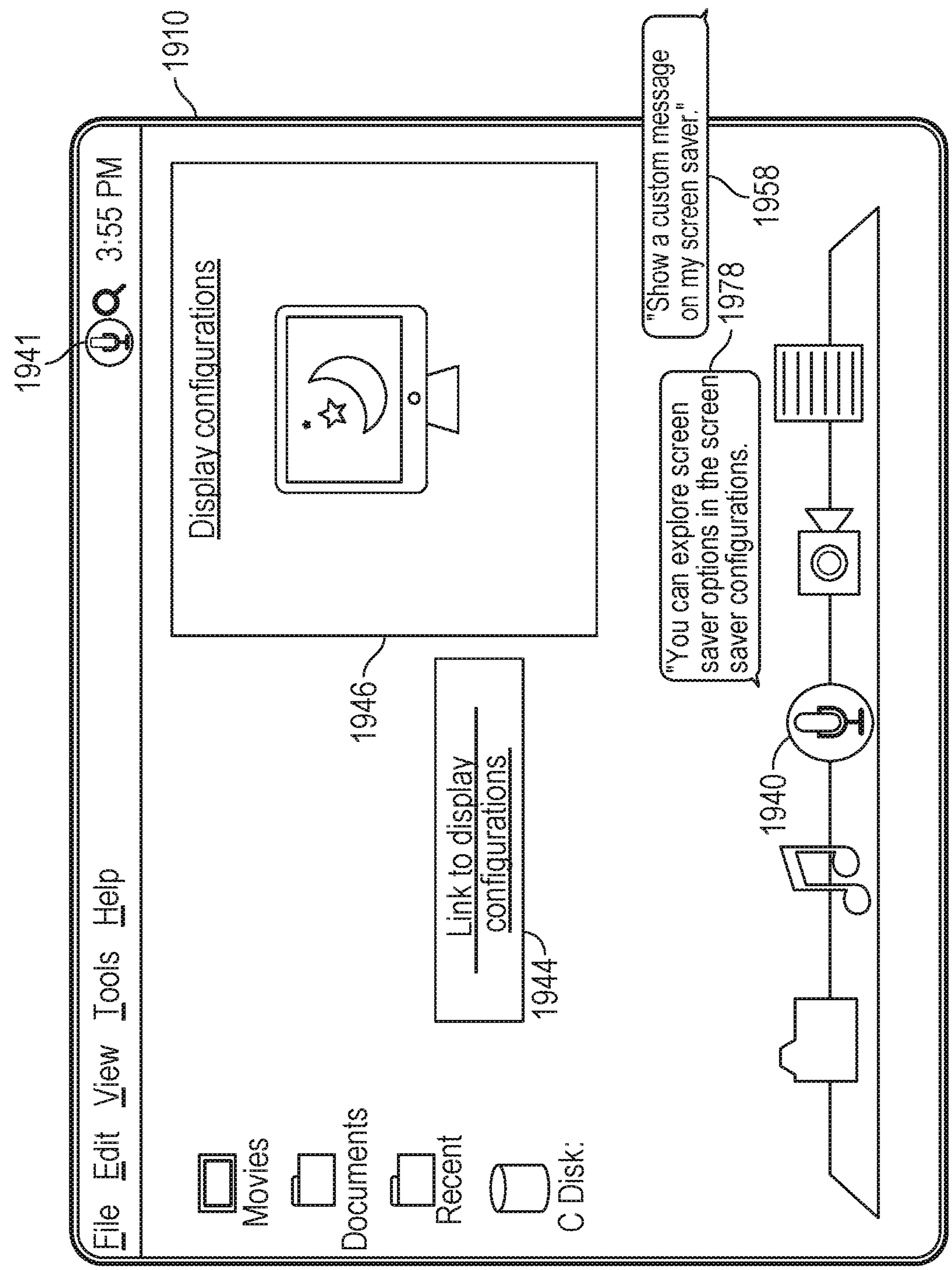

With reference to FIG. 19D, in some embodiments, the digital assistant may not be able to complete a task based on user's speech input and can thus provide a user interface to enable the user to perform the task. As shown in FIG. 19D, in some examples, the user provides a speech input 1958 such as "Show a custom message on my screen saver." The digital assistant determines that the user intent is to change the screen saver settings to show a custom message. The digital assistant further determines that the user intent is to vary a display configuration, and therefore the user intent indicates a request for performing a task.

In some embodiments, in accordance with a determination that the user intent indicates a request for performing a task, the digital assistant instantiates a process associated with the user device to perform the task. In some examples, if the digital assistant cannot complete the task based on the user intent, it provides a user interface enabling the user to perform the task. For example, based on speech input 1958, the digital assistant may not be able to determine the content of the custom message that is to be shown on the screen saver and therefore cannot complete the task of displaying the custom message. As illustrated in FIG. 19D, in some examples, the digital assistant instantiates a display configuration process and provides a user interface 1946 (e.g., a snippet or a window) to enable the user to manually change the screen saver settings. As another example, the digital assistant provides a link 1944 (e.g., a link to the display configurations) enabling the user to perform the task. The user selects link 1944 by using an input device such as a mouse, a finger, or a stylus. Upon receiving the user's selection, the digital assistant instantiates a display configuration process and displays user interface 1946 to enable the user to change the screen saver settings. In some examples, the digital assistant further provides a spoken output 1978 such as "You can explore screen saver options in the screen saver configurations."

7. Process for Operating a Digital Assistant—Intelligent Search and Object Management.

FIGS. 20A-20G illustrate a flow diagram of an exemplary process 2000 for operating a digital assistant in accordance with some embodiments. Process 2000 may be performed using one or more devices 104, 108, 200, 400, or 600 (FIGS. 1, 2A, 4, or 6A-B). Operations in process 2000 are, optionally, combined or split, and/or the order of some operations is, optionally, changed.

Figure 20A:
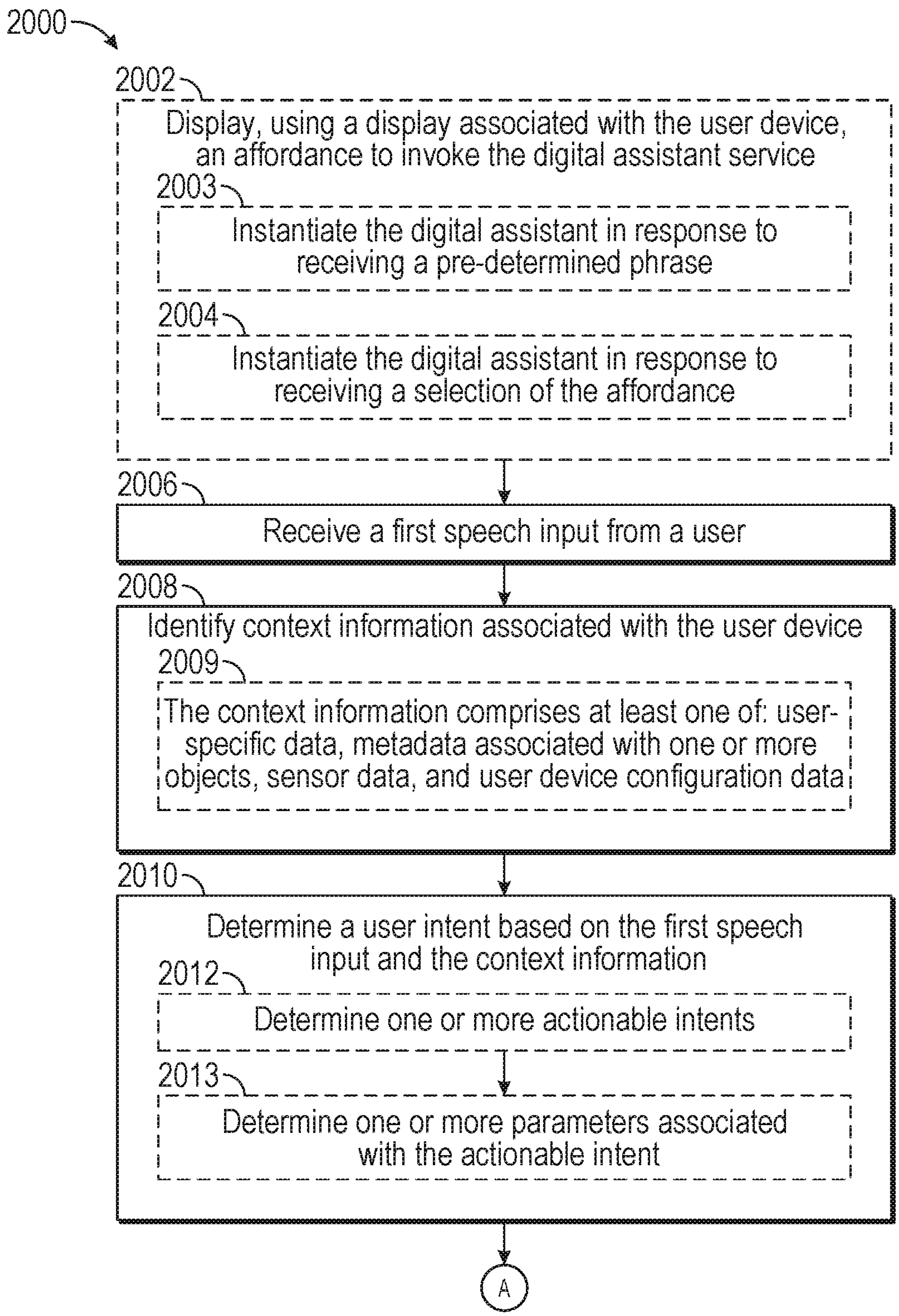
FIGS. 20A-20G illustrate a flow diagram of an exemplary process for operating a digital assistant according to various examples.

With reference to FIG. 20A, at block 2002, prior to receiving a first speech input, an affordance to invoke a digital assistant service is displayed on a display associated with a user device. At block 2003, the digital assistant is invoked in response to receiving a pre-determined phrase. At block 2004, the digital assistant is invoked in response to receiving a selection of the affordance.

At block 2006, a first speech input is received from a user. At block 2008, context information associated with the user device is identified. At block 2009, the context information includes at least one of: user-specific data, metadata associated with one or more objects, sensor data, and user device configuration data.

At block 2010, a user intent is determined based on the first speech input and the context information. At block 2012, to determine the user intent, one or more actionable intents are determined. At block 2013, one or more parameters associated with the actionable intent are determined.

Figure 20B:
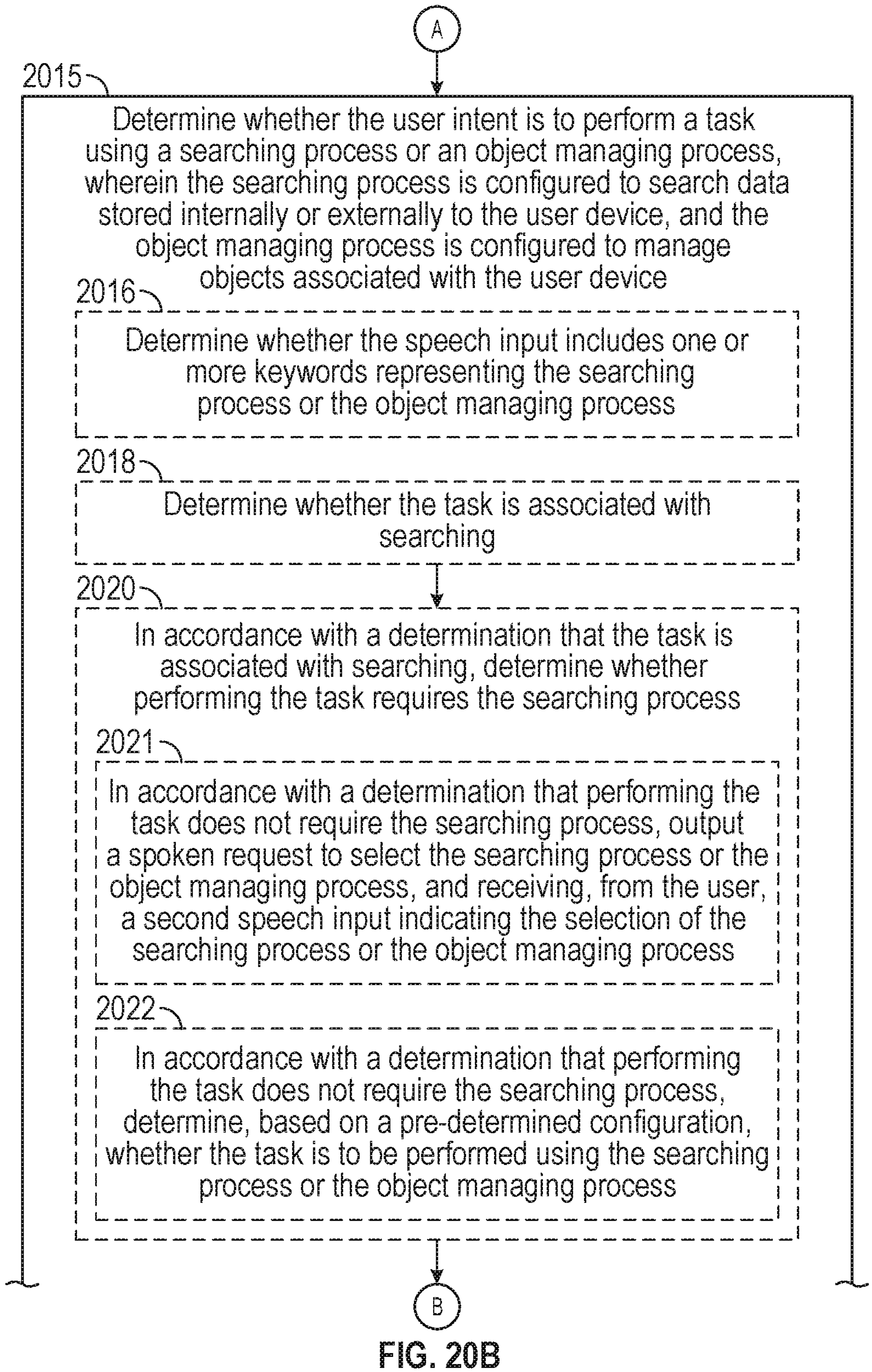

With reference to FIG. 20B, at block 2015, it is determined whether the user intent is to perform a task using a searching process or an object managing process. The searching process is configured to search data stored internally or externally to the user device, and the object managing process is configured to manage objects associated with the user device. At block 2016, it is determined whether the speech input includes one or more keywords representing the searching process or the object managing process. At block 2018, it is determined whether the task is associated with searching. At block 2020, in accordance with a determination that the task is associated with searching, it is determined whether performing the task requires the searching process. At block 2021, in accordance with a determination that performing the task does not require the searching process, a spoken request to select the searching process or the object managing process is outputted, and a second speech input is received from the user. The second speech input indicates the selection of the searching process or the object managing process.

At block 2022, in accordance with a determination that performing the task does not require the searching process, it is determined, based on a pre-determined configuration, whether the task is to be performed using the searching process or the object managing process.

Figure 20C:
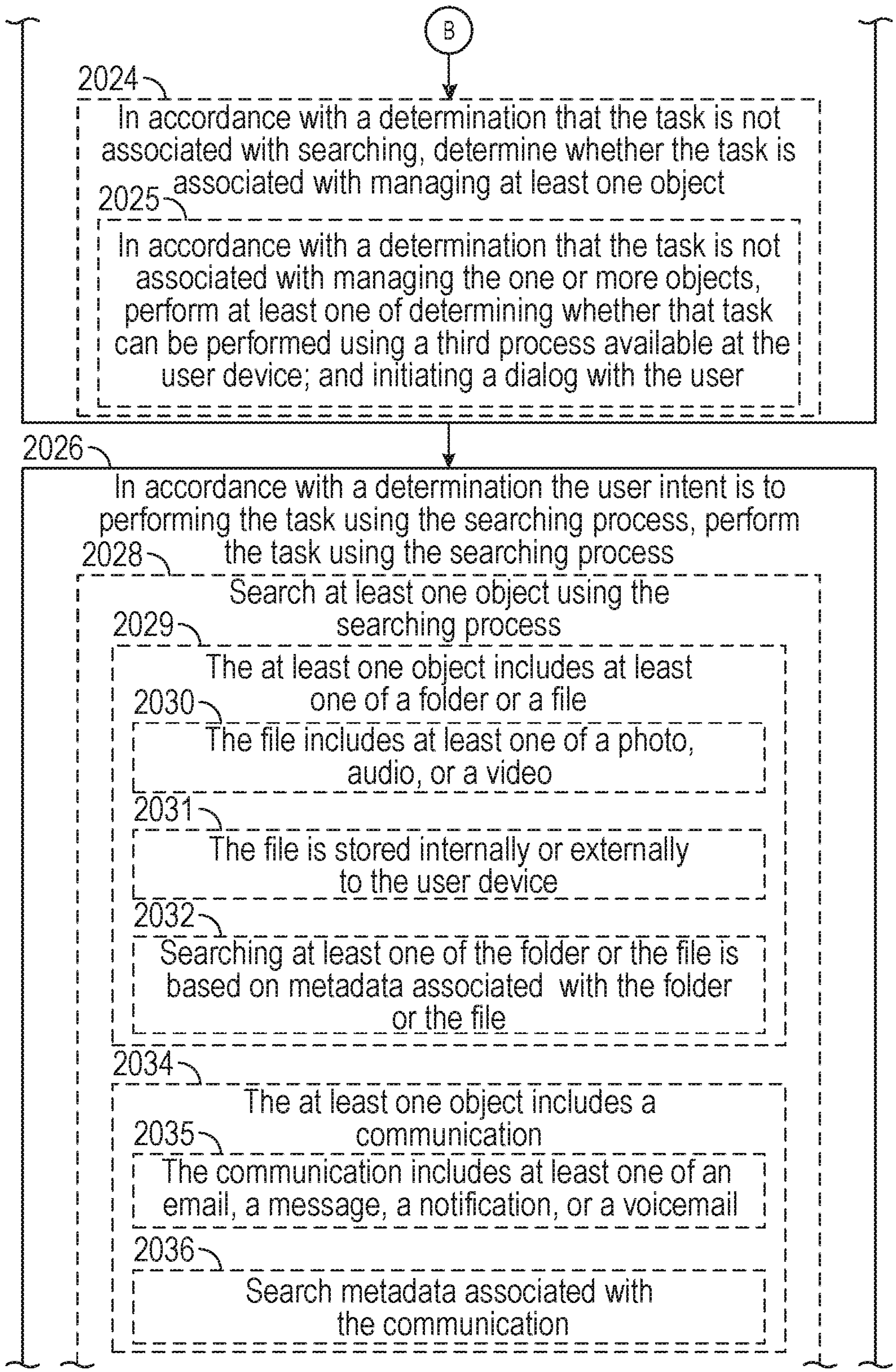

With reference to FIG. 20C, at block 2024, in accordance with a determination that the task is not associated with searching, it is determined whether the task is associated with managing at least one object. At block 2025, in accordance with a determination that the task is not associated with managing the at least one object, at least one of the following is performed: determining whether that task can be performed using a fourth process available to the user device and initiating a dialog with the user.

At block 2026, in accordance with a determination the user intent is to perform the task using the searching process, the task is performed using the searching process. At block 2028, at least one object is searched using the searching process. At block 2029, the at least one object includes at least one of a folder or a file. At block 2030, the file includes at least one of a photo, audio, or a video. At block 2031, the file is stored internally or externally to the user device. At block 2032, searching at least one of the folder or the file is based on metadata associated with the folder or the file. At block 2034, the at least one object includes a communication. At block 2035, the communication includes at least one of an email, a message, a notification, or a voicemail. At block 2036, metadata associated with the communication is searched.

Figure 20D:
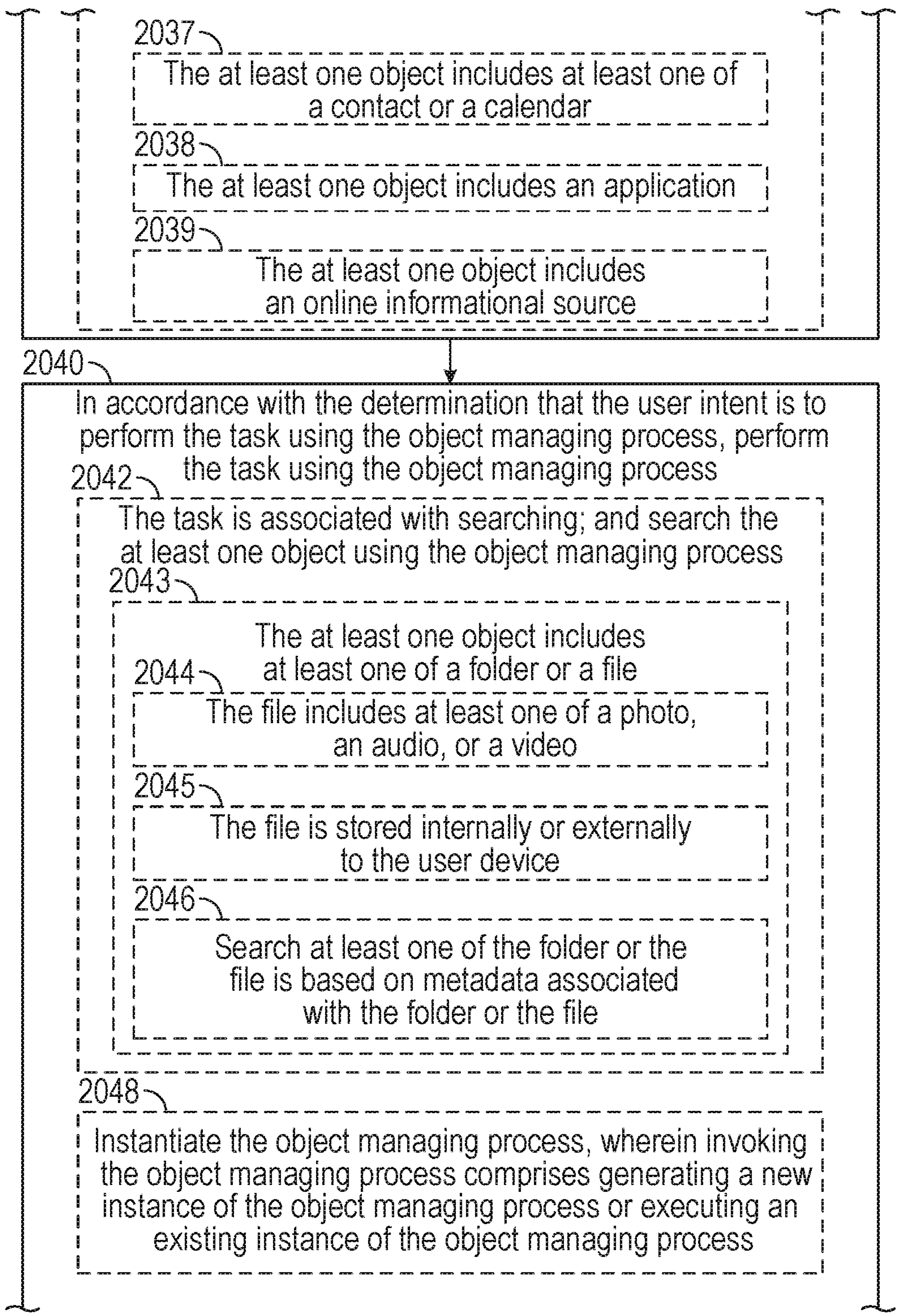

With reference to FIG. 20D, at block 2037, the at least one object includes at least one of a contact or a calendar. At block 2038, the at least one object includes an application. At block 2039, the at least one object includes an online informational source.

At block 2040, in accordance with the determination that the user intent is to perform the task using the object managing process, the task is performed using the object managing process. At block 2042, the task is associated with searching, and the at least one object is searched using the object managing process. At block 2043, the at least one object includes at least one of a folder or a file. At block 2044, the file includes at least one of a photo, an audio, or a video. At block 2045, the file is stored internally or externally to the user device. At block 2046, searching at least one of the folder or the file is based on metadata associated with the folder or the file.

At block 2048, the object managing process is instantiated. Instantiating the object managing process includes invoking the object managing process, generating a new instance of the object managing process, or executing an existing instance of the object managing process.

Figure 20E:
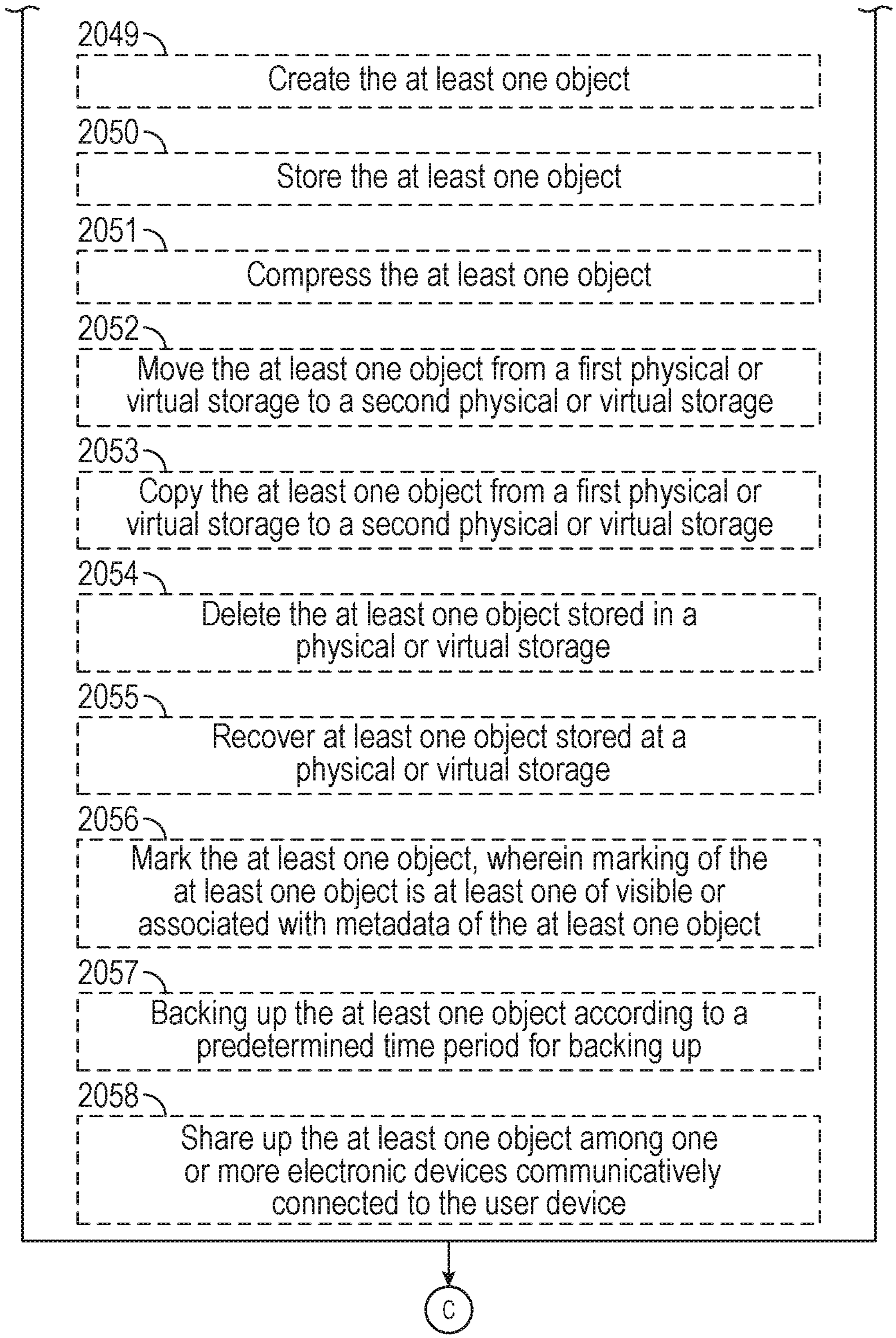

With reference to FIG. 20E, at block 2049 the at least one object is created. At block 2050, the at least one object is stored. At block 2051, the at least one object is compressed. At block 2052, the at least one object is moved from a first physical or virtual storage to a second physical or virtual storage. At block 2053, the at least one object is copied from a first physical or virtual storage to a second physical or virtual storage. At block 2054, the at least one object stored in a physical or virtual storage is deleted. At block 2055, the at least one object stored at a physical or virtual storage is recovered. At block 2056, the at least one object is marked. Marking of the at least one object is at least one of visible or associated with metadata of the at least one object. At block 2057, the at least one object is backup according to a predetermined time period for backing up. At block 2058, the at least one object is shared among one or more electronic devices communicatively connected to the user device.

Figure 20F:
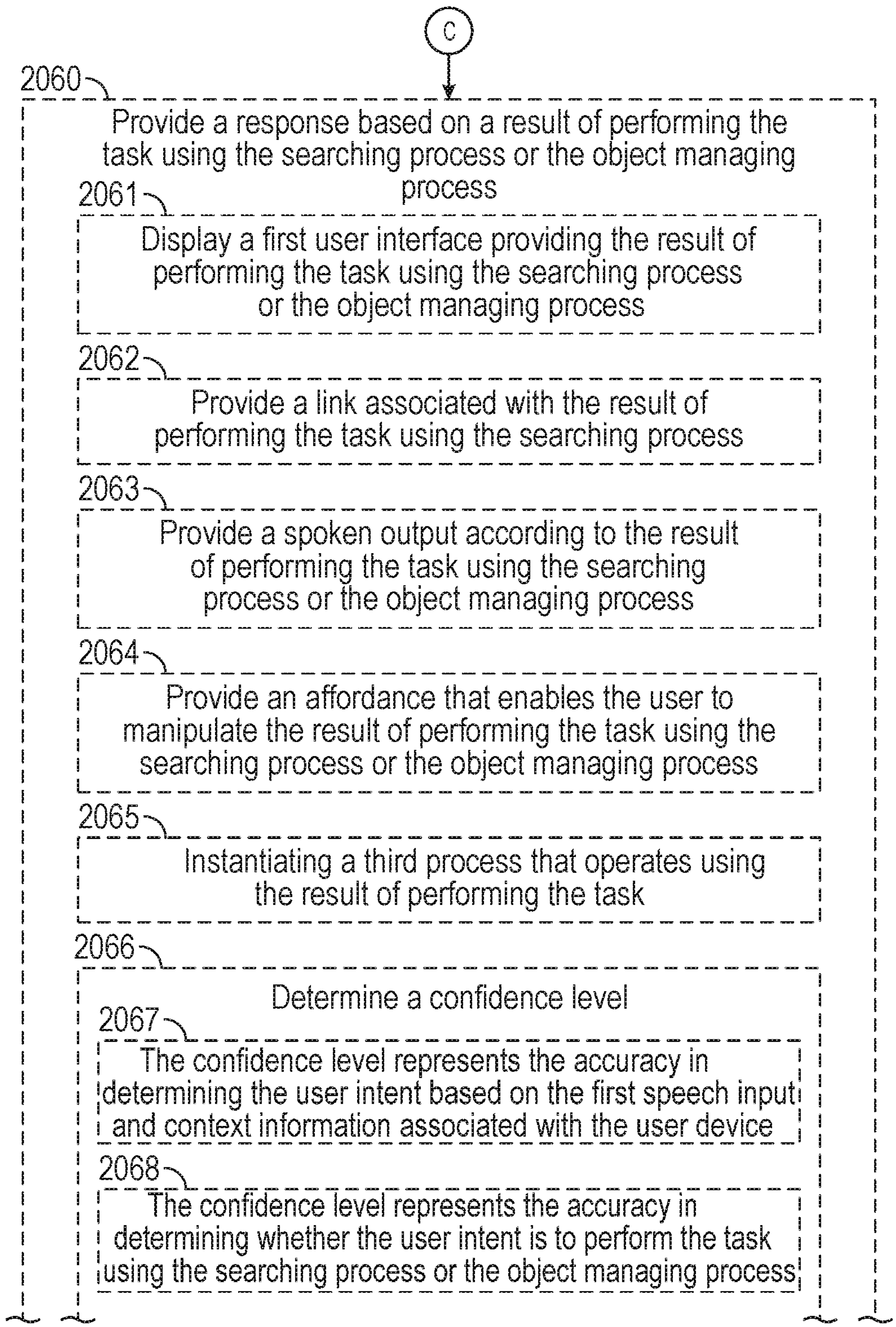

With reference to FIG. 20F, at block 2060, a response is provided based on a result of performing the task using the searching process or the object managing process. At block 2061, a first user interface is displayed providing the result of performing the task using the searching process or the object managing process. At block 2062, a link associated with the result of performing the task using the searching process is displayed. At block 2063, a spoken output is provided according to the result of performing the task using the searching process or the object managing process.

At block 2064, it is provided an affordance that enables the user to manipulate the result of performing the task using the searching process or the object managing process. At block 2065, it is instantiated a third process that operates using the result of performing the task.

With reference to FIG. 20F, at block 2066, a confidence level is determined. At block 2067, the confidence level represents the accuracy in determining the user intent based on the first speech input and context information associated with the user device. At block 2068, the confidence level represents the accuracy in determining whether the user intent is to perform the task using the searching process or the object managing process.

Figure 20G:
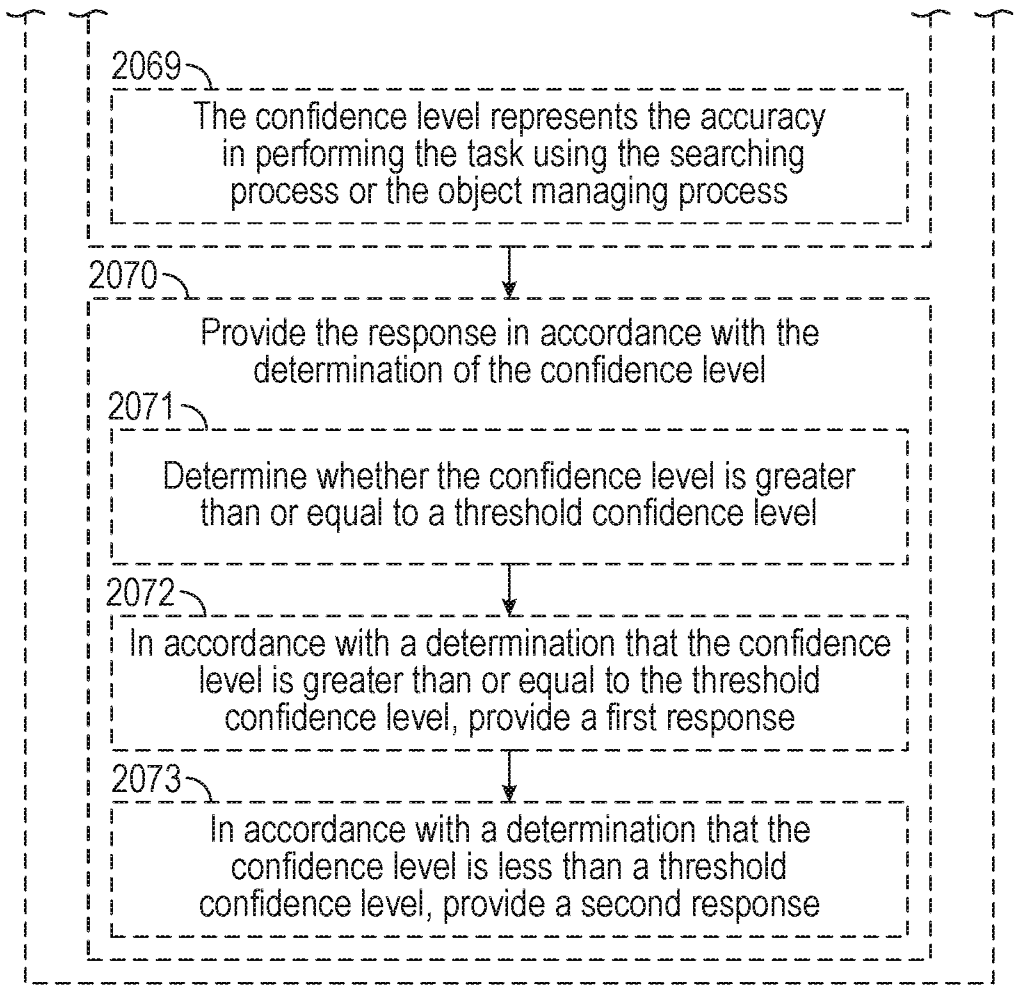

With reference to FIG. 20G, at block 2069, the confidence level represents the accuracy in performing the task using the searching process or the object managing process.

At block 2070, the response is provided in accordance with the determination of the confidence level. At block 2071, it is determined whether the confidence level is greater than or equal to a threshold confidence level. At block 2072, in accordance with a determination that the confidence level is greater than or equal to the threshold confidence level, a first response is provided. At block 2073, in accordance with a determination that the confidence level is less than a threshold confidence level, a second response is provided.

8. Process for Operating a Digital Assistant—Continuity.

FIGS. 21A-21E illustrate a flow diagram of an exemplary process 2100 for operating a digital assistant in accordance with some embodiments. Process 2100 may be performed using one or more devices 104, 108, 200, 400, 600, 1400, 1500, 1600, or 1700 (FIGS. 1, 2A, 4, 6A-6B, 14A-14D, 15A-15D, 16A-16C, and 17A-17E). Operations in process 2100 are, optionally, combined or split and/or the order of some operations is, optionally, changed.

Figure 21A:
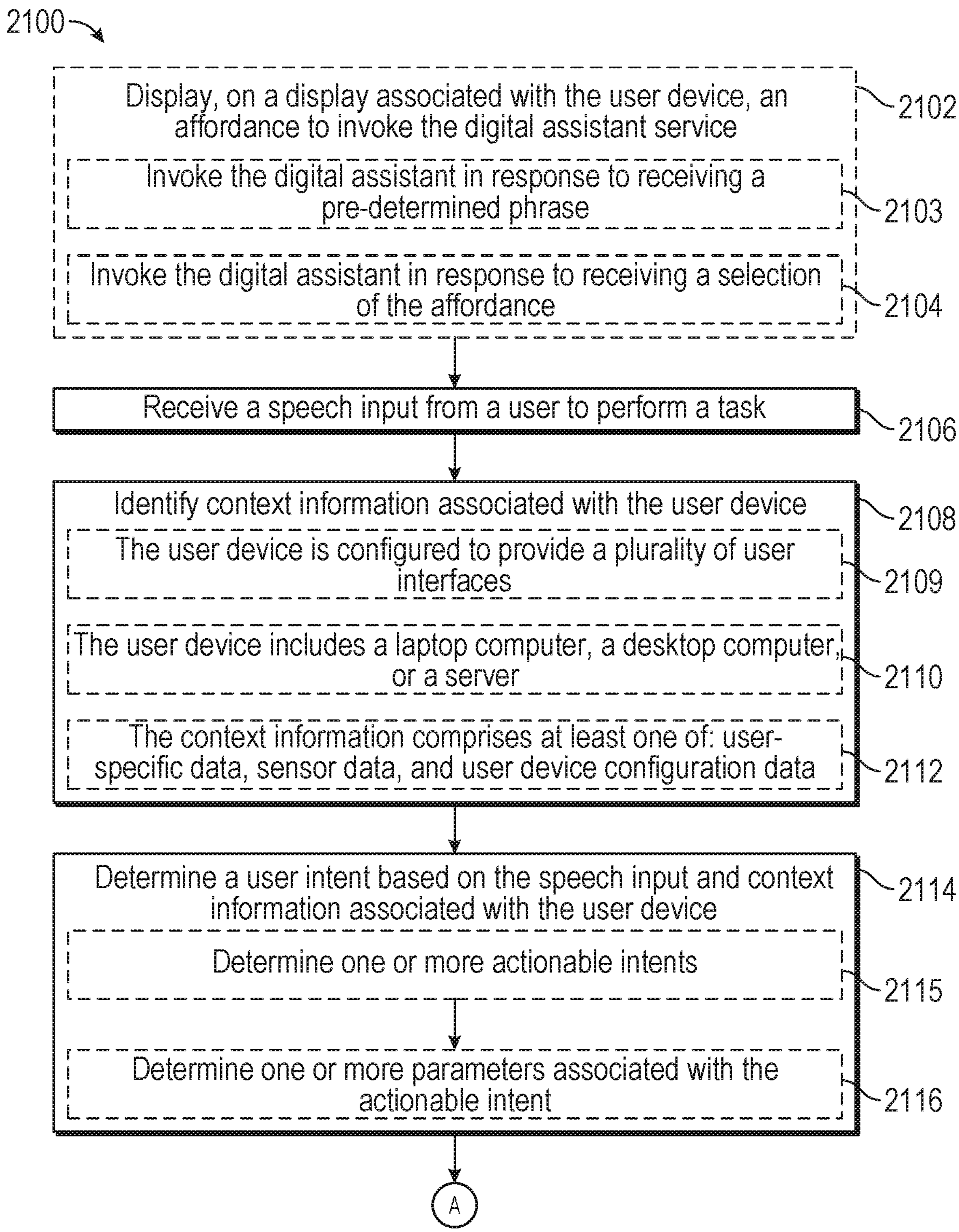
FIGS. 21A-21E illustrate a flow diagram of an exemplary process for operating a digital assistant according to various examples.

With reference to FIG. 21A, at block 2102, prior to receiving a first speech input, an affordance to invoke a digital assistant service is displayed on a display associated with a user device. At block 2103, the digital assistant is invoked in response to receiving a pre-determined phrase. At block 2104, the digital assistant is invoked in response to receiving a selection of the affordance.

At block 2106, a first speech input is received from a user to perform a task. At block 2108, context information associated with the user device is identified. At block 2109, the user device is configured to provide a plurality of user interfaces. At block 2110, the user device includes a laptop computer, a desktop computer, or a server. At block 2112, the context information includes at least one of: user-specific data, metadata associated with one or more objects, sensor data, and user device configuration data.

At block 2114, a user intent is determined based on the speech input and the context information. At block 2115, to determine the user intent, one or more actionable intents are determined. At block 2116, one or more parameters associated with the actionable intent are determined.

Figure 21B:
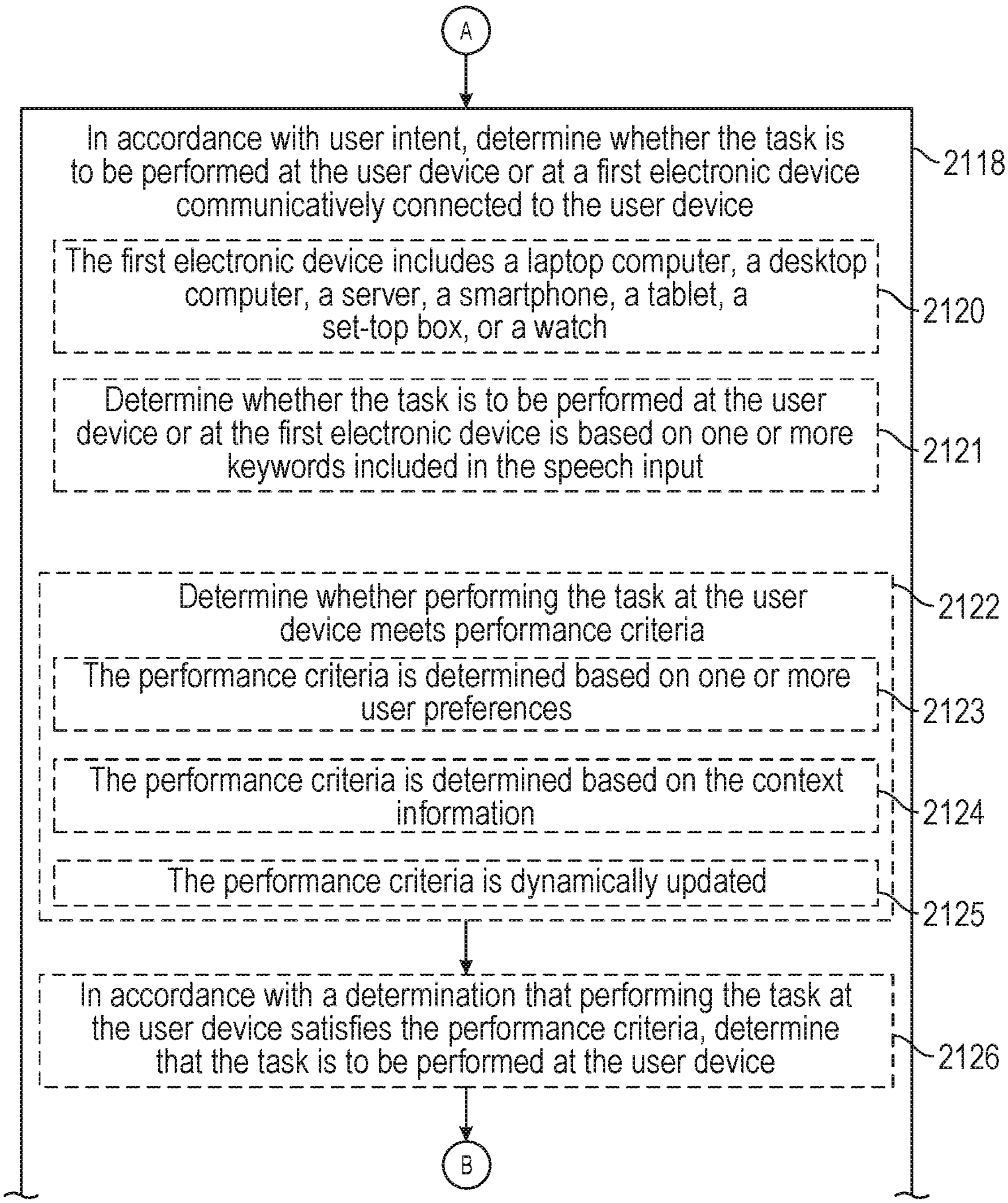

With reference to FIG. 21B, at block 2118, in accordance with user intent, it is determined whether the task is to be performed at the user device or at a first electronic device communicatively connected to the user device. At block 2120, the first electronic device includes a laptop computer, a desktop computer, a server, a smartphone, a tablet, a set-top box, or a watch. At block 2121, determining whether the task is to be performed at the user device or at the first electronic device is based on one or more keywords included in the speech input. At block 2122, it is determined whether performing the task at the user device satisfies performance criteria. At block 2123, the performance criteria are determined based on one or more user preferences. At block 2124, the performance criteria are determined based on the device configuration data. At block 2125, the performance criteria are dynamically updated. At block 2126, in accordance with a determination that performing the task at the user device satisfies the performance criteria, it is determined that the task is to be performed at the user device.

Figure 21C:
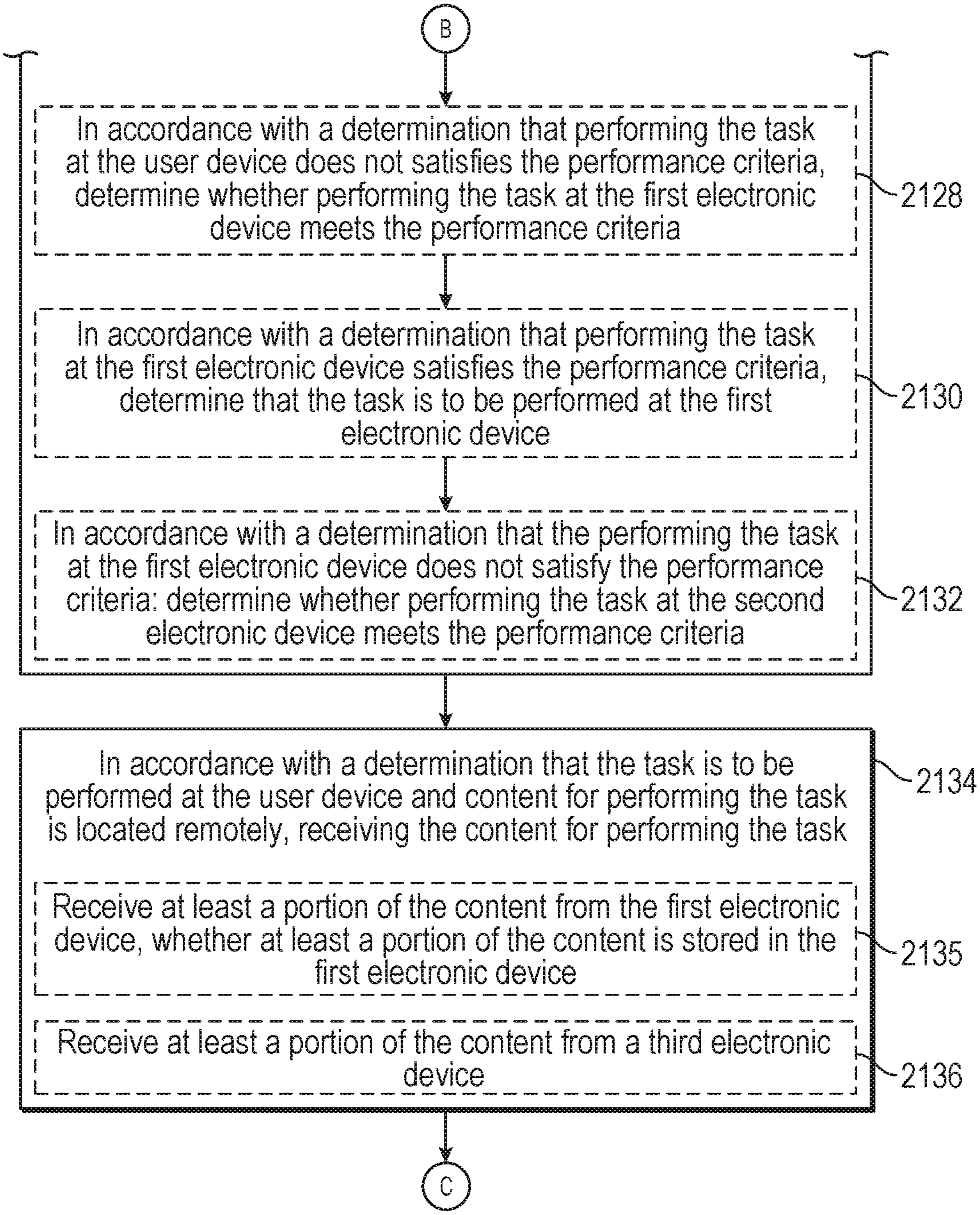

With reference to FIG. 21C, at block 2128, in accordance with a determination that performing the task at the user device does not satisfy the performance criteria, it is determined whether performing the task at the first electronic device satisfies the performance criteria. At block 2130, in accordance with a determination that performing the task at the first electronic device satisfies the performance criteria, it is determined that the task is to be performed at the first electronic device. At block 2132, in accordance with a determination that performing the task at the first electronic device does not meet the performance criteria, it is determined whether performing the task at the second electronic device satisfies the performance criteria.

At block 2134, in accordance with a determination that the task is to be performed at the user device and content for performing the task is located remotely, the content for performing the task is received. At block 2135, at least a portion of the content is received from the first electronic device. At least a portion of the content is stored in the first electronic device. At block 2136, at least a portion of the content is received from a third electronic device.

Figure 21D:
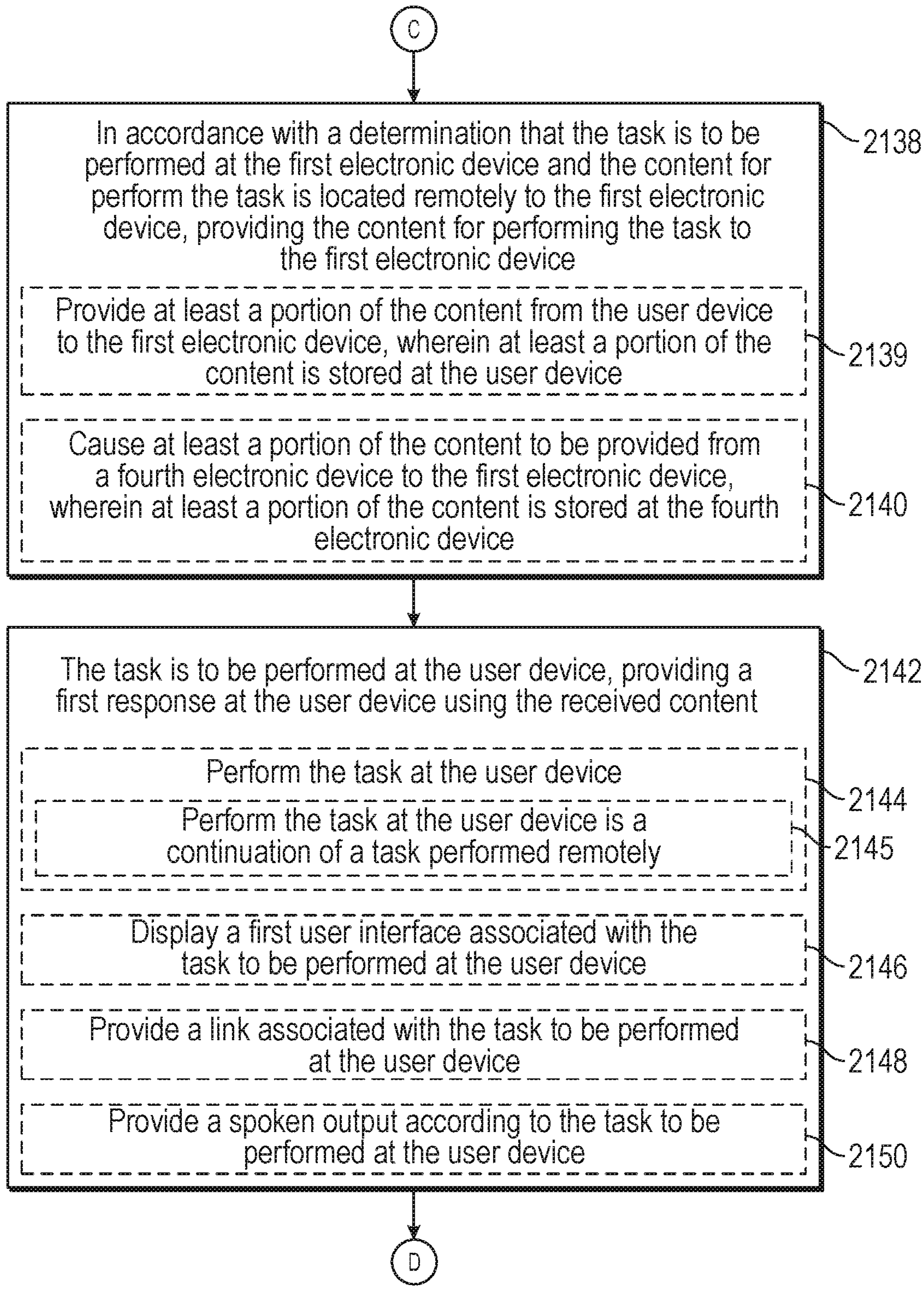

With reference to FIG. 21D, at block 2138, in accordance with a determination that the task is to be performed at the first electronic device and the content for performing the task is located remotely to the first electronic device, the content for performing the task is provided to the first electronic device. At block 2139, at least a portion of the content is provided from the user device to the first electronic device. At least a portion of the content is stored at the user device. At block 2140, at least a portion of the content is caused to be provided from a fourth electronic device to the first electronic device. At least a portion of the content is stored at the fourth electronic device.

At block 2142, the task is to be performed at the user device. A first response is provided at the user device using the received content. At block 2144, the task is performed at the user device. At block 2145, performing the task at the user device is a continuation of a task partially performed remotely to the user device. At block 2146, a first user interface is displayed associated with the task to be performed at the user device. At block 2148, a link associated with the task is to be performed at the user device. At block 2150, a spoken output is provided according to the task to be performed at the user device.

Figure 21E:
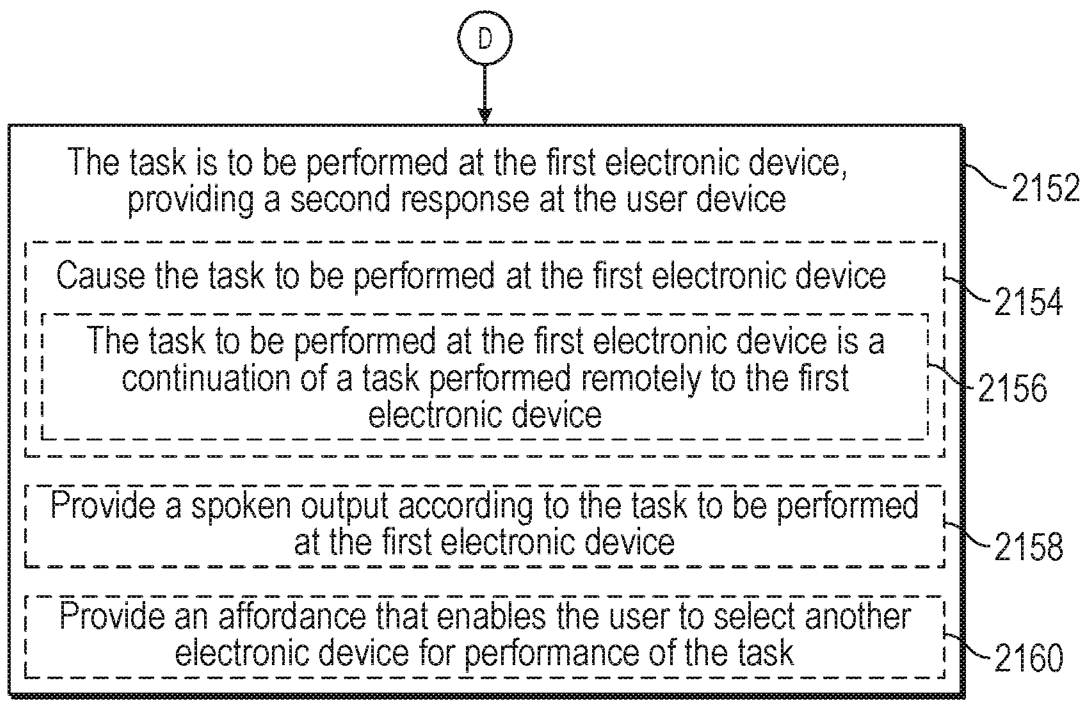

With reference to FIG. 21E, at block 2152, the task is to be performed at the first electronic device, and a second response is provided at the user device. At block 2154, the task is to be performed at the first electronic device. At block 2156, the task to be performed at the first electronic device is a continuation of a task performed remotely to the first electronic device. At block 2158, a spoken output is provided according to the task to be performed at the first electronic device. At block 2160, a spoken output is provided according to the task to be performed at the first electronic device.

9. Process for Operating a Digital Assistant—System Configuration Management.

FIGS. 22A-22D illustrate a flow diagram of an exemplary process 2200 for operating a digital assistant in accordance with some embodiments. Process 2200 may be performed using one or more devices 104, 108, 200, 400, 600, or 1800 (FIGS. 1, 2A, 4, 6A-6B, and 18C-18D). Operations in process 2200 are, optionally, combined or split, and/or the order of some operations is, optionally, changed.

Figure 22A:
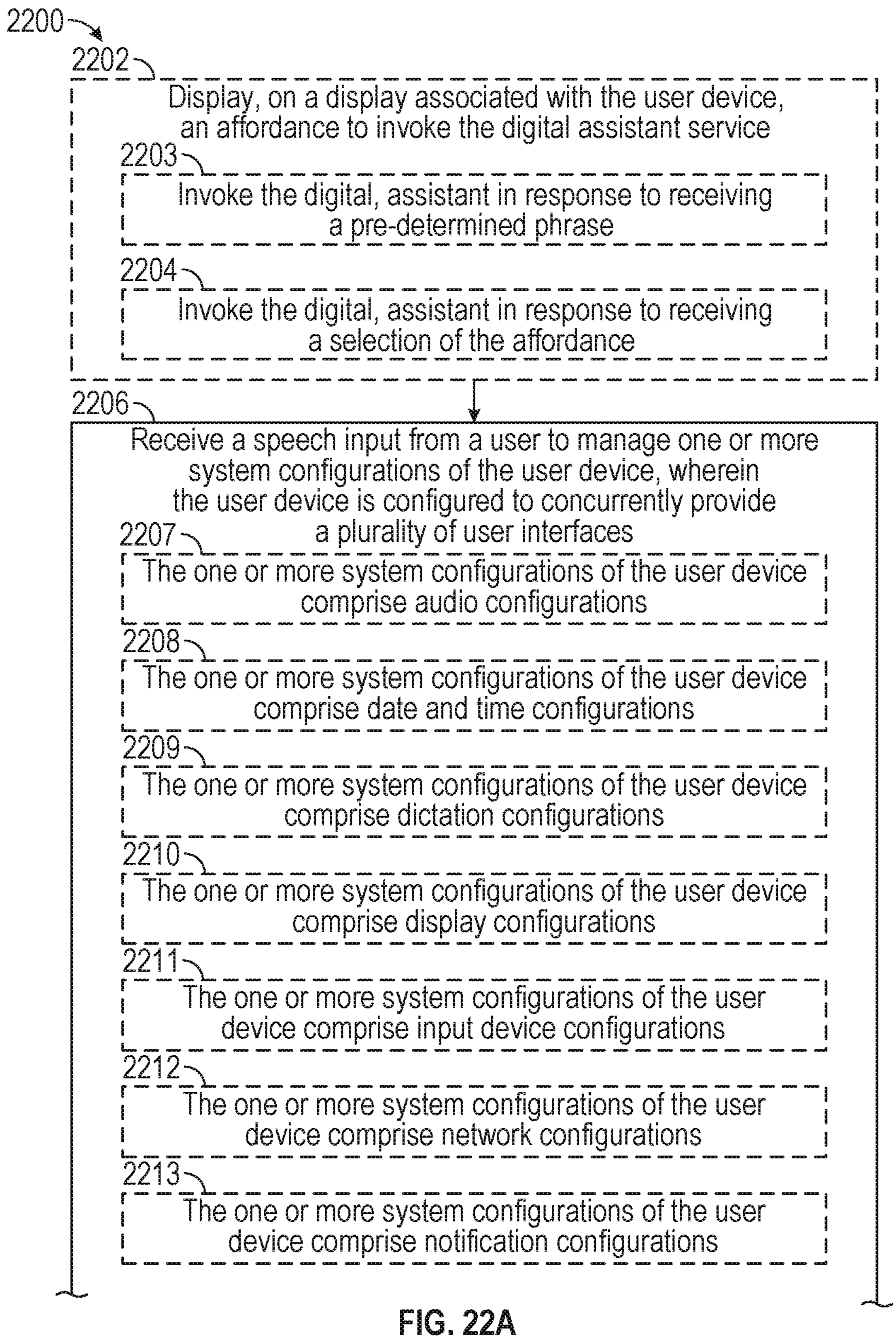
FIGS. 22A-22D illustrate a flow diagram of an exemplary process for operating a digital assistant according to various examples.

With reference to FIG. 22A, at block 2202, prior to receiving a speech input, an affordance to invoke a digital assistant service is displayed on a display associated with a user device. At block 2203, the digital assistant is invoked in response to receiving a pre-determined phrase. At block 2204, the digital assistant is invoked in response to receiving a selection of the affordance.

At block 2206, a speech input is received from a user to manage one or more system configurations of the user device. The user device is configured to concurrently provide a plurality of user interfaces. At block 2207, the one or more system configurations of the user device comprise audio configurations. At block 2208, the one or more system configurations of the user device comprise date and time configurations. At block 2209, the one or more system configurations of the user device comprise dictation configurations. At block 2210, the one or more system configurations of the user device comprise display configurations. At block 2211, the one or more system configurations of the user device comprise input device configurations. At block 2212, the one or more system configurations of the user device comprise network configurations. At block 2213, the one or more system configurations of the user device comprise notification configurations.

Figure 22B:
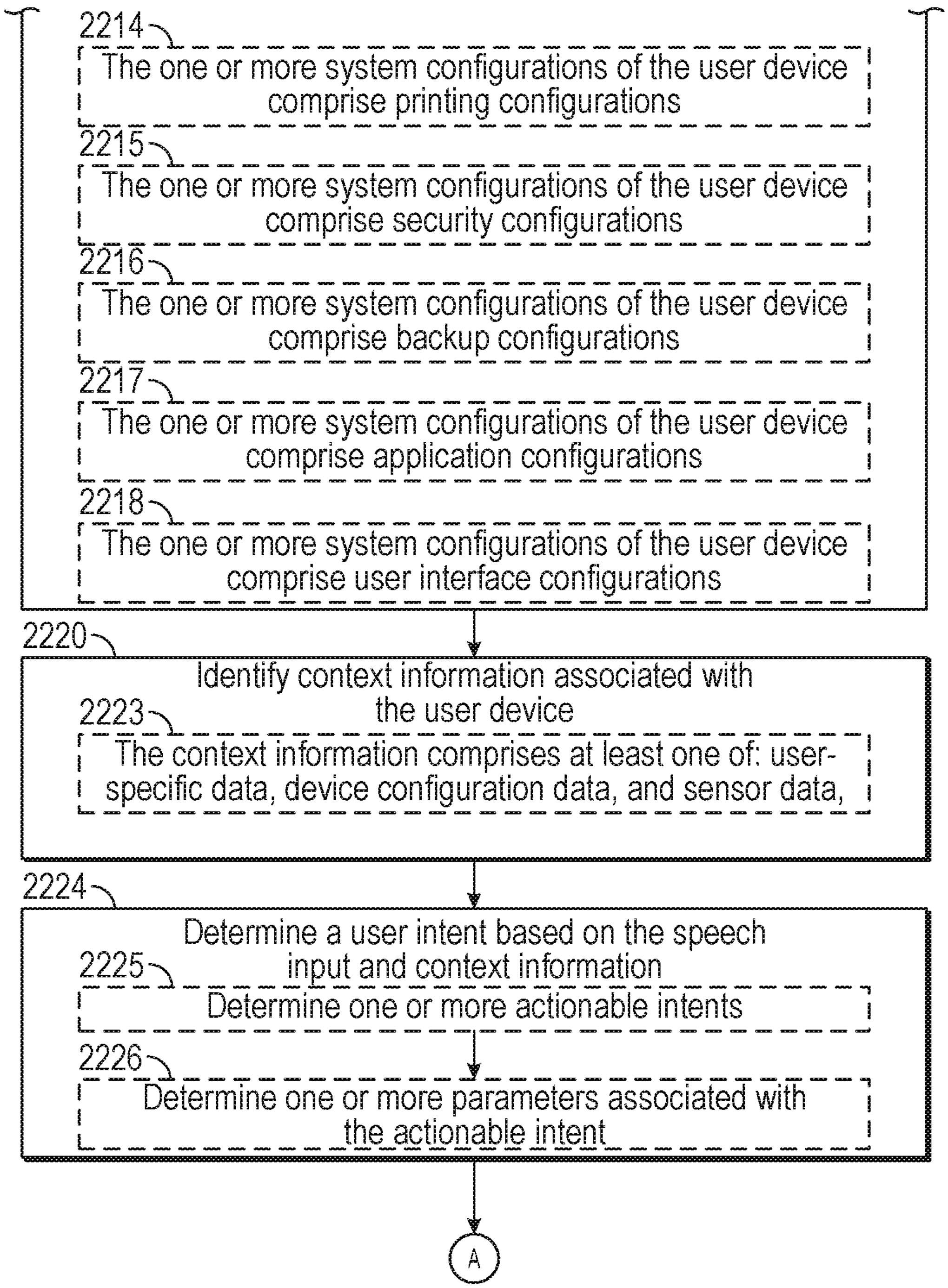

With reference to FIG. 22B, at block 2214, the one or more system configurations of the user device comprise printer configurations. At block 2215, the one or more system configurations of the user device comprise security configurations. At block 2216, the one or more system configurations of the user device comprise backup configurations. At block 2217, the one or more system configurations of the user device comprise application configurations. At block 2218, the one or more system configurations of the user device comprise user interface configurations.

At block 2220, context information associated with the user device is identified. At block 2223, the context information comprises at least one of: user-specific data, device configuration data, and sensor data. At block 2224, the user intent is determined based on the speech input and the context information. At block 2225, one or more actionable intents are determined. At block 2226, one or more parameters associated with the actionable intent are determined.

Figure 22C:
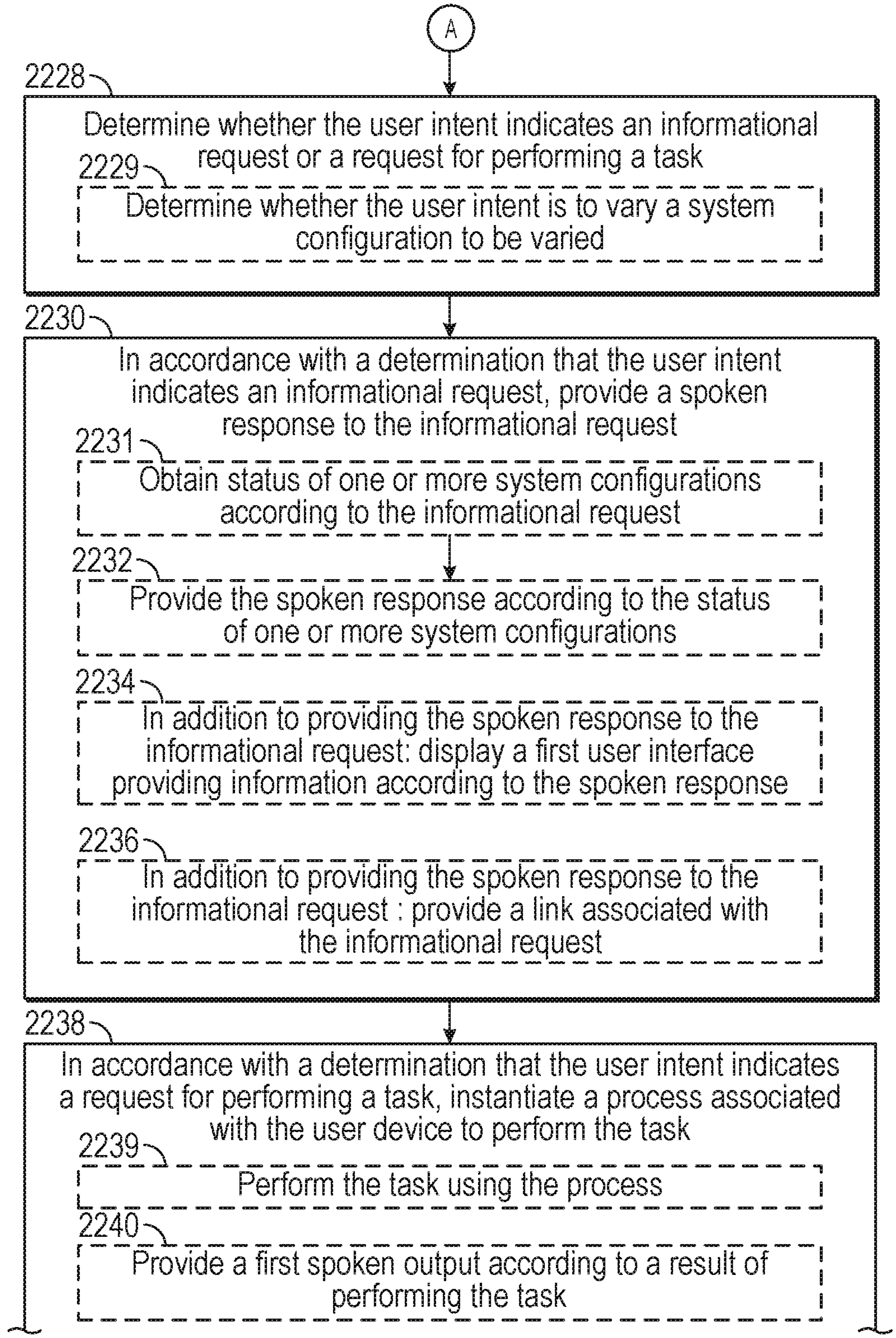

With reference to FIG. 22C, at block 2228, it is determined whether the user intent indicates an informational request or a request for performing a task. At block 2229, it is determined whether the user intent is to vary a system configuration.

At block 2230, in accordance with a determination that the user intent indicates an informational request, a spoken response is provided to the informational request. At block 2231, status of one or more system configurations is obtained according to the informational request. At block 2232, the spoken response is provided according to the status of one or more system configurations.

At block 2234, in addition to providing the spoken response to the informational request, a first user interface is displayed to provide information according to the status of the one or more system configurations. At block 2236, in addition to providing the spoken response to the informational request, a link associated with the informational request is provided.

At block 2238, in accordance with a determination that the user intent indicates a request for performing a task, a process associated with the user device is instantiated to perform the task. At block 2239, the task is performed using the process. At block 2240, a first spoken output is provided according to a result of performing the task.

Figure 22D:
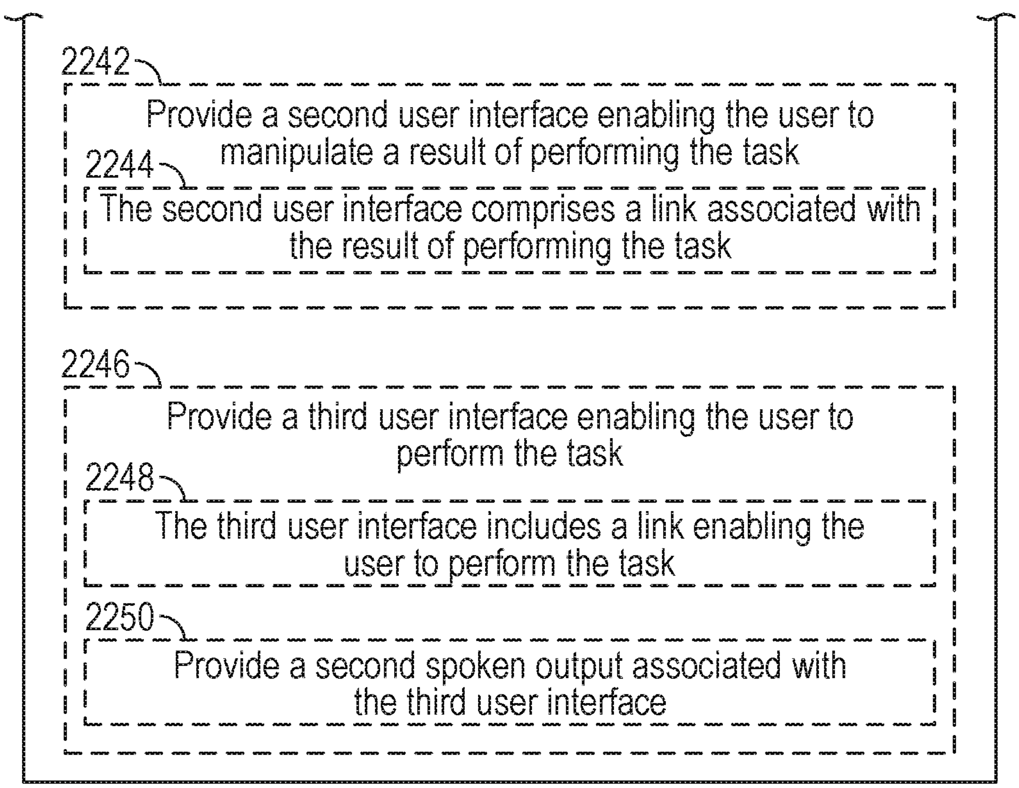

With reference to FIG. 22D, at block 2242, a second user interface is provided to enable the user to manipulate a result of performing the task. At block 2244, the second user interface comprises a link associated with the result of performing the task.

At block 2246, a third user interface is provided to enable the user to perform the task. At block 2248, the third user interface includes a link enabling the user to perform the task. At block 2250, a second spoken output associated with the third user interface is provided.

10. Electronic Device—Intelligent Search and Object Management

Figure 23:
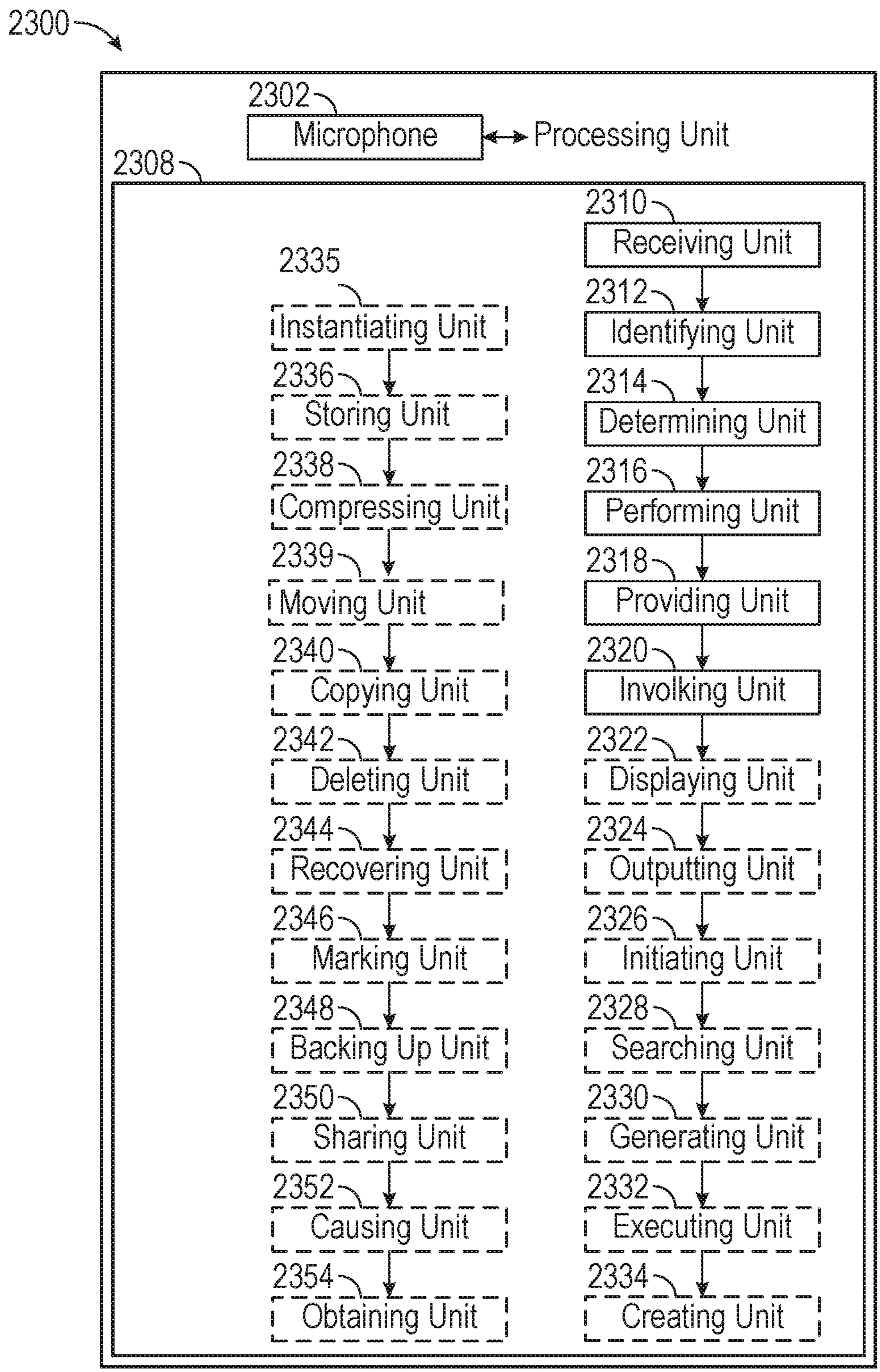
FIG. 23 illustrates a block diagram of an electronic device according to various examples.

FIG. 23 shows a functional block diagram of electronic device 2300 configured in accordance with the principles of the various described examples, including those described with reference to FIGS. 8A-8F, 9A-9H, 10A-10B, 11A-11F, 12A-12D, 13A-13C, 14A-14D, 15A-15D, 16A-16C, 17A-17E, 18A-18F, and 19A-19D. The functional blocks of the device can be optionally implemented by hardware, software, or a combination of hardware and software to carry out the principles of the various described examples. It is understood by persons of skill in the art that the functional blocks described in FIG. 23 can be optionally combined or separated into sub-blocks to implement the principles of the various described examples. Therefore, the description herein optionally supports any possible combination, separation, or further definition of the functional blocks described herein.

As shown in FIG. 23, electronic device 2300 can include a microphone 2302 and processing unit 2308. In some examples, processing unit 2308 includes a receiving unit 2310, a an identifying unit 2312, a determining unit 2314, a performing unit 2316, a providing unit 2318, an instantiating unit 2320, a displaying unit 2322, an outputting unit 2324, an initiating unit 2326, a searching unit 2328, a generating unit 2330, an executing unit 2332, a creating unit 2334, an instantiating unit 2335, a storing unit 2336, a compressing unit 2338, a copying unit 2340, a deleting unit 2342, a recovering unit 2344, a marking unit 2346, a backing up unit 2348, a sharing unit 2350, a causing unit 2352, and an obtaining unit 2354.

In some examples, the processing unit 2308 is configured to receive (e.g., with the receiving unit 2310) a first speech input from a user; identify (e.g., with the identifying unit 2312) context information associated with the user device; and determine (e.g., with the determining unit 2314) a user intent based on the first speech input and the context information.

In some examples, the processing unit 2308 is configured to determine (e.g., with the determining unit 2314) whether the user intent is to perform a task using a searching process or an object managing process. The searching process is configured to search data stored internally or externally to the user device, and the object managing process is configured to manage objects associated with the user device.

In some examples, in accordance with a determination the user intent is to perform the task using the searching process, the processing unit 2308 is configured to perform (e.g., with the performing unit 2316) the task using the searching process. In some examples, in accordance with the determination that the user intent is to perform the task using the object managing process, the processing unit 2308 is configured to perform (e.g., with the performing unit 2316) the task using the object managing process.

In some examples, prior to receiving the first speech input, the processing unit 2308 is configured to display (e.g., with the displaying unit 2322), on a display associated with the user device, an affordance to invoke the digital assistant service.

In some examples, the processing unit 2308 is configured to invoke (e.g., with the invoking unit 2320) the digital assistant in response to receiving a pre-determined phrase.

In some examples, the processing unit 2308 is configured to invoke (e.g., with the invoking unit 2320) the digital assistant in response to receiving a selection of the affordance.

In some examples, the processing unit 2308 is configured to determine with the determining unit 2314) one or more actionable intents; and determine (e.g., with determining unit 2314) one or more parameters associated with the actionable intent.

In some examples, the context information comprises at least one of: user-specific data, metadata associated with one or more objects, sensor data, and user device configuration data.

In some examples, the processing unit 2308 is configured to determine (e.g., with the determining unit 2314) whether the speech input includes one or more keywords representing the searching process or the object managing process.

In some examples, the processing unit 2308 is configured to determine (e.g., with the determining unit 2314) whether the task is associated with searching. In accordance with a determination that the task is associated with searching, the processing unit 2308 is configured to determine with the determining unit 2314) whether performing the task requires the searching process; and in accordance with a determination that the task is not associated with searching, determine (e.g., with the determining unit 2314) whether the task is associated with managing at least one object.

In some examples, the task is associated with searching, and in accordance with a determination that performing the task does not require the searching process, the processing unit 2308 is configured to output (e.g., with the outputting unit 2324) a spoken request to select the searching process or the object managing process and receive (e.g., with the receiving unit 2310), from the user, a second speech input indicating the selection of the searching process or the object managing process.

In some examples, the task is associated with searching, and in accordance with a determination that performing the task does not require the searching process, the processing unit 2308 is configured to determine (e.g., with the determining unit 2314), based on a pre-determined configuration, whether the task is to be performed using the searching process or the object managing process.

In some examples, the task is not associated with searching, and in accordance with a determination that the task is not associated with managing the at least one object, the processing unit 2308 is configured to perform (e.g., with the performing unit 2316) at least one of: determining (e.g., with the determining unit 2314) whether that task can be performed using a fourth process available to the user device; and initiating (e.g., with the initiating unit 2326) dialog with the user.

In some examples, the processing unit 2308 is configured to search (e.g., with the searching unit 2328) at least one object using the searching process.

In some examples, the at least one object includes at least one of a folder or a file. The file includes at least one of a photo, audio, or a video. The file is stored internally or externally to the user device.

In some examples, searching at least one of the folder or the file is based on metadata associated with the folder or the file.

In some examples, the at least one object includes a communication. The communication includes at least one of an email, a message, a notification, or a voicemail.

In some examples, the processing unit 2308 is configured to search (e.g., with the searching unit 2328) metadata associated with the communication.

In some examples, the at least one object includes at least one of a contact or a calendar.

In some examples, the at least one object includes an application.

In some examples, the at least one object includes an online informational source.

In some examples, the task is associated with searching, and the processing unit 2308 is configured to search (e.g., with the searching unit 2328) the at least one object using the object managing process.

In some examples, the at least one object includes at least one of a folder or a file. The file includes at least one of a photo, an audio, or a video. The file is stored internally or externally to the user device.

In some examples, searching at least one of the folder or the file is based on metadata associated with the folder or the file.

In some examples, the processing unit 2308 is configured to instantiate (e.g., with the instantiating unit 2335) the object managing process. Instantiating of the object managing process includes invoking the object managing process, generating a new instance of the object managing process, or executing an existing instance of the object managing process.

In some examples, the processing unit 2308 is configured to create (e.g., with the creating unit 2334) the at least one object.

In some examples, the processing unit 2308 is configured to store (e.g., with the storing unit 2336) the at least one object.

In some examples, the processing unit 2308 is configured to compress (e.g., with the compressing unit 2338) the at least one object.

In some examples, the processing unit 2308 is configured to move (e.g., with the moving unit 2339) the at least one object from a first physical or virtual storage to a second physical or virtual storage.

In some examples, the processing unit 2308 is configured to copy (e.g., with the copying unit 2340) the at least one object from a first physical or virtual storage to a second physical or virtual storage.

In some examples, the processing unit 2308 is configured to delete (e.g., with the deleting unit 2342) the at least one object stored in a physical or virtual storage.

In some examples, the processing unit 2308 is configured to recover with the recovering unit 2344) at least one object stored at a physical or virtual storage.

In some examples, the processing unit 2308 is configured to mark (e.g., with the marking unit 2346) the at least one object. Marking of the at least one object is at least one of visible or associated with metadata of the at least one object.

In some examples, the processing unit 2308 is configured to back up (e.g., with the backing up unit 2348) the at least one object according to a predetermined time period for backing up.

In some examples, the processing unit 2308 is configured to share (e.g., with the sharing unit 2350) the at least one object among one or more electronic devices communicatively connected to the user device.

In some examples, the processing unit 2308 is configured to provide (e.g., with the providing unit 2318) a response based on a result of performing the task using the searching process or the object managing process.

In some examples, the processing unit 2308 is configured to display (e.g., with the displaying unit 2322) a first user interface providing the result of performing the task using the searching process or the object managing process.

In some examples, the processing unit 2308 is configured to provide (e.g., with the providing unit 2318) a link associated with the result of performing the task using the searching process.

In some examples, the processing unit 2308 is configured to provide (e.g., with the providing unit 2318) a spoken output according to the result of performing the task using the searching process or the object managing process.

In some examples, the processing unit 2308 is configured to provide (e.g., with the providing unit 2318) an affordance that enables the user to manipulate the result of performing the task using the searching process or the object managing process.

In some examples, the processing unit 2308 is configured to instantiate (e.g., with the instantiating unit 2335) a third process that operates using the result of performing the task.

In some examples, the processing unit 2308 is configured to determine (e.g., with the determining unit 2314) a confidence level; and provide (e.g., with providing unit 2318) the response in accordance with the determination of the confidence level.

In some examples, the confidence level represents the accuracy in determining the user intent based on the first speech input and context information associated with the user device.

In some examples, the confidence level represents the accuracy in determining whether the user intent is to perform the task using the searching process or the object managing process.

In some examples, the confidence level represents the accuracy in performing the task using the searching process or the object managing process.

In some examples, the processing unit 2308 is configured to determine (e.g., with the determining unit 2314) whether the confidence level is greater than or equal to a threshold confidence level. In accordance with a determination that the confidence level is greater than or equal to the threshold confidence level, the processing unit 2308 is configured to provide (e.g., with the providing unit 2318) a first response; and in accordance with a determination that the confidence level is less than a threshold confidence level, the processing unit 2308 is configured to provide (e.g., with the providing unit 2318) a second response.

11. Electronic Device—Continuity

In some examples, the processing unit 2308 is configured to receive (e.g., with the receiving unit 2310) a speech input from a user to perform a task; identify (e.g., with the identifying unit 2312) context information associated with the user device; and determine (e.g., with the determining unit 2314) a user intent based on the speech input and context information associated with the user device.

In some examples, the processing unit 2308 is configured to, in accordance with user intent, determine (e.g., with the determining unit 2314) whether the task is to be performed at the user device or at a first electronic device communicatively connected to the user device.

In some examples, in accordance with a determination that the task is to be performed at the user device and content for performing the task is located remotely, the processing unit 2308 is configured to receive (e.g., with the receiving unit 2310) the content for performing the task.

In some examples, in accordance with a determination that the task is to be performed at the first electronic device and the content for performing the task is located remotely to the first electronic device, the processing unit 2308 is configured to provide (e.g., with the providing unit 2318) the content for performing the task to the first electronic device.

In some examples, the user device is configured to provide a plurality of user interfaces.

In some examples, the user device includes a laptop computer, a desktop computer, or a server.

In some examples, the first electronic device includes a laptop computer, a desktop computer, a server, a smartphone, a tablet, a set-top box, or a watch.

In some examples, the processing unit 2308 is configured to, prior to receiving the speech input, display (e.g., with the displaying unit 2322), on a display of the user device, an affordance to invoke the digital assistant.

In some examples, the processing unit 2308 is configured to invoke (e.g., with the invoking unit 2320) the digital assistant in response to receiving a pre-determined phrase.

In some examples, the processing unit 2308 is configured to invoke (e.g., with the invoking unit 2320) the digital assistant in response to receiving a selection of the affordance.

In some examples, the processing unit 2308 is configured to determine with the determining unit 2314) one or more actionable intents; and determine (e.g., with the determining unit 2314) one or more parameters associated with the actionable intent.

In some examples, the context information comprises at least one of: user-specific data, sensor data, and user device configuration data.

In some examples, determining whether the task is to be performed at the user device or at the first electronic device is based on one or more keywords included in the speech input.

In some examples, the processing unit 2308 is configured to determine (e.g., with determining unit 2314) whether performing the task at the user device satisfies performance criteria.

In some examples, in accordance with a determination that performing the task at the user device satisfies the performance criteria, the processing unit 2308 is configured to determine (e.g., with the determining unit 2314) that the task is to be performed at the user device.

In some examples, in accordance with a determination that performing the task at the user device does not satisfy the performance criteria, the processing unit 2308 is configured to determine (e.g., with the determining unit 2314) whether performing the task at the first electronic device satisfies the performance criteria.

In some examples, in accordance with a determination that performing the task at the first electronic device satisfies the performance criteria, the processing unit 2308 is configured to determine with the determining 2314) that the task is to be performed at the first electronic device.

In some examples, in accordance with a determination that the performing the task at the first electronic device does not meet the performance criteria, the processing unit 2308 is configured to determine e.g., with the determining unit 2314) whether performing the task at the second electronic device satisfies the performance criteria.

In some examples, the performance criteria are determined based on one or more user preferences.

In some examples, the performance criteria are determined based on the device configuration data.

In some examples, the performance criteria are dynamically updated.

In some examples, in accordance with a determination that the task is to be performed at the user device and content for performing the task is located remotely, the processing unit 2308 is configured to receive (e.g., with the receiving unit 2310) at least a portion of the content from the first electronic device, wherein at least a portion of the content is stored in the first electronic device.

In some examples, in accordance with a determination that the task is to be performed at the user device and content for performing the task is located remotely, the processing unit 2308 is configured to receive (e.g., with the receiving unit 2310) at least a portion of the content from a third electronic device.

In some examples, in accordance with a determination that the task is to be performed at the first electronic device and the content for performing the task is located remotely to the first electronic device, the processing unit 2308 is configured to provide (e.g., with the providing unit 2318) at least a portion of the content from the user device to the first electronic device, wherein at least a portion of the content is stored at the user device.

In some examples, in accordance with a determination that the task is to be performed at the first electronic device and the content for performing the task is located remotely to the first electronic device, the processing unit 2308 is configured to cause (e.g., with the causing unit 2352) at least a portion of the content to be provided from a fourth electronic device to the first electronic device. At least a portion of the content is stored at the fourth electronic device.

In some examples, the task is to be performed at the user device, and processing unit 2308 is configured to provide (e.g., with the providing unit 2318) a first response at the user device using the received content.

In some examples, the processing unit 2308 is configured to perform (e.g., with the performing unit 2316) the task at the user device.

In some examples, performing the task at the user device is a continuation of a task partially performed remotely to the user device.

In some examples, the processing unit 2308 is configured to display (e.g., with the displaying unit 2322) a first user interface associated with the task to be performed at the user device.

In some examples, the processing unit 2308 is configured to provide (e.g., with the providing unit 2318) a link associated with the task to be performed at the user device.

In some examples, the processing unit 2308 is configured to provide (e.g., with the providing unit 2318) a spoken output according to the task to be performed at the user device.

In some examples, the task is to be performed at the first electronic device, and the processing unit 2308 is configured to provide (e.g., with the providing unit 2318) a second response at the user device.

In some examples, the processing unit 2308 is configured to cause (e.g., with the causing unit 2352) the task to be performed at the first electronic device.

In some examples, the task to be performed at the first electronic device is a continuation of a task performed remotely to the first electronic device.

In some examples, the processing unit 2308 is configured to provide (e.g., with the providing unit 2318) a spoken output according to the task to be performed at the first electronic device.

In some examples, the processing unit 2308 is configured to provide (e.g., with the providing unit 2318) an affordance that enables the user to select another electronic device for performance of the task.

12. Electronic Device—System Configuration Management

In some examples, the processing unit 2308 is configured to receive (e.g., with the receiving unit 2310) a speech input from a user to manage one or more system configurations of the user device. The user device is configured to concurrently provide a plurality of user interfaces.

In some examples, the processing unit 2308 is configured to identify (e.g., with the identifying unit 2312) context information associated with the user device; and determine (e.g., with the determining unit 2314) a user intent based on the speech input and context information.

In some examples, the processing unit 2308 is configured to determine (e.g., with the determining unit 2314) whether the user intent indicates an informational request or a request for performing a task.

In some examples, in accordance with a determination that the user intent indicates an informational request, the processing unit 2308 is configured to provide (e.g., with the providing unit 2318) a spoken response to the informational request.

In some examples, in accordance with a determination that the user intent indicates a request for performing a task, the processing unit 2308 is configured to instantiate with the instantiating unit 2335) a process associated with the user device to perform the task.

In some examples, the processing unit 2308 is configured to, prior to receiving the speech input, display (e.g., with the displaying unit 2322) on a display of the user device, an affordance to invoke the digital assistant.

In some examples, the processing unit 2308 is configured to invoke (e.g., with the invoking unit 2320) the digital assistant service in response to receiving a pre-determined phrase.

In some examples, the processing unit 2308 is configured to invoke (e.g., with the invoking unit 2320) the digital assistant service in response to receiving a selection of the affordance.

In some examples, the one or more system configurations of the user device comprise audio configurations.

In some examples, the one or more system configurations of the user device comprise date and time configurations.

In some examples, the one or more system configurations of the user device comprise dictation configurations.

In some examples, the one or more system configurations of the user device comprise display configurations.

In some examples, the one or more system configurations of the user device comprise input device configurations.

In some examples, the one or more system configurations of the user device comprise network configurations.

In some examples, the one or more system configurations of the user device comprise notification configurations.

In some examples, the one or more system configurations of the user device comprise printer configurations.

In some examples, the one or more system configurations of the user device comprise security configurations.

In some examples, the one or more system configurations of the user device comprise backup configurations.

In some examples, the one or more system configurations of the user device comprise application configurations.

In some examples, the one or more system configurations of the user device comprise user interface configurations.

In some examples, the processing unit 2308 is configured to determine (e.g., with the determining unit 2314) one or more actionable intents; and determine (e.g., with the determining unit 2314) one or more parameters associated with the actionable intent.

In some examples, the context information comprises at least one of: user-specific data, device configuration data, and sensor data.

In some examples, the processing unit 2308 is configured to determine (e.g., with the determining unit 2314) whether the user intent is to vary a system configuration.

In some examples, the processing unit 2308 is configured to obtain (e.g., with the obtaining unit 2354) status of one or more system configurations according to the informational request; and provide with the providing unit 2318) the spoken response according to the status of one or more system configurations.

In some examples, in accordance with a determination that the user intent indicates an informational request, the processing unit 2308 is configured to, in addition to providing the spoken response to the informational request, display (e.g., with the displaying unit 2322) a first user interface providing information according to the status of the one or more system configurations.

In some examples, in accordance with a determination that the user intent indicates an informational request, the processing unit 2308 is configured to, in addition to providing the spoken response to the informational request, provide (e.g., with the providing unit 2318) a link associated with the informational request.

In some examples, in accordance with a determination that the user intent indicates a request for performing a task, the processing unit 2308 is configured to perform (e.g., with the performing unit 2316) the task using the process.

In some examples, the processing unit 2308 is configured to provide (e.g., with the providing unit 2318) a first spoken output according to a result of performing the task.

In some examples, the processing unit 2308 is configured to provide (e.g., with the providing unit 2318) a second user interface enabling the user to manipulate a result of performing the task.

In some examples, the second user interface comprises a link associated with the result of performing the task.

In some examples, in accordance with a determination that the user intent indicates a request for performing a task, the processing unit 2308 is configured to provide (e.g., with the providing unit 2318) a third user interface enabling the user to perform the task.

In some examples, the third user interface includes a link enabling the user to perform the task.

In some examples, the processing unit 2308 is configured to provide (e.g., with the providing unit 2318) a second spoken output associated with the third user interface.

The operation described above with respect to FIG. 23 is, optionally, implemented by components depicted in FIGS. 1, 2A, 4, 6A-B, or 7A-7B. For example, receiving operation 2310, identifying operation 2312, determining operation 2314, performing operation 2316, and providing operation 2318 are optionally implemented by processor(s) 220. It would be clear to a person of ordinary skill in the art how other processes can be implemented based on the components depicted in FIGS. 1, 2A, 4, 6A-B, or 7A-7B.

It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein. For example, processing unit 2308 can have an associated "controller" unit that is operatively coupled with processing unit 2308 to enable operation. This controller unit is not separately illustrated in FIG. 23 but is understood to be within the grasp of one of ordinary skill in the art who is designing a device having a processing unit 2308, such as device 2300. As another example, one or more units, such as the receiving unit 2310, may be hardware units outside of processing unit 2308 in some embodiments. The description herein thus optionally supports combination, separation, and/or further definition of the functional blocks described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method for providing a digital assistant service, comprising:

at a user device with one or more processors and memory:

receiving a speech input from a user to manage one or more user configurable system settings of the user device, wherein the user device is concurrently displaying a plurality of graphical user interfaces associated with a plurality of corresponding applications;

identifying context information associated with the user device;

determining a user intent based on the speech input and context information;

determining whether the user intent indicates an informational request related to the one or more user configurable system settings of the user device or a request for performing a task related to one of the plurality of corresponding applications;

in accordance with a determination that the user intent indicates the informational request related to the one or more user configurable system settings of the user device:

providing a spoken response to the informational request including a status of the one or more user configurable system settings of the user device;

displaying an affordance for managing the one or more user configurable system settings of the user device; and displaying a link associated with the informational request, wherein the link displays a user interface for managing the one or more user configurable system settings when selected by the user; and in accordance with a determination that the user intent indicates a request for performing the task, instantiating a process associated with the user device to perform the task.

2. The method of claim 1, further comprising, prior to receiving the speech input:

displaying, on a display of the user device, an affordance to invoke the digital assistant.

3. The method of claim 2, further comprising:

instantiating the digital assistant service in response to receiving a pre-determined phrase.

4. The method of claim 2, further comprising:

instantiating the digital assistant service in response to receiving a selection of the affordance.

5. The method of claim 1, wherein the one or more user configurable system settings of the user device comprise audio configurations.

6. The method of claim 1, wherein the one or more user configurable system settings of the user device comprise date and time configurations.

7. The method of claim 1, wherein the one or more user configurable system settings of the user device comprise dictation configurations.

8. The method of claim 1, wherein the one or more user configurable system settings of the user device comprise display configurations.

9. The method of claim 1, wherein the one or more user configurable system settings of the user device comprise input device configurations.

10. The method of claim 1, wherein the one or more user configurable system settings of the user device comprise network configurations.

11. The method of claim 1, wherein the one or more user configurable system settings of the user device comprise notification configurations.

12. The method of claim 1, wherein the one or more user configurable system settings of the user device comprise printer configurations.

13. The method of claim 1, wherein the one or more user configurable system settings of the user device comprise security configurations.

14. The method of claim 1, wherein the one or more user configurable system settings of the user device comprise backup configurations.

15. The method of claim 1, wherein the one or more user configurable system settings of the user device comprise application configurations.

16. The method of claim 1, wherein the one or more user configurable system settings of the user device comprise user interface configurations.

17. The method of claim 1, wherein determining the user intent comprises:

determining one or more actionable intents; and determining one or more parameters associated with the actionable intent.

18. The method of claim 1, wherein the context information comprises at least one of: user-specific data, device configuration data, and sensor data.

19. The method of claim 1, wherein determining whether the user intent indicates the informational request or a request for performing the task comprises:

determining whether the user intent is to vary a user configurable system setting.

20. The method of claim 1, wherein providing the spoken response to the informational request including a status of the one or more user configurable system settings of the user device further comprises:

obtaining the status of the one or more user configurable system settings according to the informational request.

21. The method of claim 20, wherein the user interface is a first user interface, further comprising, in accordance with the determination that the user intent indicates the informational request:

displaying a second user interface providing information according to the status of the one or more user configurable system settings.

22. The method of claim 1, wherein instantiating the process associated with the user device to perform the task comprises:

performing the task using the process.

23. The method of claim 22, further comprising:

providing a second spoken response according to a result of performing the task.

24. The method of claim 22, further comprising:

providing a third user interface enabling the user to manipulate a result of performing the task.

25. The method of claim 24, wherein the third user interface comprises a link associated with the result of performing the task.

26. The method of claim 1, wherein instantiating the process associated with the user device to perform the task comprises:

providing a fourth user interface enabling the user to perform the task.

27. The method of claim 26, wherein the fourth user interface includes a link enabling the user to perform the task.

28. The method of claim 26, further comprising providing a third spoken response associated with the fourth user interface.

29. A user device comprising:

one or more processors;

memory; and one or more programs stored in memory, the one or more programs including instructions for performing:

receiving a speech input from a user to manage one or more user configurable system settings of the user device, wherein the user device is concurrently displaying a plurality of graphical user interfaces associated with a plurality of corresponding applications;

identifying context information associated with the user device;

determining a user intent based on the speech input and context information;

determining whether the user intent indicates an informational request related to the one or more user configurable system settings of the user device or a request for performing a task related to one of the plurality of corresponding applications;

in accordance with a determination that the user intent indicates the informational request related to the one or more user configurable system settings of the user device:

providing a spoken response to the informational request including a status of the one or more user configurable system settings of the user device;

displaying an affordance for managing the one or more user configurable system settings of the user device; and displaying a link associated with the informational request, wherein the link displays a user interface for managing the one or more user configurable system settings when selected by the user; and in accordance with a determination that the user intent indicates a request for performing the task, instantiating a process associated with the user device to perform the task.

30. The user device of claim 29, wherein determining whether the user intent indicates the informational request or a request for performing the task comprises:

determining whether the user intent is to vary a user configurable system setting.

31. The user device of claim 29, wherein providing the spoken response to the informational request including a status of the one or more user configurable system settings of the user device further comprises:

obtaining the status of the one or more user configurable system settings according to the informational request.

32. The user device of claim 31, wherein the user interface is a first user interface, further comprising instructions for, in accordance with the determination that the user intent indicates the informational request:

displaying a second user interface providing information according to the status of the one or more user configurable system settings.

33. The user device of claim 29, wherein instantiating the process associated with the user device to perform the task comprises:

performing the task using the process.

34. The user device of claim 33, further comprising instructions for:

providing a second spoken response according to a result of performing the task.

35. The user device of claim 33, further comprising instructions for:

providing a third user interface enabling the user to manipulate a result of performing the task.

36. The user device of claim 29, wherein instantiating the process associated with the user device to perform the task comprises:

providing a fourth user interface enabling the user to perform the task.

37. A non-transitory computer-readable storage medium comprising one or more programs for execution by one or more processors of a user device, the one or more programs including instructions which, when executed by the one or more processors, cause the user device to:

receive a speech input from a user to manage one or more user configurable system settings of the user device, wherein the user device is concurrently displaying a plurality of graphical user interfaces associated with a plurality of corresponding applications;

identify context information associated with the user device;

determine a user intent based on the speech input and context information;

determine whether the user intent indicates an informational request related to the one or more user configurable system settings of the user device or a request for performing a task related to one of the plurality of corresponding applications;

in accordance with a determination that the user intent indicates the informational request related to the one or more user configurable system settings of the user device:

provide a spoken response to the informational request including a status of the one or more user configurable system settings of the user device;

display an affordance for managing the one or more user configurable system settings of the user device; and display a link associated with the informational request, wherein the link displays a user interface for managing the one or more user configurable system settings when selected by the user; and in accordance with a determination that the user intent indicates a request for performing the task, instantiate a process associated with the user device to perform the task.

38. The non-transitory computer-readable storage medium of claim 37, wherein determining whether the user intent indicates the informational request or a request for performing the task comprises:

determining whether the user intent is to vary a user configurable system setting.

39. The non-transitory computer-readable storage medium of claim 37, wherein providing the spoken response to the informational request including a status of the one or more user configurable system settings of the user device further comprises:

obtaining the status of the one or more user configurable system settings according to the informational request.

40. The non-transitory computer-readable storage medium of claim 39, wherein the user interface is a first user interface, the one or more programs further including instructions which, when executed by the one or more processors, cause the user device to, in accordance with the determination that the user intent indicates the informational request:

display a second user interface providing information according to the status of the one or more user configurable system settings.

41. The non-transitory computer-readable storage medium of claim 37, wherein instantiating the process associated with the user device to perform the task comprises:

performing the task using the process.

42. The non-transitory computer-readable storage medium of claim 41, the one or more programs further including instructions which, when executed by the one or more processors, cause the user device to:

provide a second spoken response according to a result of performing the task.

43. The non-transitory computer-readable storage medium of claim 41, the one or more programs further including instructions which, when executed by the one or more processors, cause the user device to:

provide a third user interface enabling the user to manipulate a result of performing the task.

44. The non-transitory computer-readable storage medium of claim 37, wherein instantiating the process associated with the user device to perform the task comprises:

providing a fourth user interface enabling the user to perform the task.

* * * * *